US012778332B2

(12) United States Patent
Skaaksrud

(10) Patent No.: US 12,778,332 B2
(45) Date of Patent: Nov. 3, 2026

(54) PROACTIVELY MONITORED AND REPORTING LOGISTICS RECEPTACLE APPARATUS, SYSTEMS, AND METHODS FOR RECEIVING AND TEMPORARILY MAINTAINING A DELIVERY ITEM

(71) Applicant: Federal Express Corporation, Memphis, TN (US)

(72) Inventor: Ole-Petter Skaaksrud, Germantown, TN (US)

(73) Assignee: Federal Express Corporation, Memphis, TN (US)

( * ) Notice: Subject to any disclaimer, the term of this patent is extended or adjusted under 35 U.S.C. 154(b) by 310 days.

(21) Appl. No.: 18/479,047

(22) Filed: Sep. 30, 2023

(65) Prior Publication Data

US 2024/0211874 A1 Jun. 27, 2024

Related U.S. Application Data

(60) Provisional application No. 63/434,492, filed on Dec. 22, 2022.

(51) Int. Cl.
*G06Q 10/00* (2026.01)
*A47G 29/12* (2006.01)
(Continued)

(52) U.S. Cl.
CPC ... *G06Q 10/0836* (2013.01); *A47G 29/12095* (2017.08); *A47G 29/1214* (2013.01);
(Continued)

(58) Field of Classification Search
CPC ......... G06Q 10/0836; G06Q 10/06315; G06Q 10/08; G06Q 10/0833; G06Q 10/08345; A47G 29/12095; A47G 29/1214
See application file for complete search history.

(56) References Cited

U.S. PATENT DOCUMENTS

| | | | |
|---|---|---|---|
| 5,818,336 | A | 10/1998 | Varge et al. |
| 9,371,681 | B2 | 6/2016 | Tompkins |

(Continued)

FOREIGN PATENT DOCUMENTS

| | | | |
|---|---|---|---|
| CA | 2829139 | A1 | 4/2014 |
| DE | 102015205298 | A1 | 9/2016 |

(Continued)

OTHER PUBLICATIONS

U.S. Appl. No. 18/226,248 Office Action mailed Apr. 3, 2025.

(Continued)

*Primary Examiner* — Rokib Masud
(74) *Attorney, Agent, or Firm* — Withers & Keys, LLC

(57) ABSTRACT

A proactively monitored and reporting logistics receptacle system for receiving and temporarily maintaining a delivery item. The system includes a storage receptacle for receiving the delivery item, a bridge node mounted to the storage receptacle, and a wireless accessory sensor node to monitor each of the monitored storage components for a change in state. The wireless accessory sensor node determines whether a change in state has been detected based upon sensor data generated, generates event information reflecting the detected change in state, periodically generates non-event information when the change in state has not been detected, and broadcasts an updated advertising signal. The bridge node processor detects the flag, retrieves the status update, and transmits receptacle update information to a backend server. The receptacle update information causes the backend server to initiate a first type of dispatched logistics operation when the status update corresponds to the event information.

75 Claims, 131 Drawing Sheets

(51) Int. Cl.

| | |
|---|---|
| ***A47G 29/14*** | (2006.01) |
| ***A47G 29/20*** | (2006.01) |
| ***G01P 13/00*** | (2006.01) |
| ***G06F 1/3296*** | (2019.01) |
| ***G06Q 10/0631*** | (2023.01) |
| ***G06Q 10/08*** | (2023.01) |
| ***G06Q 10/0833*** | (2023.01) |
| ***G06Q 10/0834*** | (2023.01) |
| ***G06Q 10/0836*** | (2023.01) |
| ***G06Q 10/087*** | (2023.01) |
| ***G06Q 10/20*** | (2023.01) |
| ***G06Q 20/38*** | (2012.01) |
| ***G06Q 20/40*** | (2012.01) |
| ***G06Q 30/0202*** | (2023.01) |
| ***G06Q 30/0251*** | (2023.01) |
| ***G07C 9/00*** | (2020.01) |
| ***G07C 9/20*** | (2020.01) |
| ***G07C 9/22*** | (2020.01) |
| ***G07C 9/27*** | (2020.01) |
| ***G07C 9/38*** | (2020.01) |
| ***G07F 17/12*** | (2006.01) |
| ***H04L 41/069*** | (2022.01) |
| ***H04L 41/0816*** | (2022.01) |
| ***H04L 41/082*** | (2022.01) |
| ***H04L 67/12*** | (2022.01) |
| ***H04W 4/029*** | (2018.01) |
| ***H04W 4/38*** | (2018.01) |
| ***H04W 12/06*** | (2021.01) |
| *G05D 105/28* | (2024.01) |
| *G06K 19/07* | (2006.01) |
| *H04W 4/80* | (2018.01) |

(52) U.S. Cl.

CPC ........... *A47G 29/141* (2013.01); *A47G 29/20* (2013.01); *G01P 13/00* (2013.01); *G06F 1/3296* (2013.01); *G06Q 10/06315* (2013.01); *G06Q 10/08* (2013.01); *G06Q 10/0833* (2013.01); *G06Q 10/08345* (2013.01); *G06Q 10/087* (2013.01); *G06Q 10/20* (2013.01); *G06Q 20/382* (2013.01); *G06Q 20/389* (2013.01); *G06Q 20/401* (2013.01); *G06Q 30/0202* (2013.01); *G06Q 30/0267* (2013.01); *G07C 9/00309* (2013.01); *G07C 9/00571* (2013.01); *G07C 9/00896* (2013.01); *G07C 9/215* (2020.01); *G07C 9/22* (2020.01); *G07C 9/27* (2020.01); *G07C 9/38* (2020.01); *G07F 17/13* (2020.05); *H04L 41/069* (2013.01); *H04L 41/0816* (2013.01); *H04L 41/082* (2013.01); *H04L 67/12* (2013.01); *H04W 4/029* (2018.02); *H04W 4/38* (2018.02); *H04W 12/06* (2013.01); *A47G 2029/12105* (2017.08); *A47G 2029/143* (2013.01); *A47G 2029/145* (2013.01); *A47G 2029/149* (2013.01); *G05D 2105/285* (2024.01); *G06K 19/0723* (2013.01); *G07C 2009/0092* (2013.01); *H04W 4/80* (2018.02)

(56) References Cited

U.S. PATENT DOCUMENTS

| | | | | |
|---|---|---|---|---|
| 9,609,973 | B1 | 4/2017 | Pleasant | |
| 10,097,353 | B1 * | 10/2018 | Carlson | H04L 67/306 |
| 10,373,100 | B2 | 8/2019 | Goja | |
| 10,740,717 | B2 | 8/2020 | Skaaksrud | |
| 10,824,774 | B2 | 11/2020 | Santorone et al. | |
| 10,834,253 | B1 | 11/2020 | Gabler et al. | |
| 11,620,866 | B1 | 4/2023 | Goetz et al. | |
| 11,716,444 | B2 | 8/2023 | Ritchey et al. | |
| 12,093,884 | B2 | 9/2024 | Skaaksrud | |
| 12,093,885 | B2 | 9/2024 | Skaaksrud | |
| 12,131,285 | B2 | 10/2024 | Skaaksrud | |
| 12,260,368 | B2 | 3/2025 | Skaaksrud | |
| 12,277,528 | B2 | 4/2025 | Skaaksrud | |
| 12,361,370 | B2 | 7/2025 | Skaaksrud | |
| 12,367,453 | B2 | 7/2025 | Skaaksrud | |
| 12,406,224 | B2 | 9/2025 | Skaaksrud | |
| 12,555,066 | B2 | 2/2026 | Skaaksrud | |
| 12,555,067 | B2 | 2/2026 | Skaaksrud | |
| 12,579,504 | B2 | 3/2026 | Skaaksrud | |
| 12,591,842 | B2 | 3/2026 | Skaaksrud | |
| 12,596,987 | B2 | 4/2026 | Skaaksrud | |
| 12,639,660 | B2 | 5/2026 | Skaaksrud | |
| 12,664,512 | B2 | 6/2026 | Skaaksrud | |
| 12,699,953 | B2 | 8/2026 | Skaaksrud | |
| 2005/0154602 | A1 | 7/2005 | Hertz | |
| 2006/0235739 | A1 | 10/2006 | Levis et al. | |
| 2008/0189161 | A1 | 8/2008 | Daily et al. | |
| 2013/0144428 | A1 | 6/2013 | Irwin et al. | |
| 2013/0325231 | A1 | 12/2013 | Park | |
| 2014/0035721 | A1 | 2/2014 | Heppe et al. | |
| 2015/0102903 | A1 | 4/2015 | Wilkinson | |
| 2015/0106296 | A1 | 4/2015 | Robinson et al. | |
| 2015/0154542 | A1 * | 6/2015 | Skaaksrud | B60W 60/00256 705/333 |
| 2015/0154544 | A1 * | 6/2015 | Skaaksrud | B60W 60/00256 705/333 |
| 2015/0154547 | A1 * | 6/2015 | Skaaksrud | B60W 60/00256 705/333 |
| 2015/0154549 | A1 * | 6/2015 | Skaaksrud | B60W 60/00256 705/333 |
| 2015/0154555 | A1 * | 6/2015 | Skaaksrud | B60W 60/00256 705/333 |
| 2015/0178677 | A1 | 6/2015 | Strand et al. | |
| 2015/0186840 | A1 * | 7/2015 | Torres | A47B 81/00 705/339 |
| 2015/0339862 | A1 | 11/2015 | Skaaksrud | |
| 2015/0349917 | A1 | 12/2015 | Skaaksrud | |
| 2015/0363843 | A1 | 12/2015 | Loppatto et al. | |
| 2016/0025549 | A1 | 1/2016 | Motoyama | |
| 2016/0051073 | A1 | 2/2016 | Heinz et al. | |
| 2016/0232489 | A1 | 8/2016 | Skaaksrud | |
| 2016/0335594 | A1 | 11/2016 | Czachor, Jr. et al. | |
| 2017/0041451 | A1 | 2/2017 | Wilkinson | |
| 2017/0091710 | A1 | 3/2017 | Van Dyke | |
| 2017/0091711 | A1 | 3/2017 | Akselrod et al. | |
| 2017/0124510 | A1 | 5/2017 | Caterino et al. | |
| 2017/0200152 | A1 | 7/2017 | Winkler et al. | |
| 2017/0278063 | A1 | 9/2017 | Dixon et al. | |
| 2017/0323545 | A1 | 11/2017 | Gillen et al. | |
| 2018/0046978 | A1 | 2/2018 | Tartal et al. | |
| 2018/0186454 | A1 | 7/2018 | Luckay et al. | |
| 2018/0186531 | A1 | 7/2018 | McBride et al. | |
| 2018/0189716 | A1 | 7/2018 | Crone | |
| 2018/0190054 | A1 | 7/2018 | Perez et al. | |
| 2018/0197140 | A1 | 7/2018 | Goja | |
| 2018/0330463 | A1 | 11/2018 | Parameswaran et al. | |
| 2018/0365641 | A1 | 12/2018 | Zhu | |
| 2018/0374043 | A1 | 12/2018 | Irwin et al. | |
| 2019/0012625 | A1 | 1/2019 | Lawrenson et al. | |
| 2019/0130349 | A1 | 5/2019 | Ferguson et al. | |
| 2019/0287061 | A1 | 9/2019 | Goja | |
| 2019/0287063 | A1 | 9/2019 | Skaaksrud et al. | |
| 2020/0134948 | A1 | 4/2020 | Sengstaken, Jr. | |
| 2020/0189731 | A1 | 6/2020 | Mistry et al. | |
| 2020/0240166 | A1 | 7/2020 | Graner | |
| 2020/0311671 | A1 | 10/2020 | Lundahl | |
| 2021/0009310 | A1 | 1/2021 | Moeller et al. | |
| 2021/0105435 | A1 | 4/2021 | Ritchey et al. | |
| 2021/0256472 | A1 | 8/2021 | Javidan et al. | |
| 2021/0264358 | A1 | 8/2021 | Yadav et al. | |
| 2021/0387808 | A1 | 12/2021 | Kalouche | |
| 2022/0051183 | A1 | 2/2022 | Franzo | |
| 2022/0051515 | A1 | 2/2022 | Schmidt et al. | |
| 2022/0233010 | A1 | 7/2022 | Sundaresan | |
| 2023/0068077 | A1 | 3/2023 | Kashi | |

(56) References Cited

U.S. PATENT DOCUMENTS

| | | | |
|---|---|---|---|
| 2023/0206172 A1 | 6/2023 | Kashi |
| 2023/0206174 A1 | 6/2023 | Li et al. |
| 2023/0410028 A1 | 12/2023 | O'Toole et al. |
| 2024/0062601 A1 | 2/2024 | Corder et al. |
| 2024/0211874 A1 | 6/2024 | Skaaksrud |
| 2025/0148857 A1 | 5/2025 | Ecton et al. |

FOREIGN PATENT DOCUMENTS

| | | |
|---|---|---|
| WO | 2008113568 A1 | 9/2008 |
| WO | 2009140669 A2 | 11/2009 |

OTHER PUBLICATIONS

U.S. Appl. No. 18/497,819 Office Action mailed Apr. 10, 2025.
U.S. Appl. No. 18/497,801 Office Action mailed Apr. 24, 2025.
U.S. Appl. No. 18/479,042 Office Action mailed May 7, 2025.
U.S. Appl. No. 18/240,123 Office Action mailed May 8, 2025.
U.S. Appl. No. 18/212,756 Office Action mailed May 21, 2025.
Bachofner et al., "City Logistics: Challenges and Opportunities for technology providers", Journal of Urban Mobility, Dec. 2022, pp. 1-10, vol. 2, Elsevier, https://doi.org/j.urbmob.2022.100020.
Wagner et al., "Delay Tolerant, radio frequency identification (RFID)-enabled sensing", IEEE International Conference on Wireless for Space and Extreme Environments, Oct. 30, 2014, DOI:10.1109/WISEE.2014.6973078.
U.S. Appl. No. 18/497,787 Notice of Allowance mailed Jul. 23, 2025.
U.S. Appl. No. 18/212,745 Office Action mailed Aug. 14, 2025.
U.S. Appl. No. 18/497,801 Notice of Allowance mailed Aug. 19, 2025.
U.S. Appl. No. 18/886,948 Office Action mailed Sep. 11, 2025.
U.S. Appl. No. 18/479,045 Notice of Allowance mailed Mar. 10, 2025.
U.S. Appl. No. 18/497,787 Office Action mailed Mar. 26, 2025.
U.S. Appl. No. 18/240,146 Notice of Allowance mailed Apr. 22, 2024.
U.S. Appl. No. 18/240,173 Notice of Allowance mailed May 6, 2024.
Lee, "Optimization of Modular Drone Delivery System", IEEE Xplore, 2004, 8 pages.
U.S. Appl. No. 18/212,738 Notice of Allowance mailed Jan. 21, 2025.
U.S. Appl. No. 18/226,239 Notice of Allowance mailed Feb. 18, 2025.
U.S. Appl. No. 18/226,241 Notice of Allowance mailed Jun. 10, 2024.
Plasilova et al., "RFID-based Multi-purpose Smart Post Boxes in Smart Cities", 2022 6th International Conference on Smart Grid and Smart Cities (ICSGSC), Chengdu, China, 2022, pp. 184-189.
U.S. Appl. No. 18/226,243 Notice of Allowance mailed Nov. 15, 2024.
Faugere et al., "Hyperconnected City Logistics: Smart Lockers Terminals & Last Mile Delivery Networks", IPIC 3rd International Physical Internet Conference Jun. 2016, pp. 1-14.
U.S. Appl. No. 18/212,751 Notice of Allowance mailed Dec. 13, 2024.
Perlmutter, "PUDO: What it is, and How it Can Make Your Delivery Process More Efficient", Bringg, 3 pages, Mar. 24, 2022, bringg.com, Retrieved from https://www.bringg.com/bloglin-store-pickup/pudo-pick-up-drop-off/.
U.S. Appl. No. 18/226,239 Office Action mailed Jul. 30, 2024.
U.S. Appl. No. 18/479,037 Office Action mailed Sep. 29, 2025.
U.S. Appl. No. 18/497,787 Notice of Allowance mailed Oct. 15, 2025.
U.S. Appl. No. 18/497,801 Notice of Allowance mailed Oct. 15, 2025.
U.S. Appl. No. 18/226,248 Notice of Allowance mailed Oct. 22, 2025.
Chou et al., "A Bluetooth-Smart Insulating Container for Cold-Chain Logistics", 2013 IEEE 6th International Conference on Service-Oriented Computing and Applications, 2013, pp. 298-303.
U.S. Appl. No. 18/212,756 Notice of Allowance mailed Jan. 15, 2026.
U.S. Appl. No. 18/240,123 Office Action mailed Jan. 23, 2026.
U.S. Appl. No. 18/212,745 Notice of Allowance mailed Jan. 29, 2026.
U.S. Appl. No. 18/479,037 Notice of Allowance mailed Apr. 17, 2026.
Li-Feng et al., "Design of Cold Chain Logistics Information Real Time Tracking System Based on Wireless RFID Technology", Conference paper, Jan. 18, 2022, pp. 440-453, https://doi.org/10.1007/978-3-030-94551-0_35.
U.S. Appl. No. 18/497,819 Notice of Allowance mailed Nov. 12, 2025.
FD (Fair Disclosure) Wire, "United Parcel Service Inc Analyst Meeting—Final," CQ-Roll Call, Inc., Sep. 15, 2011.
U.S. Appl. No. 18/479,049 Office Action mailed Mar. 4, 2026.
U.S. Appl. No. 18/886,912 Office Action mailed Mar. 20, 2026.
U.S. Appl. No. 18/886/948 Notice of Allowance mailed Mar. 27, 2026.
U.S. Appl. No. 18/886,912 Notice of Allowance mailed Jul. 17, 2026.
U.S. Appl. No. 19/266,117 Office Action mailed Jul. 31, 2026.
U.S. Appl. No. 18/479,049 Notice of Allowance mailed Aug. 11, 2026.
Li et al., "Deploying autonomous mobile lockers in a two-echelon parcel operation", Transportation Research Part C, May 3, 2021, 24 pages, Elsevier Ltd.
U.S. Appl. No. 19/088,075 Office Action mailed Jun. 2, 2026.
U.S. Appl. No. 18/497,814 Notice of Allowance mailed Jun. 4, 2026.

* cited by examiner

Deployable Vehicle Based Logistics Receptacle

Deployable Mobile Autonomous
Logistics Receptacle

Deployable Autonomous Mobile Container (DAMC)

PROACTIVELY MONITORED AND REPORTING LOGISTICS RECEPTACLE APPARATUS, SYSTEMS, AND METHODS FOR RECEIVING AND TEMPORARILY MAINTAINING A DELIVERY ITEM

RELATED APPLICATIONS

The present application claims priority to U.S. Provisional Application No. 63/434,492, filed on Dec. 22, 2022.

The present application is also related in subject matter to the following non-provisional patent applications where each also claims the benefit of priority to the same above-referenced provisional patent application: (1) Non-Provisional patent application Ser. No. 18/212,738 entitled "Improved Systems, Apparatus and Methods Involving an Enhanced Connected Node-based Logistics Receptacle and Methods of Operating the Same"; (2) Non-Provisional patent application Ser. No. 18/212,745 entitled "Enhanced Apparatus, Systems, and Methods for Receiving and Temporarily Maintaining a Delivery Item and Responsively Initiating a Dispatched Logistics Operation for a Storage Receptacle"; (3) Non-Provisional patent application Ser. No. 18/212,751 entitled "Enhanced Multi-compartment Logistics Receptacle Apparatus, Systems, and Methods for Receiving and Temporarily Maintaining a Delivery Item and Causing a Backend Server to Initiate a Dispatched Logistics Operation"; (4) Non-Provisional patent application Ser. No. 18/212,756 entitled "Apparatus, Systems, and Methods for Dynamically Tuning Operation of a Node-based Logistics Receptacle"; (5) Non-Provisional patent application Ser. No. 18/226,239 entitled "Centrally Managed Apparatus, Systems, and Methods for Tuning a Plurality of Enhanced Node-based Logistics Receptacles"; (6) Non-Provisional patent application Ser. No. 18/226,241 entitled "Apparatus, Systems, and Methods for Multi-domain Management of a Node-based Logistics Receptacle in Response to a Dispatched Logistics Operation Involving the Node-based Logistics Receptacle and a Mobile Courier Node"; (7) Non-Provisional patent application Ser. No. 18/226,243 entitled "Apparatus, Systems, and Methods for Receiving and Temporarily Maintaining a Delivery Item and Dynamically Initiating a Dispatched Logistics Operation for a Storage Receptacle"; (8) Non-Provisional patent application Ser. No. 18/226,248 entitled "Improved Connected Logistics Receptacle Apparatus, Systems, and Methods with Proactive Unlocking Functionality Related to a Dispatched Logistics Operation by a Mobile Logistics Asset Having an Associated Mobile Transceiver"; (9) Non-Provisional Patent application Ser. No. 18/479,037 entitled "Improved Apparatus, Systems, and Methods for Monitoring and Initiating a Logistics Response Related to a Node-enabled Logistics Receptacle to be Serviced by a Logistics Asset"; (10) Non-Provisional patent application Ser. No. 18/240,123 entitled "Connected Logistics Receptacle Apparatus, Systems, and Methods with Enhanced Customer Identification Related to a Delivery Item Being Deposited by a Parcel Customer"; (11) Non-Provisional patent application Ser. No. 18/240,146 entitled "Connected Logistics Receptacle Apparatus, Systems, and Methods having Enhanced Status Indication Functionality Related to a Logistics Operation for a Delivery Item Being Deposited by a Parcel Customer"; (12) Non-Provisional patent application Ser. No. 18/240,173 entitled "Apparatus, Systems, and Methods for Self-tuning Operation of a Node-based Logistics Receptacle Based Upon Contextual Awareness"; (13) Non-Provisional patent application Ser. No. 18/479,042, entitled "Node-enabled Logistics Receptacle Apparatus, Systems, and Methods with a Deployable Storage Element for Receiving and Temporarily Maintaining a Delivery Item"; (14) Non-Provisional patent application Ser. No. 18/479,045 entitled "Enhanced Connected Logistics Receptacle Apparatus, Systems, and Methods that Selectively Retrieve and Report Event Information to a Backend Server to Initiate a Dispatched Logistics Operation Related to a Delivery Item"; (15) Non-Provisional patent application Ser. No. 18/479,049 entitled "Apparatus, Systems, and Methods Providing an On-demand Deployable Logistics Capacity Related to a Reporting Node-based Logistics Receptacle"; (16) Non-Provisional patent application Ser. No. 18/497,787 entitled "Dynamic Learning Server-based Logistics Apparatus, Systems, and Methods"; (17) Non-Provisional patent application Ser. No. 18/497,801 entitled "Apparatus, Systems, and Methods for Self-executing Enhanced Interaction with a Node-based Logistics Receptacle"; (18) Non-Provisional patent application Ser. No. 18/497,814 entitled "Apparatus, Systems, and Methods for Enhanced Interaction with a Node-based Logistics Receptacle During an External Drop Off of a Delivery Item by a Parcel Customer Operating a Mobile User Device"; (19) Non-Provisional patent application Ser. No. 18/497,819 entitled "Apparatus, Systems, and Methods for Enhanced Interaction with a Node-based Logistics Receptacle and a Parcel Customer Operating a Mobile User Device."

FIELD OF THE DISCLOSURE

The present disclosure generally relates to systems, apparatus and methods in the field of logistics and, more particularly, to various aspects involving systems, apparatus, and methods for improved monitoring a state of an enhanced logistics receptacle and improved techniques for reporting changes to the state of the enhanced logistics receptacle to cause a backend server to initiate and/or revise one or more dispatched logistics operations.

BACKGROUND

For a logistics operation involving the receipt, shipment, and delivery of packages (e.g., parcels, and the like), it is common to deploy one or more receptacles or repositories that can securely accept such packages for shipment and/or pickup of such packages. For example, such a receptacle or repository (generally referred to as a logistics receptacle) may be a drop box that allows a customer to securely deposit a package to be shipped within it but not provide customer access to an interior holding area of the drop box. Another example may be a locker unit type of logistics receptacle, which provides the customer with secure access to one or more parts of an interior temporary holding or storage area of the logistics receptacle and where a service courier picking up any packages may have access to the same and other areas within the holding/storage area(s). As such, a logistics receptacle is often an entry point and/or pickup point for a package being shipped from one location to another.

A logistics receptacle may be publicly deployed. For example, a logistics entity may operate as a company in the logistics field and deploy different logistics receptacles at distinct geographic locations so that the public may be able to more conveniently drop off packages to be shipped rather than travel to a central shipping office or shipping center. As such, it is common that many publicly deployed logistics receptacles are not actively manned by personnel. Thus, publicly deployed logistics receptacles are often used as secure remote repositories for packages and are only periodically serviced by agents of a logistics entity, such as a courier or other types of logistics assets.

The use and management of such logistics receptacles may face a variety of different problems and inefficiencies depending on how the logistics receptacle is implemented and used. For example, in some situations, the logistics receptacle may fill up quickly to a point of an overloaded or overflowing state prior to pickup service by a courier. In other situations, the logistics receptacle may have a current pickup time that may be inappropriate based on ongoing use—e.g., where the pickup time is either too early where the logistics asset (e.g., courier) dispatched for servicing may be wasted resulting in costly inefficiencies or where the pickup time is too late where customers may be frustrated given an overloaded state and where an earlier pickup time would allow for more room within a particular logistics receptacle.

Prior attempts to address such problems are known to use one or more sensors within a logistics receptacle where a central processing device gathers data related to a deposited package and wirelessly reports such data to staff or package collection personnel. Such prior solutions may still suffer inefficiencies in how such a sensor-based logistics receptacle operates, how it monitors itself, and how such reported data may be used in management of the logistics receptacle and related to any logistics asset dispatch.

The management and use of such a logistics receptacle can be improved to provide for quicker, more robust, and more efficient monitoring and reporting of events reflecting a status of the logistics receptacle so that the appropriate type of logistics operation may be dispatched and management of this and other logistics receptacles are further enhanced. Thus, there remains a need for improved systems, apparatus, and methods that may enhance monitoring of a connected node-enabled logistics receptacle and improve how to respond to such monitoring with responsive initiation of logistics operations related to one or more such logistics receptacles in a manner that distributes the intelligent monitoring and reporting in a more advantageous manner than previously thought possible.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a proactively monitored and reporting logistics receptacle system for receiving and temporarily maintaining a delivery item. The system includes a storage receptacle for receiving the delivery item, a bridge node mounted to the storage receptacle, and a wireless accessory sensor node having a plurality of sensors that respectively monitor each of the monitored storage components for a change in state of the storage receptacle.

The storage receptacle includes a plurality of monitored storage components including at least an entrance opening for receiving the delivery item. A temporary storage area temporarily maintains the delivery item once the delivery item has been received by the storage receptacle through the entrance opening. A selectively accessible retrieval door provides access to the temporary storage area of the storage receptacle.

The bridge node includes a bridge node processor and a bridge node memory coupled to the bridge node processor. The bridge node includes bridge node memory storage maintaining bridge node code for execution by the bridge node processor. The bridge node includes a wireless communication interface coupled to the bridge node processor. The wireless communication interface is operative to communicate with at least a backend server.

The wireless accessory sensor node is further operative to determine whether the change in state of the storage receptacle has been detected based upon sensor data generated by at least one of the sensors. The wireless accessory node is operative to generate event information including time-stamped information reflecting the detected change in state of the storage receptacle when the sensor data indicates the change in state of the storage receptacle has been detected. The wireless accessory node is further operative to periodically generate non-event information resulting from confirming operation of the wireless accessory sensor node when the change in state of the storage receptacle has not been detected, where the generated non-event information represents a lack of physical interaction with the monitored storage components. The wireless accessory node is also operative to broadcast an updated advertising signal having a flag set within the updated advertising signal. The flag is set indicating the wireless accessory sensor node has a status update available for upload from the wireless accessory sensor node, and the status update includes at least one of the generated event information or the generated non-event information.

The bridge node processor, when executing the bridge node code maintained on the bridge node memory, is operative to detect, using the wireless communication interface, the flag set within the updated advertising signal. The bridge node processor is operative to retrieve, using the wireless communication interface, the status update from the wireless accessory sensor node in response to detecting the flag set. The bridge node processor is further operative to transmit, using the wireless communication interface, receptacle update information to the backend server. The receptacle update information reflects the retrieved status update including at least one of the generated event information and the generated non-event information. The receptacle update information proactively validates an operational status of the bridge node and the wireless accessory sensor node to the backend server. The receptacle update information causes the backend server to initiate a first type of dispatched logistics operation related to the storage receptacle when the status update reflected in the receptacle update information corresponds to the event information.

As described below, other aspects of the disclosure explain further details of various improvements in the operation of and use/management of an improved and enhanced system as well as a part of an improved network of logistics devices. Each of these aspects respectively effect improvements to the technology of smart and intelligent logistics receptacles and systems that are more advanced in how they monitor, report, and functions as an improved element useful in the logistics field. Those skilled in the art will appreciate that additional advantages of the above-described aspect and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Figure 1:
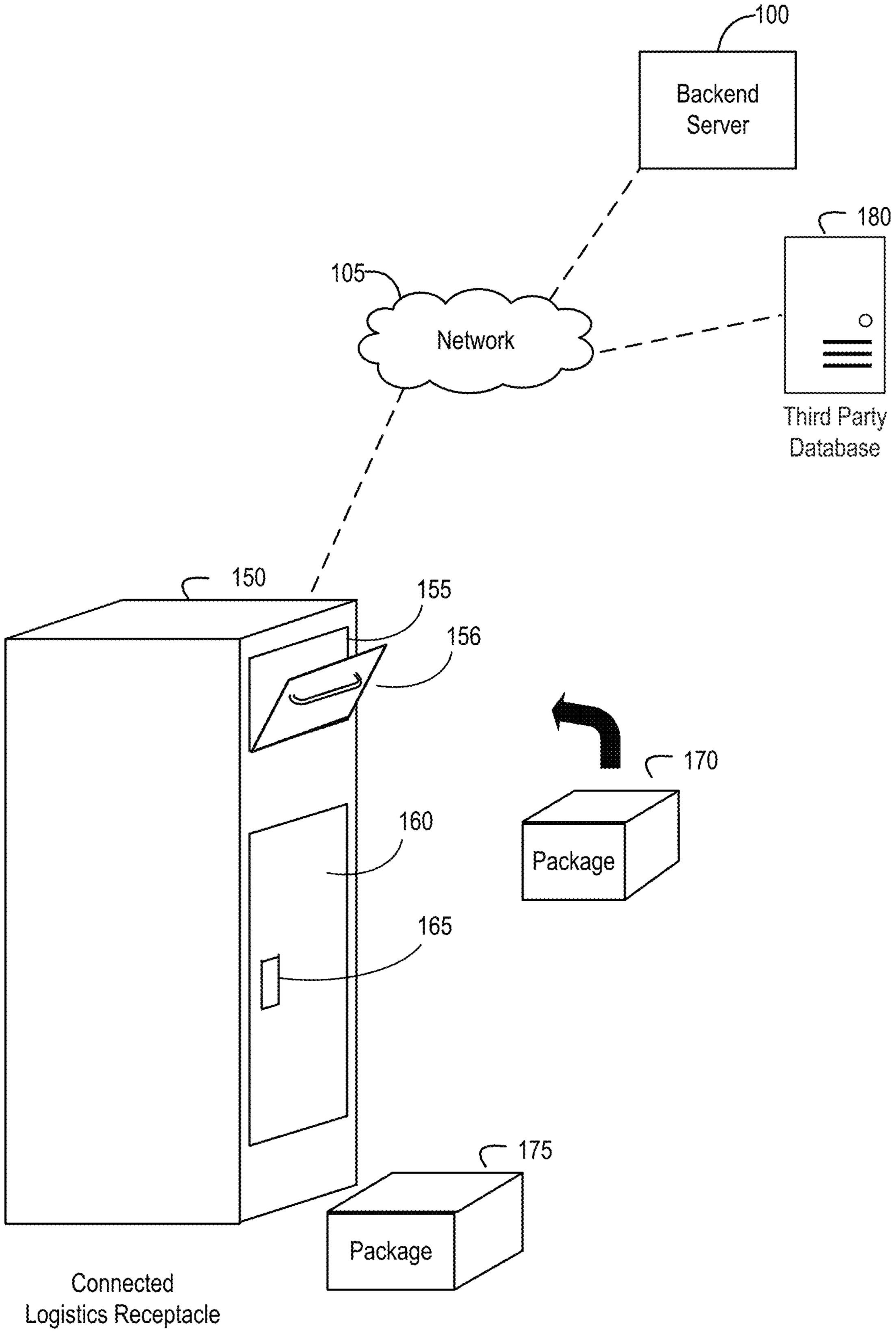
FIG. 1 is a diagram of an exemplary connected logistics receptacle operating within a network and in communication with an exemplary backend server in accordance with an embodiment of the invention.

Reference will now be made in detail to exemplary embodiments. Wherever possible, the same reference numbers are used in the drawings and the description to refer to the same or like parts.

The following describes various embodiments of an enhanced connected logistics receptacle that may be operated and applied by principles as set forth herein as part of exemplary systems, apparatus, and methods. In general, exemplary embodiments of the enhanced connected logistics receptacle transforms the logistics receptacle to become like an improved element of a mailroom or smart building operation where a drop off is more efficiently detected, where the entity dropping off the item being shipped may be automatically recognized and prompted, where a pickup is more efficiently requested, where operations of the receptacle (e.g., drop-off/pickup) may be verified, and which better avoids non-productive courier pickup interactions with the logistics receptacle.

Those skilled in the art will appreciate that each embodiment described herein effects improvements to particular technologies, such as enhancing and improving how to quickly, automatically, and intelligently to detect package drop-off events, package pickup events, gather event information related to such events, report the event information to a backend server, and cause the backend server to initiate enhanced responsive actions. Embodiments may also have the backend server learning from such reported event information and responsively tune or modify the operations of one or more connected logistics receptacles as a result. As such, each embodiment describes a specific technological application in the logistics field involving enhanced automated package drop-off/pickup activity involving one or more enhanced connected logistics receptacles and a backend server where the specific technological application improves or otherwise enhances such technical fields as explained and supported by the disclosure that follows related to the illustrations shown in FIGS. 1-77D.

FIG. 1 is a diagram of an exemplary connected logistics receptacle operating within a network and in communication with an exemplary backend server in accordance with an embodiment of the invention. Those skilled in the art will understand and appreciate that a logistics receptacle is a general term for an apparatus used as a repository or container that temporarily maintains custody of one or more packages being shipped or moved from one location to another location. Such a logistics receptacle may, for example, be referred to as a drop box or a package locker. In some embodiments, an exemplary logistics receptacle may be implemented as a single storage type of structure having a common temporary storage area within which to hold one or more deposited packages. In other embodiments, the logistics receptacle may be implemented with multiple compartmented storage areas that may be used by particular customers or couriers with selective access to the different storage areas. In different embodiments, an exemplary logistics receptacle may be stationary and fixed at a given physical location, stationary but movable between different physical locations, or be an intentionally mobile type of logistics receptacle (e.g., a vehicle-based logistics receptacle).

Referring now to FIG. 1, an exemplary connected logistics receptacle 150 (also generally referred to as an exemplary node-based logistics receptacle) is shown that may accept a package 170 (as part of shipping package 170), where the exemplary connected logistics receptacle 150 uses one or more onboard sensor(s) to detect such a package deposit as a type of change in state of receptacle 150 and communicate event information related to the change in state with an exemplary backend server 100 via a network 105. Backend server 100 may, in some embodiments, access and use information available in other servers or network storage (such as exemplary third-party database 180).

While package 170 is shown as being deposited within exemplary connected logistics receptacle 150, other packages (such as package 175) may also be considered deposited with receptacle 150 albeit external to receptacle 150 but in proximity to receptacle 150. In such an embodiment, exemplary connected logistics receptacle 150 may use external sensor(s) (e.g., external motion sensors deployed as part of a wireless accessory sensor node) to detect package 175 as another type of reportable event reflecting a change in state of receptacle 150 and communicate event information related to the change in state with exemplary backend server 100 via network 105.

Exemplary backend server 100 may be implemented as a dispatch and/or operational planning backend server computer, through communication network 105. While exemplary backend server 100 is shown in FIG. 1 connecting through network 105 to logistics receptacle 150, those skilled in the art will appreciate that backend server 100 may have a more direct or dedicated connections to the connected logistics receptacle 150 depending upon implementation details and desired communication paths. Furthermore, those skilled in the art will appreciate that an exemplary server may contain a collection of information within an internal database or other memory storage (not shown in FIG. 1), while multiple databases maintained on one or more other server platforms or network storage servers (e.g., such as third-party network storage database 180) may be used in other embodiments to maintain such a collection of information accessible to backend server 100 via network 105. Additionally, while not shown in FIG. 1, those skilled in the art will appreciate that a database for information accessible to backend server 100 may be implemented with cloud technology that essentially provides networked storage of information collections that may be directly accessible to networked computing devices, such as backend server 100. Further information on a more detailed implementation and embodiment of exemplary backend server 100 is explained below relative to FIG. 8.

Referring back to FIG. 1, exemplary network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network 105 that interconnects backend server 100 and other components shown in an embodiment illustrated in FIG. 1 (e.g., exemplary connected logistics receptacle 150 and networked third-party database 180) as well as other components not shown in FIG. 1 (e.g., other logistics asset servers, third party servers, mobile delivery assets (such as a dispatched courier asset), and the like).

Exemplary connected logistics receptacle 150 may operate as a storage receptacle structure that temporarily maintains custody of packages (such as package 170) being shipped. Exemplary connected logistics receptacle 150 has an entrance opening 155 (shown in FIG. 1 with an articulating door 156) through which package 170 may pass as package 170 is deposited within a temporary storage or holding area of the receptacle 150. Exemplary connected logistics receptacle 150 is also shown having an exemplary selectively accessible retrieval door 160 (and lock 165) through which package 170 may be retrieved from within receptacle 150 during a pickup logistics operation. As explained in more detail below, embodiments may advantageously deploy distinct types of distributed electronic node devices involving, for example, a bridge node device and one or more wireless accessory sensor node devices as part of an enhanced monitoring and reporting system in an enhanced connected logistics receptacle 150. In a general embodiment (and as shown in more detail in at least FIG. 2), an exemplary bridge node (also referred to generally as a bridging node) may be mounted to the connected logistics receptacle 150 and operative to communicate with the different wireless accessory sensor nodes in an advantageous manner. Such wireless accessory sensor nodes are programmatically adapted and configured to detect a change in state of the connected logistics receptacle 150 using one or more sensor(s), record timestamped information reflecting the detected change in receptacle state, and broadcast a status flag (e.g., a data available flag that has been set) as part of an updated advertising signal. The exemplary bridge node is programmatically adapted and configured to detect the status flag and, in response, retrieve event information available for upload from the wireless accessory sensor node and transmit the retrieved event information to the backend server, which then responsively causes the backend server to initiate a dispatched logistics operation related to the connected logistics receptacle 150.

Figure 2:
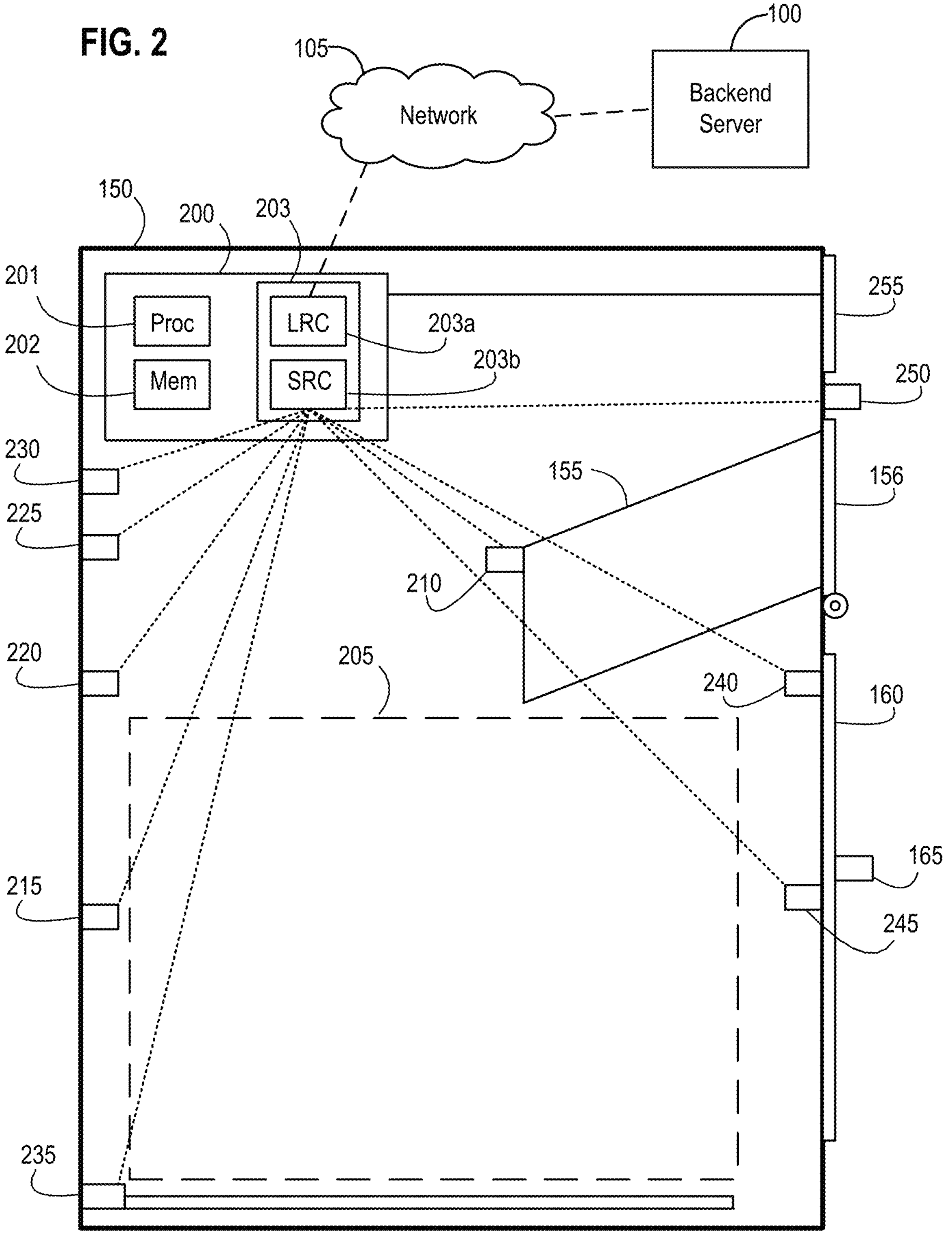
FIG. 2 is a more detailed diagram of an exemplary connected logistics receptacle operating within a network in accordance with an embodiment of the invention.

FIG. 2 is a more detailed diagram of exemplary connected logistics receptacle 150 in accordance with an embodiment of the invention. Referring now to FIG. 2, exemplary connected logistics receptacle 150 is shown as a drop-box type of logistics receptacle with entrance opening 155 (and entrance opening door 156), selectively accessible retrieval door 160 (and its lock 165), temporary storage area 205 located within receptacle 150, as well as a variety of exemplary internal components including an exemplary bridge node 200 and a variety of different exemplary wireless accessory sensor nodes 210, 215, 220, 225, 230, 235, 240, 245 and 250.

Exemplary bridge node 200, in general (and as explained in more detail with respect to FIG. 3), is a low-power programmatically configured processing and communication device adapted to provide particular functionality as a device that communicates with backend server 100 external to the exemplary connected node-based logistics receptacle and with wireless accessory sensor node(s) within the logistics receptacle. In some embodiments, exemplary bridge node 200 may also communicate with other external wireless communication devices, such as handheld wireless node devices used by couriers, other logistics personnel, as well as customers that may be picking up or dropping off packages with the logistics receptacle. Exemplary bridge node 200 generally includes a processor 201, memory 202, wireless communication interfaces 203 (implementing a long-range wireless communication interface **203*a* and a short-range wireless communications interface 203*b*), and interface circuitry to an externally disposed user interface 255 (e.g., having one or more display, keys, status lights, touchscreens, buttons, switches, and/or speaker for interacting with a shipping customer and/or logistics personnel). Exemplary bridge node 200 is mounted to exemplary connected logistics receptacle 150 and operative to communicate with the different wireless accessory sensor nodes disposed as part of the exemplary connected logistics receptacle 150 via short-range wireless communications interface 203***b*. The bridge node 200 can separately communicate with backend server 100 via long-range wireless communication interface 203*a*. Those skilled in the art will appreciate that an embodiment of exemplary bridge node 200 and exemplary wireless accessory sensor nodes 210, 215, 220, 225, 230, 235, 240, 245 and 250 may be implemented as a system of field-upgradable components so as to retro-fit an existing logistics receptacle and enhanced the local operation and remote management of such a logistics receptacle via such add-on intelligent monitoring and communication devices (e.g., bridge node 200 and different wireless accessory sensor nodes).

In FIG. 2, the different exemplary wireless accessory sensor nodes 210, 215, 220, 225, 230, 235, 240, 245 and 250 shown are generally operative to detect different types of interactions with particular parts of the connected logistics receptacle 150 (as well as areas relative to the receptacle) using a variety of types of sensors/sensor elements where timestamped detections are logged on the respective wireless accessory sensor node for later upload through the bridging bridge node 200. In other words, the different exemplary wireless accessory sensor nodes may log timestamped information related to such changes, and responsively generate updated broadcasting signals having a status flag set (e.g., a data available flag set indicating event information is available for the bridge node to upload). Exemplary bridge node 200 operates to efficiently monitor for flags set in low power signals generated and broadcast by such different wireless accessory sensor nodes and, depending on the data included in such flags, uploads relevant event information that includes timestamped information reflecting the particular changes in the state of exemplary connected logistics receptacle 150.

The exemplary wireless accessory sensor nodes shown in FIG. 2 may include similar types of sensors or different types of sensors (and/or multi-element type of sensors) depending on what is monitored on particular components of connected node-based logistics receptacle 150. For example, exemplary entrance opening sensor node 210 has at least one sensor that monitors for a change in state of entrance opening 155 (and/or entrance door 156). Such a sensor in entrance opening sensor node 210 may be implemented with a motion sensor, an orientation status sensor, an accelerometer, a multiple-axis accelerometer, and/or a magnetic sensor (such as a magnetic reed switch type of sensor). In more detail, an embodiment of exemplary entrance opening sensor node 210 may be mounted to a moving part related to entrance opening 155 (and/or entrance door 156), such as a gear, axle, hinge, cam or other structural item that moves when entrance opening 155 or entrance door 156 articulates or otherwise changes position.

Exemplary temporary storage area motion sensor node 215 has a motion sensor that is mounted and configured to detect motion within temporary storage area 205. Exemplary temporary storage area image/vision sensor node 220 has a camera sensor that is mounted and configured to detect pictures and/or video images of what is within temporary storage area 205. Exemplary temporary storage area light sensor node 225 has a light sensor that is mounted and configured to detect changes in light within temporary storage area 205. Exemplary temporary storage area chemical sensor node 230 has a chemical sensor that is mounted and configured to detect the existence of and/or changes in what chemicals (e.g., explosive/hazardous chemicals in gaseous or vapor form, and the like) are within temporary storage area 205. Exemplary temporary storage area force sensor node 235 has a sensor (e.g., a scale, load cell, impact sensor) that is mounted at the bottom of temporary storage area 205 to detect changes in what has been deposited within temporary storage area 205. Relative to selectively accessible retrieval door 160, an exemplary accessible retrieval door sensor node 240 has at least one sensor (e.g., motion sensor, orientation status sensor, accelerometer, magnetic sensor, and the like) that monitors for a change in the state of door 160. Exemplary accessible retrieval door lock sensor node 245 has a sensor that is mounted relative to lock 165 to detect changes in the state of lock 165 used to open or secure door 160. Exemplary external sensor node 250 has at least one sensor (e.g., motion sensor, proximity sensor, range sensor, and the like) that monitors for a change in the state of the near-by and proximate environment of exemplary connected logistics receptacle 150.

Those skilled in the art will appreciate that in some embodiments, an exemplary wireless accessory sensor node may focus on a particular component of the logistics receptacle 150 (e.g., entrance opening sensor node 210) where the receptacle's bridge node may interact with multiple wireless accessory sensor nodes disposed on the receptacle 150. However, in some embodiments, an exemplary wireless accessory sensor node may have different sensors that monitor different components of the logistics receptacle 150 such that the receptacle's bridge node may interact with a single wireless accessory sensor node disposed on the receptacle 150.

In light of what is shown in at least FIG. 2, an embodiment of enhanced connected logistics receptacle system for receiving and temporarily maintaining a delivery item (such as package 170) and causing a backend server to initiate a dispatched logistics operation. Such an exemplary system as shown in FIG. 2 includes a storage receptacle (such as exemplary receptacle 150), a bridge node (such as exemplary bridge node 200), and at least one wireless accessory sensor node (such as exemplary wireless accessory sensor node 210). The storage receptacle (e.g., exemplary receptacle 150 in FIG. 2) includes an entrance opening (e.g., exemplary entrance opening 155 and/or entrance opening door 156 in FIG. 2) for receiving the delivery item, a temporary storage area (e.g., exemplary storage area 205 in FIG. 2) for temporarily maintaining the delivery item once the delivery item has been deposited within the storage receptacle through the entrance opening, and a selectively accessible retrieval door (e.g., exemplary door 160 in FIG. 2) providing access to the temporary storage area of the storage receptacle.

Figure 3:
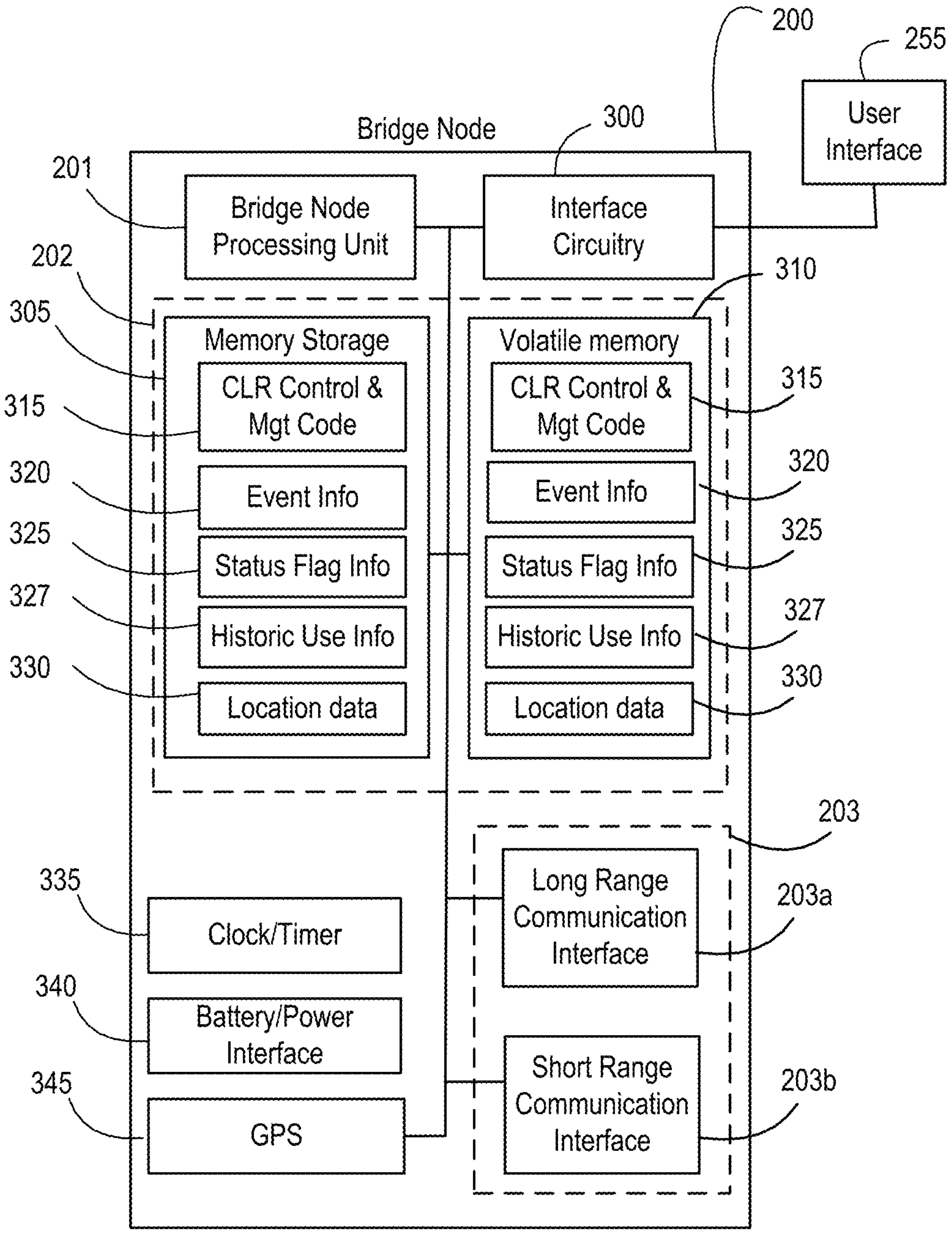
FIG. 3 is a detailed diagram of an exemplary bridge node device used as part of an exemplary connected logistics receptacle in accordance with an embodiment of the invention.

The system's bridge node (e.g., exemplary bridge node 200 in FIG. 2) is mounted to the storage receptacle, and includes bridge node processor 201, bridge node memory 202 coupled to the bridge node processor 201 (where the bridge node memory storage 202 maintains bridge node code for execution by the bridge node processor—such as CRL control & management code 305 shown in FIG. 3), long-range communication interface 203*a* coupled to the bridge node processor 201 that can communicate with the backend server 100 over a first communication path, and short-range communication interface 203*b* coupled to the bridge node processor 201 that can communicate over a second communication path.

In operation of this embodiment, the exemplary system's wireless accessory sensor node (e.g., exemplary wireless accessory sensor node 210) has at least one sensor that monitors for a change in state of the storage receptacle (e.g., a motion sensor that detects a change in motion related to the entrance opening 155 or motion through the entrance opening 155). In such an exemplary system, the wireless accessory sensor node (e.g., wireless accessory sensor node 210 that monitors entrance opening 155) is programmatically adapted and, thus, configured to detect the change in state of the storage receptacle based upon sensor data generated by the sensor (e.g., sensor data monitoring motion of or through the entrance opening 155); record timestamped information reflecting the detected change in state of the storage receptacle (e.g., the detected motion related to the entrance opening 155); and broadcast an updated advertising signal having a data available flag set within the updated advertising signal. Such a data available flag indicates the wireless accessory sensor node has event information available for upload by the bridge node. Such event information includes at least the timestamped information reflecting the detected change in state of the storage receptacle (e.g., event information with timestamped information logged by wireless accessory sensor node 210 on detected motion related to the entrance opening 155 as a change in state of receptacle 150).

In operation of this embodiment, the exemplary bridge node's processor (e.g., processing unit 201), when executing the bridge node code maintained on the bridge node memory, is programmatically adapted and, thus, configured to be operative to detect the data available flag set within the updated advertising signal over the short-range communication interface; retrieve the event information available for upload from the wireless accessory sensor node using the short-range communication interface; and transmit the retrieved event information to the backend server using the long-range communication interface to cause the backend server to initiate the dispatched logistics operation related to the storage receptacle.

FIG. 3 is a more detailed diagram of an exemplary bridge node 200 used as part of an exemplary connected logistics receptacle 150 in accordance with an embodiment of the invention. Referring now to FIG. 3, exemplary bridge node 200 is shown having processing unit 201 coupled to memory 202 (i.e., non-volatile memory storage 305, volatile memory 310), a wireless communication interface 203 (i.e., a long-range communication interface 203*a* and a short-range communication interface 203*b*), clock/timer 335, battery/power interface 340, and a GPS location circuitry 345. In some embodiments where connected logistics receptacle 150 is implemented with a user interface 255, exemplary bridge node 200 includes interface circuitry 300 that allows interactive communication with and control of elements implementing user interface 255 for interacting with a shipping customer and/or logistics personnel.

Bridge node processing unit 201 is logic (such as a processor, microprocessor, controller, microcontroller, or other programmable logic device), which generally performs computations on data and executes operational and application program code and other program modules within memory of the bridge node 200. Those skilled in the art will appreciate that processing unit 201 may be implemented with a single processor or logic unit, a more powerful multi-core processor, or multiple processors depending upon the desired implementation. In one embodiment, processing unit 201 may be implemented with a low power microprocessor and associated peripheral circuitry. Less complex microcontrollers or discrete circuitry may be used to implement processing unit 201 as well as more complex and sophisticated general purpose or dedicated purpose processors.

In yet another embodiment, exemplary processing unit 201 may be implemented by a low power ARM1176JZ-F application processor used as part of a single-board computer, such as the Raspberry Pi Computer Model B-Rev-2. The ARM application processor is embedded within a Broadcom® BCM2835 system-on-chip (SoC) deployed in the Raspberry Pi Computer. In this embodiment, the Raspberry Pi Computer device operates as a core of exemplary bridge node 200 and includes a Secure Digital memory card slot and flash memory card operating as memory storage 305, a 512 Mbyte RAM memory storage operating as volatile memory 310, an operating system (such as Linux) stored on memory storage 305 and running in volatile memory 310, and peripherals that implement interface circuitry 300, clock/timer 335, and a power supply operating as a power interface 340.

As shown in FIG. 3, exemplary bridge node 200 includes short-range communication interface 203*b* as a programmable radio and an omni-directional antenna coupled to the processing unit 201. In some embodiments, short-range communication interface 203*b* may have variable RF power characteristics, such as receiver sensitivity and/or RF output signal power level. In some embodiments, interface 203*b* may use an antenna with a different antenna profile when directionality may be desired. Those skilled in the art will appreciate that short-range communication interface 203*b* may be implemented with hardware, implemented with a combination of hardware and software, as well as implemented as a software-defined radio (SDR). Examples of short-range communication interface 203*b* may include other hardware (not shown) for operatively coupling the device to a specific short-range communication path (e.g., a Bluetooth® Low Energy (BLE) connection path communicating at 2.4 GHz). While BLE is used in one embodiment to enable a short-range communication protocol, variable power short-range interface 203*b* may be implemented with other low power, short-range communication protocols, such as ultra-low power communication protocols used with ultra-wideband impulse radio communications, ZigBee protocols, IEEE 802.15.4 standard communication protocols, and the like.

In one embodiment, various RF characteristics of the radio's transceiver, such as the RF output power and the RF receiver sensitivity may be dynamically and programmatically varied under control of processing unit 201. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal as needed depending upon a desired implementation and anticipated use of exemplary bridge node 200. In other words, embodiments of bridge node 200 (or any other bridge node) may have programmatically adjustable RF characteristics (such as an adjustable RF output signal power, an adjustable RF receiver sensitivity, the ability to switch to a different frequency or frequency band, etc.) in order to better communicate with different ones of the above-described types of wireless accessory sensor nodes that may be deployed on exemplary connected logistics receptacle 150.

As noted above with respect to FIG. 2, exemplary bridge node 200 also includes long-range communication interface 203*a* to provide a communication path to backend server 100 via network 105. Those skilled in the art will appreciate that reference to a communication interface may include an interface that collectively implements a plurality of different exemplary data communication interfaces while still being generally referenced as "a communication interface" or "wireless communication interface." Furthermore, those skilled in the art will appreciate that communication interface 203*a* may be implemented with hardware, implemented with a combination of hardware and software, as well as implemented as a software-defined radio (SDR). In more detail, an exemplary embodiment of communication interface 203*a* may be implemented with a radio in the form of an IEEE 802.11g compliant Wi-Fi transceiver or a cellular radio. In yet another embodiment, both a Wi-Fi transceiver and a cellular radio may be used when best available or according to a priority (e.g., first attempt to use the Wi-Fi transceiver if available due to possible lower costs; and if not, then rely on the cellular radio). In other words, an embodiment may rely upon diverse types of radios as part of interface 203*a*, or when one radio is out of reach from a connecting infrastructure radio within network 105. In a further embodiment, interface 203*a* may be implemented as a module providing general purpose signal processing at its core as part of a software-defined radio, which provides flexibility in transmission techniques, software-defined antennas, and adaptive radio protocols that may be dynamically changed to implement interface 203*a*. Thus, in these embodiments, long-range wireless communication interface 203*a* is used to communicate retrieved event information about detected changes in the state or status of exemplary connected logistics receptacle 150 to backend server 100 as well as to receive adjustment messages (such as a tuned time parameter message) from backend server 100.

Those skilled in the art will appreciate that in the embodiments described herein, communication interfaces 203*a* and 203*b* may be implemented as a single wireless transceiver-based communication interface having both short-range and longer-range communication capabilities (i.e., may function as both a first and second communication interface as described in the various embodiments herein). This type of wider range communication interface may be implemented using LPWAN (Low Power Wide Area Network) connectivity, such as LTE 5G, LTE-M, and NB-IOT (NarrowBand IoT). LPWAN, also commonly referred to low-power wide-area (LPWA) network or just low-power network (LPN), is a type of wide-area network wireless communication format that allows for extended range, low-bandwidth communications for power sensitive application, such as with devices that are battery powered devices (e.g., ID nodes, mobile bridge nodes, container nodes, command nodes, and the like). Exemplary types of LPWAN may include ultra-narrowband (UNB) technology from Sigfox, random phase multiple access (RPMA) technology from Ingenu, and other long-range WAN protocol (LoRaWAN) technology as promoted by the LoRa Alliance of companies (e.g., IBM, MicroChip, Cisco, Semtech, Singtel, KPN, Bouygues Telecom). LTE-M is a communication technology that allows a node-based device (such as a sensor-based ID node or command node) to directly connect to a Long Term Evolution (4G) cellular network without a gateway and on batteries. NB-IOT is a low-power communication technology that applies a narrowband approach to cellular IoT (Internet of Things) communications allowing for usage of parts of the GSM spectrum bandwidth in unused 200 kHz bands.

The clock/timer 335 for exemplary bridge node 200 generally provides one or more timing circuits used in, for example, keeping track of reporting periods and timing aspects for when bridge node 200 should attempt to detect set flags in advertising signals broadcast by wireless accessory sensor nodes, when to attempt to retrieve event information from wireless accessory sensor nodes, and when to transmit the retrieved event information to the backend server 100. In an embodiment where bridge node 200 conserves power by entering a sleep or dormant state for a predetermined time period as part of overall power conservation techniques, clock/timer 335 may assist processing unit 201 in managing timing operations, such as when to have bridge node 200 wake from a low power state (e.g., at the beginning of a reporting period for the bridge node).

The battery/power interface 340 for bridge node 200 generally powers the circuitry implementing exemplary bridge node 200. In one embodiment, battery/power interface 340 may be a rechargeable power source. For example, a bridge node may have a rechargeable power source along with a solar panel (e.g., a solar panel externally mounted on top of receptacle 150 or on one or more panels of receptacle 150) that charges the onboard rechargeable power source in order to help facilitate deployment of the connected logistics receptacle 150 in a remote location. In another embodiment, battery/power interface 340 may be a non-rechargeable power source (e.g., battery) intended to be disposed of after use. In yet another embodiment, battery/power interface 340 may be a power interface connector (such as a power cord and internal power supply on bridge node 200 where such an internal power supply is powered externally to receptacle 150). In other words, when an exemplary bridge node is in a fixed or stationary configuration, it may be powered by a power cord connected to an electrical outlet, which is coupled to an external power source. Such an external power source (not shown, and depending on the availability of such a source proximate the location of the receptacle 150), or may be operated by an external battery (not shown) or be connected to an existing power grid from which power is drawn.

Likewise, those skilled in the art will appreciate that each of the illustrated exemplary wireless accessory sensor nodes in FIG. 2 may also be powered via such an external power source or may be operated by their own respective battery. In battery-operated embodiments, such a battery may be implemented as a rechargeable power source or a non-rechargeable power source intended to be disposed of after use.

Referring back to FIG. 3, the interface circuitry 300 on bridge node 200 couples processing unit 201 to user interface 255. In one embodiment, user interface 255 may provide a visual or projected display, as well as interactive buttons or soft keys, switches, and a pointing device to facilitate interaction with the display. In a further embodiment, a data entry device (e.g., keyboard, button, switch, soft keys, touch-sensitive input device, and the like) may also be used as part of the user interface 255. In some embodiments, an exemplary user interface 255 may be implemented with an on-demand request input (e.g., button, soft key, and the like) that retrieves input from a customer to responsively initiate retrieval of information by bridge node 200 from one or more exemplary wireless accessory sensor nodes and further cause transmission of the retrieved information to backend server 100. In such an embodiment, authentication of the customer by bridge node 200 may be implemented.

In other embodiments, user interface 255 may take the form of one or more lights (e.g., status lights), audible input and output devices (e.g., a microphone and speaker), or an interactive touchscreen.

As previously noted, an exemplary bridge node, such as bridge node 200, may be positioned in a known fixed location (where bridge node 200 may not have onboard location circuitry such as circuitry 345) or, alternatively, may include dedicated onboard location positioning circuitry (e.g., GPS circuitry 345) to allow the bridge node 200 to self-determine its current location, movement, speed, and the like. In other embodiments, alternative circuitry and techniques may be relied upon for location circuitry 345 (rather than GPS), such as location circuitry compatible with other satellite-based systems (e.g., the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems).

Regarding memory storage 305 and volatile memory 310 shown in FIG. 3, both are operatively coupled to processing unit 201 in exemplary bridge node 200. Both memory components provide program elements used by processing unit 201 and maintain and store data elements accessible to processing unit 201. In the embodiment shown in FIG. 3, exemplary memory storage 305 maintains executable program code (e.g., connected logistics receptacle (CLR) control and management code 315, an operating system (not shown), and the like) as well as other data used in the operation of bridge node 200 (e.g., event information 320, status flag info 325, historic use info 327, location data 330 that is related to the location of bridge node 200 as deployed on an exemplary connected logistics receptacle 150 as well as threshold data and levels that may be used in operation of bridge node 200). Those skilled in the art will appreciate that memory storage 305 is a tangible, non-transient computer readable medium on which information (e.g., executable code/modules, operational data, sensor measurements, etc.) may be kept in a non-volatile and non-transitory manner. Volatile memory 310 is typically a random access memory (RAM) structure used by processing unit 201 during operation of the bridge node 200. Upon power up of bridge node 200, volatile memory 310 may be populated with an operational program (such as an operating system and then CRL control and management code 315) or specific program modules that help facilitate particular operations of bridge node 200. And during operation of bridge node 200, volatile memory 310 may also include certain data generated as the bridge node 200 executes instructions as programmed or loaded from memory storage 305.

Generally, an embodiment of CLR control and management code 315 is a collection of executable software features implemented as programmatic functions or program modules that generally control the behavior of a bridge node, such as bridge node 200, as it performs and functions as described in the various embodiments disclosed herein. In other words, CLR control and management code 315 may also include further program code specific for bridge node functionality described in the embodiments described in more detail below that use a bridge node. As such, the collective code executing on a bridge node, such as bridge node 200 (or any of the other implementations of a bridge node as described herein), acts to programmatically configure the bridge node 200 beyond that of a generic processing device in order to be specially adapted, via such program code, to be operative to function unconventionally—whether alone with the specific functionality described herein or as part of a system.

Event information 320 is a data structure generated by bridge node 200 based upon data retrieved from one or more wireless accessory sensor node(s). Exemplary event information 320 maintains timestamped information reflecting a detected change in state of connected logistics receptacle 150 and an identifier indicating a type of detected change in state of the connected logistics receptacle 150. The timestamped information, for example, may indicate a particular time (e.g., time of day, date) corresponding to the detected change. In other examples, the timestamped information may indicate a series of times and/or dates corresponding to a series of related changes to the receptacle, where such a series of related changes to the receptacle are detected by the wireless accessory sensor node as the detected change in state of the storage receptacle. The identifier (which may be also referred to as state information) in event information 320 may, for example, identify details on the type of change detected relative to the state of particular components of the receptacle (e.g., a detected change in motion of or motion through entrance opening 155, a detected image of package 170 moving into temporary storage area 205, a detected chemical within temporary storage area 205, a detected change in weight in what is maintained within receptacle 150, a detected change in position of the selectively accessible retrieval door 160, a detected change in the state of lock 165 for door 160, a detected change in what has been placed within a predetermined range of receptacle 150 as monitored and detected by an external motion sensor or a proximity-based range sensor, etc.).

The status flag information 325 in memory 202 of bridge node 200 is a data structure reflecting information on any status flag (e.g., data available flag) received as part of an advertising signal broadcast from one or more of the wireless accessory sensor nodes. In some embodiments, status flag information 325 may reflect that bridge node 200 has detected a single signal from one of the wireless accessory sensor nodes where that signal has a data available flag set (indicating event information is available for upload). In other embodiments, status flag information 325 may reflect that bridge node 200 has detected multiple signals from different ones of the wireless accessory sensor nodes where each of those signals has a data available flag set (indicating different event information is available for upload from different wireless accessory sensor nodes). In still other embodiments, status flag information 325 may more generally reflect that bridge node 200 has detected a signal from one or more of the wireless accessory nodes where that signal has a status flag set indicating at least that the respective wireless accessor sensor node remains operative (e.g., a heartbeat type of status that may not be indicative that new data is now available for upload by bridge node 200 but simply that the wireless accessory sensor node has not failed or run out of power). Those skilled in the art will appreciate the situation where a signal may have a heartbeat type of status flag set as well as a data available flag set, which indicates to bridge node 200 that the particular wireless accessory sensor node remains nominally operable and has event information available for upload by the bridge node 200.

Historic use information 327 in memory 202 of bridge node 200 is a data structure reflecting accumulated and updated information tracked by bridge node 200 on use of particular components of the connected logistics receptacle 150 associated with bridge node 200 based upon the event information 320 retrieved over time. Some embodiments may rely upon backend server 100 to process and track historic use information reported to server 100 as retrieved event information 830 (which then may be used to update information in management profile 825) and where server 100 may then update bridge node 200 with historic use information 327 or updates to such information 327. However, other embodiments may have the bridge node 200 itself track the retrieved event information 320 and, based on data in information 320, generate and/or update historic use information 327 maintained locally on the bridge node 200.

Location data 330 in memory 202 of bridge node 200 is a data structure used to store and maintain location information related to the location of bridge node 200 as deployed on an exemplary connected logistics receptacle 150. As noted above, some system embodiments may have exemplary connected logistics receptacle 150 as a mobile type of apparatus (e.g., one that is moved between locations, where the receptacle 150 is disposed on a mobile platform, such as a mobile delivery vehicle). In such an embodiment, bridge node 200 may be implemented as a mobile bridge node, where the mobile bridge node includes location circuitry (e.g., GPS circuitry 345) operative to generate location data 330 reflecting a current location of the mobile bridge node mounted to the storage receptacle 150. In some embodiments, the bridge node 200 may include the current location of bridge node 200 as indicated by location data 300 along with the retrieved event information transmitted to the backend server.

Figure 4:
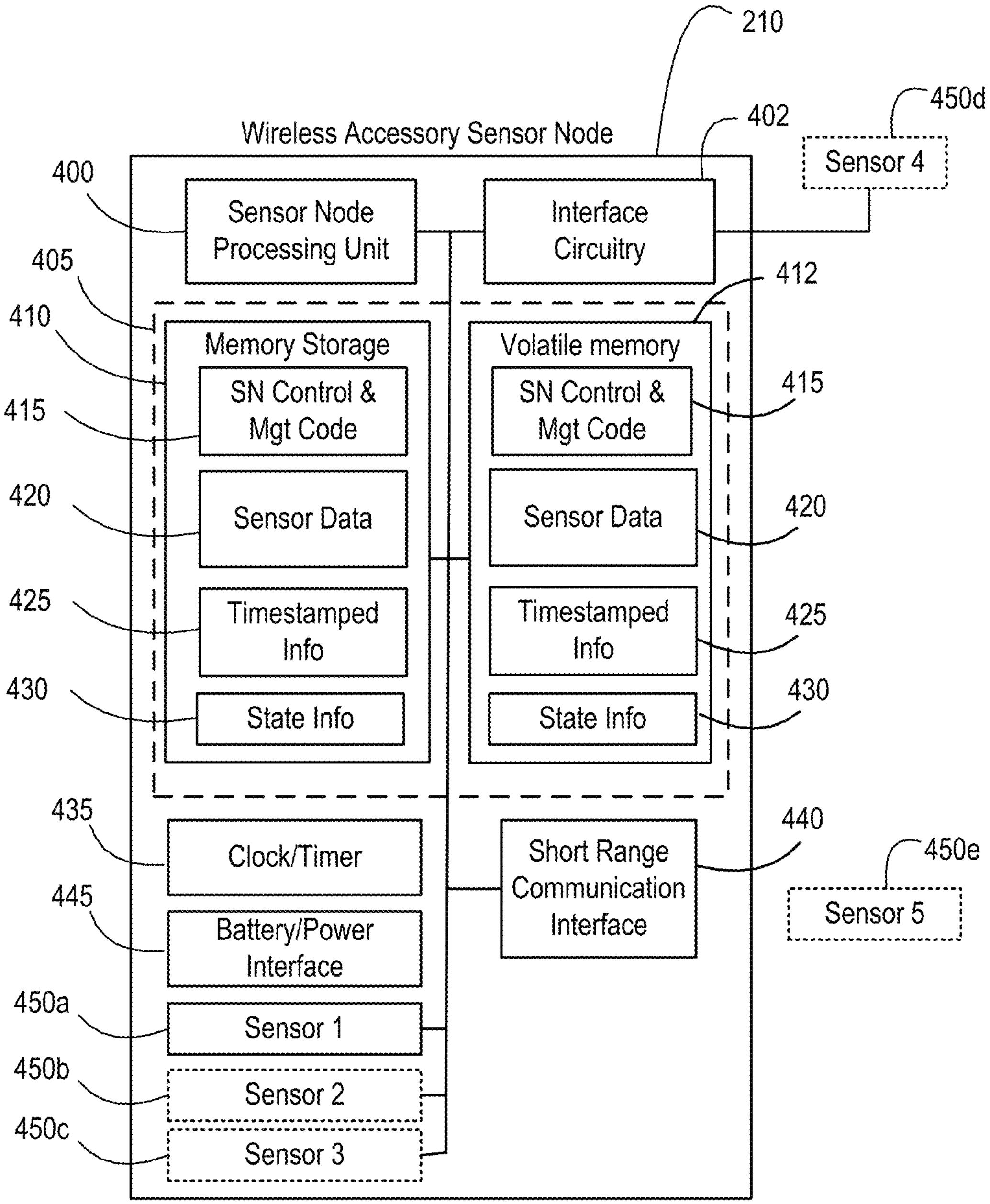
FIG. 4 is a detailed diagram of an exemplary wireless accessory sensor node device used as part of an exemplary connected logistics receptacle in accordance with an embodiment of the invention.

While FIG. 3 described above provides further details regarding an exemplary bridge node (e.g., exemplary bridge node 200), FIG. 4 is a detailed diagram of an exemplary wireless accessory sensor node device used as part of an exemplary connected logistics receptacle in accordance with an embodiment of the invention. As previously mentioned, different exemplary wireless accessory sensor nodes 210, 215, 220, 225, 230, 235, 240, 245 and 250 as shown in FIG. 2 are operative to detect different types of changes in the state of exemplary connected logistics receptacle 150, log timestamped information related to such changes, and responsively generate updated broadcasting signals having a status flag set (e.g., a data available flag set indicating event information is available for the bridge node to upload). While different exemplary wireless accessory sensor nodes 210, 215, 220, 225, 230, 235, 240, 245 and 250 may use different types and configurations of sensors to detect different types of changes in the state of exemplary connected logistics receptacle 150, exemplary wireless accessory sensor node 210 is shown in FIG. 4 in more detail to explain and describe exemplary internal components, hardware, and software deployed in embodiments of a wireless accessory sensor node and that are used to monitor different parts of and areas around exemplary connected logistics receptacle.

Referring now to FIG. 4, exemplary wireless accessory sensor node 210 is a low-power transceiver-based processing device having a sensor node processing unit 400 (also referred to as a sensor node processor), sensor node memory 405, a short-range wireless communication interface 440, a clock/timer 435, battery/power interface 445, interface circuitry 402, and various exemplary sensors. The sensor node processing unit 400 is in operative communication with at least one sensor (e.g., with one of onboard sensors 450*a*-450*c* through internal bus connections, with a separate sensor 450*d* through a wired connection off the sensor node, via interface circuitry 402, and/or with a separate sensor 450*e* through a wireless connection via short-range communication interface 440). While FIG. 4 is showing details related to exemplary wireless accessory sensor node 210 that monitors entrance opening 155, those skilled in the art will appreciate that the type of sensor(s) used with a particular wireless accessory sensor node will depend upon the particular component of receptacle 150 (or area within or near receptacle 150) being monitored.

Different types of sensors may be used for one or more of sensors 450*a*-450*c*, such a sensor implemented with a motion sensor, an orientation status sensor, an accelerometer, a multiple-axis accelerometer, and/or a magnetic sensor to monitor entrance opening 155 by exemplary wireless accessory sensor node 210. In some embodiments, exemplary wireless accessory sensor node 210 may use a combination of more than one type of sensor to do such monitoring—e.g., where sensor 450*a* is a motion sensor that detects motion of entrance opening 155 or motion through entrance opening 155, where sensor 450*b* is an orientation status sensor that detects changes in the orientation of entrance opening 155, and where sensor 450*c* is an accelerometer type of sensor that detects the acceleration of entrance opening 155 when such a component is moved (e.g., when entrance opening articulates when receiving a package 170). Those skilled in the art will appreciate that with further sensors (e.g., sensors 450*d*, 450*e*, and more), an embodiment of exemplary wireless accessory sensor node may deploy an increasing variety of types of sensors to monitor a particular component of receptacle 150 or area relative to receptacle 150 in an increasingly robust manner. Additionally, an embodiment may deploy a second wireless accessory sensor node to deploy such a different type of sensor when monitoring the same component of receptacle 150 or area relative to receptacle 150 in a manner that does not have multiple sensors per sensor node but opts for more dedicated sensor node processing power per sensor.

For example, as shown in FIG. 2, sensor data may be generated by a sensor in a wireless accessory sensor node 210 that monitors for changes in entrance opening 155 where the sensor data generated by that sensor indicates a change in state of entrance opening 155 as the change in state of the storage receptacle (e.g., exemplary connected logistics receptacle 150). In such an example, further embodiments may implement that sensor as a motion sensor detecting a change in motion of entrance opening 155 as the change in state of the storage receptacle; a motion sensor detecting a change in motion of entrance opening 155 and a failure to return to a prior state of entrance opening 155 as the change in state of the storage receptacle; or a status sensor detecting a change in orientation of entrance opening 155 (and/or a failure to return to a prior state of the entrance opening 155) as the change in state of the storage receptacle. When the sensor in this example detects a failure to return to the prior state of entrance opening 155, the type of change may indicate an overflow state of the storage receptacle and the retrieved event information transmitted to the backend server by bridge node 200 is indicative of such an overflow state of the storage receptacle.

Other embodiments may implement the sensor that monitors entrance opening 155 (via wireless accessory sensor node 210) as a motion sensor detecting movement of what is received through the entrance opening 155 as the change in state of the storage receptacle; an accelerometer detecting a change in motion of the entrance opening 155 as the change in state of the storage receptacle; a multiple-axis accelerometer detecting a change in multi-dimensional motion of the entrance opening 155 as the change in state of the storage receptacle; or a magnetic sensor detecting a change in position of the entrance opening 155 as the change in state of the storage receptacle.

In another example, as shown in FIG. 2, sensor data may be generated by a sensor in a wireless accessory sensor node that monitors for changes in temporary storage area 205 where the sensor data generated by that sensor indicates a change in state of temporary storage area 205 as the change in state of the storage receptacle (e.g., exemplary connected logistics receptacle 150). In such an example, further embodiments may implement that sensor as a motion sensor detecting motion within the temporary storage area 205 as the change in state of the storage receptacle; an image sensor detecting a change of what is stored within the temporary storage area 205 as the change in state of the storage receptacle; a scale disposed at a bottom of the temporary storage area 205 where the scale detects a change in weight of what is stored within the temporary storage area 205 as the change in state of the storage receptacle; a force sensor disposed within the temporary storage area 205 where the force sensor detects a change in what has been deposited within the temporary storage area 205 as the change in state of the storage receptacle; a load cell operative to detect an impact force related to the change in what has been deposited within the temporary storage area 205 as the change in state of the storage receptacle; a light sensor detecting a change in light within the temporary storage area 205 as the change in state of the storage receptacle; and a chemical sensor detecting a chemical within the temporary storage area 205 as the change in state of the storage receptacle.

In yet another example, as shown in FIG. 2, sensor data may be generated by a sensor in a wireless accessory sensor node 240 that monitors for changes in selectively accessible retrieval door 160 where the sensor data generated by that sensor indicates a change in state of selectively accessible retrieval door 160 as the change in state of the storage receptacle (e.g., exemplary connected logistics receptacle 150). In such an example, further embodiments may implement that sensor as a motion sensor detecting a change in motion of the selectively accessible retrieval door 160 as the change in state of the storage receptacle; a magnetic sensor detecting a change in position of the selectively accessible retrieval door 160 as the change in state of the storage receptacle; a motion sensor detecting a change in motion of the selectively accessible retrieval door 160 and a failure to return to a prior state of the selectively accessible retrieval door 160 as the change in state of the storage receptacle; a status sensor detecting a change in orientation of the selectively accessible retrieval door 160 and a failure to return to a prior state of the selectively accessible retrieval door 160 as the change in state of the storage receptacle. When the sensor in this example detects a failure to return to the prior state of door 160, the type of change may indicate an unsecured state of the storage receptacle and the retrieved event information transmitted to the backend server by bridge node 200 is indicative of such an unsecured state of the storage receptacle.

In yet another example, as shown in FIG. 2, sensor data may be generated by a sensor in a wireless accessory sensor node 245 that monitors lock 165 for changes in the state of lock 165 as the change in state of the storage receptacle (e.g., exemplary connected logistics receptacle 150).

In still another example, as shown in FIG. 2, sensor data may be generated by a sensor in wireless accessory sensor node 250 that monitors an area outside of exemplary connected logistics receptacle 150. Such a sensor, for example, may be implemented as an external motion sensor detecting a change in what has been placed within a predetermined range of the storage receptacle as the change in state of the storage receptacle; or a range sensor detecting a change in what has been placed within a predetermined range of the storage receptacle as the change in state of the storage receptacle. Such a range sensor may be, for example, a proximity sensor, a depth sensor, a LiDAR sensor, an infrared sensor, or a laser-based sensor that is operable to detect a distance from the sensor to nearby objects.

Those skilled in the art will appreciate that in some embodiments, one or more of the sensors (450*a*-450*e*) coupled to processor 400 and used as part of an exemplary wireless accessory sensor node may be implemented using multiple sensor elements for monitoring different types of changes in the state of the storage receptacle. Such different types of sensor elements may, for example, be a sensor element used to monitor a change relative to light within the storage receptacle, to monitor a change relative to motion within the storage receptacle, to capture one or more images of what is disposed within the receptacle, and to monitor for and detect a chemical within the storage receptacle. For example, when using a chemical sensor or chemical sensing element as part of a wireless accessory sensor node, the chemical being monitored for and detected (e.g., a vaporous chemical) may be a chemical indicative of a hazardous environmental condition, a chemical indicative of an explosive, a chemical indicative of a fire, or a chemical indicative of a targeted biological agent.

In one embodiment, one sensing element of the sensor may be disposed on the storage receptacle (e.g., exemplary connected logistics receptacle 150) and operative to monitor a state of the entrance opening 155, where a second of the sensor elements also disposed on the storage receptacle is operative to monitor a state of the selectively accessible retrieval door 160 of the storage receptacle. Extending this example further, another embodiment may have such a sensor where a third of the sensor elements is also disposed on the storage receptacle and operative to monitor a state of the temporary storage area 205 of the storage receptacle.

In other embodiments, an exemplary wireless accessory sensor node may use multiple wireless sensors (e.g., sensor 450*e* and others like it wirelessly coupled to processor 400 via interface 440) disposed on different parts of the storage receptacle, where each of the wireless sensors monitor for different types of changes in the state of the storage receptacle. For example, in such an embodiment a first of the wireless sensors monitors a state of the entrance opening 155, a second of the wireless sensors monitors a state of the selectively accessible retrieval door 160, while a third of the wireless sensors monitors a state of the temporary storage area 205 of the storage receptacle.

Referring back to FIG. 4, sensor node processing unit 400 may be implemented with a low power consumption microprocessor or microcontroller, having a core processing section, and associated peripheral circuitry as dictated by the needs of the particular application. Less complex microcontrollers or discrete circuitry may also be used to implement sensor node processing unit 400, but those skilled in the art will understand that some embodiments may use more complex and sophisticated microprocessors or microcontrollers. Additionally, exemplary sensor node processing unit 400 may be integrated into a single chip transceiver used as a core of an exemplary wireless accessory sensor node (e.g., wireless accessory sensor node 210 that monitors entrance opening 155). As such, exemplary sensor node processing unit 400 operates as a transceiver-based processing core of an exemplary wireless accessory sensor node (such as sensor node 210).

The short-range wireless communication interface 440 is generally a programmable radio and an omni-directional antenna coupled to the sensor node processing unit 400. In other embodiments, interface 440 may use an antenna with a different antenna profile when directionality may be desired. Those skilled in the art will appreciate that short-range communication interface 440 may be implemented with hardware, implemented with a combination of hardware and software, as well as implemented as a software-defined radio (SDR). Examples of variable power short-range communication interface 440 may include other interfacing hardware or software elements (not shown) for operatively coupling the device to a specific short-range communication path (e.g., a Bluetooth® Low Energy (BLE) connection path communicating at 2.4 GHz, a NB-IOT connection path using a low-power communication technology that applies a narrowband approach to cellular IoT (Internet of Things) communications allowing for usage of parts of the GSM spectrum bandwidth in unused 200 kHz bands, and the like).

A signal broadcast by wireless communication interface 440 is generally referred to as an advertising signal—a signal advertised or otherwise broadcast by the interface 440 on the particular wireless accessory sensor node. Such an exemplary advertising signal, in general, may include header information (with one or more flags or other information) as well as data. In more detail, an exemplary advertising signal may be formatted as a Bluetooth® Low Energy (BLE) signal formatted with header information and in an advertisement packet type of configuration with different types of metadata in different parts of the packet. Such header information may generally include a flag, such as a status flag. In one embodiment, a status flag being set as part of the signal indicates at least that the respective wireless accessor sensor node broadcasting the signal remains operative (e.g., a heartbeat type of status that may not be indicative that new data is now available for upload by bridge node 200 but simply that the wireless accessory sensor node is operating nominally, has not failed, and/or run out of power). In another embodiment, the status flag may be in the form of a data available flag, which is set to indicate new event information is available for upload from the respective wireless accessor sensor node broadcasting the signal.

The clock/timer 435 for exemplary wireless accessory sensor node 210 generally provides one or more timing circuits used in, for example, time delay, pulse generation, and oscillator applications. In an embodiment where exemplary wireless accessory sensor node conserves power by entering a sleep or dormant state for a predetermined time period as part of overall power conservation techniques, timer 435 assists processing unit 400 in managing timing operations.

The battery/power interface 445 for exemplary wireless accessory sensor node 210 is a type of power source that generally powers the low power circuitry implementing exemplary wireless accessory sensor node 210. In one embodiment, battery 445 may be a rechargeable power source. In other embodiments, battery 445 may be a non-rechargeable power source intended to be disposed of after use. In some embodiments, the power source may involve alternative energy generation, such as a solar cell. In other embodiments, the battery/power interface 445 may be coupled to a common power source used to power exemplary bridge node 200.

In additional embodiments, one skilled in the art will appreciate that similar functionality in an exemplary wireless accessory sensor node may be implemented in other types of hardware. For example, an exemplary wireless accessory sensor node may be implemented with specially optimized hardware (e.g., a particular application specific integrated circuit (ASIC) having the same operational control and functionality as sensor node control and management code, as described below, discrete logic, or a combination of hardware and firmware depending upon requirements of the exemplary wireless accessory sensor node, such as power, processing speed, level of adjustability for the RF characteristics, number and types of sensors coupled to the processor 400, cost, space, etc.

As noted above, exemplary wireless accessory sensor node includes memory 405 accessible by the sensor node processing unit 400. Memory storage 410 and volatile memory 412 are each operatively coupled to sensor node processing unit 400. Both memory components provide programming and data elements used by sensor node processing unit 400. In the embodiment shown in FIG. 4, memory storage 410 maintains a variety of program code (e.g., sensor node (SN) control and management code 415) and other data elements (e.g., sensor data 420, timestamped information 425, state information 430 that identifies the type of detected changes in the receptacle 150, and the like). Memory storage 410 is a tangible, non-transient computer readable medium on which information (e.g., executable code/modules, node data, sensor measurements, etc.) may be kept in a non-volatile and non-transitory manner. Examples of such memory storage 410 may include a solid state memory, ROM, flash memory, or other media structure that allows long term, non-volatile storage of information. In contrast, volatile memory 412 is typically a random access memory (RAM) structure used by sensor node processing unit 400 during operation of the exemplary wireless accessory sensor node. Upon power up of exemplary wireless accessory sensor node 210, volatile memory 412 may be populated with an operational program (such as SN control and management code 415 or a simple operating system (not shown)) or specific program modules that help facilitate particular operations of exemplary wireless accessory sensor node 210. And during operation of the exemplary wireless accessory sensor node, volatile memory 412 may also include certain data (e.g., sensor data 420, timestamped information 425, state information 430 that identifies the type of detected changes in the receptacle 150, and the like) generated as the exemplary wireless accessory sensor node 210 executes instructions as programmed or loaded from memory storage 410. However, those skilled in the art will appreciate that not all data elements illustrated in FIG. 4 must appear in memory storage 410 and volatile memory 412 at the same time.

Generally, an exemplary embodiment of SN control and management code 415 is a collection of software features implemented as programmatic functions or program modules that control the behavior of an exemplary wireless accessory sensor node (e.g., wireless accessory sensor node 210). In an embodiment, the functionality of code 415 may be generally similar as implemented in different wireless accessory sensor nodes. However, those skilled in the art will appreciate that while some principles of operation are similar between such wireless accessory sensor nodes, other embodiments may implement the functionality with some degree of specialization or in a different manner depending on the desired application and use of the node, and the type of sensor, sensors, and/or different sensor elements deployed on a particular wireless accessory sensor node. In other words, SN control and management code 415 may also include further program code specific for functionality described in the embodiments described in more detail below that use an exemplary wireless accessory sensor node. As such, the collective code executing on an exemplary wireless accessory sensor node, such as exemplary wireless accessory sensor node 210 (or any of the other implementations of exemplary wireless accessory sensor nodes as described herein), acts to programmatically configure the wireless accessory sensor node beyond that of a generic processing device in order to be specially adapted, via such program code, to be operative to function unconventionally—whether alone with the specific functionality described herein or as part of a system involving an exemplary connected logistics receptacle 150.

Sensor data 420 in volatile memory 415 and/or memory storage 410 may exist in memory 405 as a type of data collected from an onboard sensor (e.g., one of onboard sensors 450*a*-450*c* through internal bus connections, a separate sensor 450*d* through a wired connection off sensor node 210 via interface circuitry 402, and/or a separate sensor 450*e* through a wireless connection via short-range communication interface 440). Such sensor data may reflect or otherwise indicate a state or status of a particular component of the storage receptacle (e.g., exemplary connected logistics receptacle 150)—more particularly, a change in the state or status of the particular component of the storage receptacle. For example, sensor data 420 may include data reflecting or indicating motion of entrance opening 155 (e.g., when an articulating entrance opening 155 moves as it receives package 170, or when the door 156 to entrance opening 155 moves as a static version of entrance opening 155 receives package 170 being deposited within connected logistics receptacle 150. In other examples involving other wireless accessory sensor nodes, those skilled in the art will appreciate that such sensor data 420 may include image data, video data, light data, force or weight data, data indicative of the presence of a particular chemical, motion data, proximity or range data, or other sensor information indicative of a change in status or orientation.

Timestamped information 425 in memory 405 is generally a data structure with logged information on the timing of detected changes in the state or status of a particular component of or area relative to exemplary connected logistics receptacle 150 being monitored by that particular wireless accessory sensor node and based upon sensor data generated related to such detected changes. The timestamped information 425, for example, may indicate a particular time (e.g., time of day, date) corresponding to the detected change. In other examples, the timestamped information 425 may indicate a series of times and/or dates corresponding to a series of related detected changes, where such a series of related changes to the particular component of or area relative to exemplary connected logistics receptacle 150 are detected by the wireless accessory sensor node as the detected change in state of the storage receptacle.

State information 430 in memory 405 is generally a data structure with information that includes an identifier indicating a type of detected change in state in the particular component of or area relative to exemplary connected logistics receptacle 150 being monitored by that particular wireless accessory sensor node. For example, the identifier information in the state information 430 may, for example, identify that the detected change in state is related to a detected change in motion of or motion through entrance opening 155, a detected image of package 170 moving into temporary storage area 205, a detected chemical within temporary storage area 205, a detected change in weight in what is maintained within receptacle 150, a detected change in position of the selectively accessible retrieval door 160, a detected change in the state of lock 165 for door 160, a detected change in what has been placed within a predetermined range of receptacle 150 as monitored and detected by an external motion sensor or range sensor, etc.).

In operation in an embodiment, exemplary sensor node processing unit 401 (e.g., a programmable processor or controller), when executing SN control and management code 415 maintained within memory storage 410 and loaded into volatile memory 415, becomes programmatically adapted and specially configured to be operative to receive the sensor data generated by the at least one sensor (e.g., sensor data on movement of entrance opening 210 as detected by sensor 450*a*); detect the change in state of the storage receptacle (e.g., a change in the state of entrance opening 210 of exemplary connected logistics receptacle 150) based upon the sensor data now stored as sensor data 420; record the timestamped information 425 reflecting the detected change in state of the storage receptacle (e.g., the detected change in the state of entrance opening 210 of exemplary connected logistics receptacle 150); and then broadcast an updated advertising signal having a data available flag set within the updated advertising signal. As noted above, such a data available flag indicates the wireless accessory sensor node 210 has event information available for upload by bridge node 200 (e.g., exemplary event information 320 as uploaded and stored on bridge node 200), where such event information includes at least timestamped information 425 reflecting the detected change in state of the storage receptacle and may include identifier information from state information 430.

Figure 5A:
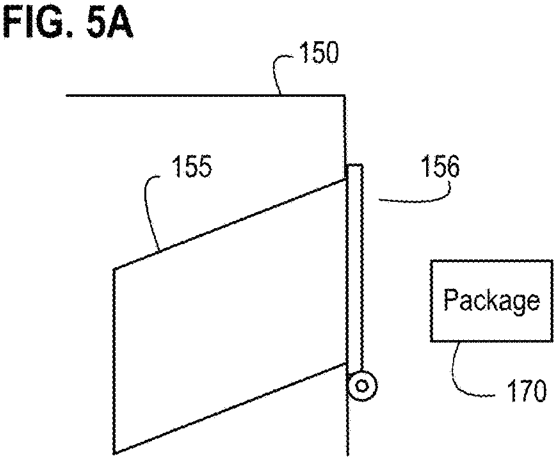
FIGS. 5A-5E are a series of diagrams illustrating different exemplary embodiments of an entrance opening to an exemplary connected logistics receptacle in accordance with different embodiments of the invention.
Figure 5B:
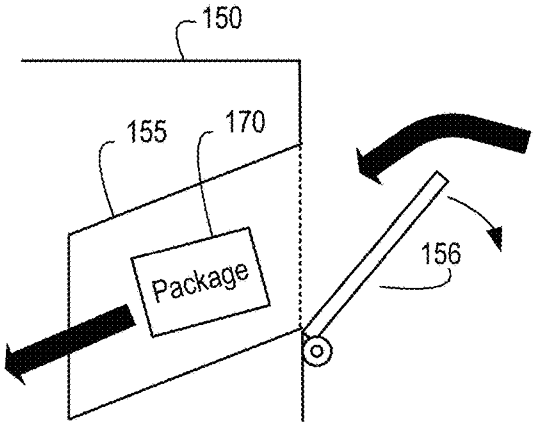

FIGS. 5A-5E are a series of diagrams illustrating different exemplary embodiments of an entrance opening to an exemplary connected logistics receptacle in accordance with different embodiments of the invention. Referring now to FIG. 5A, exemplary connected logistics receptacle 150 is shown in part where the entrance opening is implemented an articulating entrance door 156 that, when open as shown in FIG. 5B, allows the delivery item (e.g., package 170) to be received and transferred into the temporary storage area 205 of receptacle 150. In such an embodiment where the structure 155 shown in FIG. 5A operates as a static chute, as articulating entrance door 156 (which may have a handle) is opened as shown in FIG. 5B, package 170 may be placed within entrance 155 so that package 170 can slide down and into receptacle 150. Those skilled in the art will appreciate that in some embodiments, the entrance opening may be considered to be implemented by chute 155, a combination of chute 155 and door 156 (generally referenced as 155/156), a hole in receptacle 150 covered by door 160, a hold in receptacle 150 secured by a lockable door (similar to door 160), or simply a hole opening alone in receptacle 150 allowing access to within receptacle (i.e., a place through which to deposit a delivery item).

Figure 5C:
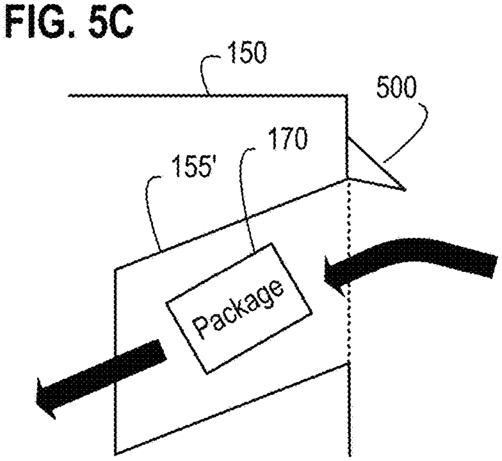
Figure 5D:
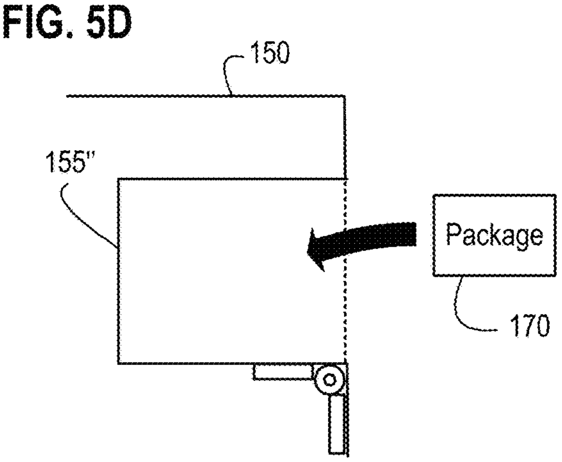
Figure 5E:
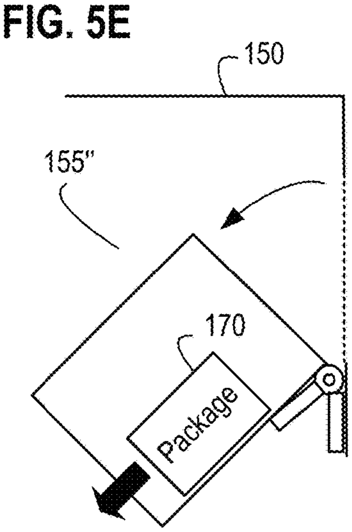

FIG. 5C illustrates an embodiment where entrance opening 155' is a static chute with no articulating door that allows the delivery item (e.g., package 170) to be inserted through the static chute and into temporary storage area 205 of receptacle 150. Without a door, the embodiment of entrance opening 155' shown in FIG. 5C includes an overhang 500 as a type of weather protection that allows package access into opening 155' but helps prevent rain from entering opening 155'. FIGS. 5D and 5E illustrate an embodiment where the entrance opening comprises an articulating drop chute 155" that allows the delivery item (e.g., package 170) to be received in a first (mostly horizontal) position of the articulating drop chute 155*b* as shown in FIG. 5D. In FIG. 5E, the articulating drop chute 155" changes position/orientation and transfers the received delivery item (e.g., package 170) to temporary storage area 205 in a second position of the articulating drop chute.

As noted above, embodiments of an exemplary connected logistics receptacle 150 deploy bridge node 200 and various wireless accessory sensor nodes operating in a distributed manner so as to operate more efficiently and use such distinct types of monitoring and communication devices to better monitor, detect, and report different kinds of state changes with respect to the receptacle 150 as types of meaningful interactions and engagements with receptacle 150. From the perspective of an exemplary bridge node used in an exemplary system involving exemplary connected logistics receptacle 150, the bridge node (e.g., bridge node 200) may operate within a programmatically determined reporting period during which the bridge node wakes, attempts to detect if any data is available from any of the wireless accessory sensor nodes, and during which retrieved event information may be transmitted to the backend server 100. FIGS. 6A-6D are exemplary timing diagrams illustrating activity during such exemplary reporting periods for an exemplary connected logistics receptacle in accordance with different embodiments of the invention.

Figure 6A:
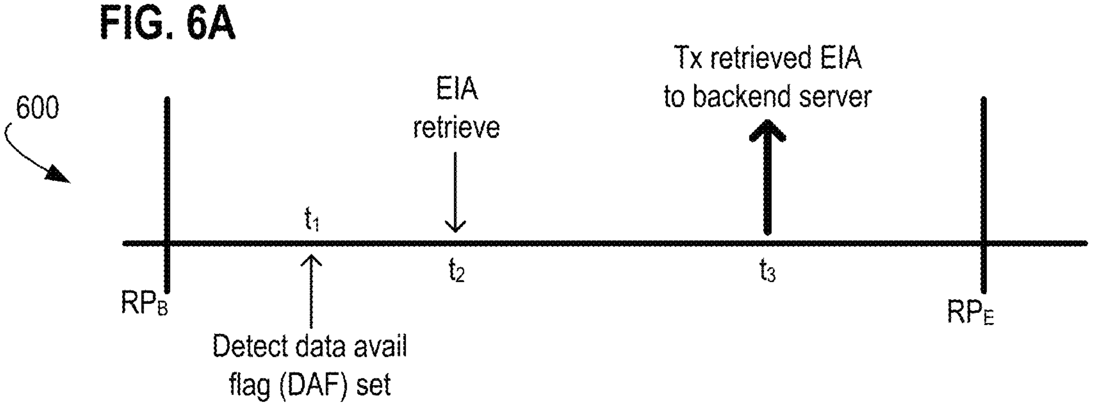
FIGS. 6A-6D are timing diagrams illustrating activity during exemplary reporting periods for an exemplary connected logistics receptacle in accordance with different embodiments of the invention.

Referring now to FIG. 6A, an exemplary timeline 600 of activity is shown having a beginning time at $RP_B$ where an exemplary reporting period for bridge node 200 begins and an ending time at $RP_E$ where the exemplary reporting period for bridge node 200 ends. In general, a bridge node's reporting period is considered a period of time during which the bridge node has been programmed to be operational. In some embodiments, the reporting period may be a time period defined by backend server 100 and provided by backend server 100 to bridge node 200. In more detail, the reporting period may be implemented as a dynamically adjusted time period stored in the bridge node memory 202, where the dynamically adjusted time period is defined by a reporting period update message sent by the backend server 100 to the bridge node 200 as part of adjusting or tuning operations performed by backend server 100 on one or more of exemplary connected logistics receptacle.

In one embodiment, bridge node 200 may check for and retrieve data during the reporting period at a predetermined time of day. In more detail, an embodiment may have bridge node processor 201, when executing CLR control and management code 315 (i.e., a type of bridge node code), programmatically adapted and operative to detect a data available flag set within the updated advertising signal over short-range communication interface 203*b* by being further operative to wake from a low power state at a predetermined time of day (e.g., at time $RP_B$ or sometime during the exemplary reporting period) and after that predetermined time of day, detect the data available flag set within the updated advertising signal over the short-range communication interface 203*b*. For example, as shown in FIG. 6A, bridge node 200 wakes from a low power state at time $RP_B$, detects a data available flag set within an updated advertising signal from a wireless accessory sensor node deployed on connected logistics receptacle 150 (e.g., wireless accessory sensor node 210) at time $t_1$ (e.g., sometime after time $RP_B$), and retrieves event information available for upload from wireless accessory sensor node 210 at time $t_2$. In some instances, the data available flag may be a status flag indicative of a count related to the event information available for upload (e.g., a count of how many changes in state of a particular component of receptacle 150 have been detected and logged by a particular wireless accessory sensor node). In this example of FIG. 6A, bridge node 200 is then able to transmit the retrieved event information to backend server at time $t_3$ prior to or at $RP_E$.

Figure 6B:
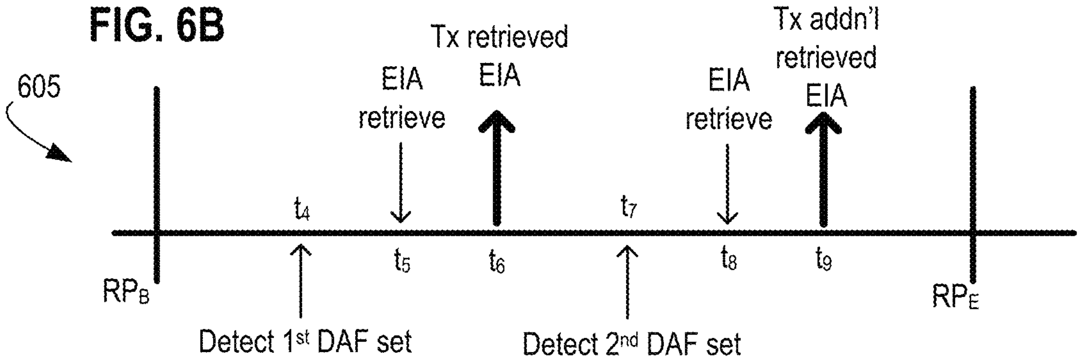

In FIG. 6B, another exemplary timeline 605 of activity is shown having a beginning time at $RP_B$ where an exemplary reporting period for bridge node 200 begins and an ending time at $RP_E$ where the exemplary reporting period for bridge node 200 ends. However, the activity shown in timeline 605 illustrates how a bridge node may retrieve event information and transmit such event information to backend server more than once during an exemplary reporting period. Referring now to FIG. 6B, an embodiment of bridge node processor 201, when executing CLR control and management code 315 (i.e., a type of bridge node code), is programmatically adapted and operative to detect a data available flag set within an updated advertising signal over short-range communication interface 203*b* after a beginning of a reporting period for bridge node 200, and then detect, before an end of the reporting period for the bridge node, a second data available flag set within a subsequent advertising signal broadcast by the wireless accessory sensor node, retrieve additional event information available for upload from the wireless accessory sensor node related to the detected second data available flag, and transmit, using the long-range communication interface 203*a*, the retrieved additional event information to the backend server 100 for use by the backend server 100 in initiating the dispatched logistics operation. For example, as shown in FIG. 6B, bridge node 200 wakes from a low power state at time $RP_B$, detects a first data available flag set within an updated advertising signal from a wireless accessory sensor node deployed on connected logistics receptacle 150 (e.g., wireless accessory sensor node 210) at time $t_4$ (e.g., after time $RP_B$), retrieves event information available (EIA) for upload from wireless accessory sensor node 210 at time $t_5$, transmits the retrieved EIA at time to, detects a second data available flag set at time $t_7$ (from the same or a different wireless accessory sensor node), retrieves the additional EIA at time to, and transmits the additional retrieved EIA at time to at or prior to $RP_E$. In some instances, the data available flag may be a status flag indicative of a count related to the event information available for upload (e.g., a count of how many changes in state of a particular component of receptacle 150 have been detected and logged by a particular wireless accessory sensor node). In this example of FIG. 6A, bridge node 200 is then able to transmit the retrieved event information to backend server at time $t_3$ prior to or at $RP_E$. In this example, event information may be retrieved more than once by bridge node 200 and transmitted to backend server 100 upon retrieving any such event information.

Figure 6C:
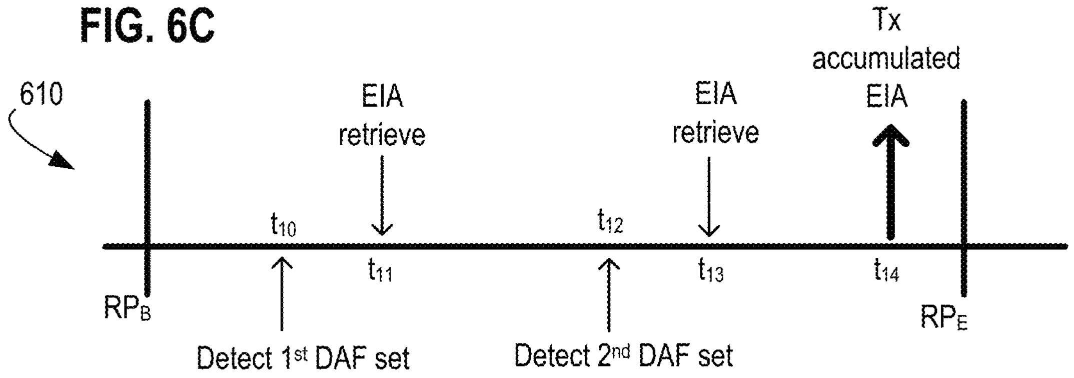

However, as shown in FIG. 6C, other embodiments may have bridge node 200 retrieving event information more than once during the reporting period and may have bridge node 200 initiating a single transmission of accumulated event information to backend server 100 at or near the end of the reporting period. In FIG. 6C, yet another exemplary timeline 610 of activity is shown having a beginning time at $RP_B$ where an exemplary reporting period for bridge node 200 begins and an ending time at $RP_E$ where the exemplary reporting period for bridge node 200 ends.

Referring now to FIG. 6C, an embodiment of bridge node processor 201, when executing CLR control and management code 315 (i.e., a type of bridge node code), is programmatically adapted and operative after detecting the data available flag set within the updated advertising signal at time $t_{10}$ and retrieving the event information available for upload from the wireless accessory sensor node at time $t_{11}$, is further operative to detect a second data available flag set at time $t_{12}$, retrieve additional event information at time $t_{13}$, and then transmit the accumulated event information at time $t_{14}$. In more detail, bridge node processor 201, when executing CLR control and management code 315 (i.e., a type of bridge node code), is programmatically adapted and operative to detect, at time $t_{12}$ prior to $RP_E$, a subsequent data available flag set within a subsequent updated advertising signal over the short-range communication interface 203*b*;

retrieve additional event information available for upload from the wireless accessory sensor node (or a different wireless accessory sensor node used in connected logistics receptacle 150) using the short-range communication interface 203*b* before the end of the reporting period $RP_E$, where the additional event information includes at least additional timestamped information reflecting an additional change in state of the storage receptacle (e.g., a component or area related to connected logistics receptacle 150); and to transmit accumulated event information to backend server 100 to cause backend server 100 to initiate a dispatched logistics operation related to the storage receptacle. In this example, the accumulated event information includes at least the timestamped information reflecting the detected change in state of the storage receptacle and the additional timestamped information reflecting an additional change in state of the storage receptacle.

In another exemplary embodiment with reference to FIG. 6C, an embodiment of bridge node processor 201, when executing CLR control and management code 315 (i.e., a type of bridge node code), is programmatically adapted and operative after detecting the data available flag set within the updated advertising signal at time $t_{10}$ and retrieving the event information available for upload from the wireless accessory sensor node at time $t_{11}$, is further operative to detect, prior to an end of the reporting period at time $RP_E$, a subsequent data available flag set within a subsequent updated advertising signal over the short-range communication interface 203*b*; retrieve additional event information available for upload from the wireless accessory sensor node using the short-range communication interface at the end of the reporting period where the additional event information includes at least additional timestamped information reflecting an additional change in state of exemplary connected logistics receptacle 150; and then transmit accumulated event information to the backend server after retrieval of the additional event information to cause the backend server 100 to initiate the dispatched logistics operation related to receptacle 150. In this example, the accumulated event information includes at least the timestamped information reflecting the detected change in state of the storage receptacle and the additional timestamped information reflecting an additional change in state of the storage receptacle.

In still another exemplary embodiment with reference to FIG. 6C, an embodiment of bridge node processor 201, when executing CLR control and management code 315 (i.e., a type of bridge node code), is programmatically adapted and operative after detecting the data available flag set within the updated advertising signal at time $t_{10}$ and retrieving the event information available for upload from the wireless accessory sensor node at time $t_{11}$, is further operative after a beginning of the reporting period $RP_B$ and before the end of the reporting period $RP_E$, to periodically monitor for the data available flag set within any of one or more updated advertising signals broadcast by any of the wireless accessory sensor nodes disposed as part of receptacle 150 and monitored by bridge node 200; and retrieve the event information available for upload related to such updated advertising signals by being operative to incrementally retrieve the event information from such wireless accessory sensor node(s) upon detecting the data available flag set within any of those updated advertising signals broadcast by the wireless accessory sensor node(s) where the incrementally retrieved event information takes the form of a series of timestamped information reflecting a series of changes of the state of the storage receptacle (e.g., changes of the state of entrance opening 155, changes of the state of temporary storage area 205, changes of the state of door 160, and/or changes of the state of the area proximate connected logistics receptacle 150). Thereafter, the bridge node processor 201, when executing CLR control and management code 315, is operative to transmit the retrieved event information to the backend server by transmitting the incrementally retrieved event information at the end of the reporting period at or near time $RP_E$ to backend server 100 to cause backend server 100 to initiate a dispatched logistics operation.

Figure 6D:
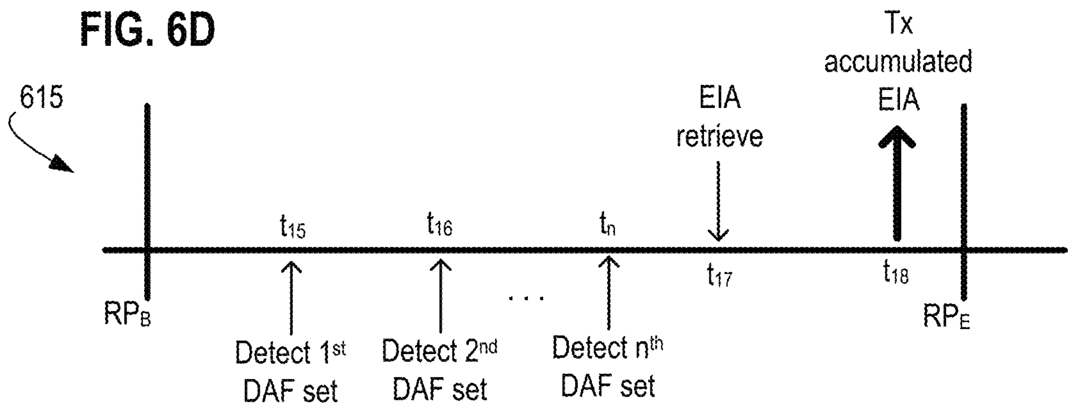

In FIG. 6D, still another exemplary timeline 615 of activity is shown having a beginning time at $RP_B$ where an exemplary reporting period for bridge node 200 begins and an ending time at $RP_E$ where the exemplary reporting period for bridge node 200 ends. However, the activity shown in timeline 615 illustrates how a bridge node may be aware of multiple instances of data being available for upload (via detecting different data available flags set over time) but delaying retrieval of the different event information and transmission of such accumulated event information to backend server 100 until at or near the end of an exemplary reporting period. Referring now to FIG. 6D, an embodiment of bridge node processor 201, when executing CLR control and management code 315 (i.e., a type of bridge node code), is programmatically adapted and further operative (after detecting the data available flag set at time $t_{15}$) to detect, prior to $RP_E$, a subsequent data available flag set within a subsequent updated advertising signal and retrieve additional event information available for upload from the wireless accessory sensor node(s) where the additional event information includes at least additional timestamped information reflecting an additional change in state of the storage receptacle; and then transmit the different retrieved event information to backend server 100 by being operative to transmit accumulated event information to backend server 100 at $RP_E$ to cause backend server 100 to initiate a dispatched logistics operation related to the storage receptacle 150. Such accumulated event information in this further example includes at least (a) the timestamped information reflecting the detected change in state of the storage receptacle and (b) the additional timestamped information reflecting the additional change in state of the storage receptacle. For example, as illustrated in FIG. 6D, bridge node 200 may detect a first data available flag set at time $t_{15}$, a second data available flag set at time $t_{16}$, and potentially a further data available flag set at time $t_n$ (prior to $RP_E$). Bridge node 200 may then retrieve the different event information from one or more respective wireless accessory sensor nodes at time $t_{17}$ before transmitting the accumulated event information at time $t_{18}$.

In some embodiments, the bridge node 200 deployed as part of an exemplary connected logistics receptacle 150 may determine the type of event based upon retrieved event information (such as a pickup event occurring with respect to receptacle 150 when package 170 is removed from receptacle 150 or a drop off event occurring with respect to receptacle 150 when package 170 is received by receptacle 150). For example, an embodiment of bridge node processor 201, when executing CLR control and management code 315 (i.e., a type of bridge node code) as part of operation within exemplary connected logistics receptacle 150, may be programmatically adapted and operative to transmit the retrieved event information to the backend server by being operative to first determine the retrieved event information indicates the detected change in state of the storage receptacle is a pickup event. The bridge node processor 201 may then be operative to transmit the retrieved event information to the backend server 100 using the long-range communication interface 203*a* and after the retrieved event information is determined to indicate the detected change in state of the storage receptacle is the pickup event. In such an example, backend server 100 may respond with altering existing or scheduling different dispatched logistics operations related to exemplary connected logistics receptacle 150 and/or operations related to other managed connected logistics receptacles.

In more detail, such an example may have the bridge node processor 201 determine the retrieved event information indicates the detected change in state of the storage receptacle 150 is a pickup event when the recorded timestamped information reflecting the detected change in state of the storage receptacle indicates a change in state of the selectively accessible retrieval door 160 (e.g., where the change in state of the selectively accessible retrieval door 160 corresponds to a detected change in motion of the selectively accessible retrieval door based upon motion sensor data, status/orientation data, magnetic sensor data, and/or lock sensor data related to the state of lock 165 for door 160).

In another example, the bridge node processor 201 may determine the retrieved event information indicates the detected change in state of the storage receptacle 150 is a pickup event when the recorded timestamped information reflecting the detected change in state of the storage receptacle 150 indicates (a) a change in state of the selectively accessible retrieval door 160 (or lock 165) and (b) a change in state of the temporary storage area 205 of receptacle 150. Such a change in the state of the selectively accessible retrieval door 160 may, for example, be based on motion sensor data, status/orientation data, magnetic sensor data, and/or lock sensor data. And such a change in the state of the temporary storage area 205 may, for example, be based on motion sensor data, image sensor data, sensor data on a detected change in weight of what is stored within temporary storage area 205, sensor data on a detected impact force within temporary storage area 205, sensor data on a detected chemical within temporary storage area 205, and/or detected light sensor data reflecting a change in light detected within temporary storage area 205.

Figure 7:
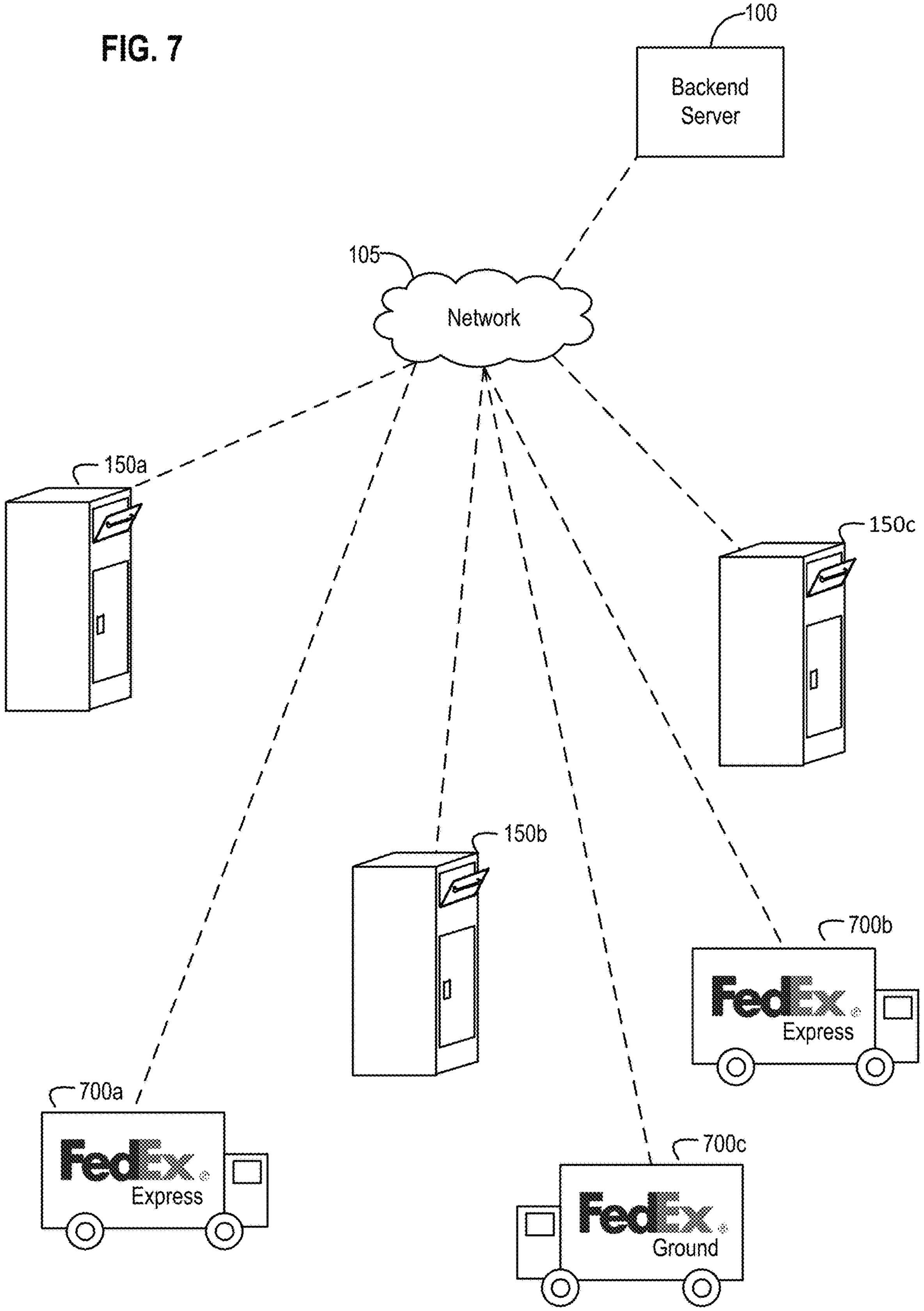
FIG. 7 is a diagram of multiple exemplary connected logistics receptacles operating within a network that connects with an exemplary backend server in accordance with an embodiment of the invention.

Exemplary backend server 100, in various embodiments described herein, receives the retrieved event information from exemplary bridge node 200 disposed within exemplary connected logistics receptacle 150 and, in response to such a transmission, may initiate one or more dispatched logistics operations related to that particular exemplary connected logistics receptacle or other connected logistics receptacles also in communication with backend server 100. FIG. 7 is a diagram of multiple exemplary connected logistics receptacles 150*a*-150*c* operating within a network that connects with an exemplary backend server 100 in accordance with an embodiment of the invention. Referring now to FIG. 7, those skilled in the art will appreciate that exemplary backend server 100 may receive information from different exemplary connected logistics receptacles 150*a*-150*c* via messages and communications over network 105 and may initiate different types of dispatched logistics operations as a result of such messages and communications. In other words, exemplary logistics assets 700*a*-700*c* that may be dispatched for a dispatched logistics operation (e.g., a pickup operation, a delivery operation) related to one or more of exemplary connected logistics receptacles 150*a*-150*c* based on the different messages and communications sent to backend server 100. Additionally, as explained in more detail below, backend server 100 may alter or tune the operational parameters of exemplary connected logistics receptacles 150*a*-150*c* based on the different messages and communications sent to backend server 100. Furthermore, as explained in more detail below, backend server 100 may setup, centrally manage, and track patterns of use, engagement, interactions for exemplary connected logistics receptacles 150*a*-150*c*.

Figure 8:
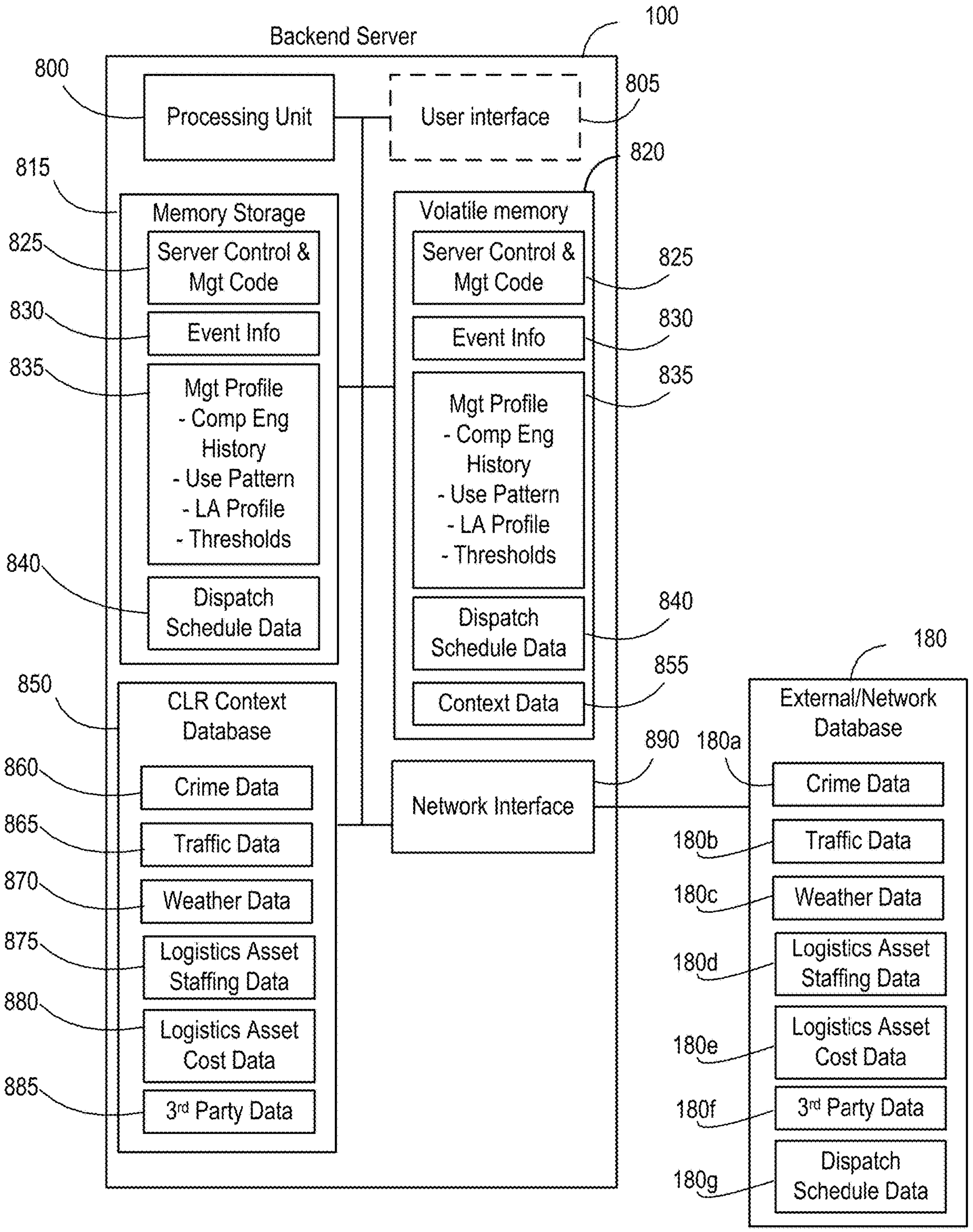
FIG. 8 is a detailed diagram of an exemplary backend server device in accordance with an embodiment of the invention.

FIG. 8 is a detailed diagram of an exemplary backend server (e.g., backend server 100) in accordance with an embodiment of the invention. Referring now to FIG. 8, exemplary backend server 100 is shown as a networked computing platform capable of connecting to and interacting with one or more connected logistics receptacles (e.g., exemplary connected logistics receptacle 150, exemplary connected logistics receptacles 150*a*-150*c*) as well as other servers or network storage (e.g., exemplary third-party database 180). Embodiments of exemplary backend server 100 are operative to communicate with other networked devices/nodes that may be used by a shipping customer (e.g., a handheld mobile cellular phone, laptop, tablet, or other communication device) or logistics personnel (e.g., a mobile device used by a logistics courier, an onboard transceiver deployed on a logistics vehicle and used by logistics personnel, and the like). Those skilled in the art will appreciate that exemplary backend server 100 is a hardware-based processing component that may be implemented in a wide variety of ways. For example, those skilled in the art will further appreciate that backend server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), a server farm that logically allows multiple distinct components to function as one server computing platform device from the perspective of a client device, or a cloud-based server with distributed storage and processing capability. In some regional deployments, an exemplary backend server may include servers dedicated for specific geographic regions as information collected within different regions may include and be subject to different regulatory controls and requirements implemented on respective regional servers.

At its core, exemplary backend server 100 shown in FIG. 8 comprises a processing or logic unit 800 (commonly referred to as a processor) coupled to a network interface 890, which facilitates and enables operative connections and communications through network 105 with one or more other network devices (e.g., exemplary connected logistics receptacle 150, exemplary connected logistics receptacles 150*a*-150*c*) as well as the other networked devices noted above that may be used by a shipping customer or logistics personnel. Using a network communication path(s) as well as program code or program modules (such as server control and management code 825), the backend server 100 generally operates to communicate with and manage exemplary connected logistics receptacles (e.g., 150, 150*a*-150*c*) as well as communicate with various logistics assets as part of initiating and/or changing dispatched logistics operations related to exemplary connected logistics receptacles.

Processing unit 800 of exemplary backend server 100 is operatively coupled to memory storage 815 and volatile memory 820, which collectively store and provide a variety of executable program code (e.g., server control and management code 825), data received from various exemplary connected logistics receptacle(s) (e.g., event information 830), and data used during logistics receptacle management and dispatching operations by backend server 100 (e.g., management profile 835, dispatch schedule data 840, and context data 855 related to the environment in which particular exemplary connected logistics receptacles are located and operate). Likewise, while the embodiment shown in FIG. 8 illustrates a simplified single memory storage 815 (and volatile memory 820), exemplary backend server 100 may deploy more than one memory storage media. Memory storage media, such as memory storage 815, may be in differing non-transitory forms (e.g., conventional hard disk drives, solid state memory such as flash memory, optical drives, RAID systems, cloud storage configured memory, network storage appliances, etc.).

Like memory storage 305 on a bridge node and memory storage 410 on a wireless accessory sensor node, memory storage 815 on backend server 100 is a tangible, non-transient computer readable medium on which information (such as executable code/modules (e.g., server control and management code 825), data received from other devices (e.g., event information 830, etc.), data used in operation of measurement information (e.g., management profile 835, etc.), and information on the contextual environment for the exemplary connected logistics receptacles managed by backend server (e.g., context data 855)) may be kept in a non-volatile and non-transitory manner.

Exemplary event information 830, as maintained in memory of backend server 100, is a data structure that generally maintains transmitted event information (e.g., retrieved event information 320) received from bridge nodes in one or more different exemplary connected logistics receptacles. As noted above with respect to exemplary event information 320 retrieved by a bridge node from a wireless accessory sensor node, exemplary event information 830 as stored on backend server 100 reflects information on detected changes on particular components of one or more connected logistics receptacles. In more detail, event information 830 includes timestamped information reflecting a detected change in state of a connected logistics receptacle (such as receptacle 150) and an identifier indicating a type of detected change in state of the particular connected logistics receptacle. The timestamped information, for example, may indicate a particular time (e.g., time of day, date) corresponding to the detected change. In other examples, the timestamped information may indicate a series of times and/or dates corresponding to a series of related changes to the receptacle, where such a series of related changes to the receptacle are detected by the wireless accessory sensor node as the detected change in state of the storage receptacle. The identifier (which may be also referred to as state information) in event information 830 may, for example, identify details on the type of change detected relative to the state of particular components of the receptacle (e.g., a detected change in motion of or motion through entrance opening 155, a detected image of package 170 moving into temporary storage area 205, a detected chemical within temporary storage area 205, a detected change in weight in what is maintained within receptacle 150, a detected change in position of the selectively accessible retrieval door 160, a detected change in the state of lock 165 for door 160, a detected change in what has been placed within a predetermined range of receptacle 150 as monitored and detected by an external motion sensor or range sensor, etc.). Event information 830 maintains such timestamped and identifier information as corresponding to a particular connected logistics receptacle and, in more detail, may maintain such information categorized and organized relative to particular components on particular connected logistics receptacles managed by backend server 100.

Exemplary management profile 835 is generally a data structure generated, maintained, and updated by backend server 100 with information on the history and use of particular connected logistics receptacles (e.g., exemplary connected logistics receptacle 150, exemplary connected logistics receptacles 150*a*-150*c*), their respective components, and logistics assets used to service the particular connected logistics receptacle. Management profile 835 may, in some embodiments, be implemented with a database or records for each connected logistics receptable being managed by backend server 100 or may be implemented as separate sub-profiles for each connected logistics receptable being managed by backend server 100.

In more detail, the information maintained in exemplary management profile 835 includes engagement or interaction history relative to particular components (e.g., an entrance opening/door/handle, a temporary storage area, a selectively accessible retrieval door/lock, and the like) for each of the different connected logistics receptacles 150 being managed by backend server 100. Exemplary management profile 835 may also include patterns of historic engagement or interaction relative to components of each of the different connected logistics receptacles 150 being managed by backend server 100. Such patterns (also referred to as server-tracked historic use patterns for a storage receptacle) are managed as an information profile that identifies a pattern of use of a particular storage receptacle (e.g., exemplary connected logistics receptacle 150). For example, such patterns may include a pattern of delivery events for the receptacle over time and/or a pattern of pickup events for the receptacle over time. Further examples of profiles of patterns in management profile 835 may include a threshold occupancy pattern profile identifying a frequency of reaching a threshold occupied level within a particular storage receptacle, and/or an overload pattern profile identifying a frequency of reaching an overload condition for a particular storage receptacle.

Such engagement/interaction history information and use pattern information in management profile 835 may be updated (e.g., updated continuously as new event information 830 is received, updated periodically but not necessarily as each bit of new event information 830 is received, or in some further embodiments updated at dynamically adjusted times depending on changes in engagement and patterns and rates of change of such engagement and patterns as further event information 830 is received from various connected logistics receptacles 150 to further enhance operations of backend server 100.

Exemplary management profile 835 may also include profile information on what logistics assets are dispatched in relation to particular connected logistics receptacles. In this way, logistics asset profile information within management profile 835 identifies what different logistics assets are dispatched, deployed, redirected or otherwise that are used to service particular exemplary connected logistics receptacles managed by backend server 100 as well as identifies patterns of such logistics assets usage relative to different exemplary connected logistics receptacles.

Exemplary management profile 835 may also include threshold data related to particular exemplary connected logistics receptacles that may be used in managing the different connected logistics receptacles. Such threshold data may be a threshold change in use and/or patterns of use/engagement relative to particular exemplary connected logistics receptacles (e.g., use of and/or patterns in such use of particular components on exemplary connected logistics receptacle 150). For example, such threshold data maintained in exemplary management profile 835 may include a threshold occupied level for different exemplary connected logistics receptacles where meeting such a threshold occupied level in that connected logistics receptacle may trigger certain actions by backend server (e.g., a sweep of other connected logistics receptacles). Such a threshold occupied level may be implemented as information defining an overflow condition (or overflow threshold level/condition) which may take the form of, for example, an amount within temporary storage area 205 as detected in video and/or image sensor data; a threshold number of deposits detected within temporary storage area 205; an amount of weight detected as having been deposited within temporary storage area 205; and/or a number of proximate deposits detected proximate the particular connected logistics receptacle 150.

Exemplary dispatch schedule data 840 maintained by backend server 100 is information related to logistics assets and their respective operations (e.g., capacity, availability, and schedule information associated with particular logistics assets (such as a commercial courier, shipping company, or private entity involved with pickup and/or delivery of items to and from connected logistics receptacles)). already scheduled dispatch operations, In some embodiments, processing unit 800 of exemplary backend server 100 is operatively coupled to user interface 805, which may be coupled to further input devices (not shown) (such as a keyboard, screen or display, and the like) so that personnel may interact with backend server 100 directly.

As noted above, backend server 100 may access context data 855 as part of managing exemplary connected logistics receptacles in the wireless node network. Those skilled in the art will appreciate that information corresponding to exemplary context data 855 may be accessed from different sources, such as onboard connected logistics receptacle (CLR) context database 850 and/or third-party network storage database 180 that may maintain different types of exemplary context data 855. As illustrated in FIG. 8, exemplary CLR context database 850 is represented as a single database accessible by processing unit 800 internal to backend server 100. Those skilled in the art will readily understand that other configurations that provide an accessible collection of context data 855 are possible and contemplated within the scope and principles of embodiments of the invention. For example, CLR context database 850 may be implemented as an externally accessible database (or multiple databases), such as an accessible storage maintained outside the backend server 100 via a dedicated interface or a network storage device (or network attached storage (NAS) unit) such as that shown as third-party network storage database 180 in FIG. 1. In yet another embodiment, those skilled in the art will appreciate that CLR context database 850 (or simply the information represented as database 850 in FIG. 8) may be implemented with cloud technology that essentially provides a distributed networked storage of collections of information (such as context data 855, dispatch schedule data 840, etc.) accessible to backend server 100.

Within CLR context database 850, an exemplary embodiment of the collection of context data 855 may be maintained that generally relates to an environment in which the exemplary connected logistics receptacles are operating or anticipated to be operating. In more detail, exemplary context data 855 as maintained in CLR context database 850 may provide geographic crime data 860 (e.g., on-going crime scenes, crime patterns, different types of crimes in particular areas, and the like), traffic data 865 (e.g., current traffic, traffic patterns, construction locations, and the like), weather data 870 (e.g., current weather happening in particular areas, weather forecasts, historic weather events for areas, and the like), logistics asset staffing data 875 (e.g., couriers deployed in delivery vehicles as mobile logistics assets, shift change information on logistics personnel, and the like), logistics asset cost data 880 (e.g., fuel costs, and the like), as well as other third-party generated data 885 that relates to the operating environment or operations of any of the connected logistics receptacles managed by backend server 100.

As shown in FIG. 8, exemplary third-party network storage database 180 may be accessed by backend server 100 to gain access to relevant additional information (e.g., types of context data 855 or dispatch schedule data 840) not normally maintained within memory onboard backend server 100. Such additional information may be more frequently updated on external database 180 and, as a result, may be periodically or occasionally accessed by backend server 100 to update information on backend server 100 or to further supplement relevant information (e.g., context data, dispatch related information, and the like) used by backend server. For example, exemplary information made accessible on third-party network storage database 180 may include further crime data **180*a*, additional traffic data 180*b*, other weather data 180*c*, supplemental logistics asset staffing data 180*d*, supplemental logistics asset cost data 180*e*, and other third-party generated data 180*f* that relates to the operating environment or operations of any of the connected logistics receptacles managed by backend server 100, as well as additional dispatch schedule data 180*g* where any of such data on database 180 may not be locally stored and maintained on backend server 100 that that may supplement/complement what is maintained within memory of backend server 100 (e.g., memory storage 815 and CLR context database 850 onboard backend server 100**).

Generally, an embodiment of server control and management code 825 is a collection of executable software features implemented as programmatic functions or program modules that generally control operations of exemplary backend server 100. Those skilled in the art will appreciate that backend server 100 will typically have an operating system (not shown) in memory storage 815 and loaded into volatile memory 820 when backend server 100 is powered and operating, and that server control and management code 825 serves to further expand upon the programmatically configured functionality of backend server 100. In other words, server control and management code 825 includes program code specific for backend server 825 unconventional functionality described in the embodiments described in more detail below that use a backend server as part of embodiments of the invention. As such, the collective code executing on backend server 100 (or any of the other implementations of a backend server as described herein), acts to programmatically configure the backend server 100 beyond that of a generic processing device in order to be specially adapted, via such program code, to be operative to function unconventionally—whether alone or in combination with other processing devices with the specific functionality described herein or as part of a system.

Those skilled in the art will appreciate that the above identification of particular program code and data are not exhaustive and that embodiments may include further executable program code or modules as well as other data relevant to operations of a processing-based device, such as a wireless accessory sensor node, a bridge node, and a backend server As noted above, embodiments of an enhanced connected logistics receptacle system for receiving and temporarily maintaining a delivery item, are operative to cause a backend server (e.g., exemplary backend server 100) to initiate a dispatched logistics operation. In more detail, an embodiment with bridge node 200 on the connected logistics receptacle 150 may be operative to use long-range communication interface 203*a* to transmit the retrieved event information (e.g., event information 320) to backend server 100 to cause the backend server 100 to initiate the dispatched logistics operation related to the storage receptacle 150. In one example, the retrieved event information transmitted to the backend server 100 causes the backend server to reactively dispatch a logistics asset to the storage receptacle 150 for pickup of at least the delivery item (e.g., package 170) from within the storage receptacle as the dispatched logistics operation. This may be accomplished, for example, where backend server 100 is caused or otherwise triggered by receipt of the event information (and analysis of such event information) to transmit a pickup message to a mobile node operated by the logistics asset, where such a pickup message identifies the storage receptacle 150 for the dispatched logistics operation. In another example, the retrieved event information transmitted to the backend server 100 causes the server to alter a previously scheduled dispatch operation related to the storage receptacle 150 as the dispatched logistics operation initiated by the bridge node 200 in receptacle 150. In more detail, the retrieved event information transmitted to the backend server 100 in this example causes the backend server 100 to transmit a pickup message to an alternative logistics asset as the dispatched logistics operation related to the storage receptacle 150. Such an alternative logistics asset is different than an original logistics asset corresponding to a previously scheduled dispatch operation related to the storage receptacle. In this example and with reference to FIG. 7, the dispatch schedule data 840 maintained on backend server 100 may indicate that the original logistics asset to be used for a particular connected logistics receptacle 150*b* may be a first logistics asset (e.g., courier and vehicle 700*a*). However, in response to retrieved event information sent to backend server 100 (now stored as event information 830), such received event information by backend server 100 may cause backend server to transmit a pickup message to a second logistics asset (e.g., courier and vehicle 700*b*) as the dispatched logistics operation related to the connected logistics receptacle 150*b* that sent such event information to backend server 100.

Further embodiments involving an enhanced connected logistics receptacle system may also implement validation of the detected changes on the connected logistics receptacle. For example, an embodiment of such a system may implement the wireless accessory sensor node as having a second sensor. Using such a second sensor, the wireless accessory sensor node may be operative to detect the change in state of the storage receptacle based upon sensor data by detecting a change in state of the entrance opening using one sensor, and then validating the change in state of the entrance opening by detecting light within the temporary storage area using the second sensor. In this particular example, the change in state of the storage receptacle corresponds to a delivery event where the delivery item is received by the storage receptacle.

In another example where the system's wireless accessory sensor node has such a second sensor, the wireless accessory sensor node can detect the change in the state of the storage receptacle based upon sensor data by detecting a change in state of the selectively accessible retrieval door using one sensor, and then validating the change in state of the selectively accessible retrieval door by detecting light within the temporary storage area using the second sensor. In this additional example, the change in state of the storage receptacle corresponds to a pickup event where the delivery item is removed from the storage receptacle.

As described above, various embodiments of an enhanced connected logistics receptacle system may use a single storage receptacle, a bridge node, and a wireless accessory sensor node having at least one sensor. However, a more detailed embodiment of an enhanced connected logistics receptacle system may use a single storage receptacle (e.g., receptacle 150), a bridge node (e.g., bridge node 200), and different wireless accessory sensor nodes (an embodiment which is also shown in FIG. 2). For example, such an embodiment of an enhanced connected logistics receptacle system may include the storage receptacle for receiving the delivery item, the bridge node mounted to storage receptacle, and two different wireless accessory sensor nodes (e.g., wireless accessory sensor nodes 210, 240). In this example, the system's first wireless accessory sensor node (e.g., wireless accessory sensor node 210) has a first sensor disposed on the storage receptacle that monitors for a change in state of the entrance opening 155. As part of this exemplary system, the first wireless accessory sensor node 210 is further operative to detect the change in state of the entrance opening 155 based upon first sensor data generated by the first sensor; record first timestamped information reflecting the detected change in state of the entrance opening 155; and broadcast a first updated advertising signal having a first data available flag set within the first updated advertising signal. Such a first data available flag indicates the first wireless accessory sensor node 210 has first event information available for upload by the bridge node 200, where the first event information includes at least the first timestamped information reflecting the detected change in state of the entrance opening 155. In this example, the second wireless accessory sensor node 240 has a second sensor disposed on the storage receptacle that monitors for a change in state of the selectively accessible retrieval door 160. As part of this exemplary system, the second wireless accessory sensor node 240 is further operative to detect the change in state of the selectively accessible retrieval door 160 based upon second sensor data generated by the second sensor; record second timestamped information reflecting the detected change in state of the selectively accessible retrieval door 160; and broadcast a second updated advertising signal having a second data available flag set within the second updated advertising signal. Such a second data available flag indicates the second wireless accessory sensor node 240 has second event information available for upload by the bridge node 200, where the second event information includes at least the second timestamped information reflecting the detected change in state of the selectively accessible retrieval door 160.

In this same example, the bridge node processor 201 within bridge node 200, when executing the CLR control & management code 315 (as a type of bridge node code maintained on the bridge node memory), is operative to detect, using the short-range communication interface 203*b*, at least one of (a) the first data available flag set within the first updated advertising signal and (b) the second data available flag set within the second updated advertising signal. The bridge node processor 201 is then further operative to responsively download, using the short-range communication interface 203*b*, retrieved event information from at least one of the first wireless accessory sensor node 210 and the second wireless accessory sensor node 240 based upon which of the first data available flag set and the second data available flag set is detected. The retrieved event information includes the first event information when the first data available flag set is detected, and includes the second event information when the second data available flag is detected. The bridge node processor 201 is then further operative to transmit, using the long-range communication interface 203*a*, the retrieved event information to the backend server 100 to cause the backend server 100 to initiate the dispatched logistics operation related to the storage receptacle.

A further embodiment of this multiple wireless accessory sensory node example may have the enhanced connected logistics receptacle system further including a third wireless accessory sensor node (e.g., one of wireless accessory sensor nodes 215, 220, 225, 230, 235 shown in FIG. 2). In this further embodiment, the third wireless accessory sensor node has a third sensor disposed on the storage receptacle that monitors for a change in state of the temporary storage area 205 (e.g., motion detected within temporary storage area 205, an image/video detected showing a change within temporary storage area 205, light detected within temporary storage area 205, a particular chemical detected within temporary storage area 205, a force or impact or change in weight detected relative to what is stored within temporary storage area 205). Such a third wireless accessory sensor node in this further embodiment is operative to detect the change in state of the temporary storage area 205 based upon third sensor data generated by the third sensor; record third timestamped information reflecting the detected change in state of the temporary storage area 205; and broadcast a third updated advertising signal having a third data available flag set within the third updated advertising signal. Such a third data available flag indicates the third wireless accessory sensor node has third event information available for upload by the bridge node 200 and where such third event information includes at least the third timestamped information reflecting the detected change in state of the temporary storage area 205. In this further embodiment involving such a third wireless accessory sensor node, bridge node processor 201 is further operative to detect, using the short-range communication interface 203*b*, at least one of (a) the first data available flag set within the first updated advertising signal, (b) the second data available flag set within the second updated advertising signal, and (c) the third data available flag set within the third updated advertising signal. The bridge node processor 201 is then operative to use interface 203*b* to responsively download event information from at least one of the first, second, or third wireless accessory sensor nodes based upon which of the first data available flag set and the second data available flag set and the third data available flag set is detected. Such downloaded/retrieved event information includes the first event information when the first data available flag set is detected, includes the second event information when the second data available flag is detected, and includes the third event information when the third data available flag is detected. Thereafter, bridge node processor 201 is further operative to use interface 203*a* to transmit the retrieved event information to backend server 100 to cause backend server 100 to initiate the dispatched logistics operation related to the storage receptacle based upon at least one of the first event information, the second event information, and the third event information.

Similar to embodiments described above, the different wireless accessory sensor nodes may use different types of sensors as described above, and use such different types of sensors to validate any detected change in state of particular components of receptacle 150 (e.g., using detected light within temporary storage area 205 to validate a detected change in state of entrance opening 155).

Likewise, those skilled in the art will appreciate that this embodiment of a multiple wireless accessory sensor node implementation of an enhanced connected logistics receptacle may utilize the type of bridge node activity timing during a reporting period shown in FIGS. 6A-6D when the system's bridge node 200 may detect one or more different flags set from one or more of the system's different wireless accessory sensor nodes. For example, bridge node 200 may wake from a low power state at a predetermined time of day, and detect a data available flag set within at least one of the first updated advertising signal and the second updated advertising signal over the short-range communication interface. Such detections may, for example, occur at the beginning of bridge node 200's reporting period, more than once during the reporting periods where bridge node 200 then transmits retrieved event information to backend server 100 each time event information from any of the wireless accessory sensor nodes is retrieved, more than once during the reporting period where bridge node 100 may retrieve event information after each detection or towards the end of the reporting period and only transmit accumulated event information to backend server 100 (rather after each detection/retrieval).

In more detailed embodiments of such a multiple wireless accessory sensor node implementation of an enhanced connected logistics receptacle, the sensor used on different wireless accessory sensor nodes may have multiple sensor elements (e.g., focusing on different areas, using different types of sensing elements, using different sensitivity of sensing elements, and the like). For example, the first sensor used on wireless accessory sensor node 210 may be implemented with multiple sensor elements for monitoring different types of changes in the state of the entrance opening 155. In more detail, such sensor elements may, for example, include a light sensor element operative to monitor a change relative to light within the storage receptacle 150 as one of the different types of changes in the state of the entrance opening 155; and a motion sensor element operative to monitor a change relative to motion within the storage receptacle 150 as one of the different types of changes in the state of the entrance opening 155. In another example, the first sensor used on wireless accessory sensor node 210 may be implemented with multiple wireless sensor elements disposed on different parts of the storage receptacle 150, where each of such wireless sensor elements monitor different types of changes in the state of the entrance opening 155 (e.g., a wireless light sensor element operative to monitor a change relative to light within the storage receptacle 150 as one of the different types of changes in the state of the entrance opening 155; and a wireless motion sensor element operative to monitor a change relative to motion within the storage receptacle 150 as one of the different types of changes in the state of the entrance opening 155.

In still another example, the second sensor used on wireless accessory sensor node 240 may be implemented with multiple sensor elements for monitoring different types of changes in the state of the selectively accessible retrieval door 160 of the storage receptacle 150 (e.g., where such sensor elements include at least two of a magnetic sensor element operative to monitor a change relative to a location of the selectively accessible retrieval door 160, a light sensor element operative to monitor a change relative to light within the storage receptacle 150 as one of the different types of changes in the state of the selectively accessible retrieval door 160 of the storage receptacle 150, and a motion sensor element operative to monitor a change relative to motion of the selectively accessible retrieval door 160 as one of the different types of changes in the state of the selectively accessible retrieval door 160 of the storage receptacle 150).

In another example, the second sensor may be implemented as multiple wireless sensor elements (e.g., similar to sensor 450*e*) disposed on different parts of the storage receptacle 150 where each of the wireless sensor elements monitor different types of changes in the state of the selectively accessible retrieval door 160. Such wireless sensor elements used for the second sensor in this example may include at least two of a wireless magnetic sensor element operative to monitor a change relative to a location of the selectively accessible retrieval door 160; a wireless light sensor element operative to monitor a change relative to light within the storage receptacle 150 as one of the different types of changes in the state of the selectively accessible retrieval door 160; and a wireless motion sensor element operative to monitor a change relative to motion of the selectively accessible retrieval door 160 as one of the different types of changes in the state of the selectively accessible retrieval door 160 of the storage receptacle 150.

In yet another example, the third sensor used with one of the wireless accessory sensor nodes managing sensors that monitor temporary storage area 205 of receptacle 150 may be implemented with multiple sensor elements for monitoring different types of changes in the state of the temporary storage area 205 (e.g., a scale/force sensor element operative to monitor an impact force or change relative to a weight of contents maintained in temporary storage area 205; a motion sensor element operative to monitor a change relative to motion detected within the temporary storage area 205; a light sensor element operative to monitor a change relative to light within the storage receptacle 150 as one of the different types of changes in the state of the temporary storage area 205; an image sensor element operative to monitor what is located within the temporary storage area 205; a chemical sensor element operative to detect a chemical within the storage receptacle as one of the different types of changes in the state of the temporary storage area of the storage receptacle). Such a third sensor may be implemented (similar to that described above) using wireless sensor elements disposed on different part of the storage receptacle 150 (e.g., a wireless scale sensor element operative to monitor a change relative to a weight of contents maintained in the temporary storage area 205; a wireless motion sensor element operative to monitor a change relative to motion detected within the temporary storage area 205; a wireless light sensor element operative to monitor a change relative to light within the storage receptacle 150 as one of the different types of changes in the state of the temporary storage area 205; a wireless image sensor element operative to monitor what is located within the temporary storage area 205; and a wireless chemical sensor element operative to detect a particular chemical (such as a gaseous vapor) within the storage receptacle 150 as one of the different types of changes in the state of the temporary storage area 205).

In yet another more detailed embodiment of a multiple wireless accessory sensor node implementation of an enhanced connected logistics receptacle, further advantageous system operations may occur when one of the wireless accessory sensor nodes detects a pickup event prior to a drop off time for the storage receptacle 150. In such an embodiment, memory 202 of bridge node 200 maintains information on a drop-off threshold time value for receptacle 150 that may be referenced and used during operation of bridge node 200. For example, an embodiment may have bridge node processor 201 being further operative to (a) determine the retrieved event information indicates a detected change in state of the selectively accessible retrieval door 160 is a pickup event occurring before a drop off threshold time for the receptacle 150, (b) use the short-range communication interface 203*b* to detect a subsequent first data available flag set within another first updated advertising signal, (c) responsively download additional first event information available for upload from a wireless accessory sensor node where the additional first event information includes additional first timestamped information reflecting an additional change in state of the entrance opening 155 before the drop off threshold time, and (d) use the long-range communication interface 203*a* to transmit the retrieved event information to the backend server 100 to cause the backend server to initiate the dispatched logistics operation related to the storage receptacle.

In some embodiments, such a system may include the backend server as part of the system—e.g., where the enhanced connected logistics receptacle system may include the storage receptacle, a bridge node disposed as part of the storage receptacle, one or more wireless accessory sensor nodes (each having at least one sensor), and the backend server as express elements of such a system. In such a system embodiment, the backend server (e.g., backend server 100) more specifically initiates the dispatched logistics operation by being further operative to reactively dispatch a logistics asset to the storage receptacle for pickup of at least the delivery item (e.g., package 170) from within the storage receptacle 150 as at least part of the dispatched logistics operation.

In even more detail, an exemplary system may further include a mobile node operated by the logistics asset (e.g., a wireless-capable tablet, a handheld mobile cellular phone, or some other mobile communication device used by logistics personnel operating delivery vehicle 700*a*). As such, an example may have the backend server being operative to dispatch the logistics asset to the storage receptacle for pickup of at least the delivery item by being further operative to transmit a pickup message to the mobile node where the pickup message identifies the storage receptacle for the dispatched logistics operation. In another example, the backend server is operative to responsively initiate the dispatched logistics operation by being further operative to transmit a pickup message to the mobile node operated by the logistics asset, but where the pickup message identifies the storage receptacle for the dispatched logistics operation and alters a previously scheduled dispatch operation related to that storage receptacle as the dispatched logistics operation.

In yet another embodiment, backend server may initiate or otherwise assign a different logistics asset for the operation (rather than dispatching an originally scheduled logistics asset). For example, an exemplary system having the backend server as an element may further include a first mobile node operated by a first logistics asset previously responsible for performing the dispatched logistics operation (e.g., a mobile handheld phone operated by a courier in delivery vehicle 700*a*), and a second mobile node operated by a second logistics asset (e.g., another mobile handheld phone operated by a courier in a different delivery vehicle 700*b*). With these two different mobile nodes involved, the backend server in this embodiment is operative to responsively initiate the dispatched logistics operation by being further operative to assess the retrieved event information to determine a change in the dispatched logistics operation, transmit a pickup message to the second logistics asset to initiate the dispatched logistics operation related to the storage receptacle, and then transmit a notification message to the first logistics asset regarding the change in the dispatched logistics operation.

In a further embodiment, such an exemplary system may be more of a retro-fit or refit type of system that upgrades or otherwise enhances an existing logistics storage receptacle, which has at least an entrance opening (e.g., entrance opening 155) for receiving a delivery item (e.g., package 170), a temporary storage area (e.g., area 205) for temporarily maintaining the delivery item once deposited with the storage receptacle, and a retrieval door (e.g., door 160) providing selective access to the temporary storage area. In more detail, where such enhanced connected logistics receptacle system may be deployed on an existing storage receptacle, the exemplary system includes a bridge node (e.g., bridge node 200) mounted to the storage receptacle and a wireless accessory sensor node that monitors for a change in state of the storage receptacle. In such a retrofit system embodiment, the wireless accessory sensor node may include multiple sensors, such as a first sensor disposed on the storage receptacle for monitoring the entrance opening, a second sensor disposed on the storage receptacle for monitoring the temporary storage area, and a third sensor disposed on the storage receptacle for monitoring the retrieval door. As such, the system's wireless accessory sensor node is operative to detect the change in state of the storage receptacle based upon sensor data generated by the at least one of the first of the sensors, the second of the sensors, and the third of the sensors; record timestamped information reflecting the detected change in state of the storage receptacle; and broadcast an updated advertising signal having a data available flag set within the updated advertising signal. Such a data available flag indicates the system's wireless accessory sensor node has event information available for upload by the bridge node, and where the event information includes at least the timestamped information reflecting the detected change in state of the storage receptacle. The bridge node, through its programmable processor when executing bridge node code maintained on the bridge node memory (e.g., CLR control and management code 315) is operative to detect the data available flag set within the updated advertising signal over the short-range communication interface, retrieve the event information available for upload from the wireless accessory sensor node using the short-range communication interface, and transmit (using the long-range communication interface 203*a*) the retrieved event information to the backend server to cause the backend server to initiate the dispatched logistics operation related to the storage receptacle.

Such different sensors used with this embodiment's wireless accessory sensor node may be implemented as onboard, wired, or wirelessly connected types of sensors (similar to the exemplary types of sensors 450*a*-450*e* shown in FIG. 4). For example and consistent with what is shown in FIG. 2, the first sensor monitoring the entrance opening of the storage receptacle may be implemented as one or more of a motion sensor detecting a change in motion of the entrance opening as the change in state of the storage receptacle; a motion sensor detecting movement of what is received through the entrance opening as the change in state of the storage receptacle; an accelerometer detecting a change in motion of the entrance opening as the change in state of the storage receptacle; or a magnetic sensor detecting a change in position of the entrance opening as the change in state of the storage receptacle. The second sensor monitoring the temporary storage area may be implemented as one or more of a motion sensor detecting motion within the temporary storage area as the change in state of the storage receptacle; an image sensor detecting a change of what is stored within the temporary storage area as the change in state of the storage receptacle; a scale disposed at a bottom of the temporary storage area, the scale detecting a change in weight of what is stored within the temporary storage area as the change in state of the storage receptacle; a force sensor disposed within the temporary storage area, the force sensor detecting an impact force related to a change in what has been deposited within the temporary storage area as the change in state of the storage receptacle; and a light sensor detecting a change in light within the temporary storage area as the change in state of the storage receptacle. The third sensor monitoring the selectively accessible retrieval door may be implemented as one or more of a motion sensor detecting a change in motion of the selectively accessible retrieval door as the change in state of the storage receptacle; a magnetic sensor detecting a change in position of the selectively accessible retrieval door as the change in state of the storage receptacle; a lock sensor detecting a change in a locked status of the selectively accessible retrieval door as the change in state of the storage receptacle; a range sensor detecting a change in what has been placed within a predetermined range of the storage receptacle as the change in state of the storage receptacle; and an external motion sensor detecting a change in what has been placed within the predetermined range of the storage receptacle as the change in state of the storage receptacle.

Figure 9A:
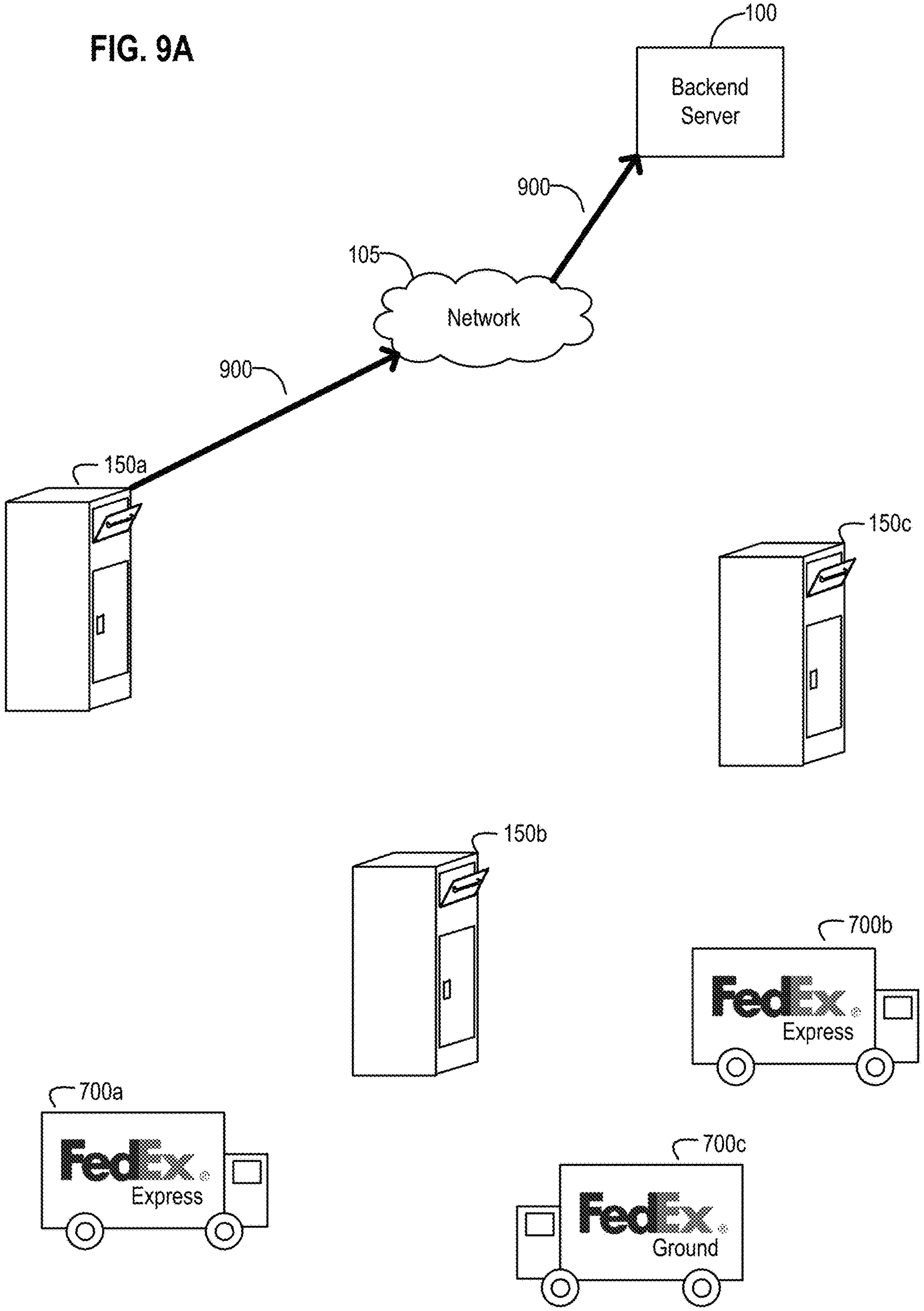
FIGS. 9A-9E are a series of diagrams of an exemplary backend server responding to receipt of retrieved event information from a bridge node in an exemplary connected logistics receptacle where the backend server initiates enhanced responses relative to the reporting exemplary connected logistics receptacle and/or relative to additional exemplary connected logistics receptacles in accordance with an embodiment of the invention.
Figure 9B:
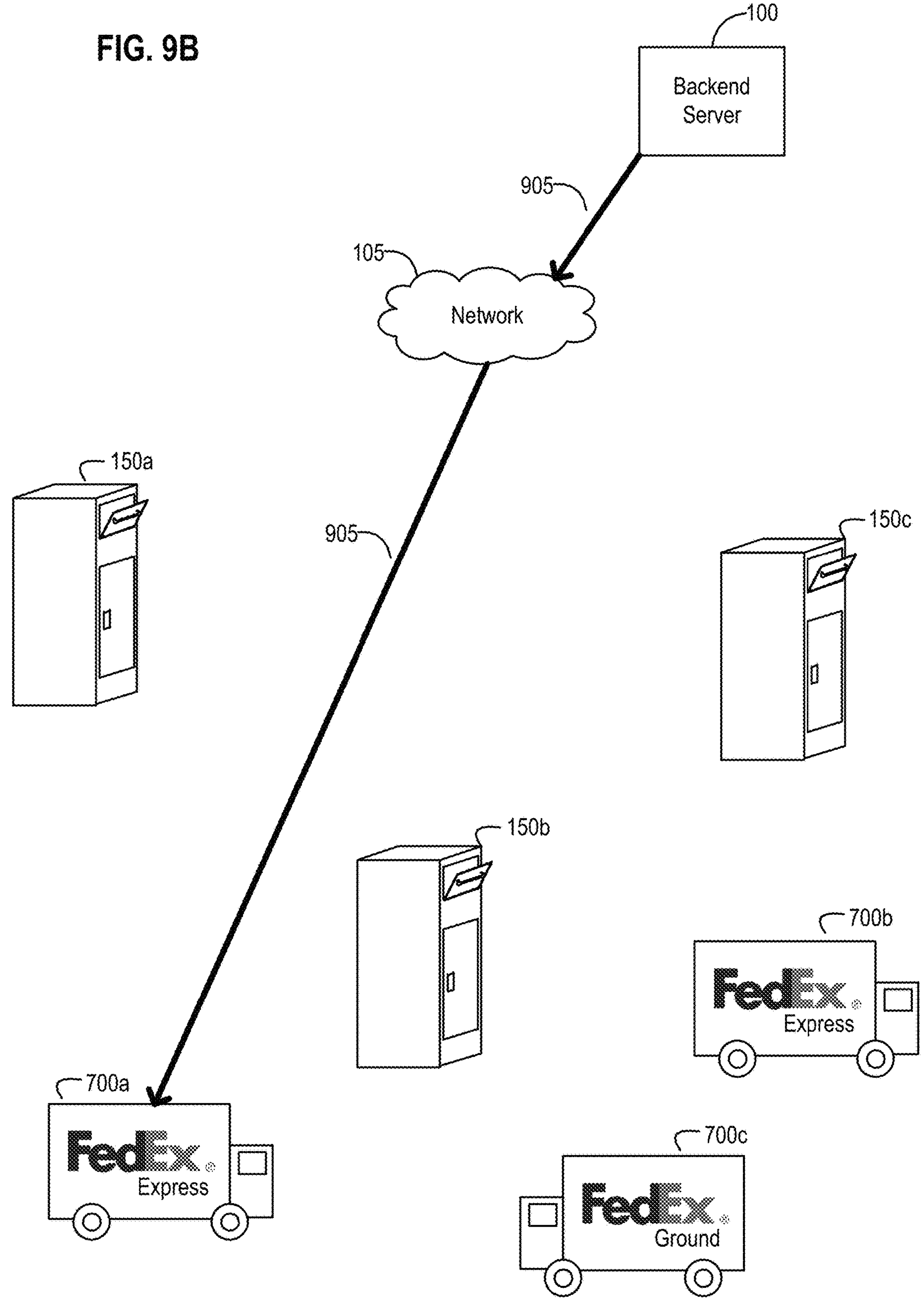
Figure 9C:
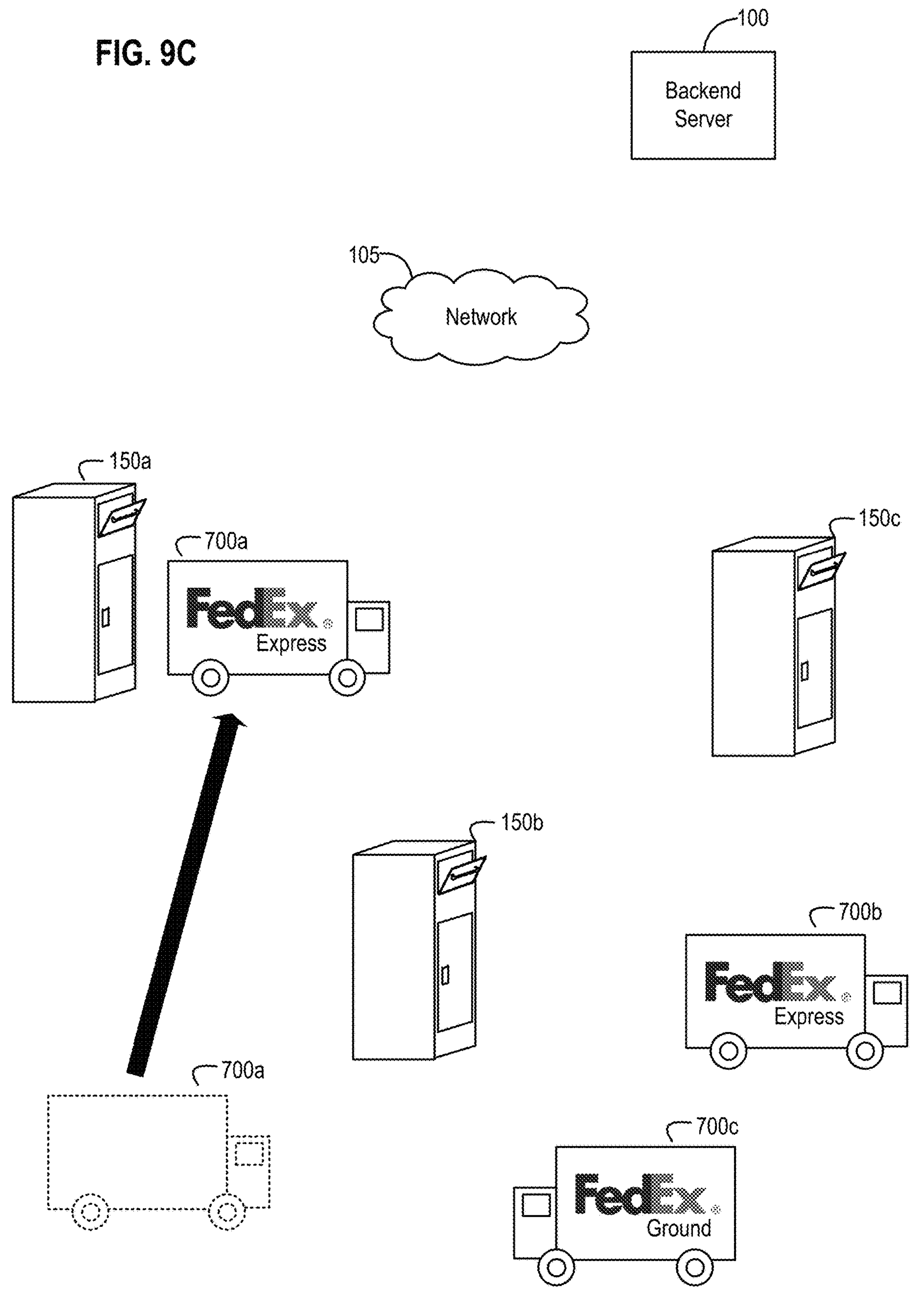

Enhanced Backend Server Response with Different Types of Initiated Logistics Ops Further embodiments with an exemplary connected logistics receptacle (e.g., receptacle 150) involve an expanded or enhanced backend server response when receiving retrieved event information from a particular connected logistics receptacle. For example, when one connected logistics receptacle (e.g., storage receptacle 150*a*) transmits retrieved event information to backend server 100, backend server 100 may be programmatically configured to be operative so as to cause or otherwise initiate a further dispatched logistics operation related to one or more additional storage receptacles (e.g., storage receptacles 150*b*, 150*c*). Generally, initiating a further dispatched logistics operation related to an additional storage receptacle (not the reporting storage receptacle) may be referred to as a triggered sweep. In other words, what triggers such a further dispatched logistics operation for that additional connected logistics receptacle is not the additional receptacle involved in such a further dispatched logistics operation. As explained in more detail below, further embodiments may set out that the basis for such a triggered sweep may, for example, include exceeding a threshold occupied level for the reporting storage receptacle; detecting or identifying an overflow condition that is found to exist for the reporting storage receptacle; or detecting a change in a historic use pattern for the reporting storage receptacle FIGS. 9A-9E are a series of diagrams of an exemplary backend server (e.g., server 100) responding to receipt of retrieved event information from a bridge node in an exemplary connected logistics receptacle where the backend server initiates one or more enhanced responses relative to the reporting exemplary connected logistics receptacle and/or relative to additional exemplary connected logistics receptacles in accordance with an embodiment of the invention. Referring now to FIG. 9A, backend server 100 is illustrated that may be in communication with different storage receptacles (e.g., exemplary connected logistics receptacles 150*a*-150*c*) over network 105 as well as with different exemplary logistics assets 700*a*-700*c*. As shown in FIG. 9A, exemplary backend server 100 is shown as part of an exemplary system where backend server 100 receives a message 900 of transmitted information (e.g., retrieved event information) from a reporting exemplary connected logistics receptacle 150*a* over network 105. Exemplary backend server 100 in this embodiment may respond by initiating a dispatched logistics operation involving the reporting exemplary connected logistics receptacle 150*a* and/or may respond by initiating a further dispatched logistics operation involving an additional exemplary connected logistics receptacle (e.g., one or more of receptacles 150*b*, 150*c*). For example, as shown in FIG. 9B, backend server 100 may respond with a dispatch message 905 transmitted to logistics asset 700*a* to initiate a pickup operation for reporting receptacle 150*a*. Then, as shown in FIG. 9C, logistics asset 700*a* responds to this dispatch message 905 by moving to the vicinity of receptacle 150*a* so that logistics personnel (e.g., a courier operating a delivery vehicle operating as logistics asset 700*a*) can pick up a package or other parcel delivery item from receptacle 150*a*.

Figure 9D:
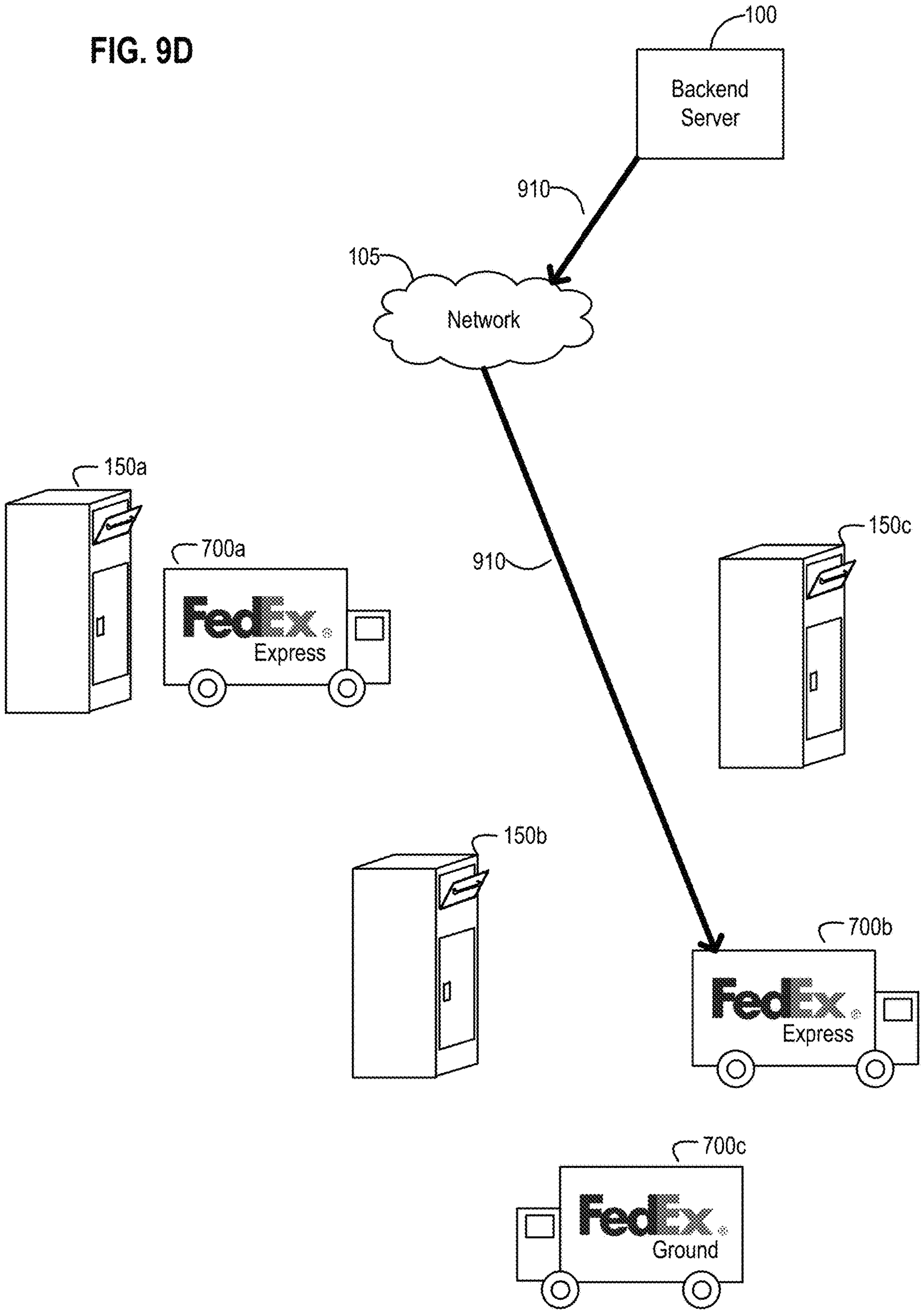
Figure 9E:
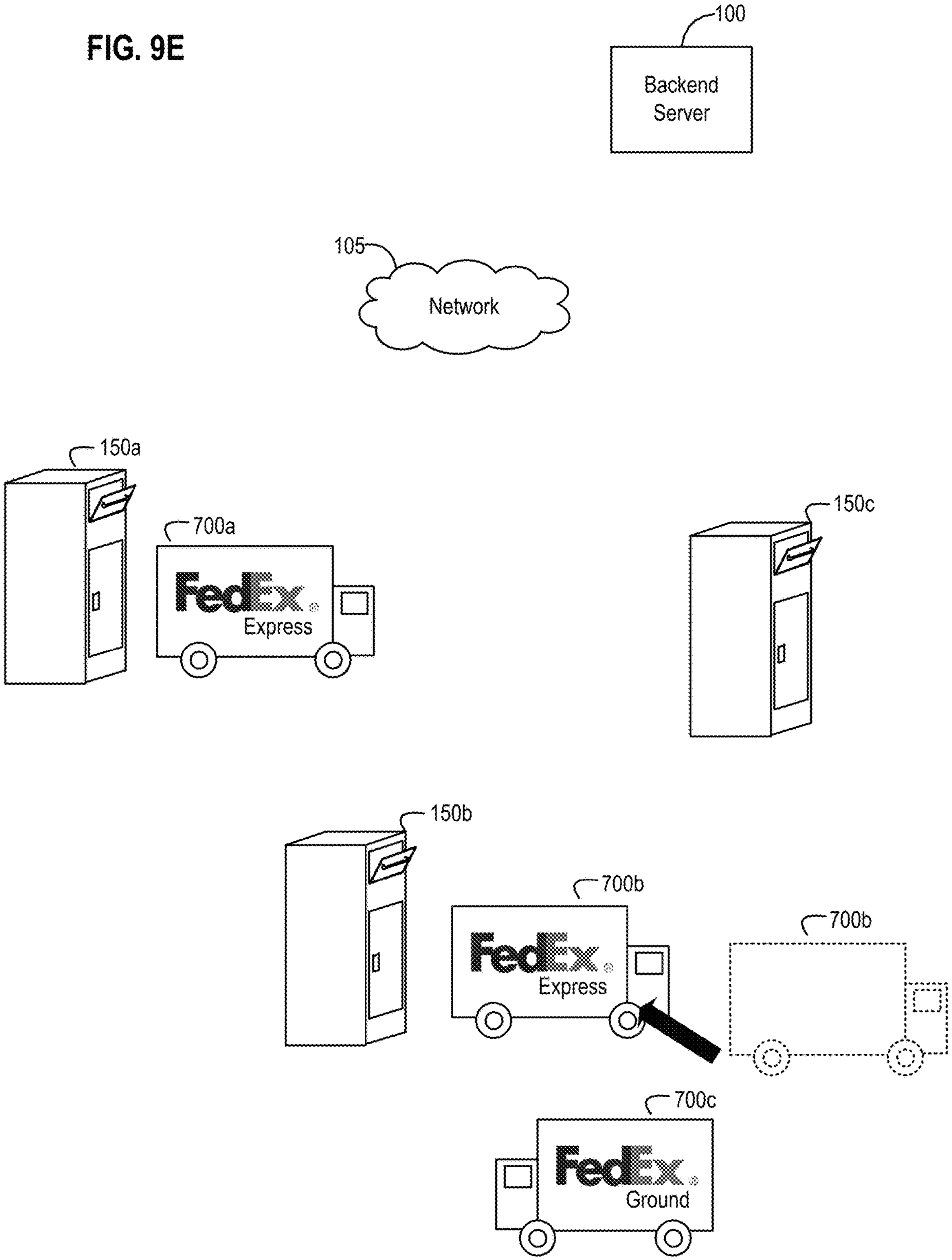

In this example, as shown in FIG. 9D, backend server 100 may respond with a triggered sweep dispatch message 910 transmitted to logistics asset 700*b* to initiate a further dispatched logistics operation for one or more non-reporting receptacles (such as receptacle 150*b*). As a result, and as shown in FIG. 9E, logistics asset 700*b* responds to this dispatch message 910 by moving to the vicinity of receptacle 150*b* so that logistics personnel (e.g., a courier operating a delivery vehicle operating as logistics asset 700*b*) can conduct the triggered sweep operation to pick up what may be in receptacle 150*b*. In some embodiments, the further dispatched logistics operation may be conducted by other logistics assets (e.g., asset 700*b*), but in other embodiments the further dispatched logistics operation may be conducted by the logistics asset that serviced the reporting receptacle 150*a*. Additionally, in some embodiments backend server 100 may simply initiate the triggered sweep dispatched logistics operation of one or more non-reporting connected logistics receptacles (e.g., receptacles 150*b*, 150*c*) in response to receiving the retrieved event information in message 900.

In more detail and with reference to the illustrations of FIGS. 9A-9E, an embodiment of an enhanced system for receiving and temporarily maintaining package 170 as a delivery item and responsively initiating one or more dispatched logistics operations has such a system including a backend server (e.g., server 100), a bridge node mounted to a storage receptacle (e.g., bridge node 200 in exemplary storage receptacle 150 or receptacle 150*a*), and a wireless accessory sensor node (e.g., wireless accessory sensor node 210) using at least one sensor to monitor for a change in the state of the storage receptacle. The system's wireless accessory sensor node is programmatically adapted to be operative to detect the change in state of the storage receptacle based upon sensor data generated by the at least one sensor, record timestamped information reflecting the detected change in state of the storage receptacle, and broadcast an updated advertising signal having a data available flag set within the updated advertising signal. In this embodiment, the data available flag indicates the wireless accessory sensor node has event information available for upload by the bridge node and where such event information includes at least the timestamped information reflecting the detected change in state of the storage receptacle. Similar to embodiments described above, the bridge node processor in the system's bridge node, when executing the bridge node code maintained on the bridge node memory (e.g., CLR control and management code 315), is programmatically adapted so to be operative to detect the data available flag set within the updated advertising signal over the short-range communication interface, retrieve the event information available for upload from the wireless accessory sensor node using the short-range communication interface, and transmit the retrieved event information to the backend server using the long-range communication interface.

In this particular embodiment, the system's backend server, in response to receiving the retrieved event information from the bridge node, is operative to reactively dispatch a logistics asset to the reporting storage receptacle for pickup of at least the delivery item from within the storage receptacle as the dispatched logistics operation initiated by the bridge node. For example, as shown in FIGS. 9B and 9C, backend server 100 reactively dispatches logistics asset 700*a* to reporting storage receptacle 150*a* for pickup of a delivery item (e.g., package 170) from within receptacle 150*a*. However, as an enhancement in this particular embodiment, the system's backend server is also operative to initiate a further dispatched logistics operation related to one or more additional storage receptacles managed by the backend server. For example, as shown in FIGS. 9D and 9E, backend server 100 is operative to dispatch a logistics asset (such as logistics asset 700*b*) to one or more additional storage receptacles (e.g., receptacle 150*b*) managed by backend server 100.

In more detail, the basis for triggering such a sweep of other receptacles may involve reaching a threshold occupied level within the reporting storage receptacle. Such a threshold occupied level for a particular storage receptacle may be maintained as threshold data maintained in memory storage 305 of bridge node 200. That data identifies a particular threshold occupied level for the particular storage receptacle (e.g., pre-defined for the particular storage receptacle or a value for the threshold occupied level that is dynamically set by either the bridge node or tuned by the backend server). Once identified/detected as being reached, the existence of such a threshold occupied level being reached allows for responsive actions (such as triggering sweeps of other storage receptacles), which may be taken in light of this condition of the reporting storage receptacle.

For example, an embodiment may have backend server 100 being further operative to determine whether the retrieved event information received from the bridge node indicates a threshold occupied level exists within the reporting storage receptacle, which then allows backend server 100 to initiate the further dispatched logistics operation with the other additional storage receptacles when the retrieved event information received from the bridge node indicates or reflects that the threshold occupied level exists within the storage receptacle. In some embodiments, the bridge node may send an indicator that the threshold occupied level exists as part of the event information transmitted to the backend server. In other embodiments, backend server 100 may maintain threshold occupied level information within management profile 835 and use that information along with the received event information from the reporting storage receptacle to determine whether the retrieved event information received from the bridge node indicates that a threshold occupied level exists within the reporting storage receptacle.

Sensor data generated by the sensor on the wireless accessory sensor node may be used from the retrieved event information as indicating the threshold occupied level within the reporting storage receptacle. Such sensor data may include, for example, sensor data generated by an image sensor within the temporary storage area 205 where the images sensor detects a change in what is stored within the temporary storage area 205 as the change in state of reporting receptacle 150. In another example, the sensor data is generated by a scale as a sensor on the wireless accessory sensor node, where the scale is disposed at a bottom of the temporary storage area 205 and detects a change in weight of what is stored within the temporary storage area 205 as the change in state of reporting receptacle 150. In another example, the sensor data is generated by a force sensor as the sensor on the wireless accessory sensor node, where the force sensor detecting an impact related to what has been deposited within the temporary storage area 205 as the change in state of reporting receptacle 150. In still another example, the sensor data is generated by a motion sensor on the wireless accessory sensor node, where the motion sensor detects (a) a change in motion of the entrance opening 155 and (b) a failure to return to a prior state of the entrance opening 155 (where (a) and (b) reflect the change in state of the reporting storage receptacle 150). In a further example, the sensor data is generated by a status sensor on the wireless accessory sensor node, where the status sensor detects (a) a change in orientation of the entrance opening 155 and (b) a failure to return to a prior state of the entrance opening 155 (where (a) and (b) reflect the change in state of the reporting storage receptacle 150).

In further embodiments involving a threshold occupied level, the retrieved event information received from the bridge node and transmitted to backend server 100 is related to multiple types of sensor data generated by the wireless accessory sensor node in the reporting storage receptacle 150. For example, such types of sensor data may include at least two from a group consisting of motion data, image data, orientation data, weight data, and force data.

While the above description focuses on using a threshold occupied level within the reporting storage receptacle as a possible basis for triggering such a sweep of other receptacles, additional embodiments may involve the detection of an overflow condition within the reporting storage receptacle. Such an overflow condition for a particular storage receptacle may be defined by and maintained as another type of threshold data maintained in memory storage 305 of bridge node 200. That data identifies a particular overflow condition for the particular storage receptacle (e.g., a predefined or predetermined condition or a value that is dynamically set by either the bridge node or selectively tuned by the backend server). Once the overflow condition exists, the existence of such an overflow condition for the reporting storage receptacle allows for responsive actions (such as triggering sweeps of other storage receptacles), which may be taken in light of this condition of the reporting storage receptacle.

In such an additional embodiment, backend server 100 is further operative to determine whether the retrieved event information received from the bridge node indicates an overflow condition exists within the reporting storage receptacle 150, which then allows backend server 100 to initiate the further dispatched logistics operation with the other additional storage receptacles when the retrieved event information received from the bridge node indicates or reflects that the overflow condition exists within the storage receptacle. In some embodiments, the bridge node may send an indicator that the overflow condition exists as part of the event information transmitted to the backend server. In other embodiments, backend server 100 may maintain overflow condition information within management profile 835 and use that information along with the received event information from the reporting storage receptacle (e.g., sensor data related to the change in state of the reporting storage receptacle) to determine whether the retrieved event information received from the bridge node indicates that an overflow condition exists within the reporting storage receptacle.

Sensor data generated by the sensor on the wireless accessory sensor node may be used from the retrieved event information as indicating the overflow condition within the reporting storage receptacle. Such sensor data may include, for example, sensor data generated by an external motion sensor on the wireless accessory sensor node, where the external motion sensor detects a change in what has been placed within a predetermined range of the reporting storage receptacle 150 as the change in state of the storage receptacle; sensor data generated by a proximity sensor on the wireless accessory sensor node, where the proximity sensor detects a change in what has been placed within a predetermined range of the reporting storage receptacle 150 as the change in state of the reporting storage receptacle 150; sensor data generated by an image sensor on the wireless accessory sensor node, where the image sensor detects a change of what is stored within the temporary storage area 205 as the change in state of the reporting storage receptacle 150; sensor data generated by an image sensor on the wireless accessory sensor node, where the image sensor detects a change of what has been placed within a predetermined range of the reporting storage receptacle 150 as the change in state of the reporting storage receptacle 150; sensor data generated by a scale as the sensor on the wireless accessory sensor node, where the scale is disposed at a bottom of the temporary storage area 205 and detects a change in weight of what is stored within the temporary storage area 205 as the change in state of the reporting storage receptacle 150; and sensor data generated by a force sensor on the wireless accessory sensor node, where the force sensor detects an impact related to what has been deposited within the temporary storage area 205 as the change in state of the reporting storage receptacle 150. In a further example, sensor data is generated by a motion sensor on the wireless accessory sensor node, where the motion sensor detects (a) a change in motion of the entrance opening 155 and (b) a failure to return to a prior state of the entrance opening 155 (where (a) and (b) reflect the change in state of the reporting storage receptacle 150). In still another example, the sensor data is generated by a status sensor on the wireless accessory sensor node, where the status sensor detects (a) a change in orientation of the entrance opening 155 and (b) a failure to return to a prior state of the entrance opening 155 (where (a) and (b) reflect the change in state of the reporting storage receptacle 150).

In further embodiments involving an overflow condition, the retrieved event information received from the bridge node and transmitted to backend server 100 is related to multiple types of sensor data generated by the wireless accessory sensor node in the reporting storage receptacle 150. For example, such types of sensor data may include at least two from a group consisting of motion data, proximity data, image data, force data, and weight data.

Aside from embodiments described above that use a threshold occupied level or overflow condition within the reporting storage receptacle as a possible basis for triggering such a sweep of other receptacles, additional embodiments may involve a change in historic use pattern for the reporting storage receptacle as a basis for triggering such a sweep of other storage receptacles. In more detail, an additional embodiment may have backend server 100 being further operative to detect a threshold change in a server-tracked historic use pattern for the reporting storage receptacle based at least upon the retrieved event information received from the bridge node. As such, when the backend server detects the threshold change in the server-tracked historic use pattern for the reporting storage receptacle, the backend server is also operative to initiate the further dispatched logistics operation related to the one or more additional storage receptacles. In this example, such a server-tracked historic use pattern for the reporting storage receptacle may be implemented as a profile identifying a pattern of use of the reporting storage receptacle as maintained on the backend server (e.g., part of management profile 835). In more detail, the profile identifying the pattern of use of the reporting storage receptacle may, for example, be a pattern of delivery events for the reporting storage receptacle and/or a pattern of pickup events for the reporting storage receptacle. In a further example, the profile identifying the pattern of use of the reporting storage receptacle may be a threshold occupancy pattern profile identifying a frequency of reaching a threshold occupied level within the reporting storage receptacle; or an overload pattern profile identifying a frequency of reaching an overload condition for the reporting storage receptacle.

Still further embodiments may use a historic use profile maintained by the bridge node 200 on the reporting storage receptacle, and information in that profile may be used as a basis for triggering such a sweep of other receptacles. In one example, the bridge node memory in a system's bridge node 200 may store and maintain a historic use profile (e.g., a historic use profile stored as part of historic use information 327 on bridge node 200), which identifies a pattern of use of the reporting storage receptacle. In this example, the retrieved event information transmitted to the backend server 100 (that causes the backend server 100 to initiate the further dispatched logistics operation related to one or more additional storage receptacles) indicates a change in the historic use pattern for the reporting storage receptacle as tracked by the bridge node. In more detail in such an example, bridge node processor 201 may be further operative to compare the retrieved event information with the historic use pattern for the reporting storage receptacle as indicated in the history use profile, and detect the change in the historic use pattern for the reporting storage receptacle based upon the comparison of the retrieved event information with the historic use pattern for the reporting storage receptacle. In such an example, bridge node processor 201 may further update the historic use profile in bridge node memory 202 based upon the retrieved event information in response to detecting the change in the historic use pattern for the reporting storage receptacle.

Such a historic use profile may be implemented, for example, with information on a pattern of delivery events for the reporting storage receptacle as logged by the bridge node 200 and based upon sensor data generated by at least one sensor of the wireless accessory sensor node in the reporting storage receptacle. In another embodiment, the historic use profile is implemented with information on a pattern of pickup events for the reporting storage receptacle as logged by the bridge node 200 and based upon sensor data generated by at least one sensor of the wireless accessory sensor node in the reporting storage receptacle. In still another embodiment, the historic use profile may be implemented with information on a threshold occupancy pattern profile identifying a frequency of reaching a threshold occupied level within the reporting storage receptacle as logged by the bridge node 200 and based upon sensor data generated by at least one sensor of the wireless accessory sensor node in the reporting storage receptacle. In yet another embodiment, the historic use profile may be implemented with information defining an overload pattern profile identifying a frequency of reaching an overload condition for the reporting storage receptacle as logged by the bridge node 200 and based upon sensor data generated by at least one sensor of the wireless accessory sensor node in the reporting storage receptacle.

In a further embodiment of such a system with enhanced dispatching related to other storage receptacles, backend server 100 may reactively dispatch a logistics asset to the reporting storage receptacle for pickup of an item from within the reporting storage receptacle as the dispatched logistics operation in a variety of ways. For example, backend server 100 may be programmatically adapted and operative to transmit a pickup message to a mobile node operated by the logistics asset (where the pickup message identifies the reporting storage receptacle for the dispatched logistics operation); alter a previously scheduled dispatch operation related to the reporting storage receptacle as the dispatched logistics operation; or by a combination of transmitting a schedule alteration message to a mobile node operated by the logistics asset and then transmitting a pickup message to an alternative logistics asset as the dispatched logistics operation related to the reporting storage receptacle (where the alternative logistics asset is different than the logistics asset originally scheduled for the dispatched logistics operation related to the reporting storage receptacle.

As noted in embodiments described above, sensor data may be used to detect a change in motion/orientation of a component on the storage receptacle (such as entrance opening 155 or door 160) and a failure for that component to return to a prior state of that component as a type of detected change in state of the storage receptacle. When retrieval door 160 fails to return to its prior state (e.g., a closed state where the storage receptacle is secure), a further embodiment may have backend server 100 operative to reactively dispatch the logistics asset to the reporting storage receptacle as the dispatched logistics operation by being operative to determine a fault condition exists on the storage receptacle based upon the retrieved event information received from the bridge node, and generate a fault condition alert message to the logistics asset identifying the fault condition. In more detail, the fault conditions exist on the reporting storage receptacle when the retrieved event information received from the bridge node 200 of that reporting storage receptacle indicates a change in motion and/or orientation of retrieval door 600 and a failure to return to a prior state of the retrieval door 600 on that reporting storage receptacle. Examples of such a fault condition alert message transmitted by backend server 100 to the logistics asset identifies the fault condition as an unsecured state of the retrieval door and may expressly prompt or otherwise request the logistics asset secure the retrieval door on that reporting storage receptacle.

While some embodiments of an enhanced system for receiving and temporarily maintaining a delivery item relative to a reporting storage receptacle and responsively initiating one or more dispatched logistics operations may include responsive operations relative to both the reporting storage receptacle and one or more other non-reporting storage receptacle(s), a further embodiment may focus more with details on responding with a triggered sweep dispatched logistics operation for such non-reporting storage receptacles. In such a further embodiment, the system may involve a backend server (e.g., exemplary backend server 100) and monitoring and reporting electronics involved with and disposed relative to a first storage receptacle (e.g., exemplary connected logistics receptacle 150*a*). Such electronics in this exemplary system include a bridge node (e.g., exemplary bridge node 200) mounted to that storage receptacle and a wireless accessory sensor node (e.g., any of exemplary wireless accessory sensor nodes 210, 215, 220, 225, 230, 235, 240, 245, and/or 250) disposed relative to that first storage receptacle having at least one sensor that monitors for a change in the state of that first storage receptacle. The system's wireless accessory sensor node is programmatically adapted so as to be operative to detect the change in state of the first storage receptacle based upon sensor data generated by the sensor(s); record timestamped information (e.g., exemplary timestamped information 425) reflecting the detected change in state of the storage receptacle; and broadcast an updated advertising signal having a data available flag set within the updated advertising signal. The data available flag in such an updated advertising signal indicates the wireless accessory sensor node has event information available for upload by bridge node 200. Such event information to be uploaded by bridge node 200 includes at least the timestamped information reflecting the detected change in state of the first storage receptacle and may also include sensor data (e.g., exemplary sensor data 420) and/or state information on the detected change in state (e.g., exemplary state information 430). In the system's bridge node 200, exemplary bridge node processor 201, when executing the bridge node code maintained on the bridge node memory (e.g., CLR control and management code 315), is operative to detect the data available flag set within the updated advertising signal over the short-range communication interface 203*b*, retrieve the event information available for upload from the wireless accessory sensor node using the short-range communication interface 203*b*, and then use long-range communication interface 203*a* to transmit the retrieved event information to the backend server 100. In response to receiving the retrieved event information from the bridge node 200, backend server 100 in this system embodiment is operative to initiate the triggered sweep dispatched logistics operation related to the one or more additional storage receptacles (e.g., non-reporting storage receptacles 150*b*, 150*c*).

In further embodiments of such a system that initiates such a triggered sweep of one or more non-reporting storages receptacles may have the basis for triggering such a sweep of the non-reporting receptacle or receptacles may involve reaching a threshold occupied level for the reporting storage receptacle, detecting an overflow condition for the reporting storage receptacle, detecting a threshold change in historic use or a pattern of historic use for the reporting storage receptacle as previously described.

Still further embodiments of a system that initiates such a triggered sweep of one or more non-reporting storages receptacles may also have backend server 100 initiating a dispatch operation relative to the reporting storage receptacle (e.g., receptacle 150*a*). In more detail, an example of backend server 100 in such a system is operative to reactively dispatch the logistics asset to the first storage receptacle (e.g., receptacle 150*a*) for pickup of at least the delivery item from within that first storage receptacle (the reporting storage receptacle) as the first dispatched logistics operation by being further operative to transmit a pickup message to a mobile node operated by the logistics asset (e.g., a mobile node used on logistics asset 700*a*, such as a handheld cell phone or table used by logistics personnel on logistics asset 700*a* or an onboard mobile transceiver deployed as part of a logistics delivery vehicle operating as logistics asset 700*a*). Such a pickup message may identify that first storage receptacle for the first dispatched logistics operation.

In another example, backend server 100 may alter a prior scheduled dispatch operation related to the reporting storage receptacle. In more detail, backend server 100 in this embodiment is operative to reactively dispatch the logistics asset 700*a* to reporting storage receptacle 150*a* for pickup of at least the delivery item from within that first storage receptacle as the first dispatched logistics operation by being further operative to alter a previously scheduled dispatch operation related to the first storage receptacle as the first dispatched logistics operation.

In still another example, backend server 100 may initiate the use of a different logistics asset for the dispatch operation related to the reporting storage receptacle. In more detail, backend server 100 in this embodiment is operative to reactively dispatch a logistics asset to the first storage receptacle (the reporting receptacle) for pickup of at least the delivery item from within the first storage receptacle as the first dispatched logistics operation by being further operative to transmit a schedule alteration message to a mobile node operated by the logistics asset 700*a*, and transmit a pickup message to an alternative logistics asset (e.g., logistics asset 700*b*) as the first dispatched logistics operation related to that reporting storage receptacle. The alternative logistics asset in this example is different than the logistics asset originally scheduled for the first dispatched logistics operation related to the first storage receptacle (the reporting storage receptacle).

In still further embodiments of such a system that initiates such a triggered sweep of one or more non-reporting storages receptacles, sensor data may be used to detect a change in motion/orientation of a component on the storage receptacle (such as entrance opening 155 or door 160) and a failure for that component to return to a prior state of that component as a type of detected change in state of the storage receptacle. Similar to embodiments described above, when retrieval door 160 fails to return to its prior state (e.g., a closed state where the storage receptacle is secure), a further embodiment may have backend server 100 operative to reactively dispatch the logistics asset to the reporting storage receptacle as the dispatched logistics operation by being operative to determine a fault condition exists on the storage receptacle based upon the retrieved event information received from the bridge node, and generate a fault condition alert message to the logistics asset identifying the fault condition. In more detail, the fault conditions exist on the reporting storage receptacle when the retrieved event information received from the bridge node 200 of that reporting storage receptacle indicates a change in motion and/or orientation of retrieval door 600 and a failure to return to a prior state of the retrieval door 600 on that reporting storage receptacle. Examples of such a fault condition alert message transmitted by backend server 100 to the logistics asset identifies the fault condition as an unsecured state of the retrieval door and may expressly prompt or otherwise request the logistics asset secure the retrieval door on that reporting storage receptacle.

Multi-Compartment Logistics Receptacle

As mentioned above, the receptacle 150 in some embodiments may be implemented as a multi-compartment secure access receptacle or container (such as a locker type of logistics receptacle) where each of the receptacle compartments have temporary storage per compartment and are monitored (similar to that shown and explained with respect to FIG. 2). In such an embodiment, the multi-compartment logistics receptacle has more than one entrance opening where a particular entrance opening is accessible to a shipping customer for depositing the package (i.e., item to be shipped). Once within the multi-compartment logistics receptacle, the package is secure and only removed from a secure storage area within a compartment of the receptacle by a person or device that is authorized to do so.

Some embodiments of an exemplary multi-compartment logistics receptacle may have retrieval doors per compartment, rather than a single retrieval door for all temporary storage compartments. Some embodiments may include a common access door with further selectively accessible access doors to individual compartments within the receptacle. Some embodiments may deploy a monitoring and reporting system that uses a bridge or bridging node along with different configurations of wireless accessory sensor nodes and sensors. For example, an embodiment may use a single wireless accessory sensor node for the receptacle with multiple sensors deployed in each of the compartments on a compartment-by-compartment basis. In another example, an embodiment may use a wireless accessory sensor node dedicated per compartment with multiple sensors per compartment for that respective sensor node.

FIGS. 10A-10E illustrate a variety of exemplary embodiments of a multi-compartment logistics receptacle in the form of structural elements and electronic monitoring and reporting elements. Those skilled in the art will appreciate that the detailed explanation regarding potential sensors that monitor components of a logistics receptacle and wireless accessory sensor nodes related to FIG. 2 may also be applicable to the exemplary embodiments of a multi-compartment logistics receptacle shown in each of FIGS. 10A-10E. For example, while the embodiments shown in FIGS. 10A-10E may show one wireless accessory sensor node or a dedicated wireless accessory sensor node on a per-compartment basis, further embodiments may use multiple wireless accessory sensor nodes per compartment. Likewise, those skilled in the art will appreciate that the different types of sensors discussed relative to FIG. 2 may also be used in any of the exemplary embodiments of a multi-compartment logistics receptacle, such as that shown in FIG. 10A-10E.

Figure 10A:
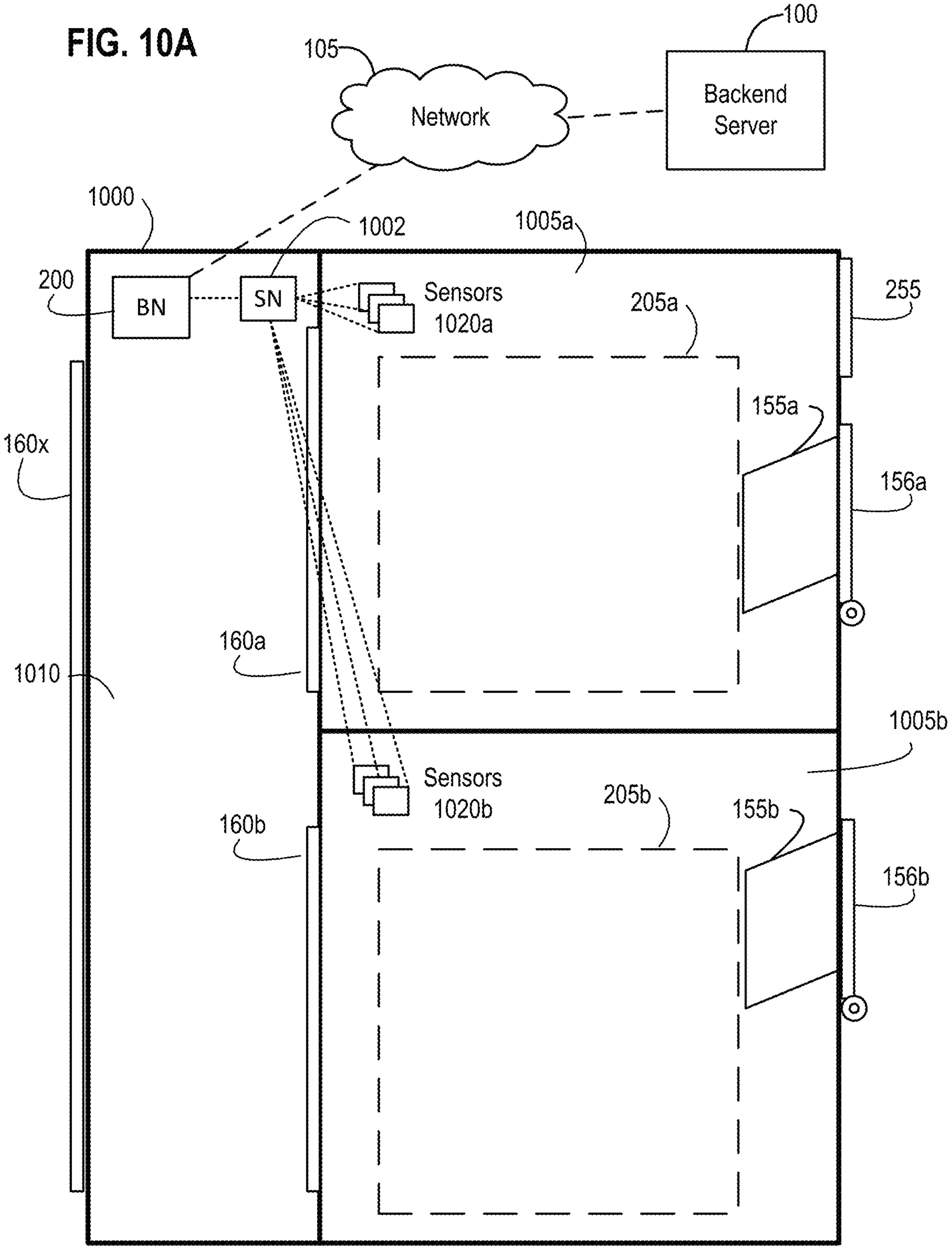
FIG. 10A is a diagram of a first exemplary multi-compartment logistics receptacle having multiple monitored receptacle compartments and a common access compartment in accordance with an embodiment of the invention.

FIG. 10A is a diagram of an exemplary multi-compartment logistics receptacle as a system having multiple monitored receptacle compartments and a common access compartment in accordance with an embodiment of the invention. Referring now to FIG. 10A, exemplary storage receptacle 1000 is shown having compartment 1005*a*, compartment 1005*b*, as well as a common access compartment 1010 that is selectively accessible via external access door 160*x* (i.e., a type of selectively accessible retrieval door that provides a level of access to compartments 1005*a*, 1005*b*). Compartment 1005*a* has its own entrance door 156*a*, entrance opening 155*a*, temporary storage compartment area 205*a*, as well as its own selectively accessible retrieval door 160*a* through which a logistics asset (such as a courier) that is authorized to retrieve items from compartment 1005*a* may gain access to the temporary storage area defined within compartment 1005*a*. In other embodiments, compartment 1005*a* may use alternative types of entrance openings as discussed above.

In like manner, compartment 1005*b* in this embodiment also has its own entrance door 156*b*, entrance opening 155*b*, temporary storage compartment area 205*b*, as well as its own selectively accessible retrieval door 160*b* through which a logistics asset (such as a courier) that is authorized to retrieve items from compartment 1005*b* may gain access to the temporary storage area defined within compartment 1005*b*. In other embodiments, compartment 1005*b* may also use alternative types of entrance openings as discussed above.

In FIG. 10A, the exemplary multi-compartment logistics receptacle system shown includes an exemplary bridge node 200, an exemplary wireless accessory sensor node 1002, and different subsets of sensors 1020*a*, 1020*b* respectively deployed in each of compartments 1005*a*, 1005*b* that may monitor different aspects in each of the compartments 1005*a*, 1005*b* (similar that described above regarding wireless sensor nodes explained relative to FIGS. 2 and 4). The exemplary bridge node 200 shown in FIG. 10A is mounted to exemplary storage receptacle 1000 and operative to communicate with the backend server 100 over a first communication path (e.g., Wi-Fi, cellular, and the like), and may be further operative to communicate over a second communication path (e.g., Bluetooth® Low Energy (BLE), NFC, and the like) different than the first communication path. The embodiment shown in FIG. 10A deploys an exemplary wireless accessory sensor node 1002 (similar to that explained in FIG. 4 regarding exemplary wireless accessory sensor node 210) mounted to the storage receptacle 1000 and coupled (wired or wireless) to sensors 1020*a*, 1020*b* where such sensors monitor for a change in state of storage receptacle 100. In more detail, a first subset of sensors 1020*a* is disposed relative to monitored receptacle compartment 1005*a*, while a second subset of sensors 1020*b* is disposed relative to monitored receptacle compartment 1005*b*. Exemplary sensors 1020*a*, for example, may include different types of sensors (e.g., motion sensors, magnetic sensors, light sensors, accelerometers, scale sensors, image sensors, lock sensors, and the like) that monitor components and aspects (e.g., the temporary storage compartment, entrance opening, retrieval door, light within the compartment, gas within the compartment, movement within the compartment, weight of contents held within the compartment, and the like) relative to monitored receptacle compartment 1005*a*. Exemplary sensors 1020*b*, in like manner, may include different types of sensors that monitor similar components and aspects relative to monitored receptacle compartment 1005*b*.

During operation of the exemplary multi-compartment logistics receptacle system shown in FIG. 10A, exemplary wireless accessory sensor node 1002 is further operative to detect the change in state of the storage receptacle 1000 based upon sensor data generated by at least one of the sensors in the first subset of sensors 1020*a* and in the second subset of sensors 1020*b*; record timestamped information reflecting the detected change in state of the storage receptacle 1000; and broadcast an updated advertising signal having a data available flag set within the updated advertising signal. Similar to that explained above, such a data available flag indicates the wireless accessory sensor node 1002 has event information available for upload by the bridge node 200, where such event information available for upload including at least the timestamped information reflecting the detected change in state of the storage receptacle 1000. Bridge node 200, as part of this embodiment, is further operative to detect the data available flag set within the updated advertising signal, retrieve the event information available for upload from the wireless accessory sensor node 1002, and transmit the retrieved event information to the backend server 100 (e.g., via network 105) to cause the backend server 100 to initiate the dispatched logistics operation related to the storage receptacle 1000.

Similar to that described above in embodiments using a single compartment logistics receptacle, the timestamped information may reflect a time of the detected change in the storage receptacle 1000 and a source of such a detected change in state of the storage receptacle 1000 (e.g., the source being at least one of compartments 1005*a*, 1005*b* and door 160*a*/160*b*/160*x*). In more detail, the source of the detected change in state of the storage receptacle 1000 may include at least one of the monitored components associated with compartment 1005*a*, the monitored components associated with compartment 1005*b* (e.g., an entrance opening, temporary storage area, and the like), and the selectively accessible retrieval door(s) 160*x*/160*a*/160*b*, locks for securing any of the doors.

Similar to that described above in embodiments using a single compartment logistics receptacle, the event information may include the timestamped information and an identifier indicating a type of detected change in state of the storage receptacle (e.g., a change in state of at least one of entrance opening 155*a*/156*a* and entrance opening 155*b*/156*b*; a change in state of at least one of temporary storage area 205*a* and temporary storage area 205*b*; a change in state of entrance opening 155*a*/156*a* and temporary storage area 205*a*; a change in state of entrance opening 155*b*/156*b* and temporary storage area 205*b*; and a change in state of the selectively accessible retrieval door(s) 160*x*/160*a*/160*b*).

In some embodiments, a lock may be deployed for securing the selectively accessible retrieval door and where a lock sensor may monitor the state of the lock for that door. In such an embodiment, the type of detected change in state of the storage receptacle 1000 may include a change in the state of the lock as indicated by the lock sensor.

In some embodiments, at least one of the sensors 1020*a*/1020*b* may include an external motion sensor that monitors outside the storage receptacle 1000 (or a particular compartment of the receptacle 1000) for movement within a predetermined range of the storage receptacle 1000 (or that particular compartment 1005*a*/1005*b*). In such an embodiment, the type of detected change in state of the storage receptacle 1000 may include a change in what has been placed within a predetermined range of the storage receptacle 1000 (or the particular compartment 10005*a*/1005*b*) as indicated by the external motion sensor.

The timestamped information may, in some embodiments, include data indicating a series of times corresponding to a series of related changes to the storage receptacle 1000 (or compartments 1005*a*/1005*b*). Such a series of related changes to the storage receptacle correspond to the detected change in state of the storage receptacle associated with the retrieved event information transmitted to the backend server 100. Such a series of related changes may, for example, correspond to a series of related changes to at least two of the entrance opening 155*a*/156*a*, temporary storage area 205*a*, entrance opening 155*b*/156*b*, temporary storage area 205*b*, and the selectively accessible retrieval door(s) 160*x*/160*a*/160*b*.

In a more detailed embodiment of the exemplary multi-compartment logistics receptacle system shown in FIG. 10A, the first subset of sensors 1020*a* may, for example, be implemented to include a motion sensor detecting a change in motion of the first entrance opening 155*a*/156*a* as the change in state of the storage receptacle 1000; a motion sensor detecting movement of what is received through the first entrance opening 155*a*/156*a* as the change in state of the storage receptacle 1000; an accelerometer detecting a change in motion of the first entrance opening 155*a*/156*a* as the change in state of the storage receptacle 1000; a magnetic sensor detecting a change in position of the first entrance opening 155*a*/156*a* as the change in state of the storage receptacle 1000. In another example, the first subset of the sensors 1020*a* may be implemented with at least two or more from a group consisting of a motion sensor detecting a change in motion of the first entrance opening 155*a*/156*a*; a motion sensor detecting movement of what is received through the first entrance opening 155*a*; an accelerometer detecting a change in motion of the first entrance opening 155*a*/156*a*; and a magnetic sensor detecting a change in position of the first entrance opening 155*a*/156*a* as the change in state of the storage receptacle 1000. Those skilled in the art will understand that similar types of sensors may be deployed as the second subset of sensors 1020*b* for detecting changes in the state of receptacle 1000 relative to entrance opening 155*b*/156*b* for compartment 1005*b*.

Relative to the temporary storage area 205*a*, the first subset of the sensors 1020*a* may include one or more of, for example, a motion sensor detecting motion within the first temporary storage area 205*a*; an image sensor detecting a change of what is stored within the first temporary storage area 205*a*; a scale disposed at a bottom of the first temporary storage area 205*a* (where the scale detects a change in weight of what is stored within the first temporary storage area 205*a*); and a light sensor detecting a change in light within the first temporary storage area 205*a*. Those skilled in the art will understand that similar types of sensors may be deployed as the second subset of sensors 1020*b* for detecting changes in the state of receptacle 1000 relative to temporary storage area 205*b* in compartment 1005*b*.

Relative to the retrieval door(s) used on receptacle 1000, the first subset of the sensors 1020*a* may include one or more of, for example, a motion sensor detecting a change in motion of the selectively accessible retrieval door 160*a*; a magnetic sensor detecting a change in position of the selectively accessible retrieval door 160*a*; a lock sensor detecting a change in a locked status of the selectively accessible retrieval door 160*a*; and an external motion sensor detecting a change in what has been placed within a predetermined range of the storage receptacle 1000 (e.g., compartment 1005*a*) as the change in state of the storage receptacle. Those skilled in the art will understand that similar types of sensors may be deployed as the second subset of sensors 1020*b* for detecting changes in the state of receptacle 1000 relative to door 160*b* in compartment 1005*b*.

While not shown in FIG. 10A, an embodiment may include further sensors that are operatively coupled to exemplary wireless accessory sensor node 1002 that similarly monitors components that may not be dedicated with just one of the monitored receptacle compartments 1005*a*/1005*b*, such as the external access door 160*x* and/or the common access compartment 1010. Thus, one skilled in the art will appreciate that in such an embodiment, a detected change in state of storage receptacle 1000 may also be based on sensors detecting, for example, a change in light within compartment 1010, movement of or change in position/orientation of door 160*x*, movement within compartment 1010, and the like Similar to that described above in embodiments using a single compartment logistics receptacle, those skilled in the art will appreciate that an embodiment of the exemplary multi-compartment logistics receptacle system shown in FIG. 10A may have bridge node 200 waking at a predetermined time of day to detect any data available flag, may do so relative to points within the bridge node's reporting period, may detect subsequent data available flags prior to the end of the reporting period, transmit accumulated event information to the server at points during or at the end of the reporting period, and likewise periodically monitor for detected changes and incrementally retrieve/transmit relevant event information to backend server 100.

Figure 10B:
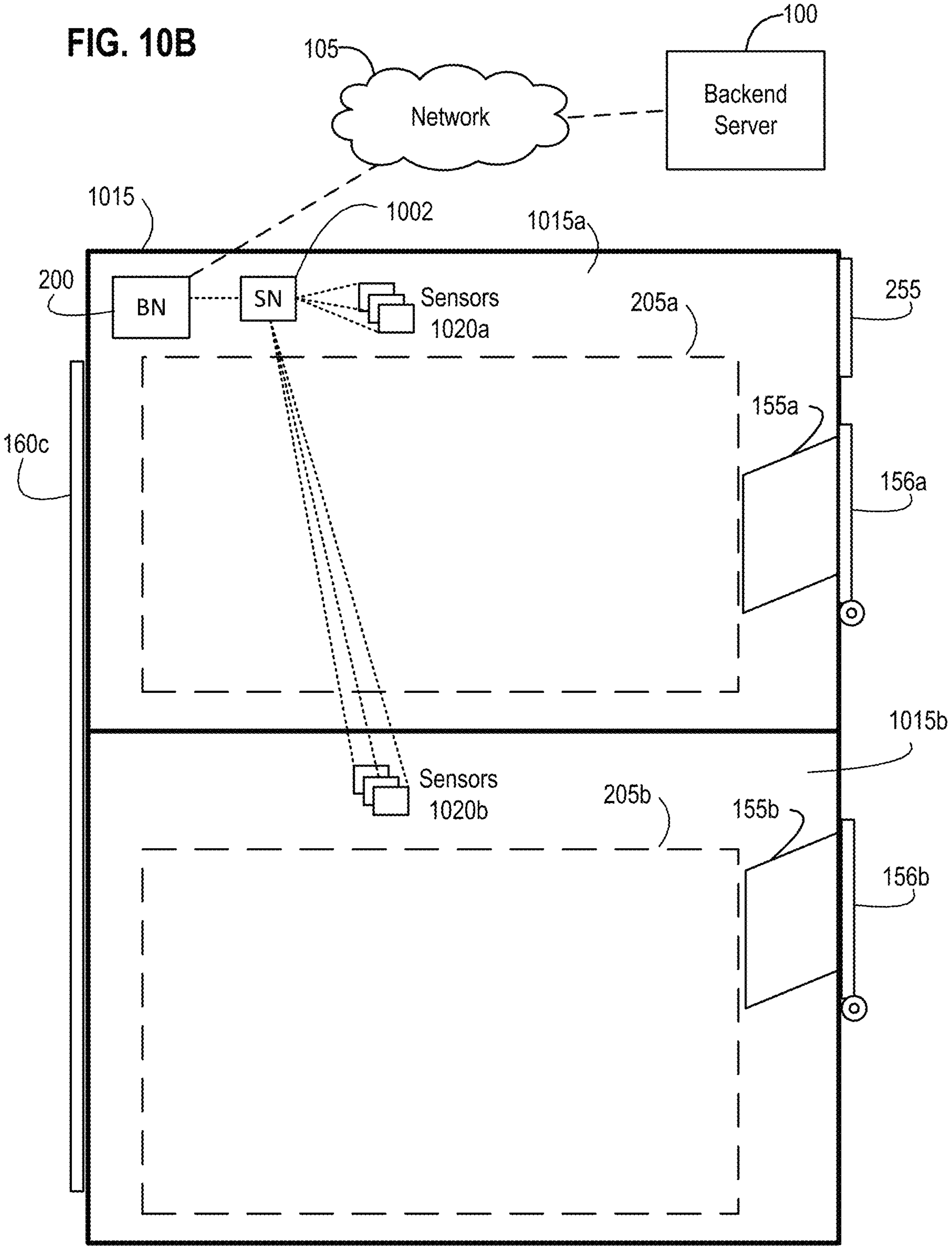
FIG. 10B is a diagram of a second exemplary multi-compartment logistics receptacle having multiple monitored receptacle compartments and a common selectively accessible retrieval door providing access within the compartments in accordance with an embodiment of the invention.

FIG. 10B is a diagram of another exemplary multi-compartment logistics receptacle having multiple monitored receptacle compartments. Referring now to FIG. 10B, exemplary storage receptacle 1015 is generally configured similar to exemplary receptacle 1000 of FIG. 10A, but without a common access compartment 1010 that is selectively accessible via external access door 160_x_. In other words, exemplary storage receptacle 1015 is shown having compartment 1015_a_, compartment 1015_b_, as well as a common selectively accessible retrieval door 160_c_ providing access to within each of the compartments 1015_a_, 1015_b_ in accordance with an embodiment of the invention. Operation of the deployed bridge node 200, wireless accessory sensor node 1002 and the groups of sensors 1020_a_, 1020_b_ are similar to that described above relative to receptacle 1000 (with the exception that the retrieval door being monitored is door 160_c_ rather particular compartment retrieval doors 160_a_, 160_b_).

Figure 10C:
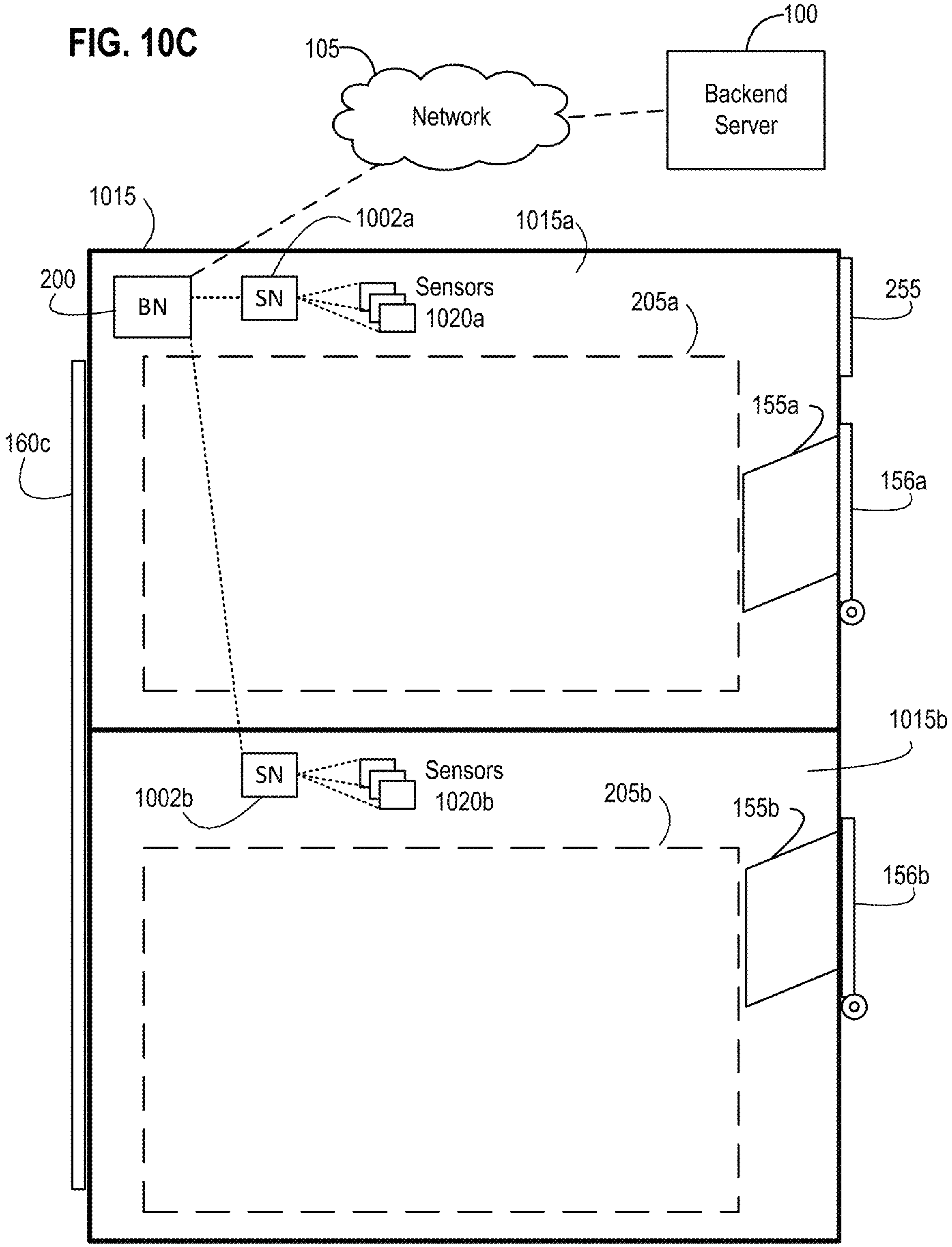
FIG. 10C is a diagram of a third exemplary multi-compartment logistics receptacle similar to that in FIG. 10B but using different wireless accessory sensor nodes in each monitored receptacle compartment in accordance with an embodiment of the invention.

FIG. 10C is a diagram of yet another exemplary multi-compartment logistics receptacle similar to that in FIG. 10B, which uses door 160_c_. However, in the embodiment shown in FIG. 10C, the system uses different wireless accessory sensor nodes 1002_a_, 1002_b_ for each of the monitored receptacle compartments 1015_a_, 1015_b_, respectively, in accordance with an embodiment of the invention. Those skilled in the art will appreciate that in some embodiments, it may be desired to use more than one wireless accessory sensor node within the receptacle and, in some instances, dedicate a wireless accessory sensor node and its own set of sensors to particular compartments. Operation of the deployed bridge node 200 and the groups of sensors 1020_a_, 1020_b_ are similar to that described above relative to receptacle 1015, but with the bridge node 200 being operative to detect advertising signals from both of the wireless accessory sensor nodes 1002_a_, 1002_b_, which respectively are coupled to the different subsets of sensors 1020_a_, 1020_b_ for each compartment 1015_a_, 1015_b_.

Figure 10D:
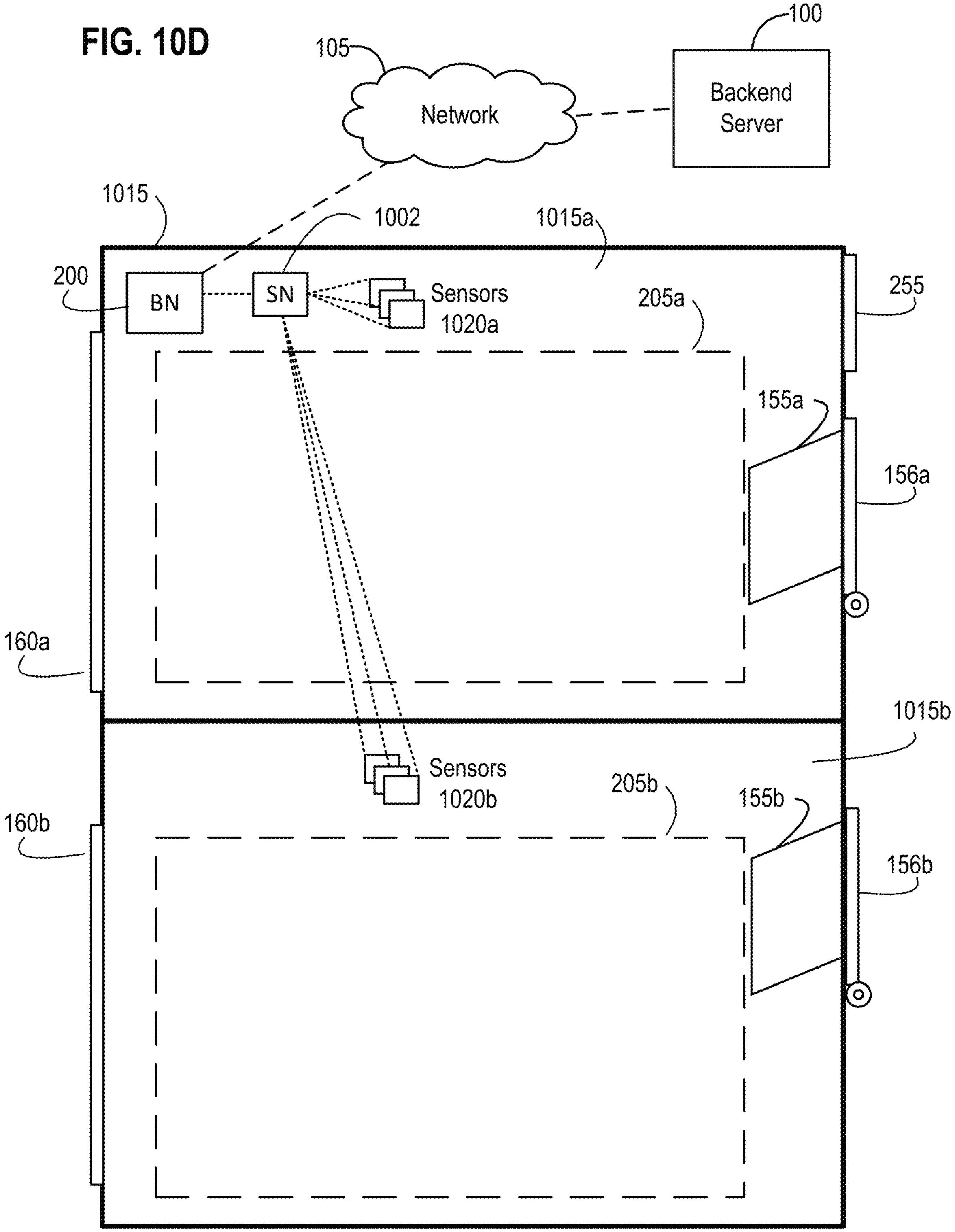
FIG. 10D is a diagram of a fourth exemplary multi-compartment logistics receptacle having multiple monitored receptacle compartments and separate selectively accessible retrieval doors providing limited access to within individual compartments in accordance with an embodiment of the invention.

FIG. 10D is a diagram of a fourth exemplary multi-compartment logistics receptacle having multiple monitored receptacle compartments similar to that in FIG. 10A and separate selectively accessible retrieval doors 106_a_, 160_b_ providing limited access to within individual compartments 1015_a_, 1015_b_ in accordance with an embodiment of the invention. Referring now to FIG. 10D, receptacle 1015 is shown configured similar to that of receptacle 1000 in FIG. 10A, but without a common access compartment 1010 that is selectively accessible via external access door 160_x_. The embodiment shown in FIG. 10D operates similar to that of FIG. 10A but allows for a logistics asset to directly access the individual compartments without accessing a common access compartment or the need to be authorized to access further parts of receptacle 1015 other than the particular retrieval door 106_a_, 106_b_ for the appropriate compartment being serviced. Operation of the deployed bridge node 200, wireless accessory sensor node 1002 and the groups of sensors 1020_a_, 1020_b_ are similar to that described above relative to receptacle 1000.

Figure 10E:
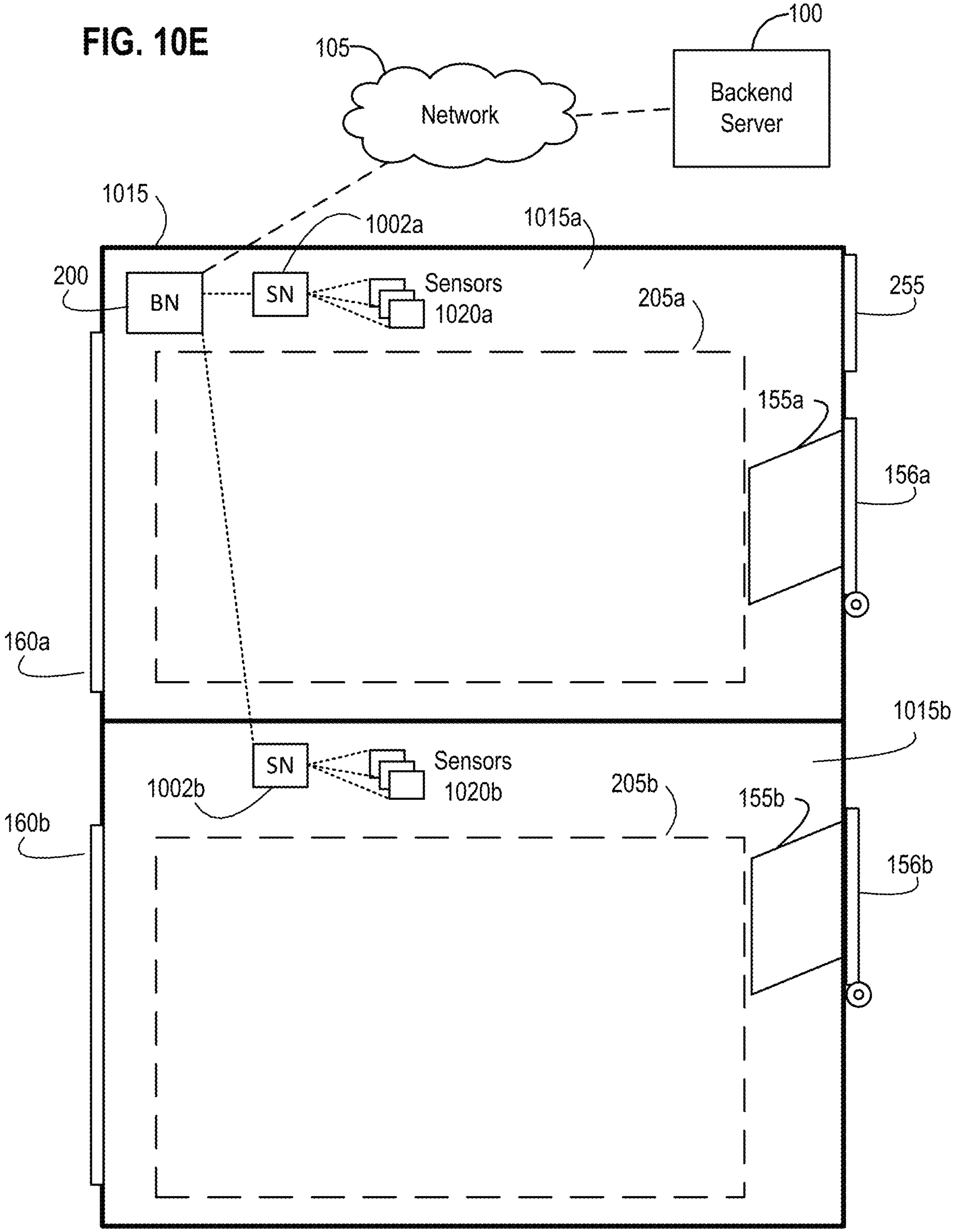
FIG. 10E is a diagram of a fifth exemplary multi-compartment logistics receptacle similar to that in FIG. 10D but using different wireless accessory sensor nodes in each monitored receptacle compartment in accordance with an embodiment of the invention.

FIG. 10E is a diagram of a fifth exemplary multi-compartment logistics receptacle similar to that in FIG. 10D but using different wireless accessory sensor nodes in each monitored receptacle compartment in accordance with an embodiment of the invention. In other words, the embodiment shown in FIG. 10E is largely similar to that shown in FIG. 10C but with a difference in that it uses individual retrieval doors 160_a_, 160_b_ to provide access within each of compartments 1015_a_, 1015_b_. Thus, the embodiment shown in FIG. 10E is a system that uses different wireless accessory sensor nodes 1002_a_, 1002_b_ for each of the monitored receptacle compartments 1015_a_, 1015_b_, respectively, in accordance with an embodiment of the invention. Operation of the deployed bridge node 200 and the groups of sensors 1020_a_, 1020_b_ are similar to that described above relative to receptacle 1015 in FIG. 10D, but with the bridge node 200 being operative to detect advertising signals from both of the wireless accessory sensor nodes 1002_a_, 1002_b_, which respectively are coupled to the different subsets of sensors 1020_a_, 1020_b_ for each compartment 1015_a_, 1015_b_.

In each of the above-described embodiments of an exemplary multi-compartment logistics receptacle system shown in FIGS. 10A-10E (as well as other embodiments that may use multi-compartment logistics receptacles similar to those shown in FIGS. 10A-10E), such a system may validate detected changes through use of additional sensors (such as a light sensor), which help confirm or otherwise indicate the change is related to a pickup/delivery. For example, an embodiment may have a wireless accessory sensor node (such as node 1002) being operative to detect the change in state of the storage receptacle based upon sensor data generated by at least one of the sensors by being further operative to detect a change in state of a first entrance opening (such as entrance opening 155_a_/156_a_) using a first sensor from sensors 1020_a_, and validate the change in state of that entrance opening by detecting light within the temporary storage area 205_a_ using a light sensor from the first group of sensors 1020_a_. In this way, the change in state of the storage receptacle corresponds to a delivery event where the delivery item is received in that temporary storage compartment 1015_a_ of particular storage receptacle.

In another embodiment, the wireless accessory sensor node (such as node 1002) may be operative to detect the change in state of the storage receptacle based upon sensor data generated by at least one of the sensors by being further operative to detect a change in state of the second entrance opening (such as entrance opening 155_b_/156_b_) using a sensor from sensors 1020_b_, and validate the change in state of the second entrance opening by detecting light within the temporary storage area using a light sensor from that group of sensors 1020_b_. In this way, the change in state of the storage receptacle corresponds to a delivery event where the delivery item is received in the second temporary storage compartment 1015_b_ of the storage receptacle.

In still another embodiment, the wireless accessory sensor node (such as node 1002) may be operative to detect the change in state of the storage receptacle based upon sensor data generated by the at least one of the sensors by being further operative to detect a change in state of the selectively accessible retrieval door (such as door 160_a_) using a sensor from sensors 1020_a_ and validate the change in state of the selectively accessible retrieval door by detecting light within the temporary storage area using a light sensor from that group of sensors 1020_a_. In this way, the change in state of the storage receptacle corresponds to a pickup event where the delivery item is removed from within the storage receptacle (e.g., from within compartment 1015_a_ of receptacle 1000).

When the detected change in state of the storage receptacle is a pickup event, embodiments of the system's bridge node may be operative to transmit the retrieved event information back to the backend server in a particular manner. For example, an embodiment of the bridge node processor, when executing the multi-compartment bridge node code, may be operative to transmit the retrieved event information to the backend server by being operative to determine the retrieved event information indicates the detected change in state of the storage receptacle is a pickup event; and transmit, using the long-range communication interface and after the retrieved event information is determined to indicate the detected change in state of the storage receptacle is the pickup event, the retrieved event information to the backend server to cause the backend server to initiate the dispatched logistics operation related to the delivery item. In more detail, the bridge node processor may, for example, determine that the retrieved event information indicates the detected change in state of the storage receptacle is the pickup event when the recorded timestamped information reflecting the detected change in state of the storage receptacle indicates a change in state of the selectively accessible retrieval door. In another example, the bridge node processor may determine the retrieved event information indicates the detected change in state of the storage receptacle is the pickup event when the recorded timestamped information reflecting the detected change in state of the storage receptacle indicates (a) a change in state of the selectively accessible retrieval door and (b) a change in state of at least one of the first temporary storage compartment (e.g., a detected change in motion within the first temporary storage compartment based upon first motion sensor data as part of the sensor data; a detected change of what is stored within the first temporary storage compartment based upon first image sensor data as part of the sensor data; a detected change in weight of what is stored within the first temporary storage compartment based upon first scale data as part of the sensor data; and a detected change in light within the first temporary storage compartment based upon first light sensor data as part of the sensor data) and the second temporary storage compartment (e.g., a detected change in motion within the second temporary storage compartment based upon second motion sensor data as part of the sensor data; and a detected change of what is stored within the second temporary storage compartment based upon second image sensor data as part of the sensor data; a detected change in weight of what is stored within the second temporary storage compartment based upon second scale data as part of the sensor data; and a detected change in light within the second temporary storage compartment based upon second light sensor data as part of the sensor data).

Figure 11:
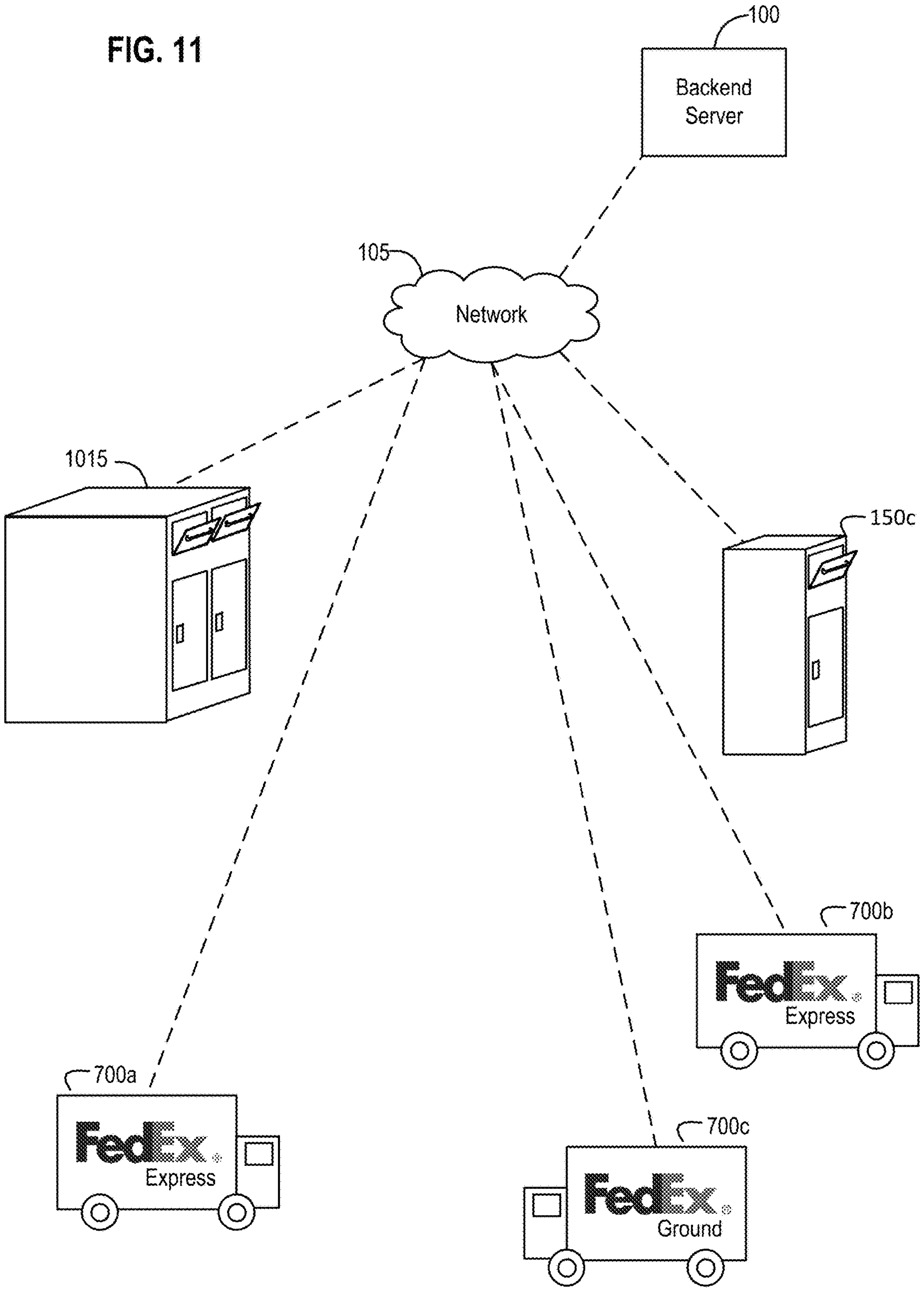
FIG. 11 is a diagram illustrating an exemplary multi-compartment logistics receptacle operating within a network and in communication with an exemplary backend server where the server initiates a dispatched logistics operation with a particular logistics entity in accordance with an embodiment of the invention.

FIG. 11 is a diagram illustrating an exemplary multi-compartment logistics receptacle operating within a network and in communication with an exemplary backend server where the server initiates a dispatched logistics operation with a particular logistics entity in accordance with an embodiment of the invention.

As explained above relative to FIG. 7, those skilled in the art will appreciate that exemplary backend server 100 may receive information from different exemplary connected logistics receptacles 150*a*-150*c* via messages and communications over network 105 and may initiate different types of dispatched logistics operations as a result of such messages and communications. As shown in FIG. 11, one or more of those exemplary connected logistics receptacles may be implemented as an exemplary multi-compartment logistics receptacle 1015. Referring now to FIG. 11, exemplary logistics assets 700*a*-700*c* may be dispatched for a dispatched logistics operation (e.g., a pickup operation, a delivery operation) related to one or more of exemplary logistics receptacles, including exemplary multi-compartment logistics receptacle 1015, based on the different messages and communications sent to backend server 100. And similar to that described herein, backend server 100 may alter or tune the operational parameters of exemplary connected logistics receptacles (including exemplary multi-compartment logistics receptacle 1015) based on the different messages and communications sent to backend server 100.

In some embodiments involving an enhanced multi-compartment logistics receptacle (such as those shown in FIGS. 10A-10E), retrieval of the delivery item (e.g., package, parcel, letter, and the like) may be dynamically initiated with a particular logistics asset depending on the particular compartment associated with the detected change in state. For example, an embodiment may include an exemplary enhanced multi-compartment logistics receptacle system for receiving and temporarily maintaining a delivery item (e.g., package 170, 175) and causing initiation of a dispatched logistics operation where such a system includes at least backend server 100, a multi-compartment storage receptacle 1015, a bridge node 200, and a wireless accessory sensor node 1002 that has (e.g., is wired to or wirelessly coupled to) sensors 1020*a*, 1020*b* for each compartment of the receptacle 1015. Sensors 1020*a*, 1020*b* operate to monitor for a change in state of the storage receptacle 1015 (e.g., sensors 1020*a* monitoring for a change in the state of compartment 1015*a* of receptacle 1015, and sensors 1020*b* monitoring for a change in the state of compartment 1015*b* of receptacle 1015).

In such an embodiment, the system's wireless accessory sensor node 1002 is programmatically configured and adapted so as to become operative to detect the change in state of the storage receptacle 1015 based upon sensor data generated by at least one of the sensors in the first subset of sensors 1020*a* and in the second subset of sensors 1020*b*. The wireless accessory sensor node 1002 is further operative to record timestamped information reflecting the detected change in state of the storage receptacle, and broadcast an updated advertising signal having a data available flag set within the updated advertising signal. The data available flag indicates the wireless accessory sensor node 1002 has event information available for upload by the bridge node 200. Such event information available for upload includes at least (a) the timestamped information reflecting the detected change in state of the storage receptacle, and (b) a detected change indicator identifying which of the receptacle's compartments is related to the detected change in state of the storage receptacle 1015.

In this embodiment, the system's bridge node 200 is programmatically configured and adapted so as to become operative to detect the data available flag set within the updated advertising signal, retrieve the event information available for upload from the wireless accessory sensor node 1002, and transmit a state change notification to the backend server 100. Such a state change notification is a message related to the retrieved event information reflecting the detected change in state of the storage receptacle 1015.

In this embodiment, the system's backend server 100 is operative to receive the notification from the bridge node and initiate the dispatched logistics operation with a first logistics entity and related to the first of the monitored receptacle compartments when the notification indicates the retrieved event information is related to the first of the monitored receptacle compartments. As such, the backend server initiates the dispatched logistics operation with more specificity based on the particular compartment 1015*a*, 1015*b* of receptacle 1015. In more detail, backend server 100 may be operative to initiate the dispatched logistics operation by being operative to identify the first logistics entity for the dispatched logistics operation based upon the detected change indicator included with the received event information and initiate the dispatched logistics operation related to the first of monitored receptacle compartments using the identified first logistics entity.

Figure 12A:
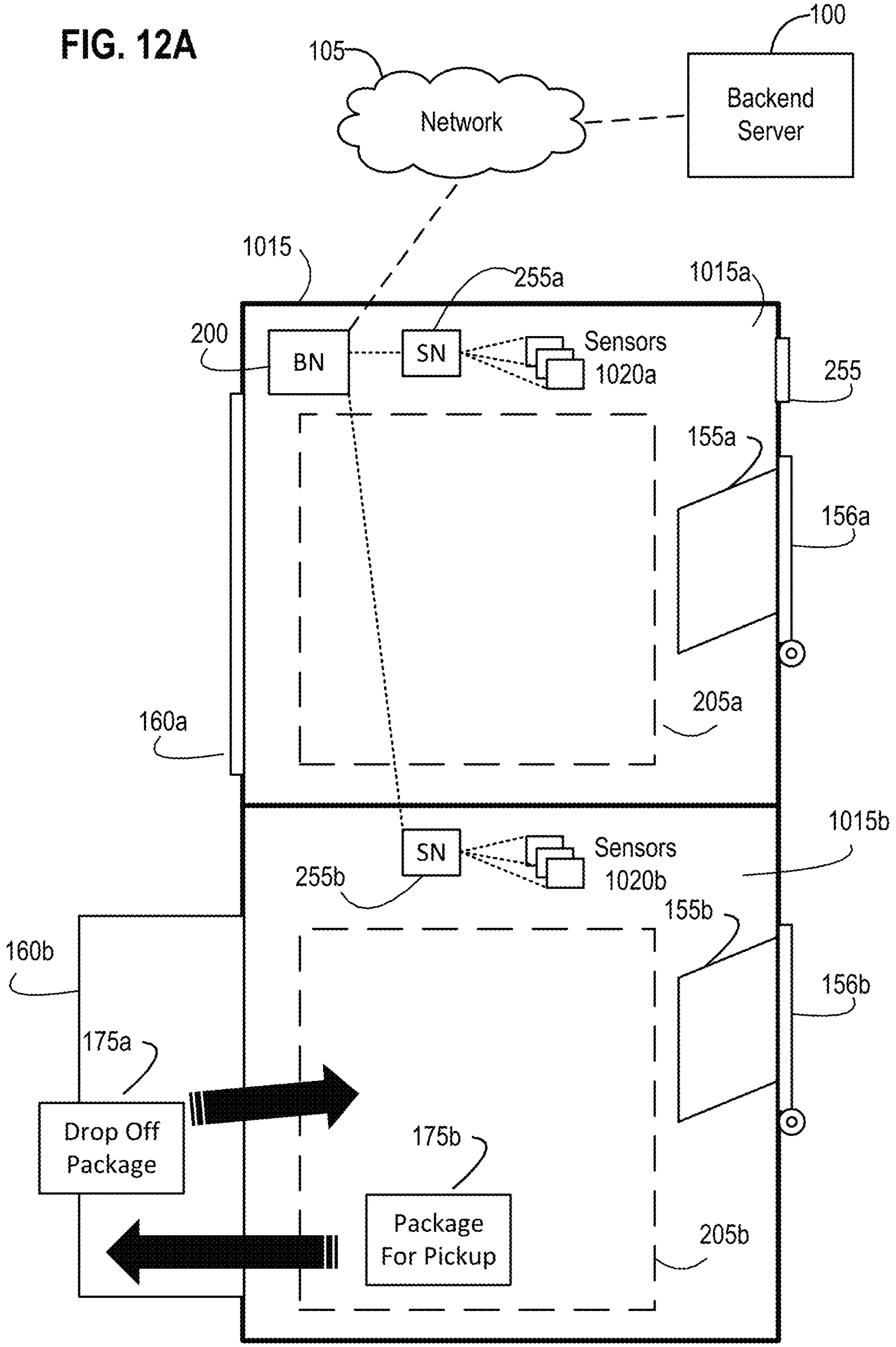
FIG. 12A is a diagram illustrating an exemplary multi-compartment logistics receptacle involved in an exemplary swap type of dispatched logistics operation involving one of the monitored receptacle compartments in accordance with an embodiment of the invention.

In a further embodiment, the dispatched logistics operation involving receptacle 1015 may be implemented as a swap operation by the first logistics entity to retrieve the delivery item from the first of the monitored receptacle compartments and drop-off a second item into the first of the monitored receptacle compartments. For example, FIG. 12A is a diagram illustrating exemplary multi-compartment logistics receptacle 1015 involved in an exemplary swap type of dispatched logistics operation being carried out by exemplary logistics asset 700*a* involving monitored receptacle compartment 1015*b* in accordance with an embodiment of the invention. Referring now to FIG. 12A, receptacle 1015 is shown where exemplary logistics asset 700*a* (as a type of logistics entity) has opened door 160*b* as part of a swap operation to drop off package 175*a* within compartment 1015*b* (e.g., place package 175*a* within temporary storage area 205*b*) while also picking up package 175*b* from within compartment 1015*b*.

Figure 12B:
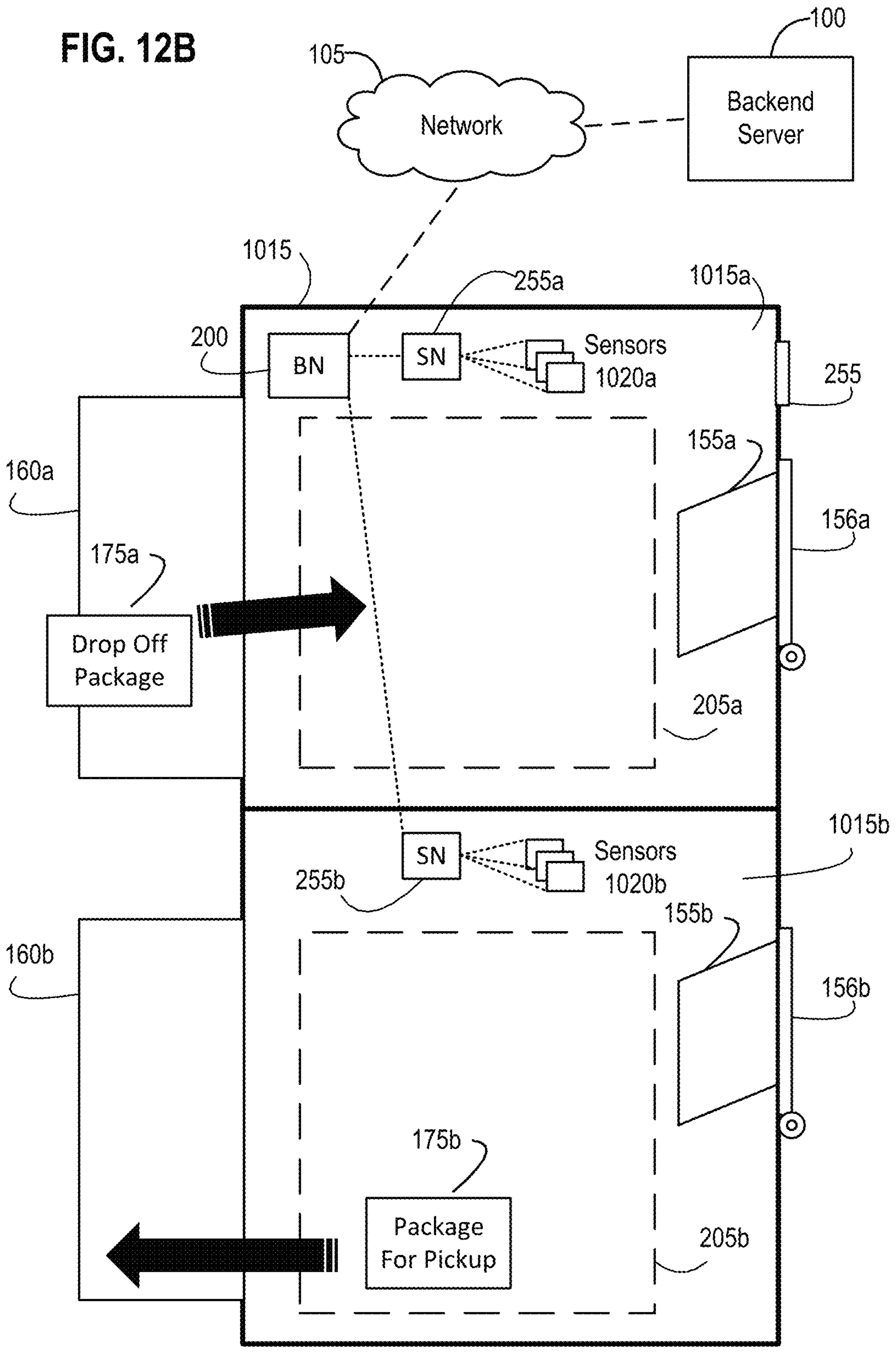
FIG. 12B is a diagram illustrating an exemplary multi-compartment logistics receptacle involved in an exemplary swap type of dispatched logistics operation involving two or more of the monitored receptacle compartments in accordance with an embodiment of the invention.

Alternatively, such a dispatched logistics operation may be implemented as a swap operation by the first logistics entity to retrieve the delivery item from the first of the monitored receptacle compartments and drop-off a second item into the second of the monitored receptacle compartments. For example, FIG. 12B is a diagram illustrating exemplary multi-compartment logistics receptacle 1015 involved in an exemplary swap type of dispatched logistics operation being carried out by exemplary logistics asset 700*a* involving both of monitored receptacle compartments 1015*a* and 1015*b* in accordance with an embodiment of the invention. Referring now to FIG. 12B, receptacle 1015 is shown where exemplary logistics asset 700*a* (as a type of logistics entity) has opened door 160*a* as part of a swap operation to drop off package 175*a* within compartment 1015*a*, and then opened door 160*b* as part of the swap operation to pick up package 175*b* from within compartment 1015*b*.

In some further embodiments, the backend server 100 identifies the particular logistics entity/asset for the dispatched logistics operation by considering the role of that logistics entity/asset. For example, a further embodiment may have the backend server being operative to identify the first logistics entity by being further operative to dynamically identify the first logistics entity based upon a role of the first logistics entity associated with the delivery item (e.g. where the role of the first logistics entity associated with the delivery item is a logistics courier role having the first logistics entity involved with the delivery item and at least one other additional delivery item as part of the dispatched logistics operation; where the role of the first logistics entity associated with the delivery item comprises a for-hire role (such as a gig worker) having the first logistics entity picking up only the delivery item and delivering the delivery item to a recipient as part of the dispatched logistics operation; where the role of the first logistics entity associated with the delivery item comprises a primary recipient role having the first logistics entity being an intended recipient of the delivery item; and where the role of the first logistics entity associated with the delivery item comprises a secondary recipient role having the first logistics entity being related to an intended recipient of the delivery item).

In still further embodiments, a more explicit transfer of rights to access a particular compartment 1015*a*, 1015*b* of the multi-compartment storage receptacle 1015 may be implemented. For example, a further embodiment may have the backend server 100 operative to initiate the dispatched logistics operation with the first logistics entity by being operative to transfer a right to access the first of the monitored receptacle compartments (e.g., compartment 1015*a*) to the first logistics entity for use in conducting the dispatched logistics operation with the first of the monitored receptacle compartments. More specifically, backend server 100 may be further operative to transmit a permissive notification to bridge node 200, where the permissive notification identifies the transferred right to access the first of the monitored receptacle compartments 1015*a*. Such permissive notification may also identify the first logistics entity as being authorized to use the transferred right to access the first of the monitored receptacle compartment 1015*a*. In another example, a further embodiment may have the backend server 100 being operative to initiate the dispatched logistics operation with the first logistics entity by further being operative to transfer a right to access each of the monitored receptacle compartments in the receptacle (or a subset of all compartments in the receptacle) to the first logistics entity for use in conducting the dispatched logistics operation with at least the first of the monitored receptacle compartments.

In yet another further embodiment, the backend server may use a different logistics asset/entity for subsequent servicing of that multi-compartment logistics receptacle. For example, a further embodiment may have backend server 100 being further operative to receive a subsequent notification from bridge node 200 where the subsequent notification is related to additional event information reflecting a detected change in state of the storage receptacle for a different compartment (e.g., the second of the monitored receptacle compartments 1015*b*). The backend server 100 is then operative to initiate a subsequent dispatched logistics operation with a second logistics entity (e.g., 700*b*) and related to the second of the monitored receptacle compartments 1015*b* when the subsequent notification indicates the additional event information is related to the second of the monitored receptacle compartments 1015*b*. More particularly, the backend server may be further operative to initiate a subsequent dispatched logistics operation with a second logistics entity and related to the second of the monitored receptacle compartments when the notification indicates the retrieved event information is related to the second of the monitored receptacle components.

Backend Server Tuning of a Node-Based Connected Logistics Receptacle

As noted above, various embodiments may have the backend server learning from the reported event information and responsively tuning or modifying the operations of one or more node-based connected logistics receptacles (also referred to as node-based logistics receptacles herein) as a result. For example, an embodiment may implement adjusting or tuning operations by backend server 100 where the backend server 100 learns of engagement interactions and patterns of use/interaction with particular components of a node-based logistics receptacle and then updates the bridge node in that node-based logistics receptacle with revised operational parameters to tune, for example, the drop off time per location and alter the pickup resources needed. In more detail, such embodiments may have the server tuning when a particular bridge node deployed with a storage receptacle may retrieve or upload event information (which may be related to a revised drop off time for the receptacle) and/or tuning when such a bridge node transmits such retrieve event information to the backend server (e.g., at a revised end of a reporting period (related to a new drop-off time)). FIGS. 15A-19B illustrate various aspects related to such server learning embodiments involving tuned timing related to the logistics receptacles.

Figure 15A:
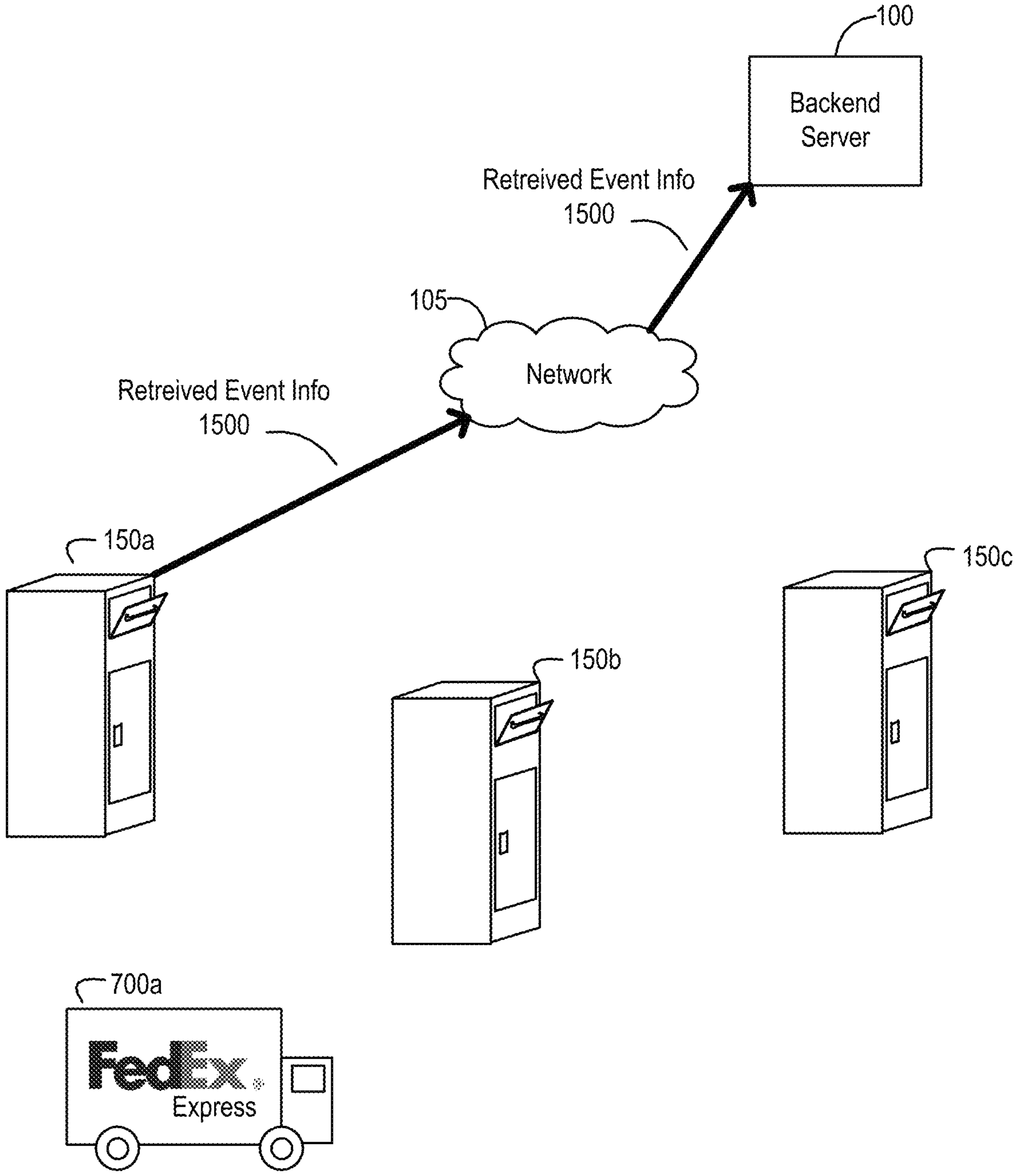
FIG. 15A is a diagram of an exemplary system for dynamically tuning operations where the system's bridge node in an exemplary node-based logistics receptacle is transmitting retrieved event information to the system's backend server in accordance with an embodiment of the invention.
Figure 15B:
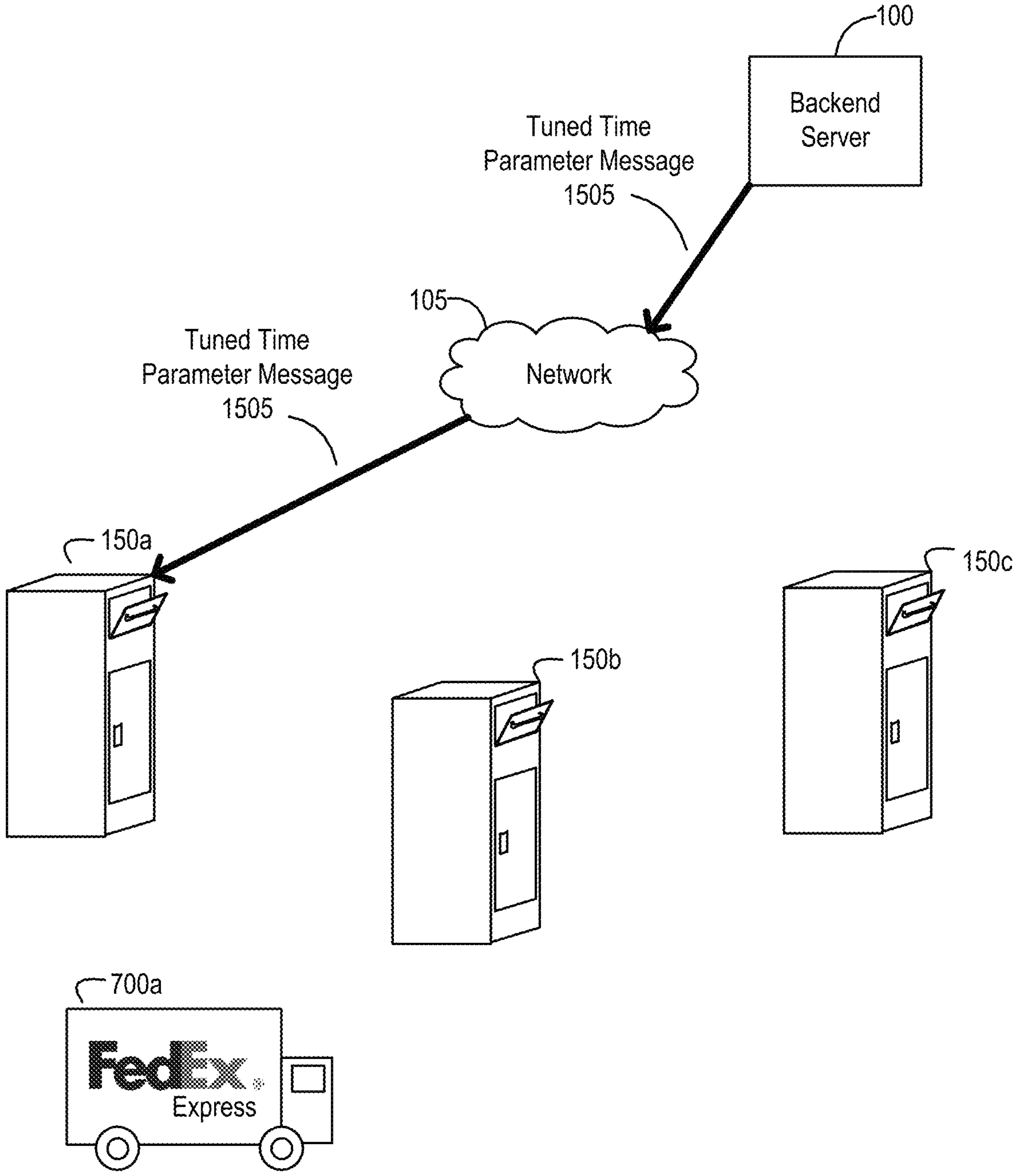
FIG. 15B is a diagram of an exemplary system for dynamically tuning operations where the system's backend server sends an exemplary tuned time parameter message to the system's bridge node in an exemplary node-based logistics receptacle to cause the bridge node to alter timing related operations in accordance with an embodiment of the invention.

FIG. 15A is a diagram of an exemplary system for dynamically tuning operations where the system's bridge node in an exemplary node-based logistics receptacle is transmitting retrieved event information to the system's backend server in accordance with an embodiment of the invention. Referring now to FIG. 15A, exemplary backend server 100, network 105, exemplary node-based logistics receptacles 150*a*-150*c*, and exemplary logistics asset 700*a* are shown where exemplary node-based logistics receptacle 150*a* has detected a change in state of receptacle 150*a* and the bridge node within that exemplary node-based logistics receptacle 150*a* transmits retrieved event information 1500 through network 105 to backend server 100. In general, in such an exemplary system, backend server 100 responds to the transmitted retrieved event information 1500 with an exemplary tuned time parameter message 1505, as shown in FIG. 15B, sent by backend server 100 to the system's bridge node in exemplary node-based logistics receptacle 150*a* to cause that bridge node to alter timing related operations in accordance with an embodiment of the invention.

Figure 16:
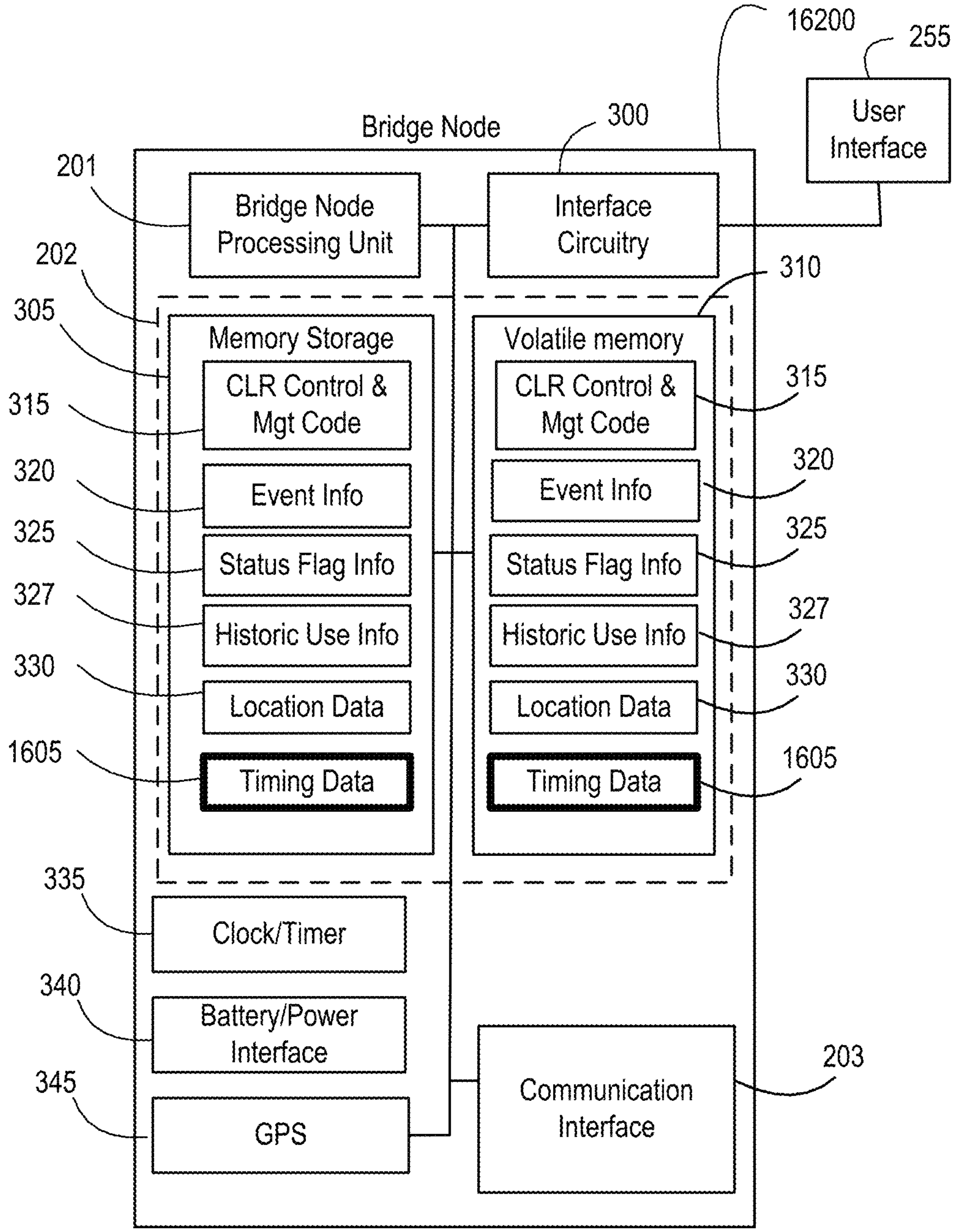
FIG. 16 is a detailed diagram of an exemplary bridge node device used as part of an exemplary system for dynamically tuning operations in accordance with an embodiment of the invention.

An exemplary embodiment of the bridge node device in such an embodiment is shown in FIG. 16. Referring now to FIG. 16, exemplary bridge node 16200 is illustrated with components (e.g., hardware and software elements) similar to that explained with respect to exemplary bridge node 200 (FIG. 3), but exemplary bridge node 16200 is expressly shown having timing data 1605 as additional data used in the operation of the bridge node. Exemplary timing data 1605 is generally a data structure that maintains information related to the timing of particular operations of the bridge node. As such, exemplary timing data 1605 may be implemented as a dynamic timing profile data structure on what is being altered in response to when the bridge node 16200 receives a tuned time parameter message. For example, exemplary timing data 1605 may be updated or revised in accordance with the tuned time parameter message to dynamically alter or update the predetermined time of day that bridge node 16200 retrieves or uploads available event information from a wireless accessory sensor node in the receptacle. In addition, or alternatively, exemplary timing data 1605 may be updated or revised in accordance with the tuned time parameter message to dynamically alter or update the predetermined time of day that bridge node 16200 transmits retrieved event information to backend server 100. Those skilled in the art will appreciate that other bridge nodes, such as exemplary bridge node 200, may also be implemented with exemplary timing data 1605 used for storing, maintaining, and updating information related to timing of operations for that particular bridge node—e.g., reporting periods, waking times, retrieval times for uploading event information from a wireless accessory sensor node, transmission times for sending retrieved event information to the backend server, and the like.

In an embodiment that may make use of such exemplary revised timing data 1605 in response to a tuned time parameter message 1505, an exemplary system for dynamically tuning operation of a node-based logistics receptacle is described. Such a node-based logistics receptacle 150*a* (similar to receptacle 150) used relative to such a system has multiple storage receptacle components including at least an entrance opening 155/156 for receiving a delivery item (e.g., package 170), a temporary storage area 205 for temporarily maintaining the delivery item once received, and a retrieval door 160 providing selective access to the delivery item within the temporary storage area 205. In general, the exemplary system for dynamically tuning operation of the node-based logistics receptacle includes backend server 100, a wireless accessory sensor node (e.g., nodes 210, 1002, 1002*a*/1002*b*), and a bridge node (e.g., bridge node 16200). The system's wireless accessory sensor node is disposed on the node-based logistics receptacle and has sensors (e.g., sensors 450*a*-450*e*, 1020*a*, 1020*b*) that collectively monitor the storage receptacle components of the node-based logistics receptacle. Each of the sensors is operative to generate sensor data reflecting one or more interactions with the storage receptacle components of that node-based logistics receptacle over a recording time period.

The system's bridge node 16200 is disposed on the node-based logistics receptacle and programmatically operative to retrieve event information from the wireless accessory sensor node at a predetermined time of day. In more detail, an embodiment may have the system's bridge node 16200 being operative to retrieve the event information from the wireless accessory sensor node at the predetermined time of day by being further operative to wake from a low power state at the predetermined time of day, and once woken from the low power state, retrieve the event information from the wireless accessory sensor node.

The system's bridge node 16200 then transmits the retrieved event information to the backend server 100. The retrieved event information (such as exemplary retrieved event information 1500) represents the sensor data generated over the recording time period. In response to receiving the retrieved event information from bridge node 16200, backend server 100 is programmatically operative to transmit a tuned time parameter message (such as exemplary tuned time parameter message 1505) to the bridge node. Such a tuned time parameter message causes bridge node 16200 to alter the predetermined time of day that the bridge node 16200 retrieves subsequent event information from the wireless accessory sensor node in the reporting node-based logistics receptacle 150*a*.

In more detail, an example of such a system embodiment may have backend server 100 being operative to generate the tuned time parameter message 1505 based upon a customer-initiated interaction with the one or more of the storage receptacle components (e.g., entrance opening 155/156, temporary storage area 205) as indicated by the retrieved event information 1500 received from the bridge node. In another example, the embodiment may have backend server 100 being operative to generate the tuned time parameter message 1505 based upon a courier-initiated interaction with one or more of the storage receptacle components (e.g., the retrieval door 160, temporary storage area 205) as indicated by the retrieved event information 1500 received from the bridge node.

In still further embodiments, an exemplary system embodiment may have backend server 100 being further operative to generate the tuned time parameter message 1505 based upon (a) timing information of the detected/sensed interactions with the storage receptacle component(s) as indicated by the retrieved event information 1500 received from the bridge node; and/or (b) a type of the interactions with the storage receptacle component(s) as indicated by the retrieved event information 1500 received from the bridge node. Examples of such a type of interaction may include, but is not limited to, a sensed movement of the entrance opening 155/156; a sensed movement of an object moving through the entrance opening 155; a change in position of the entrance opening 155/156; a sensed movement within the temporary storage area 205; a change in what is stored within the temporary storage area 205; a change in weight of what is stored within the temporary storage area 205; a change in light detected within the temporary storage area 205 (or more generally within the receptacle 150*a*); a change in position of the retrieval door 160; and a sensed movement of the retrieval door 160.

Further embodiments of such an exemplary system for dynamically tuning operations of a logistics receptacle may identify/detect interactions and compare event information related to such interactions to prior interaction history for that node-based logistics receptacle (e.g., for particular components of that receptacle) as the basis for generating the tuned time parameter message 1505. For example, a further embodiment may have backend server 100 being further operative to generate the tuned time parameter message 1505 by being operative to receive the retrieved event information 1500 from the bridge node 16200 and identify a first engagement event (e.g., a drop-off event or pickup event) for a first of the storage receptacle components of that node-based logistics receptacle 150*a* from the retrieved event information 1500. The backend server 100 is also operative to then compare the identified first engagement event for the first storage receptacle component with a prior component engagement history for the first storage receptacle component (e.g., server-tracked historic use pattern and engagement history information in management profile 835) and generate the tuned time parameter message 1501 based upon that comparison. In more detail, when such a prior component engagement history is implemented as a server-tracked historic use pattern for the first of the storage receptacle components, the backend server 100 may conduct such a comparison by detecting a threshold change in the server-tracked historic use pattern for the first storage receptacle component based upon the identified first engagement event. This server-tracked historic use pattern may, for example, be maintained on the backend server as part of a profile (e.g., as part of management profile 835) identifying a pattern of use of the node-based logistics receptacle, such as a pattern of delivery events for the node-based logistics receptacle or a pattern of pickup events for the node-based logistics receptacle. The profile may, in some examples, include information representing a threshold occupancy pattern profile identifying a frequency of reaching a threshold occupied level within the node-based logistics receptacle. In still other examples, the profile may include information representing an overload pattern profile identifying a frequency of reaching an overload condition for the node-based logistics receptacle.

In another example, a further embodiment may have backend server 100 being further operative to generate the tuned time parameter message 1505 by being operative to receive the retrieved event information 1500 from the bridge node 16200; identify multiple engagement events for the storage receptacle components of the node-based logistics receptacle 150*a* from the retrieved event information 1500; compare the identified engagement events for those storage receptacle components with a prior component engagement history for those storage receptacle components (e.g., information in management profile 835); and generate the tuned time parameter message 1505 based upon the comparison.

Such a prior component engagement history may be implemented as a server-tracked historic use pattern for the storage receptacle components. As such, the backend server 100 may be operative to compare the identified engagement events for the storage receptacle components with the prior component engagement history for those storage receptacle components by being further operative to detect a threshold change in the server-tracked historic use pattern for those storage receptacle components based upon the identified engagement events.

In still other embodiments, the server may identify a pattern of engagements as part of generating the tuned time parameter message. In more detail, a further embodiment may have backend server 100 being operative to receive the retrieved event information 1500 from the bridge node 16200; identify a pattern of engagement events for one or more of the storage receptacle components of the node-based logistics receptacle 150*a* from the retrieved event information 1500; compare the identified pattern of engagement events for the storage receptacle components with a prior component engagement history for those storage receptacle components; and generate the tuned time parameter message 1505 based upon the comparison. In this further embodiment, the prior component engagement history may be implemented as a server tracked profile (e.g., a management profile 835 that maintains a server-tracked historic use pattern for receptacle components) for the node-based logistics receptacle 150*a* indicating a prior pattern related to use of the storage receptacle components; a prior pattern related to timing of interactions with the storage receptacle components; and a prior pattern related to types of the interactions with the storage receptacle components. In still a further example, the backend server 100 may conduct the comparison of identified pattern of engagement events for the storage receptacle components with the prior component engagement history for the storage receptacle components by detecting a threshold change in the server-tracked historic use pattern for the storage receptacle components based upon the identified pattern of engagement events.

In addition to transmitting the tuned time parameter message, further embodiments may have the backend server 100 taking steps to initiate a logistics operation (pickup from, delivery to) this particular node-based logistics receptacle 150*a*. For example, backend server 100 may be further programmatically operative, in response to receiving the retrieved event information 1500, to initiate a dispatched logistics operation related to the node-based logistics receptacle 150*a* with a first logistics asset (e.g., asset 700*a*). In another example, backend server 100 may be programmatically operative, in response to receiving the retrieved event information 1500, to initiate an alternative dispatched logistics operation related to the node-based logistics receptacle 150*a* with an alternative logistics asset (such as asset 700*b*). This alternative logistics asset may be different than an original logistics asset corresponding to a previously scheduled dispatch operation for that node-based logistics receptacle 150*a*.

Still further embodiments relating to dynamic tuning operations for a node-based logistics receptacle (such as receptacle 150*a*) may involve sending a message to the backend server at predetermined time of day indicating no interactions detected. For example, a further system embodiment to that described above may have the system's bridge node 16200 being further programmatically operative to transmit a first confirmation status message to the backend server 100, where the first confirmation status message represents a type of confirmation that the bridge node 16200 is at least operative to determine no further event information is available to upload from the system's wireless accessory sensor node during a subsequent reporting time period and where transmission of such a confirmation status message by bridge node 16200 may occur at a designated or dynamically updated time of day.

Likewise, the system's bridge node 16200 in another embodiment may be further programmatically operative to transmit a second confirmation status message to the backend server 100, where the second confirmation status message represents another type of confirmation that the bridge node 16200 is at least operative to receive a signal from the wireless accessory sensor node during the subsequent reporting time period. In more detail, the signals from the wireless accessory sensor node may indicate no further interactions with the storage receptacle components of the node-based logistics receptacle 150*a* over the subsequent reporting time period and where the bridge node may transmit the second confirmation status message to the backend server at a designated time of day.

The system embodiments relating to dynamic tuning operations for a node-based logistics receptacle (such as receptacle 150*a*) described above involve tuning or adjusting when the bridge node 16200 retrieves or uploads available event information from the wireless accessory sensor node, but a further embodiment may also tune the time for transmitting or uploading such retrieved event information to the backend server 100. For example, an embodiment may implement the tuned time parameter message 1505 such that it also causes the bridge node 16200 to alter when the bridge node 16200 transmits future retrieved event information to the backend server 100. In more detail, the tuned time parameter message generated by backend server 100 may cause the bridge node 16200 to alter a cutoff time of day when the node-based logistics receptacle 150*a* is designated to no longer accept any further delivery item (e.g., packages, letters, parcels, objects, and the like) for the day and when the bridge node 16200 transmits future retrieved event information to the backend server. In even more detail in such an example, the backend server 100 may be programmatically operative to transmit the tuned time parameter message 1505 to the bridge node 16200 in receptacle 150*a* by being further programmatically operative to (a) determine whether an adjustment of the cutoff time of day for the node-based logistics receptacle 150*a* is warranted based upon the retrieved event information 1500 received by the backend server 100; (b) generate the tuned time parameter message 1505 when the adjustment of the cutoff time of day for the node-based logistics receptacle 150*a* is determined to be warranted based upon the retrieved event information 1500 received by the backend server 100; and (c) transmit the tuned time parameter message 1505 to the bridge node 16200 causing the bridge node 16200 to at least alter when the bridge node 16200 transmits future retrieved event information to the backend server 100.

Figure 17A:
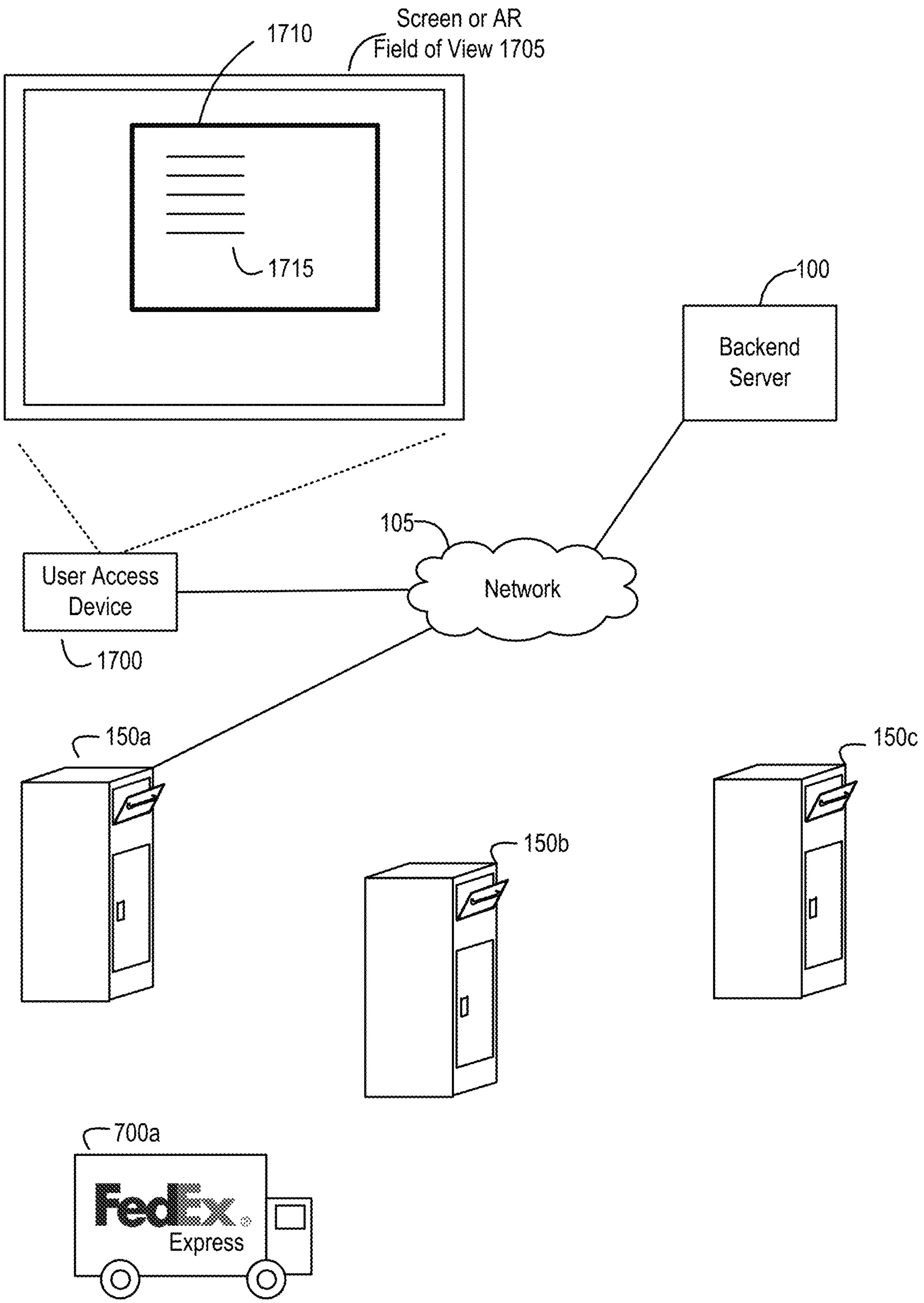
FIG. 17A is a diagram illustrating an exemplary user access device that is operative to access an online portal hosted by a backend server in accordance with an embodiment of the invention.

The system embodiments relating to dynamic tuning operations for a node-based logistics receptacle (such as receptacle 150*a*) described above may also inform others about adjustments related to the node-based logistics receptacle in various ways, such as via an online portal or via an integral display on the receptacle itself. FIG. 17A is a diagram illustrating an exemplary user access device 1700 that is operative to access an online portal 1710 hosted by backend server 100 in accordance with an embodiment of the invention. Referring now to FIG. 17A, exemplary user access device 1700 is a processor based communication device (such as a smartphone, laptop, tablet, and the like) that is able to connect to network 105 and may communicate with other devices, such as mobile handheld bridge nodes used by logistics personnel and or connect with and communicate with a node-based logistics receptacle (e.g., once authorized and authenticated to do so). Generally, user access device 1700 via its screen 1705 (or field of view display when device 1700 is an augmented reality based device) allows a user, in the embodiment shown in FIG. 17A, to access and view operational information on a node-based logistics receptacle, such as updated operational information on times of use for receptacle 150*a* (e.g., an adjusted cutoff time of day for the node-based logistics receptacle 150*a* for accepting any further delivery item or after which deliver items will not be accepted/reported; an adjusted period of time during which the node-based logistics receptacle will accept any further delivery item and outside of which items will not be accepted/reported).

Figure 17B:
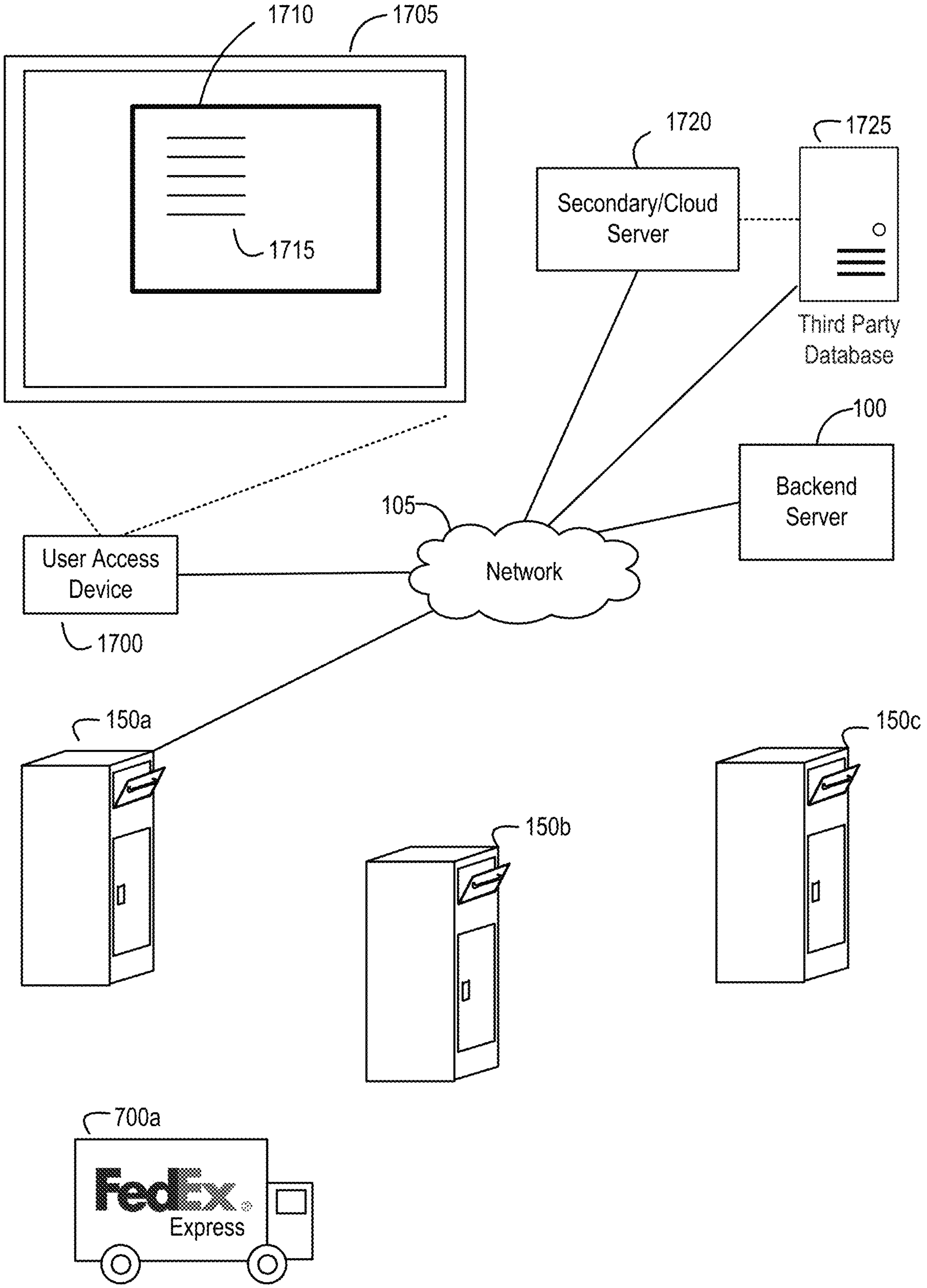
FIG. 17B is a diagram illustrating an exemplary user access device that is operative to access an online portal hosted by an alternative or secondary server in accordance with an embodiment of the invention.

In more detail, an embodiment may have exemplary user access device 1700 showing online portal 1710 as a window on screen 1705 and where the information shown in online portal 1710 is provided by backend server 100 (as shown in FIG. 17A) or, in other examples, by a secondary/cloud server 1720 (separate from backend server 100, as shown in FIG. 17B). Those skilled in the art will appreciate that secondary/cloud server 1720 may provide hosting services for such information presented in online portal 1710, and may gain access such information via a third party database 1725 (which may be populated from backend server 100 with updated operational information on a particular node-based logistics receptacle—information that may be maintained by backend server 100 as part of management profile 835, information that may be updated by backend server 100, and information that may be separately uploaded to database 1725 and/or secondary/cloud server 1720).

In another embodiment, exemplary user access device 1700 may be implemented as an exemplary processor based augmented reality device. Those skilled in the art will appreciate that incorporation of augmented reality as part of the user operating device 1700 facilitates an enhanced interactive experience that combines real world content (e.g., a view of the surrounding area proximate device 1700) and processor-generated content (e.g., virtual symbols, objects, information, prompted messages, directions, sensory information, and the like overlaid with the real world content) shown in an interwoven manner that advantageously allows the user to perceive both the real world content and the processor-generated content. In general, an exemplary augmented reality enhanced device implementation of user access device 1700 may include a processor, memory, a display (e.g., a heads up display that may be viewed on the device by the user or a look through display viewed through by the user with real world and processor-generated content appearing on the display overlaid on the real world content), sensors (e.g., GPS sensors, accelerometer, imaging sensors, camera, and the like), a wireless transceiver for communication with other devices, as well as input devices for user input and interactivity (e.g., button, cursor, touchscreen, microphone, and the like). Such an exemplary augmented reality enhanced device implementation of user access device 1700 may, for example, be implemented as augmented reality glasses that project a digital overlay directly in the user's field of vision. In general, an exemplary augmented reality enhanced device implementation of user access device 1700 presents the user with a combination of digital and physical worlds, facilitates interactions made in near real time with less distraction for the user, and an accurate 3D identification of virtual and real objects for use by the user when providing such interactions (e.g., receiving information displayed, recognizing objects (such as an exemplary node-based logistics receptacle), and providing responsive input/feedback based upon the information displayed). Further, such an exemplary processor based augmented reality device implementation of user access device 1700 may still provide the ability to connect to network 105 and communicate with other devices, such as mobile handheld bridge nodes used by logistics personnel (which may themselves have augmented reality features) and/or connect with and communicate with a node-based logistics receptacle (e.g., once authorized and authenticated to do so) via its wireless transceiver.

Generally, those skilled in the art will appreciate that an exemplary augmented reality enhanced user access device 1700 via its screen 1705 (i.e., the field of view display for the AR device 1700) allows, for example, a user to access and view operational information on a node-based logistics receptacle, such as updated operational information on times of use for receptacle 150*a* (e.g., an adjusted cutoff time of day for the node-based logistics receptacle 150*a* for accepting any further delivery item or after which deliver items will not be accepted/reported; an adjusted period of time during which the node-based logistics receptacle will accept any further delivery item and outside of which items will not be accepted/reported) in combination with a view of the real world. For example, an embodiment may have exemplary augmented reality enhanced user access device 1700 showing online portal 1710 on a portion of screen 1705 (e.g., as part of screen 1705, as an overlay of information on screen 1705) where the information shown in online portal 1710 is provided by backend server 100 (as shown in FIG. 17A) or, in other examples, by a secondary/cloud server 1720 (separate from backend server 100, as shown in FIG. 17B) while also allowing the user operating device 1700 a view on the remaining part of screen 1705 of the real world. Information shown on screen 1705 may be accompanied, for example, with additional notification enhancements (e.g., sound, colors, highlights, haptic feedback, and the like) that help draw attention to the information as perceived on screen 1705.

Those skilled in the art will appreciate that various embodiments of exemplary user access device 1700 may be implemented using a desktop computer, a laptop computer, a tablet (such as an Apple iPad® touchscreen tablet), a personal area network device (such as a Bluetooth® device), a smartphone (such as an Apple Iphone®), a smart wearable device (such as a Samsung Galaxy Gear™ smartwatch device, or a Google Glass™ wearable smart optics), an augmented reality (AR) headset, or other such devices capable of communicating over network 105 and its wired and/or wireless communication paths. Thus, an exemplary user access device may be a mobile type of device intended to be easily moved (such as a tablet or smartphone), and may be a non-mobile type of device intended to be operated from a fixed location (such as a desktop computer).

Figure 18:
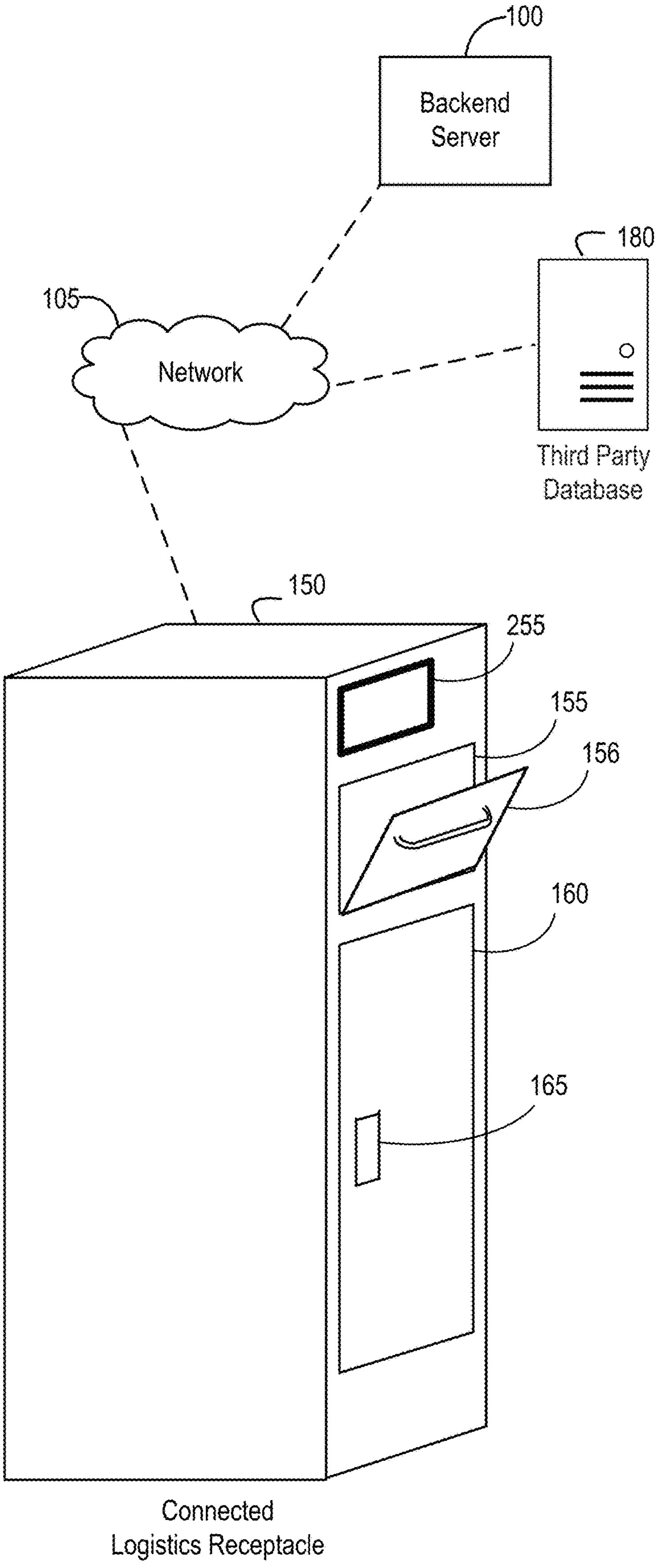
FIG. 18 is a diagram illustrating an exemplary connected logistics receptacle operating within a network and in communication with an exemplary backend server where the logistics receptacle includes a display capable of showing updated operational information related to adjusted or updated operational aspects of the logistics receptacle in accordance with an embodiment of the invention.

FIG. 18 is a diagram illustrating an exemplary connected logistics receptacle 150 (similar to that in FIG. 1) in communication with an exemplary backend server 100 where the logistics receptacle 150 includes an exemplary integral display 255 disposed to be viewable from outside of logistics receptacle 150 and capable of showing updated operational information related to adjusted or updated operational aspects of the logistics receptacle 150 in accordance with an embodiment of the invention. Referring now to FIG. 18, exemplary display 255 is shown on the front of exemplary node-based logistics receptacle 150 so as to present displayed information on display 255 to a user of receptacle 150. In such an example, the tuned time parameter message 1505 transmitted to the bridge node 16200 (disposed as part of receptacle 150) may cause the bridge node 16200 to generate an updated operational information message shown on display 255. In an example, this updated operational information message may reflect a changed cutoff time of day when the node-based logistics receptacle 150 is designated to no longer accept any further delivery item for the day; may reflect a new pickup time of day for the node-based logistics receptacle; may include a prompt to check online for a new pickup time of day for the node-based logistics receptacle (e.g., such as a visually scannable code generated on the display, where the visually scannable code (barcode, QR code, and the like) is related to online available information on the new pickup time).

Figure 19A:
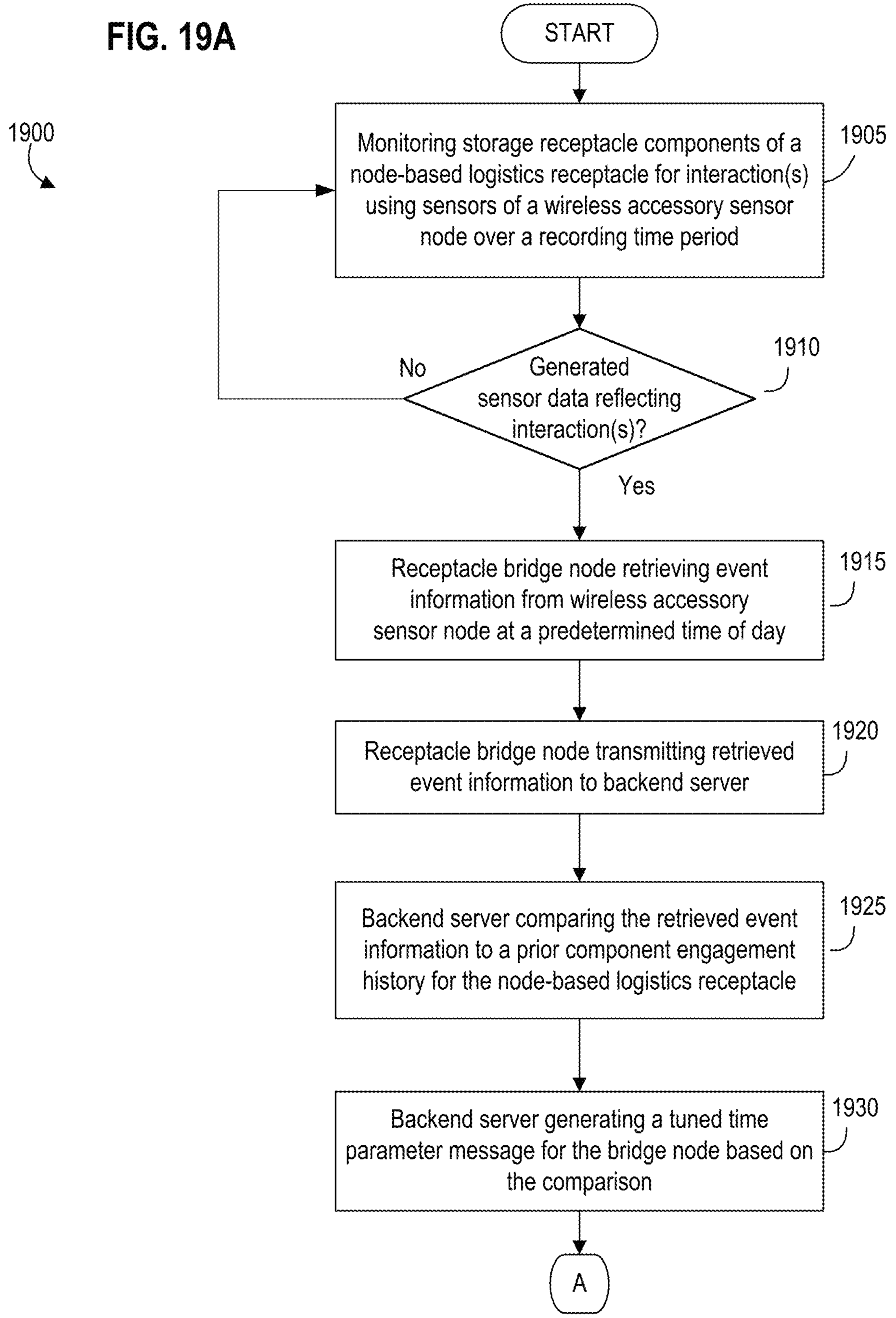
FIGS. 19A and 19B collectively are a flow diagram illustrating an exemplary method dynamically tuning operation of a node-based logistics receptacle in accordance with an embodiment of the invention.
Figure 19B:
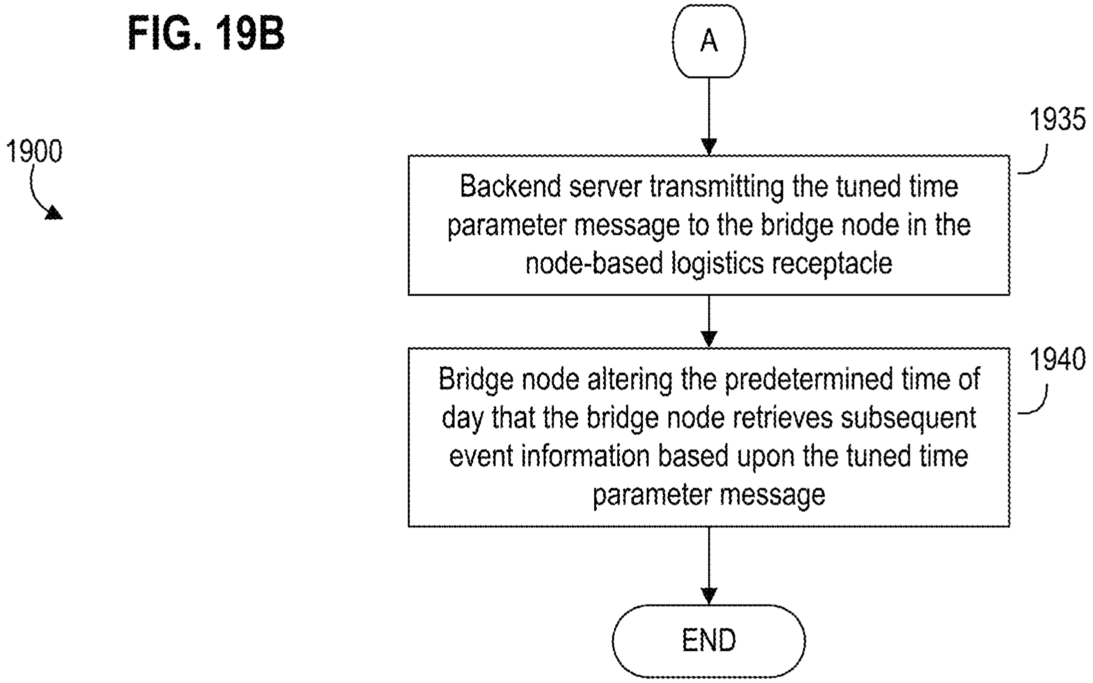

FIGS. 19A and 19B collectively are a flow diagram illustrating an exemplary method for dynamically tuning the operation of a node-based logistics receptacle similar to that discussed above in FIGS. 15A-18 and in accordance with an embodiment of the invention. Referring now to FIG. 19A, exemplary method 1900 begins at step 1905 where the sensors of the wireless accessory sensor node on the node-based logistics receptacle are monitoring the receptacle's storage receptacle components for one or more interactions over a recording time period. At step 1910, method 1900 determines if at least one of the sensors has generated sensor data reflecting interactions with one or more of the storage receptacle components of the node-based logistics receptacle over the recording time period. If not, then step 1910 returns to step 1905 for continued monitoring. However, if so, step 1910 proceeds to step 1915.

At step 1915, method 1900 has the bridge node retrieving event information from the wireless accessory sensor node at a predetermined time of day, where such event information is related to the generated sensor data (e.g., event information may include information on a type of interaction, the component interacted with, timestamped information on the interaction, and the like). In some embodiments of step 1915, method 1900 may implement this step by first having the bridge node waking from a low power state at the predetermined time of day, and then retrieving the event information from the wireless accessory sensor node by the bridge node once woken from the low power state. In a further embodiment, the retrieved event information in step 1915 may indicate a customer-initiated interaction with the one or more of the storage receptacle components (e.g., the entrance opening, the temporary storage area). In another example, the retrieved event information may indicate a courier-initiated interaction with one or more of the storage receptacle components (e.g., the retrieval door, the temporary storage area). In still another embodiment of step 1915, the retrieved event information may indicate timing information of the interactions with the one or more of the storage receptacle components. In yet another embodiment of step 1915, the retrieved event information may indicate a type of the one or more interactions with the one or more of the storage receptacle components (e.g., a sensed movement of the entrance opening; a sensed movement of an object moving through the entrance opening; a change in position of the entrance opening; a sensed movement within the temporary storage area; a change in what is stored within the temporary storage area; a change in weight of what is stored within the temporary storage area; a change in light detected within the temporary storage area; a change in position of the retrieval door; and/or a sensed movement of the retrieval door).

At step 1920, method 1900 has the bridge node transmitting the retrieved event information to the backend server, where the retrieved event information represents the sensor data generated over the recording time period.

At step 1925, method 1900 has the backend server receiving the retrieved event information and comparing this retrieved event information to a prior component engagement history for the reporting node-based logistics receptacle (e.g., part of the information kept in exemplary management profile 835). In a further embodiment of method 1900, step 1925 may be implemented with the backend server identifying a first engagement event (e.g., a drop-off event, pickup event) for a first of the storage receptacle components of the reporting node-based logistics receptacle from the retrieved event information and comparing that identified first engagement event with a prior component engagement history for the first of the storage receptacle components (e.g., a server-tracked historic use pattern for that storage receptacle component). In this example, the backend server may generate the tuned time parameter message in step 1930 based upon the comparison of the identified first engagement event with the prior component engagement history (e.g., the server-tracked historic use pattern) for the first of the storage receptacle components. Using such a server-tracked historic use pattern, an embodiment of step 1925 may implement such a comparison by detecting a threshold change in the server-tracked historic use pattern for the first of the storage receptacle components based upon the identified first engagement event. The server-tracked historic use pattern in this embodiment of step 1925 may be maintained on the backend server as part of a profile (e.g., management profile 825) identifying a pattern of use of the node-based logistics receptacle. Such a profile may, for example, be a pattern of delivery events for the node-based logistics receptacle; a pattern of pickup events for the node-based logistics receptacle; a threshold occupancy pattern profile identifying a frequency of reaching a threshold occupied level within the node-based logistics receptacle; or an overload pattern profile identifying a frequency of reaching an overload condition for the node-based logistics receptacle.

In other embodiments of method 1900, step 1925 may involve identifying multiple engagement events for the one or more of the storage receptacle components of the node-based logistics receptacle from the retrieved event information, and comparing the identified engagement events with a prior component engagement history (e.g., a server-tracked historic use pattern maintained as part of a profile, such as management profile 835, which identifies patterns of use of the receptacle) for the one or more of the storage receptacle components. The tuned time parameter message may be generated based on this comparison and, in some embodiments of step 1925, the comparison may involve detecting a threshold change in the server-tracked historic use pattern for the one or more of the storage receptacle components based upon the identified engagement events.

In still other embodiments of method 1900, step 1925 may perform such a comparison based upon identified patterns of engagements compared to server-tracked engagement history information. For example, the comparing step of step 1925 may be implemented with the backend server identifying a pattern of engagement events for the storage receptacle components of the node-based logistics receptacle from the retrieved event information and comparing the identified pattern of engagement events with a prior component engagement history for the storage receptacle components. In this example, the backend server may generate the tuned time parameter message in step 1930 based upon the comparison of the identified pattern of engagement events for the storage receptacle components with the prior component engagement history for the storage receptacle components. As with the other examples above, the prior component engagement history for the storage receptacle components may be implemented with a server-tracked profile for the node-based logistics receptacle (e.g., management profile 835) indicating a prior pattern related to use of the one or more of the storage receptacle components; a prior pattern related to timing of the one or more interactions with the one or more of the storage receptacle components; or a prior pattern related to types of the one or more interactions with the one or more of the storage receptacle components; or a server-tracked historic use pattern for the one or more of the storage receptacle components. When step 1925 is using such a server-tracked historic use pattern as the prior component engagement history, the comparing in step 1925 may be implemented by detecting a threshold change in the server-tracked historic use pattern for the one or more of the storage receptacle components based upon the identified pattern of engagement events.

At step 1930, the backend server proceeds with generating a tuned time parameter message (e.g., message 1505) for the bridge node based upon the comparison of the retrieved event information to the prior component engagement history for the node-based logistics receptacle performed in step 1925. Step 1930 proceeds through transition A to step 1935 on FIG. 19B, where method 1900 has the backend server transmitting the tuned time parameter message to the bridge node. Thereafter, at step 1940, method 1900 has the bridge node in the reporting node-based logistics receptacle altering the predetermined time of day that the bridge node retrieves subsequent event information from the wireless accessory sensor node based upon the tuned time parameter message.

In a further embodiment of method 1900, the backend server may also cause the initiation of a logistics operation for the reporting node-based logistics receptacle. For example, method 1900 may further include the step, in response to the backend server receiving the retrieved event information, of initiating a dispatched logistics operation by the backend server, where the dispatched logistics operation is related to the reporting node-based logistics receptacle and a first logistics asset (such as asset 700*a*). In another example, method 1900 may further comprise the step of having the backend server initiating an alternative dispatched logistics operation in response to receiving the retrieved event information. Such an alternative dispatched logistics operating in this example is related to the reporting node-based logistics receptacle and an alternative logistics asset, which is different than an original logistics asset corresponding to a previously scheduled dispatch operation for the node-based logistics receptacle.

An embodiment of method 1900 may also have the bridge node notifying the backend server with a message indicating that no interactions were detected. For example, method 1900 may further include a step of having the bridge node transmitting a first confirmation status message to the backend server, where the first confirmation status message represents a first confirmation that the bridge node is operative to determine no further event information is available to upload from the wireless accessory sensor node during a subsequent reporting time period, which may be done at a designated time of day (e.g., defined as part of information in exemplary timing data 1605). In another example, method 1900 may further include a step of having the bridge node transmitting a second confirmation status message to the backend server, where the second confirmation status message represents a second confirmation that the bridge node is operative to receive a signal from the wireless accessory sensor node during the subsequent reporting time period (e.g., where the signal indicates no further interactions with the storage receptacle components of the node-based logistics receptacle over the subsequent reporting time period; and where such a second confirmation status message is sent at a designated time of day (which may be defined as part of information in exemplary timing data 1605)).

Embodiments of method 1900 relating to dynamic tuning operations for a node-based logistics receptacle (such as receptacle 150*a*) described above involve tuning or adjusting when the bridge node 16200 retrieves or uploads available event information from the wireless accessory sensor node, but a further embodiment of method 1900 may also tune the time for transmitting or uploading such retrieved event information to the backend server. For example, method 1900 may further include a step where the bridge node is altering when the bridge node transmits future retrieved event information to the backend server based upon the tuned time parameter message. This may take the form of the bridge node altering a cutoff time of day when the node-based logistics receptacle is designated to no longer accept any further delivery item for the day and when the bridge node transmits future retrieved event information to the backend server based upon the tuned time parameter message (where such altered timing may be updated as part of exemplary timing data 1605).

In more detail, an embodiment of method 1900 may implement step 1940 where the tuned time parameter message is transmitted by (a) having the backend server determining whether an adjustment of the cutoff time of day for the node-based logistics receptacle is warranted based upon the retrieved event information received by the backend server; (b) having the backend server generating the tuned time parameter message once the adjustment of the cutoff time of day for the node-based logistics receptacle is determined to be warranted based upon the retrieved event information received by the backend server; and (c) having the backend server transmitting the tuned time parameter message to the bridge node causing the bridge node to at least alter when the bridge node transmits the retrieved subsequent event information to the backend server.

Embodiments of method 1900 relating to dynamic tuning operations for a node-based logistics receptacle (such as receptacle 150*a*) described above may also include steps that inform or notify others about adjustments related to the node-based logistics receptacle in various ways, such as via an online portal or via an integral display on the receptacle itself. For example, an embodiment of method 1900 may further include a step where the backend server is updating operational information on the node-based logistics receptacle, where such updated operational information (e.g., an altered time when the bridge node transmits future retrieved event information to the backend server based upon the tuned time parameter message; an adjusted cutoff time of day for the node-based logistics receptacle for accepting any further delivery item; an adjusted period of time during which the node-based logistics receptacle will accept any further delivery item) is accessible through an online portal and including information on an altered time when the bridge node transmits future retrieved event information to the backend server based upon the tuned time parameter message. As explained relative to FIGS. 17A and 17B, such an online portal may be hosted by the backend server or a second server (e.g., secondary/cloud server 1720). In another example, a further embodiment of method 1900 has the bridge node generating an updated operational information message shown on a display coupled to the bridge node (e.g., integral display 255 shown in FIG. 18) and disposed on the node-based logistics receptacle. In this example, the updated operational information message may reflect a changed cutoff time of day when the node-based logistics receptacle is designated to no longer accept any further delivery item for the day; a new pickup time of day for the node-based logistics receptacle; a prompt shown on the display advising to check online for a new pickup time of day for the node-based logistics receptacle (e.g., where such a prompt may include a visually scannable code generated on the display and related to online available information on the new pickup time or other changed operational timing related to that node-based logistics receptacle).

In a further system embodiment, similar to system embodiments described above related to dynamic tuning operations for a node-based logistics receptacle (such as receptacle 150*a*), an exemplary system may focus on changes to when the bridge node transfers event information to the server (as opposed to when the bridge node retrieves or uploads the event information from the wireless accessory sensor node or in combination with when the bridge node retrieves or uploads the event information from the wireless accessory sensor node). For example, an embodiment of such a system for dynamically tuning operation of a node-based logistics receptacle (such as receptacle 150, 150*a* having storage receptacle components including at least an entrance opening 155/156 for receiving a delivery item, a temporary storage area 205 for temporarily maintaining the delivery item once received, and a retrieval door 160 providing selective access to the delivery item within the temporary storage area). The exemplary system includes at least a backend server 100; a bridge node (e.g., bridge node 16200), and a wireless accessory sensor node (e.g., sensor node 210, 1002, 1002*a*, 1002*b*). In this embodiment, the system's wireless accessory sensor node is disposed on the node-based logistics receptacle and has multiple sensors (e.g., sensors 1020*a*, 1020*b*, 440*a*-450*e*) that collectively monitor the storage receptacle components of the node-based logistics receptacle, wherein each of the sensors is operative to generate sensor data reflecting one or more interactions with one or more of the storage receptacle components of the node-based logistics receptacle over a recording time period (e.g., as defined in exemplary timing data 1605). The system's bridge node is disposed on the node-based logistics receptacle and programmatically operative to retrieve event information from the wireless accessory sensor node at a predetermined time of day (e.g., as defined in exemplary timing data 1605) and transmit the retrieved event information to the backend server (where the retrieved event information represents at least the sensor data generated over the recording time period. The system's backend server is programmatically operative, in response to receiving the retrieved event information, to transmit a tuned time parameter message to the bridge node. Such a tuned time parameter message causes the system's bridge node to alter a predetermined time of day when the bridge node transmits future retrieved event information to the backend server. In more detail, the tuned time parameter message may cause the bridge node to alter a cutoff time of day when the node-based logistics receptacle is designated to no longer accept any further delivery item for the day as the predetermined time of day when the bridge node transmits the future retrieved event information to the backend server;

and/or alter a cutoff time of day when the node-based logistics receptacle is designated to no longer accept any further delivery item for the day and when the bridge node transmits future retrieved event information to the backend server. Further still, the backend server may be operative to transmit the tuned time parameter message by being more specifically operative to (i) determine whether an adjustment of the cutoff time of day for the node-based logistics receptacle is warranted based upon the retrieved event information received by the backend server; (ii) generate the tuned time parameter message when the adjustment of the cutoff time of day for the node-based logistics receptacle is determined to be warranted based upon the retrieved event information received by the backend server; and (iii) transmit the tuned time parameter message to the bridge node causing the bridge node to at least alter when the bridge node transmits future retrieved event information to the backend server.

Similar to the system embodiments described above, this system embodiment relating to dynamic tuning operations for a node-based logistics receptacle may also inform others about adjustments related to the node-based logistics receptacle in various ways, such as via an online portal or via an integral display on the receptacle itself as described above relative to FIGS. 17A, 17B and 18.

And also similar to the system embodiments described above, this system embodiment may also involve sending a message to the backend server at predetermined time of day indicating no interactions detected. For example, a further system embodiment to that described above may have the system's bridge node 16200 being further programmatically operative to transmit a first confirmation status message to the backend server 100, where the first confirmation status message represents a type of confirmation that the bridge node 16200 is at least operative to determine no further event information is available to upload from the system's wireless accessory sensor node during a subsequent reporting time period and where transmission of such a confirmation status message by bridge node 16200 may occur at a designated or dynamically updated time of day.

Likewise, the system's bridge node 16200 in another embodiment may be further programmatically operative to transmit a second confirmation status message to the backend server 100, where the second confirmation status message represents another type of confirmation that the bridge node 16200 is at least operative to receive a signal from the wireless accessory sensor node during the subsequent reporting time period. In more detail, the signals from the wireless accessory sensor node may indicate no further interactions with the storage receptacle components of the node-based logistics receptacle 150*a* over the subsequent reporting time period and where the bridge node may transmit the second confirmation status message to the backend server at a designated time of day.

Server Setup, Management & Training of a Network of Node-Based Connected Logistics Receptacles While various embodiments described above focus on dynamic tuning operations for a particular node-based logistics receptacle based upon event information reported by that node-based logistics receptacle, additional embodiments may employ a different type of dynamic tuning operation. As explained in more detail below, such additional embodiments include a backend server that centrally manages multiple node-based logistics receptacles. In doing so, the backend server generally configures each one, and may dynamically tune the operation of each based upon a more robust set of information being reported by multiple different node-based logistics receptacles. Such information is used by the backend server to better learn and adapt to interactions and events occurring across a network of node-based logistics receptacles. In this way, these additional embodiments focus on a different type of centralized network setup, management, and dynamic tuning that may be applied to a fleet of connected node-based logistics receptacles beyond that addressed in embodiments described above.

Figure 20A:
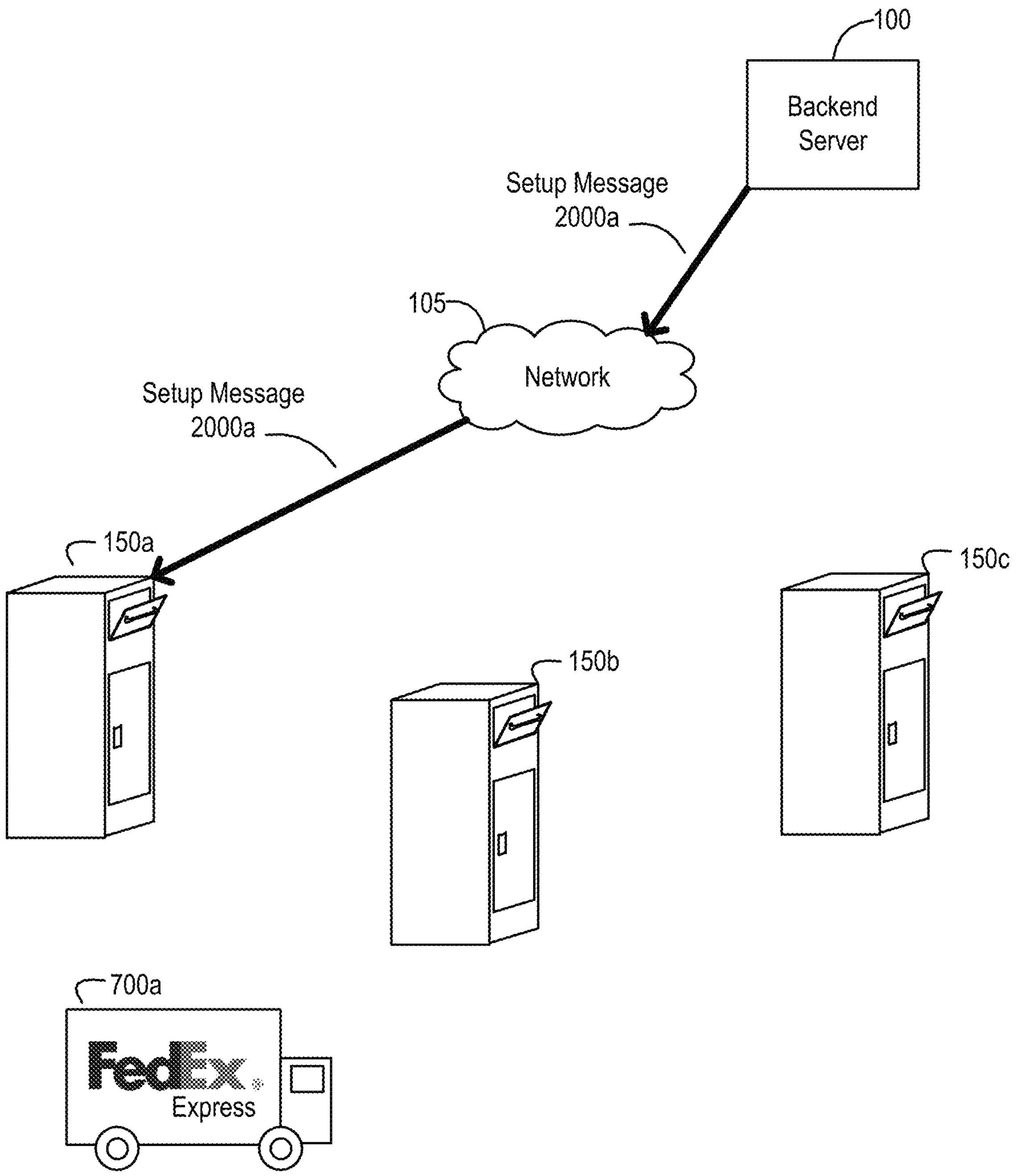
FIGS. 20A-20H are a series of diagrams of an exemplary centrally managed system for tuning multiple enhanced node-based logistics receptacles involving a backend server in accordance with an embodiment of the invention.

FIGS. 20A-20H are a series of diagrams of an exemplary centrally managed system for tuning multiple enhanced node-based logistics receptacles involving a backend server in accordance with an embodiment of the invention. Referring now to FIG. 20A, backend server 100 is shown as being operative to be in communication with various exemplary enhanced node-based logistics receptacles (e.g., receptacles 150*a*-150*c*) via network 105 as well as exemplary logistics asset 700*a*. As explained above, backend server maintains an exemplary management profile (e.g., management profile 835) related to each of the enhanced node-based logistics receptacles.

A first of the enhanced node-based logistics receptacles 150*a* is operative to communicate with the backend server 100 and includes multiple monitored receptacle components, a first bridge node (e.g., similar to bridge node 200, 16200), and a first wireless accessory sensor node (e.g., similar to sensor node 210, 1002, 1002*a*, 1002*b*). The first wireless accessory sensor node is coupled to or otherwise equipped with a group of first sensors that collectively monitor one or more interactions with respective ones of the monitored receptacle components of first receptacle 150*a* over a first recording time period. The first bridge node (as part of receptacle 150*a*) is operative to retrieve first event information (information related to sensor data generated by the first sensors) from the first wireless accessory sensor node and transmit the retrieved first event information at a first upload time to the backed server 100.

A second of the node-based logistics receptacles 150*b* is operative to communicate with the backend server 100 and includes multiple of its own monitored receptacle components, a second bridge node (e.g., similar to bridge node 200, 16200), and a second wireless accessory sensor node (e.g., similar to sensor node 210, 1002, 1002*a*, 1002*b*). The second wireless accessory sensor node is coupled to or otherwise equipped with a group of second sensors that collectively monitor one or more interactions with respective ones of the monitored receptacle components of receptacle 150*b* over a second recording time period. The second bridge node (as part of receptacle 150*b*) is operative to retrieve second event information from the second wireless accessory sensor node, where the second event information is related to sensor data generated by the second plurality of sensors. The second bridge node is then operative to transmit the retrieved second event information at a second upload time to the backed server.

As illustrated in FIG. 20A, backend server 100 is programmatically configured (e.g., via executable code, such as an embodiment of exemplary server control and management code 825) to be operative to transmit a first setup message 2000*a* to the first bridge node within receptacle 150*a*. In general, the first setup message 2000*a* presents a command or instructions that initiate or otherwise cause a configuring task related to operation of the first bridge node to be undertaken by the first bridge node. Such a configuring task, in this embodiment shown in FIG. 20A, relates to at least the first recording time period for the first wireless accessory sensor node and the first upload time for the first bridge node to transmit the retrieved first event information to the backend server.

Figure 20B:
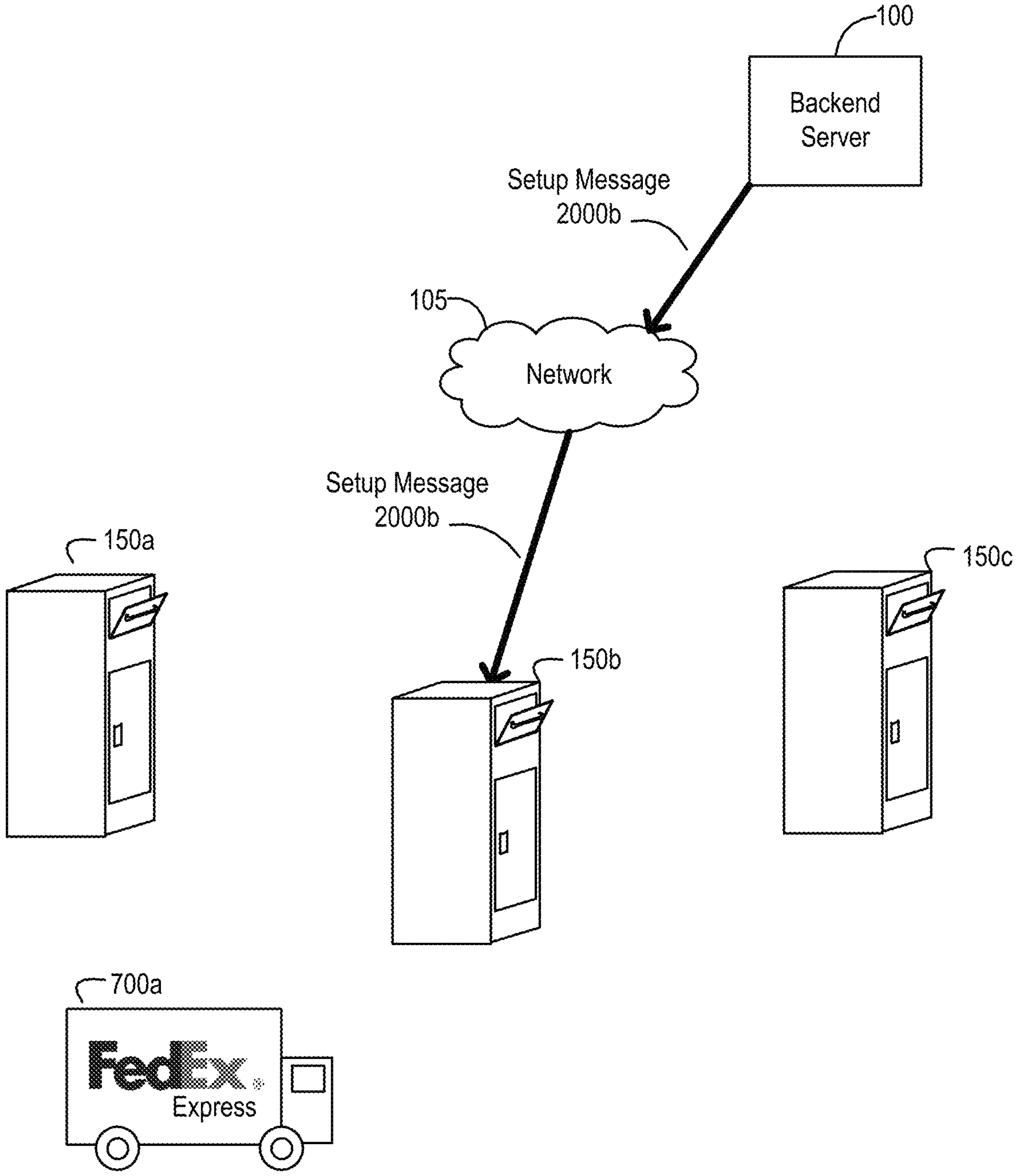

In FIG. 20B, backend server 100 is programmatically configured (e.g., via executable code, such as an embodiment of exemplary server control and management code 825) to be operative to transmit a second setup message 2000*b* to the second bridge node within receptacle 150*b*. As with the first setup message 2000*a*, the second setup message 2000*b* presents a command or instructions that initiate or otherwise cause a configuring task related to operation of the second bridge node to be undertaken by the second bridge node. Such a configuring task, in this embodiment shown in FIG. 20B, relates to at least the second recording time period for the second wireless accessory sensor node and the second upload time for the second bridge node to transmit the retrieved second event information to the backend server.

In further embodiments involving more specific implementations of such setup messages, the first setup message may, for example, configure operation of the first bridge node related to (a) the first recording time period for the first wireless accessory sensor node, (b) a first predetermined time for retrieving the first event information, and (c) the first upload time for transmitting the retrieved first event information to the backend server. Further still, another example may also have the second setup message configuring operation of the second bridge node related to (d) the second recording time period for the second wireless accessory sensor node, (e) a second predetermined time for retrieving the second event information, and (f) the second upload time for transmitting the retrieved second event information to the backend server.

Similar to that described above, those skilled in the art will appreciate that the respective wireless accessory sensor node in a particular receptacle (e.g., the first receptacle 150*a* and the second receptacle 150*b*) may operate by monitoring interactions with its sensors. Such a first/second wireless accessory sensor node is then operative to (a) detect, within its recording time period and using one or more of its sensors, a change in relevant monitored receptacle components, where the detected change corresponds to interactions with the respective monitored receptacle components; (b) record sensor data generated by its sensors (including timestamped information reflecting the detected change); and (c) broadcast an updated advertising signal by that sensor node where the updated advertising signal has a data available flag set indicating that one of the wireless accessory sensor nodes has event information available for upload by the bridge node in that particular receptacle (where such event information includes at least the timestamped information).

Figure 20C:
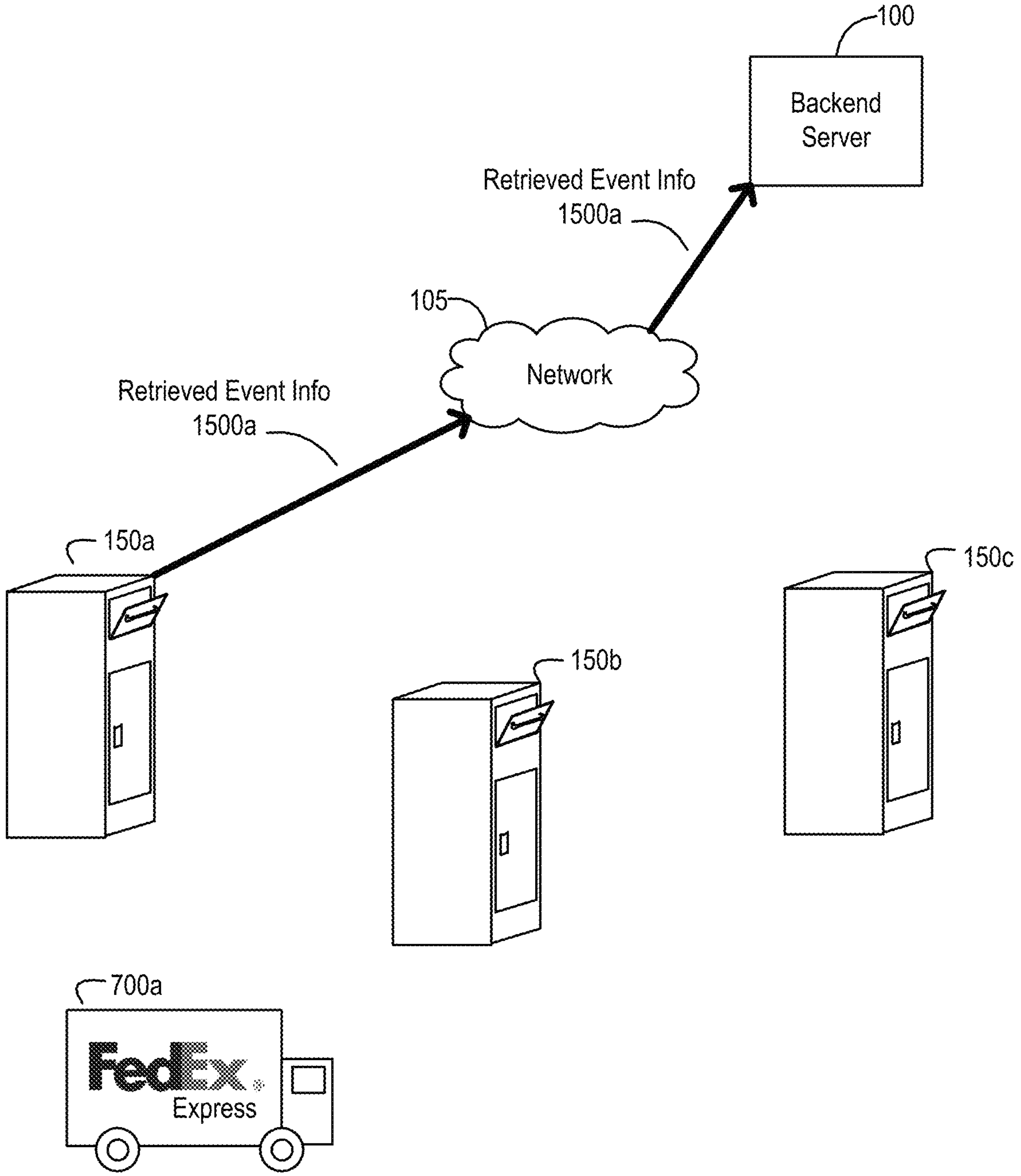
Figure 20D:
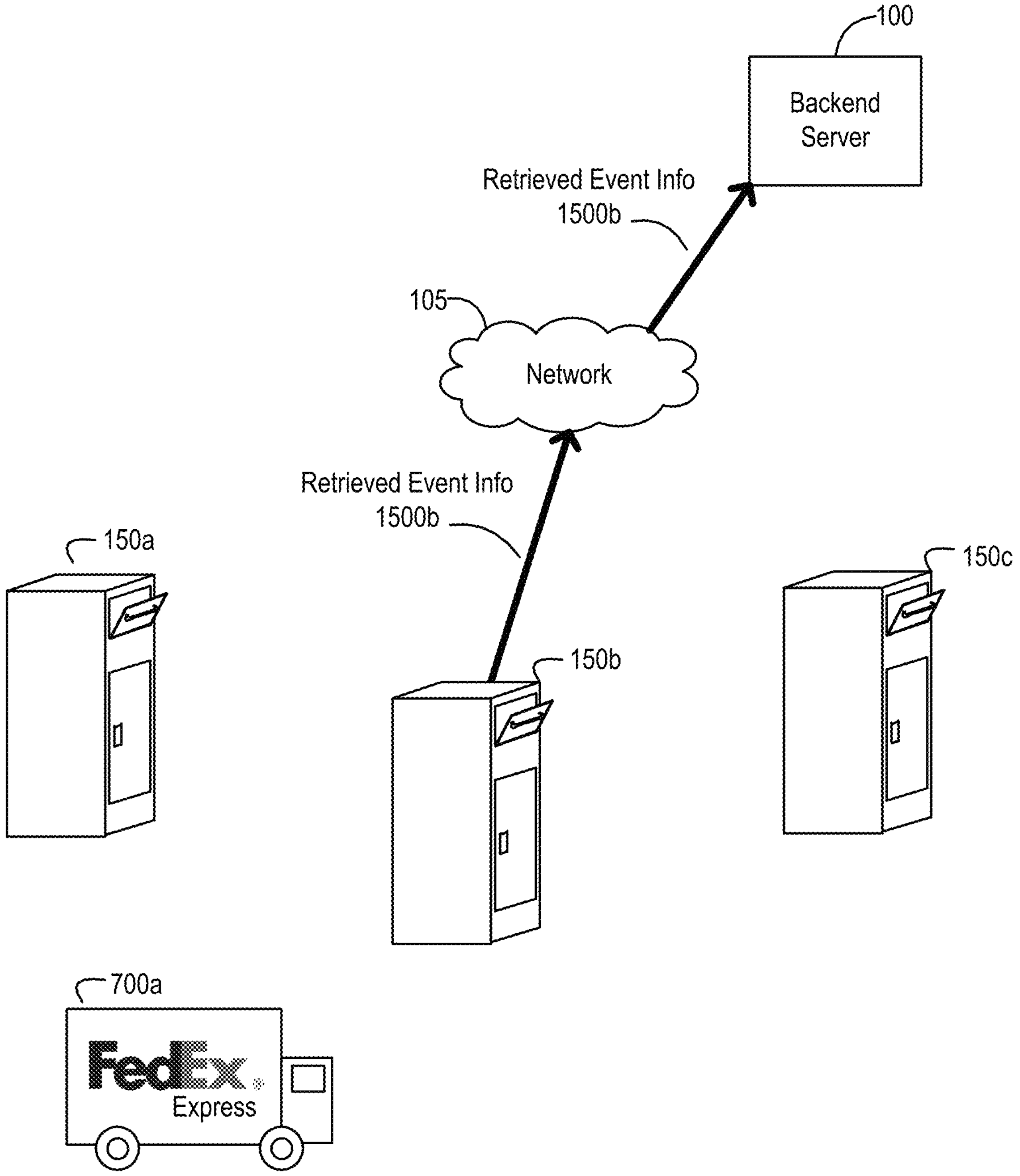

As shown in FIGS. 20C and 20D, backend server 100 is shown operative to receive the retrieved first event information 1500*a* from the first bridge node and the retrieved second event information 1500*b* from the second bridge node, respectively. Such retrieved event information from each of receptacles 150*a* and 150*b* represents changes in state (e.g., interactions with particular monitored components) of those receptacles 150*a*, 150*b*.

Once the retrieved first event information 1500*a* and the retrieved second event information 1500*b* are received by backend server 100, backend server 100 is further operative to compare the retrieved first event information 1500*a* with information in the management profile (e.g., information in exemplary management profile 835 maintained on server 100 that relates to receptacle 150*a*) and compare the retrieved second event information 1500*b* with the management profile (e.g., other information in exemplary management profile 835 maintained on server 100 that relates to receptacle 150*b*). Backend server 100 then revises, changes, or otherwise updated the management profile in a type of learning task based upon the comparison of the retrieved first event information 1500*a* with information in the management profile 835 and the comparison of the retrieved second event information 1500*b* with information in the management profile 835.

In such an embodiment, exemplary management profile 835 may maintain different types of information on each of the different managed node-based logistics receptacles and in different ways (e.g., as part of a single data structure as the profile, as part of a database as the profile with differing records for each of the different receptacles, as part of distinctly stored data structures collective referred to as the profile, and the like). In one example, the management profile may be implemented with a prior component engagement history for each of the enhanced node-based logistics receptacles (e.g., where the prior component engagement history for each of the enhanced node-based logistics receptacles includes a separate prior history of interactions with the monitored receptacle components for each of the receptacles). In another example, the management profile may be implemented with a server-tracked historic use pattern for each of the enhanced node-based logistics receptacles (e.g., a pattern of engagement events (such as delivery or pickup events) related to each of the receptacles; a threshold occupancy pattern profile identifying a frequency of reaching a threshold occupied level within each of the receptacles (or a particular threshold occupied level for particular receptacles where they may be different for different receptacles); an overload pattern profile identifying a frequency of reaching an overload condition for each of the receptacles (or a particular overload pattern/condition for particular receptacles where they may be different for different receptacles). In yet another example, the management profile may be implemented with a logistics asset profile related to logistics assets assigned to service each of the particular receptacles. In more detail, the logistics asset profile may identify a first logistics asset assigned to service one receptacle and identify a second logistics asset assigned to service another of the receptacles. In some situations, the logistics asset profile may identify a first logistics asset commonly assigned to service some or all of the receptacles.

Figure 20E:
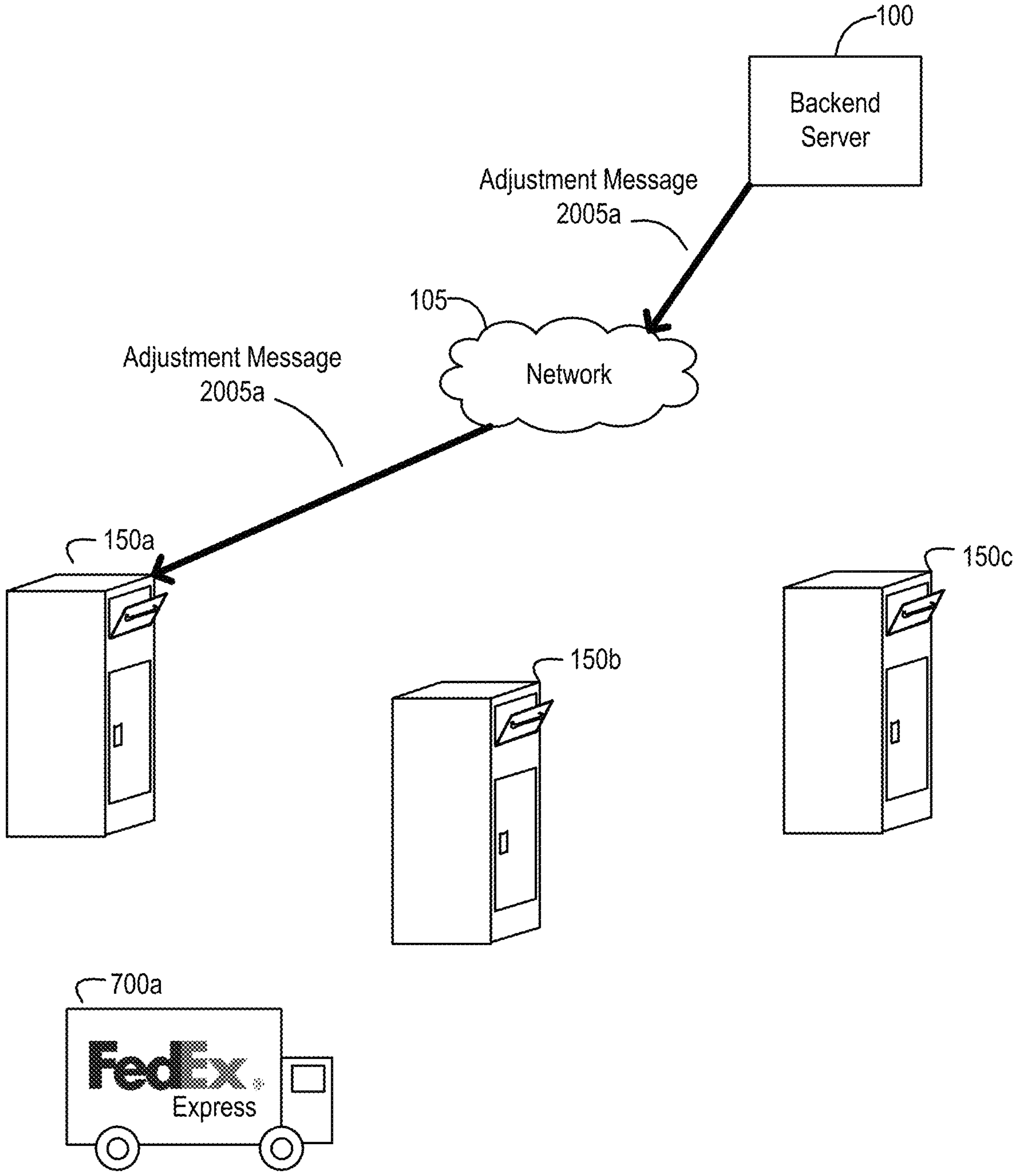
Figure 20F:
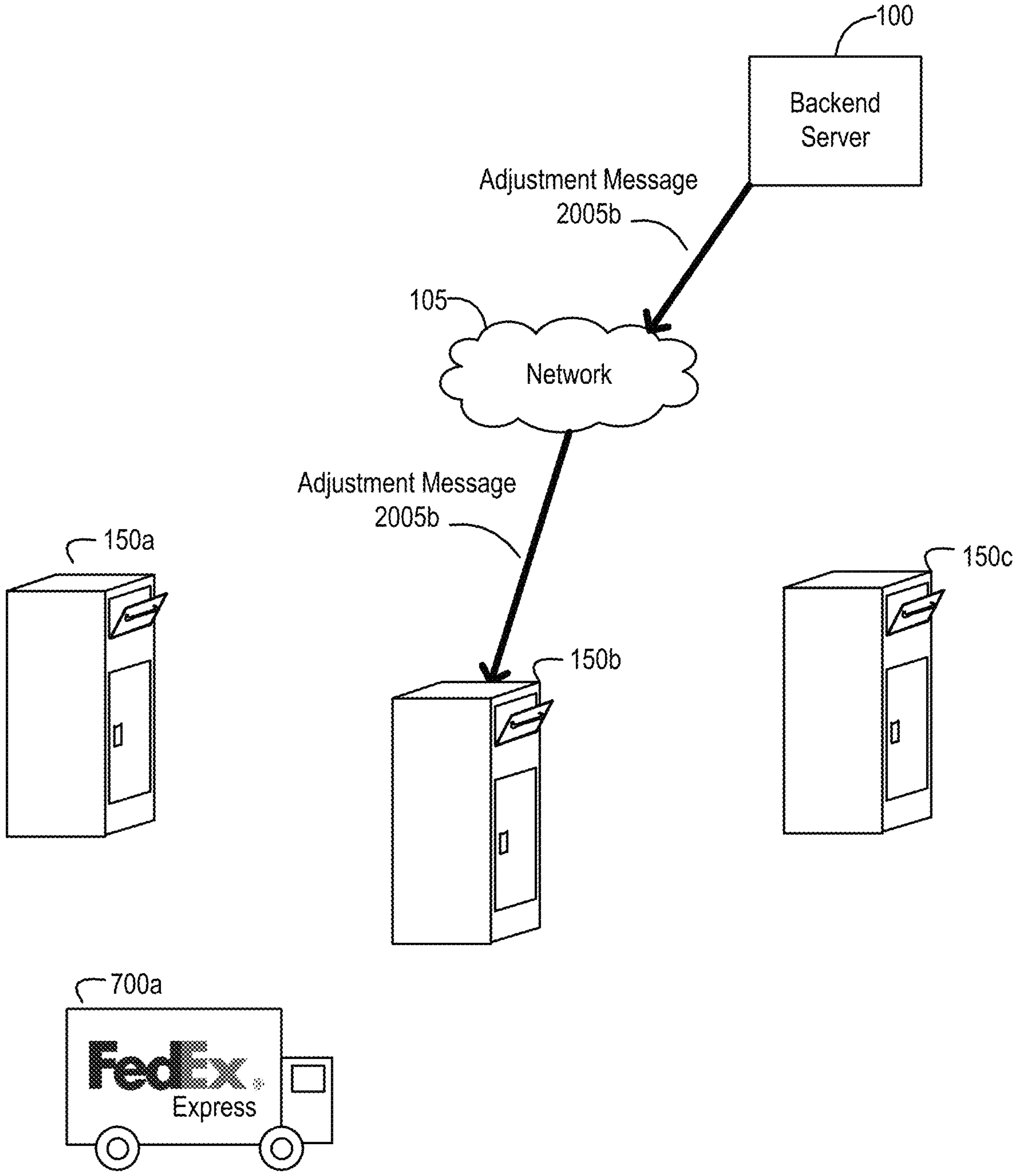

FIGS. 20E and 20F illustrate how backend server 100 responds to such "learning" based upon information from multiple node-based logistics receptacle by generating and transmitting an adjustment message to at least one of the bridge nodes. For example, FIG. 20E shows backend server 100 being operative to transmit an adjustment message 2005*a* to the first bridge node in receptacle 150*a*, where that adjustment message 2005*a* is based upon the revised management profile 835. Such an adjustment message 2005*a* causes or otherwise initiates the first bridge node to undertake a first timing change to operation of the first bridge node. For example, in such an embodiment, the first timing change may cause the first bridge node to instruct the first wireless accessory sensor node to update the first recording time period over which the sensors generate the sensor data related to the first event information. In another example, the first timing change may involve an update to a first predetermined time on when the first bridge node retrieves the first event information upon implementing the update. In yet another example, the first timing change may involve an update to the first upload time on when the first bridge node is operative to transmit the retrieved first event information to the backend server upon implementing the update. Thus, a reporting receptacle may be tuned and managed in such a manner by backend server, as well as non-reporting receptacles, in such an embodiment.

In some embodiments, further adjustments may be made to other receptacles being managed by backend server—e.g., via an additional adjustment message 2005*b* transmitted by backend server 100 to another bridge node (such as the second bridge node disposed in and operating as part of node-based logistics receptacle 150*b* or a bridge node disposed in and operating as part of node-based logistics receptacle 150*c*). For example, an embodiment may have the additional adjustment message 2005*b* generated based upon the revised management profile. Such an additional adjustment message 2005*b* initiates a second timing change to operation of the second bridge node (e.g., causes the second bridge node to undertake a second timing change to operation of the second bridge node). Such a second timing change may, for example, cause the second bridge node to instruct the second wireless accessory sensor node to update the second recording time period over which the second plurality of sensors generate the sensor data related to the second event information; update a second predetermined time on when the second bridge node is operative to retrieve the second event information upon implementing the update; and/or update the second upload time on when the second bridge node is operative to transmit the retrieved second event information to the backend server upon implementing the update.

Figure 20G:
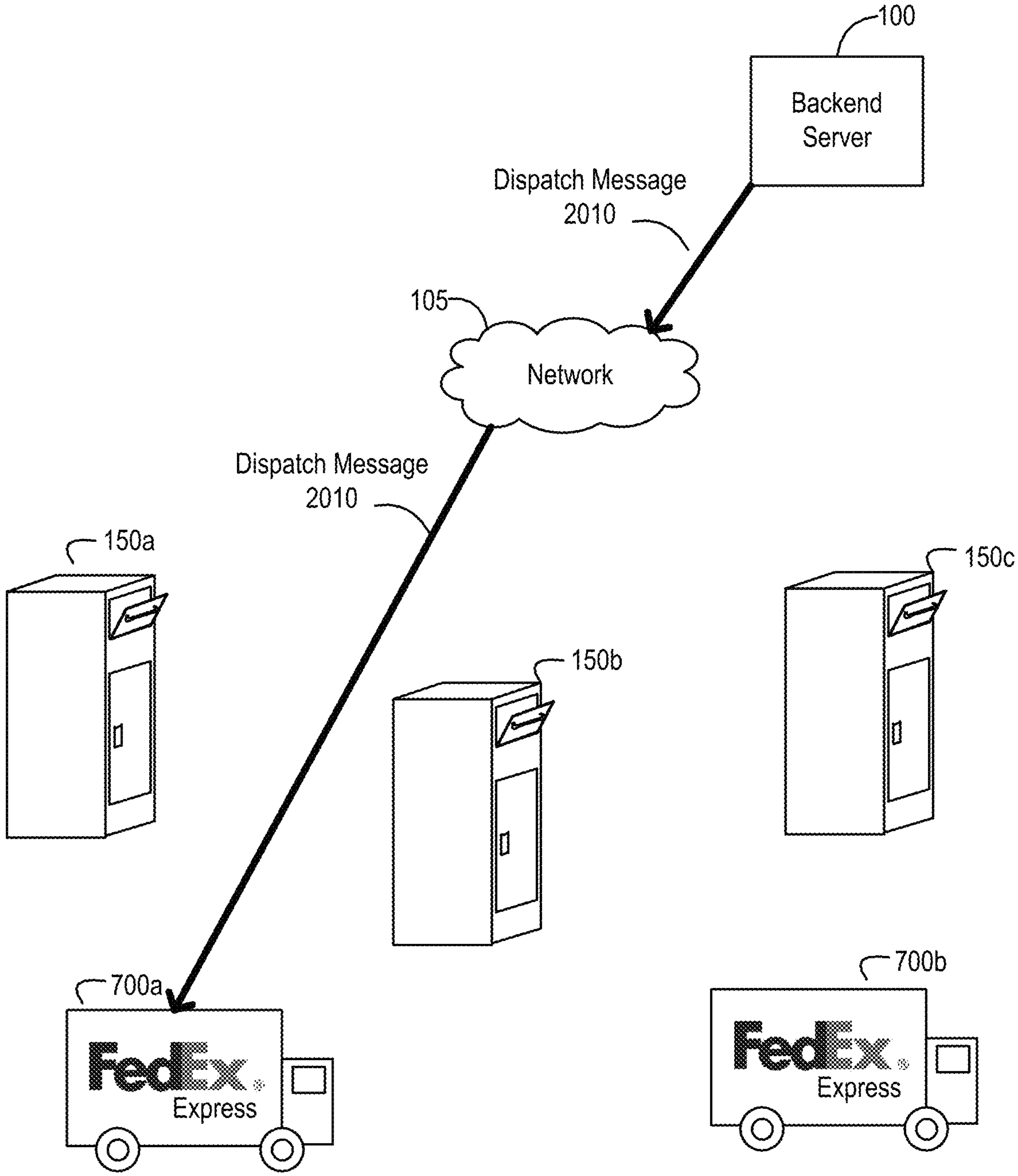
Figure 20H:
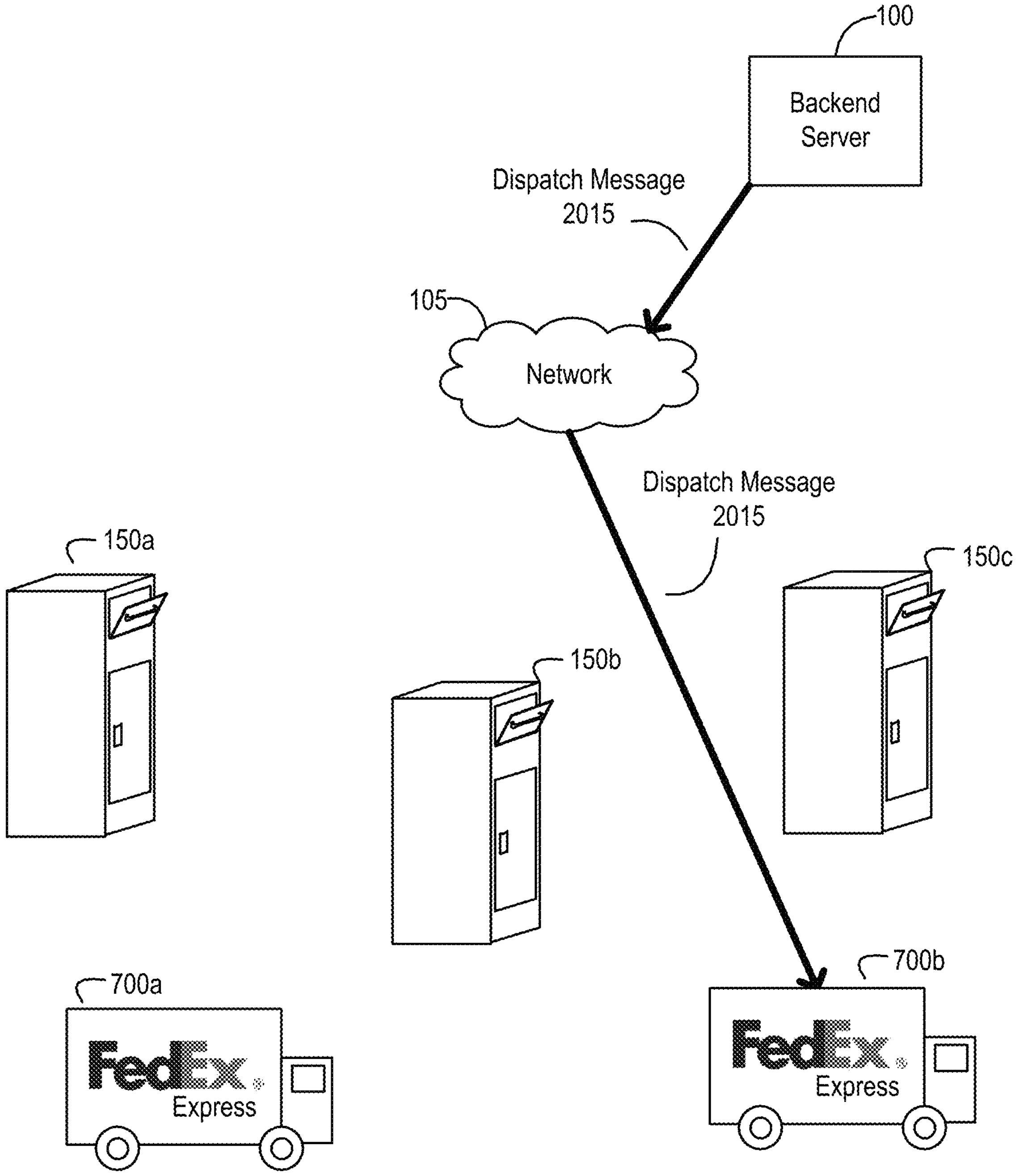

FIGS. 20G and 20H illustrate how backend server 100 may further respond by initiating a dispatched logistics operation. For example, FIG. 20G shows backend server 100 being further programmatically operative, after revising the management profile 835 in this embodiment, to initiate a dispatched logistics operation related to at least one of the enhanced node-based logistics receptacles based upon the revised management profile. As shown in FIG. 20G, backend server 100 generates and transmits an exemplary dispatch message 2010 and transmits it through network 105 to a logistics asset 700*a* for the dispatched logistics operation. In some embodiments, such as that shown in FIG. 20H, initiation of the dispatched logistics operation may, for example, be initiated by backend server 100 via dispatch message 2015 to an alternative logistics asset than previously assigned to the at least one of the enhanced node-based logistics receptacles (e.g., to logistics asset 700*b*, rather than to previously assigned logistics asset 700*a*). Further still, an embodiment may have such a dispatched logistics operation initiated by the backend server 100 at an alternative time than previously scheduled for a receptacle.

In some embodiments, backend server 100 may implement an even more robust type of "learning" using the reported event information from different node-based logistics receptacles as well as environmental context data related to particular receptacle(s). Such embodiments may have backend server 100 revising the management profile with consideration of environmental context data (e.g., exemplary context data 855, information maintained in exemplary CLR context database 850, and the like) related to at least one of the node-based logistics receptacles being tuned by the backend server. For example, an embodiment may have backend server 100 being programmatically configured to be operative to revise management profile 835 based upon (a) a comparison of the retrieved first event information with the management profile; (b) a comparison of the retrieved second event information with the management profile; and (c) a relevant portion of the environmental context data (e.g., exemplary context data 855, information maintained in exemplary CLR context database 850, context data maintained in database 180 and accessible to server 100) related to at least the first of the enhanced node-based logistics receptacles. In yet another example, another embodiment may have backend server 100 being programmatically configured to be operative to revise management profile 835 based upon (a) a comparison of the retrieved first event information with the management profile 835; (b) the comparison of the retrieved second event information with the management profile; (c) a relevant portion of the environmental context data (e.g., exemplary context data 855, information maintained in exemplary CLR context database 850, context data maintained in database 180 and accessible to server 100) related to the first node-based logistics receptacle (e.g., receptacle 150*a*); and (d) another relevant portion of the environmental context data related to the second node-based logistics receptacle (e.g., receptacle 150*b*). Those skilled in the art will appreciate that consideration of context data related to particular node-based logistics receptacles as the backend server 100 compares interactions with different node-based logistics receptacles to engagement histories, use patterns, and other profiled historic usage information on those receptacles provides an even more detailed way of backend server 100 learning and adjusting to how such node-based logistics receptables may be managed and adjusted to better suit the usage environment and operating situation for the different node-based logistics receptacles.

In another example, an embodiment of an exemplary centrally managed system for tuning a different enhanced node-based logistics receptacles that revises a management profile using reported event information from multiple receptacles as well as environmental context data about the physical operating environment relative to such receptacles may include a backend server (such as backend server 100) and multiple node-enabled logistics receptacles (such as exemplary receptacles 150*a* and 150*b*). The system's backend server maintains at least a management profile (e.g., exemplary management profile 835) related to each of the enhanced node-based logistics receptacles and environmental context data about a physical operating environment of each of the enhanced node-based logistics receptacles (e.g., exemplary context data 855, information maintained in exemplary CLR context database 850, context data maintained in database 180 and accessible to server 100).

The system's first enhanced node-based logistics receptacle (e.g., receptacle 150*a*) is operative to communicate with the backend server 100 and has at least multiple monitored receptacle components (e.g., entrance opening, temporary storage area, selectively accessible retrieval door), a first wireless accessory sensor node having multiple sensors that collectively monitor one or more interactions with respective ones of the monitored receptacle components of receptacle 150*a* over a first recording time period, and a first bridge node operative to retrieve first event information from the first wireless accessory sensor node and transmit the retrieved first event information at a first upload time to the backed server. The first event information is related to sensor data generated by the sensors coupled to the first wireless accessory sensor node (e.g., light data, motion data, image data, status data, weight data, force data, and the like as exemplary sensor data).

The system's second enhanced node-based logistics receptacles (e.g., receptacle 150*b*) is also operative to communicate with the backend server 100 and has at least multiple monitored receptacle components (e.g., entrance opening, temporary storage area, selectively accessible retrieval door), a second wireless accessory sensor node having multiple sensors that collectively monitor one or more interactions with respective ones of the monitored receptacle components of receptacle 150*b* over a second recording time period, and a second bridge node operative to retrieve second event information from the second wireless accessory sensor node and transmit the retrieved second event information at a second upload time to the backed server. The second event information is related to sensor data generated by the sensors coupled to the second wireless accessory sensor node (e.g., light data, motion data, image data, status data, weight data, force data, and the like as exemplary sensor data).

The system's backend server in this particular embodiment is programmatically configured to be operative to transmit a first setup message to the first bridge node and a second setup message to the second bridge node. In this example, the first setup message functions to configure operation of the first bridge node related to at least (a) the first recording time period for the first wireless accessory sensor node and (b) the first upload time for transmitting the retrieved first event information to the backend server. Likewise, the second setup message functions to configure operation of the second bridge node related to at least (c) the second recording time period for the second wireless accessory sensor node and (d) the second upload time for transmitting the retrieved second event information to the backend server. The system's backend server is further operative to receive the retrieved first event information from the first bridge node and the retrieved second event information from the second bridge node; and then compare the retrieved first event information with the management profile and compare the retrieved second event information with the management profile.

Notably, the system's backend server in this particular embodiment if also programmatically configured to revise the management profile (e.g., exemplary management profile 835) based upon (1) the comparison of the retrieved first event information with the management profile, (2) the comparison of the retrieved second event information with the management profile, (3) a first portion of the environmental context data related to the first of the enhanced node-based logistics receptacles, and (4) a second portion of the environmental context data related to the second of the enhanced node-based logistics receptacles.

The backend server in this embodiment then transmits at least an adjustment message to the first bridge node, where such an adjustment message is based upon the revised management profile and such an adjustment message initiates a first timing change to operation of at least the first bridge node (e.g., an update to the first upload time on when the first bridge node is operative to transmit the retrieved first event information to the backend server upon implementing the update). In other examples, the backend server may send an additional adjustment message to the second bridge node where such an additional adjustment message is based upon the revised management profile initiates a second timing change to operation of the second bridge node (e.g., an update to the second upload time on when the second bridge node is operative to transmit the retrieved second event information to the backend server upon implementing the update).

The environmental context data (e.g., data 855) used in this particular embodiment, may be implemented with for example, traffic data related to the location of each of the enhanced node-based logistics receptacles (e.g., exemplary traffic data 865, 180*b*); weather data related to the location of each of the enhanced node-based logistics receptacles (e.g., exemplary weather data 870, 180*c*); fuel cost data related to the location of each of the enhanced node-based logistics receptacles (e.g., kept as part of data 855); crime data related to the location of each of the enhanced node-based logistics receptacles (e.g., exemplary crime data 860, 180*a*); logistics asset staffing data related to the location of each of the enhanced node-based logistics receptacles (e.g., exemplary logistics asset staffing data 875, 180*d*); logistics asset cost data; and other third party context data. As previously explained, such environmental context data may be kept on backend server 100 as exemplary context data 855 and maintained in CLR context database 850 or database 180. Such environmental context data may provide geographic crime data 860 (e.g., on-going crime scenes, crime patterns, different types of crimes in particular areas, and the like), traffic data 865 (e.g., current traffic, traffic patterns, construction locations, and the like), weather data 870 (e.g., current weather happening in particular areas, weather forecasts, historic weather events for areas, and the like), logistics asset staffing data 875 (e.g., couriers deployed in delivery vehicles as mobile logistics assets, shift change information on logistics personnel, and the like), logistics asset cost data 880 (e.g., fuel costs, and the like), as well as other third-party generated data 885 that relates to the operating environment or operations of any of the connected logistics receptacles managed by backend server 100. Further still, those skilled in the art will appreciate that the environmental context data about the physical operating environment of each of the enhanced node-based logistics receptacles may be implemented with information about an anticipated operating environment for at least one of the enhanced node-based logistics receptacles, where that receptacle is anticipated to be moved to a second location corresponding to the anticipated operating environment for at least one of the enhanced node-based logistics receptacles.

Those skilled in the art will appreciate that further examples of such a system may implement the server-maintained management profile in a manner similar to that described above (e.g., as with exemplary management profile 835 that may include prior component engagement histories for the different managed receptacles, historic use patterns for the different managed receptacles, information on logistics resources assigned to the different managed receptacles, thresholds for different receptacles, and the like). Those skilled in the art will appreciate that further examples of such a system may have backend server being responsive to cause or otherwise initiate/alter logistics operations for the managed node-based logistics receptacles similar to that described in other embodiments above. Those skilled in the art will also appreciate that further examples of such a system may have backend server setting up each of the managed node-based logistics receptacles in similar ways to that described in other embodiments above.

Enhanced Pickup Processing

Various embodiments described above focus on ways for a backend server to "tune" or otherwise modify operations of an exemplary connected logistics receptacle. Further embodiments described below relate to enhanced methods for multi-domain management of such an exemplary connected node-based logistics receptacle in response to a dispatched logistics operation involving the node-based logistics receptacle and a mobile courier node. In general, embodiments may have an initiated dispatched logistics operation beginning where a courier (e.g., a type of logistics asset) being deployed to service a particular logistics receptacle (e.g., exemplary receptacle 150, 1000, and the like). As part of such a logistics operation (e.g., a pickup operation), interactions with monitored components of the receptacle (such as opening of the retrieval door) may trigger a sensor coupled to the receptacle's wireless accessory sensor node. The receptacle's bridge node then reports a new event to the backend server if such an event is seen before the last drop-off time. Enhancing this further, the receptacle's bridge node may report chute interactions and/or interactions detected relative to the receptacle's temporary storage area. The courier's mobile or handheld node (a type of mobile bridge node with scanning capability) may record one or more barcode pickup scans on what is retrieved. Information on such interactions and pickup scans are each sent to the backend server by the receptacle's bridge node and the courier's node, respectively. The backend server in such an embodiment uses the chute/temporary storage interactions (knowing no further will be detected for what is being retrieved) and barcode pickup scans of each delivery item in the logistics receptacle (or compartment of the logistics receptacle) to adjust for pickup thresholds, reporting period, etc. for that particular logistics receptacle. Such an enhancement may extend and expand upon the backend server's ability to tuning for more specific conditions.

Figure 13A:
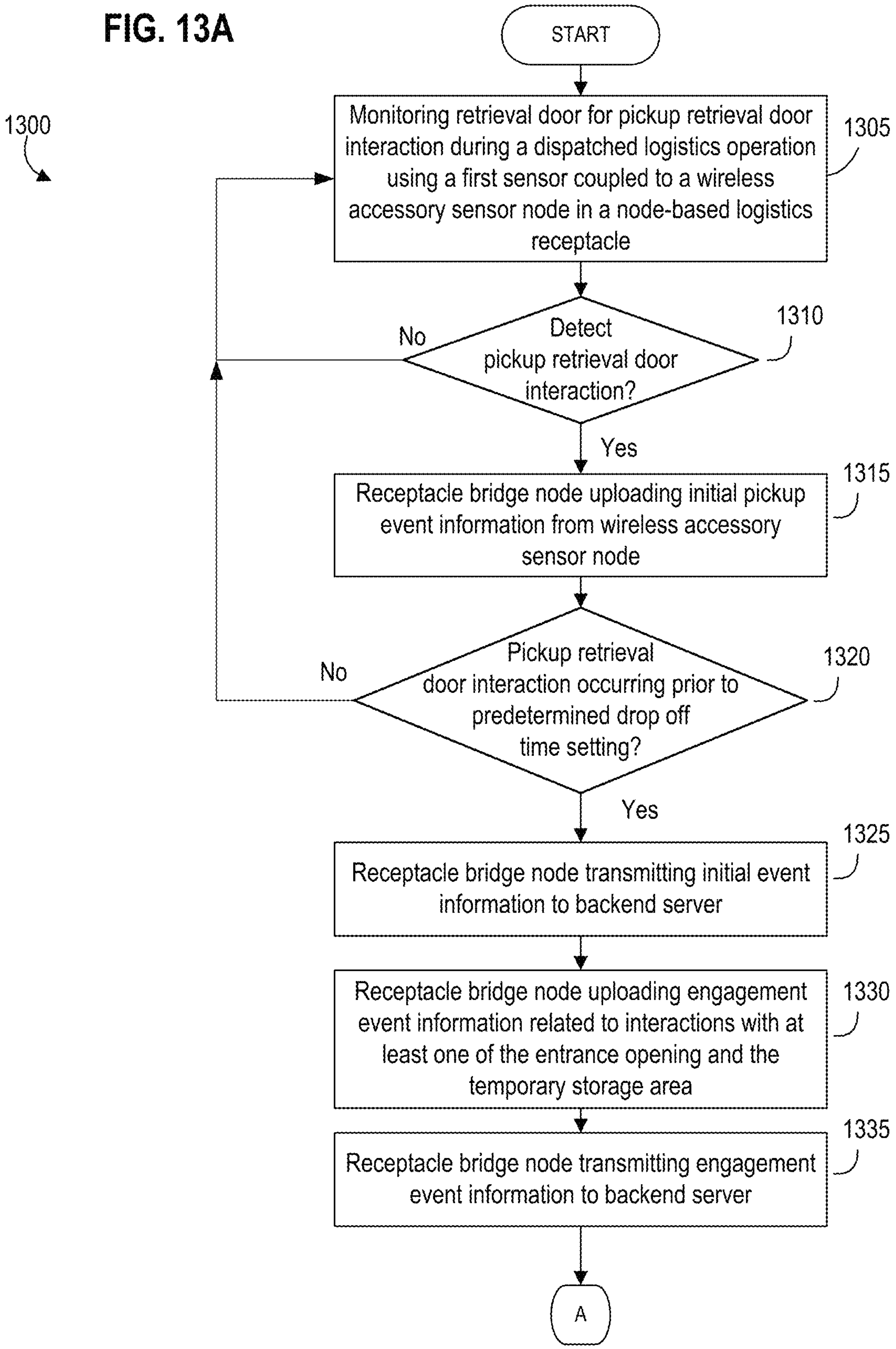
FIGS. 13A and 13B collectively are a flow diagram illustrating an exemplary method for multi-domain management of a node-based logistics receptacle in response to a dispatched logistics operation involving the node-based logistics receptacle and a mobile courier node in accordance with an embodiment of the invention.
Figure 13B:
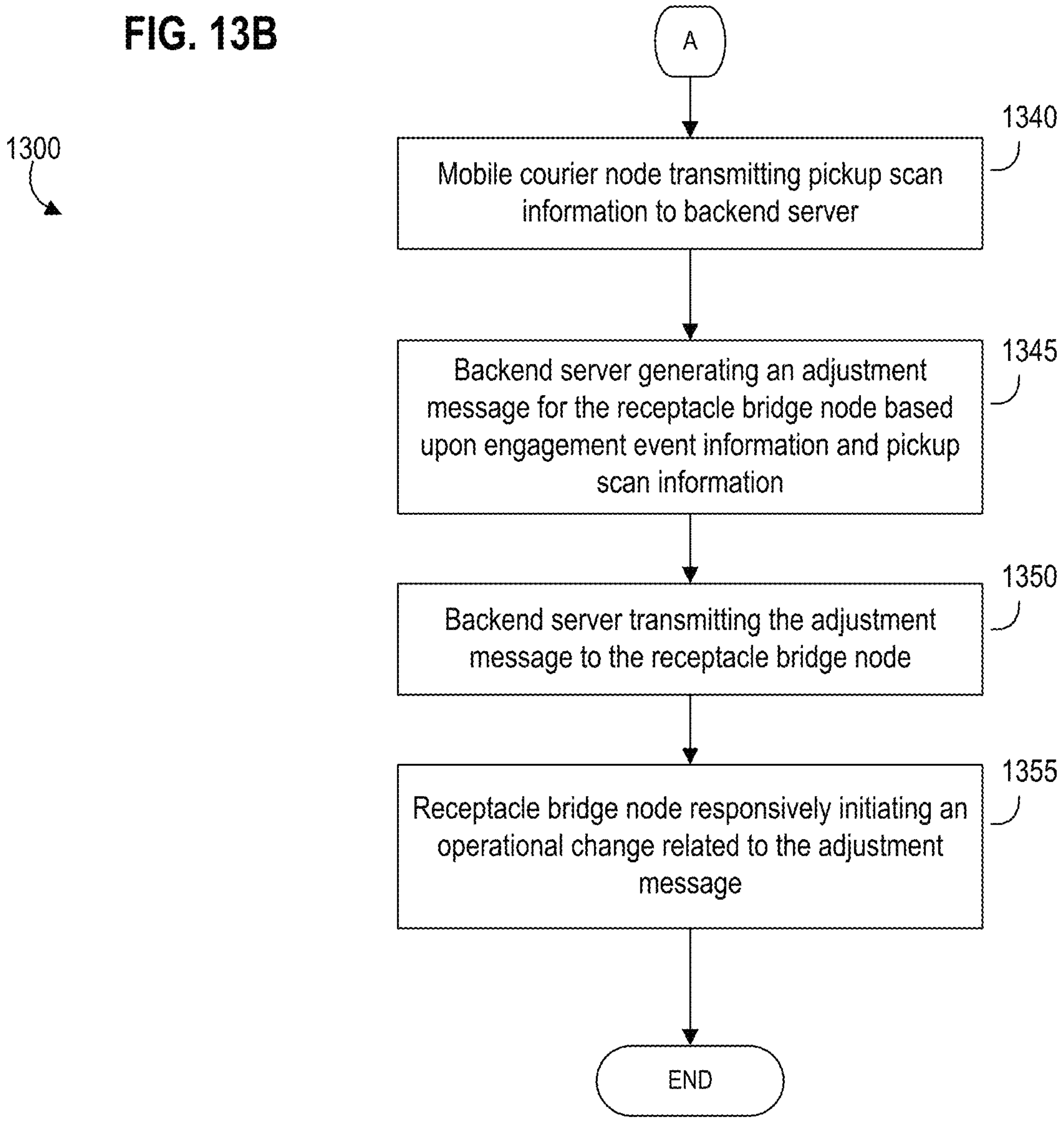

FIGS. 13A-13B collectively represent a flow diagram illustrating an exemplary method for multi-domain management of a node-based logistics receptacle (e.g., exemplary logistics receptacle 50, 1000, 1015) in response to a dispatched logistics operation involving the node-based logistics receptacle and a mobile courier node in accordance with an embodiment of the invention. An embodiment of such an exemplary mobile courier node may be implemented similar to exemplary bridge node 200 as shown and explained relative to FIG. 3, but programmatically configured via onboard program code (in place of CLR control and management code 315 and info/data 320-330) to be operative to communicate with backend server 100 and include a sensor capable of capturing machine-readable references (such as scannable images of barcodes, QR codes, and the like visible on the outside of a delivery item) or textual information (such a textual information on a label on a delivery item).

Referring now to FIG. 13A, exemplary method 1300 is shown as a method for multi-domain management of a node-based logistics receptacle in response to a dispatched logistics operation involving the node-based logistics receptacle and a mobile courier node. As referenced in method 1300, the node-based logistics receptacle (e.g., receptacle 150) has a multiple storage receptacle components including at least an entrance opening (e.g., entrance opening 155/entrance door 156) for receiving one or more shipping items (e.g., package 170), a temporary storage area (e.g., storage area 205) for temporarily maintaining the shipping items once received, and a retrieval door (e.g., door 160) providing selective access to the shipping items within the temporary storage area. The node-based logistics receptacle used in method 1300 further has a wireless accessory sensor node coupled to multiple sensors (e.g., exemplary wireless accessory sensor node 210, 1002 operatively coupled to different sensors) disposed on the node-based logistics receptacle and a receptacle bridge node (e.g., exemplary bridge node 200) disposed on the node-based logistics receptacle operative to communicate with a backend server (e.g., server 100).

At step 1305, method 1300 begins by monitoring the retrieval door of the node-based logistics receptacle during the dispatched logistics operation for pickup retrieval door interactions using a first of the sensors coupled to the wireless accessory sensor node. At step 1310, method 1300 proceeds to step 1315 when detecting a pickup retrieval door interaction with the retrieval door of the node-based logistics receptacle during the dispatched logistics operation. If no pickup retrieval door interaction is detected, method 1300 returns to step 1305 for continued monitoring.

In more detail, an embodiment of method 1300 may implement step 1310 more specifically by detecting the retrieval door interaction using a sensor coupled to the wireless accessory sensor node as a change in state of retrieval door 160 based upon sensor data generated by a sensor monitoring door 160 (e.g., where the wireless accessory sensor node is implemented by exemplary accessible retrieval door sensor node 240, which has at least one sensor (such as a motion sensor, orientation status sensor, accelerometer, magnetic sensor, and the like) that monitors for a change in the state of door 160). Step 1310 then has the wireless accessory sensor node recording timestamped information and broadcasting an updated advertising signal. The timing information recorded in this implementation of step 1310 reflects timing associated with or corresponding to the retrieval door interaction as the detected change in state of the retrieval door. The broadcasted updated advertising signal has a data available flag set within the updated advertising signal, where that data available flag indicating the wireless accessory sensor node has the initial pickup event information available for upload by the receptacle bridge node. Such initial pickup event information includes at least the timestamped information reflecting the detected change in state of the retrieval door.

At step 1315, method 1300 has the receptacle bridge node uploading initial pickup event information from the wireless accessory sensor node. Such initial pickup event information corresponds to at least timing associated with the pickup retrieval door interaction as detected by the first of the sensors in step 1310.

Next, at step 1320, the receptacle bridge node determines whether the pickup retrieval door interaction occurred prior to a predetermined drop off time setting for the node-based logistics receptacle based upon the initial pickup event information. If so, method 1300 proceeds from step 1320 to step 1325. Otherwise, method 1300 returns to step 1305.

At step 1325, method 1300 proceeds with the receptacle bridge node transmitting the initial event information to the backend server. Then, at step 1330, method 1300 proceeds with the receptacle bridge node uploading engagement event information from the wireless accessory sensor node. The engagement event information uploaded corresponding to one or more interactions with at least one of (a) the entrance opening as detected by a second of the sensors coupled to the wireless accessory sensor node, and (b) the temporary storage area as detected by a third of the sensors coupled to the wireless accessory sensor node.

In more detail, an embodiment of method 1300 may implement step 1330 with more specificity to upload the engagement event information by (i) first detecting (using the second of the sensors coupled to the wireless accessory sensor node) the one or more interactions with the entrance opening; (ii) recording, by the wireless accessory sensor node, entrance opening timestamped information reflecting each of the detected interactions with the entrance opening; (iii) detecting (using the third of the sensors coupled to the wireless accessory sensor node) the one or more interactions with the temporary storage area; (iv) recording, by the wireless accessory sensor node, storage area timestamped information reflecting each of the detected one or more interactions with the temporary storage area; (v) broadcasting, by the wireless accessory sensor node, an updated advertising signal having a data available flag set within the updated advertising signal, the data available flag indicating the wireless accessory sensor node has the engagement event information available for upload by the receptacle bridge node; and (vi) uploading, by the receptacle bridge node, the engagement event information from the wireless accessory sensor node in response to the receptacle bridge node detecting the data available flag set within the updated advertising signal, the engagement event information including at least the entrance opening timestamped information and the storage area timestamped information. In such a further embodiment of step 1330, the one or more interactions with the entrance opening/temporary storage area may be interactions that occur prior to the predetermined drop off time setting for the node-based logistics receptacle.

At step 1335, method 1300 proceeds with the receptacle bridge node transmitting the engagement event information to the backend server. After step 1335, method 1300 proceeds through transition A to step 1340 on FIG. 13B, where method 1300 continues with the mobile courier node transmitting pickup scan information to the backend server. Such pickup scan information represents the one or more shipping items as retrieved from the temporary storage area as part of the dispatched logistics operation. For example, the mobile courier node may be used by logistics personnel (e.g., courier, gig worker, and the like) operating the exemplary logistics asset (e.g., asset 700*a*) that has been dispatched for the dispatched logistics operation. A further embodiment of method 1300 may implement step 1340 with more specificity with the mobile courier node generating the pickup scan information as barcode information representing the one or more shipping items as retrieved from the temporary storage area as part of the dispatched logistics operation; and then transmitting the pickup scan information to the backend server. In yet another example, step 1340 may be implemented with the mobile courier node the pickup scan information as wirelessly broadcast information detected from the one or more shipping items as retrieved from the temporary storage area as part of the dispatched logistics operation; and transmitting, by the mobile courier node, the pickup scan information to the backend server.

At step 1345, method 1300 proceeds by having the backend server generating an adjustment message for the receptacle bridge node in the node-based logistics receptacle based upon an assessment of the engagement event information and the pickup scan information. Such an adjustment message acts as a type of remote command for the receptacle bridge node that initiates an operational change for the node-based logistics receptacle. In more detail, an embodiment of method 1300 may implement step 1345 with the backend server 100 updating a server-maintained profile identifying a pattern of use of the node-based logistics receptacle (e.g., information kept in exemplary management profile 835 in memory of backend server 100) with the engagement event information and with the pickup scan information; determining the updated server-maintained profile indicates a threshold change in the pattern of use of the node-based logistics receptacle; and then generating the adjustment message for the receptacle bridge node in the node-based logistics receptacle based upon the updated server-maintained profile. In such a further embodiment of step 1345, the threshold change in the pattern of use of the node-based logistics receptacle may, for example, be a threshold change in a frequency of reaching a pickup threshold level for the node-based logistics receptacle or a threshold change in a historic average content amount for the node-based logistics receptacle (where the historic average content amount may, for example, relate to prior pickup scan information as reported to the backend server and the pickup scan information transmitted to the backend server as part of the dispatched logistics operation).

At step 1350, method 1300 proceeds with the backend server transmitting the adjustment message to the receptacle bridge node in the node-based logistics receptacle, and then step 1355 has the receptacle bridge node responsively initiating the operational change related to the adjustment message in response to receipt of the adjustment message.

In further embodiments of method 1300, such an operational change may involve altering pickup threshold values and/or operational timing adjustments. For example, an embodiment of method 1300 may implement initiating the operational change for the node-based logistics receptacle in step 1355 with the receptacle bridge node altering a pickup threshold value for the node-based logistics receptacle stored by the receptacle bridge node. In more detail, this may also involve the further steps of detecting, using one or more of the sensors coupled to the wireless accessory sensor node, one or more changes in a subsequent state of the storage receptacle components; having the receptacle bridge node upload subsequent event information from the wireless accessory sensor node (where the subsequent event information is related to the detected changes in the subsequent state of the storage receptacle components); having the receptacle bridge node comparing the subsequent event information and the pickup threshold value to determine a pickup request condition exists; and transmitting, by the receptacle bridge node, a pickup request message to the backend server, the pickup request message reporting the subsequent event information to the backend server and indicating the pickup request condition exists.

In another example, a further embodiment of method 1300 may implement initiating the operational change for the node-based logistics receptacle in step 1355 with the receptacle bridge node altering an operational timing value for the node-based logistics receptacle stored by the receptacle bridge node. Such an operational timing value may be implemented, for example, as the predetermined drop off time setting for the node-based logistics receptacle; a predetermined time value for when the receptacle bridge node uploads the engagement event information; a predetermined time value for when the receptacle bridge node transmits the engagement event information to the backend server; a predetermined recording time period during which the wireless accessory sensor node is operative to monitor the entrance opening; and/or a predetermined recording time period during which the wireless accessory sensor node is operative to monitor the each of the entrance opening, the temporary storage, and the retrieval door of the node-based logistics receptacle.

In some embodiments, the engagement event information uploaded as part of step 1325 may be more limited in that such information corresponds to what is referenced as chute event information. Such chute event information relates to interactions as detected by sensors coupled to the wireless accessory sensor node that monitor the entrance opening structure for the logistics receptacle (such as entrance door 156, entrance opening 155, the variations of such structure shown and described relative to FIG. 5, and the like) as opposed to interactions detected relative to what is then further received in the temporary storage area of the receptacle.

Figure 14A:
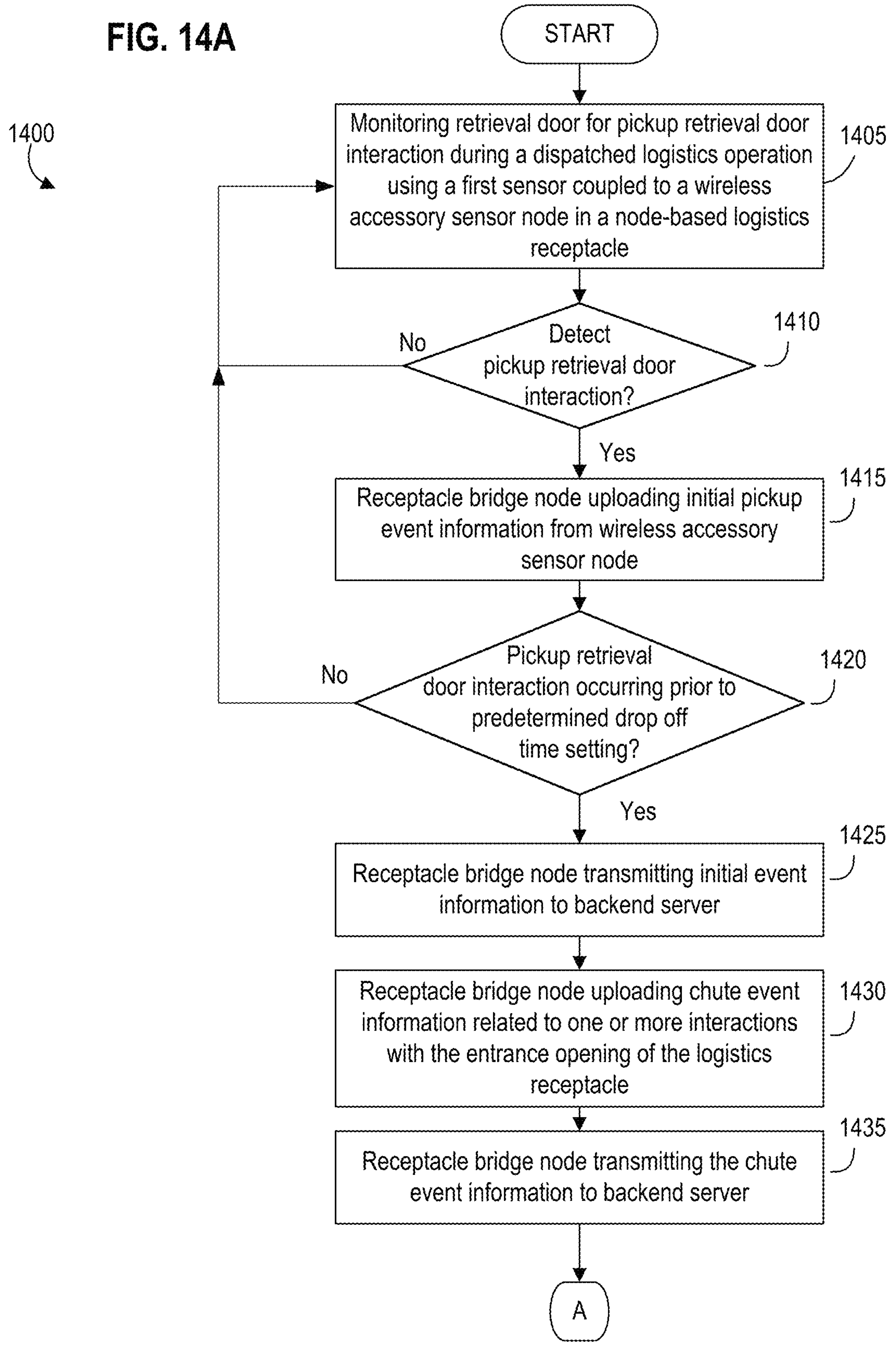
FIGS. 14A and 14B collectively are a flow diagram illustrating another exemplary method for multi-domain management of a node-based logistics receptacle in response to a dispatched logistics operation involving the node-based logistics receptacle and a mobile courier node in accordance with an embodiment of the invention.
Figure 14B:
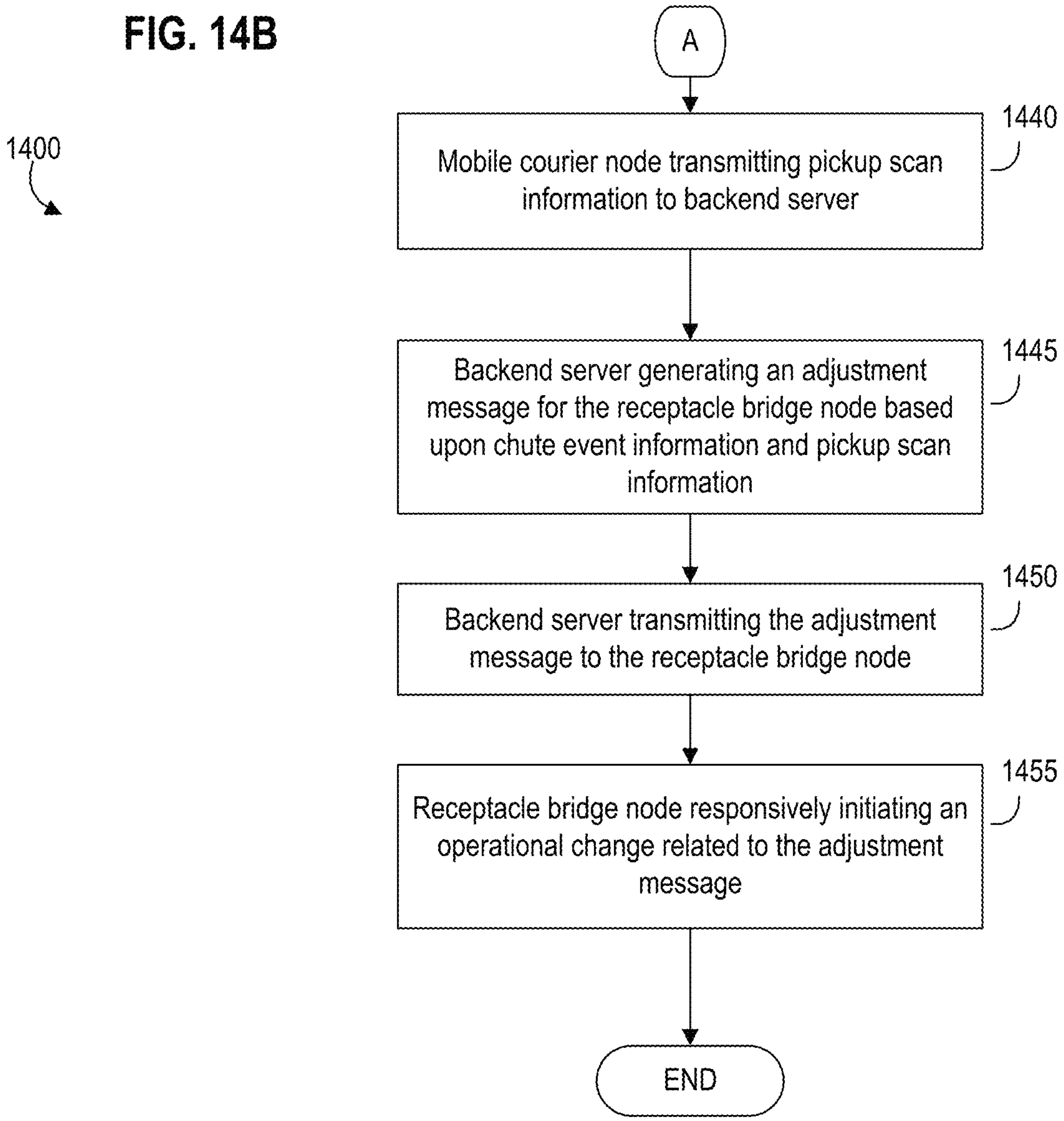

Relative to such a further embodiment, FIGS. 14A and 14B collectively are a flow diagram illustrating another exemplary method 1400 for multi-domain management of a node-based logistics receptacle in response to a dispatched logistics operation involving the node-based logistics receptacle and a mobile courier node in accordance with an embodiment of the invention.

Referring now to FIG. 14A, exemplary method 1400 is shown as a method for multi-domain management of a node-based logistics receptacle in response to a dispatched logistics operation involving the node-based logistics receptacle and a mobile courier node. Similar to that with method 1300 and as referenced in method 1400, the node-based logistics receptacle (e.g., receptacle 150) has a multiple storage receptacle components including at least an entrance opening (e.g., entrance opening 155/entrance door 156) for receiving one or more shipping items (e.g., package 170), a temporary storage area (e.g., storage area 205) for temporarily maintaining the shipping items once received, and a retrieval door (e.g., door 160) providing selective access to the shipping items within the temporary storage area. The node-based logistics receptacle used in method 1400 further has a wireless accessory sensor node coupled to multiple sensors (e.g., exemplary wireless accessory sensor node 210, 1002 operatively coupled to different sensors) disposed on the node-based logistics receptacle and a receptacle bridge node (e.g., exemplary bridge node 200) disposed on the node-based logistics receptacle operative to communicate with a backend server (e.g., server 100).

Exemplary method 1400 begins at step 1405 where it can be seen in FIG. 14A, steps 1405-1425 of exemplary method 1400 are the same as steps 1305-1325 of method 1300. At step 1430, method 1400 proceeds with the receptacle bridge node uploading chute event information from the wireless accessory sensor node where such chute event information uploaded corresponds to one or more interactions with the entrance opening as detected by a second of the sensors coupled to the wireless accessory sensor node.

In more detail, an embodiment of method 1400 may implement step 1430 with more specificity to upload the chute event information by (i) detecting (using the second of the sensors coupled to the wireless accessory sensor node) the one or more interactions with the entrance opening; (ii) having the wireless accessory sensor node recording timestamped information reflecting each of the detected interactions with the entrance opening (where such timestamped information reflects a detected change in state of the retrieval door as indicated by the detected one or more interactions with the entrance opening); (iii) having the wireless accessory sensor node broadcasting an updated advertising signal having a data available flag set within the updated advertising signal (where the data available flag indicates the wireless accessory sensor node has the chute event information available for upload by the receptacle bridge node); and (iv) having the receptacle's bridge node uploading the chute event information from the wireless accessory sensor node in response to the receptacle bridge node detecting the data available flag set within the updated advertising signal (where the chute event information includes at least the timestamped information). In such a further embodiment of step 1430, the one or more interactions with the entrance opening may be interactions that occur prior to the predetermined drop off time setting for the node-based logistics receptacle.

At step 1435, method 1400 proceeds with the receptacle bridge node transmitting the chute event information to the backend server. After step 1435, method 1400 proceeds through transition A to step 1440 on FIG. 14B, where method 1400 continues with the mobile courier node transmitting pickup scan information to the backend server (similar to that explained in step 1340 on FIG. 13B). Such pickup scan information represents the one or more shipping items as retrieved from the temporary storage area as part of the dispatched logistics operation. For example, the mobile courier node may be used by logistics personnel (e.g., courier, gig worker, and the like) operating the exemplary logistics asset (e.g., asset 700*a*) that has been dispatched for the dispatched logistics operation. A further embodiment of method 1400 may implement step 1440 with more specificity with the mobile courier node generating the pickup scan information as barcode information representing the one or more shipping items as retrieved from the temporary storage area as part of the dispatched logistics operation; and then transmitting the pickup scan information to the backend server. In yet another example, step 1440 may be implemented with the mobile courier node the pickup scan information as wirelessly broadcast information detected from the one or more shipping items as retrieved from the temporary storage area as part of the dispatched logistics operation; and transmitting, by the mobile courier node, the pickup scan information to the backend server.

At step 1445, method 1400 proceeds by having the backend server generating an adjustment message for the receptacle bridge node in the node-based logistics receptacle based upon an assessment of the chute event information and the pickup scan information. Such an adjustment message acts as a type of remote command for the receptacle bridge node that initiates an operational change for the node-based logistics receptacle. In more detail, an embodiment of method 1400 may implement step 1445 with the backend server 100 updating a server-maintained profile identifying a pattern of use of the node-based logistics receptacle (e.g., information kept in exemplary management profile 835 in memory of backend server 100) with the chute event information and with the pickup scan information; determining the updated server-maintained profile indicates a threshold change in the pattern of use of the node-based logistics receptacle; and generating the adjustment message for the receptacle bridge node in the node-based logistics receptacle based upon the updated server-maintained profile. In such a further embodiment of step 1445, the threshold change in the pattern of use of the node-based logistics receptacle may, for example, be implemented as a threshold change in a frequency of reaching a pickup threshold level for the node-based logistics receptacle or a threshold change in a historic average content amount for the node-based logistics receptacle (where such an historic average content amount relates to prior pickup scan information as reported to the backend server 100 and the pickup scan information transmitted to the backend server 100 as part of the dispatched logistics operation).

At step 1450, method 1400 has the backend server transmitting the adjustment message to the receptacle bridge node in the node-based logistics receptacle, and then step 1455 has the receptacle bridge node responsively initiating the operational change related to the adjustment message in response to receipt of the adjustment message.

In further embodiments of method 1400, such an operational change may involve altering pickup threshold values and/or operational timing adjustments. For example, an embodiment of method 1400 may implement initiating the operational change for the node-based logistics receptacle in step 1455 with the receptacle bridge node altering a pickup threshold value for the node-based logistics receptacle stored by the receptacle bridge node. In more detail, this may also involve the further steps of detecting, using one or more of the sensors coupled to the wireless accessory sensor node, one or more changes in a subsequent state of the storage receptacle components; having the receptacle bridge node upload subsequent event information from the wireless accessory sensor node (where the subsequent event information is related to the detected changes in the subsequent state of the storage receptacle components); having the receptacle bridge node comparing the subsequent event information and the pickup threshold value to determine a pickup request condition exists; and transmitting, by the receptacle bridge node, a pickup request message to the backend server, the pickup request message reporting the subsequent event information to the backend server and indicating the pickup request condition exists.

In another example, a further embodiment of method 1400 may implement initiating the operational change for the node-based logistics receptacle in step 1455 with the receptacle bridge node altering an operational timing value for the node-based logistics receptacle stored by the receptacle bridge node. Such an operational timing value may be implemented, for example, as the predetermined drop off time setting for the node-based logistics receptacle; a predetermined time value for when the receptacle bridge node uploads the engagement event information; a predetermined time value for when the receptacle bridge node transmits the engagement event information to the backend server; a predetermined recording time period during which the wireless accessory sensor node is operative to monitor the entrance opening; and/or a predetermined recording time period during which the wireless accessory sensor node is operative to monitor the each of the entrance opening, the temporary storage, and the retrieval door of the node-based logistics receptacle.

Dynamically Scheduled On-Road Logistics Assets

Further embodiments may enhance how logistics asset(s) are involved and dynamically involved when initiating dispatched logistics operations to various enhanced connected node-base logistics receptacles by the backend server. In some embodiments, dynamically initiating such a dispatched logistics operation may be implemented based upon the event information reported to the backend server and server tracked location of the logistics asset, while in other embodiments may have the backend server selecting the logistics asset to use based upon the reported event information and a logistics asset usage profile related to costs and/or environmental impact for using different logistics assets (e.g., types) as well as the location of such logistics assets. FIGS. 21-25 provide illustrations of various related embodiments of systems that have its backend server being dynamically initiate dispatched logistics operations with particular logistics assets under a variety of conditions as explained in more detail below.

Figure 21:
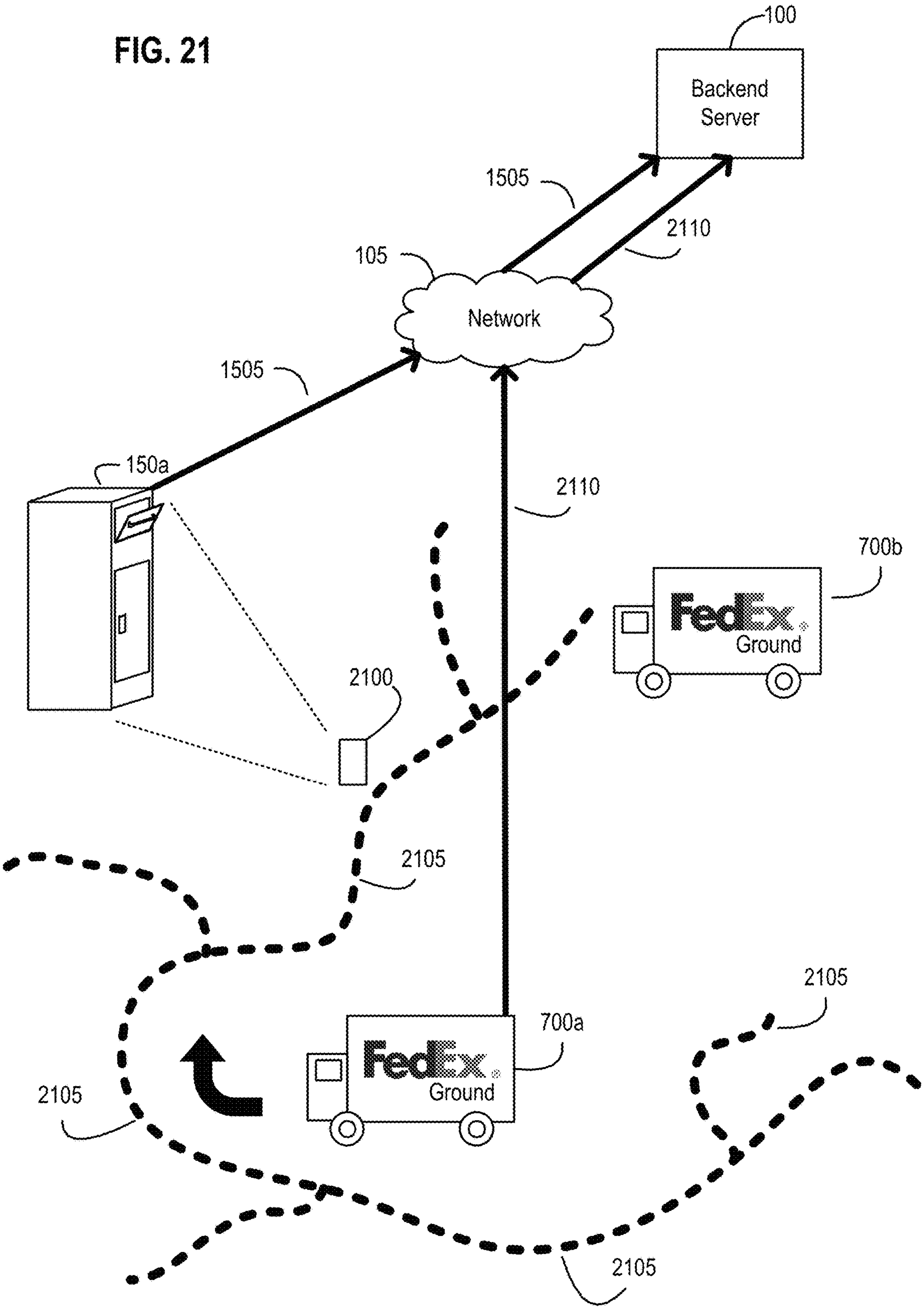
FIG. 21 is a diagram illustrating an exemplary connected logistics receptacle operating within a network and in communication with an exemplary backend server dynamically initiating a dispatched logistics operation in accordance with an embodiment of the invention.
Figure 22:
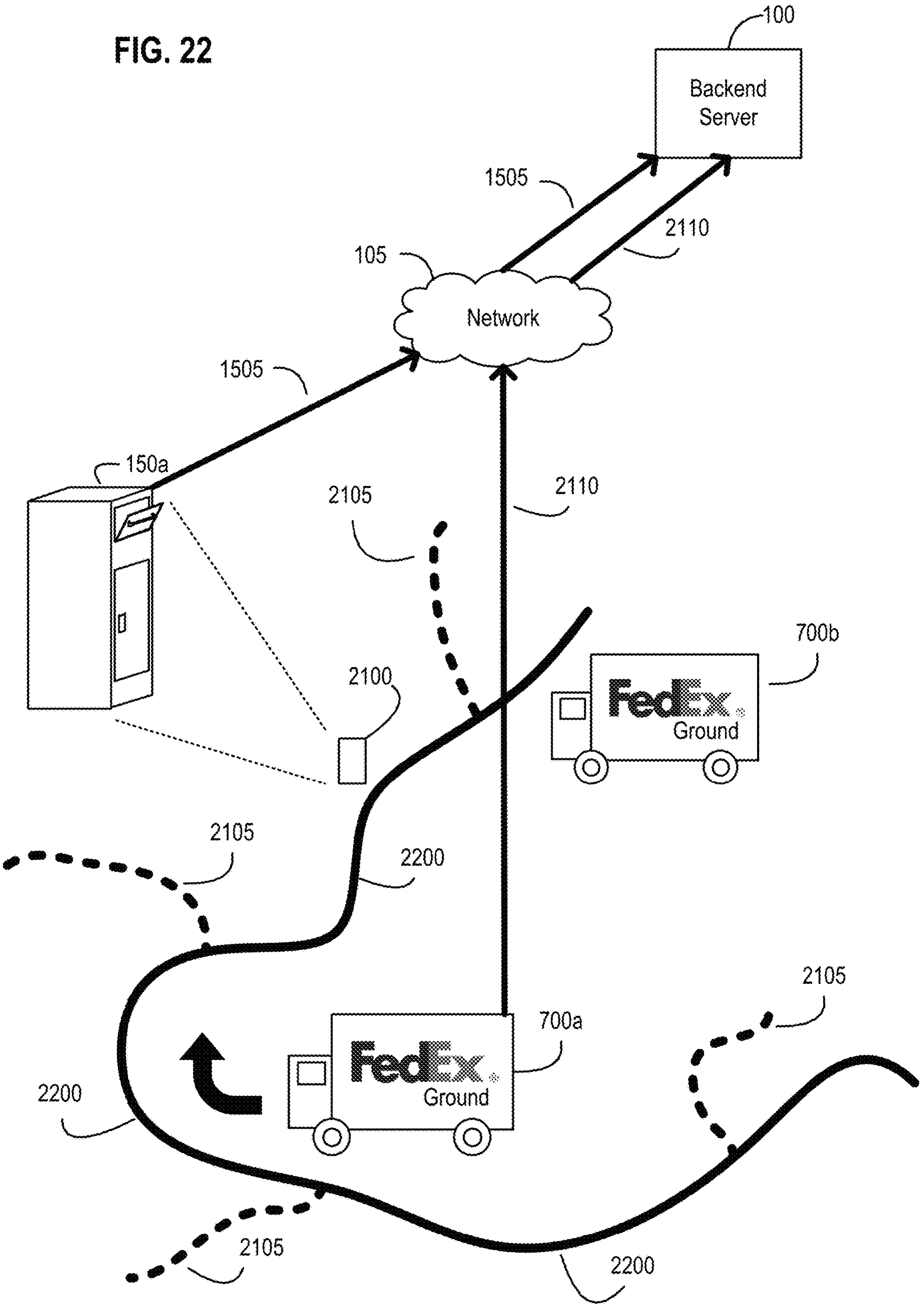
FIG. 22 is a diagram illustrating the exemplary connected logistics receptacle and exemplary backend server of FIG. 21 dynamically initiating a dispatched logistics operation involving consideration of an exemplary currently scheduled route relative to a location of the exemplary connected logistics receptacle in accordance with an embodiment of the invention.

FIG. 21 is a diagram illustrating exemplary connected logistics receptacle 105*a* operating within a network and in communication with exemplary backend server 100 that is operable to dynamically initiate a dispatched logistics operation in accordance with an embodiment of the invention. Referring now to FIG. 21, such a system is shown with backend server 100 (which maintains management profile 835 related to various storage receptacles) and node-based logistics receptacle 150*a* having a storage receptacle, a bridge node, and at least one wireless accessory sensor node and sensors that monitor for a change in state of the storage receptacle. As shown in FIG. 21, exemplary node-based logistics receptacle 150*a* is positioned at location 2100 where customers may deposit or pickup packages (e.g., package 170, 175) using receptacle 150*a*. Location 2100 is shown relative to a roadway network 2105, on which one or more logistics assets (e.g., logistics asset 700*a*) may be traveling.

Those skilled in the art will appreciate that logistics asset 700*a* may be equipped with a location tracking device (not shown), such as a GPS receiver, and be able to provide its location via location message 2110 sent to backend server 100. In this manner, backend server 100 is aware of or otherwise has visibility to the current location of this particular logistics asset 700*a*. Those skilled in that art will further appreciate that backend server 100 may be similarly aware of and have visibility to the location of other logistics assets (a group of which may be available for dispatched logistics operations). Those skilled in the art will also understand that determining a location using location/tracking devices may be implemented using a variety of methodologies/devices other than GPS (or in addition to GPS), such as with wireless location services or techniques that use characteristics of Wi-Fi, cellular, or other access points to discover a device's location, triangulate a location, and the like.

In operation and consistent with at least one of the embodiments explained above, the bridge node device in receptacle 150*a* is able to transmit event information 1505 relative to detected changes in the state of the storage receptacle part of receptacle 150*a*. For example, the wireless accessory sensor node in exemplary node-based logistics receptacle 150*a* detects the change in state of the storage receptacle based upon sensor data generated by its sensor(s); records timestamped information reflecting the detected change in state of the storage receptacle; and broadcasts an updated advertising signal having a data available flag set within the updated advertising signal, where the data available flag indicates the wireless accessory sensor node has event information available for upload by the bridge node. The receptacle's bridge node detects the data available flag set within the updated advertising signal during a reporting period for the bridge node; retrieves the event information available for upload during the reporting period from the wireless accessory sensor node (where the event information includes at least the timestamped information reflecting the detected change in state of the storage receptacle); and transmits the retrieved event information 1505 to the backend server 100 at a reporting time during the reporting period.

The system's backend server 100, in response to receiving the retrieved event information 1505 from the bridge node in receptacle 150*a*, is enhanced so as to be operative to identify location information related to a first logistics asset (e.g., based upon the location message 2110 sent by that logistics asset 700*a*); compare the retrieved event information 1505 received from the bridge node in receptacle 150*a* to that location information for the first logistics asset; and then dynamically initiate the dispatched logistics operation as a result of comparing the retrieved event information 1505 to the location information related to the first logistics asset (e.g., a current position of the logistics asset 700*a* as tracked by the backend server 100).

In more detail, the system's backend server 100 may compare the retrieved event information 1505 to the location information related to logistics asset 700*a* by being further operative to determine whether the location information related to logistics asset 700*a* indicates logistics asset 700*a* is within a predetermined range of the storage receptacle (e.g., the storage receptacle that is part of node-based logistics receptacle 150*a*). For example, the exemplary location message 2110 may indicate that the current position of logistics asset 700*a* is less than 2 miles from location 2100 of receptacle 150*a*. Backend server 100 may use such information to determine that being less than 2 miles from location 2100 of receptacle 150*a* means that logistics asset is within a predetermined ranges of receptacle 150*a* for purposes of dynamically initiating the dispatched logistics operation. Thereafter, in such an example, the backend server 100 dynamically initiates the dispatched logistics operation when (and given that) the first logistics asset is within such a predetermined range of the storage receptacle (where such a range may vary for different receptacles and/or for different logistics assets being considered). However, if the backend server 100 determines the first logistics asset is not within the predetermined range of that storage receptacle (e.g., the location 2100 of receptacle 150*a*), the backend server 100 may respond by initiating the dispatched logistics operation using an alternative logistics asset (such as logistics asset 700*b*).

In even more detail, the system's backend server 100 may compare the retrieved event information 1505 to the location information related to logistics asset 700*a* by being further operative to determine whether the location information related to logistics asset 700*a* indicates that logistics asset 700*a* will pass within a predetermined range of the storage receptacle in exemplary logistics receptacle 150*a* prior to a predetermined response time. More specifically, an example may have the system's backend server 100 use the location information to determine if logistics asset is on a currently scheduled router (e.g., exemplary route 2200 in FIG. 22) and predict whether logistics asset 700*a* will pass within that predetermined range of receptacle 150*a* prior to a particular response time. Thereafter, in such an example, the backend server 100 dynamically initiates the dispatched logistics operation when (a) the logistics asset 700*a* is located within the predetermined range of the storage receptacle on the currently scheduled route and (b) when the backend server 100 predicts the first logistics asset will pass within the predetermined range of the storage receptacle prior to the predetermined response time. However, if (a) or (b) are conditions that are not met, the backend server 100 may respond by initiating the dispatched logistics operation using an alternative logistics asset (such as logistics asset 700*b*).

An embodiment involving such dynamic initiation of the dispatched logistics operation may also consider context information (e.g., exemplary context data 855, context data from CLR context database 850, and/or context data from database 180 accessible by backend server 100) related to the storage receptacle of interest. For example, the system's backend server 100 may dynamically initiate the dispatched logistics operation based upon a comparison of the retrieved event information 1505 received from the bridge node in receptacle 150*a* to context information related to an operating environment of the storage receptacle that is part of receptacle 150*a*. In more detail, this may be implemented with the system's backend server 100 being operative to access context information related to the storage receptacle in node-based logistics receptacle 150*a* and then dynamically initiate the dispatched logistics operation based upon (a) comparing the retrieved event information 1505 received to the location information related to logistics asset 700*a*, and (b) comparing the retrieved event information 1505 to the context information related to the storage receptacle in exemplary logistics receptacle 150*a*. Such context information, for example, may include information related to the current location of the storage receptacle (e.g., location 2100 for receptacle 150*a*), such as crime data, traffic data, and/or weather data. In another example, such context information may include at least one of logistics asset staffing data regarding the logistics asset 700*a* and logistics asset cost data regarding that logistics asset 700*a*.

While an embodiment noted above considers the route of logistics asset 700*a* (e.g., exemplary route 2200 shown in FIG. 22) and a particular response time when dynamically initiating a dispatched logistics operation, another embodiment may have backend server 100 operative to compare the retrieved event information 1505 to the location information related to logistics asset 700*a* by being further operative to determine whether that location information indicates the logistics asset 700*a* is on a currently scheduled route 2200 that will pass within a predetermined range of the storage receptacle in node-based logistics receptacle 150*a*. If so, backend server 100 will send a dispatch message to logistics asset 700*a* (or an agent of asset 700*a*) to initiate the dispatched logistics operation. If not, backend server 100 may send a different dispatch message to an alternative logistics asset (e.g., logistics asset 700*b* shown in FIG. 22) when the currently schedule route of the first logistics asset will pass within the predetermined range of the storage receptacle.

Further still, an embodiment involving the dynamic initiation of the dispatched logistics operation may also consider context information (e.g., exemplary context data 855, context data from CLR context database 850, and/or context data from database 180 accessible by backend server 100) related to a particular route of a logistics asset. For example, the system's backend server 100 may dynamically initiate the dispatched logistics operation based upon based upon a comparison of the retrieved event information 1505 to context information related to locations on a route for the logistics asset 700*a* (e.g., exemplary route 2200). Such context information may, for example, include at least one of crime data, traffic data, and weather data regarding the locations on the route for logistics asset 700*a*. In more detail, this may be implemented with the system's backend server 100 being operative to access context information related to locations on a scheduled route for logistics asset 700*a* and then dynamically initiate the dispatched logistics operation as a result of (a) comparing the retrieved event information 1505 to the location information related to logistics asset 700*a*, and (b) comparing the retrieved event information 1505 to the context information related to the locations on the scheduled route for logistics asset 700*a*.

Figure 23:
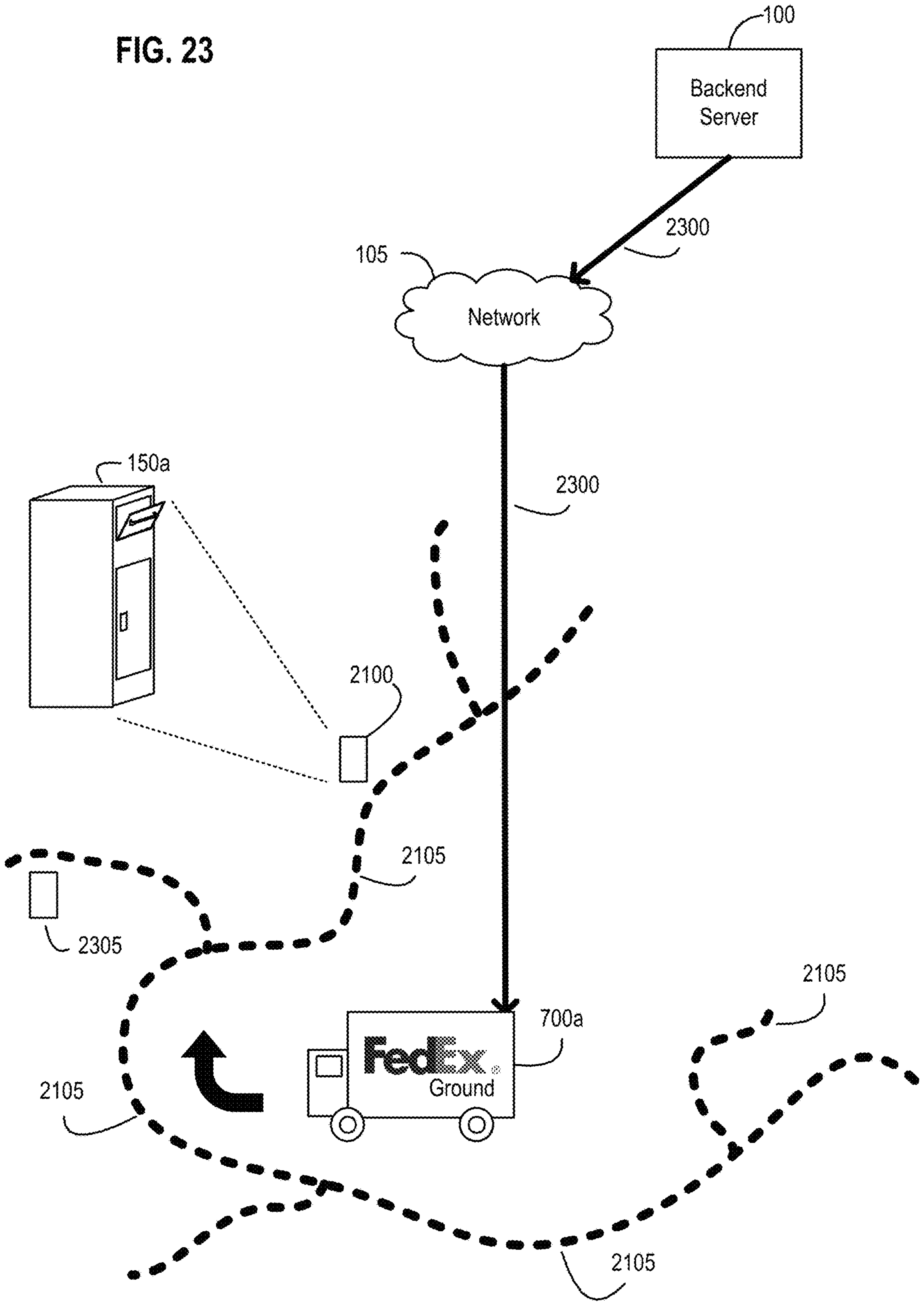
FIG. 23 is a diagram illustrating the exemplary connected logistics receptacle and exemplary backend server of FIG. 21 dynamically initiating a dispatched logistics operation involving an exemplary redirect dispatch message in accordance with an embodiment of the invention.

FIG. 23 is a diagram illustrating the exemplary connected logistics receptacle and exemplary backend server of FIG. 21 dynamically initiating a dispatched logistics operation involving an exemplary redirect dispatch message in accordance with an embodiment of the invention. Referring now to FIG. 23, exemplary logistics asset 700*a* may be on a prior scheduled logistics operation related to a node-based logistics receptacle positioned at location 2305. As such, logistics asset 700*a* is shown traversing roadway network 2105 towards location 2305. However, the system's backend server 100 is shown as operative to dynamically initiate the dispatched logistics operation by being further operative to transmit an exemplary redirect dispatch message 2300 to logistics asset 700*a* to redirect logistics asset 700*a* from such a prior scheduled logistics operation involving a receptacle (e.g., pickup and/or delivery) at location 2305. In more detail, redirect dispatch message 2300 may redirect logistics asset 700*a* to location 2100 of receptacle 150*a* (or in some embodiments, to a predicted location of receptacle 150*a* when such an exemplary node-based logistics receptacle 150*a* is implemented as a mobile structure having a mobile storage receptacle).

Figure 24:
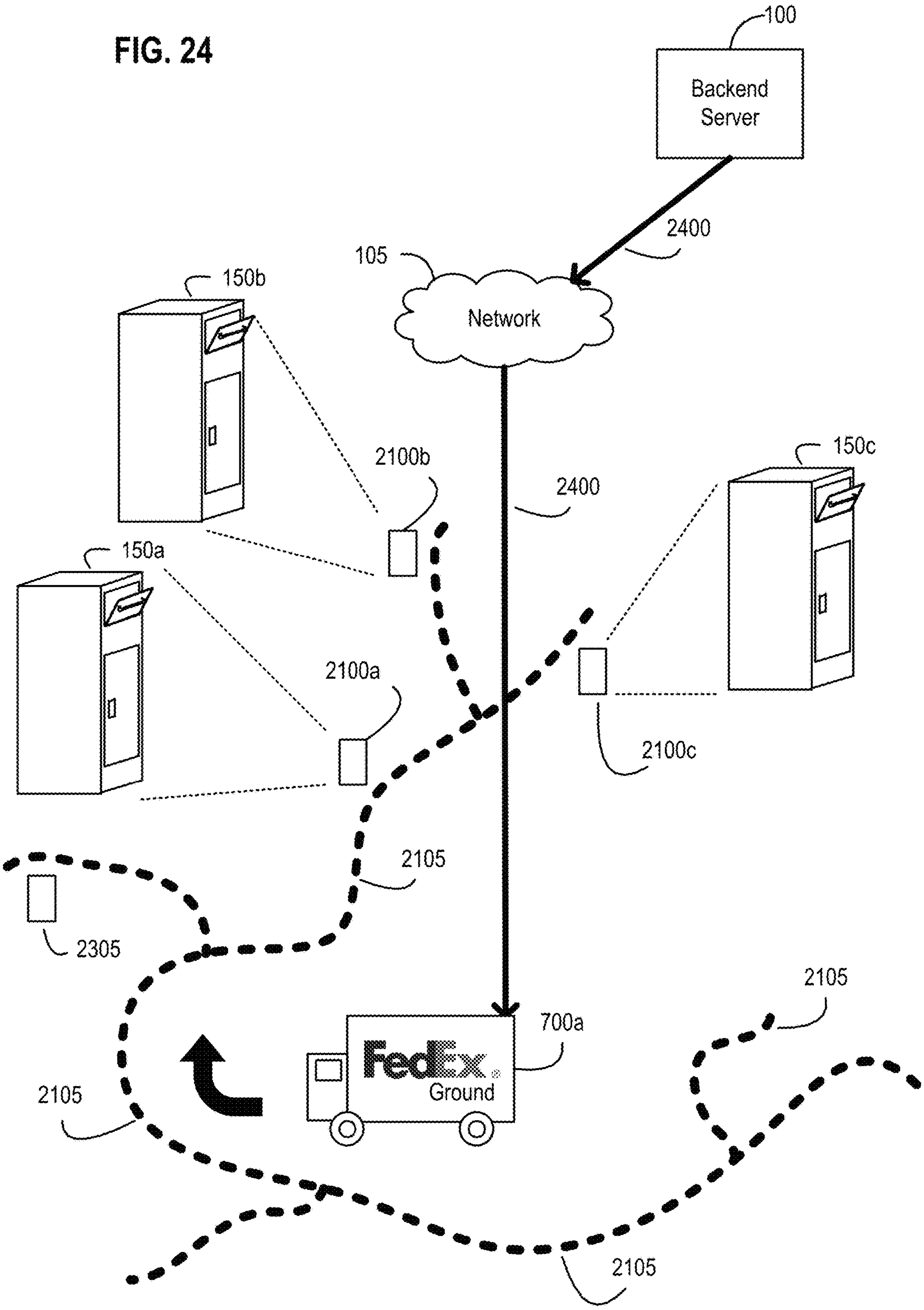
FIG. 24 is a diagram illustrating the exemplary connected logistics receptacle and exemplary backend server of FIG. 21 dynamically initiating a dispatched logistics operation involving an exemplary combination dispatch message that initiates servicing a reporting logistics receptacle and dispatches an exemplary sweep operation of at least one more non-reporting logistics receptacle in accordance with an embodiment of the invention.

FIG. 24 is a diagram illustrating the exemplary connected logistics receptacle and exemplary backend server of FIG. 21 dynamically initiating a dispatched logistics operation involving an exemplary combination dispatch message that initiates servicing a reporting node-based logistics receptacle and initiates the dispatch of an exemplary sweep operation of at least one more non-reporting node-based logistics receptacle in accordance with an embodiment of the invention. Referring now to FIG. 24, exemplary reporting node-enabled logistics receptacle 150*a* is shown positioned at location 2100*a* while other exemplary logistics receptacles 150*b* and 150*c* are respectively shown as positioned at locations 2100*b* and 2100*c*. In one example, an embodiment may have backend server 100 being operative to dynamically initiate the dispatched logistics operation by being further operative to transmit an exemplary combination dispatch message 2400 to logistics asset 700*a* to (a) initiate servicing of the storage receptacle in logistics receptacle 150*a* as the dispatched logistics operation and to (b) further dispatch a sweep operation to service an additional storage receptacle (such as one of logistics receptacles 150*b*, 150*c*). Such a sweep operation to service the additional storage receptacle may be dispatched without the backend server 100 receiving additional event information from either of the additional storage receptacles 150*b*, 150*c*. In another example, an embodiment may have backend server 100 being operative to dynamically initiate the dispatched logistics operation by transmitting a combination dispatch message 2400 to the logistics asset 700*a* to (a) continue with a sweep operation of an additional storage receptacle (such as logistics receptacle 150*b*, 150*c*) and then to (b) service the storage receptacle in logistics receptacle 150*a* upon completion of the sweep operation (which may be dispatched without the backend server receiving additional event information from the additional storage receptacle).

In some embodiments involving dynamically initiating the dispatched logistics operation, the backend server 100 may consider a historic use pattern for the reporting node-based logistics receptacle. For example, an embodiment may have backend server 100 being operative to dynamically initiate the dispatched logistics operation based upon a comparison of the retrieved event information 1505 to a server-tracked historic use pattern for the storage receptacle maintained as part of management profile 835 on the backend server 100. Such a historic use pattern may be implemented with information on prior detected engagements with the storage receptacle in logistics receptacle 105*a* as updated by backend server 100 based on prior event information on that storage receptacle as received by backend server 100; implemented as a profile identifying a pattern of use of the storage receptacle as maintained on the backend server; and/or a pattern of delivery/pickup events for the storage receptacle.

In another example, backend server 100 may be further operative to dynamically initiate the dispatched logistics operation when the comparison of the retrieved event information 1505 to the server-tracked historic use pattern for the storage receptacle in reporting logistics receptacle 150*a* indicates a likelihood for an additional deposit of a further delivery item to receptacle 150*a* to be less than a threshold dispatch initiation value. In such a situation, when the likelihood of the additional deposit is lower than this threshold value, backend server 100 proceeds to initiate the dispatched logistics operation rather than wait (i.e., with server 100 intelligently learning and responding to the retrieved event information 1505 in a dynamic way that further considers this historic use pattern and likelihood of an additional deposit within a relevant period of time).

In a more detailed example, the backend server 100 may be operative to dynamically initiate the dispatched logistics operation by being further operative to access a server-tracked historic use pattern for the storage receptacle in logistics receptacle 150*a* (e.g., as part of information in exemplary management profile 835) and compare the retrieved event information 1505 to the server-tracked historic use pattern for the storage receptacle. Backend server 100 then is operative to dynamically initiate the dispatched logistics operation as a result of (a) comparing the retrieved event information 1505 to the location information related to logistics asset 700*a* (e.g., data indicating the location of asset 700*a* as provided in location message 2110), and (b) comparing the retrieved event information 1505 to the server-tracked historic use pattern for the storage receptacle as part of node-based logistics receptacle 150*a*.

In still another detailed example, the backend server 100 may be operative to dynamically initiate the dispatched logistics operation by being further operative to similarly access a server-tracked historic use pattern for the storage receptacle in logistics receptacle 150*a* (e.g., as part of information in exemplary management profile 835) and compare the retrieved event information 1505 to the server-tracked historic use pattern for the storage receptacle. Backend server 100, in this example, may also be operative to determine whether a likelihood for an additionally detected deposit of a further delivery item (e.g., package 170, 175) within the storage receptacle is less than a threshold dispatch initiation value based upon the comparison of retrieved event information 1505 to the server-tracked historic use pattern for the storage receptacle. Thereafter, backend server 100 may dynamically initiate the dispatched logistics operation as a result of (a) comparing the retrieved event information 1505 to the location of logistics asset 700*a* (e.g., data indicating the location of asset 700*a* as provided in location message 2110) and (b) when the likelihood for an additional deposit of a further delivery item detected within the storage receptacle in node-based logistics receptacle 150*a* is determined to be less than the threshold dispatch initiation value.

In a further embodiment, a system may be deployed that dynamically initiates a dispatched logistics operation based on historic use patterns kept as part of the management profile maintained by backend server 100 (rather than based on the location of a particular logistics asset). For example, such a system embodiment may include backend server 100, and a bridge node (e.g., exemplary bridge node 200, 16200) mounted to the storage receptacle in exemplary node-based logistics receptacle 150*a* as well as a wireless accessory sensor node (e.g., exemplary wireless accessory sensor node 210, 1002, 1002*a*, 1002*b*) and one or more coupled sensor(s) within logistics receptacle 150*a*. The system's backend server 100 in this example maintains a historic use pattern for the storage receptacle in receptacle 150*a* as part of a management profile related to at least that storage receptacle (e.g., historic use pattern information maintained in memory of backend server 100 as part of exemplary management profile 835 and previously updated by backend server 100 based on prior detected engagements with the storage receptacle).

Those skilled in the art will appreciate that this system embodiment similarly has the wireless accessory sensor node being operative to detect a change in state of the storage receptacle based upon sensor data generated by at least one of the sensors, record timestamped information reflecting the detected change, and broadcast an updated advertising signal having a data available flag set within the updated advertising signal, where the data available flag indicates the wireless accessory sensor node has event information available for upload by the bridge node (i.e., event information including at least the timestamped information reflecting the detected change in state of the storage receptacle). And similarly as described before, the system's bridge node is programmatically operative to detect such a data available flag set within the updated advertising signal during a reporting period for the bridge node, retrieve the event information available for upload during that reporting period from the wireless accessory sensor node, and transmit the retrieved event information (e.g., exemplary retrieved event information 1505) to the backend server at a reporting time during the reporting period.

In this example, the backend server 100 responds to receiving the retrieved event information from the bridge node, by being operative to then access the historic use pattern for the storage receptacle as part of logistics receptacle 150*a*; compare the retrieved event information 1505 to the historic use pattern for that storage receptacle; and then dynamically initiate the dispatched logistics operation as a result of comparing the retrieved event information 1505 to the historic use pattern for that storage receptacle. Such a historic use pattern may include information on the prior detected engagements with the storage receptacle as updated by the backend server 100 based on prior event information on the storage receptacle as received by the backend server 100. Such a historic use pattern, in particular, may also be implemented as a server-tracked profile identifying a pattern of use of the storage receptacle as maintained on the backend server 100 where the profile may identify the pattern of use of that storage receptacle as a pattern of delivery events for the storage receptacle or as a pattern of component state change for the storage receptacle based upon prior event information on the storage receptacle as received by the backend server 100. When using such a historic use pattern, the backend server 100, in some embodiments, may dynamically initiate the dispatched logistics operation when the result of comparing the retrieved event information 1505 to the historic use pattern for the storage receptacle indicates a likelihood for an additional deposit of a further delivery item detected within the storage receptacle to be less than a threshold dispatch initiation value.

Those skilled in the art will appreciate that further embodiments that dynamically initiate the dispatched logistics operation based on a historic use pattern may also have the backend server 100 considering the location of a particular logistics asset, that location relative to a predetermined ranges from the reporting receptacle, a route being used by a particular logistics asset, use of an alternative logistics asset, and consideration of a predetermined response time similar to that described above. Likewise, those skilled in the art will appreciate that still further embodiments that dynamically initiate the dispatched logistics operation based on a historic use pattern and may also have the backend server 100 considering (e.g., comparing to event information) context information related to the operating environment of the particular storage receptacle (such as crime data, traffic data, and weather data, logistics asset staffing data, and logistics asset cost data) as well as context information related to locations on a route for a particular logistics asset used to service that storage receptacle. Additionally, those skilled in the art will appreciate that further embodiments that dynamically initiate the dispatched logistics operation based on a historic use pattern may also have the backend server 100 initiating the dispatched logistics operation via a transmitted redirect dispatch message to a particular logistics asset to redirect the logistics asset from a prior scheduled logistics operation (e.g., or to redirect the logistics asset to a predicted location of the storage receptacle when implemented as a mobile storage receptacle). Further still, those skilled in the art will appreciate that yet further embodiments that dynamically initiate the dispatched logistics operation based on a historic use pattern may also have the backend server 100 initiating the dispatched logistics operation via transmission of a combination dispatch message to a particular logistics asset to (a) initiate servicing the storage receptacle as part of reporting node-based logistics receptacle 150*a* as the dispatched logistics operation and to (b) further dispatch a sweep operation to service an additional storage receptacle (e.g., non-reporting node-enabled logistics receptacle 150*b*). Alternatively, such a combination dispatch message may be transmitted to the particular logistics asset to (a) prompt that logistics asset to continue with a sweep operation of an additional storage receptacle (e.g., receptacle 150*b*) and then to (b) initiate servicing of the storage receptacle (e.g., receptacle 150*a*) upon completion of the sweep operation of the additional non-reporting storage receptacle.

In an even more detailed embodiment, a system may be deployed that dynamically initiates a dispatched logistics operation based on context information on the operating environment for a reporting logistics receptacle, a historic use pattern for that receptacle, and a logistics asset profile related to one or more logistics assets used to service that receptacle. For example, such a more detailed system embodiment may similarly include backend server 100, and a bridge node (e.g., exemplary bridge node 200, 16200) mounted to the storage receptacle in exemplary node-based logistics receptacle 150*a* as well as a wireless accessory sensor node (e.g., exemplary wireless accessory sensor node 210, 1002, 1002*a*, 1002*b*) and one or more coupled sensor(s) within logistics receptacle 150*a*. The system's backend server 100 in this example maintains a management profile (e.g., exemplary management profile 835) related to the storage receptacle (e.g., related to at least the storage receptacle as part of exemplary node-based logistics receptacle 150*a*) and context information related to an operating environment of that storage receptacle. More specifically, the server-maintained management profile includes at least a historic use pattern for the storage receptacle and a logistics asset profile related to one or more logistics assets used to service the storage receptacle. Such a historic use pattern in this example is information maintained and updated by the backend server 100 on prior detected engagements with the storage receptacle part of logistics receptacle 150*a*.

Those skilled in the art will appreciate that this more detailed system embodiment similarly has the wireless accessory sensor node being operative to detect a change in state of the storage receptacle based upon sensor data generated by at least one of the sensors, record timestamped information reflecting the detected change, and broadcast an updated advertising signal having a data available flag set within the updated advertising signal, where the data available flag indicates the wireless accessory sensor node has event information available for upload by the bridge node (i.e., event information including at least the timestamped information reflecting the detected change in state of the storage receptacle). And similarly as described before, the system's bridge node is programmatically operative to detect such a data available flag set within the updated advertising signal during a reporting period for the bridge node, retrieve the event information available for upload during that reporting period from the wireless accessory sensor node, and transmit the retrieved event information (e.g., exemplary retrieved event information 1505) to the backend server at a reporting time during the reporting period.

In this more detailed example, the backend server 100 responds to receiving the retrieved event information from the bridge node, by being operative to generate a comparison of the retrieved event information 1505 (e.g., information on what monitored component of the storage receptacle detected a change in state indicative of an interaction or engagement with part of the storage receptacle) to the historic use pattern for that storage receptacle (e.g., a pattern of delivery events for that storage receptacle), the logistics asset profile on logistics receptacles used to service that storage receptacle, and the context information on the operating environment for that storage receptacle; and dynamically initiate the dispatched logistics operation as a result of the comparison. In some situations, the backend server 100 in this more detailed example may be further operative to dynamically initiate the dispatched logistics operation when the result of the comparison indicates a likelihood for an additional deposit of a further delivery item detected within this particular storage receptacle to be less than a threshold dispatch initiation value.

Those skilled in the art will appreciate that further embodiments of such a more detailed example that dynamically initiate the dispatched logistics operation based on a historic use pattern, context data, and a logistics asset profile may also have the backend server 100 considering the location of a particular logistics asset as part of the logistics asset profile, that location relative to a predetermined ranges from the reporting receptacle, a route being used by a particular logistics asset, use of an alternative logistics asset, and consideration of a predetermined response time similar to that described above. Likewise, those skilled in the art will appreciate that still further embodiments that dynamically initiate the dispatched logistics operation based on a historic use pattern, context data, and a logistics asset profile may also have the context information considered in the comparison being related to the operating environment of the particular storage receptacle (such as crime data, traffic data, and weather data, logistics asset staffing data, and logistics asset cost data) as well as context information related to locations on a route for a particular logistics asset used to service that storage receptacle. Additionally, those skilled in the art will appreciate that further embodiments that dynamically initiate the dispatched logistics operation based on a historic use pattern, context data, and a logistics asset profile may also have the backend server 100 initiating the dispatched logistics operation via a transmitted redirect dispatch message to a particular logistics asset to redirect the logistics asset from a prior scheduled logistics operation (e.g., or to redirect the logistics asset to a predicted location of the storage receptacle when implemented as a mobile storage receptacle). Further still, those skilled in the art will appreciate that yet further embodiments that dynamically initiate the dispatched logistics operation based on a historic use pattern, context data, and a logistics asset profile may also have the backend server 100 initiating the dispatched logistics operation via transmission of a combination dispatch message to a particular logistics asset to (a) initiate servicing the storage receptacle as part of reporting node-based logistics receptacle 150*a* as the dispatched logistics operation and to (b) further dispatch a sweep operation to service an additional storage receptacle (e.g., non-reporting node-enabled logistics receptacle 150*b*). Alternatively, such a combination dispatch message may be transmitted to the particular logistics asset to (a) prompt that logistics asset to continue with a sweep operation of an additional storage receptacle (e.g., receptacle 150*b*) and then to (b) initiate servicing of the storage receptacle (e.g., receptacle 150*a*) upon completion of the sweep operation of the additional non-reporting storage receptacle.

Figure 25:
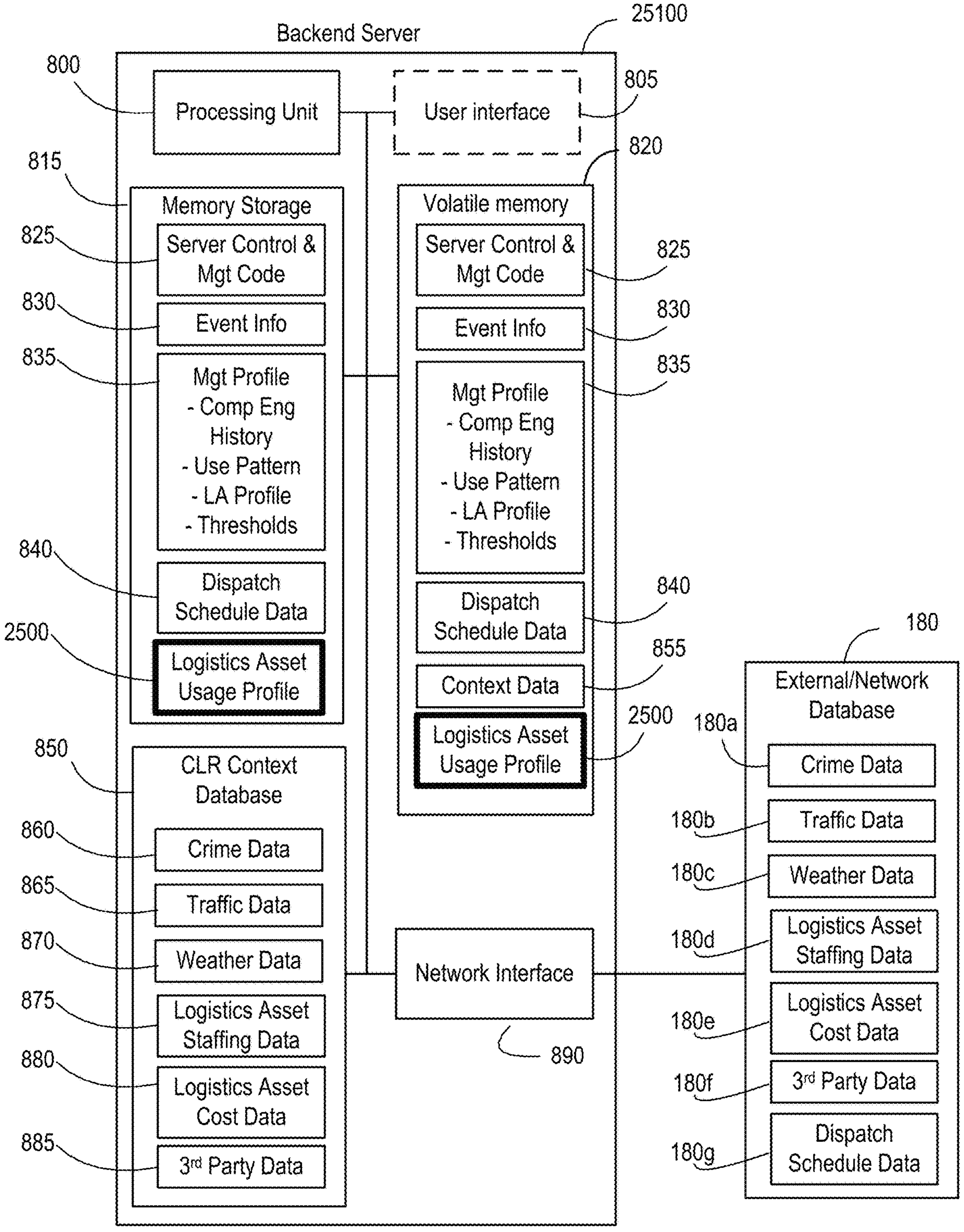
FIG. 25 is a detailed diagram of another embodiment of an exemplary backend server that uses an exemplary logistics asset usage profile as part of dynamically initiating a dispatched logistics operation in accordance with an embodiment of the invention.

A further system embodiment may have backend server 100 dynamically initiating the dispatched logistics operation based upon information maintained in a logistics asset usage profile. FIG. 25 is a detailed diagram of another embodiment of an exemplary backend server 25100 (similar to exemplary server 100) that uses an exemplary logistics asset usage profile 2500 as part of dynamically initiating a dispatched logistics operation in accordance with an embodiment of the invention. Referring now to FIG. 25, exemplary backend server 25100 is shown with similar components than that of backend server 100, and notably includes exemplary logistics asset usage profile 2500 as a data structure that maintains (and may be updated with) information related to costs incurred (e.g., monetary, environmental impact, and the like) associated with use of particular logistics assets that may be selectively and dynamically chosen by the backend server 100 for a particular dispatched logistics operation. Updates to exemplary logistics asset usage profile 2500 may be performed by backend server 100 based upon cost-related information provided to backend server 25100 and/or specific updates from third-party logistics entities on their respective cost information, fees, types of logistics assets available, configurability of such assets, and the like.

For example, an exemplary system embodiment relying upon information in a logistics asset usage profile (such as profile 2500) when dynamically initiating a dispatched logistics operation may similarly include backend server 25100, a bridge node (e.g., exemplary bridge node 200, 16200) mounted to the storage receptacle in exemplary node-based logistics receptacle 150*a*, and a wireless accessory sensor node (e.g., exemplary wireless accessory sensor node 210, 1002, 1002*a*, 1002*b*) and one or more coupled sensor(s) within logistics receptacle 150*a*. The system's backend server 25100 in this embodiment maintains a logistics asset usage profile (e.g., exemplary profile 2500) related to multiple logistics assets (e.g., exemplary logistics assets 700*a*-700*c*). Such a logistics asset usage profile used by the system's backend server 25100 may include, for example, cost information related use of each of the logistics assets; environmental impact information related to use of each of the logistics assets; and logistics asset class information for each of the logistics assets.

Those skilled in the art will appreciate that this system embodiment has the system's wireless accessory sensor node being operative to detect a change in state of the storage receptacle based upon sensor data generated by at least one of the sensors, record timestamped information reflecting the detected change, and broadcast an updated advertising signal having a data available flag set within the updated advertising signal, where the data available flag indicates the wireless accessory sensor node has event information available for upload by the bridge node (i.e., event information including at least the timestamped information reflecting the detected change in state of the storage receptacle). And similarly as described before, the system's bridge node is programmatically operative to detect such a data available flag set within the updated advertising signal during a reporting period for the bridge node, retrieve the event information available for upload during that reporting period from the wireless accessory sensor node, and transmit the retrieved event information (e.g., exemplary retrieved event information 1505) to the backend server 25100 at a reporting time during the reporting period. Thereafter, the backend server 25100 responds to receiving the retrieved event information 1505 by being operative to compare the retrieved event information 1505 to the logistics asset usage profile; select a first logistics asset (e.g., exemplary logistics asset 700*a*) from the logistics assets covered in the logistics asset usage profile as a result of the comparison involving the logistics asset usage profile and the retrieved event information 1505 received; and dynamically initiate the dispatched logistics operation using the selected first logistics asset.

As mentioned above, the exemplary logistics asset usage profile 2500 used in this embodiment may include cost information related to use of each of the different logistics assets. As such, backend server 2510 may compare the retrieved event information 1505 to the logistics asset usage profile 2500 and select the first logistics asset by being further operative to identify a location of the storage receptacle (i.e., the location of reporting receptacle 150*a*) based upon the retrieved event information 1505; compare the location of the storage receptacle to the cost information related to use of each of the different logistics assets; and select the first logistics asset as a result of comparing the location of the storage receptacle to the cost information related use of each of the logistics assets. In more detail, backend server 2510 may compare the retrieved event information 1505 to the logistics asset usage profile 2500 and select the first logistics asset based upon the result of comparing the location of the storage receptacle to the cost information related use of each of the logistics assets as a monetary cost optimized selection from the logistics assets. Such a monetary cost optimized selection generally is a selection that attempts to find one of the logistics assets where use of that particular logistics asset for this particular dispatched logistics operation presented a lower monetary cost to be incurred when compared to use of other logistics assets characterized in the logistics asset usage profile 2500.

Furthermore, the exemplary logistics asset usage profile 2500 used in this embodiment may be implemented to include environmental impact information related to use of each of the different logistics assets. Examples of such environment impact information may include but is not limited to environmentally released greenhouse gas/compounds related to use of particular logistics assets, noise related to logistics asset use, degradation of air quality related to logistics asset use, degradation of water resources due to logistics asset use, and the like. Those skilled in the art will appreciate that electric powered or solar powered logistics asset vehicles may have a lower environmental impact through use when compared to some fossil fuel powered delivery vehicles used by other logistics assets. Likewise, those skilled in the art will appreciate the autonomous electric delivery robots operating as a type of logistics asset may also have a lower environmental impact (and lower monetary cost incurred) related to their use when compared to human-controlled and deployed fossil fuel powered delivery vehicles as another type of logistics asset. As such, backend server 2510 may compare the retrieved event information 1505 to the logistics asset usage profile 2500 and select the first logistics asset by being further operative to identify a location of the storage receptacle based upon the retrieved event information 1505; compare the location of the storage receptacle to the environmental impact information related to use of each of the logistics assets; and select the first logistics asset as a result of this comparison involving environmental impact information. In more detail, the backend server may select the first logistics asset based upon the result of comparing the location of the storage receptacle (e.g., the location of position 2100 for node-enabled logistics receptacle 150*a*) to the environmental impact information related use of each of the different logistics assets as an environmental cost optimized selection from the different logistics assets.

Additionally, the exemplary logistics asset usage profile 2500 used in this embodiment may be implemented to include logistics asset class information for each of the different logistics assets. Such logistics asset class information is generally information that distinguishes each of the different logistics assets with a characteristic grouping or class assigned to each of the assets. Exemplary logistics asset class information may include an incurred time factor for use of a type of logistics asset in the dispatched logistics operation. In another example, exemplary logistics asset class information may be implemented as a type of logistics asset for use in the dispatched logistics operation (e.g., an autonomous type of logistics asset, a non-autonomous type of logistics asset, an inhouse fleet type of logistics asset, a third-party fleet type of logistics asset, and a third-party trusted class type of logistics asset (such as an on-demand type of single engagement logistics asset from a marketplace set of logistics resources like Uber®, Lyft®, or other gig-type on-demand couriers)). As such, backend server 25100 may compare the retrieved event information 1505 to the logistics asset usage profile 2500 and select the first logistics asset by being further operative to identify a location of the storage receptacle (e.g., position 2100 of receptacle 150*a*) based upon the retrieved event information; compare the location of the storage receptacle to the logistics asset class information in profile 2500; and select the first logistics asset as a result of comparing the location of the storage receptacle to the logistics asset class information related use of each of the different logistics assets.

Comparison of the retrieved event information 1505 to information in the logistics asset usage profile 2500 may, in some embodiments, involve specific consideration of the location of the storage receptacle related to such event information. For example, the system embodiment may have backend server 25100 being operative to compare the retrieved event information to the logistics asset usage profile by being further operative to identify a location of the storage receptacle; and compare the retrieved event information to the logistics asset usage profile using the location of the storage receptacle. In some embodiments, backend server 25100 may identify the location of the storage receptacle based upon location information in the management profile maintained by the backend server (e.g., exemplary management profile 835 that may be updated with revised position information as different node-based logistics receptacles are moved or relocated).

Exemplary logistics asset usage profile 2500, as implemented in some embodiments, may include location information related to each of the different logistics assets. As such and in a particular example, backend server 25100 may be operative to compare the retrieved event information 1505 to the logistics asset usage profile 2500 and select the first logistics asset by being further operative to identify the location of the storage receptacle based upon the retrieved event information; compare the location of the storage receptacle to (a) the cost information related to use of each of the plurality of logistics assets and (b) the location information related to each of the plurality of logistics assets; and select the first logistics asset as a result of comparing the location of the storage receptacle to (a) and (b). In another example where the logistics asset usage profile includes location information on the logistics assets, backend server 25100 may be operative to compare the retrieved event information 1505 to the logistics asset usage profile 2500 and select the first logistics asset by being further operative to identify the location of the storage receptacle based upon the retrieved event information; compare the location of the storage receptacle to (a) the environmental impact information related to use of each of the plurality of logistics assets and (b) the location information related to each of the plurality of logistics assets; and then select the first logistics asset as a result of comparing the location of the storage receptacle to (a) and (b). In still another example where the logistics asset usage profile includes location information on the logistics assets, backend server 25100 may be operative to compare the retrieved event information 1505 to the logistics asset usage profile 2500 and select the first logistics asset by being further operative to identify the location of the storage receptacle based upon the retrieved event information; compare the location of the storage receptacle to (a) the logistics asset class information related to each of the plurality of logistics assets and (b) the location information related to each of the plurality of logistics assets, and then select the first logistics asset as a result of comparing the location of the storage receptacle to (a) and (b).

In a further embodiment that involves the backend server 25100 using logistics asset usage profile 2500, server 25100 may also consider historic use patter information as part of dynamically initiating the dispatched logistics operation. For example, an embodiment may have the system's backend server 25100 being further operative to dynamically initiate the dispatched logistics operation based upon a comparison of the retrieved event information 1505 to a server-tracked historic use pattern for the storage receptacle (e.g., identifying a pattern of use (such as delivery events) of that storage receptacle) maintained as part of management profile 835 on the backend server 25100. The server-tracked historic use pattern in such an embodiment is information on prior detected engagements with the storage receptacle as updated by the backend server based on prior event information on the storage receptacle as received by the backend server. In this example, backend server 25100 may be further operative to dynamically initiate the dispatched logistics operation when the comparison of the retrieved event information 1505 to the server-tracked historic use pattern for the storage receptacle indicates a likelihood for an additional deposit of a further delivery item detected within the storage receptacle to be less than a threshold dispatch initiation value. In more detail, backend server 25100 may dynamically initiate the dispatched logistics operation using the first logistics asset by being further operative to (a) access a server-tracked historic use pattern for the storage receptacle from exemplary management profile 835; (b) compare the retrieved event information 1505 to the server-tracked historic use pattern for that storage receptacle that is part of the logistics receptacle 150*a* sending the event information 1505; and (c) dynamically initiate the dispatched logistics operation using the first logistics asset when the likelihood for an additional deposit of a further delivery item detected within that storage receptacle is determined to be less than the threshold dispatch initiation value (where the likelihood for an additional deposit of a further delivery item is based upon comparing the retrieved event information 1505 to the server-tracked historic use pattern for that storage receptacle).

Those skilled in the art will appreciate that still further embodiments that dynamically initiate the dispatched logistics operation based on information within a logistics asset usage profile may also have the backend server 25100 considering (e.g., comparing to event information) context information related to the operating environment of the particular storage receptacle (such as crime data, traffic data, and weather data, logistics asset staffing data, and logistics asset cost data) as well as context information related to locations on a route for a particular logistics asset used to service that storage receptacle. For example, an embodiment may have backend server 25100 be further operative to dynamically initiate the dispatched logistics operation using the first logistics asset based upon a further comparison of the retrieved event information received from the bridge node (e.g., exemplary retrieved event information 1505) to context information related to an operating environment of the storage receptacle (e.g., information related to a current location of the storage receptacle, such as crime data, traffic data, and/or weather data). In another example, an embodiment may have backend server 25100 being further operative to dynamically initiate the dispatched logistics operation using the first logistics asset based upon a comparison of the retrieved event information 1505 to context information related to multiple locations on a route for the first logistics asset (e.g., at least one of crime data, traffic data, and/or weather data regarding the different locations on the route for the first logistics asset). Such a route may, more specifically, be an existing scheduled route for the first logistics asset.

Additionally, those skilled in the art will appreciate that further embodiments that dynamically initiate the dispatched logistics operation based on information in a logistics asset usage profile may also have the backend server 25100 initiating the dispatched logistics operation via a transmitted redirect dispatch message to a particular logistics asset to redirect the logistics asset from a prior scheduled logistics operation (e.g., or to redirect the logistics asset to a predicted location of the storage receptacle when implemented as a mobile storage receptacle). Further still, those skilled in the art will appreciate that yet further embodiments that dynamically initiate the dispatched logistics operation based on information in a logistics asset usage profile may also have the backend server 25100 initiating the dispatched logistics operation via transmission of a combination dispatch message to a particular logistics asset to (a) initiate servicing the storage receptacle as part of reporting node-based logistics receptacle 150*a* as the dispatched logistics operation and to (b) further dispatch a sweep operation to service an additional storage receptacle (e.g., non-reporting node-enabled logistics receptacle 150*b*). Alternatively, such a combination dispatch message may be transmitted to the particular logistics asset to (a) prompt that logistics asset to continue with a sweep operation of an additional storage receptacle (e.g., receptacle 150*b*) and then to (b) initiate servicing of the storage receptacle (e.g., receptacle 150*a*) upon completion of the sweep operation of the additional non-reporting storage receptacle.

More generally, another embodiment of an exemplary system that dynamically initiates a dispatched logistics operation for a storage receptacle based upon information in a logistics asset usage profile may similarly include backend server 25100, a bridge node (e.g., exemplary bridge node 200, 16200) mounted to the storage receptacle in exemplary node-based logistics receptacle 150*a*, and a wireless accessory sensor node (e.g., exemplary wireless accessory sensor node 210, 1002, 1002*a*, 1002*b*) and one or more coupled sensor(s) within logistics receptacle 150*a*. In this more general embodiment, the system's backend server 25100 maintains a logistics asset usage profile (e.g., exemplary profile 2500) related to multiple logistics assets (e.g., exemplary logistics assets 700*a*-700*c*). Such a logistics asset usage profile used by the system's backend server 25100 may include, for example, cost information related use of each of the logistics assets; environmental impact information related to use of each of the logistics assets; and logistics asset class information for each of the logistics assets. Those skilled in the art will appreciate that this system embodiment has the system's bridge node being operative to retrieve event information from the wireless accessory sensor node and transmit the retrieved event information (e.g., exemplary retrieved event information 1505) to the backend server 25100. Backend server 25100, in response to receiving the retrieved event information 1505, is operative to compare the retrieved event information received from the bridge node to the logistics asset usage profile related to the plurality of logistics assets, select a first logistics asset from the plurality of logistics assets as a result of comparing the retrieved event information received from the bridge node to the logistics asset usage profile, and dynamically initiate the dispatched logistics operation using the first logistics asset.

Self Auto-Unlocking of a Node-Based Connected Logistics Receptacle

In some embodiments, a further improvement may have an exemplary node-based connected logistics receptacle deployed as part of a system equipped to automatically unlock to provide enhanced access to within the logistics receptacle. For example, and as illustrated in FIGS. 26A-30, an embodiment's system may have an exemplary bridge node become aware of the state or status of an approaching mobile logistics asset (e.g., a logistics delivery van with a vehicle deployed type of bridge node operating as an associated mobile transceiver or a courier riding in the van having a mobile handheld node (e.g., smartphone or mobile bridge node like device operated by that courier)). As that mobile logistics asset approaches the exemplary connected logistics receptacle, the receptacle's bridge node becomes aware of status information on the mobile logistics asset (such as the ignition state of the mobile delivery van) and the receptacle's bridge node may automatically change the locked state of that exemplary node-based connected logistics receptacle upon approach depending on the status information, without interrogation of the receptacle's bridge node, and/or with authentication of the approaching logistics asset. Various embodiments may involve modes of interaction that include direct node-to-node authentication, contextual awareness (e.g., where the backend server knows why such a mobile logistics asset is approaching and initiates an automatic unlock to be carried out by the receptacle's bridge node), and/or where an approaching device may issue an unlock request to the backend server where the backend server responsively sends an unlock key to the approaching device (e.g., the mobile logistics asset's mobile handheld or to the vehicle's mobile transceiver) when in proximity to the appropriate node-based connected logistics receptacle.

Figure 26A:
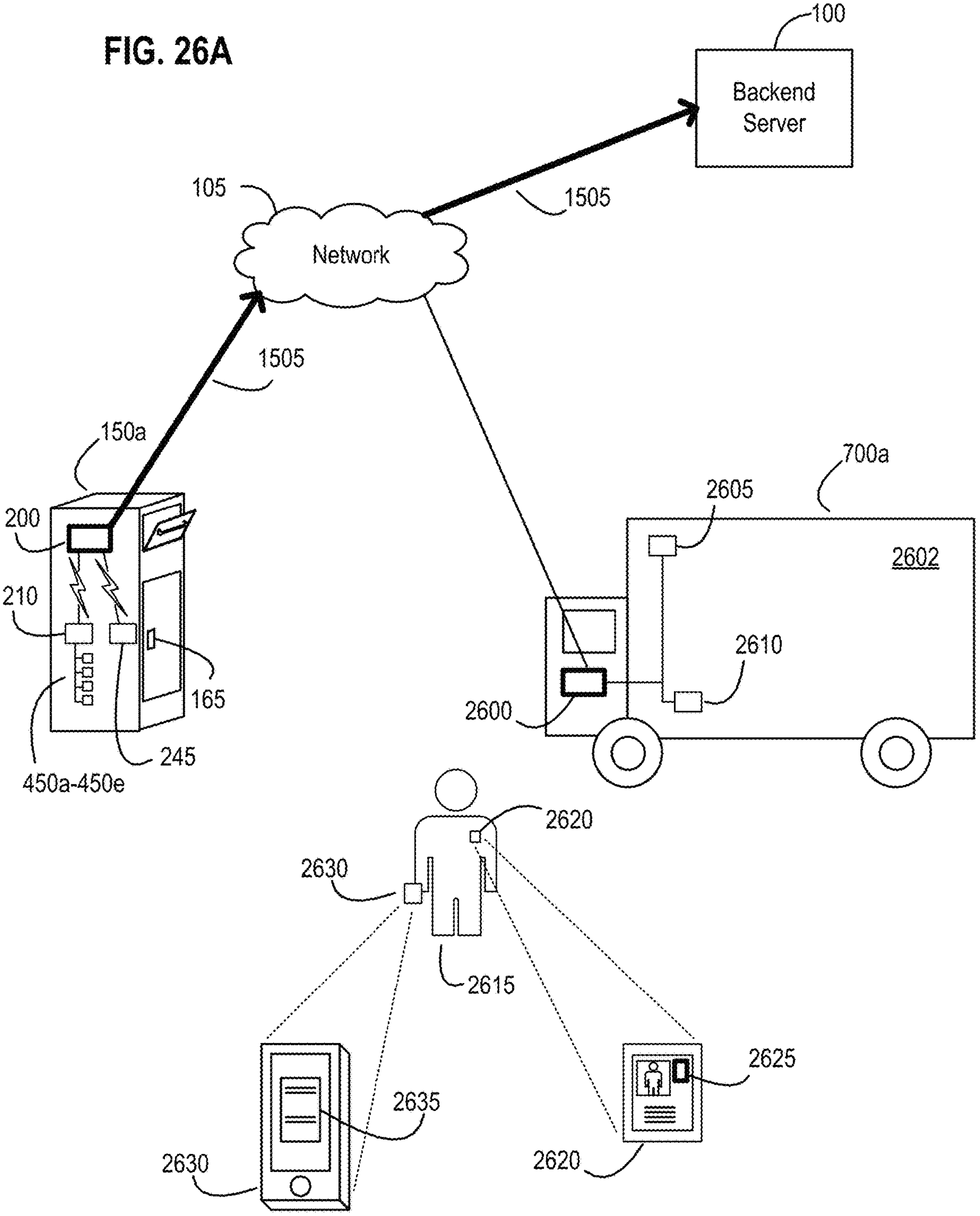
FIGS. 26A-26C are diagrams illustrating an exemplary connected logistics receptacle operating as part of a system with proactive unlocking functionality related to a dispatched logistics operation by an exemplary mobile logistics asset having an associated mobile transceiver in accordance with an embodiment of the invention.
Figure 26B:
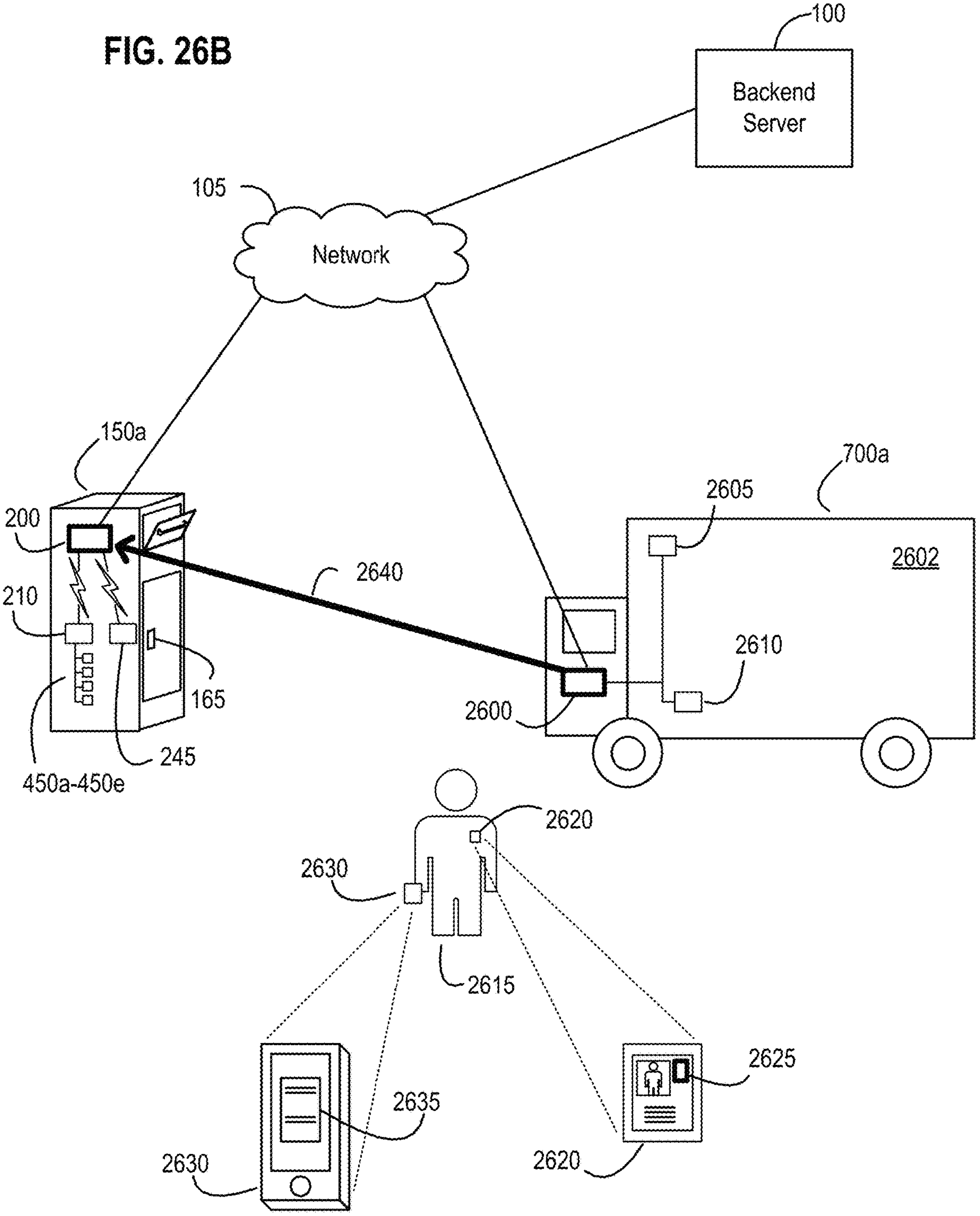
Figure 26C:
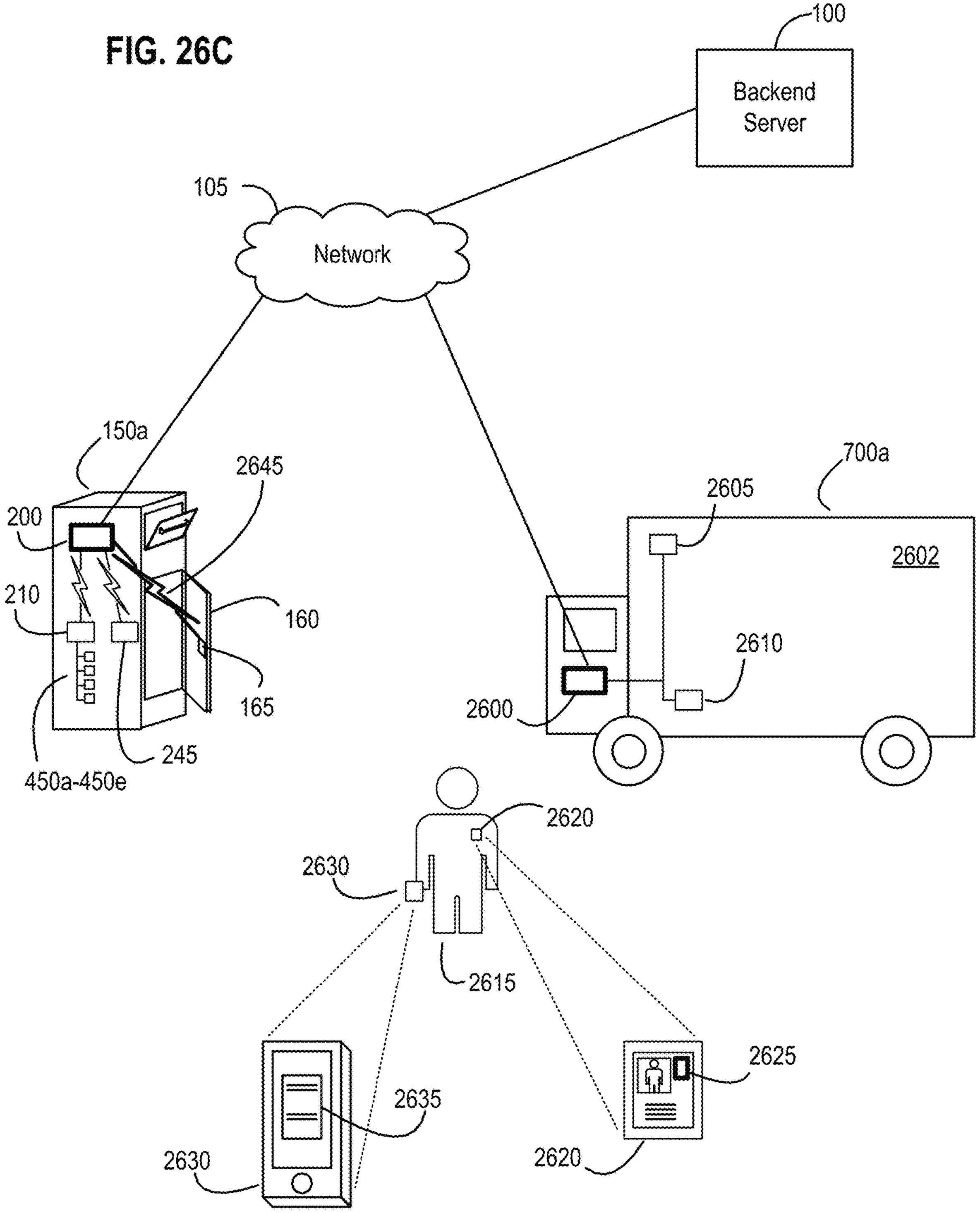

In more detail, FIGS. 26A-26C present diagrams illustrating an exemplary connected logistics receptacle operating as part of a system with proactive unlocking functionality related to a dispatched logistics operation by an exemplary mobile logistics asset having an associated mobile transceiver in accordance with an embodiment of the invention. Referring now to FIG. 26A, exemplary connected logistics receptacle 150*a* is shown along with backend server 100 and exemplary mobile logistics asset 700*a* (e.g., courier personnel 2615 and a delivery vehicle 2602).

Exemplary connected logistics receptacle 150*a* shown in FIG. 26A has a storage receptacle for receiving and maintaining a delivery item (as previously described having temporary storage area 205 and accessible retrieval door 160). Exemplary connected logistics receptacle 150*a* is illustrated having at least exemplary bridge node 200, exemplary wireless accessory sensor nodes 210, 245, lock 165 for door 160 that provides access to within the storage receptacle, and sensors 450*a*-450*e* that are coupled to at least one of the wireless accessory sensor nodes on receptacle 150*a*. Consistent with exemplary lock 165 described above, those skilled in the art will appreciate that lock 165 shown in FIG. 26A is disposed on the storage receptacle and relative to the selectively accessible retrieval door 160, and is operative to change between two lock states in response to a lock control input (e.g., a secure state of lock 165 that prevents the selectively accessible retrieval door 160 from opening and providing access to within the temporary storage area, and an unlocked state of lock 165 that allows the selectively accessible retrieval door 160 to open relative to the temporary storage area for selective access to within the temporary storage area of exemplary connected logistics receptacle 150*a*).

Exemplary delivery vehicle 2602 is shown as having an exemplary mobile transceiver 2600, location circuitry 2605 coupled to transceiver 2600, and vehicle status monitoring circuitry 2610 coupled to transceiver 2600. Exemplary mobile transceiver 2600 is a type of vehicle-based wireless transceiver associated with the mobile logistics asset 700*a* and operative to wirelessly communicate (e.g., via communication over network 105 to backend server 100, via communication to other handheld or mobile transceivers, via communication to exemplary bridge node 200 within receptacle 150*a*). Exemplary location circuitry 2605 is disposed on or within vehicle 2602 and is operative to provide information on the current location of vehicle 2602 (e.g., location coordinates, relative position, and the like) and/or movement status of vehicle 2602 (e.g., moving, stationary, direction of movement, current speed, and the like). Exemplary vehicle status monitoring circuitry 2610 may be implemented with sensor-based hardware and/or software that receives and/or monitors information on the delivery vehicle 2602, such as the operating status of the vehicle (e.g., an ignition status, a braking status, a transmission status (such as a park, reverse, drive indication), a status of doors on the vehicle, and the like).

Exemplary courier personnel 2615 shown in FIG. 26A is equipped with a wireless device 2630 and mobile node-enabled badge 2620. Exemplary mobile handheld communication device 2630 is carried by courier personnel 2615 and may operate as a type of mobile wireless transceiver associated with the mobile logistics asset 700*a* (e.g., such as an augmented reality enabled implementation of device 2630 used by logistics personnel). Using exemplary mobile handheld communication device 2630, courier personnel 2615 may send/receive information, which may be displayed as information 2635 on the device 2630 (e.g., exemplary information 2635 as processor-generated information overlaid on a view through device 2630). Exemplary mobile node-enabled badge 2620 in this example is carried by courier personnel 2615 and aside from providing visual identification information related to courier personnel 2615 may also operate as a type of mobile wireless transceiver associated with the mobile logistics asset 700*a* where information may be wirelessly transmitted by logic 2625 within badge 2620. Exemplary mobile node-enabled badge 2620 identifies personnel 2615 via information presented on badge 2620 and/or via information maintained by logic 2625 (e.g., an RFID tag within information related to personnel 2615, a BLE device capable of storing and sending information related to personnel 2615 to other devices, a battery-powered transceiver operative to maintain and wirelessly transmit such information, and the like).

Those skilled in the art will appreciate that exemplary wireless device 2630 carried by logistics personnel 2615 (e.g., operating as a type of mobile wireless transceiver associated with the mobile logistics asset 700*a*) may, like exemplary device 1700 previously noted, be implemented as an exemplary processor-based augmented reality device (e.g., AR headset or enhanced glasses) used by courier personnel 2615. Those skilled in the art will appreciate that incorporation of augmented reality as part of the logistics personnel operating device 2630 (like exemplary device 1700) facilitates an enhanced interactive experience that combines real world content (e.g., a view of the surrounding area proximate device 2630) and processor-generated content (e.g., such as exemplary information 2635 corresponding to virtual symbols, objects, information, prompted messages, directions, sensory information, and the like overlaid on the real world content) shown in an interwoven manner that advantageously allows the logistics personnel to better perceive both the real world content and the processor-generated content. In general, an exemplary augmented reality enhanced device implementation of device 2630 may include a processor, memory, a display (e.g., a heads up display that may be viewed on the device by the user or a look through display viewed through by the user with real world and processor-generated content appearing on the display), sensors (e.g., GPS sensors, accelerometer, imaging sensors, camera, and the like), a wireless transceiver for communication with other devices, as well as input devices for user input and interactivity (e.g., button, cursor, touch-screen, microphone, and the like). Such an exemplary augmented reality enhanced device implementation of device 2630 may, for example, be implemented as augmented reality glasses that project a digital overlay directly in the logistics personnel's field of vision. In general, an exemplary augmented reality enhanced device implementation of device 2630 presents the logistics personnel (as the user) with a combination of digital and physical worlds, facilitates interactions made in near real time with less distraction for the logistics personnel, and an accurate 3D identification of virtual and real objects for use by the logistics personnel when engaging in such interactions (e.g., receiving information displayed, recognizing objects (such as an exemplary node-based logistics receptacle), and providing responsive input/feedback based upon the information displayed). Further, such an exemplary processor based augmented reality device implementation of device 2630 may still provide the ability to connect to network 105 and communicate with other devices, such as mobile handheld bridge nodes used by other logistics personnel (which may themselves have augmented reality features), wireless transceivers onboard a logistics vehicle, and/or connect with and communicate with a node-based logistics receptacle (e.g., once authorized and authenticated to do so) via its wireless transceiver. Information presented via exemplary augmented reality enhanced device 2630 may be accompanied, for example, with additional notification enhancements (e.g., sound, colors, highlights, haptic feedback, and the like) that help draw attention to the information as perceived by the logistics personnel operating the exemplary augmented reality enhanced device 2630.

In this exemplary embodiment of an improved connected logistics receptacle system with proactive unlocking functionality related to a dispatched logistics operation by a mobile logistics asset (e.g., exemplary mobile logistics asset 700*a*), exemplary bridge node 200 is mounted to the storage receptacle of exemplary connected logistics receptacle 150*a* and programmatically adapted and configured to be operative to perform particular tasks that have bridge node 200 advantageously interacting with backend server 100 as well as transceiver elements of the mobile logistics asset to initiate such unlocking functionality. For example, exemplary bridge node 200 is programmatically adapted and configured to transmit time-based event information to the backend server 100 to cause the backend server 100 to initiate the dispatched logistics operation for the storage receptacle, which may involve having server 100 initiating communications with mobile logistics asset 700*a*. Such time-based event information reflects detection of receipt of the delivery item relative to the storage receptacle.

Exemplary bridge node 200 in this embodiment is further programmatically adapted and configured to receive status information from the mobile transceiver associated with the mobile logistics asset 700*a*, such as exemplary status information 2640 received from mobile transceiver 2600 on delivery vehicle 2602 as shown in FIG. 26B. In other embodiments, such status information may be received from mobile node-enabled badge 2620 carried by courier personnel 2615 operating as the mobile transceiver associated with the mobile logistics asset 700*a* or from mobile handheld communication device 2630 carried by courier personnel 2615 operating as the mobile transceiver associated with the mobile logistics asset 700*a*.

The status information received includes at least an operating status related to the mobile logistics asset 700 (e.g., an operating status of the delivery vehicle 2602 associated with the mobile logistics asset 700*a*). In more detail, the operating status of the delivery vehicle 2602 associated with the mobile logistics asset 700*a* may include an ignition status of the delivery vehicle 2602, a braking status of delivery vehicle 2602, a transmission status of delivery vehicle 2602, a status of doors/access openings on delivery vehicle 2602, a location status of the delivery vehicle 2602, a movement status of delivery vehicle 2602, a location status and movement status of delivery vehicle 2602, or a combination of different types of operating status information on the delivery vehicle 2602. The location status of vehicle 2602 may, in some examples, include a current location of the delivery vehicle 2602 relative to a location of the storage receptacle and/or relative to a geo-fence location associated with the storage receptacle.

With the status information, exemplary bridge node 200 in this embodiment is further programmatically adapted and configured to generate a lock control input 2645 (e.g., a type of command or control signal) to automatically change the lock 165 from the secure state to the unlocked state based upon the status information received from the mobile transceiver. Further embodiments may have exemplary bridge node 200 being operative to generate a subsequent signal as the lock control input to automatically change the lock from the unlocked state to the secure state based upon updated status information received from the mobile transceiver.

Figure 27:
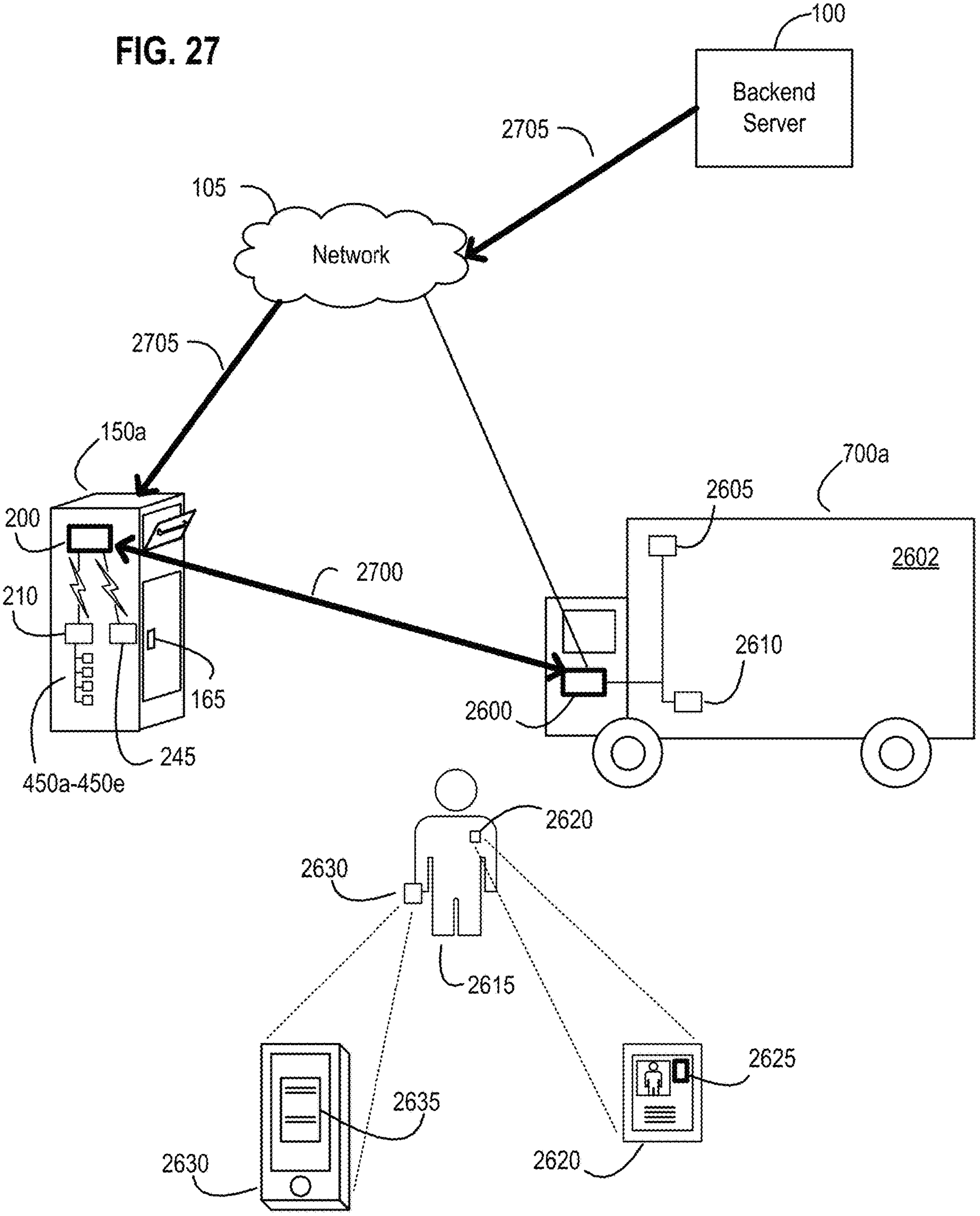
FIG. 27 is a diagram illustrating the exemplary connected logistics receptacle, exemplary backend server, and exemplary mobile logistics asset of FIGS. 26A-26C and further illustrating authentication of the approaching mobile logistics asset in accordance with an embodiment of the invention.

In more detailed embodiments, such an exemplary system may deploy authentication functionality on whether the mobile transceiver is authorized for accessing the storage receptacle as part of exemplary connected logistics receptacle 150*a*. FIG. 27 is a diagram illustrating the exemplary connected logistics receptacle 150*a*, exemplary backend server 100, and exemplary mobile logistics asset 700*a* of FIGS. 26A-26C and further illustrating authentication of the approaching mobile logistics asset 700*a* in accordance with an embodiment of the invention. Referring now to FIG. 27, exemplary authentication data 2705 from backend server 100 may be received by exemplary bridge node 200 to use as part of authentication handshaking 2700 communications with the approaching mobile transceiver 2600. Bridge node 200 may then be operative to authenticate whether the mobile transceiver 2600 associated with the mobile logistics asset 700*a* is authorized to conduct the dispatched logistics operation for the storage receptacle based upon authentication data 2705 that identifies an authorized entity dispatched for the dispatched logistics operation for the storage receptacle. Such exemplary authentication data 2705 may, for example, be implemented as a device identifier for an authorized communication device associated with the authorized entity dispatched for the dispatched logistics operation for the storage receptacle. As such, the bridge node 200 is further operative to authenticate whether the mobile transceiver associated with the mobile logistics asset 700*a* (e.g., mobile transceiver 2600, handheld 2630, node-enabled badge 2620, an AR headset implementing any of devices 2600, 2630) is authorized to conduct the dispatched logistics operation for the storage receptacle.

In more detail, bridge node 200 may be operative to generate the lock control input by being further operative to generate the lock control input 2645 to automatically change the lock 165 from the secure state to the unlocked state when (a) the mobile transceiver 2600 has been authenticated by the bridge node 200 as being authorized to conduct the dispatched logistics operation for the storage receptacle and (b) based upon the status information received from the mobile transceiver 2600. Such an authentication of whether the mobile transceiver 2600 associated with the mobile logistics asset 700*a* is authorized to conduct the dispatched logistics operation for the storage receptacle may be accomplished when bridge node 200 successfully conducts an authentication handshake operation with authentication handshaking signals 2700 with the mobile transceiver 2600. Such an authentication handshake operation may be implemented using an encrypted identify verification protocol as part of authentication handshaking signals 2700. In a further example, the authentication handshake operation may be implemented as an identify verification operation where the bridge node 200 is operative to send a challenge message to the mobile transceiver 2600 to which the mobile transceiver 2600 responds with a correct response message to the challenge message as part of the authentication handshake operation (e.g., as part of the messaging making up authentication handshaking signals 2700).

Figure 28:
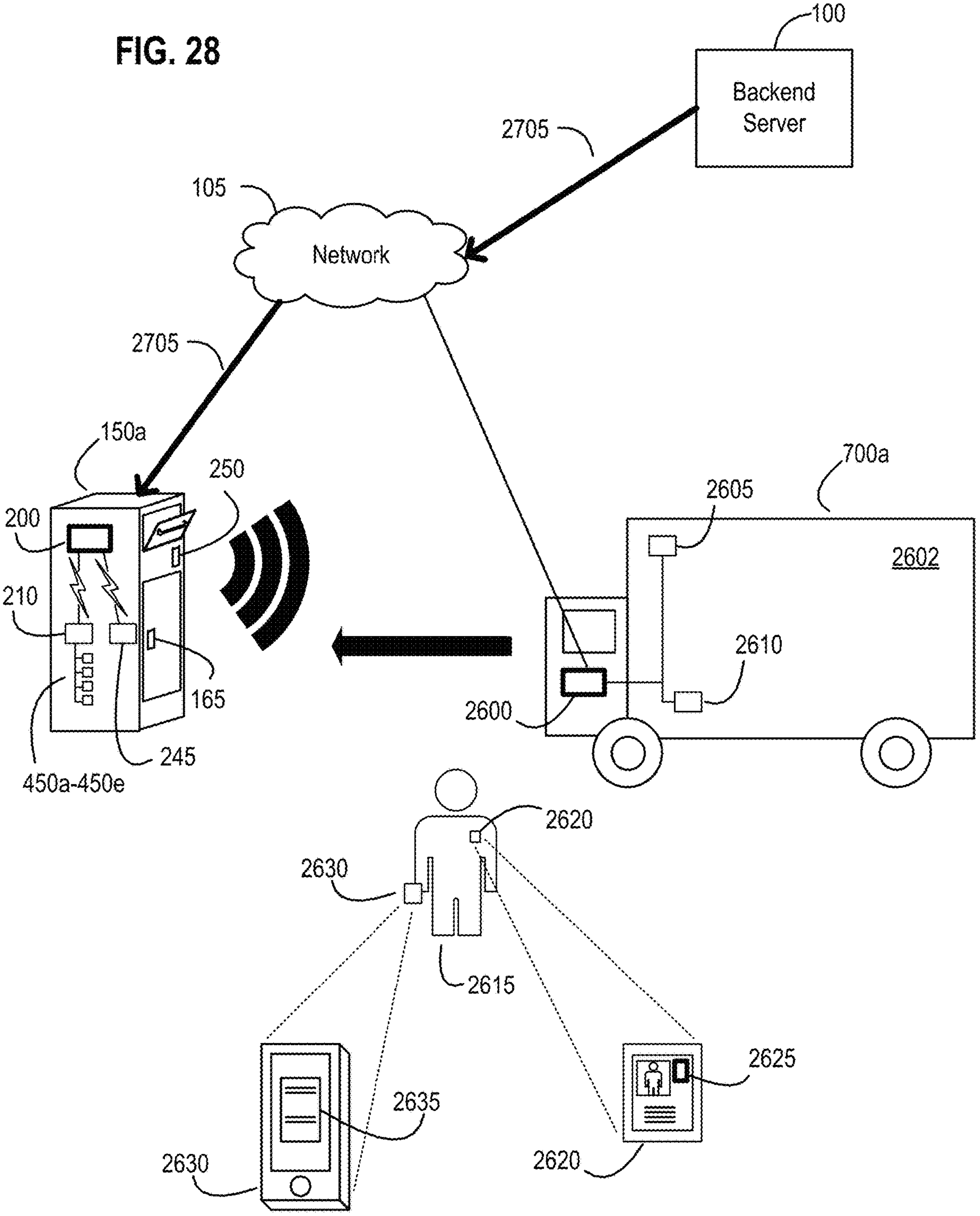
FIG. 28 is a diagram illustrating the exemplary connected logistics receptacle, exemplary backend server, and exemplary mobile logistics asset of FIGS. 26A-26C and further illustrating another example of authentication of the approaching mobile logistics asset in combination with proximity sensing in accordance with an embodiment of the invention.

FIG. 28 is a diagram illustrating the exemplary connected logistics receptacle 105*a*, exemplary backend server 100, and exemplary mobile logistics asset 700*a* of FIGS. 26A-26C and further illustrating another example of authentication of the approaching mobile logistics asset in combination with detecting the approaching logistics asset (e.g., via proximity sensing) in accordance with an embodiment of the invention. Referring now to FIG. 28, exemplary mobile logistics asset 700*a* is shown approaching the location of exemplary connected logistics receptacle 150*a*. In such a situation, an exemplary embodiment may have bridge node 200 being further operative, prior to receiving the status information, to detect the mobile transceiver 2600 associated with the mobile logistics asset 700*a* after transmission of the time-based event information to the backend server 100. Such detection may, for example, be in the form of physical proximity detecting the approaching mobile logistics asset 700*a* using external sensor node 250 that uses an external sensor monitoring for a change in the state of the near-by and proximate environment of exemplary connected logistics receptacle 150*a*. In another example, such detection may be in the form of bridge node 200 detecting an identification message broadcast from the mobile transceiver 2600.

In another example, bridge node 200 may, prior to receiving the status information, be further operative to detect, after transmission of the retrieved event information to the backend server 100, the mobile logistics asset 700*a* to be within a threshold distance from the storage receptacle using an external proximity sensor coupled to the bridge node 200 (e.g., a proximity sensor coupled to bridge node 200 through exemplary external sensor node 250); and then authenticate whether the mobile transceiver associated with the detected mobile logistics asset (e.g., transceiver 2600, device 2630, badge 2620, an AR headset implementing any of devices 2600, 2630, and the like) is authorized to conduct the dispatched logistics operation for the storage receptacle. In another example, bridge node 200 may, prior to receiving the status information, be further operative to detect, prior to receiving the status information, the mobile transceiver associated with the mobile logistics asset after transmission of the retrieved event information to the backend server; and authenticate whether the mobile transceiver is authorized to conduct the dispatched logistics operation for the storage receptacle.

In yet another example, the bridge node 200 may be operative to receive the status information from the mobile transceiver by being further operative to receive an operating status message from the mobile transceiver having information on an operating status of a delivery vehicle associated with the mobile logistics asset. With that operating status message, the bridge node 200 is operative in this example to generate the lock control input to automatically change the lock 165 from the secure state to the unlocked state by being further operative to authenticate whether the mobile transceiver associated with the mobile logistics asset is authorized to conduct the dispatched logistics operation for the storage receptacle, and generate the lock control input to automatically change the lock from the secure state to the unlocked state when (a) the mobile transceiver has been authenticated by the bridge node as being authorized to conduct the dispatched logistics operation for the storage receptacle and (b) based upon the operating status of the delivery vehicle associated with the mobile logistics asset. In some embodiments, the bridge node 200 is also operative to generate a subsequent signal as the lock control input to automatically change the lock 165 from the unlocked state to the secure state based upon updated status information received from the mobile transceiver.

Figure 29A:
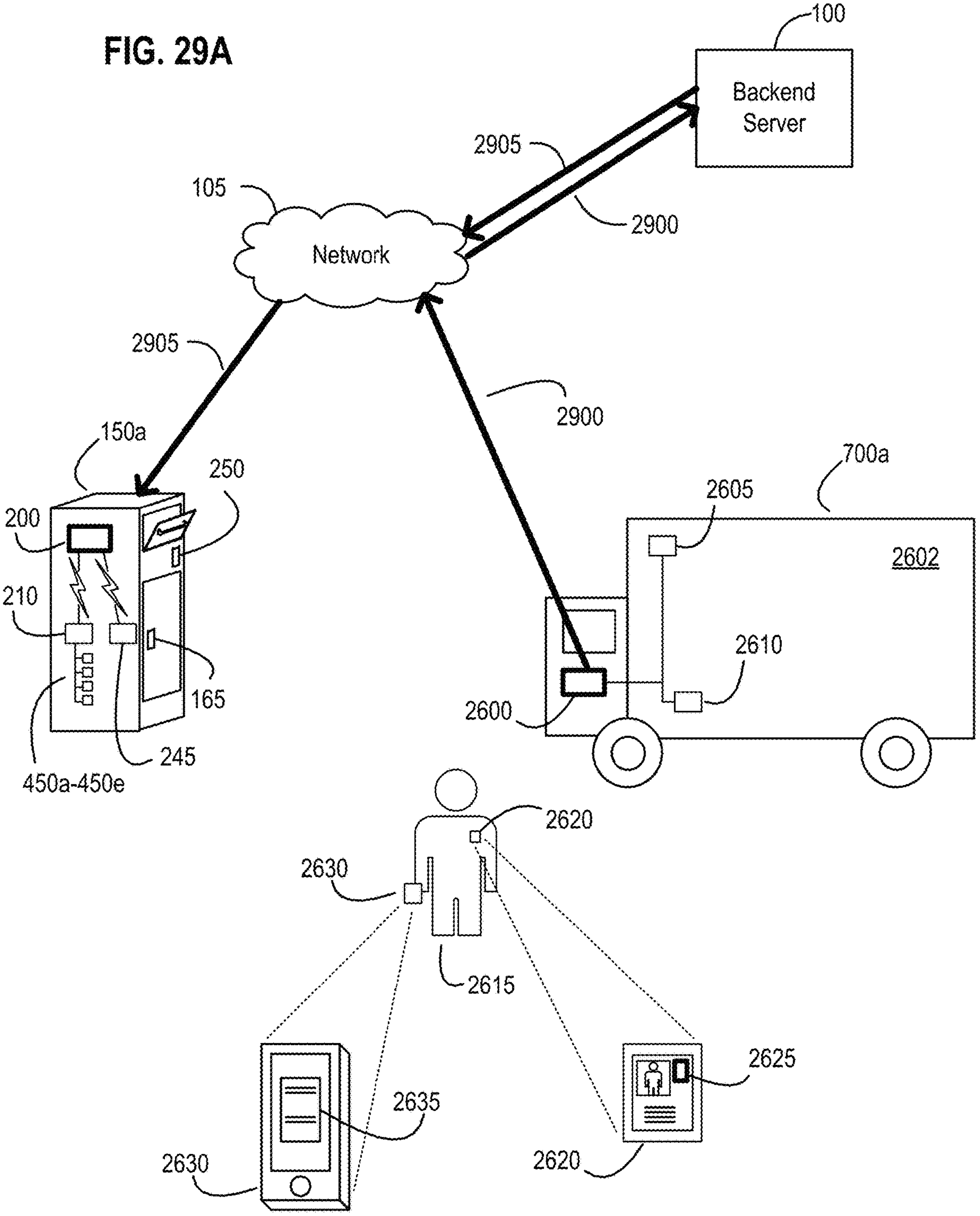
FIGS. 29A-29B are diagrams illustrating the exemplary connected logistics receptacle, exemplary backend server, and exemplary mobile logistics asset of FIGS. 26A-26C and further illustrating still another example of authentication of the approaching mobile logistics asset related to the location of the mobile logistics asset in accordance with an embodiment of the invention.
Figure 29B:
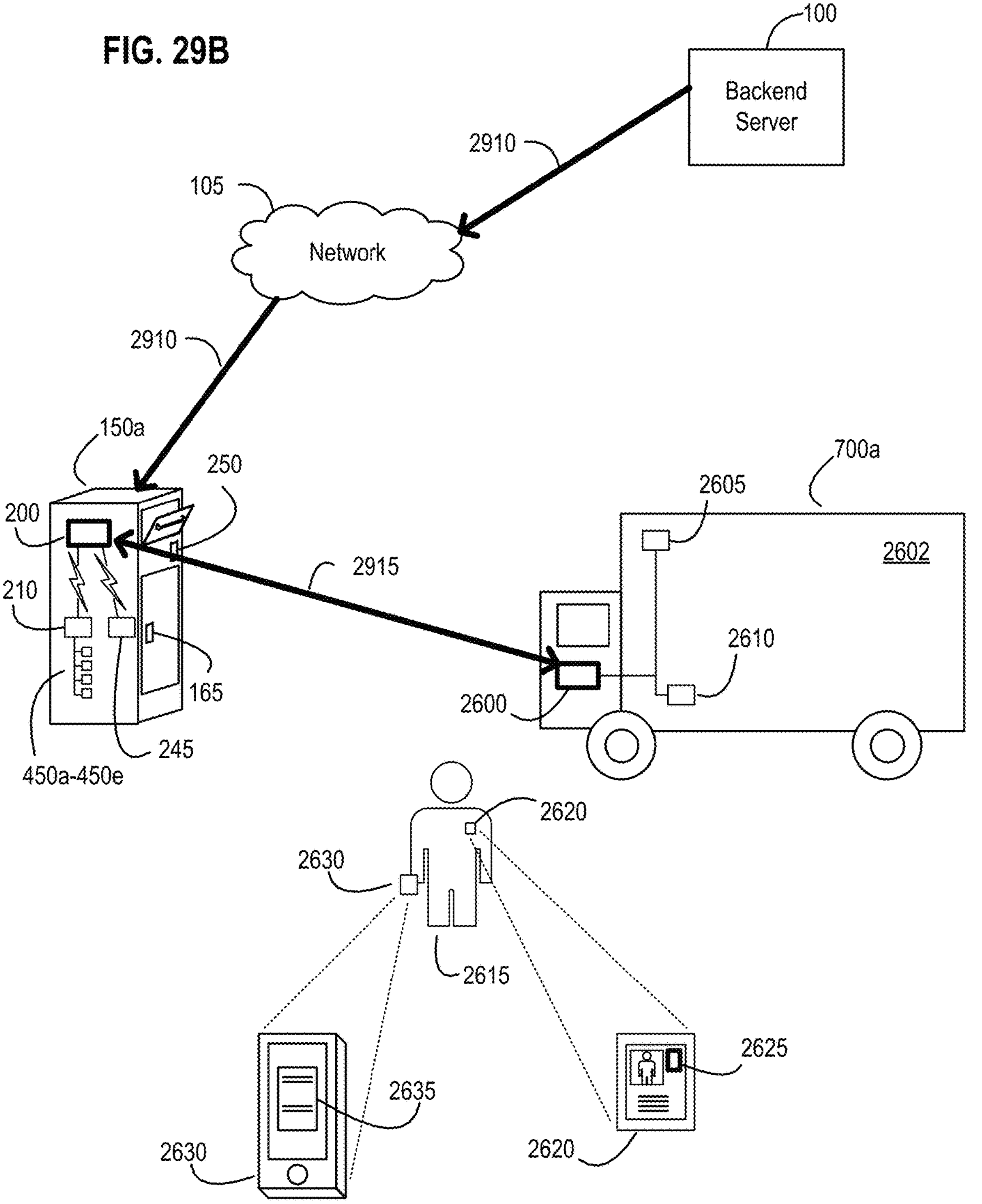

FIGS. 29A-29B are diagrams illustrating the exemplary connected logistics receptacle 150*a*, exemplary backend server 100, and exemplary mobile logistics asset 700*a* of FIGS. 26A-26C and further illustrating still another example of authentication of the approaching mobile logistics asset 700*a* related to the location of the mobile logistics asset 700*a* in accordance with an embodiment of the invention. Referring now to FIG. 29A, exemplary bridge node 200 is programmatically adapted and configured to receive an unlock request 2905 from the backend server 100. The unlock request 2905 in this example may be based upon a current location of the mobile logistics asset 700a according to a location message 2900 received by the backend server 100 from the mobile transceiver 2600.

In a further example shown in FIG. 29B, the mobile asset's location may be sent to the backend server 100, which then requests that the bridge node 200 trigger authentication with mobile transceiver 2600 and then unlock upon successful authentication. In more detail, such an example may have bridge node 200 being operative to receive an authentication unlock request 2910 from the backend server 100. In response to the authentication unlock request 2910, the bridge node 200 authenticates whether the mobile transceiver 2600 associated with the mobile logistics asset 700a is authorized to conduct the dispatched logistics operation for the storage receptacle. The bridge node 200 then generates the lock control input 2645 to automatically change the lock 165 from the secure state to the unlocked state when (a) the mobile transceiver 2600 (or device 2630 or badge 2620 or an AR headset implementing devices 2600 or 2630) has been authenticated by the bridge node 200 as being authorized to conduct the dispatched logistics operation for the storage receptacle and (b) based upon the status information received from the mobile transceiver. Such authentication may be accomplished, for example, by successfully conducting an authentication handshake operation between bridge node 200 and the respective mobile transceiver (e.g., transceiver 2600, badge 2620, and/or handheld device 2630, which may be implemented as an AR headset).

Figure 30:
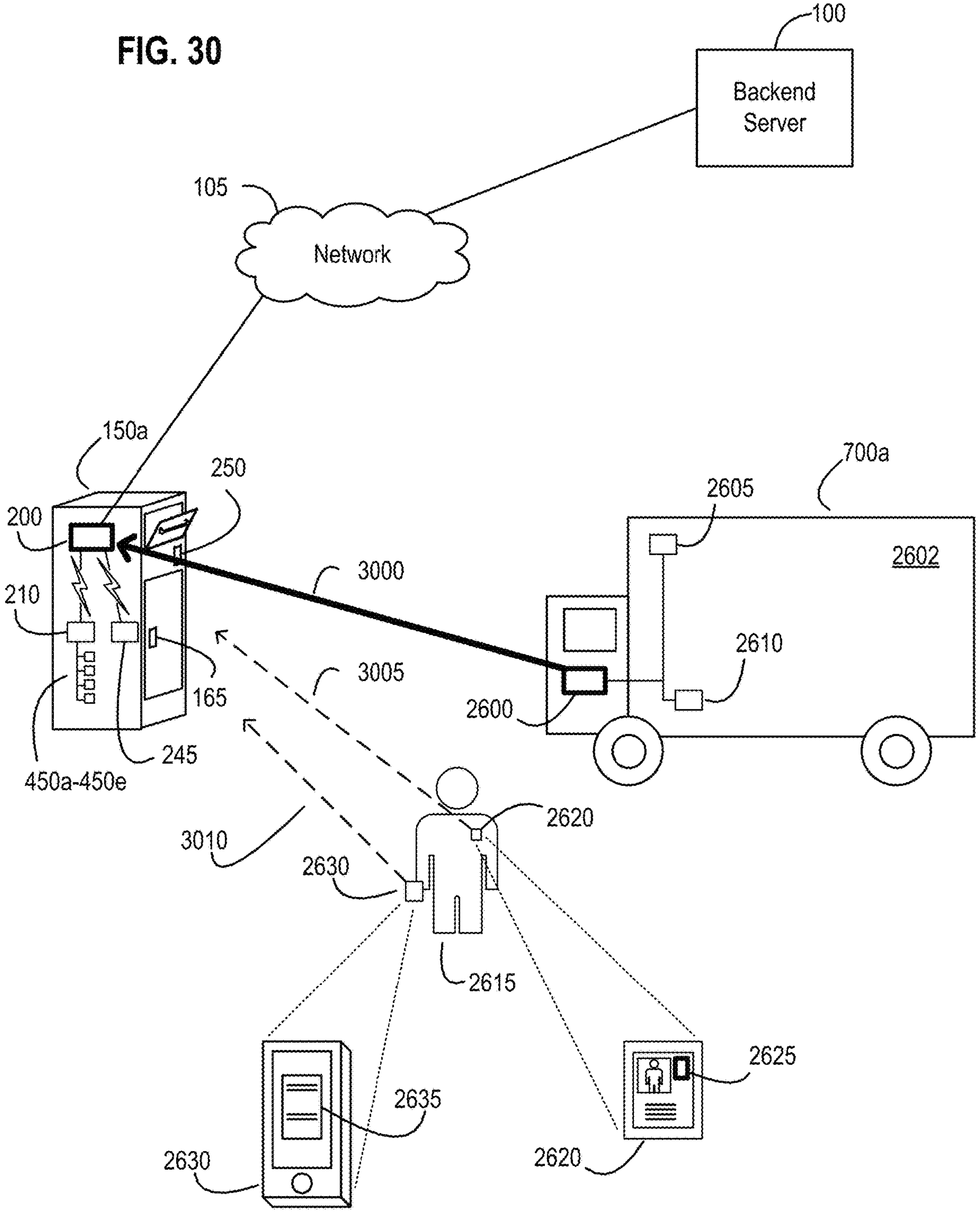
FIG. 30 is a diagram illustrating the exemplary connected logistics receptacle, exemplary backend server, and exemplary mobile logistics asset of FIGS. 26A-26C and further illustrating examples of different exemplary courier validation messages from different external devices in accordance with an embodiment of the invention.

In some embodiments, a courier validation message may also be provided by the respective mobile transceiver. FIG. 30 is a diagram illustrating the exemplary connected logistics receptacle 150a, exemplary backend server 100, and exemplary mobile logistics asset 700a of FIGS. 26A-26C and further illustrating examples of different exemplary courier validation messages from different external transceiver devices (e.g., transceiver 2600, badge 2620, and/or handheld device 2630, which may be implemented with augmented reality (AR) functionality) in accordance with an embodiment of the invention. Referring now to FIG. 30, bridge node 200 in this example is operative to generate the lock control input 2645 to automatically change the lock 165 from the secure state to the unlocked state by being further operative to receive a courier validation message 3000 from the mobile transceiver 2600 prior to generating the lock control input 2645; and then generate the lock control input 2645 to automatically change the lock 165 from the secure state to the unlocked state based upon (a) the status information received from the mobile transceiver and (b) the courier validation message received from the mobile transceiver. In a more detailed example, the processor in bridge node 200 may be operative to generate the lock control input to automatically change the lock from the secure state to the unlocked state by being further operative to receive courier validation message 3000 from the mobile transceiver (e.g., transceiver 2600, handheld transceiver 2630, an AR enabled transceiver implementing devices 2600 or 2630) prior to generating the lock control input 2645; and generate the lock control input 2645 to automatically change the lock 165 from the secure state to the unlocked state (a) based upon the status information received from the mobile transceiver and (b) when the courier validation message 3000 indicates a validation approval input from an operator of the mobile transceiver (e.g., from courier personnel 2615) to automatically change the lock 165 from the secure state to the unlocked state.

Those skilled in the art will appreciate that a further embodiment of such a system with proactive unlocking functionality related to a dispatched logistics operation may further include a wireless accessory sensor node having at least one sensor that monitors for a deposit of the delivery item relative to the storage receptacle, where the wireless accessory sensor node is operative to (a) detect receipt of the delivery item relative to the storage receptacle based upon sensor data generated by at least one sensor and (b) notify the bridge node 200 of time-based event information available for upload related to the detected receipt of the delivery item. In such a further embodiment, the bridge node 200 is also operative to retrieve the time-based event information from the wireless accessory sensor node in response to the notification from the wireless accessory sensor node and then (as described in embodiments above) transmit the time-based event information to the backend server 100, which causes the backend server 100 to initiate the dispatched logistics operation for the storage receptacle.

Those skilled in the art will also appreciate that a more detailed embodiment of such a system with proactive unlocking functionality related to a dispatched logistics operation may have the storage receptacle comprising an entrance opening 155 for receiving the delivery item, a temporary storage area 205 for temporarily maintaining the delivery item once the delivery item has been deposited within the storage receptacle through the entrance opening, a selectively accessible retrieval door 160 providing access to the delivery item within the temporary storage area 205 of the storage receptacle, and a lock 165 disposed on the storage receptacle and relative to the selectively accessible retrieval door 160. Similar to that described above, the lock 165 can change between two lock states in response to a lock control input 2645, where a first of the lock states comprises a secure state that prevents the selectively accessible retrieval door 160 from opening and providing access to within the temporary storage area 205, and where a second of the lock states is an unlocked state that allows the selectively accessible retrieval door 160 to open relative to the temporary storage area 205 for selective access to within the temporary storage area 205.

The bridge node 200 in this more detailed embodiment includes a bridge node processor 201, a bridge node memory 202 coupled to the bridge node processor and maintaining bridge node code for execution by the bridge node processor 201, and a communication interface 203 coupled to the bridge node processor 201 where the communication interface is operative to communicate with backend server 100 and a mobile transceiver associated with the mobile logistics asset 700a (e.g., transceiver 2600, device 2630, badge 2620). Such a mobile transceiver may, for example, be implemented as an augmented reality device used by logistics personnel associated with logistics asset 700a. This more detailed embodiment also includes a wireless accessory sensor node having at least one sensor that monitors for a change in the storage receptacle associated with a deposit of the delivery item relative to the storage receptacle. The wireless accessory sensor node in this more detailed embodiment is further operative to detect the receipt of the delivery item relative to the storage receptacle based upon sensor data generated by the at least one sensor; record timestamped information reflecting the detected receipt of the delivery item; and broadcast a notification of event information available for upload related to the detected receipt of the delivery item, the event information including at least the timestamped information reflecting the detected receipt of the delivery item.

In this more detailed embodiment, the bridge node processor 201, when executing the bridge node code in memory of bridge node 200, is also operative to receive the notification about the event information available for upload from the wireless accessory sensor node; retrieve the event information available for upload from the wireless accessory sensor node; transmit the retrieved event information to the backend server to cause the backend server to initiate the dispatched logistics operation for the storage receptacle; receive status information from the mobile transceiver associated with the mobile logistics asset (where the status information is related to an operating status of the mobile logistics asset); and generate the lock control input to automatically change the lock from the secure state to the unlocked state based upon the status information received from the mobile transceiver.

Monitoring Movement of the Node-Enabled Logistics Receptacle

In additional embodiments, a further improvement may involve an exemplary connected node-enabled logistics receptacle deployed as part of a system equipped to automatically monitor its own movement and/or location and adaptively cause the backend server 100 to respond by altering a dispatched logistics operation to be conducted by a logistics asset. In such an embodiment, the exemplary node-enabled logistics receptacle is deployed in the system as a location and/or motion aware logistics platform that may use location circuitry (e.g., exemplary GPS location circuitry 345) and/or different onboard sensors that may detect movement of the node-enabled logistics receptacle. In general, when there has been movement of a logistics receptacle, a logistics asset (such as a courier) may be faced with difficulty finding the logistics receptacle. As such, an embodiment may have the node-enabled logistics receptacle generally detecting its movement, which may then be transmitted to the backend server. The backend server, having been advantageously updated with such movement and/or location related information, can alert the logistics asset (e.g., courier) of this movement and/or new location. In other words, such an embodiment has the practical application of updating the backend server of movement and/or a new location to proactively or reactively inform the logistics asset (and/or customers) in a self-healing type of system. Such detected movement/location, in some embodiments as explained in more detail below, may include motion, changes in location, and/or changes in position/orientation. Such movement may further include intentional movement where the move of the node-enabled logistics receptacle was planned and may include confirmation and/or operational mode changes for the node within the logistics receptacle (e.g., a bridge node and/or wireless accessory sensor node(s)) after the move is complete or at least upon reaching a particular location or within a threshold distance of that particular location. For example, the node-based logistics receptacle may change operational modes (e.g., from a low power or less than fully active mode to a normal mode of operation) once arriving at or close to a predetermined location (e.g., a new location, a location where another logistics receptacle used to be, and the like).

Figure 31:
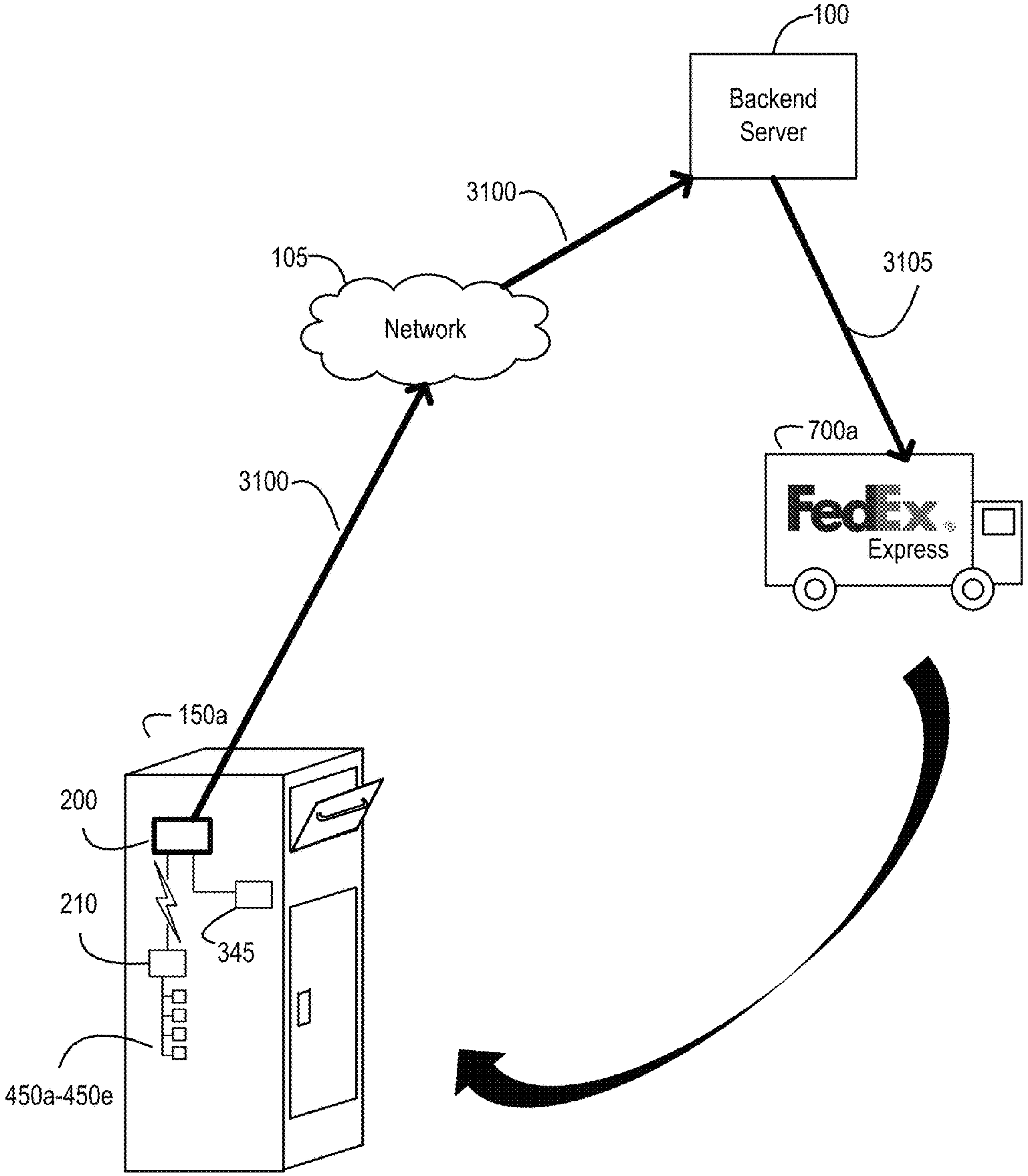
FIG. 31 is a diagram illustrating an exemplary improved monitoring and logistics response system involving movement of the system's exemplary logistics receptacle in accordance with an embodiment of the invention.

FIGS. 31-35 provide illustrations related to such exemplary embodiments that involve self-monitoring of a node-enabled logistics receptacle's movement/location and responding accordingly. FIG. 31 is a diagram illustrating an exemplary improved monitoring and logistics response system involving movement of the system's exemplary logistics receptacle in accordance with an embodiment of the invention. Referring now to FIG. 31, an example of an improved monitoring and logistics response system is shown including exemplary backend server 100, exemplary connected node-enabled logistics receptacle 150*a* and exemplary mobile logistics asset 700*a*. As shown in FIG. 31, exemplary logistics receptacle 150*a* is operative to receive and temporarily maintain a delivery item being shipped. Consistent with descriptions above, exemplary logistics receptacle 150*a* has an entrance opening through which the delivery is received and a temporary storage area where the delivery item is temporarily and securely maintained until an authorized pickup to be conducted by a logistics asset (such as exemplary logistics asset 700*a*).

Those skilled in the art will appreciate that exemplary logistics receptacle 150*a* is implemented with a sensor-based node (e.g., bridge node 200 that is coupled to a variety of different types of sensors 450*a*-450*e*) disposed on the logistics receptacle 150*a*. Such an exemplary sensor-based node is implemented with a processor, memory storage that maintains management code for execution by the processor, a communication interface coupled to the processor and that is operative to communicate with a backend server, and at least one sensor coupled to the processor that generates sensor data related to movement associated with the logistics receptacle 150*a*. In such an exemplary system, the processor of the sensor-based node in logistics receptacle 150*a* (when executing the management code maintained on the node memory storage), is operative to detect movement associated with the logistics receptacle 150*a* based upon the sensor data, and transmit an alert notification 3100 through network 105 to backend server 100 over the node's communication interface (e.g., wireless communication interface 203 of exemplary bridge node 200). Such an alert notification 3100 identifies the logistics receptacle 150*a* and informs the backend server 100 of the detected movement. The system's backend server 100 in such an embodiment is then operative to alert the logistics asset 700*a* with an alert message 3105 about the detected movement associated with the logistics receptacle 150*a* causing the logistics asset 700*a* to alter a dispatched logistics operation to be conducted by the logistics asset 700*a* relative to the logistics receptacle 150*a*.

In such a system embodiment, detecting movement may be implemented in a variety of ways. More particularly, an embodiment may have the node processor of the sensor-based node in logistics receptacle 150*a* be operative to detect the movement by being further operative to detect motion associated with the logistics receptacle using the sensor data generated by at least one sensor. Such motion detection may, for example, involve a tilt sensor where the detected motion is a tilt movement detected by the tilt sensor; an inertial sensor where the detected motion is an inertial movement detected by the inertial sensor; an accelerometer where the detected motion is an accelerated movement detected by the accelerometer; and/or an external motion sensor focused externally with respect to the logistics receptacle 150*a* and where the detected motion is motion relative to an external environment of the logistics receptacle 150*a* as detected by the external motion sensor.

In another example, detecting movement may involve detecting a change in location. More particularly, an embodiment may have the node processor of the sensor-based node in logistics receptacle 150*a* be operative to detect the movement by being further operative to detect a location change of the logistics receptacle 150*a* using the sensor data generated by at least one sensor. Such location change detection may, for example, have the sensor being location circuitry 345 where the location change is a change in physical location of the logistics receptacle 150*a* as detected by the location circuitry 345 (e.g., a change in location coordinates as detected by GPS location circuitry 345). Alternatively (or in addition), such location change detection may have the sensor being a proximity sensor where the location change comprises a change in proximity of the logistics receptacle 150_a_ relative to at least one object disposed external to the logistics receptacle 150_a_ as detected by the proximity sensor. Thus, an embodiment may have sensor circuitry within logistics receptacle 150_a_ being able to detect a change in location via location circuitry (e.g., location circuitry compatible with satellite-based systems (e.g., GPS, the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems).

Stated another way, further system examples may detect movement using the sensor-based node of logistics receptacle 150_a_ that involves detecting a positional change of the logistics receptacle 150_a_ (such as a change in position or even orientation) using wireless communication circuitry as the sensor (e.g., exemplary wireless communication interface 203). In more detail, the sensor used for detecting movement may be implemented with a millimeter wave sensor element operatively implemented in the communication interface 203 of exemplary bridge node 200 such that the position change is detected by the millimeter wave sensor element in communication interface 203.

In still further embodiments, exemplary systems may detect movement via the sensor-based node of logistics receptacle 150_a_ using a combination of motion, location and/or position. For example, such a system embodiment may have the node processor of the sensor-based node within logistics receptacle 150_a_ be operative to detect the movement by being further operative to detect the movement as (a) motion associated with the logistics receptacle 150_a_ using a first sensor (e.g., a motion sensor, a tilt sensor, an inertial sensor, an accelerometer, an external motion sensor) coupled to the sensor-based node and (b) a change in location of the logistics receptacle 150_a_ using a second sensor (e.g., location circuitry, proximity sensor, wireless communication circuitry) coupled to the sensor-based node. In another example, such a system embodiment may have the node processor of the sensor-based node within logistics receptacle 150_a_ be operative to detect the movement by being further operative to detect the movement as at least one of (a) motion associated with the logistics receptacle 150_a_ using a first sensor coupled to the sensor-based node; (b) a change in location of the logistics receptacle 150_a_ using a second sensor coupled to the sensor-based node; and (c) a change in position of the logistics receptacle 150_a_ using a third sensor coupled to the sensor-based node. Those skilled in the art will appreciate that embodiments may involve a combination of any of (a), (b), and (c) as detailed above as ways to implement self-detection of movement of exemplary logistics receptacle 150_a_.

Figure 32:
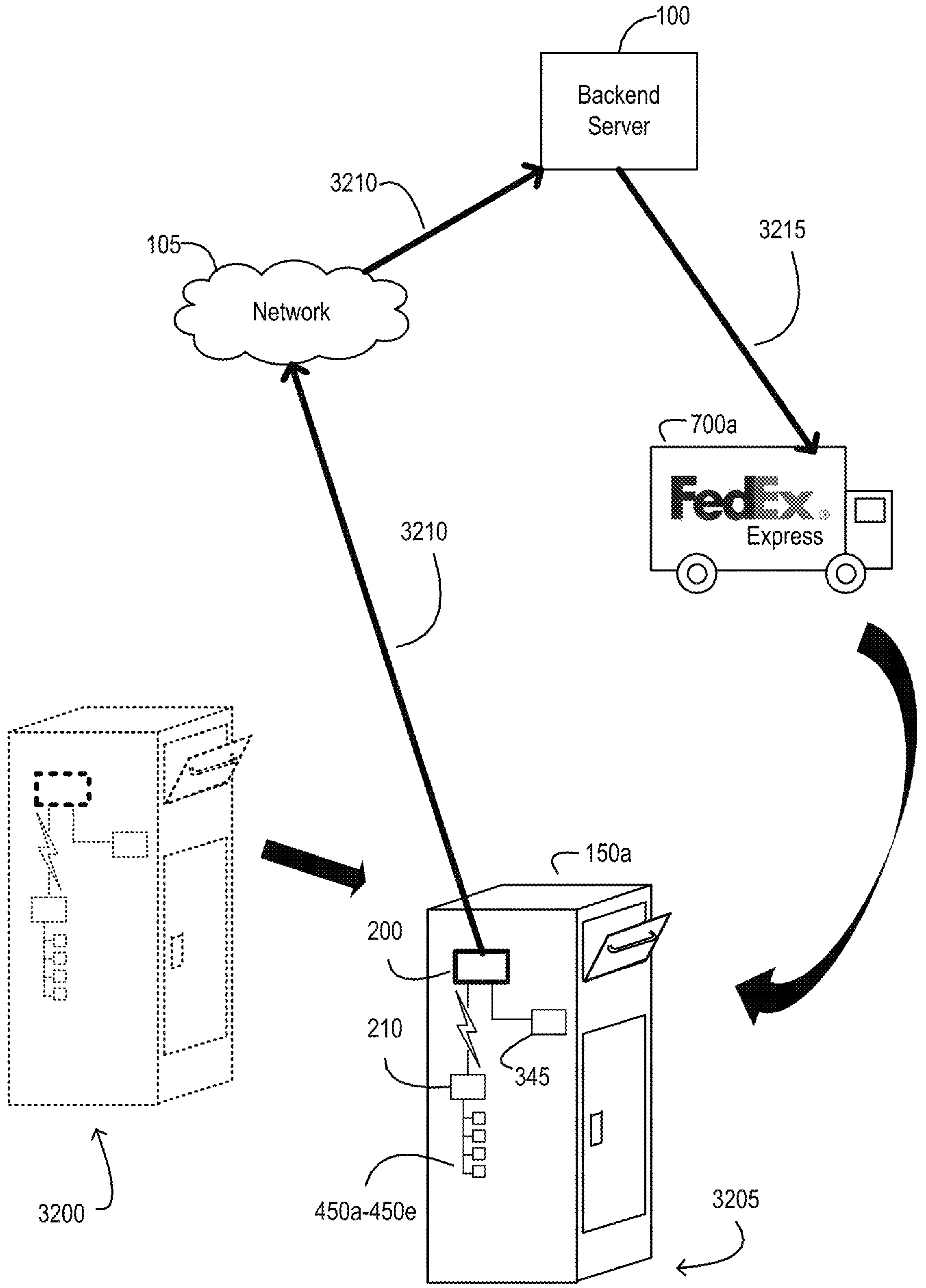
FIG. 32 is a diagram illustrating the exemplary improved monitoring and logistics response system of FIG. 31 involving an updated location of the system's exemplary logistics receptacle in accordance with an embodiment of the invention.

While FIG. 31 illustrates such an exemplary system notifying backend server 100 of self-detected movement (e.g., change in motion, change in location, change in position, and combinations thereof), FIG. 32 is a diagram illustrating the exemplary improved monitoring and logistics response system of FIG. 31 involving an updated location of the system's exemplary logistics receptacle 150_a_ in accordance with an embodiment of the invention. Referring now to FIG. 32, the system's sensor-based node may have its processor being further operative to detect an updated location 3205 (e.g., distinct from and/or relative to an original location 3200) of the logistics receptacle 150_a_ after no longer detecting the movement associated with the logistics receptacle 150_a_, and transmit a message 3210 with the updated location of the logistics receptacle 150_a_ to the backend server 100. With this updated location information from message 3210, backend server 100 is then operative to send a different message 3215 to alert the logistics asset 700_a_ about the updated location of the logistics receptacle 150_a_ causing the logistics asset 700_a_ to alter the dispatched logistics operation to be conducted by the logistics asset 700_a_ relative to the logistics receptacle 150_a_. Such an alert message 3215 may, in some examples, alert the logistics asset 700_a_ about (a) the movement associated with the logistics receptacle 150_a_ and (b) the updated location 3205 of the logistics receptacle 150_a_, where (a) and (b) causes the logistics asset 700_a_ to alter the dispatched logistics operation to be conducted by the logistics asset 700_a_ relative to the logistics receptacle 150_a_.

In more detail, the system's sensor-based node may have its processor, after transmitting the alert notification 3100, being further operative to (a) detect the updated location 3205 of the logistics receptacle 150_a_ after transmitting the alert notification 3100 and no longer detecting the movement associated with the logistics receptacle 150_a_, and (b) transmit the updated location 3205 of the logistics receptacle 150_a_ to the backend server 100 via message 3210. In such a detailed example, those skilled in the art will appreciate that backend server 100 is operative to alert the logistics asset 700_a_ via message 3215 to alert the logistics asset 700_a_ about the updated location 3205 of the logistics receptacle 150_a_, which causes the logistics asset 700_a_ to alter the dispatched logistics operation to be conducted by the logistics asset 700_a_ relative to the logistics receptacle 150_a_. In some embodiment a message 3215 may alert the logistics asset 700_a_ about the movement associated with the logistics receptacle 150_a_ and the updated location 3205 of the logistics receptacle 150_a_ causing the logistics asset 700_a_ to alter the dispatched logistics operation to be conducted by the logistics asset 700_a_ relative to the logistics receptacle 150_a_. For example, in response to message 3215 (which may include information on self-detected movement of receptacle 150_a_ and/or a self-detected updated location of receptacle 150_a_ as reported in message 3210), logistics asset 700_a_ alters the dispatched logistics operation relative to logistics receptacle 150_a_ by changing pre-arranged route details and travel to the updated location 3205 (rather than to location 3200) as part of the dispatched logistics operation now altered in light of the self-detected and reported information from logistics receptacle 150_a_.

In yet a more detailed example, the node processor of the sensor-based node within logistics receptacle 150_a_, after detecting the movement, may be further operative to detect updated location 3205 of the logistics receptacle 150_a_ after transmitting the alert notification 3100 and no longer detecting the movement associated with the logistics receptacle 150_a_; and transmit alert notification 3210, which includes (a) first notification data providing an identifier corresponding to the logistics receptacle 150_a_, (b) second notification data informing the backend server 100 of the movement associated with the logistics receptacle 150_a_, and (c) third notification data providing the updated location 3205 of the logistics receptacle 150_a_. Thereafter in this example, backend server 100 is operative to alert the logistics asset via message 3215 about the movement associated with the logistics receptacle 150_a_ and the updated location 3205 of the logistics receptacle 150_a_ causing the logistics asset 700_a_ to alter the dispatched logistics operation to be conducted by the logistics asset 700*a* relative to the logistics receptacle 150*a*.

Those skilled in the art will appreciate that examples of such detected movement associated with the node-enabled logistics receptacle 150*a* relates to preplanned movement associated with the logistics receptacle 150*a*. Such preplanned movement may, for example, be movement related to previously scheduled maintenance on the receptacle 150*a* or simply a planned change in operative location for the logistics receptacle 150*a* to make more efficient use of logistics receptacle 150*a* and better serve customers seeking to deposit delivery items for shipping using a logistics receptacle and a logistics asset from one location to another location. In some embodiments, the node processor of the sensor-based node within logistics receptacle 150*a*, after transmitting the alert notification 3210, may be further operative to receive a confirmation from the backend server 100 that the detected movement associated with the logistics receptacle 150*a* relates to preplanned movement associated with the logistics receptacle 150*a* as identified in the alert notification. In this way, the sensor-based node within logistics receptacle 150*a* may be made aware that the self-detected movement and/or change in location/position is intentional (rather than something nefarious or unauthorized).

In some examples, the node processor of the sensor-based node within logistics receptacle 150*a*, after transmitting the alert notification 3210 and after a threshold period of time without receiving such a confirmation, may be further operative to issue a priority alert message to the backend server 100 that the detected movement associated with the logistics receptacle 150*a* has not been confirmed as authorized or otherwise preplanned movement, which causes the backend server 100 further request more frequent updates to the location of the logistics receptacle 150*a* being moved in such an unauthorized manner and to deploy resources (e.g., police, logistics assets, and the like) to recover the logistics receptacle 150*a* self-reporting such unauthorized movement. Embodiments may have such a moving logistics receptacle 150*a* enter a restricted mode of operation that secures the logistics receptacle 150*a* (e.g., changes the state of lock 165 to a locked state) until the moving logistics receptacle 150*a* is recovered and confirmation of such a recovery with backend server 100 is established.

Those skilled in the art will appreciate that operational modes of the logistics receptacle 150*a* (e.g., components within the logistics receptacle) may change or be self-adaptively changed based on the self-detected changes in movement, location, and/or position for the particular node-enabled logistics receptacle. For example, further embodiments may have the node processor of the sensor-based node within logistics receptacle 150*a*, after detecting the movement, being further operative to cause a change from a current operational mode of the node-based logistics receptacle (e.g., the sensor-based node disposed within the logistics receptacle and/or other components of the logistics receptacle controlled by such a sensor-based node within that logistics receptacle) to a secondary operational mode. In more detail, such a change from the current operational mode to the secondary operational mode may occur after detecting a cessation of movement associated with the logistics receptacle 150*a* corresponding to an end of the preplanned movement associated with the logistics receptacle 150*a*.

In an example embodiment, the secondary operational mode may be implemented as a normal operation of the sensor-based node disposed within the logistics receptacle 150*a* at a new location (e.g., location 3205). Such a new location may be a predetermined address associated with the preplanned movement, such as a new road intersection, new commercial address, new building or facility, and the like. The secondary operational mode may be a normal operation of the sensor-based node disposed within logistics receptacle 150*a* at the new location as confirmed by the backend server 100 to the sensor-based node within logistics receptacle 150*a* via a confirmation message sent by backend server 100 once logistics receptacle 150*a* reports the updated location via message 3210. In more detail regarding shifting from a current operational mode to the secondary operational mode, the node processor of the sensor-based node (e.g., bridge node 100) within logistics receptacle 150*a* may be programmatically adapted to be further operative to detect, based upon further sensor data, a cessation of movement associated with the logistics receptacle 150*a* corresponding to an end of the preplanned movement associated with the logistics receptacle 150*a*; report an updated location to the backend server 100; and receive a confirmation message from the backend server 100 that the updated location of the logistics receptacle is a predetermined new location for the logistics receptacle 150*a*. In this more detailed example, the secondary operational mode may be implemented as normal operation of the sensor-based node disposed within the logistics receptacle 150*a* at the predetermined new location.

In other embodiments, such a secondary operational mode may be implemented as a type of decommissioned mode of operation for at least the sensor-based node disposed within the logistics receptacle 150*a*. In an example, the decommissioned mode of operation for at least the sensor-based node disposed within the logistics receptacle 150*a* may be implemented once the sensor-based node has detected the movement associated with the logistics receptacle 150*a*. Such a decommissioned mode of operation may be a low-power operational state of the sensor-based node within the logistics receptacle 150*a* as the logistics receptacle 150*a* is placed at an inventory location for temporary storage; a non-operational state of the sensor-based node within the logistics receptacle 150*a* as the logistics receptacle 150*a* is placed at an inventory location for temporary storage; or a non-operational state of the sensor-based node as the logistics receptacle 150*a* is placed at a maintenance location for refurbishment.

Figure 33:
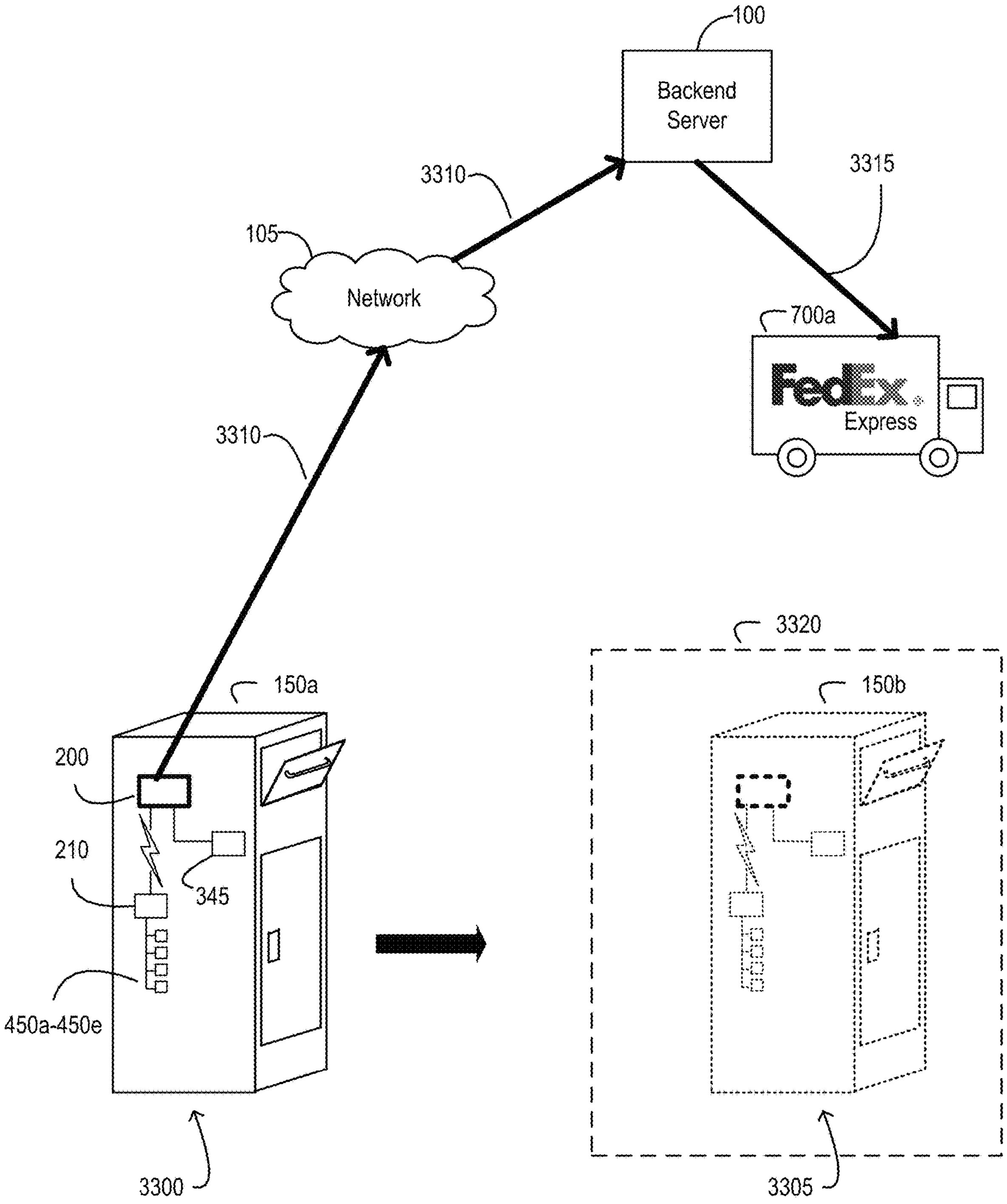
FIG. 33 is a diagram illustrating the exemplary improved monitoring and logistics response system of FIG. 31 involving replacement movement and use of an exemplary replacement logistics receptacle relative to a predetermined location where a second logistics receptacle was previously located in accordance with an embodiment of the invention.

FIG. 33 is a diagram illustrating the exemplary improved monitoring and logistics response system of FIG. 31, but involves replacement movement and use of an exemplary replacement logistics receptacle relative to a predetermined location where a second logistics receptacle was previously located in accordance with an embodiment of the invention. In other words, the system's node-enabled logistics receptacle may be a new unit being moved from an original location to replace another logistics receptacle at the new location. In such an example, the movement of the replacement logistics receptacle is a type of replacement movement—e.g., coming in to replace another logistics receptacle. Referring now to FIG. 33, an example of an improved monitoring and logistics response system is shown including exemplary backend server 100, exemplary connected node-enabled logistics receptacle 150*a* and exemplary mobile logistics asset 700*a* where logistics receptacle 150*a* is being moved from location 3300 to a location 3305 where exemplary node-enabled logistics receptacle 150*b* is being replaced. As shown in FIG. 31, those skilled in the art will appreciate that the node processor of the sensor-based node within exemplary logistics receptacle 150*a* detects movement as a replacement movement associated with the logistics receptacle 150*a*, which may be reported via message 3310 to backend server 100 (which then may initiate or cause an alert message 3315 to be sent to logistics asset 700*a* so as to alter a dispatched logistics operation—e.g., updating logistics asset 700*a* that logistics receptacle 150*a* is moving to location 3305 to replace logistics receptacle 150*b*). After detecting the replacement movement, the node processor of the sensor-based node within exemplary logistics receptacle 150*a* is then operative to change its current operational mode (e.g., a decommissioned operational mode) to a secondary operational mode (e.g., a newly commissioned mode) for the sensor-based node disposed within the logistics receptacle 150*a*. In an embodiment, such a decommissioned operational mode has the sensor-based node within exemplary logistics receptacle 150*a* still able to detect movement, but with limited other operational capabilities (e.g., limited abilities to detect and report delivery items received, limited abilities to monitor components of the logistics receptacle, and the like) while the newly commissioned operational mode has the sensor-based node within exemplary logistics receptacle 150*a* transitioning to a fully operational mode of operating to monitor for delivery items received, communicate with backend server 100 about such received delivery items, and provide other intelligent node-enabled services relative to operation of the logistics receptacle. In an embodiment, the node processor of the sensor-based node within exemplary logistics receptacle 150*a* shown in FIG. 33 may be operative to detect the replacement movement prior to reaching a predetermined location (e.g., such as the prior location 3305 of second logistics receptacle 150*b* before the second logistics receptacle 150*b* was moved away from the prior location 3305. More specifically, the node processor of the sensor-based node within exemplary logistics receptacle 150*a* may be operative to change the current operational mode to the secondary operational mode by being further operative to change the current operational mode from the decommissioned mode of operation to the newly commissioned mode of operation upon arrival at the predetermined location (e.g., location 3305). The predetermined location may be a geolocation associated with a previous location 3305 of a currently decommissioned sensor-based node within a second logistics receptacle 150*b* being replaced by the sensor-based node and the logistics receptacle 150*a*.

In a further embodiment, the node processor of the sensor-based node within exemplary logistics receptacle 150*a* may be operative to detect the replacement movement associated with the replacement logistics receptacle 150*a* by detecting the replacement movement prior to reaching a geofence perimeter 3320 relative to the predetermined location 3305 that was previously associated with second logistics receptacle 150*b* prior to when the second logistics receptacle 150*a* was decommissioned. More specifically, the node processor of the sensor-based node within exemplary logistics receptacle 150*a* may also be operative to change the current operational mode for the sensor-based node in logistics receptacle 150*a* (i.e., the replacement unit in this embodiment) to the secondary operational mode by being further operative to change the current operational mode from a decommissioned mode of operation to a newly commissioned mode of operation upon detecting the logistics receptacle 150*a* is within the geofence perimeter 3320 relative to the predetermined location 3305.

Figure 34:
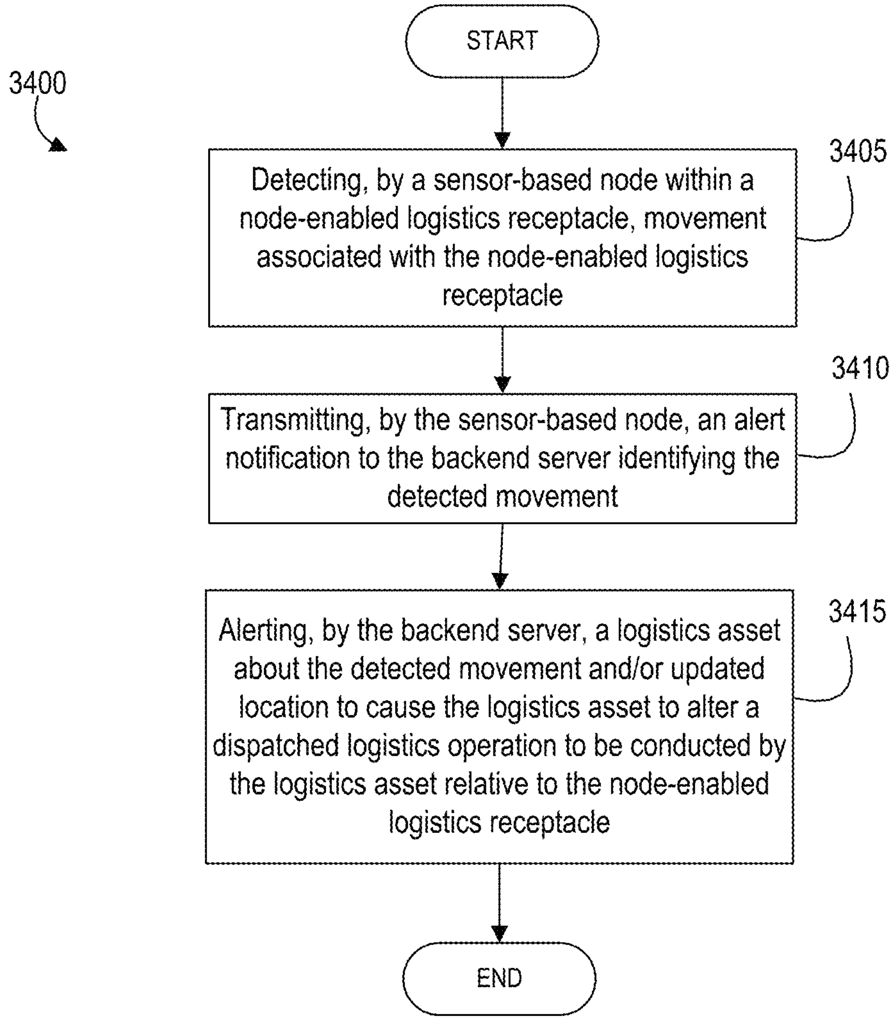
FIG. 34 is a flow diagram illustrating an exemplary improved method for monitoring and initiating a logistics response related to a node-enabled logistics receptacle to be serviced by a logistics asset in accordance with an embodiment of the invention.

FIG. 34 is a flow diagram illustrating an exemplary improved method for monitoring and initiating a logistics response related to a node-enabled logistics receptacle (e.g., receptacle 150*a*) to be serviced by a logistics asset (e.g., logistics asset 700*a*) in accordance with an embodiment of the invention. Referring now to FIG. 34, exemplary method 3400 for monitoring and initiating a logistics response related to a node-enabled logistics receptacle (e.g., exemplary node-enabled logistics receptacle 150*a*) to be serviced by a logistics asset (e.g., exemplary logistics asset 700*a*) is illustrated beginning with step 3405. At step 3405, method 3400 has a sensor-based node (e.g., exemplary bridge node) disposed within the node-enabled logistics receptacle detecting movement associated with the node-enabled logistics receptacle.

In more detail, step 3405 may detect such movement using at least one sensor coupled to the sensor-based node for detecting motion associated with the node-enabled logistics receptacle. Such motion, for example, may be a tilt movement detected by a tilt sensor, an inertial movement detected by an inertial sensor, an acceleration detected by an accelerometer sensor as the at least one sensor coupled to the sensor-based node, and/or motion relative to an external environment of the node-enabled logistics receptacle as detected by an externally focused motion sensor.

In a further embodiment, step 3405 may detect such movement using at least one sensor coupled to the sensor-based node for detecting a location change of the node-enabled logistics receptacle. Such a location change, for example, may be a change in physical location as detected by location circuitry coupled to the sensor-based node, a change in proximity to at least one object disposed external to the node-enabled logistics receptacle as detected by a proximity sensor coupled to the sensor-based node, and/or a change in location coordinates as detected by location circuitry coupled to the sensor-based node.

In still another embodiment, step 3405 may detect such movement using at least one sensor coupled to the sensor-based node for detecting a position change of the node-enabled logistics receptacle. Such a position change, for example, may be a change in orientation of the node-enabled logistics receptacle. The position change may, for example, be detected by a wireless communication sensor coupled to the sensor-based node, a wireless communication interface of the sensor-based node, and/or at least one millimeter wave sensor coupled to the sensor-based node.

In yet another embodiment, step 3405 may detect the movement as both (a) the motion associated with the node-enabled logistics receptacle using a first sensor coupled to the sensor-based node, and (b) a change in location of the node-enabled logistics receptacle using a second sensor coupled to the sensor-based node. In this embodiment, the motion may, for example, be a tilt movement detected by a tilt sensor as the first sensor, an inertial movement detected by an inertial sensor as the first sensor, an acceleration detected by an accelerometer sensor as the first sensor, and/or motion relative to an external environment of the node-enabled logistics receptacle as detected by an externally focused motion sensor as the first sensor coupled to the sensor-based node. In this embodiment, the location change may, for example, be a change in location as detected by location circuitry coupled to the sensor-based node, a change in proximity to at least one object disposed external to the node-enabled logistics receptacle by a proximity sensor coupled to the sensor-based node, and/or a change in location coordinates by location circuitry coupled to the sensor-based node as the second sensor coupled to the sensor-based node.

In still another embodiment, the detecting in step 3405 may be implemented as detecting the movement as at least one of (a) motion associated with the node-enabled logistics receptacle using a first sensor coupled to the sensor-based node; (b) a change in location of the node-enabled logistics receptacle using a second sensor coupled to the sensor-based node; and (c) a change in position of the node-enabled logistics receptacle using a third sensor coupled to the sensor-based node.

At step 3410, method 3400 then proceeds with the sensor-based node transmitting an alert notification to a backend server. Such an alert notification (e.g., exemplary alert notification 3100) identifying the node-enabled logistics receptacle and informing the backend server of the movement in response to detecting the movement.

At step 3415, method 3400 proceeds with the backend server alerting the logistics asset about the detected movement associated with the node-enabled logistics receptacle causing the logistics asset to alter a dispatched logistics operation to be conducted by the logistics asset relative to the node-enabled logistics receptacle.

In further embodiments of method 3400, the sensor-based node may detect location after movement is no longer detected. For example, method 3400 may include, after the detecting step, the steps of (a) detecting, by the sensor-based node, an updated location of the node-enabled logistics receptacle after no longer detecting the movement associated with the node-enabled logistics receptacle and (b) transmitting, by the sensor-based node, the updated location of the node-enabled logistics receptacle to the backend server. In such an example, the backend server may then alert the logistics asset about the updated location of the node-enabled logistics receptacle causing the logistics asset to alter the dispatched logistics operation to be conducted by the logistics asset relative to the node-enabled logistics receptacle. More specifically, the alerting step may have the backend server alerting the logistics asset about the movement associated with the node-enabled logistics receptacle and the updated location of the node-enabled logistics receptacle, which then causes the logistics asset to alter the dispatched logistics operation to be conducted by the logistics asset relative to the node-enabled logistics receptacle.

In another embodiment, method 3400 may, after transmitting in step 3410, include the steps of (a) detecting, by the sensor-based node, an updated location of the node-enabled logistics receptacle after transmitting the alert notification and no longer detecting the movement associated with the node-enabled logistics receptacle; and (b) transmitting, by the sensor-based node, the updated location of the node-enabled logistics receptacle to the backend server. Here, the alerting step 3415 may be implemented with the backend server alerting the logistics asset about the updated location of the node-enabled logistics receptacle causing the logistics asset to alter the dispatched logistics operation to be conducted by the logistics asset relative to the node-enabled logistics receptacle. More specifically, the alerting step may be implemented with the backend server alerting the logistics asset about the movement associated with the node-enabled logistics receptacle and the updated location of the node-enabled logistics receptacle causing the logistics asset to alter the dispatched logistics operation to be conducted by the logistics asset relative to the node-enabled logistics receptacle.

In still another embodiment, method 3400 may include the step of detecting, by the sensor-based node, an updated location of the node-enabled logistics receptacle after transmitting the alert notification in step 3410 and no longer detecting the movement associated with the node-enabled logistics receptacle. In such an embodiment, step 3410 of transmitting the alert notification comprises transmitting, by the sensor-based node, the alert notification to the backend server, where the alert notification comprises (a) first notification data providing an identifier corresponding to the node-enabled logistics receptacle, (b) second notification data informing the backend server of the movement associated with the node-enabled logistics receptacle, and (c) third notification data providing the updated location of the node-enabled logistics receptacle. In such an embodiment, step 3415 then may be implemented as alerting, by the backend server, the logistics asset about the movement associated with the node-enabled logistics receptacle and the updated location of the node-enabled logistics receptacle causing the logistics asset to alter the dispatched logistics operation to be conducted by the logistics asset relative to the node-enabled logistics receptacle.

In some embodiments of method 3400, the detected movement associated with the node-enabled logistics receptacle relates to preplanned movement associated with the node-enabled logistics receptacle. For example, after the step of transmitting the alert notification in step 3410, method 3400 may further include a step of confirming, by the backend server, that the detected movement associated with the node-enabled logistics receptacle relates to the preplanned movement associated with the node-enabled logistics receptacle as identified in the alert notification. In another example, after step 3405 of detecting the movement, method 3400 may include the step of changing, by the sensor-based node, a current operational mode for the node-enabled logistics receptacle to a secondary operational mode for the node-enabled logistics receptacle. This may be implemented where such a changing step further comprises changing, by the sensor-based node, the current operational mode for the node-enabled logistics receptacle to the secondary operational mode for the node-enabled logistics receptacle once the sensor-based node disposed within the node-enabled logistics receptacle detects a cessation of movement associated with the node-enabled logistics receptacle corresponding to an end of the preplanned movement associated with the node-enabled logistics receptacle.

In additional embodiments of method 3400, the secondary operational mode for the node-enabled logistics receptacle may be a normal operation of the node-enabled logistics receptacle at a new location, such as a predetermined address associated with the preplanned movement. More specifically, the secondary operational mode for the node-enabled logistics receptacle may be a normal operation of the node-enabled logistics receptacle at the new location as confirmed by the backend server to the sensor-based node. In even more detail, an embodiment of method 3400 may further include the steps of (a) detecting, by the sensor-based node, a cessation of movement associated with the node-enabled logistics receptacle corresponding to an end of the preplanned movement associated with the node-enabled logistics receptacle; (b) reporting, by the sensor-based node, an updated location to the backend server; and (c) receiving, by the sensor-based node, a confirmation message from the backend server that the updated location of the node-enabled logistics receptacle is a predetermined new location for the node-enabled logistics receptacle. In such an embodiment, the secondary operational mode for the node-enabled logistics receptacle is a normal operation of the node-enabled logistics receptacle at the predetermined new location.

In a further embodiment of method 3400, the secondary operational mode for the node-enabled logistics receptacle may be a decommissioned mode of operation for the node-enabled logistics receptacle. For example, the secondary operational mode for the node-enabled logistics receptacle may be a decommissioned mode of operation for the node-enabled logistics receptacle once the sensor-based node has detected the movement associated with the node-enabled logistics receptacle. More specifically, the decommissioned mode of operation for the node-enabled logistics receptacle may be implemented as a low-power operational state of the node-enabled logistics receptacle as the node-enabled logistics receptacle is placed at an inventory location for temporary storage; a non-operational state of the node-enabled logistics receptacle as the node-enabled logistics receptacle is placed at an inventory location for temporary storage; or a non-operational state of the node-enabled logistics receptacle as the node-enabled logistics receptacle is placed at a maintenance location for refurbishment.

In still further embodiments of method 3400, the step of detecting 3405 may have the sensor-based node disposed within the node-enabled logistics receptacle detecting a replacement movement associated with the node-enabled logistics receptacle as the movement as the node-enabled logistics receptacle is replacing another logistics receptacle. As such, method 3400 may also include, after the step of detecting the replacement movement, the step of changing, by the sensor-based node, a current operational mode for the node-enabled logistics receptacle to a secondary operational mode for the node-enabled logistics receptacle, where the current operational mode for the node-enabled logistics receptacle is a decommissioned mode of operation for the node-enabled logistics receptacle and the secondary operational mode for the node-enabled logistics receptacle comprises a newly commissioned mode of operation for the node-enabled logistics receptacle. In such an embodiment, detecting the replacement movement may be implemented as detecting, by the sensor-based node disposed within the node-enabled logistics receptacle, the replacement movement prior to reaching a predetermined location (e.g., where the predetermined location is a prior location of a second node-enabled logistics receptacle before the second node-enabled logistics receptacle was moved away from the prior location, or where the predetermined location is a geolocation associated with a previous location of a currently decommissioned node-enabled logistics receptacle being replaced by the node-enabled logistics receptacle).

Further still, another embodiment of method 3400 may have the step of detecting the replacement movement implemented by the sensor-based node disposed within the node-enabled logistics receptacle detecting the replacement movement prior to reaching a geofence perimeter relative to a predetermined location (e.g., perimeter 3320 relative to location 3305) that was previously associated with a second node-enabled logistics receptacle prior to when the second node-enabled logistics receptacle was decommissioned. Here, the step of changing the current operational mode for the node-enabled logistics receptacle to the secondary operational mode may include changing the current operational mode for the node-enabled logistics receptacle from the decommissioned mode of operation to the newly commissioned mode of operation upon arrival at the predetermined location or upon detecting the node-enabled logistics receptacle is within the geofence perimeter relative to the predetermined location.

Figure 35:
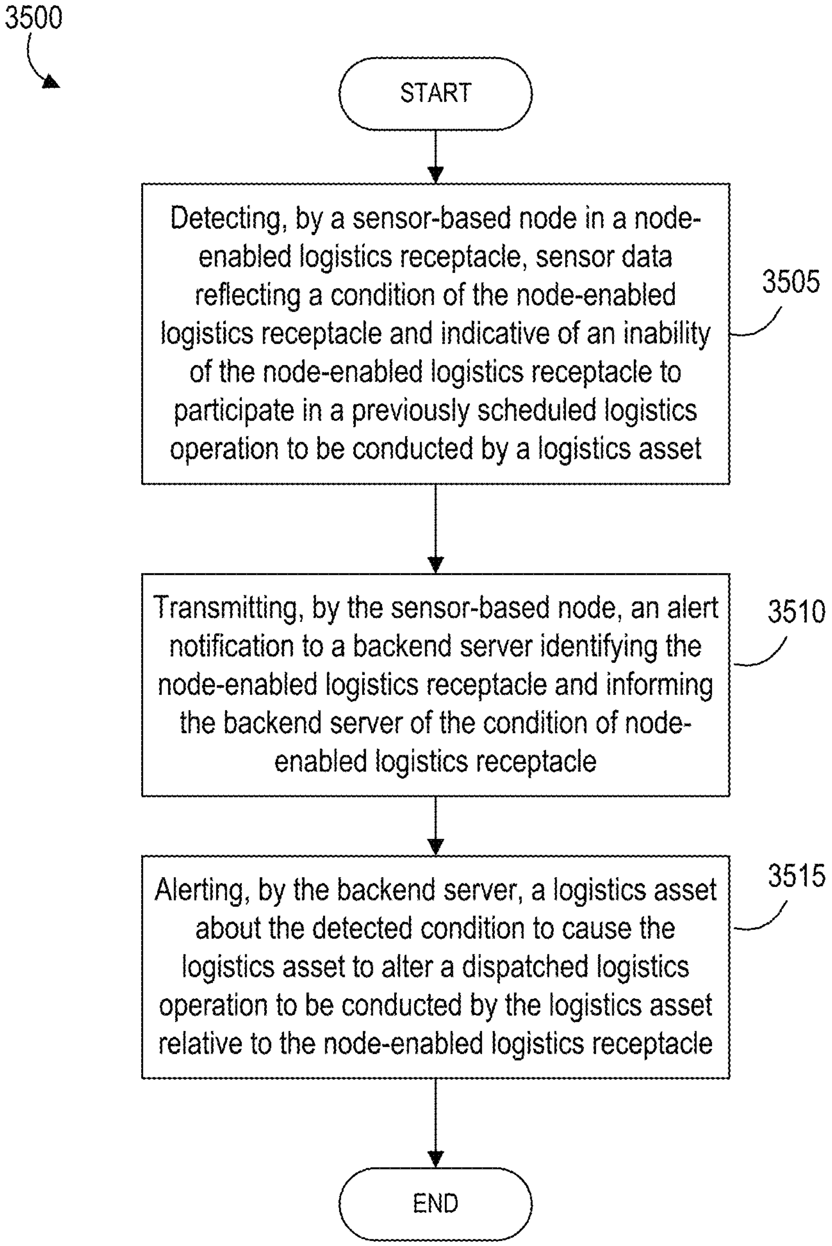
FIG. 35 is a flow diagram illustrating another exemplary improved method for monitoring and initiating a logistics response related to a node-enabled logistics receptacle to be serviced by a logistics asset in accordance with an embodiment of the invention.

FIG. 35 is a flow diagram illustrating another exemplary improved method for monitoring and initiating a logistics response related to a node-enabled logistics receptacle (e.g., receptacle 150*a*) to be serviced by a logistics asset (e.g., logistics asset 700*a*) in accordance with an embodiment of the invention. Referring now to FIG. 35, exemplary method 3500 for monitoring and initiating a logistics response related to a node-enabled logistics receptacle (e.g., exemplary node-enabled logistics receptacle 150*a*) to be serviced by a logistics asset (e.g., exemplary logistics asset 700*a*) is illustrated beginning with step 3505.

At step 3505, method 3500 begins with a sensor-based node disposed within the node-enabled logistics receptacle detecting sensor data reflecting a condition of the node-enabled logistics receptacle. The sensor data is indicative of an inability of the node-enabled logistics receptacle to participate in a previously scheduled logistics operation to be conducted by the logistics asset relative to the node-enabled logistics receptacle. For example, an embodiment of step 3505 may be implemented with the sensor-based node disposed within the node-enabled logistics receptacle detecting movement associated with the node-enabled logistics receptacle based upon the sensor data reflecting the condition of the node-enabled logistics receptacle. Stated another way, an embodiment may have the condition of the node-enabled logistics receptacle in step 3505 be motion associated with the node-enabled logistics receptacle (e.g., a tilt movement detected by a tilt sensor, an inertial movement detected by an inertial sensor, an acceleration detected by an accelerometer sensor, and/or motion relative to an external environment of the node-enabled logistics receptacle as detected by an externally focused motion sensor).

In another embodiment, the condition of the node-enabled logistics receptacle in step 3505 may be a location change of the node-enabled logistics receptacle (e.g., a change in physical location as detected by location circuitry coupled to the sensor-based node, a change in proximity to at least one object disposed external to the node-enabled logistics receptacle as detected by a proximity sensor coupled to the sensor-based node, and/or a change in location coordinates as detected by location circuitry coupled to the sensor-based node as the at least one sensor coupled to the sensor-based node).

In still another embodiment, the condition of the node-enabled logistics receptacle in step 3505 may be a position change of the node-enabled logistics receptacle (e.g., a change in orientation of the node-enabled logistics receptacle, a position change detected by a wireless communication sensor coupled to the sensor-based node, a position change detected by a wireless communication interface of the sensor-based node, and/or a position change detected by at least one millimeter wave sensor coupled to the sensor-based node).

In yet another embodiment, the condition of the node-enabled logistics receptacle in step 3505 may be at least one of (a) motion associated with the node-enabled logistics receptacle using a first sensor coupled to the sensor-based node and (b) a change in location of the node-enabled logistics receptacle using a second sensor coupled to the sensor-based node. For example, such motion may be a tilt movement detected by a tilt sensor as the first sensor coupled to the sensor-based node; an inertial movement detected by an inertial sensor as the first sensor coupled to the sensor-based node; an acceleration detected by an accelerometer sensor as the first sensor coupled to the sensor-based node; and/or motion relative to an external environment of the node-enabled logistics receptacle as detected by an externally focused motion sensor as the first sensor coupled to the sensor-based node. Furthermore, the change in location may be a change in location as detected by location circuitry coupled to the sensor-based node as the second sensor coupled to the sensor-based node; a change in proximity to at least one object disposed external to the node-enabled logistics receptacle by a proximity sensor coupled to the sensor-based node as the second sensor coupled to the sensor-based node; a change in location coordinates by location circuitry coupled to the sensor-based node as the second sensor coupled to the sensor-based node.

In even more detail, an embodiment of method 3500 may be implemented as having the condition of the node-enabled logistics receptacle being at least one of (a) motion associated with the node-enabled logistics receptacle using a first sensor coupled to the sensor-based node; (b) a change in location of the node-enabled logistics receptacle using a second sensor coupled to the sensor-based node; and (c) a change in position of the node-enabled logistics receptacle using a third sensor coupled to the sensor-based node.

At step 3510, method 3500 has the sensor-based node transmitting an alert notification to a backend server. Here, the alert notification identifies the node-enabled logistics receptacle and informs the backend server of the movement in response to detecting the sensor data indicative of the inability of the node-enabled logistics receptacle to participate in the previously scheduled logistics operation.

At step 3515, method 3500 proceeds with the backend server alerting the logistics asset about the detected movement associated with the node-enabled logistics receptacle causing the logistics asset to alter a dispatched logistics operation to be conducted by the logistics asset relative to the node-enabled logistics receptacle.

A further embodiment of method 3500 may, for example and after detecting movement associated with the node-enabled logistics receptacle based upon the sensor data reflecting the condition of the node-enabled logistics receptacle, include the further steps of (a) detecting, by the sensor-based node, an updated location of the node-enabled logistics receptacle after no longer detecting the movement associated with the node-enabled logistics receptacle; and (b) transmitting, by the sensor-based node, the updated location of the node-enabled logistics receptacle to the backend server. In this embodiment, the alerting step 3515 may be implemented as alerting, by the backend server, the logistics asset about the updated location of the node-enabled logistics receptacle causing the logistics asset to alter the dispatched logistics operation to be conducted by the logistics asset relative to the node-enabled logistics receptacle. In more detail, step 3515 may be implemented with the backend server alerting the logistics asset about the movement associated with the node-enabled logistics receptacle and the updated location of the node-enabled logistics receptacle causing the logistics asset to alter the dispatched logistics operation to be conducted by the logistics asset relative to the node-enabled logistics receptacle.

Another embodiment of method 3500 may, for example and after detecting movement associated with the node-enabled logistics receptacle based upon the sensor data reflecting the condition of the node-enabled logistics receptacle, include the following steps after step 3510 of (a) detecting, by the sensor-based node, an updated location of the node-enabled logistics receptacle after transmitting the alert notification and no longer detecting the movement associated with the node-enabled logistics receptacle; and (b) transmitting, by the sensor-based node, the updated location of the node-enabled logistics receptacle to the backend server. In this particular embodiment, step 3515 may be implemented as alerting, by the backend server, the logistics asset about the updated location of the node-enabled logistics receptacle causing the logistics asset to alter the dispatched logistics operation to be conducted by the logistics asset relative to the node-enabled logistics receptacle. More specifically, step 3515 may be implemented as with the backend server alerting the logistics asset about the movement associated with the node-enabled logistics receptacle and the updated location of the node-enabled logistics receptacle causing the logistics asset to alter the dispatched logistics operation to be conducted by the logistics asset relative to the node-enabled logistics receptacle.

Still another embodiment of method 3500 may, for example and after detecting movement associated with the node-enabled logistics receptacle, include the step of detecting, by the sensor-based node, an updated location of the node-enabled logistics receptacle after transmitting the alert notification in step 3510 and no longer detecting the movement associated with the node-enabled logistics receptacle. In such an embodiment, step 3510 may be implemented as transmitting, by the sensor-based node, the alert notification to the backend server, where the alert notification comprises (a) first notification data providing an identifier corresponding to the node-enabled logistics receptacle, (b) second notification data informing the backend server of the movement associated with the node-enabled logistics receptacle, and (c) third notification data providing the updated location of the node-enabled logistics receptacle. In such an embodiment, step 3515 may be implemented with the backend server alerting the logistics asset about the movement associated with the node-enabled logistics receptacle and the updated location of the node-enabled logistics receptacle causing the logistics asset to alter the dispatched logistics operation to be conducted by the logistics asset relative to the node-enabled logistics receptacle.

In still another embodiment of method 3500, as part of detecting movement associated with the node-enabled logistics receptacle based upon the sensor data reflecting the condition of the node-enabled logistics receptacle those skilled in the art will appreciate that such detected movement may be associated with intentional movement of the node-enabled logistics receptacle, such as preplanned movement associated with the node-enabled logistics receptacle. In such an embodiment, method 3500 may also include, after step 3510, the step of confirming, by the backend server, that the detected movement detected movement associated with the node-enabled logistics receptacle relates to the preplanned movement associated with the node-enabled logistics receptacle as identified in the alert notification.

After detecting movement in such a further embodiment of method 3500, method 3500 may also have the operational mode for the node-enabled logistics change as a result of such preplanned movement. For example, such an embodiment may include, after detecting the preplanned movement, a step where the sensor-based node changes a current operational mode for the node-enabled logistics receptacle to a secondary operational mode for the node-enabled logistics receptacle. More specifically, such a changing step may be implemented with the sensor-based node changing the current operational mode for the node-enabled logistics receptacle to the secondary operational mode for the node-enabled logistics receptacle once the sensor-based node disposed within the node-enabled logistics receptacle detects a cessation of movement associated with the node-enabled logistics receptacle corresponding to an end of the preplanned movement associated with the node-enabled logistics receptacle. The secondary operational mode for the node-enabled logistics receptacle may, for example, be normal operation of the node-enabled logistics receptacle at a new location (e.g., a predetermined address associated with the preplanned movement) or be normal operation of the node-enabled logistics receptacle at a new location as confirmed by the backend server to the sensor-based node. In more detail, method 3500 may include the steps of (a) detecting, by the sensor-based node, a cessation of movement associated with the node-enabled logistics receptacle corresponding to an end of the preplanned movement associated with the node-enabled logistics receptacle; (b) reporting, by the sensor-based node, an updated location to the backend server; and (c) receiving, by the sensor-based node, a confirmation message from the backend server that the updated location of the node-enabled logistics receptacle is a predetermined new location for the node-enabled logistics receptacle. In such a situation, the secondary operational mode for the node-enabled logistics receptacle may be normal operation of the node-enabled logistics receptacle at the predetermined new location.

In other embodiments of method 3500, the secondary operational mode for the node-enabled logistics receptacle may be implemented as a decommissioned mode of operation for the node-enabled logistics receptacle (e.g., a decommissioned mode of operation for the node-enabled logistics receptacle once the sensor-based node has detected the movement associated with the node-enabled logistics receptacle). In more detail, the decommissioned mode of operation for the node-enabled logistics receptacle may, for example, be implemented as a low-power operational state of the node-enabled logistics receptacle as the node-enabled logistics receptacle is placed at an inventory location for temporary storage; a non-operational state of the node-enabled logistics receptacle as the node-enabled logistics receptacle is placed at an inventory location for temporary storage; or a non-operational state of the node-enabled logistics receptacle as the node-enabled logistics receptacle is placed at a maintenance location for refurbishment.

In some embodiments of method 3500, the node-enabled logistics receptacle may be in use as replacement hardware where it shifts to a secondary operational mode from a currently decommissioned mode of operation. For example, an embodiment of method 3500 may detect movement in step 3505 with the sensor-based node disposed within the node-enabled logistics receptacle detecting a replacement movement associated with the node-enabled logistics receptacle as the movement; and then after such a detection, further include the step of changing, by the sensor-based node, a current operational mode for the node-enabled logistics receptacle to a secondary operational mode for the node-enabled logistics receptacle, where the current operational mode for the node-enabled logistics receptacle comprises a decommissioned mode of operation for the node-enabled logistics receptacle and the secondary operational mode for the node-enabled logistics receptacle comprises a newly commissioned mode of operation for the node-enabled logistics receptacle.

In more detail, the step of detecting the replacement movement may be performed prior to reaching a predetermined location (e.g., a prior location of a second node-enabled logistics receptacle before the second node-enabled logistics receptacle was moved away from the prior location or a geolocation associated with a previous location of a currently decommissioned node-abled logistics receptacle being replaced by the node-enabled logistics receptacle). The step of detecting the replacement movement may also be implemented with the sensor-based node disposed within the node-enabled logistics receptacle detecting the replacement movement prior to reaching a geofence perimeter relative to a predetermined location that was previously associated with a second node-enabled logistics receptacle prior to when the second node-enabled logistics receptacle was decommissioned.

The step of changing the current operational mode for the node-enabled logistics receptacle to the secondary operational mode may be implemented as changing the current operational mode for the node-enabled logistics receptacle from the decommissioned mode of operation to the newly commissioned mode of operation upon arrival at the predetermined location or upon detecting the node-enabled logistics receptacle is within the geofence perimeter relative to the predetermined location.

Another embodiment of method 3500 may implement step 3505 with the sensor-based node disposed within the node-enabled logistics receptacle detecting a sensed maintenance condition associated with the node-enabled logistics receptacle based upon the sensor data reflecting the condition of the node-enabled logistics receptacle. In such an embodiment, method 3500 may include, after step 3505, the step of changing, by the sensor-based node, a current operational mode for the node-enabled logistics receptacle to a secondary operational mode for the node-enabled logistics receptacle, where the secondary operational mode for the node-enabled logistics receptacle is a decommissioned mode of operation for the node-enabled logistics receptacle at a current location of the node-enabled logistics receptacle. In more detail, changing the current operational mode for the node-enabled logistics receptacle to the decommissioned mode of operation may involve causing the sensor-based node to temporarily enter the decommissioned mode of operation while remaining at the current location of the node-enabled logistics receptacle awaiting a maintenance operation on the node-enabled logistics receptacle (e.g., a dispatched maintenance operation on the node-enabled logistics receptacle, such as a dispatched maintenance operation on the node-enabled logistics receptacle initiated by the backend server in response to the alert notification).

In a further embodiment of method 3500, the sensor-based node disposed within the node-enabled logistics receptacle may, at step 3505, detect an inoperative condition associated with the node-enabled logistics receptacle based upon the sensor data reflecting the condition of the node-enabled logistics receptacle. In more detail in such an embodiment, method 3500 may, after the step of detecting the inoperative condition, include changing, by the sensor-based node, a current operational mode for the node-enabled logistics receptacle to a secondary operational mode for the node-enabled logistics receptacle, where the secondary operational mode for the node-enabled logistics receptacle is a decommissioned mode of operation for the node-enabled logistics receptacle at a current location of the node-enabled logistics receptacle. Such a step of changing the current operational mode for the node-enabled logistics receptacle to the decommissioned mode of operation may be implemented as causing the sensor-based node to enter the decommissioned mode of operation while awaiting removal from the current location of the node-enabled logistics receptacle.

On-Demand Deployable Logistics Capacity

In additional embodiments, a further improvement may involve on-demand deployment of a deployable mobile logistics receptacle to help address surges in demand at, for example, the location of an existing exemplary node-based logistics receptacle. In general, an existing exemplary node-based logistics receptacle may be experiencing capacity or occupancy issues and report event information to the backend server, which may then respond by activating such a deployable mobile logistics receptacle to help address the capacity or occupancy issues relative to the reporting node-based logistics receptacle.

Figure 51:
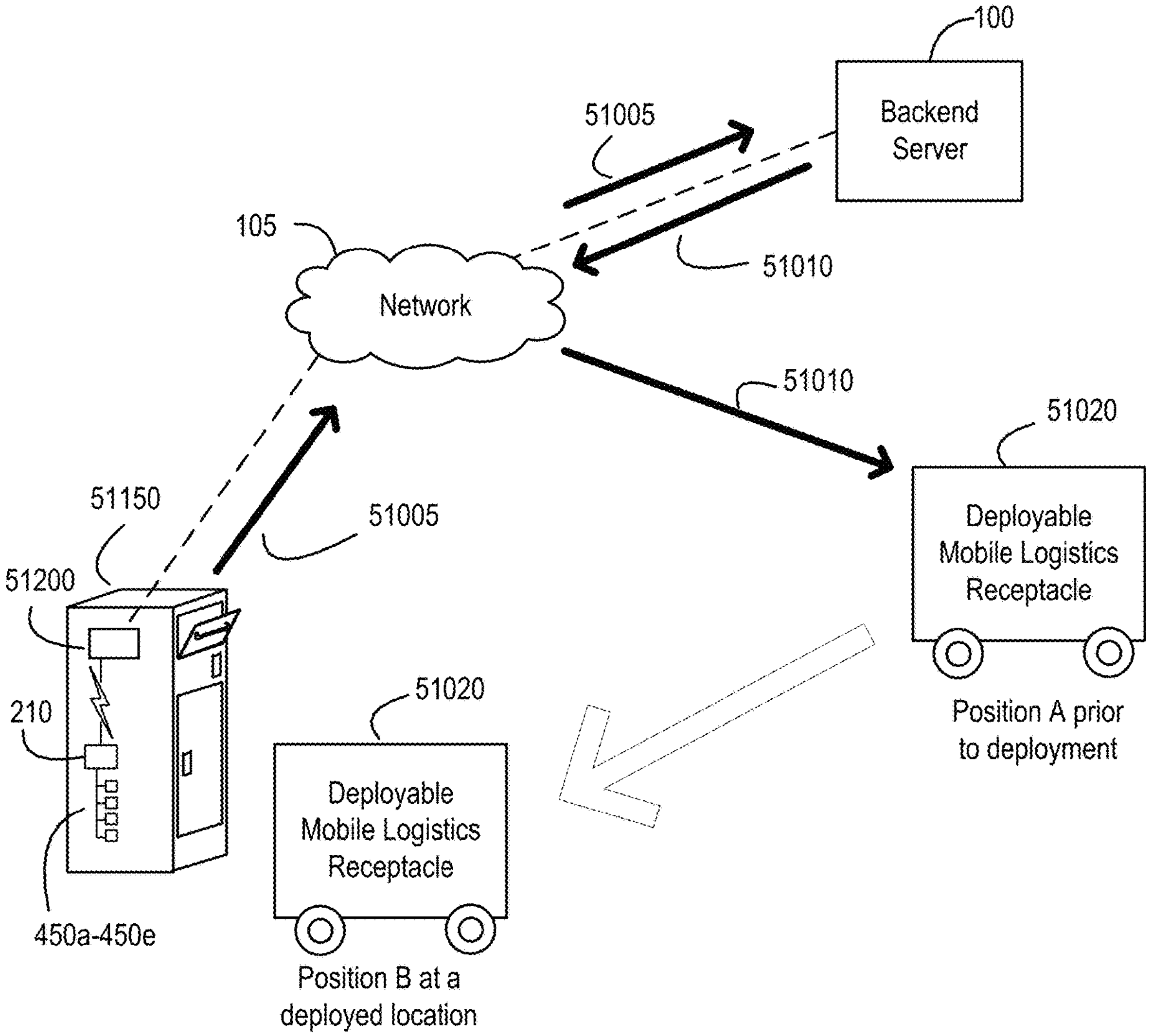
FIG. 51 is a diagram illustrating aspects of an exemplary system for providing an on-demand deployable logistics capacity related to and in response to an exemplary reporting node-based logistics receptacle in accordance with an embodiment of the invention.

FIGS. 51-55 provide illustrations related to such exemplary embodiments that involve systems providing on-demand deployment of a deployable mobile logistics receptacle. FIG. 51 is a diagram illustrating aspects of an exemplary system for providing an on-demand deployable logistics capacity related to and in response to an exemplary reporting node-based logistics receptacle in accordance with an embodiment of the invention. Referring now to FIG. 51, exemplary connected node-based logistics receptacle 51150 is shown operative to communicate with backend server 100 with components similar to exemplary logistics receptacle 150 described relative to FIG. 2. Those skilled in the art will appreciate that exemplary connected logistics receptacle 51150 shown in FIG. 51 is similarly structured to exemplary connected/node-based logistics receptacle 150 and 150*a*, with the exception that exemplary receptacle 51150 is equipped with an exemplary bridge node 51200 that transmits a status update message 51005 including information related to event information indicating a demand surge condition existing relative to receptacle 51150.

Figure 48:
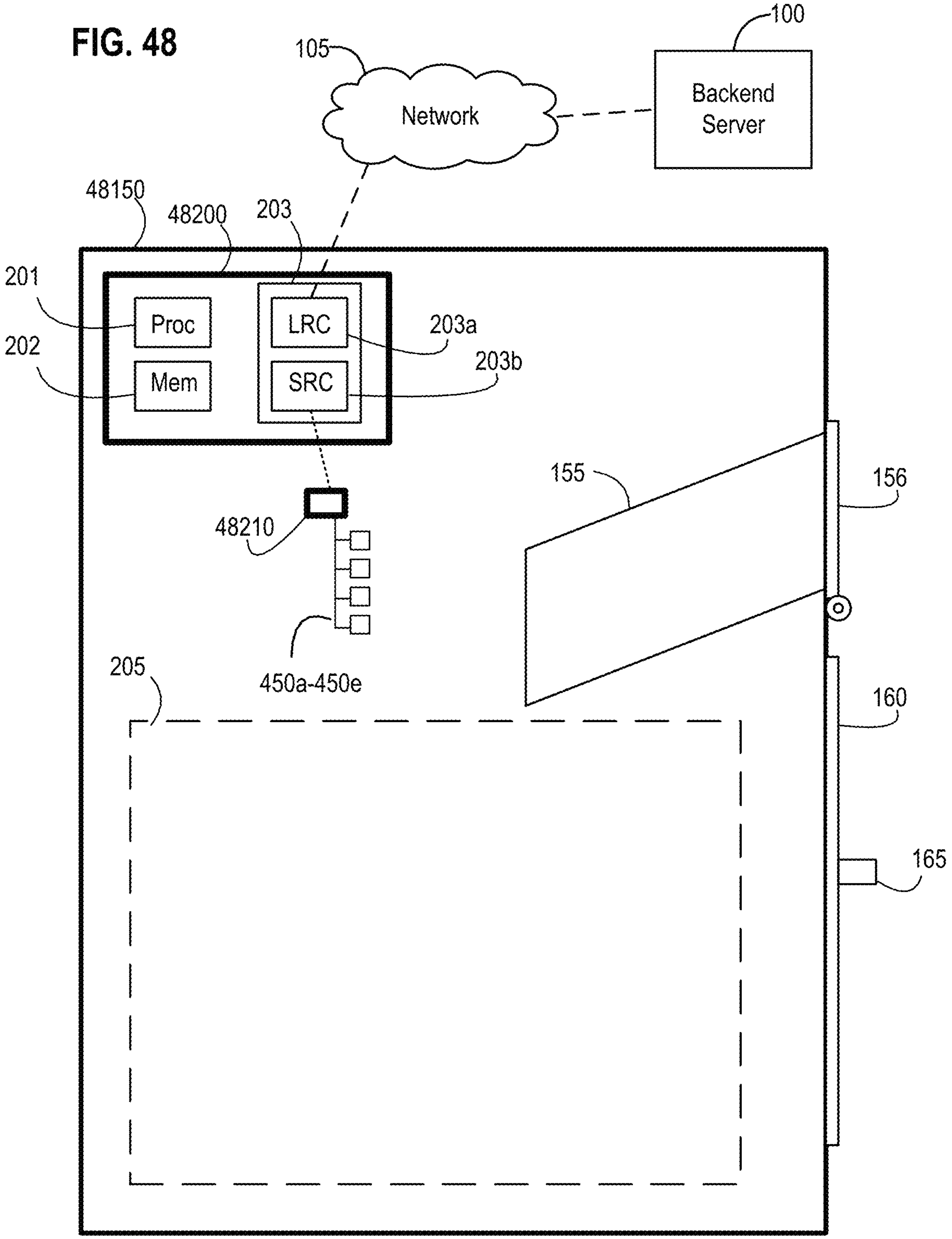
FIG. 48 is a diagram of an exemplary proactively monitored and reporting logistics receptacle system operating within a network in accordance with an embodiment of the invention.

As such, an exemplary system providing an on-demand deployable logistics capacity related to a reporting node-based logistics receptacle as shown in FIG. 48 includes exemplary backend server 100 and an exemplary deployable mobile logistics receptacle 51020.

In this embodiment, the system's deployable mobile logistics receptacle is configured (as explained in more detail below) and operative to receive parcel items at a deployed location (such as at or near the reporting node-based logistics receptacle 51150). The system's backend server 100 in this embodiment is in communication with the reporting node-based logistics receptacle 51150. As such, exemplary backend server 100 is programmatically configured to be operative to receive a message (such as status update message 51005) that includes event information from the reporting node-based logistics receptacle 51150. The event information indicates a demand surge condition exists relative to the reporting node-based logistics receptacle 51150.

In more detail, backend server 100 may receive the event information from the reporting node-based logistics receptacle 51150 by being further operative to receive status update message 51005 from the reporting node-based logistics receptacle 51150, where the status update message 51005 includes at least the event information reflecting or otherwise indicating at least a change in state of the reporting node-based logistics receptacle (e.g., a deposit was made within the temporary storage area of receptacle 51150, and the like). Backend server 100 may determine that the demand surge condition exists relative to the reporting node-based logistics receptacle 51150 based upon the event information and information stored within management profile 835 maintained by the backend server 100 on the reporting node-based logistics receptacle 51150. As previously noted, exemplary management profile 835 is generally a data structure generated, maintained, and updated by backend server 100 with information on operations (e.g., history and use) of particular connected logistics receptacles (e.g., exemplary connected logistics receptacle 51150), their respective components, and logistics assets used to service the particular connected logistics receptacle. In particular, an exemplary management profile 835 used in system embodiments for on-demand deployment of a deployable mobile logistics receptacle may have the management profile including information relating to a pattern of use of the reporting node-based logistics receptacle 51150; information relating to a pattern on detected threshold capacity conditions for the reporting node-based logistics receptacle 51150; information relating to a pattern of overflow conditions for the reporting node-based logistics receptacle 51150; and/or prior/historic use information on the reporting node-based logistics receptacle 51150 (generally and/or specific to particular receptacle components on receptacle 51150, such as the entrance opening, the temporary storage area, the access door, and the area outside but proximate to the receptacle 51150). Such historic use information may, for example, include a pattern of delivery events for the reporting node-based logistics receptacle 51150; a pattern of pickup events for the reporting node-based logistics receptacle 51150; and/or an overload pattern profile identifying a frequency of reaching an overload condition for the reporting node-based logistics receptacle 51150.

In one example, backend server 100 may determine that the demand surge condition exists relative to the reporting node-based logistics receptacle 51150 when the event information from message 51005 indicates at least a threshold number of parcels are currently maintained within the node-based logistics receptacle 51150, when the event information from message 51005 indicates at least a threshold level of contents within the reporting node-based logistics receptacle 51150, when the event information from message 51005 indicates at least a threshold weight of contents exists within the reporting node-based logistics receptacle 51150, when the event information from message 51005 includes indicia of an overflow condition for the reporting node-based logistics receptacle 51150, and/or when the event information from message 51005 includes indicia that the reporting node-based logistics receptacle 51150 is within a threshold range of an overflow condition for that reporting node-based logistics receptacle 51150. Such threshold information relative to reporting node-based logistics receptacle 51150 may be available to backend server 100 as part of exemplary management profile 835.

In a further example, the system's backend server 100 may be programmatically configured to be operative to receive the event information from the reporting node-based logistics receptacle 51150 by being further operative to receive the status update message 51005 from the reporting node-based logistics receptacle 51150 (where the status update message 51005 includes at least event information indicating at least a change in state of the reporting node-based logistics receptacle 51150); compare the event information with management profile 835, which defines historic use information on the reporting node-based logistics receptacle 51150; and determine that the demand surge condition exists relative to the reporting node-based logistics receptacle 51150 based upon the comparison.

Once backend server 100 determines that the demand surge condition exists relative to the reporting node-based logistics receptacle 51150, exemplary backend server 100 is programmatically configured to be further operative to send an exemplary activation message 51010 to the deployable mobile logistics receptacle 51020 to initiate deployment of the deployable mobile logistics receptacle 51020 to a location of the reporting node-based logistics receptacle 51150 as the deployed location of the deployable mobile logistics receptacle 51020.

The system's exemplary deployable mobile logistics receptacle 51020 is operative to receive the activation message from the backend server, move from a current position of the deployable mobile logistics receptacle to a deployed location in response to the activation message, and provide, at the deployed location, the on-demand deployable logistics capacity related to a subsequent shipping deposit. Such a deployed location, for example, may be a location within a predetermined distance from the location of the reporting node-based logistics receptacle 51150. In more detail, the deployment location may be a location within a predetermined distance from the location of the reporting node-based logistics receptacle 51150, where such a predetermined distance is maintained as part of management profile 835 stored by the backend server 100 regarding the reporting node-based logistics receptacle 51150. In the example shown in FIG. 51, exemplary deployable mobile logistics receptacle 51020 receives activation message 51010 from backend server 100. In response to the activation message 51010, exemplary deployable mobile logistics receptacle 51020 begins at position A prior to deployment and moves that current position to the deployed location (e.g., position B at a deployed location at, near, or otherwise substantially close to the location of reporting node-based logistics receptacle 51150 so as to be within a particular predetermined distance from receptacle 51150).

Figure 52A:
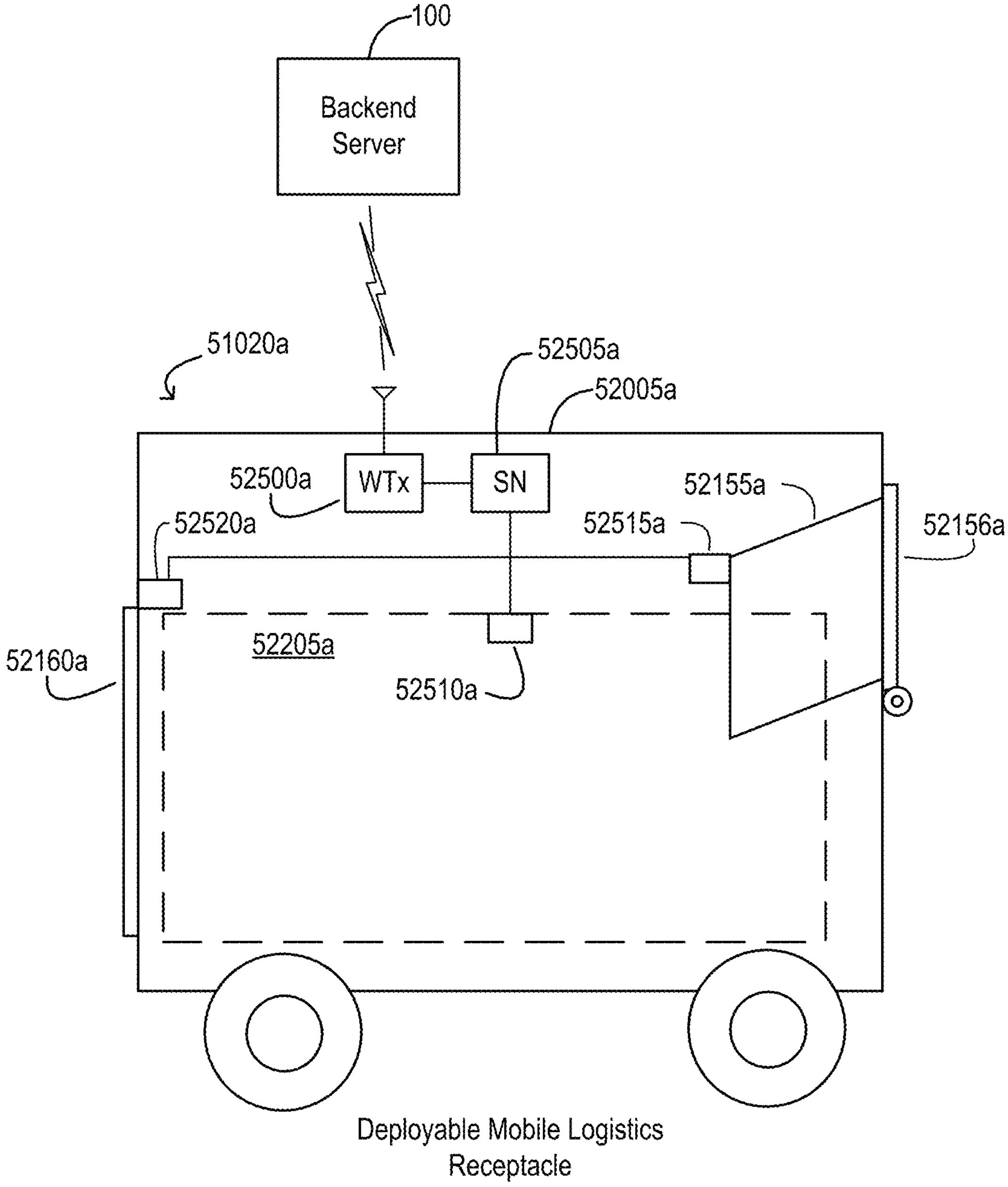
FIGS. 52A-52C are diagrams of different exemplary embodiments of a deployable mobile logistics receptacle in accordance with various embodiments of the invention.
Figure 52B:
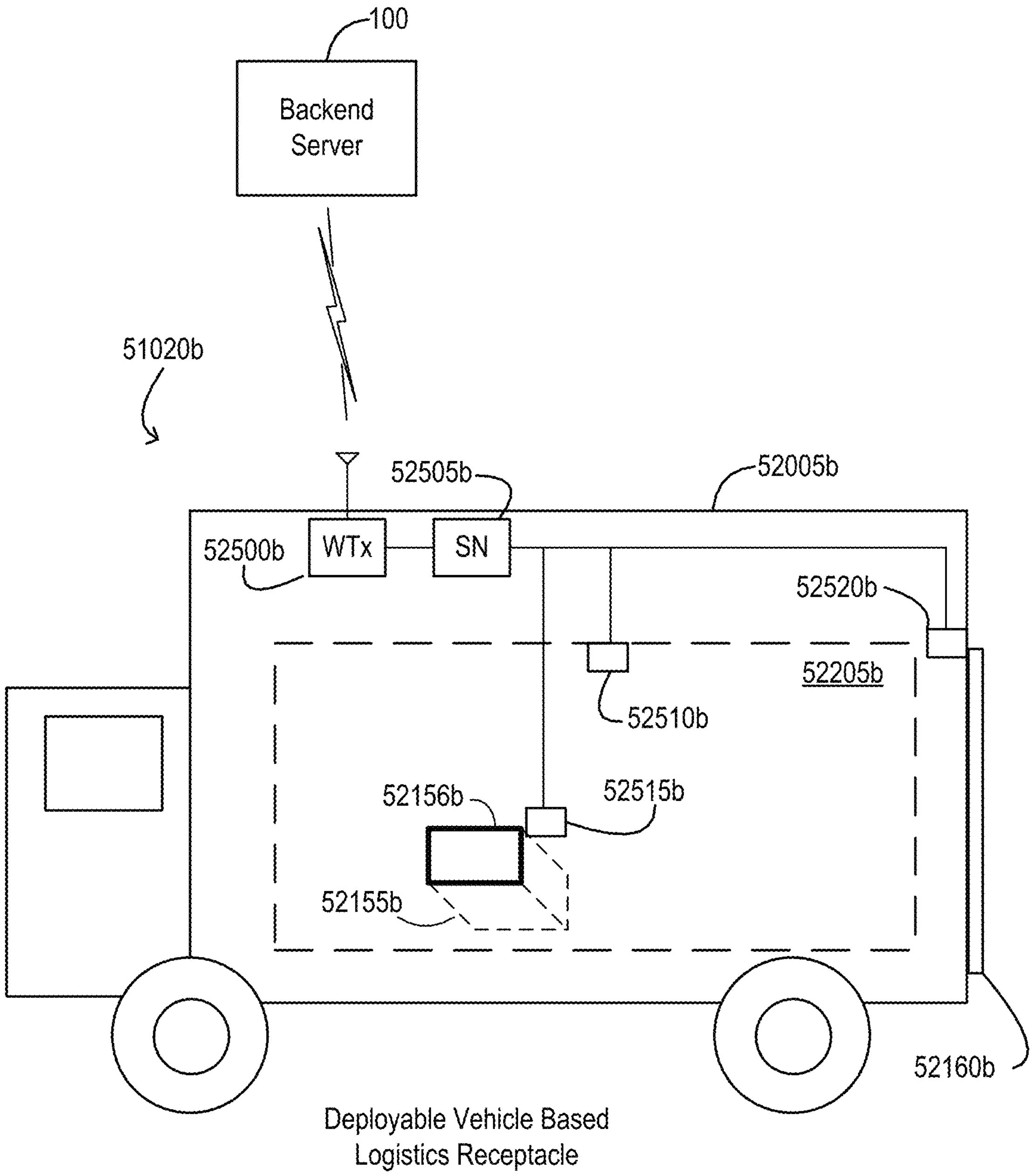
Figure 52C:
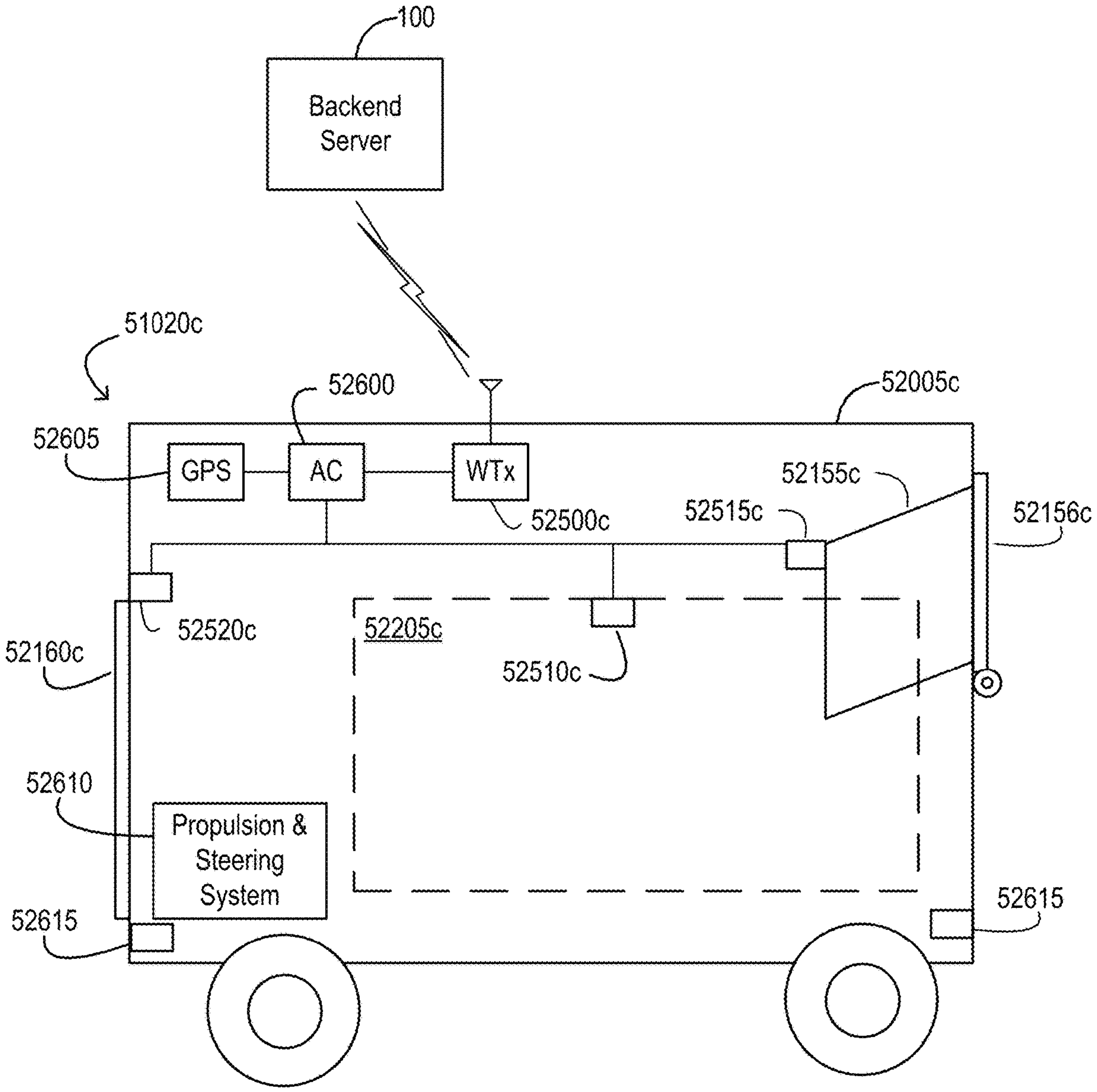

Exemplary deployable mobile logistics receptacle 51020 may be implemented in various ways so that it is responsive to the activation message, be movable between different locations, and provide similar logistics services for accepting and providing access to delivery items (e.g., letters, packages, parcels, and other objects being shipped). FIGS. 52A-52C are diagrams of different exemplary embodiments of deployable mobile logistics receptacle 51020*a-c* in accordance with various embodiments of the invention.

Referring now to FIG. 52A, an example deployable mobile logistics receptacle 51020 is shown as exemplary deployable mobile logistics receptacle 51020*a*. Exemplary deployable mobile logistics receptacle 51020*a* is a wheel-based movable apparatus that can receive and temporarily maintain custody of delivery/parcel items as well as provide selective access to such delivery items. In one embodiment, exemplary deployable mobile logistics receptacle 51020*a* may be moved via human control. In other embodiments, exemplary deployable mobile logistics receptacle 51020*a* may be moved via other mechanisms, such as being towed or propelled under the control of an externally disposed human operator.

As shown in FIG. 52A, exemplary deployable mobile logistics receptacle 51020*a* is implemented as having a movable container housing 52005*a*, an entrance opening 52156*a*/52155*a*, a temporary storage area 52205*a*, a selectively accessible retrieval door 52160*a*, a sensor-enabled node 52505*a*, sensors 52510*a*, 52515*a*, 52520*a*, and a wireless transceiver 52500*a*. The exemplary movable container housing 52005*a* is generally a housing within which the parcel items are received at the deployed location. The exemplary entrance opening 52156*a*/52155*a* is disposed on the movable container housing 52005*a* and provides an opening through which the parcel items are received at the deployed location. As shown in FIG. 52A, exemplary entrance door 52156*a* is disposed on the movable container housing 52005*a* and can be articulated to expose an opening through housing 52005*a* and entrance opening chute 52155*a*. Exemplary temporary storage area 52205*a* is disposed within the movable container housing 52005*a* as a temporary holding area for maintaining the parcel items as they are received and deposited at the deployed location. Exemplary selectively accessible retrieval door 52160*a*, which may include a lock or other security measure to selectively open/close the door, provides selective access to the temporary storage area 52205*a* within the mobile container housing 52005*a*. Exemplary sensor-enabled node 52505*a* is shown mounted to the housing 52005*a* and coupled to each of holding area sensor 52510*a*, entrance opening sensor 52515*a*, and access door sensor 52520*a*. Those skilled in the art will appreciate that exemplary deployable mobile logistics receptacle 51020*a* may be equipped with further types of sensors (much like any of the sensors that are described herein as being used onboard an exemplary node-based logistics receptacle, such as receptacle 150). Exemplary wireless transceiver 52500*a* disposed on the movable container housing 52005*a* is operatively coupled to the sensor-enabled node 52505*a* and operative to receive the activation message 51010 from backend server 100 and otherwise communicate with server 100 via network 105.

In more detail, exemplary sensor-enabled node 52505*a* used in exemplary deployable mobile logistics receptacle 51020*a* and disposed on the movable container housing 52005*a* may be operative to change a mode of operation from a low power mode to an active mode of operation in response to the activation message 51010 as received by the wireless transceiver 52500*a*. Once in the active mode of operation, exemplary sensor-enabled node 52505*a* may then be operative to detect a change in state of the deployable mobile logistics receptacle 51150 based upon sensor data generated by the sensor-enabled node 52505*a*, such as sensor data provided by one of sensors 52510*a*, 52515*a* relative to at least one of the entrance opening 52155*a*/52156*a* and the temporary storage area 52205*a*. In another example, exemplary sensor-enabled node 52505*a* may be operative to detect the change in state of the deployable mobile logistics receptacle 51020*a* based upon sensor data generated by the sensor-enabled node 52505*a*, such as sensor data provided by one of sensors 52510*a*, 52515*a*, and 52520*a* relative to at least one of the entrance opening 52155*a*/52156*a*, the temporary storage area 52205*a*, and the selectively accessible retrieval door 52160*a*. In still another example, exemplary sensor-enabled node 52505*a* may be programmatically configured to be further operative to transmit mobile event information to the backend server 100 in response to a detected change in state of the deployable mobile logistics receptacle 52020*a*.

Referring now to FIG. 52B, another exemplary deployable mobile logistics receptacle 51020 is shown as a mobile delivery vehicle-based logistics receptacle 51020*b*. Exemplary deployable mobile logistics receptacle 51020*b* is a vehicle-based movable apparatus that, like receptacle 51020*a*, can receive and temporary maintain custody of delivery/parcel items as well as provide selective access to such delivery items. In one embodiment, those skilled in the art will appreciate that exemplary mobile delivery vehicle-based logistics receptacle 51020*b* may be moved via human control of the mobile delivery vehicle (e.g., truck, van, car, or other vehicle). Such a mobile delivery vehicle may, for example, be engine-powered, solar-powered, electric-powered, human-powered/pedaled, or hybrid-powered with a combination of such propulsion techniques implemented on the mobile delivery vehicle.

As shown in FIG. 52B, mobile delivery vehicle-based logistics receptacle 51020*b* is implemented as having a movable delivery vehicle 52005*b*, a vehicle-based entrance opening 52156*b*/52155*b*, a vehicle-based temporary storage area 52205*b*, a selectively accessible retrieval door 52160*b*, a sensor-enabled node 52505*b*, sensors 52510*b*, 52515*b*, 52520*b*, and a wireless transceiver 52500*b*. The exemplary mobile delivery vehicle 52005*b* has a portion that operates as type of housing within which the parcel items are received at the deployed location. This may, in some instances, be a housing structure on the mobile vehicle platform where the housing structure provides for storage of any accepted or to be picked up parcel items.

The exemplary vehicle-based entrance opening 52156*b*/52155*b* is disposed on the mobile delivery vehicle 52005*b* (e.g., along a side of vehicle 52005*b*) and provides an opening through which the parcel items are received at the deployed location. As shown in FIG. 52B, exemplary entrance door 52156*b* is disposed on the vehicle 52005*b* and can be articulated to expose an opening through a wall/side of vehicle 52005*b* and entrance opening chute 52155*b*. Exemplary temporary storage area 52205*b* is disposed within the mobile delivery vehicle 52005*b* as a temporary holding area for maintaining the parcel items as they are received and deposited at the deployed location. Exemplary selectively accessible retrieval door 52160*b*, which may include a lock or other security measure to selectively open/close the door, is shown disposed on an end of mobile delivery vehicle 52005*b* and provides selective access to the temporary storage area 52205*b* within the mobile delivery vehicle 52005*b*.

Exemplary sensor-enabled node 52505*b* (much like that with exemplary node 52505*a*) is shown mounted to the vehicle 52005*b* and coupled to each of holding area sensor 52510*b*, vehicle-based entrance opening sensor 52515*b*, and access door sensor 52520*b*. Those skilled in the art will appreciate that exemplary deployable mobile logistics receptacle 51020*b* may be equipped with further types of sensors (much like any of the sensors that are described herein as being used onboard an exemplary node-based logistics receptacle, such as receptacle 150). Exemplary wireless transceiver 52500*b* disposed on the mobile delivery vehicle 52005*b* is operatively coupled to the sensor-enabled node 52505*b* and operative to receive the activation message 51010 from backend server 100 and otherwise communicate with server 100 via network 105.

In more detail, exemplary sensor-enabled node 52505*b* used in exemplary deployable mobile logistics receptacle 51020*b* (i.e., mobile delivery vehicle-based logistics receptacle 51020*b*) and disposed on the mobile delivery vehicle 52005*b* may be operative to change a mode of operation from a low power mode to an active mode of operation in response to the activation message 51010 as received by the wireless transceiver 52500*b*. Once in the active mode of operation, exemplary sensor-enabled node 52505*b* may then be operative to detect a change in state of the mobile delivery vehicle-based logistics receptacle 51020*b* based upon sensor data generated by the sensor-enabled node 52505*b*, such as sensor data provided by one of sensors 52510*b*, 52515*b* relative to at least one of the vehicle-based entrance opening 52155*b*/52156*b* and the vehicle-based temporary storage area 52205*b*. In another example, exemplary sensor-enabled node 52505*b* may be operative to detect the change in state of the mobile delivery vehicle-based logistics receptacle 51020*b* based upon sensor data generated by the sensor-enabled node 52505*b*, such as sensor data provided by one of sensors 52510*b*, 52515*b*, and 52520*b* relative to at least one of the vehicle-based entrance opening 52155*b*/52156*b*, the vehicle-based temporary storage area 52205*b*, and the selectively accessible retrieval door 52160*b* at the back of the vehicle 52005*b*. In still another example, exemplary sensor-enabled node 52505*b* may be programmatically configured to be further operative to transmit mobile event information to the backend server 100 in response to a detected change in state of the deployable mobile logistics receptacle 52020*a*.

Referring now to FIG. 52C, another exemplary deployable mobile logistics receptacle 51020 is shown as a deployable mobile autonomous logistics receptacle (generally referred to as a type of deployable autonomous mobile container 51020*c*). Exemplary deployable autonomous container 51020*c* is a self-moving apparatus that, like receptacles 51020*a* and 51020*b*, can receive and temporary maintain custody of delivery/parcel items as well as provide selective access to such delivery items. Those skilled in the art will appreciate that exemplary deployable autonomous container 51020*c* generally accepts instructions (that may include a destination location) and is operative to navigate from its initial position to the desired destination based upon location circuitry and navigation sensors that help container 51020*c* autonomously track where it is, where it is going, and avoid and navigate obstacles in its path towards its destination.

As shown in FIG. 52C, an embodiment of exemplary deployable autonomous container 51020*c* is implemented as having a container housing 52005*c*, an entrance opening 52156*c*/52155*c*, a temporary storage area 52205*c*, a selectively accessible retrieval door 52160*c*, an autonomous controller 52600, a propulsion and steering system 52610, mobile container navigation sensors 52615, container status sensors 52510*b*, 52515*b*, 52520*b*, a wireless transceiver 52500*c*, and location circuitry (GPS) 52605. In more detail, exemplary container housing 52005*c* generally provides structural walls, bottom and top that collectively define a type of container within which to temporarily maintain parcel items that are being dropped off or being maintained for pickup. The exemplary entrance opening 52156*c*/52155*c* is disposed on the container housing 52005*c* and provides an opening through which the parcel items are received at the deployed location. Exemplary temporary storage area 52205*c*, which maintains the parcel items received at the deployed location, is disposed within the container housing 52005*c*. Exemplary selectively accessible retrieval door 52160*c*, which may include a lock or other security measure to selectively open/close the door, is shown disposed on container housing 52005*c* and provides selective access to the temporary storage area 52205*c*.

As shown in FIG. 52C, exemplary autonomous controller 52600 is generally disposed on the container housing 52005*c* but interfaces with each of the propulsion and steering system 52610, mobile container navigation sensors 52615, container status sensors 52510*b*, 52515*b*, 52520*b*, wireless transceiver 52500*c*, and location circuitry (GPS) 52605. The exemplary autonomous controller 52600 may be implemented with at least one controller or processor that is operatively connected to sensors (e.g., mobile container navigation sensors 52615, container status sensors 52510*b*, 52515*b*, 52520*b*) through hardwired and/or wireless interfacing circuitry or dedicated sensor processing circuitry that may buffer sensor data and process the sensor data. Those skilled in the art will appreciate that exemplary autonomous controller 52600 has the power and self-governance in the performance of sensor processing and responsive control functions that allow the exemplary deployable autonomous container 51020*c* to move, avoid collisions, navigate towards specified locations, and effect actuated and articulated interactions while moving or stationary as part of the logistics operations described herein.

In more detail, such an exemplary autonomous controller 52600 may be implemented as an onboard processing module or system with one or more processors or controllers (such as CPUs/GPUs) and program code or software modules that execute on this platform to programmatically configure the autonomous controller 52600 to be operative to provide the autonomous capability to run the exemplary deployable autonomous container 51020*c* as discussed herein. Further, such an exemplary autonomous controller 52600 may also have redundant, fault-tolerant features for safety control, as well as parallel sensing and parallel processing that allows for common and/or distributed management for operations of such an exemplary autonomous controller 52600. For example, an embodiment of autonomous controller 52600 may deploy distributed management where tasks may be offloaded from a particular processor or system within autonomous controller 52600 and assigned (permanently or dynamically) to another processor or system (e.g., where a sensor may have processing of its sensor data built-in, which offloads the sensor data processing from another processor or system within an embodiment of autonomous controller 52600).

Those skilled in the art will appreciate that exemplary autonomous controller 52600 used in embodiments described herein may, for example, be implemented with an NVIDIA® Jetson™ Xavier AI embedded computing module for autonomous machines that features a 512-Core Volta GPU with Tensor Cores, 8-Core ARM 64-Bit CPU, dual NVDLA deep learning accelerators, video processor for up to 2×4K 60 fps encode and decode, seven-way VLIW vision processor and 16 GB 256-Bit LPDDR4 memory. Another embodiment of an exemplary autonomous controller 52600 may be implemented with an NVIDIA® DRIVE platform level solution powered by two NVIDIA DRIVE Orin™ systems-on-a-chip (SoC) that feature ARM Cortex-A78AE CPU cores and an NVIDIA® DRIVE Hyperion sensor suite. Still another embodiment of such an exemplary autonomous controller 52600 may, for example, be implemented with an ARM Cortex-A76AE autonomous processor with superscalar, out-of-order processing and split-lock flexibility to allow for a split mode with highest multicore performance or split mode for advanced multicore fault-tolerance features for built-in safety and diagnostic functionality at a hardware level (e.g., fail-operational or fault-tolerant capability—where the control system detects a control system fault with memory, processing, data bus, or other control system sub-systems, reports the fault, and continues operation in a degraded mode as needed).

As shown in FIG. 52C, exemplary propulsion and steering system 52610 is disposed on the container housing 52005*c*. Exemplary propulsion and steering system 52610, in general, is responsive to propulsion and steering control signals from the autonomous controller 52600 that cause changes to directional movement of the deployable autonomous mobile container 51020*c*. Exemplary propulsion and steering system 52610 provides kinetic movement related power for deployable autonomous mobile container 51020*c*. Those skilled in the art will appreciate that such power may be engine-powered, solar-powered, electric-powered, or hybrid-powered with a combination of such propulsion techniques implemented to move exemplary deployable autonomous mobile container 51020*c*. Transferring such power from exemplary propulsion and steering system 52610 to ground contact surfaces may, for example, take the form of wheels or other propulsion tracks selected for enhanced traction via tread/track materials and patterns so as to help maneuver through and navigate uneven streets, broken/buckled sidewalks, tree roots, standing water, grassy sloped terrain, and the like on its way to its deployed location. In some embodiments, exemplary propulsion and steering system 52610 may power less than all wheels on container 51020*c* while all wheels may be powered in other embodiments. Likewise, exemplary propulsion and steering system 52610 may steer less than all wheels on container 51020*c* in some embodiments, while all wheels may be steerable in other embodiments.

Exemplary mobile container navigation sensors 52615 are coupled to the autonomous controller 52600 and disposed on housing 52005*c* in different locations so as to monitor the environment proximate the deployable autonomous mobile container 51020*c*—e.g., in front of container 51020*c* relative to its direction of travel, as well as behind and on each side. This allows autonomous controller 52600 to receive robust external environmental sensory data from the mobile container navigation sensors 52615 to enable collision free travel and navigation when moving to and from different locations. Those skilled in the art will appreciate that exemplary mobile container navigation sensors 52615 may be of a variety of types of sensors (e.g., motion sensors, proximity sensors, image sensors, video sensors, LiDAR sensors, depth sensors, infrared sensors, ultrasonic sensors, thermal sensors, and the like) and are operative to autonomously detect an object in the path of the deployable autonomous mobile container 51020*c* and provide navigation feedback sensor data to the autonomous controller 52600 on the detected object.

Exemplary container status sensors 52510*c*, 52515*c*, 52520*c* are each coupled to the autonomous controller 52600 and each operative to detect a change in state of the deployable autonomous mobile container 51020*c* based upon sensor data generated by at least one of the container status sensors 52510*c*, 52515*c*, 52520*c* relative to at least one of the entrance opening 52156*c*/52155*c*, temporary storage area 52205*c*, and selectively accessible retrieval door 52160*c*. As such, those skilled in the art will appreciate that exemplary container status sensors 52510*c*, 52515*c*, 52520*c* may be used to monitor for deposit/pickup interactions with the deployable autonomous mobile container 51020*c*.

Exemplary wireless transceiver 52500*c* is disposed on the container housing 52005*c* of deployable autonomous mobile container 51020*c* and is operatively coupled to the coupled to the autonomous controller 52600. As used onboard the deployable autonomous mobile container 51020*c*, the wireless radio transceiver 52500*c* is operative to communicate with the backend server 100 disposed external to the deployable autonomous mobile container 51020*c* receive the activation message 51010 from the backend server 100.

Exemplary location circuitry 52605, such as a Global Positioning System (GPS) receiver and antenna, is disposed on the container housing 52005*c* and also operatively coupled to the autonomous controller 52600. In general, the location circuitry 52605 generates location data on a location of the deployable autonomous mobile container 51020*c* and provides the location data to the autonomous controller 52600. As such, exemplary location circuitry 52605 allows autonomous controller 52600 to self-determine its location or to determine its location by itself. In other examples, alternative circuitry and techniques may be relied upon for location circuitry 52605 (rather than GPS), such as location circuitry compatible with other satellite-based systems (e.g., the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems).

In operation, the autonomous controller 52600 of exemplary autonomous mobile container 51020*c* may be programmatically configured to be operative to cause the deployable autonomous mobile container to move from a current position of the deployable autonomous mobile container 51020*c* (e.g., Position A) to the deployed location (e.g., Position B) in response to the activation message 51010 by sending the propulsion and steering control signals to the propulsion and steering system 52610. In more detail, moving from the current position to the deployed position has the autonomous controller 52600 of exemplary autonomous mobile container 51020*c* receiving navigation sensor feedback as it navigates towards the deployed location while avoiding collisions, as well as revising the propulsion and steering control signals sent to the propulsion and steering system 52610 to correct speed, direction, and avoid objects in its path. Once at the deployed location (e.g., Position B shown in FIG. 51), an embodiment may have the autonomous controller 52600 of exemplary autonomous mobile container 51020*c* being programmatically configured to be further operative to transmit mobile event information to the backend server 100 in response to a detected change in state of the deployable autonomous mobile container 51020*c* based upon the sensor data generated by at least one of the container status sensors 52510*c*, 52515*c*, 52520*c*.

In a further embodiment, the autonomous controller 52600 of exemplary autonomous mobile container 51020*c* may be programmatically operative to receive, using the wireless radio transceiver, the activation message 51010 from the backend server 100; move from a current position of the deployable autonomous mobile container 51020*c* to the deployed location in response to the activation message 51010; and provide, at the deployed location, the on-demand deployable logistics capacity related to a subsequent shipping deposit.

Figure 53:
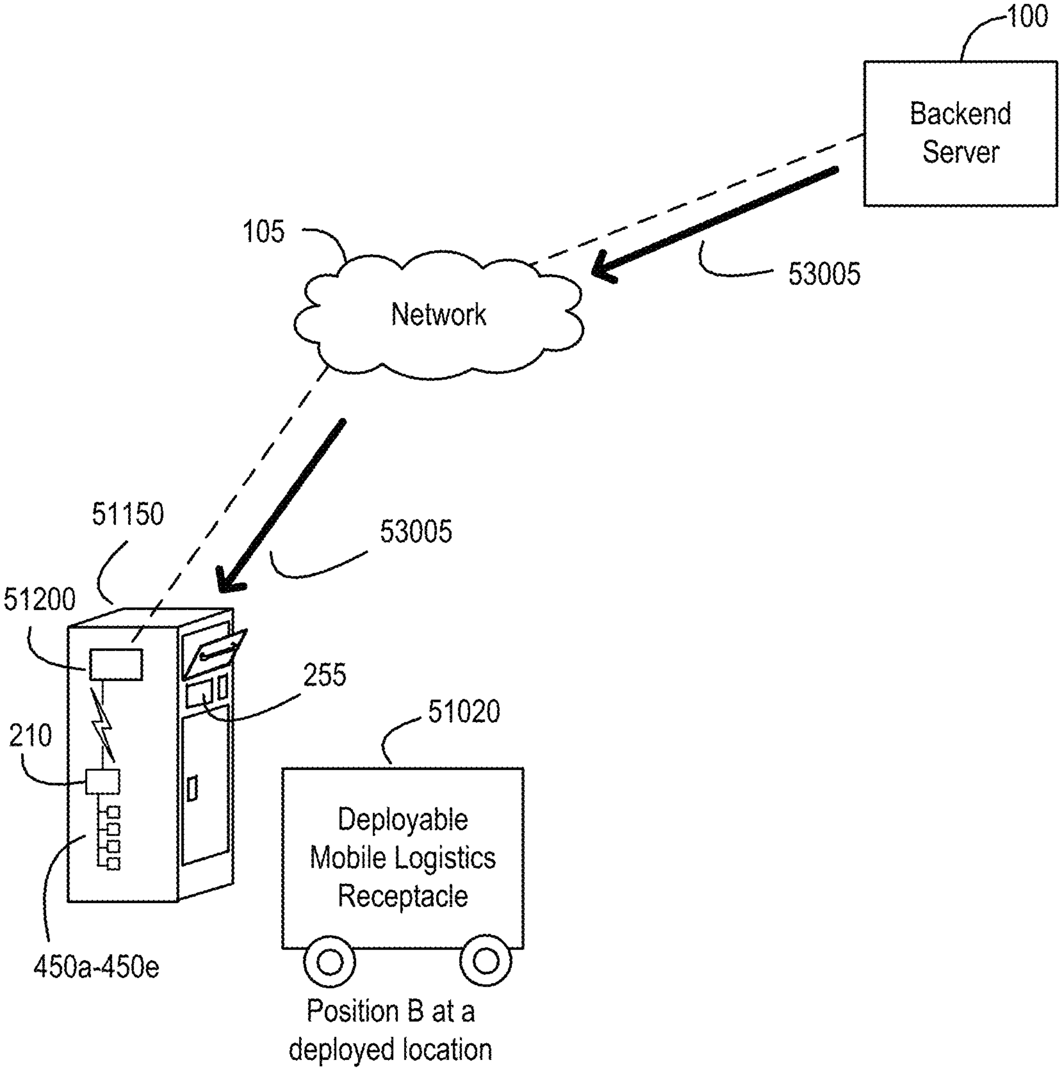
FIG. 53 is a diagram illustrating an embodiment of the system of FIG. 51 where the backend server causes the reporting node-based logistics receptacle to show alternative deposit information related to the deployable mobile logistics receptacle in accordance with an embodiment of the invention.

FIG. 53 is a diagram illustrating an embodiment of the system of FIG. 51 where the backend server 100 causes the exemplary reporting node-based logistics receptacle 51150 to show alternative deposit information related to the exemplary deployable mobile logistics receptacle 51020 in accordance with an embodiment of the invention. Referring now to FIG. 53, exemplary deployable mobile logistics receptacle 51020 is shown at its deployed location (Position B). Once located at this deployed position, an embodiment has the backend server being programmatically configured to be further operative to transmit an update message 53005 to the reporting node-based logistics receptacle 51150. Receipt of the update message 53005 causes the reporting node-based logistics receptacle 51150 to generate a visible display message indicating alternative deposit information related to the deployable mobile logistics receptacle 51020. Such a visible display message may be shown using externally disposed user interface 255 on the reporting node-based logistics receptacle 51150. As previously noted, externally disposed user interface 255 may have one or more display, keys, status lights, touchscreens, buttons, switches, and/or speaker for interacting with a shipping customer and/or logistics personnel. In more detail, receipt of the update message 53005 may cause the reporting node-based logistics 51150 to generate a change in status light (e.g., an externally exposed status light part of interface 255) on the reporting node-based logistics receptacle 51150 as the visible display message indicating the alternative deposit information related to the deployable mobile logistics receptacle 51020. Alternatively, or in combination, receipt of the update message 53005 may cause the reporting node-based logistics 51150 to generate a change in what is shown on an external display screen (e.g., an exemplary display-based user interface part of interface 255) on the reporting node-based logistics receptacle 51150 as the visible display message indicating the alternative deposit information related to the deployable mobile logistics receptacle 51020. Such alternative deposit information related to the deployable mobile logistics receptacle 51020 may be related to and include information on the deployed location of the deployable mobile logistics receptacle 51020 so as to assist customers in using the deployable mobile logistics receptacle 51020 for subsequent drop off actions.

A further embodiment may have the system's backend server 100 being programmatically configured to be further operative to transmit an update message 53005 to the reporting node-based logistics receptacle 51150 where the update message 53005 causes the reporting node-based logistics receptacle 51150 to wirelessly broadcast a status update message indicating alternative deposit information related to the deployable mobile logistics receptacle 51020. Such a wirelessly broadcast status update message may thus allow wirelessly enabled customers to receive alternative deposit information related to the deployable mobile logistics receptacle 51020, such as the deployed location of the deployable mobile logistics receptacle 51020.

Figure 54:
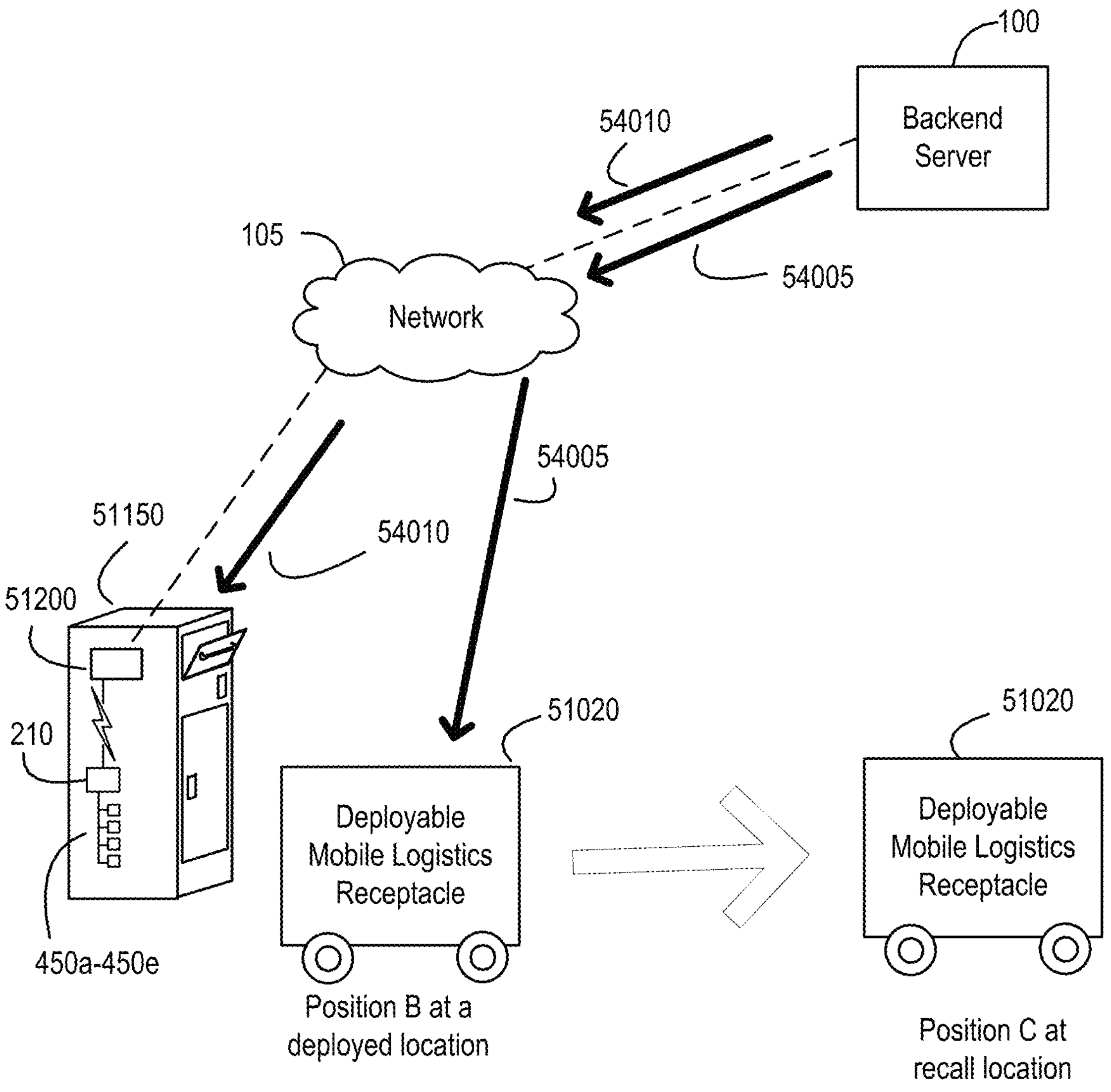
FIG. 54 is a diagram illustrating an embodiment of the system of FIG. 51 where the backend server recalls the deployable mobile logistics receptacle in accordance with an embodiment of the invention.

FIG. 54 is a diagram illustrating an embodiment of the system of FIG. 51 where the backend server 100 recalls the deployable mobile logistics receptacle 51020 in accordance with an embodiment of the invention. Those skilled in the art will appreciate that at some point in time, the usefulness of having the deployable mobile logistics receptacle 51020 deployed at Position B (its deployed location at or near the location of reporting node-based logistics receptacle 51150) may change. This may, for example, be because the reporting node-based logistics receptacle 51150 may have been services and no longer have a demand surge condition existing. In other examples, this may be because the deployable mobile logistics receptacle 51020 itself reaches a particular level of capacity. Thus, an embodiment may have the system's backend server 100 being programmatically configured to be further operative to send a recall message 54005 to the deployable mobile logistics receptacle 51020 to initiate a recall of the deployable mobile logistics receptacle 51020 from the deployed location of the deployable mobile logistics receptacle 51020. In a further embodiment, the system's backend server 100 may be programmatically configured to be further operative to transmit a recall message 54005 to the deployable mobile logistics receptacle 51020 to initiate a recall of the deployable mobile logistics receptacle 51020 from the deployed location of the deployable mobile logistics receptacle 51020, and then transmit a recall update message 54010 to the reporting node-based logistics receptacle 51150, the receipt of which causes the reporting node-based logistics receptacle 51150 to generate a visible display message indicating a change in operational status related to the deployable mobile logistics receptacle 51020, indicating a recall status related to the deployable mobile logistics receptacle 51020, and/or indicating a return to normal operation for the reporting node-based logistics receptacle 51150. The system's deployable mobile logistics receptacle 51020 may also be further operative, in response to the recall message 54005, to move from the deployed location (e.g., Position B shown in FIG. 54) to a recall location (e.g., Position C shown in FIG. 54). In one example, the recall location may be a logistics facility location capable of unloading the deployable mobile logistics receptacle 51020 and temporarily storing the deployable mobile logistics receptacle 51020 awaiting a further deployment of the deployable mobile logistics receptacle 51020. In another example, the recall location may be a location of a mobile logistics vehicle (not shown in FIG. 54, but similar to a delivery van associated with a logistics asset 700*a*) capable of receiving the deployable mobile logistics receptacle 51020.

Figure 55:
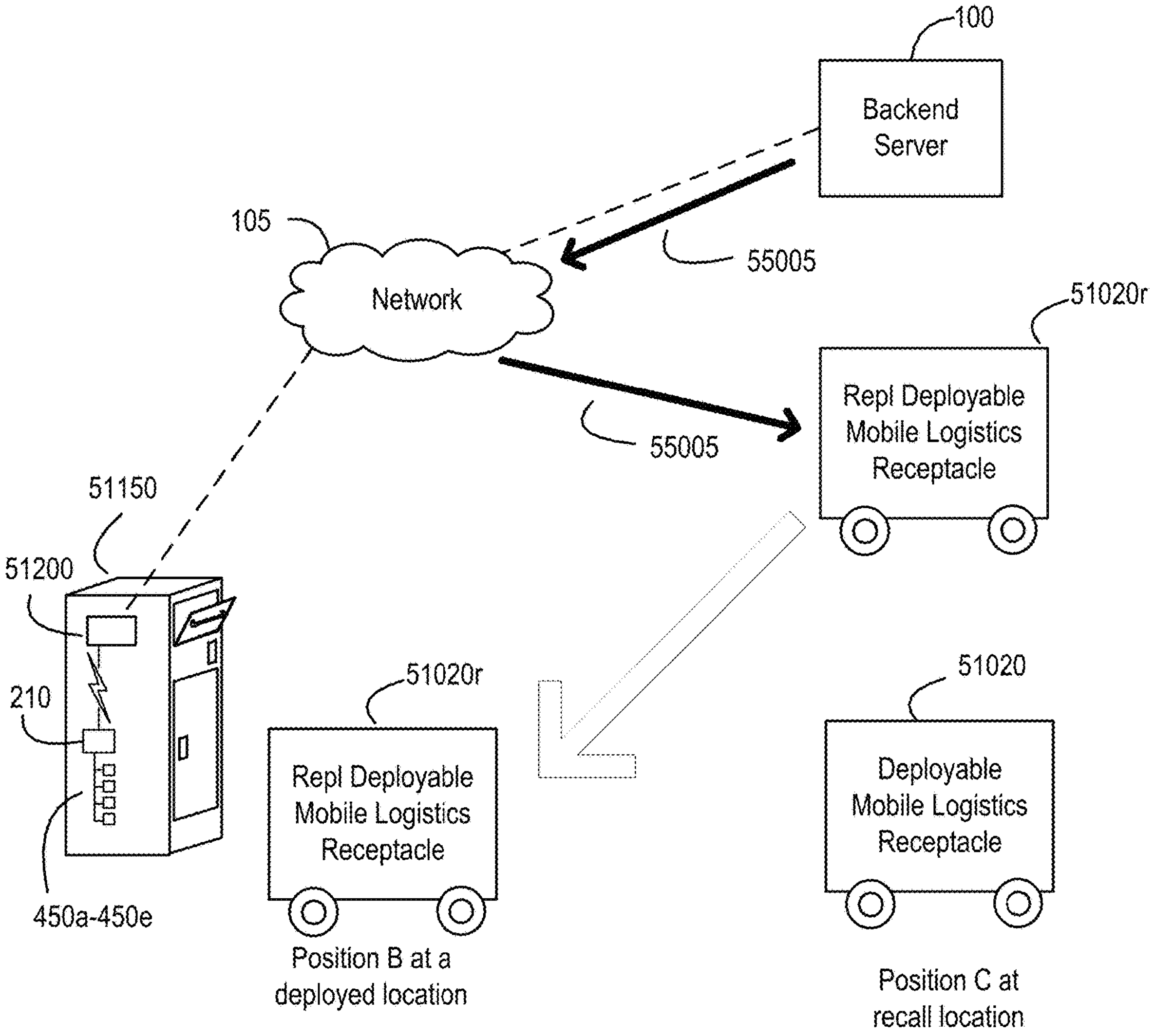
FIG. 55 is a diagram illustrating an embodiment of the system of FIG. 51 where the backend server activates an exemplary replacement deployable mobile logistics receptacle in accordance with an embodiment of the invention.

FIG. 55 is a diagram illustrating an embodiment of the system of FIG. 51 where the system's backend server 100 activates an exemplary replacement deployable mobile logistics receptacle in accordance with an embodiment of the invention. Referring now to FIG. 55, the system's backend server 100 and deployed mobile logistics receptacle 51020 are shown once the deployed mobile logistics receptacle 51020 has been recalled. Here, there still may be a need to have a deployed mobile logistics receptacle at or near the reporting node-based logistics receptacle 51150 as it may still be in conditions corresponding to a demand surge condition (e.g., at capacity, in an overflow condition, still awaiting pickup servicing, and the like). In such a situation, an embodiment may have the system's backend server 100 being programmatically configured to be further operative to transmit a supplemental activation message 55005 to an exemplary replacement deployable mobile logistics receptacle 51020*r* to initiate deployment of the replacement deployable mobile logistics receptacle 51020*r* to the deployed location of the deployable mobile logistics receptacle 51020 (e.g., at or near the reporting node-based logistics receptacle 51150). In more detail, the system's backend server 100 may also be operative to transmit a recall message (e.g., message 54005 as explained above) to the deployable mobile logistics receptacle 51020 to initiate a recall of the deployable mobile logistics receptacle 51020 from the deployed location of the deployable mobile logistics receptacle (e.g., Position B) and causing deployable mobile logistics receptacle 51020 to move to the recall location (e.g., Position C). The system's backend server 100 may be operative to transmit the supplemental activation message 55005 to the replacement deployable mobile logistics receptacle 51020*r* to initiate deployment of the replacement deployable mobile logistics receptacle 51020*r* to the deployed location of the deployable mobile logistics receptacle (e.g., Position B) after a predetermined time period after sending the activation message to the deployable mobile logistics receptacle and/or initiate deployment of the replacement deployable mobile logistics receptacle 51020*r* to the deployed location of the deployable mobile logistics receptacle based upon feedback information received from the deployable mobile logistics receptacle 51020. Such feedback information from the existing deployed mobile logistics receptacle 51020 to backend server allows the backend server 100 to learn of conditions related to the previously deployed mobile logistics receptacle 51020 (e.g., exemplary feedback information corresponding to a status of the deployable mobile logistics receptacle (such as operating status, capacity status, overflow status or condition, and the like), exemplary feedback information corresponding to mobile event information related to one or more detected changes in the deployable mobile logistics receptacle (such as any detected status changes reflecting interactions with components of the deployable mobile logistics receptacle representing a pickup or drop off).

In some embodiments described below, those skilled in the art will appreciate that initiating deployment of an exemplary deployable mobile logistics receptacle 51020 may be allowed and implemented via machine-to-machine (M2M) micropayment using blockchain. In such embodiments, when exemplary backend server 100 generally desires to send the activation message 51010 to a deployable mobile logistics receptacle to initiate deployment of an exemplary deployable mobile logistics receptacle (e.g., deployable mobile logistics receptacles 51020, 51020*a*, 51020*b*, or 51020*c*), the exemplary backend server 100 in such a system embodiment may do so autonomously and securely using predefined terms and conditions defined in a self-executing smart contract between the devices (e.g., backend server 100 and the deployable mobile logistics receptacle 51020). Those skilled in the art will appreciate that such an exemplary smart contract may be generally considered as a self-executing contract with the terms of the agreement between the devices being directly written into lines of code (e.g., computerized transaction protocols that execute contract conditions making a transaction traceable, transparent and irreversible). The devices may be commonly owned or may be devices associated with different entities (e.g., when the backend server 100 is owned and operated by one entity and the deployable mobile logistics receptacle 51020 is owned and operated by another entity). Such a smart contract may be implemented and considered a decentralized application on network 105 that executes business logic in response to events where execution can result in the exchange of money, delivery of services (such as initiating use of a third party device, such as an exemplary deployable mobile logistics receptacle), unlocking of content protected by digital rights management or other types of data manipulation (such as the exchange of sensor data gathered by the deployable mobile logistics receptacle). Smart contracts may also be used to enforce privacy protection by, for example, facilitating the selective release of privacy-protected data to meet a specific request or permitting access to a particular secured area (such as a temporary storage area within deployable mobile logistics receptacle 51020) or initiating use of a third party device for a particular task (such as initiating use of the deployable mobile logistics receptacle 51020 that provides a type of on-demand deployable logistics capacity related to a reporting node-based logistics receptacle 51150).

Referring back to FIG. 51, a further system embodiment may have the backend server 100 being programmatically configured to be operative to send the activation message 51010 to the deployable mobile logistics receptacle 51020 to initiate deployment of the deployable mobile logistics receptacle 51020 by being further programmatically configured to be operative to send the activation message 51010 to the deployable mobile logistics receptacle 51020 to initiate deployment of the deployable mobile logistics receptacle 51020 according to a smart contract based activation agreement related to the deployable mobile logistics receptacle 51020. Those skilled in the art will appreciate that establishing such a smart contract based connection by one network device with another network device may be generally accomplished with the execution of a smart contract application (a type of decentralized application on network 105) that will create and allow such a connection and interaction with the two devices under terms of that smart contract. In more detail, an embodiment may have the backend server 100 being programmatically configured to be operative to send the activation message 51010 to the deployable mobile logistics receptacle 51020 to initiate deployment of the deployable mobile logistics receptacle 51020 by being further programmatically configured to be operative to establish a smart contract based activation agreement with the deployable mobile logistics receptacle 51020, where the smart contract based activation agreement provides terms for paid for deployment of the deployable mobile logistics receptacle 51020; and send the activation message 51010 to the deployable mobile logistics receptacle 51020 to initiate deployment of the deployable mobile logistics receptacle 51020 according to the terms for paid for deployment of the deployable mobile logistics receptacle 51020 according to the smart contract based activation agreement.

Those skilled in the art will appreciate that in a further example, this may involve running an exemplary decentralized application residing on one of the devices or on a part of network 105 representing the smart contract in response to events (such as a request to establish a smart contract based connection used to initiate deployment of a deployable mobile logistics receptacle) by one device/entity (e.g., backend server 100) with another device/entity (e.g., deployable mobile logistics receptacle 51020). The smart contract facilitating (e.g., used in establishing) such a connection involves a transaction between the two devices/entities. Data representing payment for such a transaction (e.g., payment for establishing the smart contract based connection for the performance of a service by the deployable mobile logistics receptacle 51020 for backend server 100) may be stored in an extendible chain in a distributed fashion on the network 105, such a distributed blockchain based virtual permanent ledger.

Here, the smart contract based connection provides paid-for use of exemplary deployable mobile logistics receptacle 51020. As such, the system's deployable mobile logistics receptacle 51020 may deploy to provide on-demand logistics capacity near reporting node-based logistics receptacle 51150 under terms of the smart contract based connection with the backend server 100. In more detail, such a smart contract based connection may, for example, be implemented by a protocol for an automated transaction stored on a blockchain and run in response to meeting at least a payment condition for deploying the deployable mobile logistics receptacle. In some embodiments, the smart contract based connection may provide for initiating deployment of the deployable mobile logistics receptacle 51020 under predetermined pricing terms as the payment condition. Such predetermined pricing terms may, for example, relate to a blockchain-based payment for payment for initiating deployment of the deployable mobile logistics receptacle (e.g., supplied by a logistics asset having one or more deployable mobile logistics receptacles, supplied by a logistics broker having access to one or more third-party for-hire deployable mobile logistics receptacles) in response to the activation message and/or a blockchain-based payment for access rights to the data generated by any of the sensing elements in deployable mobile logistics receptacle 51020.

Selective Retrieval and Reporting of Event Information

Some of the embodiments described above involve the bridge node retrieving the available event information from the wireless accessory sensor node at particular times as described herein. However, in additional embodiments, the storage receptacle's bridge node may only selectively retrieve particular logged/captured sensor data and information (e.g., as event information) from the wireless accessory sensor node based upon information generally referred to as selective criteria where not all available event information is retrieved to be then transmitted to the backend server for use in causing the backend server to initiate a dispatched logistics operation related to the storage receptacle. The selective criteria may be implemented as one or more types of information, as described in more detail below. In this way, such additional embodiments involving this type of selective retrieval of event information report back only particular types, classes, subsets of event information or event information that has been triaged at the level of the node-based logistics receptacle to be more refined and more useful to the backend server in managing and/or servicing the node-based logistics receptacle.

Figure 36:
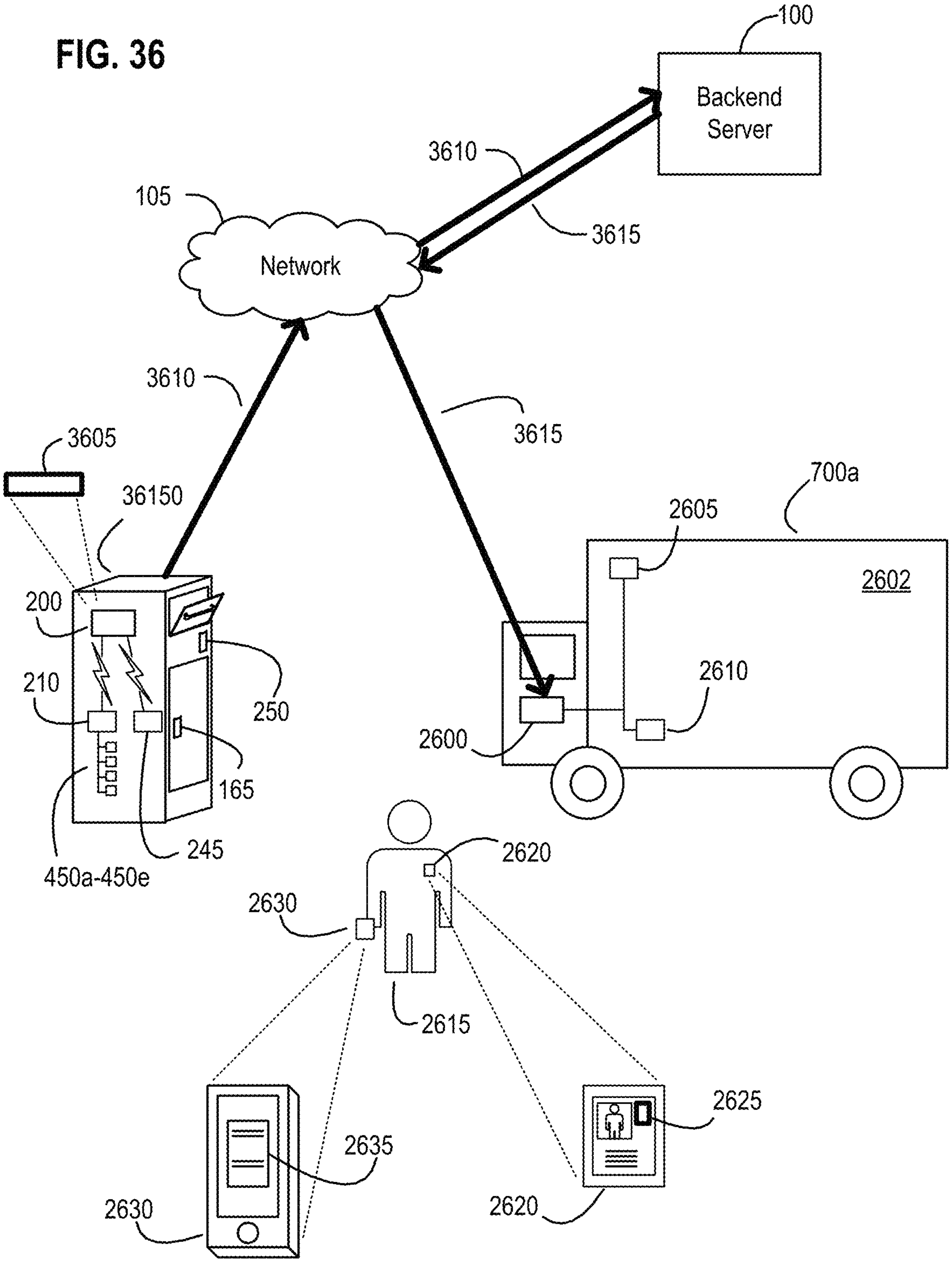
FIG. 36 is a diagram illustrating an exemplary enhanced connected logistics receptacle system that selectively retrieves and reports event information to a backend server to initiate a dispatched logistics operation related to a delivery item in accordance with an embodiment of the invention.

FIG. 36 is a diagram illustrating an exemplary enhanced connected logistics receptacle system that selectively retrieves and reports particular event information to a backend server to initiate a dispatched logistics operation related to a delivery item in accordance with an embodiment of the invention. Referring now FIG. 36, exemplary connected logistics receptacle 36150 is shown along with backend server 100 and exemplary mobile logistics asset 700*a* (e.g., courier personnel 2615 (equipped with a mobile handheld communication device 2630 and mobile node-enabled badge 2620) and a delivery vehicle 2602 (equipped with an exemplary mobile transceiver 2600, location circuitry 2605 coupled to transceiver 2600, and vehicle status monitoring circuitry 2610 coupled to transceiver 2600).

Those skilled in the art will appreciate that exemplary connected logistics receptacle 36150 shown in FIG. 36 is similarly structured to exemplary connected logistics receptacle 150*a*, with the exception that exemplary receptacle 36150 includes selective monitoring and management code for execution by the processor in bridge node 200 (controlling functionality of bridge node 200 in such additional embodiments) and use of selectivity information 3605 maintained within memory 305/310 of bridge node 200 as part of selectively retrieving and reporting particular event information. In other words, and as explained in more detail below, data maintained as part of exemplary selectivity information 3605 generally reflects selective criteria used by the bridge node 200 to determine what is to be retrieved and uploaded from the wireless accessory sensor node regarding available event information generated on and maintained by the wireless accessory sensor node (e.g., exemplary wireless accessory sensor node 210).

As such, an exemplary system embodiment is shown in FIG. 36 that includes exemplary connected logistics receptacle 36150 having a storage receptacle for receiving and maintaining a delivery item (as previously described having an entrance opening, a temporary storage area 205 and selectively accessible retrieval door 160). The system's exemplary connected logistics receptacle 36150 is also illustrated being equipped with at least exemplary bridge node 200, exemplary wireless accessory sensor nodes 210, 245, lock 165 for door 160 that provides access to within the storage receptacle, and sensors 450*a*-450*e* that are coupled to at least one of the wireless accessory sensor nodes on receptacle 150*a*. The system's exemplary bridge node 200, consistent with previously descriptions, is mounted to the storage receptacle and includes a bridge node processor 201, a bridge node memory 202 (e.g., volatile memory 310 and non-volatile memory 305), and a wireless communication interface 203. As noted above, the bridge node memory is coupled to the bridge node processor and maintains selective monitoring and management code (e.g., a type of CLR control and management code 315) for execution by the bridge node processor along with at least exemplary selectivity information 3605 that is used during execution of the selective monitoring and management code. The communication interface is coupled to the bridge node processor and is operative to communicate with at least the backend server 100 over a first communication path (e.g., exemplary network 105).

Consistent with the description above, the system uses at least one exemplary wireless accessory sensor node (e.g., node 210) coupled to a plurality of sensors (e.g., sensors 450*a*-450*e*) where each of the sensors respectively monitors for a change in state of the storage receptacle. The system's exemplary wireless accessory sensor node 210 is operative to detect the change in state of the storage receptacle based upon sensor data generated by the at least one sensor; record timestamped information reflecting the detected change in state of the storage receptacle; and broadcast an updated advertising signal having a data available flag set within the updated advertising signal. Here, the data available flag indicates the wireless accessory sensor node has at least some event information available for upload by the bridge node 200 (where such event information includes at least the timestamped information reflecting the detected change in state of the storage receptacle).

The bridge node processor within the system's exemplary bridge node 200, when executing the selective monitoring and management code maintained on the bridge node memory, is operative to detect the data available flag set within the updated advertising signal over the communication interface; selectively retrieve the event information from the wireless accessory sensor node using the communication interface based upon a selective criteria for upload (e.g., data maintained within selectivity information 3605); and transmit, using the bridge node's communication interface, the retrieved event information in a message 3610 to the backend server 100 to cause the backend server 100 to initiate the dispatched logistics operation via a dispatch message 3615 related to the storage receptacle.

In a further embodiment of such an exemplary system, the selective criteria used by bridge node 200 may originate from the backend server. For example, the system's bridge node processor may be further operative to receive a selective criteria message from the backend server 100. Such a selective criteria message updates the selectivity information 3605 used by the bridge node 200 as the selective criteria. In more detail, the selective criteria message may cause the bridge node 200 processor to store (or update) selectivity information 3605 in the bridge node memory where the selectivity information is identified in the selective criteria message and, thereafter, corresponds to the selective criteria used when selectively retrieving the event information available for upload.

In another embodiment of such an exemplary system, the selective criteria used by bridge node 200 may come from what is broadcast by the system's wireless accessory sensor node. For example, the system's bridge node processor may be further operative to selectively retrieve the event information available for upload based upon the selective criteria by being further operative to detect a selection identifier based upon information within the updated advertising signal (e.g., information within the data available flag itself), and then selectively retrieve the event information available for upload from the wireless accessory sensor node using the communication interface based upon the detected selection identifier representing the selective criteria for upload.

In still another embodiment, what is selectively retrieved is only a subset or portion of the available event information on the wireless accessory sensor node. For example, and in more detail, the exemplary system's bridge node processor may be operative to selectively retrieve the event information based upon the selective criteria for upload by being further operative to selectively retrieve, based upon the selective criteria for upload, at least a subset or portion of the event information available for upload and maintained on the wireless accessory sensor node. The particular subset or portion of the available event information maintained on the wireless accessory sensor node may be indicated by the selective criteria for upload.

What is selectively retrieved, in other embodiments, may be based upon the type of component in the storage receptacle where a change was detected that warrants retrieval. For example, the selective criteria for upload may be a predetermined type of change in state of the storage receptacle related to one or a subset of the monitored storage receptacle components (e.g., the entrance opening, the temporary storage area, the access door, and the like). In more detail, the selectively retrieved event information may be a portion of the event information available for upload on the wireless accessory sensor node that corresponds to the identified type of change in state of the storage receptacle related to the one of the monitored storage receptacle components.

In other embodiments, the selective criteria for upload may be a predetermined class of sensor related to the detected change in state of the storage receptacle. For example, such a predetermined class of sensor may be a prioritized class of sensor identifying a first subset of the sensors. In more detail, the predetermined class of sensor related to the detected change in state of the storage receptacle may be a motion class of sensor that includes a motion sensor capable of detecting at least a change in motion of one of the monitored receptacle structural components, a change in motion of an object moving in relation to one of the monitored receptacle structural components, a change in motion outside of the storage receptacle, and/or a change in motion of one of the monitored receptacle structural components.

In another embodiment, the predetermined class of sensor related to the detected change in state of the storage receptacle may be a status class of sensor. For example, when the monitored storage receptacle components include a lock, such as exemplary lock 165 for securing the selectively accessible retrieval door 160, the status class of sensor may be a lock sensor capable of detecting a change in state of the lock 165 as the change in state of the storage receptacle. In another example, the status class of sensor may be a range sensor (e.g., a range sensor coupled to wireless accessory sensor node 250) capable of detecting a change in what has been placed within a predetermined range of the storage receptacle as the change in state of the storage receptacle. In yet another example, the status class of sensor may be an orientation sensor capable of detecting a change in orientation of one of the monitored storage receptacle components as the change in state of the storage receptacle. In still another example, the status class of sensor may include a magnetic sensor capable of detecting a change in position of one of the monitored storage receptacle components as the change in state of the storage receptacle.

In yet another embodiment, the predetermined class of sensor related to the detected change in state of the storage receptacle may be an imaging class of sensor. In other embodiments, the predetermined class of sensor related to the detected change in state of the storage receptacle may be a force class of sensor, such as a scale capable of detecting a change in weight of what is maintained within the storage receptacle as the change in state of the storage receptacle or an impact sensor capable of detecting a change in what has been deposited within the storage receptacle as the change in state of the storage receptacle. Further still, additional embodiments may have the predetermined class of sensor related to the detected change in state of the storage receptacle being a light class of sensor (e.g., light detection sensor, laser-based sensor, etc.) or a chemical class of sensor (e.g., an explosive sensor, a sensor that detects particular vaporous chemicals in gas form, or other chemical sensors).

In further embodiments, the selective criteria for upload may be a threshold detection condition relative to the detected change in state of the storage receptacle. For example, the bridge node processor in the system's bridge node 200 may be operative to selectively retrieve the event information based upon the selective criteria for upload by being further operative to selectively retrieve, based upon the threshold detection condition as the selective criteria for upload, a portion of the event information available for upload associated with the threshold detection condition. Such a threshold detection condition may, for example, be detection of an external package as the detected change in state of the storage receptacle; detection of a package count excess condition as the detected change in state of the storage receptacle; and/or detection of a weight excess condition as the detected change in state of the storage receptacle.

The selective criteria for upload, in still further embodiments, may be based upon the time of detection. For example, an embodiment may implement the selective criteria for upload as a temporal preference criteria identifying which in a series of detected changes in state of the storage receptacle warrant reporting to the backend server. In more detail, such a temporal preference criteria may identify a first in the series of detected changes in state of the storage receptacle, a last in the series of detected changes in state of the storage receptacle, or a predetermined one in the series of detected changes in state of the storage receptacle as the particular detected change that warrants having its related event information being retrieved by the bridge node 200 for reporting to the backend server 100.

Further still, the selective criteria for upload used in other embodiments may prioritize retrieval of particular event information for particular customers. For example, the selective criteria for upload used by the system's bridge node 200 may be implemented as a customer prioritization preference criteria, which defines a customer associated with the detected change in state of the storage receptacle. In more detail, an embodiment may have the system's bridge node processor being further operative to identify a customer associated with the detected change in state of the storage receptacle based upon a broadcast signal received by the communication interface from a mobile user access device associated with the shipping customer (e.g., a smartphone or augmented reality communication device (e.g., AR glassware/headset) used by a shipping customer dropping off the delivery item or other parcels at the node-based logistics receptacle 36150, a wireless transceiver based mobile tag used by the shipping customer, a wireless transceiver in a mobile vehicle used by the shipping customer, and the like). The broadcast signal from the mobile user access device associated with the customer may include an RF signature associated with the customer, which may be used in identifying the customer. The bridge node processor in such an embodiment is operative to selectively retrieve the event information from the wireless accessory sensor node based upon the selective criteria for upload by being further operative to selectively retrieve the event information from the wireless accessory sensor node when a customer prioritization criteria matches the identified customer associated with the detected change in state of the storage receptacle. Here, the customer prioritization criteria defines whether the identified customer warrants prioritized reporting to the backend server of interactions with the storage receptacle. In some examples, the customer prioritization criteria may define a first class of one or more customers that warrants non-delayed reporting of the interactions with the storage receptacle and/or an additional class of one or more customers where reporting of the interactions with the storage receptacle are delayed until a predetermined time (e.g., time from detection, time of day, the end of a reporting period associated with the bridge node, time on a particular day of the week, and the like).

In similar embodiments, the selective criteria for upload used in other embodiments may prioritize retrieval of particular event information for particular entities. For example, the selective criteria for upload used by the system's bridge node 200 may be implemented as an entity prioritization preference criteria, which defines an entity associated with the detected change in state of the storage receptacle. In more detail, an embodiment may have the system's bridge node processor being further operative to identify the entity associated with the detected change in state of the storage receptacle based upon a broadcast signal received by the communication interface from a mobile user access device associated with the entity (e.g., a smartphone used by an entity employee, a wireless transceiver based mobile tag used by the entity employee, a wireless transceiver in a mobile vehicle used by the entity, and the like). The broadcast signal from the mobile user access device associated with the entity may include an RF signature associated with the entity, which may be used in identifying the particular entity. The bridge node processor in such an embodiment is operative to selectively retrieve the event information from the wireless accessory sensor node based upon the selective criteria for upload by being further operative to selectively retrieve the event information from the wireless accessory sensor node when the entity prioritization criteria matches the identified entity associated with the detected change in state of the storage receptacle, where the entity prioritization criteria defines whether the identified entity warrants prioritized reporting to the backend server of interactions with the storage receptacle. In some examples, the entity prioritization criteria may define a first class of one or more entities that warrants non-delayed reporting of the interactions with the storage receptacle and/or an additional class of one or more entities where reporting of the interactions with the storage receptacle are delayed until a predetermined time (e.g., time from detection, time of day, the end of a reporting period associated with the bridge node, time on a particular day of the week, and the like).

Figure 37:
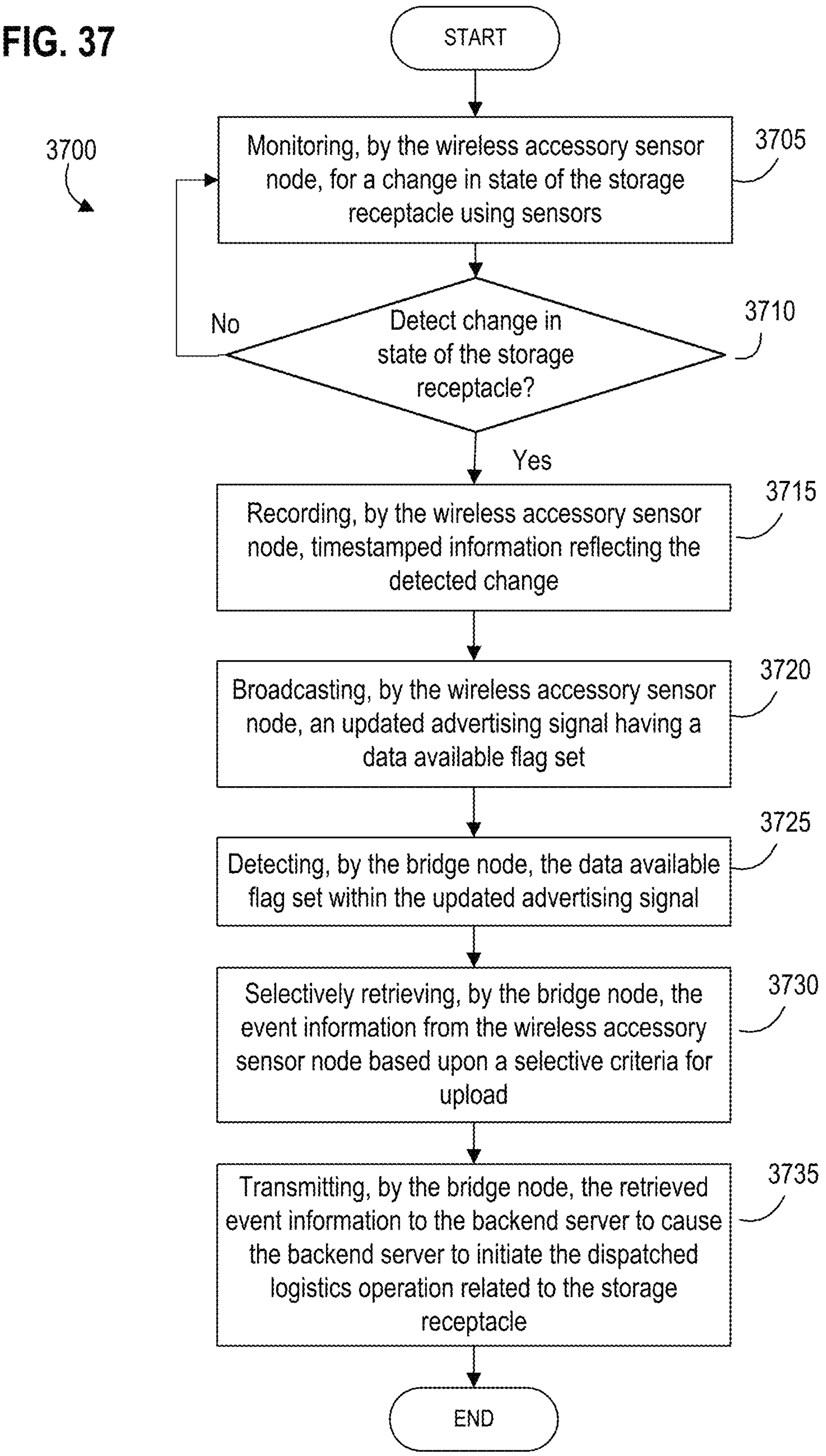
FIG. 37 is a flow diagram illustrating an exemplary method for selective uploading and transmitting of event information from a node-based logistics receptacle in accordance with an embodiment of the invention.

In light of such a system embodiment illustrated in FIG. 36 and described above, those skilled in the art will appreciate that another related embodiment involves a method for uploading and transmitting of event information from a node-based logistics receptacle implemented by the above-described system components. FIG. 37 is a flow diagram illustrating an exemplary method 3700 for selective uploading and transmitting of event information from a node-based logistics receptacle in accordance with an embodiment of the invention. In such an exemplary method 3700, the node-based logistics receptacle used may be implemented with exemplary node-based logistics receptacle 36150, which has multiple monitored storage receptacle components (including at least an entrance opening 155 for receiving one or more shipping items, a temporary storage area 205 for temporarily maintaining the one or more shipping items once received, and a retrieval door 160 providing selective access to the one or more shipping items within the temporary storage area). The node-based logistics receptacle used in implementing exemplary method 3700 further has a wireless accessory sensor node coupled to multiple sensors (e.g., exemplary wireless accessory sensor node 210) disposed on the node-based logistics receptacle and a receptacle bridge node (e.g., exemplary bridge node 200) disposed on the node-based logistics receptacle operative to communicate with a backend server (e.g., exemplary backend server 100).

Referring now to FIG. 37, exemplary method 3700 begins at step 3705 with the wireless accessory sensor node monitoring for a change in state of the storage receptacle using the sensors. At step 3710, method 3700 proceeds with the wireless accessory sensor node detecting the change in state of the storage receptacle based upon sensor data generated by at least one of the sensors. If a change is detected, step 3710 proceeds to step 3715. If a change is not yet detected, then method 3700 proceeds back to step 3705 to continue monitoring for a sensor-based change in state of the storage receptacle.

At step 3715, method 3700 proceeds with the wireless accessory sensor node recording timestamped information reflecting the detected change in state of the storage receptacle. At step 3720, method 3700 then has the wireless accessory sensor node broadcasting an updated advertising signal having a data available flag set within the updated advertising signal. The data available flag indicates the wireless accessory sensor node has event information available for upload by the bridge node. Such event information includes at least the timestamped information reflecting the detected change in state of the storage receptacle, but may include further information (e.g., the type of sensor detecting the change, the component monitored related to the change, and the like consistent with the description herein on types of event information).

At step 3725, method 3700 proceeds with the bridge node detecting the data available flag set within the updated advertising signal. At this point, the bridge node is made aware there is event information available but as described in more detail below, the bridge node only selectively retrieves the event information in step 3730 using the communication interface of the bridge node and based upon a selective criteria for upload. In this way, a selective amount of what event information available on the wireless accessory sensor node is then retrieved by the bridge node from the wireless accessory sensor node in step 3730. In more detail, such selective criteria may be implemented using selectivity information maintained by the bridge node (e.g., data in selectivity information 3605).

Finally, at step 3735, method 3700 proceeds with the bridge node transmitting the retrieved event information to the backend server to cause the backend server to initiate the dispatched logistics operation related to the storage receptacle.

In further embodiments of method 3700, the selective criteria used by the bridge node in step 3730 may originate from the backend server. For example, an embodiment of method 3700 may also include the step of receiving, by the bridge node, a selective criteria message from the backend server 100. Such a selective criteria message updates the selectivity information 3605 used by the bridge node 200 as the selective criteria. In more detail, such an embodiment of method 3700 may have the bridge node receiving a selective criteria message from the backend server and then storing selectivity information in memory of the bridge node where such selectivity information is identified in the selective criteria message and corresponds to the selective criteria used when selectively retrieving the event information available for upload in step 3730.

In another embodiment of exemplary method 3700, the selective criteria used by bridge node 200 in step 3730 may come from what is broadcast by the system's wireless accessory sensor node. For example, step 3730 may be implemented with the bridge node selectively retrieving the event information available for upload based upon the selective criteria with the bridge node detecting a selection identifier based upon information within the updated advertising signal (e.g., information within the data available flag itself), and then selectively retrieving the event information available for upload from the wireless accessory sensor node using the communication interface based upon the detected selection identifier representing the selective criteria for upload.

In still another embodiment of method 3700, what is selectively retrieved in step 3730 is only a subset or portion of the available event information on the wireless accessory sensor node. For example, and in more detail, step 3730 may be implemented with the bridge node selectively retrieving, based upon the selective criteria for upload, at least a subset or portion of the event information available for upload and maintained on the wireless accessory sensor node. The particular subset or portion of the available event information maintained on the wireless accessory sensor node may be indicated by the selective criteria for upload.

What is selectively retrieved, in other embodiments of step 3730, may be based upon the type of component in the storage receptacle where a change was detected that warrants retrieval. For example, the selective criteria for upload may be a predetermined type of change in state of the storage receptacle related to one or a subset of the monitored storage receptacle components (e.g., the entrance opening, the temporary storage area, the access door, and the like). In more detail, the selectively retrieved event information may be a portion of the event information available for upload on the wireless accessory sensor node that corresponds to the identified type of change in state of the storage receptacle related to the one of the monitored storage receptacle components.

In still other embodiments of step 3730 of method 3700, the selective criteria for upload used in step 3730 may be a predetermined class of sensor related to the detected change in state of the storage receptacle. For example, such a predetermined class of sensor may be a prioritized class of sensor identifying a first subset of the sensors. In more detail, the predetermined class of sensor related to the detected change in state of the storage receptacle may be a motion class of sensor that includes a motion sensor capable of detecting at least a change in motion of one of the monitored receptacle structural components, a change in motion of an object moving in relation to one of the monitored receptacle structural components, a change in motion outside of the storage receptacle, and/or a change in motion of one of the monitored receptacle structural components.

In another embodiment of step 3730 of method 3700, the predetermined class of sensor related to the detected change in state of the storage receptacle may be a status class of sensor. For example, when the monitored storage receptacle components include a lock, such as exemplary lock 165 for securing the selectively accessible retrieval door 160, the status class of sensor may be a lock sensor capable of detecting a change in state of the lock 165 as the change in state of the storage receptacle. In another example, the status class of sensor may be a range sensor (e.g., a range sensor coupled to wireless accessory sensor node 250) capable of detecting a change in what has been placed within a predetermined range of the storage receptacle as the change in state of the storage receptacle. In yet another example, the status class of sensor may be an orientation sensor capable of detecting a change in orientation of one of the monitored storage receptacle components as the change in state of the storage receptacle. In still another example, the status class of sensor may include a magnetic sensor capable of detecting a change in position of one of the monitored storage receptacle components as the change in state of the storage receptacle.

In yet another embodiment of step 3730, the predetermined class of sensor related to the detected change in state of the storage receptacle may be an imaging class of sensor. In other embodiments of step 3730, the predetermined class of sensor related to the detected change in state of the storage receptacle may be a force class of sensor, such as a scale capable of detecting a change in weight of what is maintained within the storage receptacle as the change in state of the storage receptacle or an impact sensor capable of detecting a change in what has been deposited within the storage receptacle as the change in state of the storage receptacle. Further still, additional embodiments of step 3730 may have the predetermined class of sensor related to the detected change in state of the storage receptacle being a light class of sensor (e.g., light detection sensor, laser-based sensor, etc.) or a chemical class of sensor (e.g., an explosive sensor, a sensor that detects particular vaporous chemicals in gas form, or other chemical sensors).

In further embodiments of method 3700, the selective criteria for upload used in step 3730 may be a threshold detection condition relative to the detected change in state of the storage receptacle. For example, the step 3730 may have the bridge node selectively retrieving, based upon the threshold detection condition as the selective criteria for upload, a portion of the event information available for upload associated with the threshold detection condition. Such a threshold detection condition may, for example, be detection of an external package as the detected change in state of the storage receptacle; detection of a package count excess condition as the detected change in state of the storage receptacle; and/or detection of a weight excess condition as the detected change in state of the storage receptacle.

The selective criteria for upload, in still further embodiments, may be based upon the time of detection. For example, an embodiment may implement the selective criteria for upload as a temporal preference criteria identifying which in a series of detected changes in state of the storage receptacle warrant reporting to the backend server. In more detail, such a temporal preference criteria may identify a first in the series of detected changes in state of the storage receptacle, a last in the series of detected changes in state of the storage receptacle, or a predetermined one in the series of detected changes in state of the storage receptacle as the particular detected change that warrants having its related event information being retrieved by the bridge node 200 for reporting to the backend server 100.

Further still, the selective criteria for upload used in other embodiments of step 3730 of method 3700 may prioritize retrieval of particular event information for particular customers. For example, the selective criteria for upload used by the system's bridge node 200 may be implemented as a customer prioritization preference criteria, which defines a customer associated with the detected change in state of the storage receptacle. In more detail, an embodiment may have step 3730 implemented with the bridge node identifying a customer associated with the detected change in state of the storage receptacle based upon a broadcast signal received by the communication interface from a mobile user access device associated with the shipping customer (e.g., a smartphone used by a shipping customer dropping off the delivery item or other parcels at the node-based logistics receptacle 36150, a wireless transceiver based mobile tag used by the shipping customer, a wireless transceiver in a mobile vehicle used by the shipping customer, and the like). The broadcast signal from the mobile user access device associated with the customer may include an RF signature associated with the customer, which may be used in identifying the customer. In such an embodiment, step 3730 may be implemented with the bridge node selectively retrieving the event information from the wireless accessory sensor node based upon the selective criteria for upload by being further operative to selectively retrieve the event information from the wireless accessory sensor node when a customer prioritization criteria matches the identified customer associated with the detected change in state of the storage receptacle. Here, the customer prioritization criteria defines whether the identified customer warrants prioritized reporting to the backend server of interactions with the storage receptacle. In some examples, the customer prioritization criteria may define a first class of one or more customers that warrants non-delayed reporting of the interactions with the storage receptacle and/or an additional class of one or more customers where reporting of the interactions with the storage receptacle are delayed until a predetermined time (e.g., time from detection, time of day, the end of a reporting period associated with the bridge node, time on a particular day of the week, and the like).

In similar more detailed embodiments of method 3700, the selective criteria for upload used in other embodiments may prioritize retrieval of particular event information for particular entities. For example, the selective criteria for upload used by the system's bridge node 200 may be implemented as an entity prioritization preference criteria, which defines an entity associated with the detected change in state of the storage receptacle. In more detail, an embodiment may implement step 3730 with the bridge node identifying the entity associated with the detected change in state of the storage receptacle based upon a broadcast signal received by the communication interface from a mobile user access device associated with the entity (e.g., a smartphone used by an entity employee, a wireless transceiver based mobile tag used by the entity employee, a wireless transceiver in a mobile vehicle used by the entity, and the like). The broadcast signal from the mobile user access device associated with the entity may include an RF signature associated with the entity, which may be used in identifying the particular entity. Step 3730 in such an embodiment has the bridge node selectively retrieving the event information from the wireless accessory sensor node based upon the selective criteria for upload by selectively retrieving the event information from the wireless accessory sensor node when the entity prioritization criteria matches the identified entity associated with the detected change in state of the storage receptacle, where the entity prioritization criteria defines whether the identified entity warrants prioritized reporting to the backend server of interactions with the storage receptacle. In some examples, the entity prioritization criteria may define a first class of one or more entities that warrants non-delayed reporting of the interactions with the storage receptacle and/or an additional class of one or more entities where reporting of the interactions with the storage receptacle are delayed until a predetermined time (e.g., time from detection, time of day, the end of a reporting period associated with the bridge node, time on a particular day of the week, and the like).

Enhanced Customer Identification by a Node-Based Logistics Receptacle

Some of the embodiments described herein involve detection of a change in state of the node-based logistics receptacle (e.g., changes in monitored components of the storage receptacle). Additional embodiments may also monitor for and identify the parcel customer dropping off the delivery item (e.g., exemplary package 170, which may be a parcel, letter, boxed item, unboxed item, or other object being deposited with the storage receptacle for shipment). As explained in more detail below, embodiments that also involve customer identification may enhance and adapt an exemplary node-based logistics receptacle so as to detect wireless signals being broadcast by the parcel customer's mobile user device (e.g., smartphone or wireless-enabled tablet running an app related to the shipment of the delivery item) as the parcel customer approaches the node-based logistics receptacle when depositing/dropping off the delivery item. In this way, such additional embodiments deploy self-monitoring node-based logistics receptacles to detect not only a change in the state of the receptacle's components (e.g., entrance opening, temporary storage area, access door, surrounding area next to the receptacle, and the like), but also detect and interact with parcel customer to validate and verify those parcel customers are authorized to use the particular node-based logistics receptacle as it relates to the particular delivery item being dropped off. Such additional functionality implemented in an exemplary node-based logistics receptacle also facilitates tracking and updating of custodial control related to the delivery item with more specificity, and updating the server with such updated custodial control information. In some embodiments, this may also have the advantage of early awareness of an unauthorized deposit and the ability to take corrective action on the part of the server (i.e., initiating a corrective logistics operation where a logistics asset is dispatched with particularity to retrieve a specific delivery item deposited in that node-based logistics receptacle where such a deposit was proactively detected, determined to be unauthorized, and notification of such an unauthorized deposit was reported to the server by the bridge node in the node-based logistics receptacle).

Figure 38A:
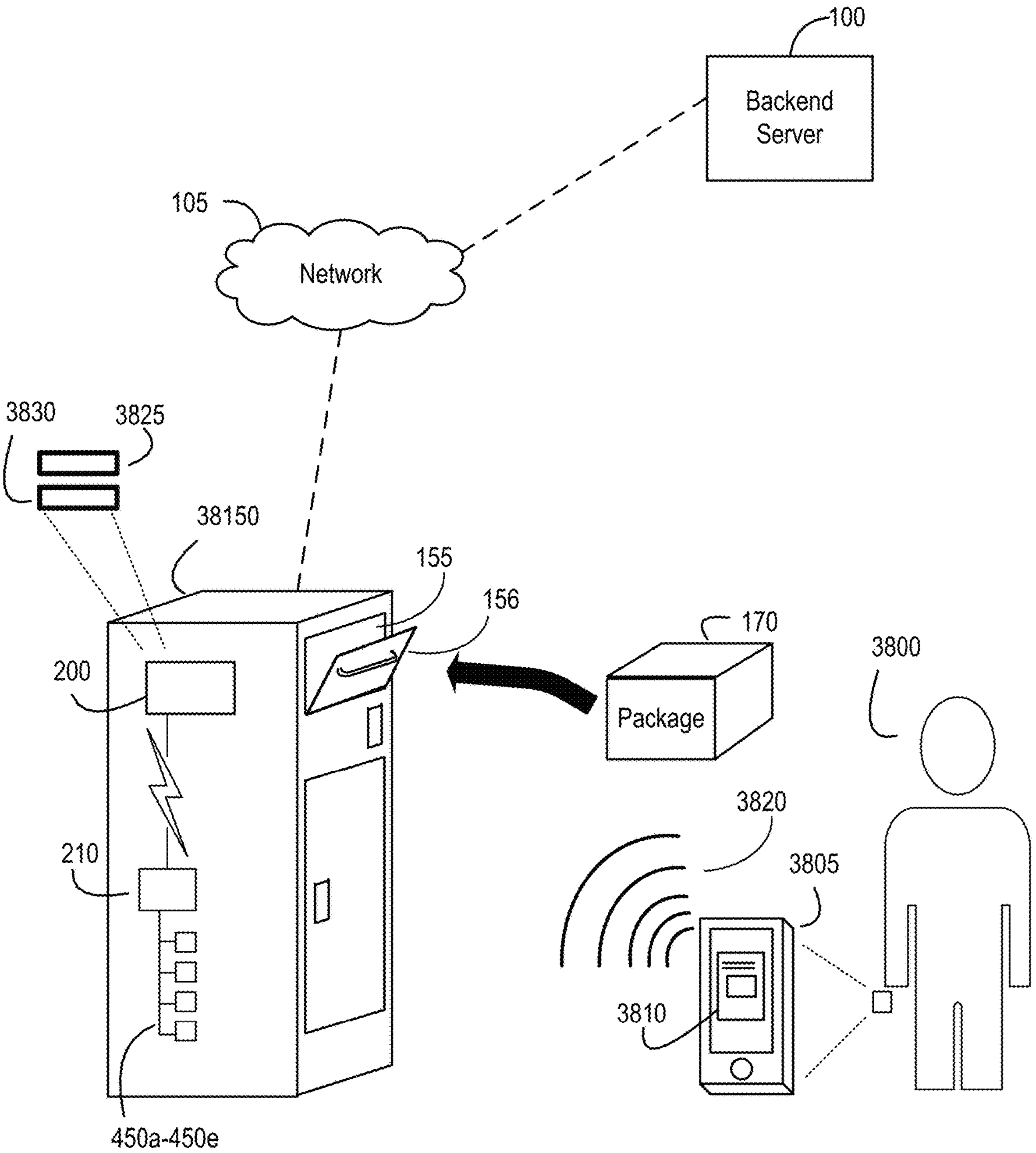
FIGS. 38A-38C are diagrams illustrating an exemplary connected logistics receptacle system with enhanced customer identification related to a delivery item being deposited by a parcel customer in accordance with an embodiment of the invention.
Figure 38B:
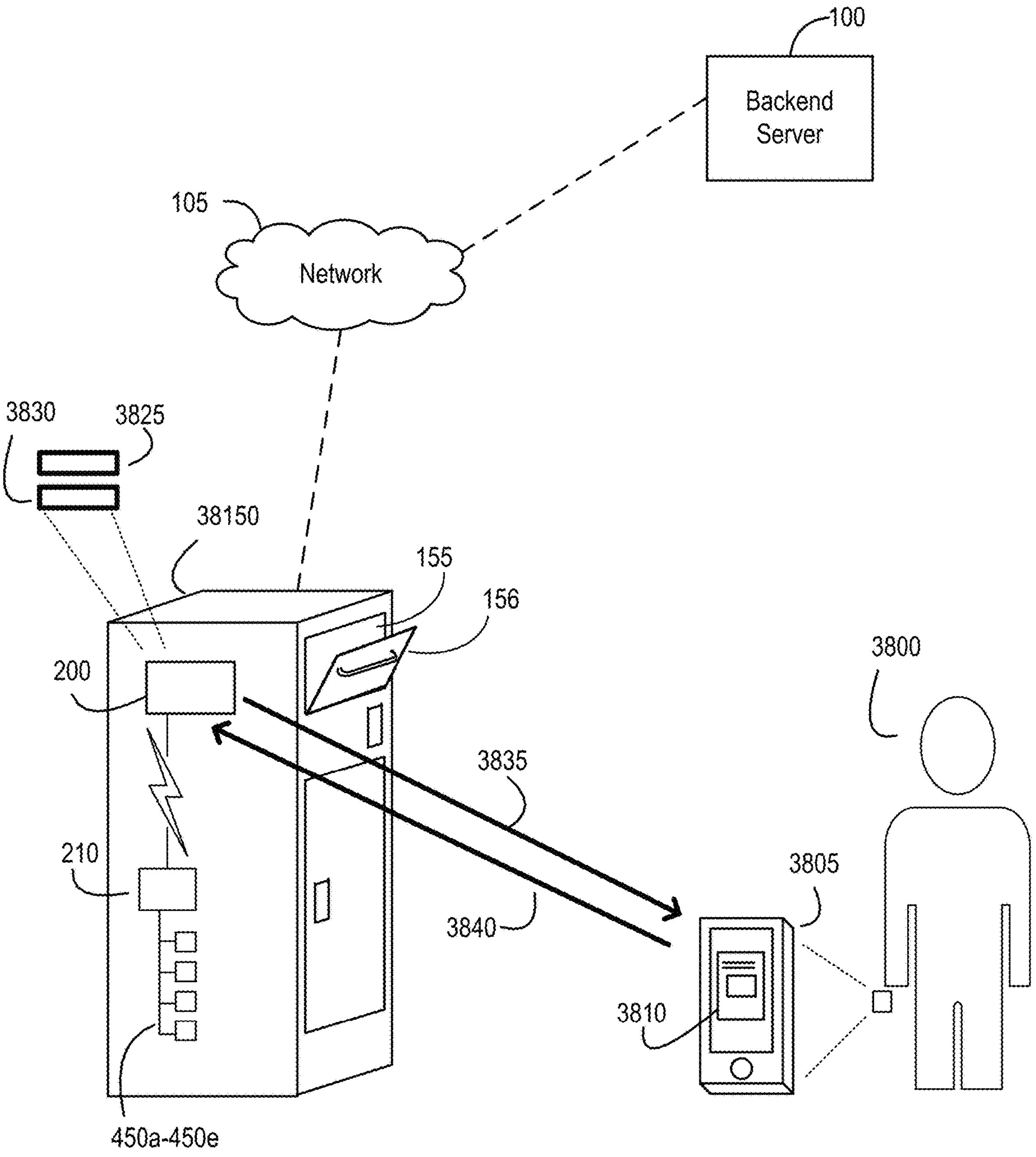
Figure 38C:
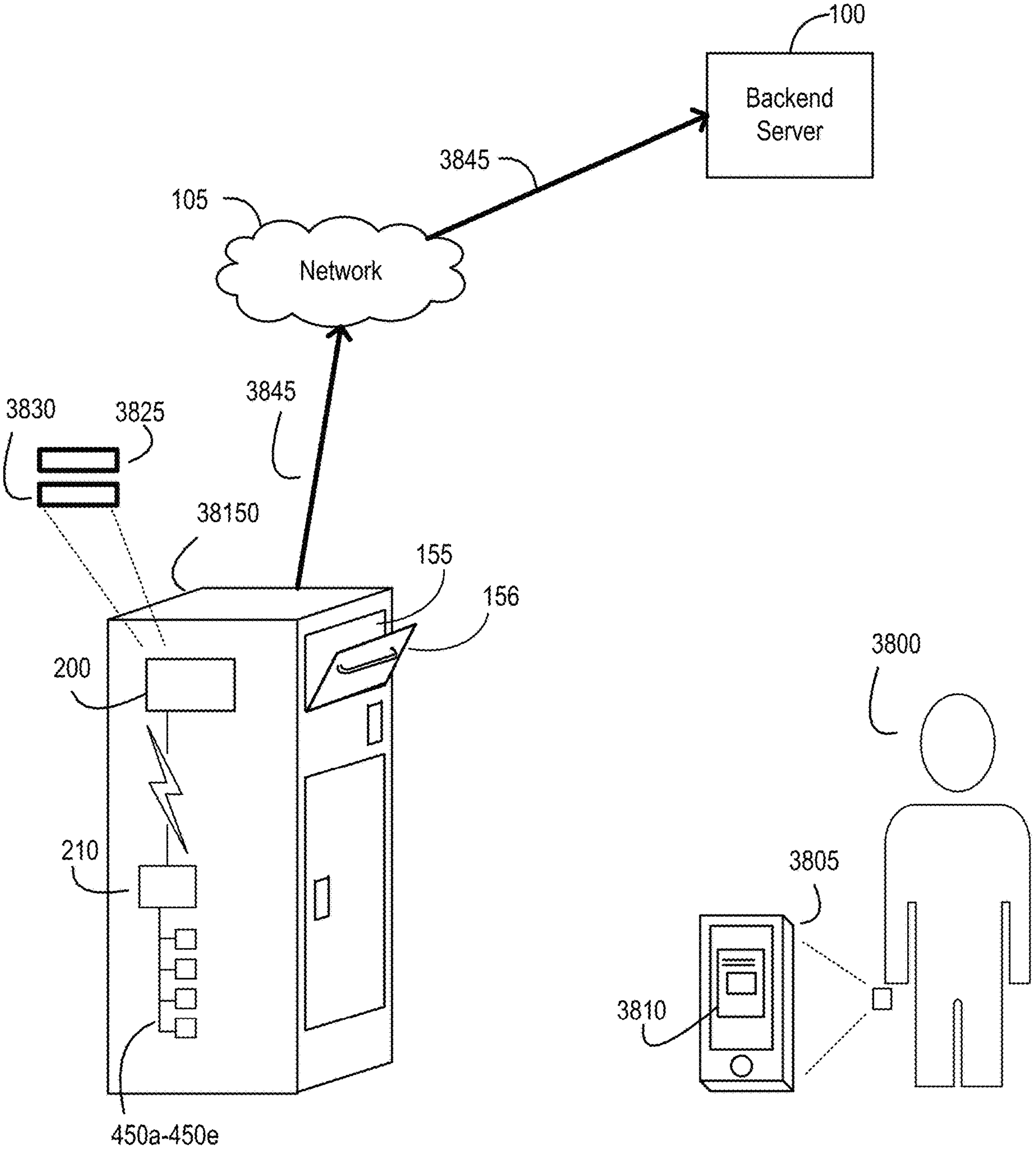

FIGS. 38A-38C are diagrams illustrating an exemplary connected logistics receptacle system with enhanced customer identification related to a delivery item being deposited by a parcel customer in accordance with an embodiment of the invention. Referring now FIG. 38A, exemplary connected logistics receptacle 38150 is shown operative to communicate with backend server 100 and an exemplary parcel customer 3800. Exemplary parcel customer 3800 is shown transporting exemplary package 180 (a type of delivery item) to be deposited within the exemplary connected logistics receptacle 38150. Exemplary parcel customer 3800 is also shown equipped with a mobile handheld communication device 3805 (more generally referred to as a mobile user device). Those skilled in the art will appreciate that as shown in FIG. 38A, exemplary mobile user device 3805 is running an exemplary app that allows mobile user device 3805 to broadcast a wireless communication signal 3820 related to the delivery item (e.g., exemplary package 170) being deposited with exemplary connected logistics receptacle 38150.

Those skilled in the art will appreciate that exemplary device 3805 carried by parcel customer 3800 may, like exemplary devices 1700 and 2630, be implemented as an exemplary processor-based augmented reality device (e.g., an AR headset type of device with communication capabilities) used by parcel customer 3800. Those skilled in the art will appreciate that incorporation of augmented reality as part of device 3805 (like exemplary devices 1700 and 2630 that are implemented with augmented reality functionality) facilitates an enhanced interactive experience that combines real world content (e.g., a view of the surrounding area proximate device 3805) and processor-generated content (e.g., information corresponding to virtual symbols, objects, information, prompted messages, directions, sensory information, and the like overlaid on the real world content) shown in an interwoven manner that advantageously allows the parcel customer 3800 to better perceive both the real world content and the processor-generated content. In general, an exemplary augmented reality enhanced device implementation of device 3805 may include a processor, memory, a display (e.g., a heads up display that may be viewed on the device by the user or a look through display viewed through by the user with real world and processor-generated content appearing on the display), sensors (e.g., GPS sensors, accelerometer, imaging sensors, camera, and the like), a wireless transceiver for communication with other devices, as well as input devices for user input and interactivity (e.g., button, cursor, touchscreen, microphone, and the like). Such an exemplary augmented reality enhanced device implementation of device 3805 may, for example, be implemented as augmented reality glasses that project a digital overlay directly in the parcel customer's field of vision. In general, an exemplary augmented reality enhanced device implementation of device 3805 presents the parcel customer 3800 (as the user) with a combination of digital and physical worlds, facilitates interactions made in near real time with less distraction for the parcel customer 3800, and an accurate 3D identification of virtual and real objects for use by the parcel customer 3800 when engaging in such interactions (e.g., receiving information displayed, recognizing objects (such as an exemplary node-based logistics receptacle), and providing responsive input/feedback based upon the information displayed). Further, such an exemplary processor based augmented reality device implementation of device 3805 may still provide the ability to connect to network 105 and communicate with other devices (which may themselves have augmented reality features), other wireless transceivers associated with logistics assets, and/or connect with and communicate with one or more node-based logistics receptacles via its wireless transceiver. Information presented via exemplary augmented reality enhanced device 3805 may be accompanied, for example, with additional notification enhancements (e.g., sound, colors, highlights, haptic feedback, and the like) that help draw attention to the information as perceived by the parcel customer 3800 operating the exemplary augmented reality enhanced device 3805.

Those skilled in the art will appreciate that exemplary connected logistics receptacle 38150 shown in FIGS. 38A-38C is similarly structured to exemplary connected/node-based logistics receptacle 150_a_, with the exception that exemplary receptacle 38150 includes an embodiment of monitoring and management code for execution by the processor in bridge node 200 (controlling functionality of bridge node 200 in such additional embodiments) and use of exemplary custodial control information 3825 and exemplary pre-authorized identification information 3830 maintained within memory 305/310 of bridge node 200 as part of enhanced customer identification functionality implemented in exemplary connected logistics receptacle 38150. Those skilled in the art will appreciate that backend server 100 may, in some embodiments, transmit updates to the pre-authorized identification information 3830 for use by the exemplary connected logistics receptacle 38150. Those skilled in the art will also appreciate, as explained in more detail below, that bridge node 200 may update the custodial control information 3825 and provide such updated custodial control information to backend server 100.

As such, an exemplary connected logistics receptacle system embodiment with enhanced customer identification is shown in FIGS. 38A-38C that includes exemplary connected logistics receptacle 38150 having a storage receptacle for receiving and maintaining a delivery item (as previously described having monitored storage receptacle components, such as an entrance opening, a temporary storage area 205 and selectively accessible retrieval door 160). The system's exemplary connected logistics receptacle 38150 is also illustrated being equipped with at least exemplary bridge node 200, exemplary wireless accessory sensor nodes 210, 245, lock 165 for door 160 that provides access to within the storage receptacle, and sensors 450*a*-450*e* that are coupled to at least one of the wireless accessory sensor nodes on receptacle 38150. The system's exemplary bridge node 200, consistent with previously descriptions, is mounted to the storage receptacle and includes a bridge node processor 201, a bridge node memory 202 (e.g., volatile memory 310 and non-volatile memory 305), and a wireless communication interface 203. As noted above, the bridge node memory is coupled to the bridge node processor and maintains an embodiment of monitoring and management code capable of enhanced customer identification (e.g., a type of CLR control and management code 315) for execution by the bridge node processor along with at least exemplary custodial control information 3825 and exemplary pre-authorized identification information 3830 that may be used during execution of the monitoring and management code as explained below. The communication interface is coupled to the bridge node processor and is operative to communicate with at least the backend server 100 over a first communication path (e.g., exemplary network 105).

Consistent with the description above, the system embodiment uses at least one exemplary wireless accessory sensor node (e.g., node 210) coupled to a plurality of sensors (e.g., sensors 450*a*-450*e*) where each of the sensors respectively monitors for a change in state of the storage receptacle. Such sensors, as described above, may generate sensor data related to motion of the entrance opening, motion of objects moving through the entrance opening, motion of an object within the temporary storage area, image sensor data related a change of contents maintained within the temporary storage area, weight sensor data related a change in weight of what is stored within the temporary storage area, and the like. The system's exemplary wireless accessory sensor node 210 is operative to detect the change in state of the storage receptacle related to at least one of the monitored storage receptacle components based upon sensor data generated by at least one sensor and broadcast an updated advertising signal in response to the detected change in state of the storage receptacle.

The bridge node processor within the system's exemplary bridge node 200, when executing the monitoring and management code maintained on the bridge node memory, is operative to detect the updated advertising signal from the wireless accessory sensor node over the communication interface and then detect a wireless communication signal broadcast from a mobile user device associated with the parcel customer (e.g., detecting exemplary wireless signal 3820 being broadcast by device 3805 running app 3810 and used by parcel customer 3800). Those skilled in the art will appreciate that device 3805 may be implemented, for example, as an AR headset type of device used by parcel customer 3800 where information shown via app 810 appears in the field of view of the AR headset as part of processor-generated content overlaid on real world content viewed through the AR headset version of device 3805.

Referring now to FIG. 38B, the bridge node processor within the system's exemplary bridge node 200, when executing the monitoring and management code maintained on the bridge node memory, is shown operative to transmit a validation message 3835 over the bridge node's communication interface to the mobile user device 3805 associated with the parcel customer 3800 in response to the detected wireless communication signal 3820 and the detected updated advertising signal from the wireless accessory sensor node (e.g., node 210). The mobile user device 3805 used by parcel customer 3800 receives the validation message 3835 and, through the app 3810 running on the device 3805, is able to respond with a validation confirmation message 3840 transmitted back to the system's exemplary bridge node 200, which receives the validation confirmation message 3840 over the bridge node's communication interface. Referring now to FIG. 38C, the bridge node processor within the system's exemplary bridge node 200, when executing the monitoring and management code maintained on the bridge node memory, is then operative to transmit, using the communication interface, event information 3845 to the backend server 100 when the validation confirmation message 3840 authenticates the parcel customer 3800 (where the transmitted event information includes at least information reflecting the detected change in state of the storage receptacle).

More specifically, a further system embodiment may use exemplary authorization data provided as part of the broadcast wireless communication signal 3820 to help the system recognize the parcel customer as being an authorized customer (e.g., via the customer's mobile user device 3805 being an authorized device associated with an authorized customer). For example, the system's bridge node processor may be operative to detect the wireless communication signal broadcast by being operative to receive the wireless communication signal 3820 broadcast from the mobile user device 3805 associated with the parcel customer 3800 over the communication interface of the system's bridge node 200; and recognize the mobile user device 3805 as an authorized mobile user device based upon authorization data within the wireless communication signal 3820. In a more detailed example embodiment, the system's bridge node processor may be operative to recognize the mobile user device as the authorized mobile user device by being operative to identify the authorization data within the wireless communication signal 3820, compare the authorization data to information on a plurality of pre-authorized mobile user devices (e.g., information maintained in exemplary pre-authorized identification information 3830); and recognize the mobile user device 3805 as being an authorized mobile user device based upon the results of comparing that authorization data to the information on the pre-authorized mobile user devices.

In a further embodiment, the exemplary validation message 3835 may request different kinds of information from the parcel customer 3800. For example, the validation message 3835 may request confirmation that the parcel customer 3800 has deposited the delivery item in the storage receptacle and/or request authentication information from the parcel customer 3800 related to the delivery item. In more detail, such requested authentication information may, for example, include shipping information related to the delivery item (e.g., a tracking number for the delivery item, address information related to the delivery item, recipient information related to the delivery item, and the like) and/or information identifies the delivery item (e.g., contents description, weight information, and the like) and/or information identifies the parcel customer 3800 (e.g., name of the parcel customer, contact information for the parcel customer, entity associated with the parcel customer, and the like).

Likewise, further embodiments may have the exemplary validation confirmation message 3840 including different information. For example, the validation confirmation message 3840 may include authentication information from the parcel customer 3800 related to the delivery item. Examples of such authentication information (similar to that noted above as being requested) may include shipping information related to the delivery item, information identifies the delivery item, and/or information identifies the parcel customer.

In some system embodiments, custodial control information may be used (e.g., exemplary custodial control information 3825) and updated as part of operations of the system. For example, the system's bridge node processor, when executing the monitoring and management code maintained on the bridge node memory, may be further operative to update custodial control information 3825 maintained within the bridge node memory related to custody of the delivery item when the validation confirmation message 3840 authenticates the parcel customer 3800 (e.g., when the parcel customer's mobile user device 3805 is determined to be pre-authorized or associated with an authorized customer of the node-based connected logistics receptacle 38150). In such an example, the event information transmitted to the backend server 100 may also include the updated custodial control information related to the delivery item as a way of updating the server 100 so that the server 100 may track custodial control and responsibility for a given delivery item.

In a further system embodiment, the event information sent back to server 100 may initiate a dispatched logistics operation (e.g., pickup) related to the storage receptacle (e.g., receptacle 38150). In more detail, the bridge node processor, when executing the monitoring and management code maintained on the bridge node memory, may be operative to transmit the event information to the backend server 100 by being operative to transmit, using the communication interface of the system's bridge node 200, the event information to the backend server 100 when the validation confirmation message 3840 authenticates the parcel customer 3800, which then causes the backend server 100 to initiate a dispatched logistics operation related to the storage receptacle. Such event information may also, for example, include at least timing information related to the detected change in state of the storage receptacle and/or an identification of the delivery item and/or updated custodial control information related to the delivery item.

And in yet another system embodiment, the system's wireless accessory sensor node may more specifically be operative to detect the change in state of the storage receptacle based upon the sensor data generated by at least one of the sensors; record timestamped information reflecting the detected change in state of the storage receptacle; and then broadcast the updated advertising signal having a data available flag set within the updated advertising signal. Such a data available flag indicates the system's wireless accessory sensor node has the event information available for upload by the bridge node and the event information includes at least the timestamped information reflecting the detected change in state of the storage receptacle.

Figure 39A:
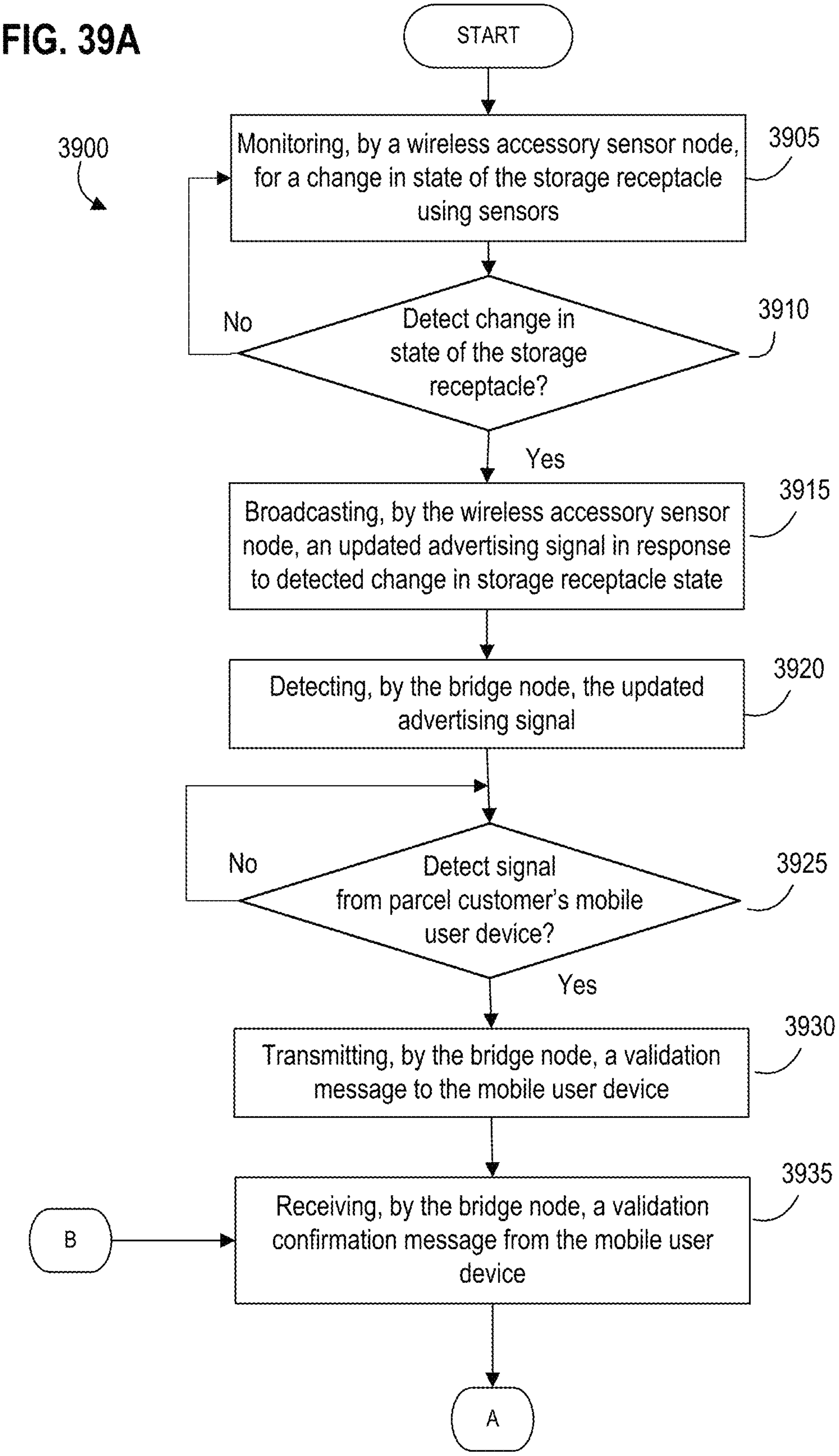
FIGS. 39A-39B collectively are a flow diagram illustrating an exemplary method enhanced customer identification related to a delivery item being deposited with a node-based logistics receptacle in accordance with an embodiment of the invention.
Figure 39B:
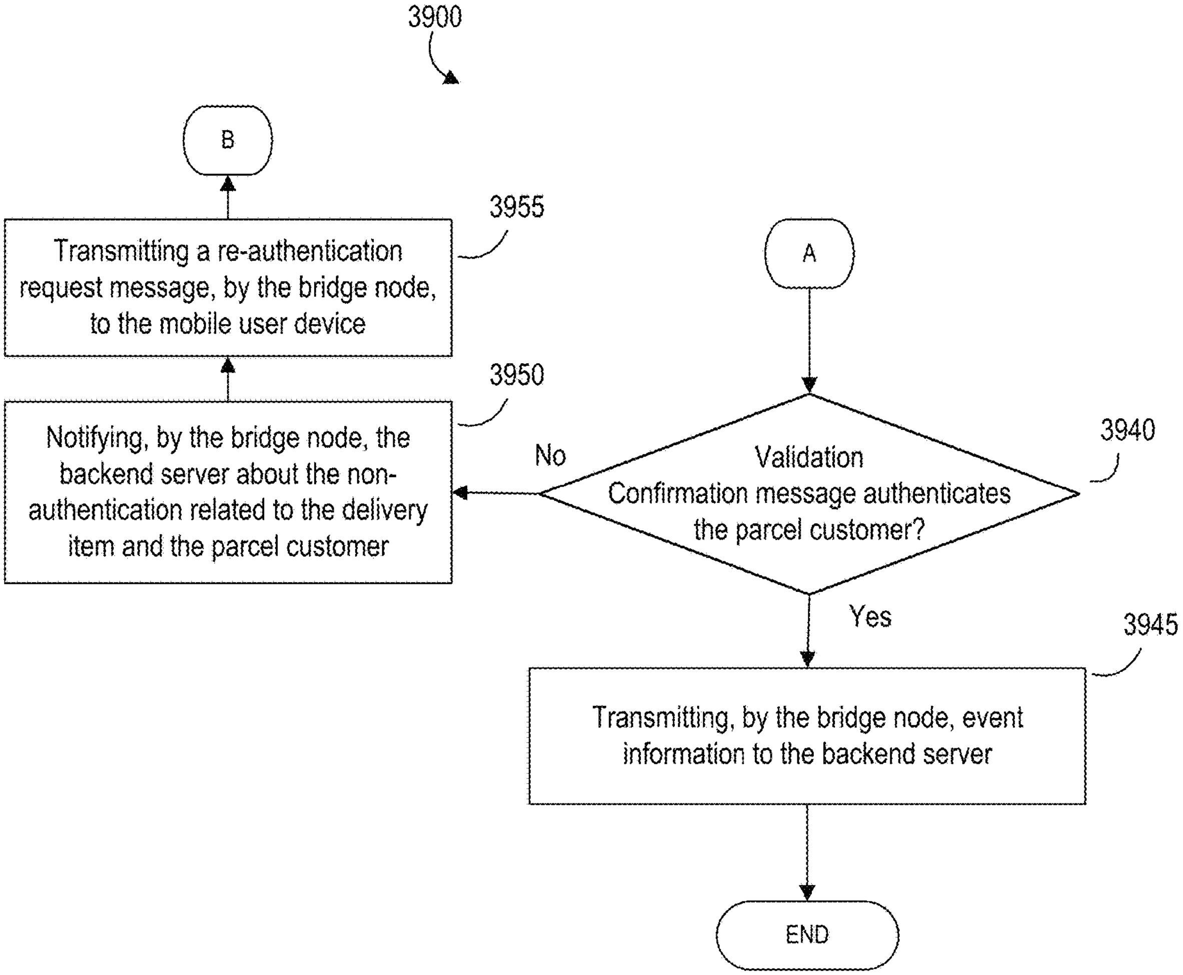

In light of such a system embodiment illustrated in FIGS. 38A-38C and described above, those skilled in the art will appreciate that another related embodiment involves a method for enhanced customer identification related to a delivery item being deposited with a node-based logistics receptacle implemented by the above-described system components. FIGS. 39A-39B collectively are a flow diagram illustrating an exemplary method 3900 for enhanced customer identification related to a delivery item being deposited with a node-based logistics receptacle in accordance with an embodiment of the invention. In such an exemplary method 3900, the node-based logistics receptacle used may be implemented with exemplary node-based logistics receptacle 38150, which has multiple monitored storage receptacle components (including at least an entrance opening 155 for receiving one or more shipping items, a temporary storage area 205 for temporarily maintaining the one or more shipping items once received, and a retrieval door 160 providing selective access to the one or more shipping items within the temporary storage area). The node-based logistics receptacle used in implementing exemplary method 3900 further has a wireless accessory sensor node coupled to multiple sensors (e.g., exemplary wireless accessory sensor node 210) disposed on the node-based logistics receptacle and a receptacle bridge node (e.g., exemplary bridge node 200) disposed on the node-based logistics receptacle operative to communicate with a backend server (e.g., exemplary backend server 100).

Referring now to FIG. 39A, exemplary method 3900 begins at step 3905 with the wireless accessory sensor node monitoring for a change in state of the storage receptacle using the sensors. At step 3910, method 3900 proceeds with the wireless accessory sensor node detecting the change in state of the storage receptacle based upon sensor data generated by at least one of the sensors. If a change is detected, step 3910 proceeds to step 3915. If a change is not yet detected, then method 3900 proceeds back to step 3905 for continued monitoring for a sensor-based change in state of the storage receptacle. In more detail, an embodiment of method 3900 may implement step 3910 based upon sensor data generated by one of the sensors monitoring the entrance opening (e.g., a sensor generating motion sensor data related to motion of the entrance opening, motion sensor data related to motion of an object through the entrance opening, and the like). Another embodiment of step 3910 may have the step of detecting the change in state of the storage receptacle being based upon sensor data generated by another of the sensors monitoring the temporary storage area (e.g., a sensor generating sensor data such as motion sensor data related to motion of an object within the temporary storage area, image sensor data related a change of contents maintained within the temporary storage area, weight sensor data related a change in weight of what is stored within the temporary storage area, and the like). Those skilled in the art will further appreciate that such sensor data used to detect the sensor-based change in step 3910 may also be from a combination of sensors monitoring the same or different monitored storage receptacle components.

At step 3915, method 3900 proceeds with the wireless accessory sensor node broadcasting an updated advertising signal in response to the detected change in state of the storage receptacle. At step 3920, method 3900 proceeds with detecting, by the bridge node, the updated advertising signal from the wireless accessory sensor node.

At step 3925, method 3900 proceeds with the bridge node detecting a wireless communication signal broadcast from a mobile user device associated with the parcel customer (e.g., exemplary signal 3820 being transmitted from mobile device 3805 used by parcel customer 3800). If such a wireless communication signal is detected, step 3925 proceeds to step 3930. However, if such a wireless communication signal is not yet detected, then method 3900 remains in step 3925 to continue trying to detect such a wireless communication signal broadcast from a mobile user device associated with the parcel customer. A further embodiment of method 3900 may implement step 3925 with the bridge node receiving the wireless communication signal broadcast from the mobile user device associated with the parcel customer and recognizing the mobile user device as an authorized mobile user device based upon authorization data within the wireless communication signal. In more detail, recognizing the mobile user device as the authorized mobile user device may, for example, have the bridge node first identifying the authorization data within the wireless communication signal, comparing the authorization data to information on pre-authorized mobile user devices that are authorized to interact with logistics receptacle 38150 (e.g., information stored in exemplary pre-authorized identification information 3830, which may be updated by backend server 100), and then recognizing the mobile user device as the authorized mobile user device based upon the results of comparing the authorization data to the information on the pre-authorized mobile user devices.

At step 3930, method 3900 proceeds with the bridge node transmitting a validation message (e.g., exemplary validation message 3835) to the mobile user device associated with the parcel customer in response to the detected wireless communication signal and the detected updated advertising signal. For example, an exemplary validation message may request confirmation that the parcel customer has deposited the delivery item in the storage receptacle. In another example, an exemplary validation message may request authentication information from the parcel customer related to the delivery item (e.g., authentication information that includes shipping information related to the delivery item, authentication information that identifies the delivery item, and/or authentication information that identifies the parcel customer).

At step 3935, method 3900 proceeds with the bridge node receiving a validation confirmation message (e.g., exemplary validation confirmation message 3840) from the mobile user device associated with the parcel customer. For example, an exemplary validation confirmation message may provide requested authentication information from the parcel customer related to the delivery item (such as shipping information related to the delivery item, information that identifies the delivery item, and/or information that identifies the parcel customer).

After step 3935, method 3900 proceeds through Transition A (shown at the bottom of FIG. 39A) to step 3940 on FIG. 39B, where method 3900 continues with the bridge node determining whether the validation confirmation message authenticates the parcel customer. If the validation confirmation message authenticates the parcel customer, step 3940 proceeds to step 3945. However, if the validation confirmation message does not authenticate the parcel customer (e.g., indicating the mobile user device 3805 or parcel customer 3800 is not authorized to use or otherwise interact with exemplary logistics receptacle 38150), then method 3900 proceeds to step 3950.

At step 3945, method 3900 proceeds with the bridge node transmitting event information to the backend server when the validation confirmation message authenticates the parcel customer. Such event information includes at least information reflecting the detected change in state of the storage receptacle.

At step 3950 where the validation confirmation message did not authenticate the customer (e.g., the parcel customer 3800 or the mobile user device 3805 associated with the parcel customer 3800), an embodiment of method 3900 may have the bridge node notifying the backend server about the non-authentication related to the delivery item and parcel customer. The backend server 100 may track such non-authenticated attempts to use the particular logistics receptacle 38150 and may take further action based upon the notification (e.g., update the pre-authorized identification information 3830, contact the parcel customer 3800 via messaging to relay alternative logistics receptacle information where the parcel customer 3800 may be authenticated & authorized to use, and the like). This also may have the advantage of early awareness of an unauthorized deposit in exemplary logistics receptacle 38150 and the ability to take corrective action (as a type of further action based on the notification) on the part of the server. Such corrective action, for example, may have the backend server responsively initiating a corrective logistics operation where a logistics asset is dispatched with particularity to retrieve a specific delivery item deposited in that node-based logistics receptacle 38150 where such a deposit was proactively detected, determined to be unauthorized (e.g., performed by a non-authenticated customer), and notification of such an unauthorized deposit was reported to the server 100 by the bridge node 100 in the node-based logistics receptacle 38150.

At step 3955, an embodiment of method 3900 may have the bridge node transmitting a re-authentication request message to the mobile user device and returning, through Transition B, to step 3935 on FIG. 39A where the bridge node can receive another validation confirmation message (e.g., an attempt to correct information previously provided by the mobile user device 8305 and another attempt to authenticate the mobile user device and/or the parcel customer).

Further embodiments of method 3900 may also have the bridge node accessing and updating custodial control information (e.g., exemplary custodial control information 3825). For example, an embodiment of method 3900 may include a further step of updating, by the bridge node, custodial control information maintained within the bridge node related to custody of the delivery item when the validation confirmation message authenticates the parcel customer. In such an example, the event information transmitted to the backend server in step 3945 may also include updated custodial control information related to the delivery item.

Those skilled in the art will also appreciate that event information transmitted to the backend server as part of step 3945 when the validation confirmation message authenticates the parcel customer may cause the backend server to initiate a dispatched logistics operation related to the storage receptacle (e.g., a pickup operation where the server dispatches a logistics asset to the location of exemplary node-based logistics receptacle 38150). Such event information may include timing information related to the detected change in state of the storage receptacle, an identification of the delivery item, and/or an updated custodial control information related to the delivery item.

Enhanced Status Indication Functionality for a Node-Based Logistics Receptacle

Further embodiments of an exemplary connected node-based logistics receptacle have enhanced status indication functionality. Such embodiments deploy different types of exemplary status update notifications to reflect a status of the particular exemplary connected node-based logistics receptacle (e.g., its operational status and ability to effectively accept a delivery item that may be efficiently serviced during a logistics operation).

Figure 40:
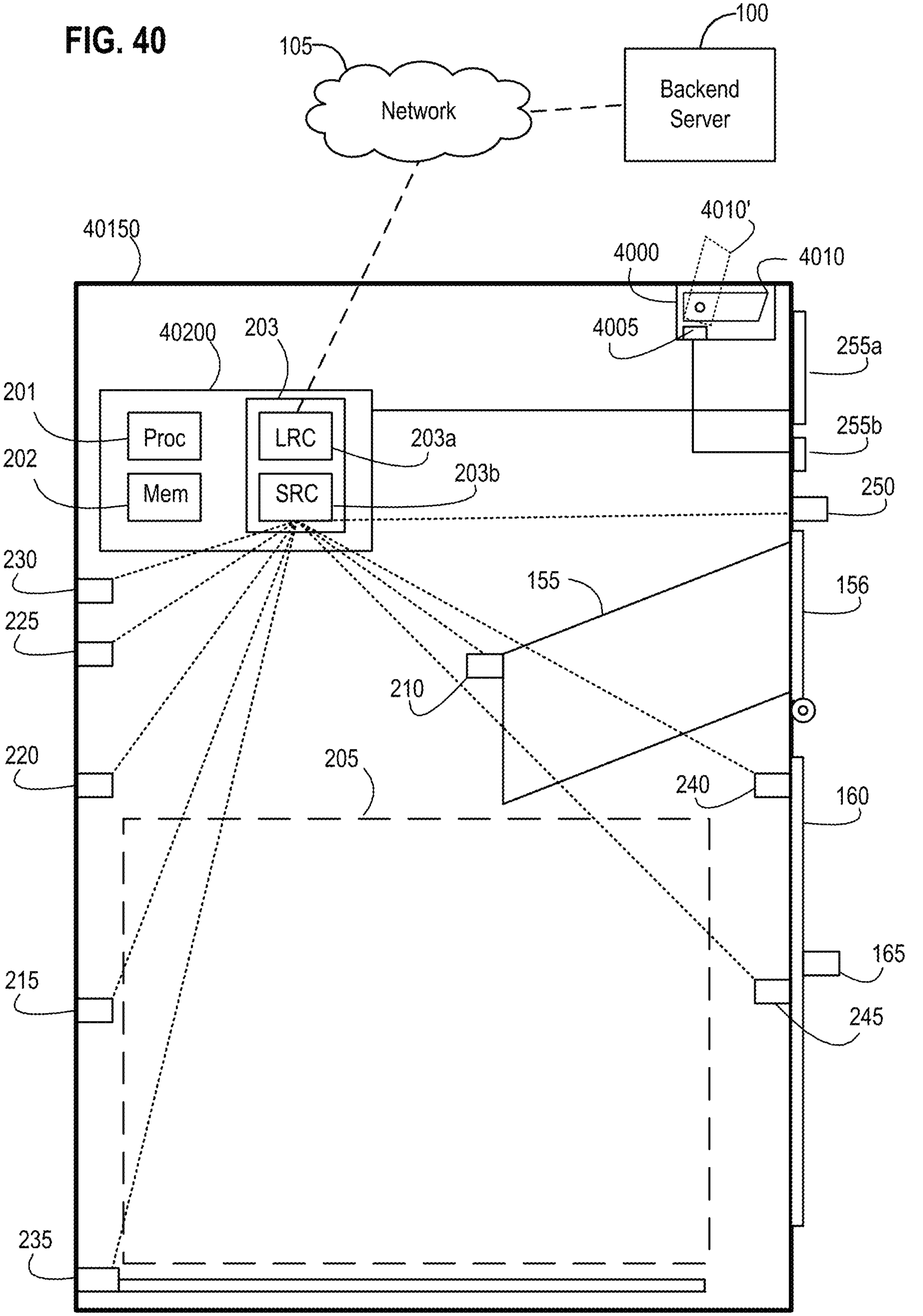
FIG. 40 is a diagram illustrating an exemplary enhanced connected logistics receptacle having enhanced status indication functionality related to a logistics operation for a delivery item being deposited by a parcel customer in accordance with an embodiment of the invention.

FIG. 40 is a diagram illustrating an exemplary enhanced connected logistics receptacle having enhanced status indication functionality related to a logistics operation for a delivery item being deposited by a parcel customer in accordance with an embodiment of the invention. Referring now to FIG. 40, exemplary connected logistics receptacle 40150 is shown operative to communicate with backend server 100 with components similar to exemplary logistics receptacle 150 described relative to FIG. 2. Those skilled in the art will appreciate that exemplary connected logistics receptacle 40150 shown in FIGS. 40 and 42A-42D is similarly structured to exemplary connected/node-based logistics receptacle 150 and 150*a*, with the exception that exemplary receptacle 40150 is equipped with an exemplary bridge node 40200 (shown in more detail in FIG. 41) that uses further types of data (e.g., a status indicator setting profile 4115, customer registry file 4120, and a history of prior event information 4125) and equipped with different types of status indicators. As such, exemplary receptacle 40150 includes an embodiment of monitoring and management code for execution by the processor in bridge node 40200 (controlling functionality of bridge node 40200 in such additional embodiments) and use of such data (e.g., status indicator setting profile 4115, customer registry file 4120, and a history of prior event information 4125) maintained within memory 305/310 of bridge node 40200 as part of enhanced status indication functionality implemented in exemplary connected logistics receptacle 40150. Those skilled in the art will appreciate that backend server 100 may, in some embodiments, transmit updates to the status indicator setting profile 4115 and/or customer registry file 4120 (and prior event information 4125 in some cases) for use by the exemplary connected logistics receptacle 40150. Those skilled in the art will also appreciate, as explained in more detail below, that bridge node 40200 may update the prior event information 4125 based upon its own detection and retrieval of event information.

As shown in FIG. 2, exemplary logistics receptacle 150 includes externally disposed user interface 255, which may have one or more display, keys, status lights, touchscreens, buttons, switches, and/or speaker for interacting with a shipping customer and/or logistics personnel. Consistent with this and as shown in FIG. 40, exemplary connected logistics receptacle 40150 is shown including exemplary display-based user interface 255*a* and exemplary externally exposed status light 255*a* as examples of types of a status indicator disposed on the logistics receptacle 40150. Exemplary connected logistics receptacle 40150 is also shown including an exemplary electronically actuated physical indicator 4000 as a type of status indicator. Those skilled in the art will appreciate that exemplary electronically actuated physical indicator 4000 is disposed on the storage receptacle and operable to be actuated between a first position (corresponding to a first condition for receptacle 40150) to a second position (corresponding to the second condition for receptacle 40150). For example, the electronically actuated physical indicator 4000 may be implemented with an actuator 4005 that changes the position of a deployable indicator 4010 from a recessed position to an elevated or deployed position 4010'. Such a deployable indicator 4010 may, for example, be implemented with a flag, board, colored object, or other physical symbol that is representative of a particular operational state of the receptacle 40150 (e.g., accepting or no longer accepting any more parcels) and actuatable to different positions. In another example, the electronically actuated physical indicator 4000 may be implemented with an electronically illuminated message visibly shown on another display-based user interface disposed on the storage device (e.g., on a display such as display 255*a* that may be actuated to a different and more visible position so as to attract the attention of a parcel customer attempting to use receptacle 40150).

Figure 41:
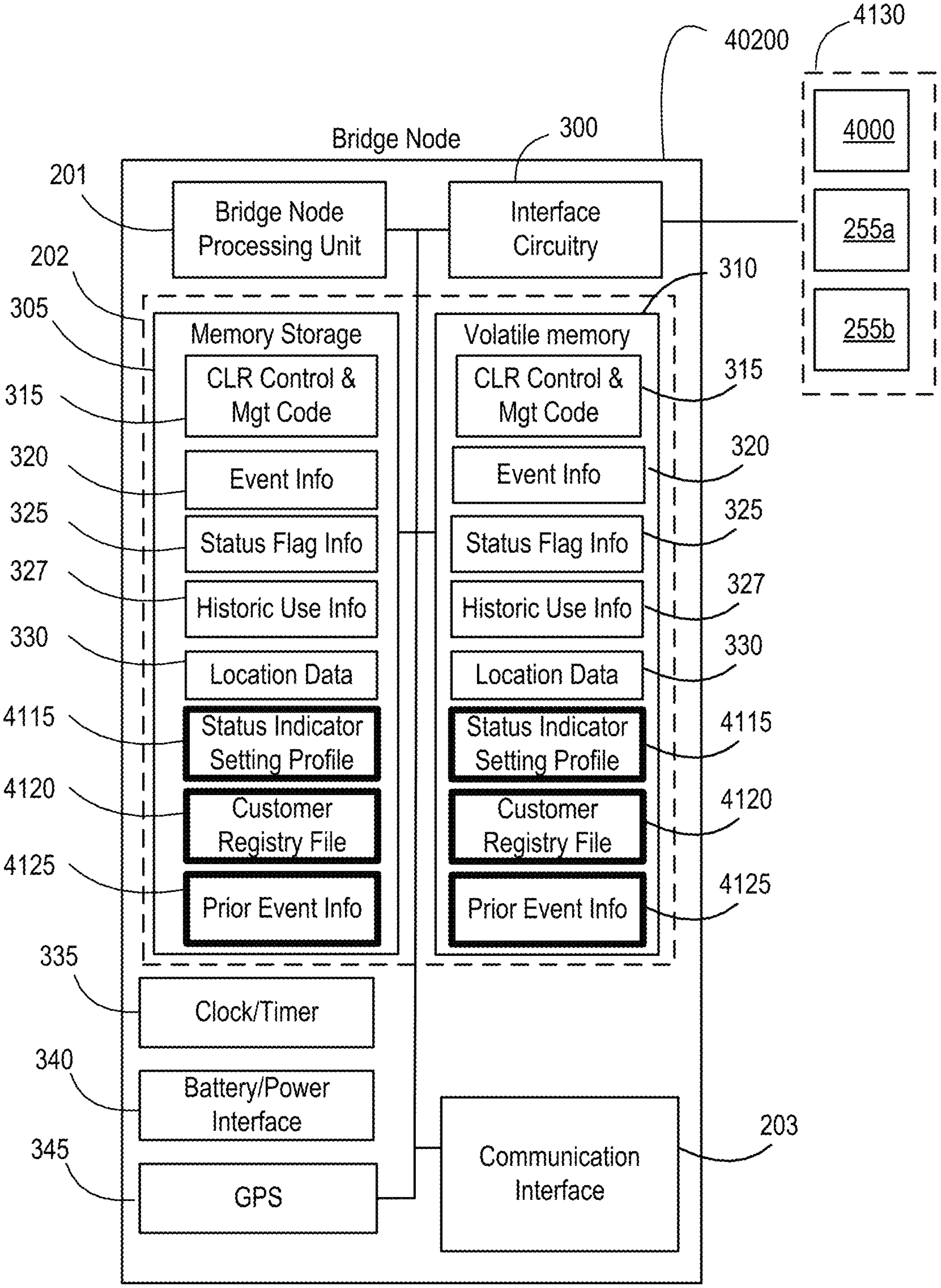
FIG. 41 is a detailed diagram of an exemplary bridge node used within the exemplary enhanced connected logistics receptacle having enhanced status indication functionality of FIG. 40 in accordance with an embodiment of the invention.

In more detail, FIG. 41 is a detailed diagram of exemplary bridge node 40200 used within the exemplary enhanced connected logistics receptacle 40150 having enhanced status indication functionality (via exemplary status indicators 4130) in accordance with an embodiment of the invention. Referring now to FIG. 41, exemplary bridge node 40200 is illustrated with components (e.g., hardware and software elements) similar to that explained with respect to exemplary bridge node 200 (FIG. 3), but exemplary bridge node 40200 is expressly shown having status indicator setting profile 4115, customer registry file 4120, and prior event information 4125 as additional data used in the operation of the bridge node 40200 as explained in more detail below. Exemplary status indicators 4130 (e.g., actuated physical indicator 4000, user interface display 255*a*, light(s) 255*b*) are coupled to the bridge node processor 201 of bridge node 40200 through interface circuitry 300.

As such, an exemplary connected logistics receptacle system embodiment with enhanced status indication as shown in FIGS. 40 and 42A-42D includes exemplary connected logistics receptacle 40150 having a storage receptacle for receiving and maintaining a delivery item (as previously described having monitored storage receptacle components, such as an entrance opening, a temporary storage area 205 and selectively accessible retrieval door 160). The system's exemplary connected logistics receptacle 40150 is equipped with at least exemplary bridge node 40200, exemplary wireless accessory sensor nodes (such as node 210), and sensors 450*a*-450*e* that are coupled to at least one of the wireless accessory sensor nodes on receptacle 40150. The system's exemplary bridge node 40200, consistent with previously descriptions, is mounted to the storage receptacle and includes a bridge node processor 201, a bridge node memory 202 (e.g., volatile memory 310 and non-volatile memory 305), and a wireless communication interface 203. As noted above and shown in FIG. 41, the bridge node memory is coupled to the bridge node processor and maintains an embodiment of monitoring and management code capable of enhanced status indication (e.g., a type of CLR control and management code 315) for execution by the bridge node processor along with at least exemplary status indicator setting profile 4115, customer registry file 4120, and prior event information 4125 that may be used during execution of the monitoring and management code as explained below. The communication interface is coupled to the bridge node processor and is operative to communicate with at least the backend server 100 over a first communication path (e.g., exemplary network 105).

Consistent with the description above, the system embodiment uses at least one exemplary wireless accessory sensor node (e.g., node 210) coupled to a plurality of sensors (e.g., sensors 450*a*-450*e*) where each of the sensors respectively monitors for a change in state of the storage receptacle. Such sensors, as described above, may generate sensor data related to motion of the entrance opening, motion of objects moving through the entrance opening, motion of an object within the temporary storage area, image sensor data related a change of contents maintained within the temporary storage area, weight sensor data related a change in weight of what is stored within the temporary storage area, and the like. The system's exemplary wireless accessory sensor node 210 is operative to detect the change in state of the storage receptacle related to at least one of the monitored storage receptacle components based upon sensor data generated by at least one sensor and broadcast an updated advertising signal in response to the detected change in state of the storage receptacle. The updated advertising signal indicates event information is available for upload by bridge node 40200, where the event information is related to the detected change in state of the storage receptacle.

The bridge node processor within the system's exemplary bridge node 40200, when executing the monitoring and management code maintained on the bridge node memory, is operative to detect the updated advertising signal broadcast by the wireless accessory sensor node, retrieve the event information from the wireless accessory sensor node in response to detecting the updated advertising signal, and toggle the status indicator from the first condition (e.g., a condition related to a first operational state of the storage receptacle indicating the storage receptacle remains operative to accept an additional delivery item) to the second condition (e.g., another condition related to a second operational state of the storage receptacle indicating the storage receptacle is at least temporarily unable to accept an additional delivery item) based upon a comparison of the event information to the status indicator setting profile (e.g., data within profile 4115).

In more detail, the event information in such a system embodiment may reflect or otherwise indicate a pickup event. For example, the event information may be or include timing information on the detected change in state of the storage receptacle and a type of the detected change in state of the storage receptacle (e.g., a state of a selectively accessible retrieval door providing access to within the storage receptacle) where the event information corresponds to a pickup event for the storage receptacle.

Additional detailed system embodiments may compare the event information and data within the status indicator setting profile with more specificity. For example, the system's bridge node processor, when executing the monitoring and management code maintained on the bridge node memory, may be operative to toggle the status indicator by being further operative to toggle the status indicator from the first condition to the second condition may be implemented programmatically to occur when the comparison reflects timing information on the detected change in state of the storage receptacle as indicated in the event information is within a time threshold as defined by the status indicator setting profile. In another example, toggling the the status indicator from the first condition to the second condition may be implemented programmatically to occur when the comparison reflects (a) a contents threshold has been detected as the detected change in state of the storage receptacle indicated in the event information and (b) a time threshold defined by the status indicator setting profile has been reached. In still another example, toggling the status indicator from the first condition to the second condition may be implemented programmatically to occur when the comparison reflects a contents threshold defined by the status indicator setting profile has been reached as the detected change in state of the storage receptacle indicated in the event information. In yet another example, toggling the status indicator from the first condition to the second condition may be implemented programmatically to occur when the comparison reflects (a) a pickup event corresponds to the detected change in state of the storage receptacle as indicated in the event information and (b) a time threshold defined by the status indicator setting profile has been reached. And in still another example, toggling the status indicator from the first condition to the second condition may be implemented programmatically to occur when the comparison reflects a time threshold defined by the status indicator setting profile has been reached.

Further embodiments may adjust the status indicator setting profile 4115 as maintained within the system's bridge node 40200. In other words, the bridge node processor, when executing the monitoring and management code maintained on the bridge node memory, may be further operative to adjust the status indicator setting profile 4115. For example, the bridge node processor, when executing the monitoring and management code maintained on the bridge node memory, may be operative to adjust the status indicator setting profile 4115 by being operative to receive a remote adjustment message from the backend server 100 (where the remote adjustment message indicates an alteration to the contents of the status indicator setting profile 4115) and adjust the status indicator setting profile 4115 according to the remote adjustment message.

In another example, the bridge node processor, when executing the monitoring and management code maintained on the bridge node memory, may be further operative to transmit the event information to the backend server 100 to update the backend server 100 related to the storage receptacle. Thereafter, the bridge node processor may adjust the status indicator profile 4115 by being operative to receive a remote adjustment message from the backend server 100 in response to the transmitted event information (where the remote adjustment message indicates an alteration to the contents of the status indicator setting profile 4115), and adjust the status indicator setting profile 4115 according to the remote adjustment message.

In still another example, the bridge node processor, when executing the monitoring and management code maintained on the bridge node memory, may be operative to adjust the status indicator setting profile by being operative to generate an update of the status indicator setting profile based at least upon the event information; and adjust the status indicator setting profile according to the update of the status indicator setting profile. In a similar example, the bridge node processor may be operative to generate the update of the status indicator setting profile based at least upon the event information and a history of prior event information maintained on the bridge node memory (e.g., data stored in exemplary prior event information 4125).

FIGS. 42A-42D are diagrams illustrating different examples of how the exemplary enhanced connected logistics receptacle 40150 having enhanced status indication functionality of FIG. 40 may generate and transmit an exemplary status update notification to different types of external devices in accordance with an embodiment of the invention. In FIGS. 42A-42D, exemplary external devices are shown that may receive such status update notifications and include, for example, a laptop 4200, a desktop computer or terminal 4205, a mobile handheld communication device

3805*a* (e.g., smartphone, tablet, augmented reality (AR) headset type of interactive communication device, or the like) operated by a parcel customer 3800*a*, mobile handheld communication device 2630 (e.g., smartphone, tablet, augmented reality headset device, or the like) that is used by courier personnel 2615 operated as a type of mobile wireless transceiver associated with mobile logistics asset 700*a* (e.g., using delivery vehicle 2602), and exemplary mobile transceiver 2600 as a type of vehicle-based wireless transceiver associated with the mobile logistics asset 700*a* associated with delivery vehicle 2602. Those skilled in the art will appreciate that such devices 3805*a* (similar to exemplary device 3805) and 2630 may be implemented with augmented reality enhanced functionality similar to that described above. Those skilled in the art will also appreciate that such examples of an external device that may, according to embodiments, receive status update notifications to report a change of the status indicator and/or take the place of the physical implementation of a status indicator change on the receptacle 40150 as a mechanism for enhanced status indication.

Figure 42A:
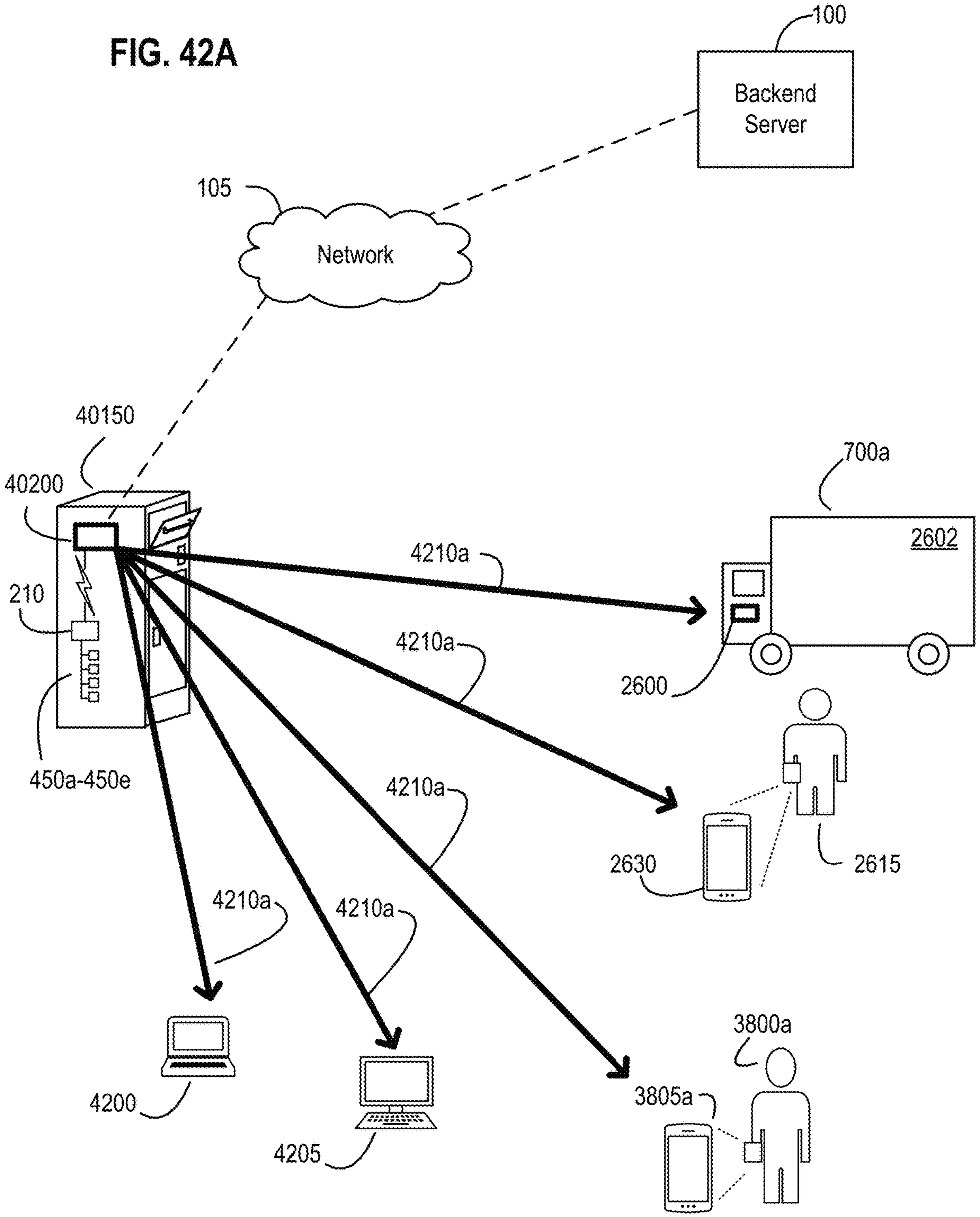
FIGS. 42A-42D are diagrams illustrating different examples of how the exemplary enhanced connected logistics receptacle having enhanced status indication functionality of FIG. 40 may generate and transmit exemplary status update notification to different types of external devices in accordance with an embodiment of the invention.
Figure 42B:
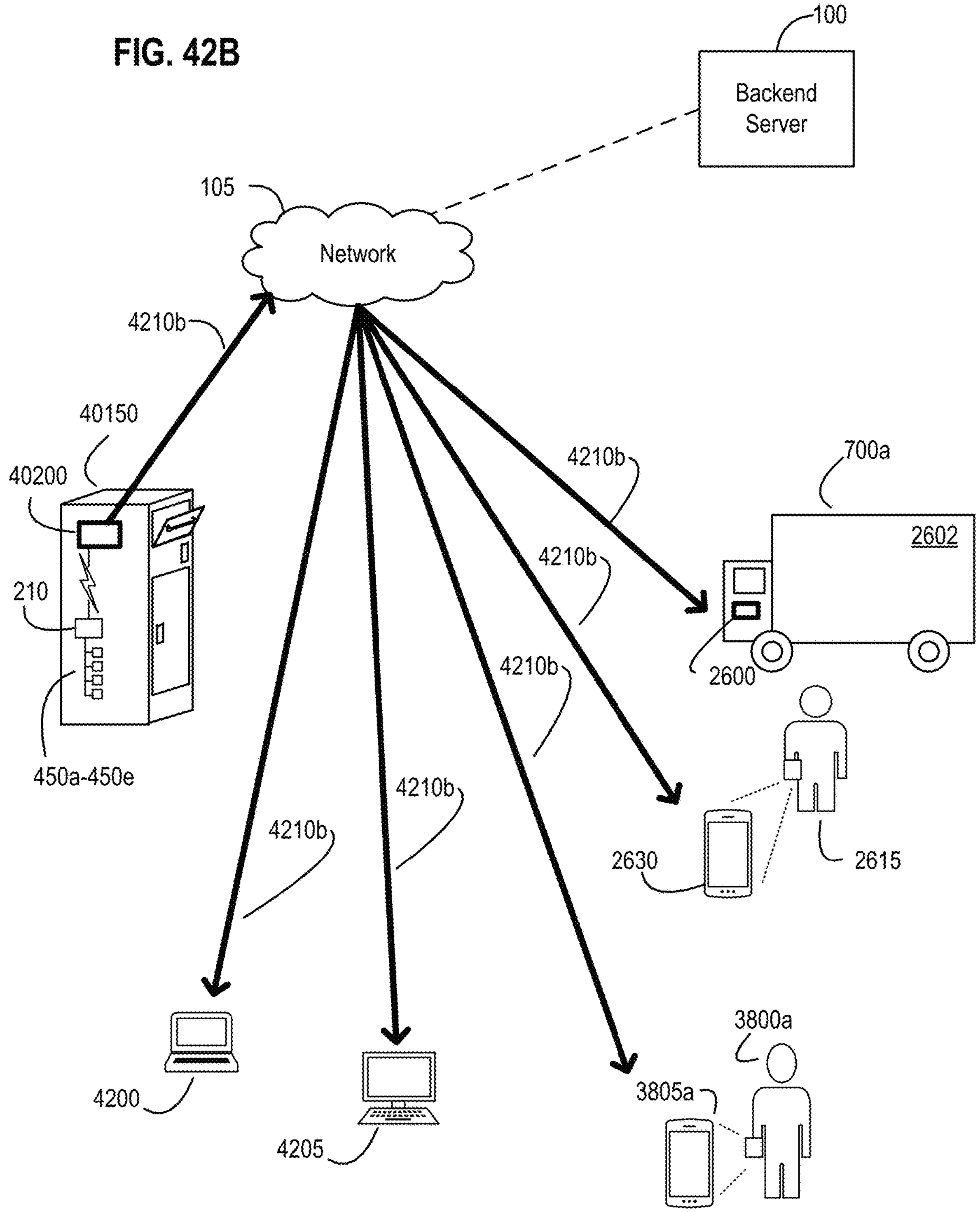

How such a status update notification is provided to such external devices may be accomplished in a variety of ways. As shown in FIG. 42A, an example shows an exemplary status update notification 4210*a* may be provided (e.g., broadcast) to one or more of the different exemplary external devices in a manner that avoids the need to make use of network 105 (e.g., via Bluetooth or other short range communication paths). In FIG. 42B, an example shows how exemplary receptacle 40150 (e.g., bridge node 40200 within receptacle 40150) may transmit an exemplary status update notification 4210*b* to one or more of the different exemplary external devices in a manner that uses network 105 as part of the communication path from the bridge node 40200 to the particular external device. Accordingly, further system embodiments may have the bridge node processor of bridge node 40200 being operative to generate a status update notification (such as notification 4210*a*, 4210*b*) based upon the comparison of the event information to the status indicator setting profile 4115 and then transmit, using the communication interface 203 of bridge node 40200, the status update notification to at least one external user device.

Figure 42C:
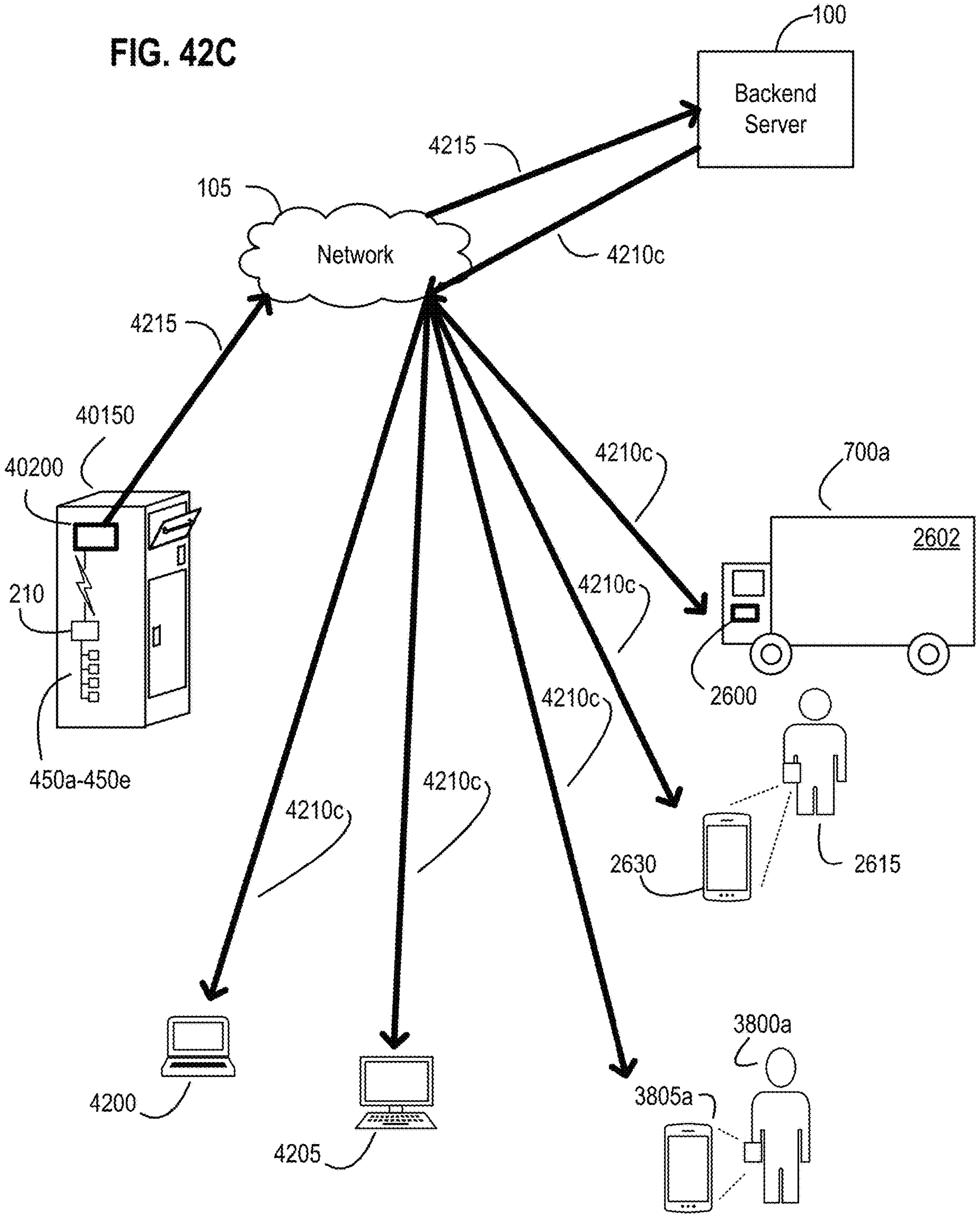

In other embodiments, information (such as status update notification information or simply the event information retrieved) may be sent to the server 100, which then generates its own status update notification to external user devices (and may include logistics assets with logistics personnel). As shown in FIG. 42C, an example shows how exemplary receptacle 40150 (e.g., bridge node 40200 within receptacle 40150) may transmit information 4215 (e.g., event information) to backend server 100, which then generates and transmits an exemplary status update notification 4210*c* via network 105 to one or more of the different exemplary external devices. In more detail, a further system embodiment may have the bridge node processor 201 of bridge node 40200, when executing the monitoring and management code maintained on the bridge node memory, being further operative to generate a status update notification based upon the comparison of the event information to the status indicator setting profile 4115; and transmit, using the communication interface 203 of bridge node 40200, the status update notification 4210*c* to one or more external user devices identified in customer registry file 4120 maintained on the bridge node memory. Bridge node 40200 may, in such an example embodiment, receive the customer registry file 4120 from backend server 100 (as well as updates to the customer registry file 4120 from backend server 100).

A further system embodiment may, instead of toggling a physical status indicator on the node-based logistics receptacle, rely on transmitting the relevant status notification to others related to the updated operation status of the node-based logistics receptacle. In more detail, for example, a logistics receptacle similar to that of receptacle 150 may be used with exemplary bridge node 40200 where the bridge node's processor 201 is operative to detect the updated advertising signal broadcast by the wireless accessory sensor node and retrieve the event information from the wireless accessory sensor node in response to detecting the updated advertising signal. Thereafter, the bridge node's processor 201 may then generate a status update notification based upon the comparison of the event information to the status indicator setting profile (where the status update notification indicates a change from a first operational state of the storage receptacle to a second operational state of the storage receptacle based upon the comparison of the event information to the status indicator setting profile 4115), and transmit the generated status update notification to at least one external user device operated by another parcel customer that warns the other parcel customer of the existence of the second operational state of the storage receptacle (e.g., that the logistics receptacle is at least temporarily unable to accept an additional delivery item).

Figure 42D:
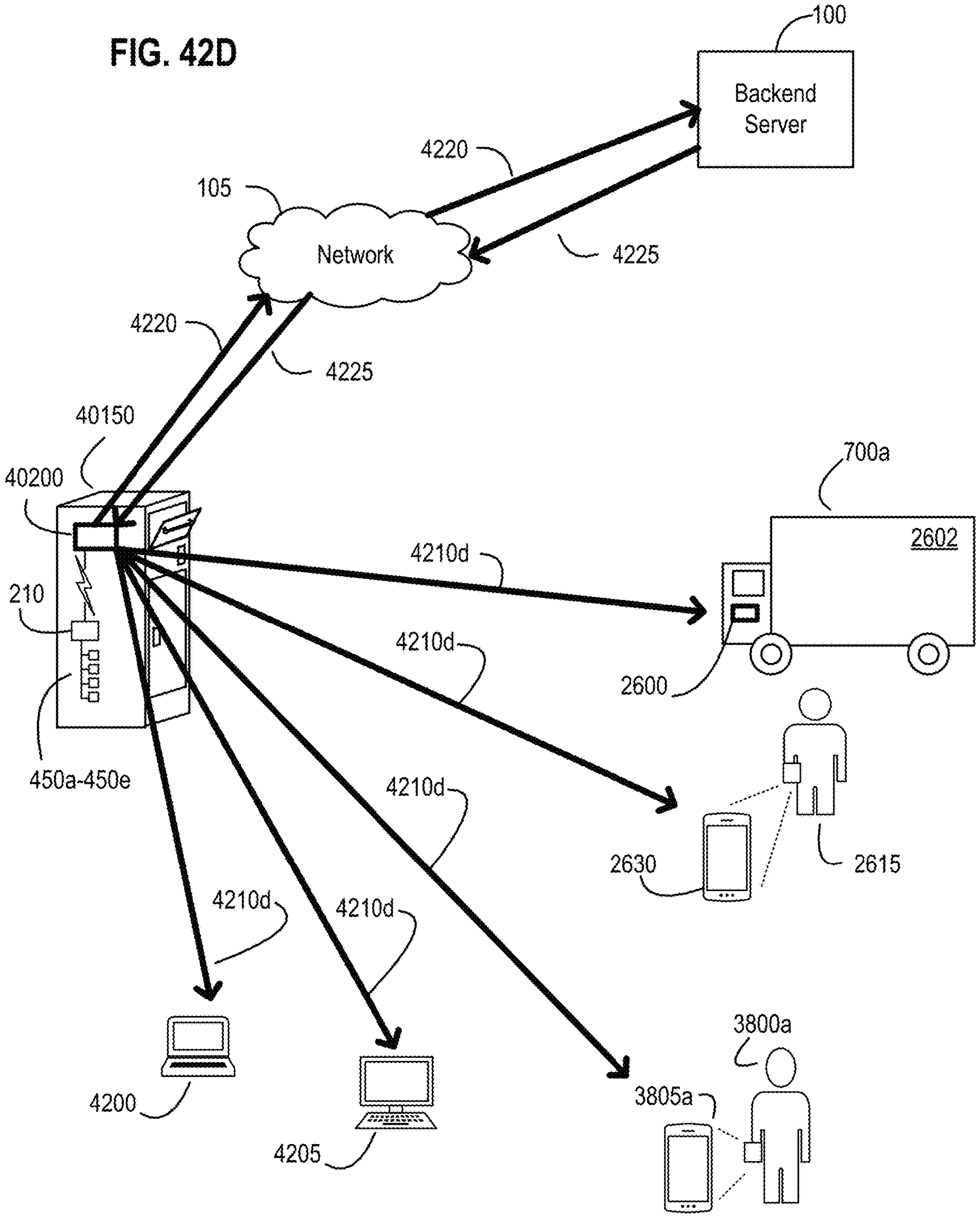

In still further embodiments, an exemplary system may use a physical status indicator, but be operative to toggle the status indicator based on remote input from the backend server 100 after the server 100 receives the reported event information. As shown in FIG. 42D, an example shows how exemplary receptacle 40150 (e.g., bridge node 40200 within receptacle 40150) may transmit information 4220 (e.g., event information) to backend server 100, which then generates and transmits an exemplary status change command, causing the bridge node 40200 to generate and broadcast exemplary status notification update 4210*d* to one or more of the different exemplary external devices (which may be done using network 105 or without using network 105). In more detail, a further system embodiment may have the bridge node processor 201 of bridge node 40200, when executing the monitoring and management code maintained on the bridge node memory, being further operative detect the updated advertising signal broadcast by the wireless accessory sensor node and retrieve the event information from the wireless accessory sensor node in response to detecting the updated advertising signal. The bridge node's processor is then operative to transmit (via the communication interface 203) the event information to the backend server 100 to update the backend server 100 related to the storage receptacle. The bridge node's processor is further operative to receive, from the backend server 100, a status change command generated by the backend server 100 based upon the event information and a status indicator setting profile maintained on the backend server 100, and toggle the status indicator on receptacle 40150 from the first condition to the second condition based upon the received status change command.

Further still, a system embodiment (with or without physical status indicators) may have the bridge node processor, when executing the monitoring and management code maintained on the bridge node memory, being operative to detect the updated advertising signal broadcast by the wireless accessory sensor node and retrieve the event information from the wireless accessory sensor node in response to detecting the updated advertising signal. The bridge node processor is also operative to cause the communication interface to transmit the event information to the backend server 100 to update the backend server 100 related to the storage receptacle. The bridge node processor, via the communication interface, is also operative to receive, from the backend server, a status change command generated by the backend server 100 based upon the event information and a status indicator setting profile maintained on the backend server 100; generate a status update notification based upon the status change command (where the status update notification indicates a change from a first operational state of the storage receptacle to a second operational state of the storage receptacle based upon status change command received from the backend server 100); and transmit, via the communication interface, the status update notification to at least one external user device operated by another parcel customer that warns the another parcel customer of the existence of the second operational state of the storage receptacle.

Advanced Self-Tuning with a Contextually Aware Node-Based Logistics Receptacle

Additional embodiments of an exemplary node-based logistics receptacle may be deployed with more contextual awareness related to the receptacle's physical environment and around the receptacle's operation as well as self-learning and training. Such embodiments may take advantage of environmental context information—such as traffic patterns, time of year, holidays, sales events, mortgage closing rates, weather, and the like to predict changes in future interactions with the exemplary node-based logistics receptacle. As explained in more detail below via the embodiments and description, strategic use of a variety of types of external sensing (e.g., motion sensors, machine vision, and the like) help monitor the environment where the exemplary node-based logistics receptacle is installed.

Figure 43:
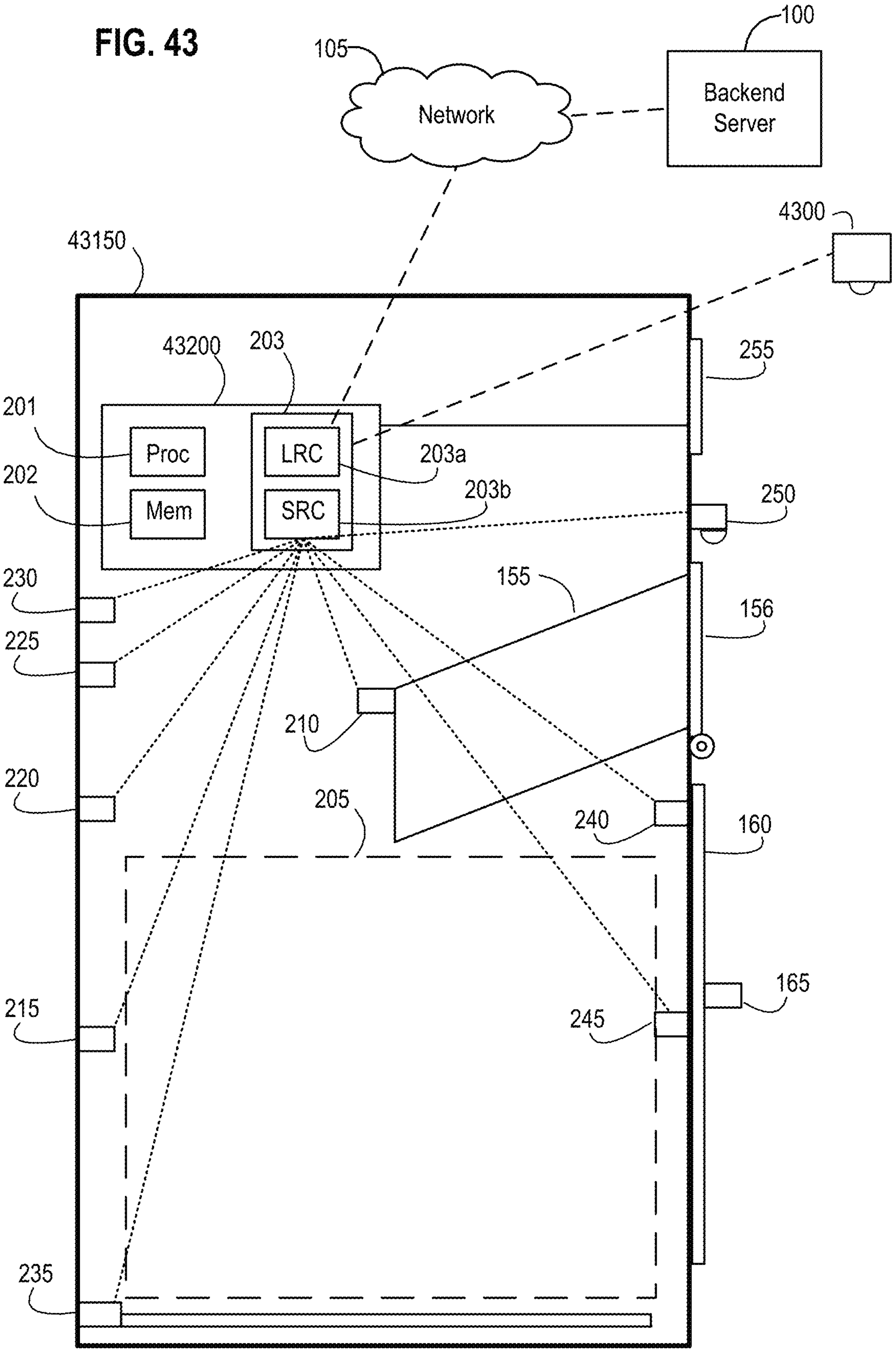
FIG. 43 is a diagram illustrating aspects of an exemplary system for self-tuning operation of an exemplary node-based logistics receptacle based upon contextual awareness in accordance with an embodiment of the invention.

FIG. 43 is a diagram illustrating aspects of an exemplary system for self-tuning operation of an exemplary node-based logistics receptacle based upon contextual awareness in accordance with an embodiment of the invention. Referring now to FIG. 43, exemplary connected logistics receptacle 43150 is shown operative to communicate with backend server 100 with components similar to exemplary logistics receptacle 150 described relative to FIG. 2. Those skilled in the art will appreciate that exemplary connected logistics receptacle 43150 shown in FIGS. 43 and 45A-47 is similarly structured to exemplary connected/node-based logistics receptacle 150 and 150*a*, with the exception that exemplary receptacle 43150 is equipped with an exemplary bridge node 43200 (shown in more detail in FIG. 44) that uses further types of data maintained on the bridge node 43200 (e.g., an exemplary management profile 4400 and environmental context data 4405) and operative to use different types of external sensors (e.g., an external sensor used with external sensor node 250 as part of receptacle 43150, exemplary external sensor 4300 disposed external to and separate from receptacle 43150). As such, exemplary receptacle 43150 includes an embodiment of monitoring and management code for execution by the processor in bridge node 43200 (controlling functionality of bridge node 43200 in such additional embodiments) and use of such data (e.g., exemplary management profile 4400 and environmental context data 4405) maintained within memory 305/310 of bridge node 43200 as part of enhanced self-tuning functionality based upon contextual awareness implemented in exemplary connected logistics receptacle 43150. Those skilled in the art will appreciate that backend server 100 may, in some embodiments, transmit updates to the exemplary management profile 4400 and/or environmental context data 4405 for use by the exemplary connected logistics receptacle 43150. Those skilled in the art will also appreciate, as explained in more detail below, that bridge node 43200 may update the exemplary management profile 4400 and/or environmental context data 4405 based on operations of receptacle 43150 without an update command or data from backend server 100.

As shown in FIG. 2, exemplary logistics receptacle 150 includes exemplary external sensor node 250 having at least one sensor (e.g., motion sensor, proximity sensor, range sensor, and the like) that monitors the near-by or local environment proximate to exemplary connected logistics receptacle 150. Consistent with this and as shown in FIG. 43, exemplary connected logistics receptacle 43150 is shown including exemplary external sensor node 250 having at least one sensor that is disposed on receptacle 43150. Those skilled in the art will appreciate that the externally focused sensor coupled to external sensor node 250 may be disposed relative to logistics receptacle 43150 so as to have a sensing orientation to monitor particular locations proximate receptacle 43150 and/or particular externally viewable parts of receptacle 43150 (such as the entrance opening).

As shown in FIG. 43, exemplary bridge node 43200 is shown as operable to communicate with (e.g., in communication with) another external sensor 4300 that is disposed external to and separate from the node-based logistics receptacle. As such, those skilled in the art will appreciate that an exemplary external sensor used in the embodiments that follow may be part of receptacle 43150 and coupled to bridge node 43200 (e.g., with or without using external sensor node 250 as an intermediary device that couples the external sensor to the bridge node) and/or may be separate from receptacle 43150 but operative to generate and provide external sensor data to bridge node 43200. Exemplary external sensors may be implemented with, for example, a motion sensor that generates motion sensor data as the external sensor data, an imaging sensor that generates image sensor data (e.g., via a security camera from a network of security cameras) as the external sensor data, or a machine vision sensor that generates video sensor data as the image sensor data).

Figure 44:
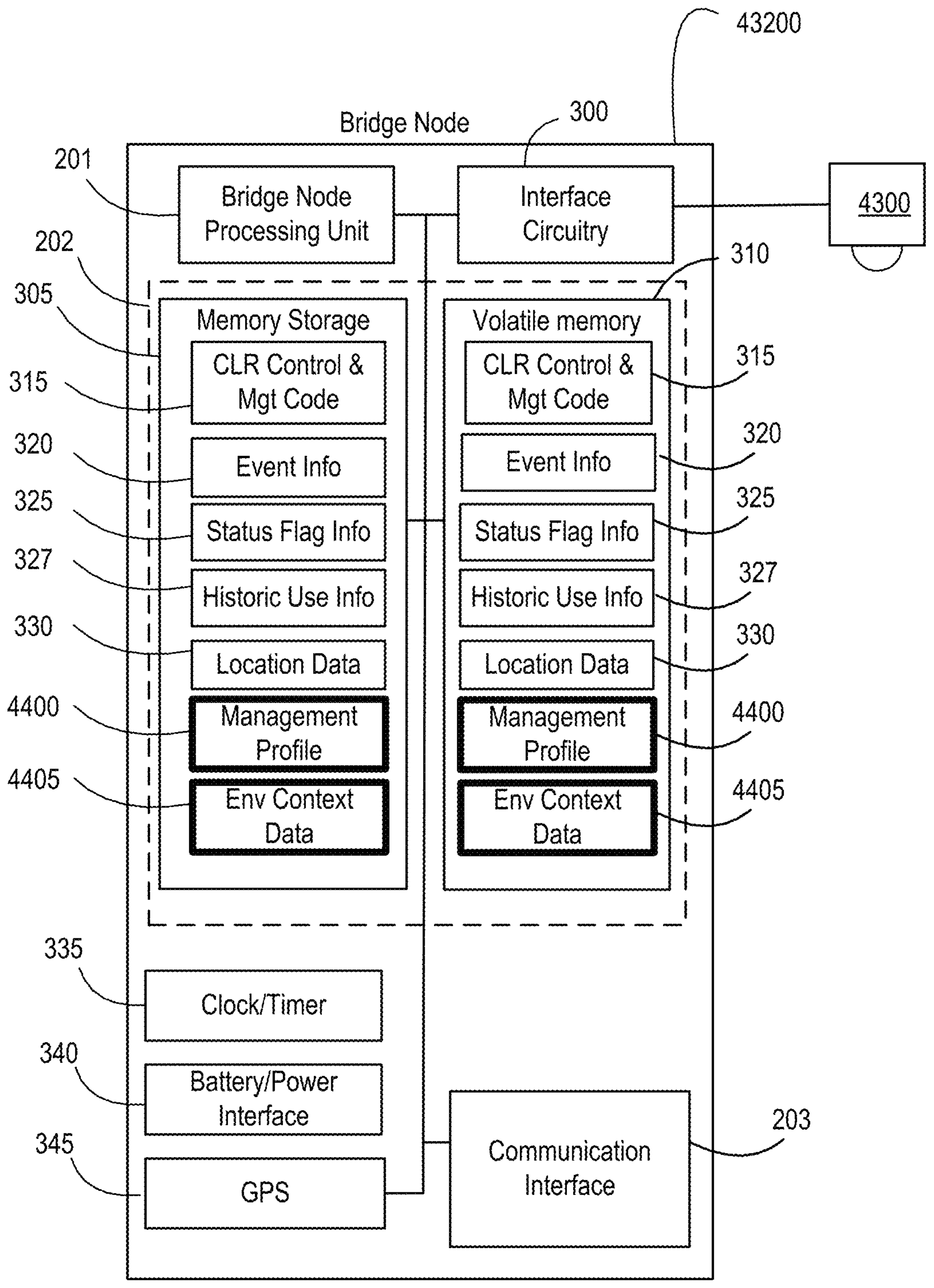
FIG. 44 is a detailed diagram of an exemplary bridge node used within the exemplary node-based logistics receptacle of FIG. 43 in accordance with an embodiment of the invention.

In more detail, FIG. 44 is a detailed diagram of an exemplary bridge node 43200 used within the exemplary connected logistics receptacle 43150 of FIG. 43 in accordance with an embodiment of the invention. Referring now to FIG. 44, exemplary bridge node 43200 is illustrated with components (e.g., hardware and software elements) similar to that explained with respect to exemplary bridge node 200 (FIG. 3), but exemplary bridge node 43200 is expressly shown having exemplary management profile 4400 and environmental context data 4405 as additional data used in the operation of the bridge node 43200 as explained in more detail below. Exemplary external sensor 4300 is also shown coupled to the bridge node processor 201 of bridge node 43200 through interface circuitry 300.

As such, an exemplary system for self-tuning operation of exemplary node-based logistics receptacle 43150 based upon contextual awareness as shown in FIGS. 43 and 45A-47 includes exemplary connected logistics receptacle 43150 having a storage receptacle for receiving and maintaining a delivery item (as previously described having monitored storage receptacle components, such as an entrance opening, a temporary storage area 205 and selectively accessible retrieval door 160). The system's exemplary connected logistics receptacle 43150 is equipped with at least exemplary bridge node 43200, exemplary wireless accessory sensor nodes (such as node 210, 250, etc.), and sensors 450*a*-450*e* that are coupled to at least one of the wireless accessory sensor nodes on receptacle 43150. The system's exemplary bridge node 43200, consistent with previously descriptions, is mounted to the storage receptacle and includes a bridge node processor 201, a bridge node memory 202 (e.g., volatile memory 310 and non-volatile memory 305), and a wireless communication interface 203. As noted above and shown in FIG. 44, the bridge node memory is coupled to the bridge node processor and maintains an embodiment of monitoring and management code capable of enhanced status indication (e.g., a type of CLR control and management code 315) for execution by the bridge node processor along with at least exemplary management profile 4400 and environmental context data 4405 that may be used during execution of the monitoring and management code as explained below. The communication interface is coupled to the bridge node processor and is operative to communicate with at least the backend server 100 over a first communication path (e.g., exemplary network 105).

Consistent with the description above, the system embodiment uses an exemplary wireless accessory sensor node (e.g., node 210) coupled to a plurality of sensors (e.g., sensors 450*a*-450*e*) that collectively monitor the storage receptacle components of the node-based logistics receptacle 43150 and generate sensor data reflecting one or more interactions with one or more of the storage receptacle components of the node-based logistics receptacle 43150 over a recording time period. Such sensors, as described above, may generate sensor data related to motion of the entrance opening, motion of objects moving through the entrance opening, motion of an object within the temporary storage area, image sensor data related a change of contents maintained within the temporary storage area, weight sensor data related a change in weight of what is stored within the temporary storage area, and the like.

The bridge node processor within the system's exemplary bridge node 43200, when executing the monitoring and management code maintained on the bridge node memory, is programmatically operative to receive external sensor data generated by the external sensor (e.g., the external sensor used with external sensor node 250 and/or the external sensor 4300 disposed separate from receptacle 43150) related to the local environment proximate the node-logistics receptacle 43150. The system's bridge node processor is then operative to predict a change in future interactions with one or more of storage receptacle components of the node-based logistics receptacle 43150 based upon the external sensor data received by the bridge node 43200. The processor of bridge node 43200 is then programmatically operative to update the management profile 4400 stored within the bridge node memory 202 based upon the predicted change in future interactions with the storage receptacle components of the node-based logistics receptacle 43150 and alter, using the updated management profile 4400, an operational task related to monitoring for and reporting a change in state of one or more of storage receptacle components of the node-based logistics receptacle 43150.

In more detail, exemplary management profile 4400 as used within such a system embodiment, for example, may define the recording time period (e.g., a range of time during a day when the sensors monitor the storage receptacle components for one or more interactions with one or more of the storage receptacle components). Exemplary management profile 400 may, in some embodiments, define a predetermined time of day when the bridge node 43200 retrieves event information from the wireless accessory sensor node in response to detecting an updated advertising signal from the wireless accessory sensor node, where the event information includes at least information reflecting interaction(s) with one or more of the storage receptacle components of node-based logistics receptacle 43150 during the recording time period. Exemplary management profile 4400 may also define a transmission time when the bridge node 43200 sends retrieved event information to the backend server 100.

In some system embodiments, the memory of the system's bridge node 43200 (as shown in FIG. 44) includes environmental context data 4405 as a type of contextual information locally stored that may be used as part of predicting the change in future interactions with the system's logistics receptacle 43150. In more detail, an embodiment may have the bridge node memory maintaining environmental context data 4405 about the local operating environment of the node-based logistics receptacle 43150. As such, the bridge node may then be programmatically operative to predict the change in the future interactions with one or more of storage receptacle components of the node-based logistics receptacle 43150 based upon the external sensor data received by the bridge node 43200 and at least a portion of the environmental context data. Exemplary environmental context data 4305 may, for example, be implemented with traffic data related to the location of the node-based logistics receptacle 43150, weather data related to the location of the node-based logistics receptacle 43150, crime data related to the location of the node-based logistics receptacle 43150, holiday data related to the location of the node-based logistics receptacle 43150, financial data associated with a financial transaction related to the location of the node-based logistics receptacle 43150 (e.g., mortgage rates, savings rates, lending fees, and the like related to that locality), seasonal activity data related to the location of the node-based logistics receptacle 43150, and/or sales event data related to the location of the node-based logistics receptacle 43150.

Further embodiments may have the bridge node being further programmatically operative to receive an update of the environmental context data 4405 about the local operating environment of the node-based logistics receptacle 43150. For example, the system's bridge node may receive a first update of the environmental context data 4405 from the backend server 100 and receive a second update of the environmental context data 4405 from another network source of such locally relevant contextual data (e.g., a network memory storage device operative to communicate with bridge node 43200 via network 105). In another example, the system's bridge node may be programmatically operative to generate a request for a context data update from the backend server 100 and transmit the request for the context data update to the backend server 100 using the communication interface 203. The system's bridge node, in response to this request, is then operative to receive an update of the environmental context data 4405 about the local operating environment of the node-based logistics receptacle 43150 from the backend server 100 and update the environmental context data 4405 with the update of the environmental context data received from the backend server 100.

In some embodiments, the exemplary environmental context data may be locally stored by the system's bridge node 43200 in a database. For example, a system embodiment may also include a contextual database (which may be part of memory 202 or separate from memory 202 depending on a desired implementation and amount of information to be stored, searched, and accessed). This contextual database is coupled to the system's bridge node 43200, where the contextual database maintains the environmental context data 4405 about the local operating environment of the node-based logistics receptacle 43150. Those skilled in the art will appreciate that the bridge node may also be programmatically operative to receive a database update for such a contextual database in a further example. Such a database update may include an update of some/all of the environmental context data 4405 about the local operating environment of the node-based logistics receptacle 43150.

As noted above, an exemplary system embodiment has the bridge node 43200 being operative to alter an operational task related to monitoring for and reporting a change in state of the one or more of storage receptacle components of the node-based logistics receptacle 43150. In more detail, this may be implemented in more detailed embodiments, for example, by changing the recording time period, by changing the recording time period starting on a particular day, by temporarily changing the recording time period for a particular range of days, by changing the predetermined time of day when the bridge node 43200 retrieves event information from the wireless accessory sensor node, by changing the transmission time when the bridge node 43200 sends retrieved event information to the backend server 100, and/or by changing when to request, from the backend server 100, a dispatched logistics operation for the node-based logistics receptacle 43150.

Figure 45A:
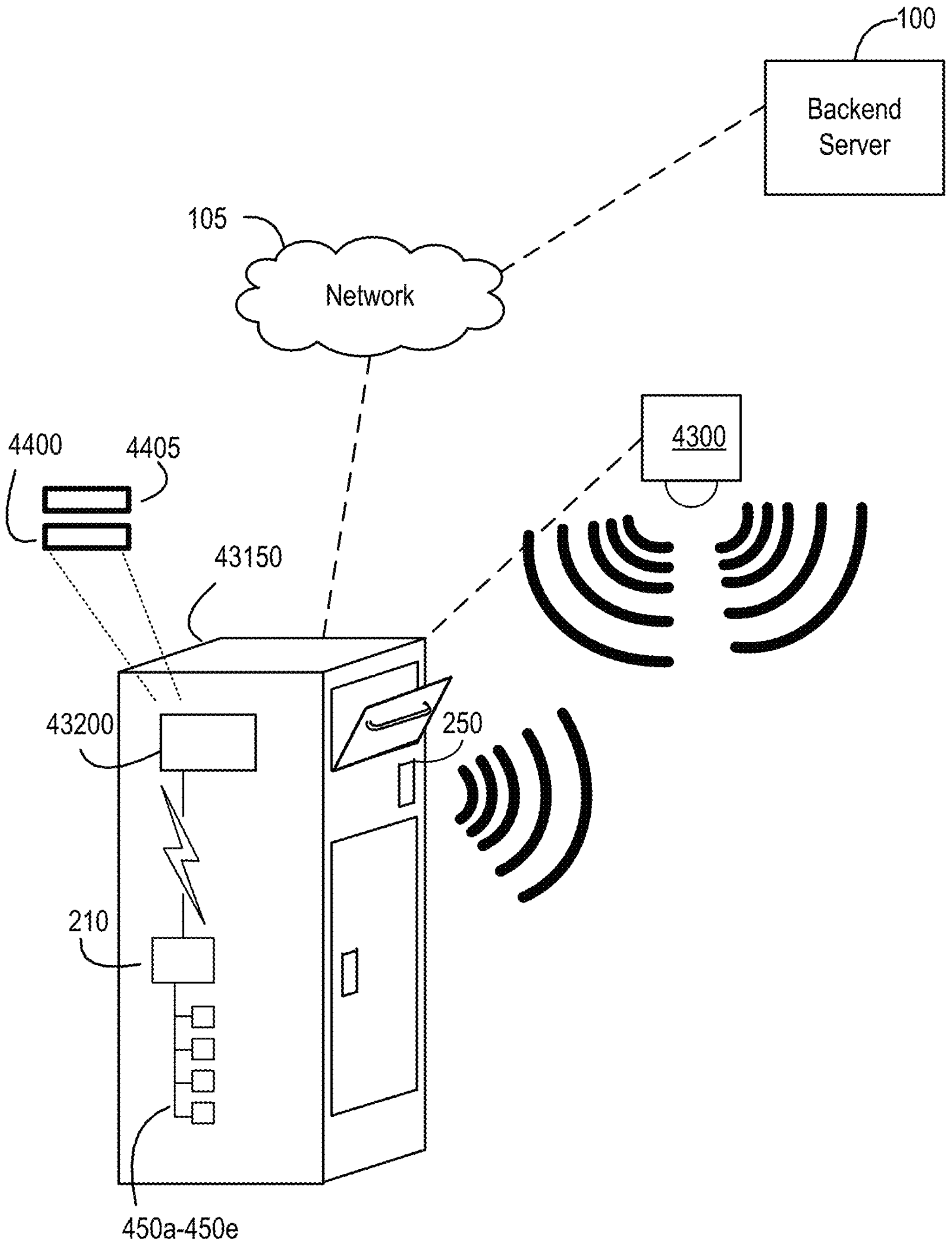
FIGS. 45A-45D are diagrams illustrating different examples of how the exemplary node-based logistics receptacle of FIG. 43 using external sensors may enhance monitoring of a local environment proximate the exemplary enhanced connected logistics receptacle in accordance with an embodiment of the invention.

FIGS. 45A-45D are diagrams illustrating various examples of how exemplary node-based logistics receptacle 43150 of FIG. 43 using external sensors may enhance monitoring of a local environment proximate the exemplary enhanced connected logistics receptacle in accordance with an embodiment of the invention. Referring now to FIG. 45A, exemplary node-based logistics receptacle 43150 is shown with graphic representations of how each of the external sensor associated with external sensing node 250 and the externally disposed external sensor 4300 monitor the local environment proximate the node-based logistics receptacle 43150. Depending on the local environment, those skilled in the art will appreciate that different types of external sensors (as mentioned above) may be used and oriented so as to capture motion, movement, objects, and approaching people relative to receptacle 43150.

Figure 45B:
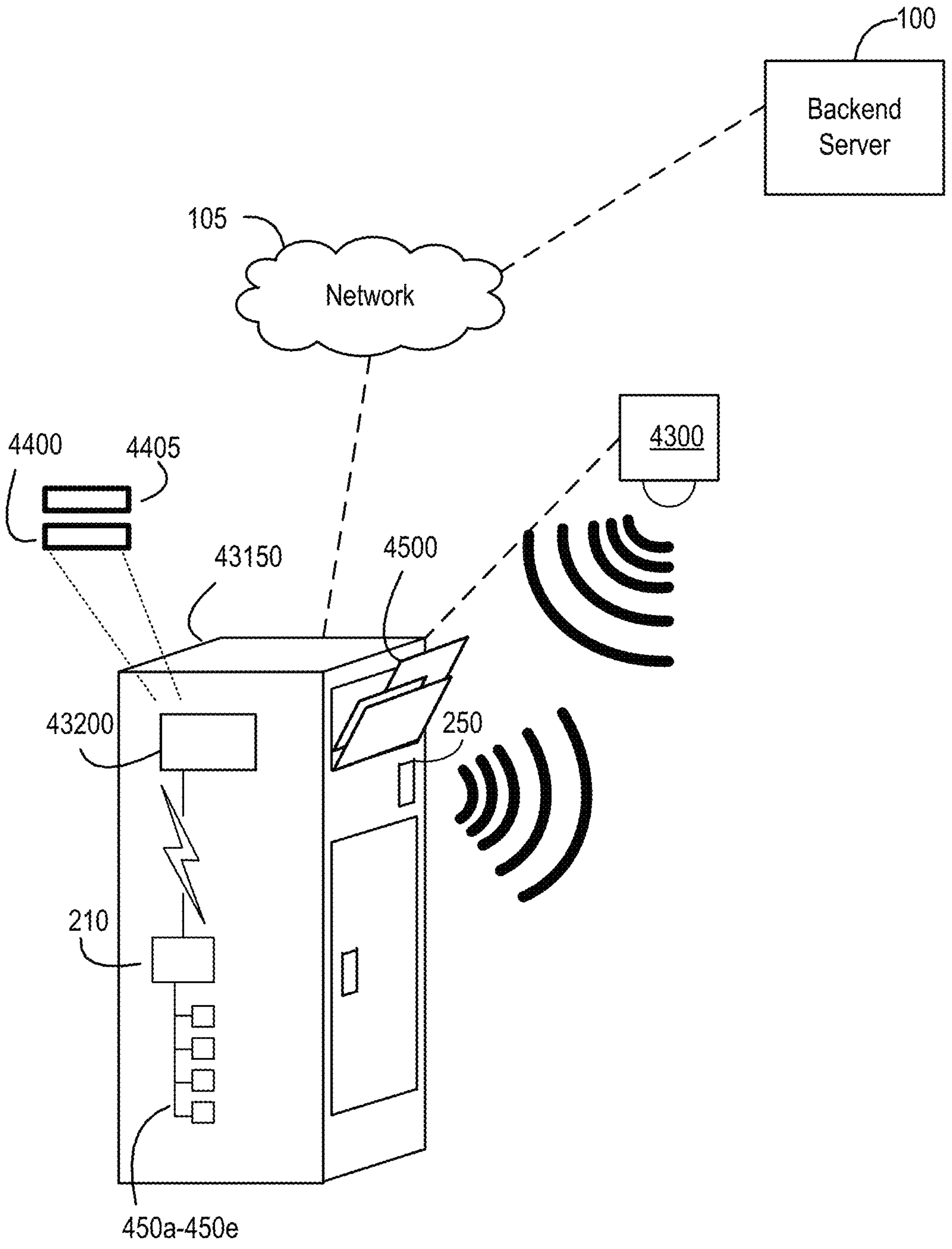

Referring now to FIG. 45B, the external sensor data received by bridge node 43200 may identify an overflow condition for the exemplary node-based logistics receptacle 43150. In an embodiment shown in FIG. 45B, the bridge node 43200 may be programmatically operative to identify an overflow condition based upon at least a portion of the external sensor data. For example, a portion of the sensor data related to monitoring the entrance opening of receptacle 43150 may be used by bridge node 43200 to identify whether one or more packages 4500 have been left but are unable to be fully accepted within the receptacle 43150. This may be the result of packages, letters, parcels and other object being deposited with receptacle 43150 but at a collectively level beyond an internal package holding capacity of receptacle 43150 as identified by separate external sensor 4300 or as identified by the sensor coupled to external sensor node 250. The bridge node 43200 is then programmatically operative to predict the change in future interactions with one or more of the storage receptacle components of the node-based logistics receptacle based upon the external sensor data received by the bridge node 43200 and the identified overflow condition. The overflow condition may, in more detail and for example, be a condition of exemplary node-based logistics receptacle 43150 having exceeded an internal package holding capacity, a condition of exemplary node-based logistics receptacle 43150 identified using at least the portion of the external sensor data to have one or more parcels located outside and proximate to exemplary node-based logistics receptacle 43150, or a condition of exemplary node-based logistics receptacle 43150 identified using at least the portion of the external sensor data to have one or more parcels visible in the entrance opening (e.g., where other parcels may be preventing the visible parcels from passing through the entrance opening and no longer be visible).

Figure 45C:
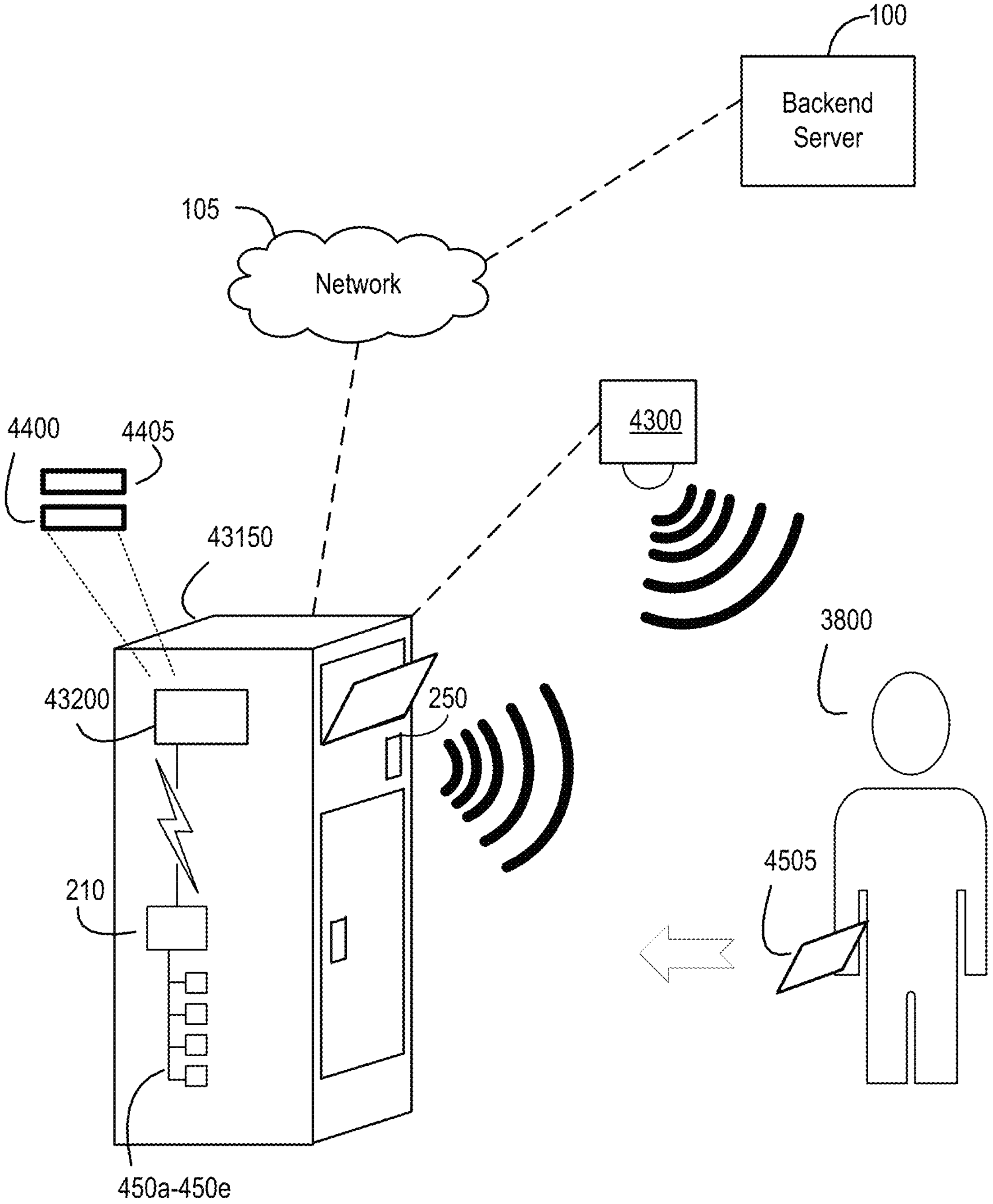

Referring now to FIG. 45C, the external sensor data received by bridge node 43200 may identify a parcel customer for the exemplary node-based logistics receptacle 43150. In an embodiment shown in FIG. 45C, the bridge node may be programmatically operative to identify an approaching parcel customer (i.e., parcel customer 3800 carrying parcel 4505) of the node-based logistics receptacle 43150 based upon at least a portion of the external sensor data. For example, and as shown in FIG. 45C, external sensor data from each of the sensor coupled to external sensor node 250 and the external sensor 4300 may generate external sensor data used by bridge node 43200 to identify parcel customer 3800 as they approach logistics receptacle 43150. Such external sensor data (or at least the portion used for identifying the parcel customer) may be image sensor data or video sensor data. In a further embodiment, such external sensor data may be an identified wireless signal broadcast by a mobile user device (e.g., smartphone, table, or other mobile electronic communication device) operated by the approaching customer. The bridge node 43200 may also be programmatically operative, in such an embodiment, to predict the change in future interactions with the one or more of the storage receptacle components of the node-based logistics receptacle based upon the external sensor data received by the bridge node and the identified approaching customer.

Figure 45D:
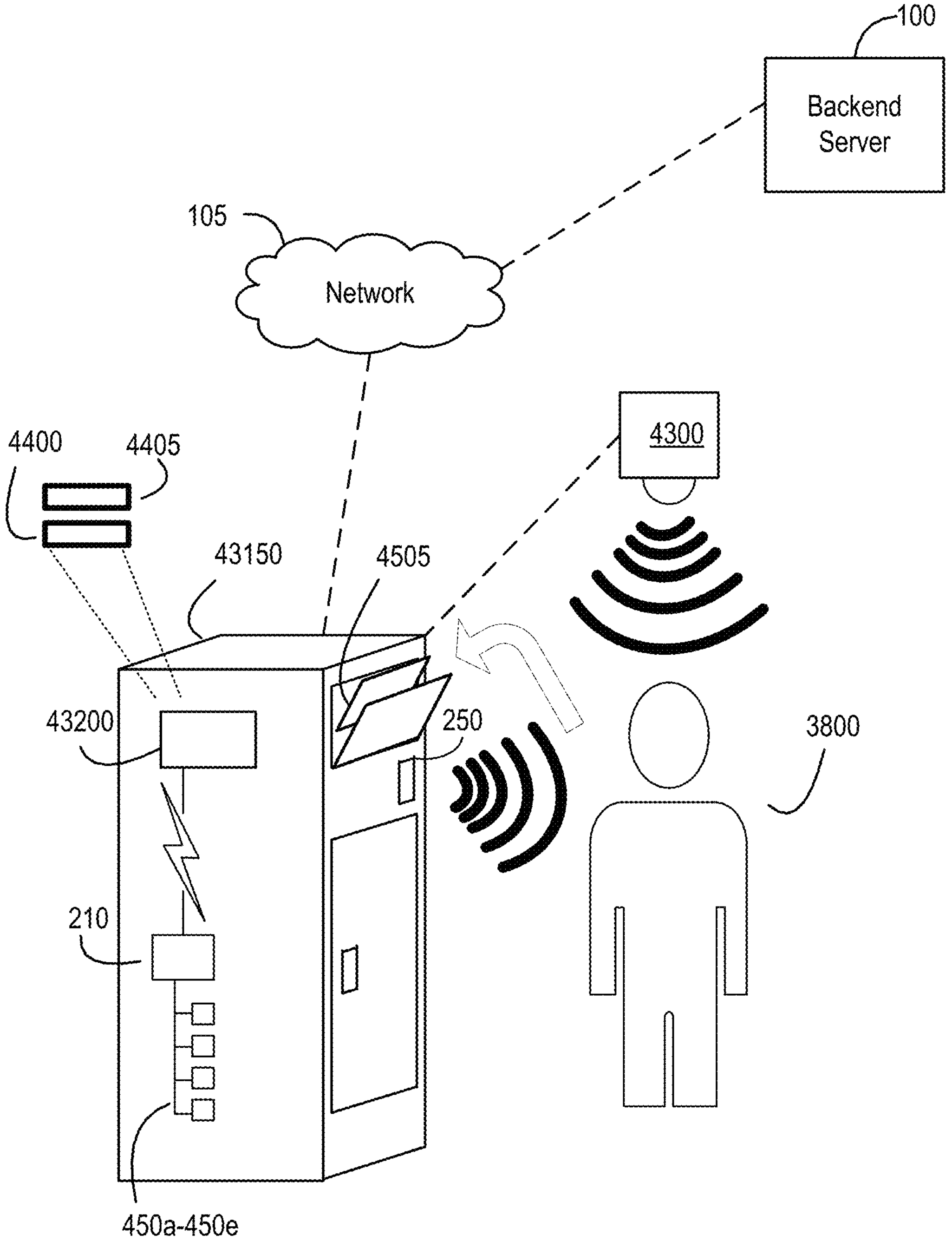

Referring now to FIG. 45D, the external sensor data received by bridge node 43200 may be used as part of confirming the drop off of an item with the exemplary node-based logistics receptacle 43150. In an embodiment shown in FIG. 45D, the bridge node is programmatically operative to receive the external sensor data by being further operative to confirm drop off of the delivery item (e.g., parcel 4505) based upon at least a portion of the external sensor data prior to predicting the change in the future interactions with the one or more of the storage receptacle components of the node-based logistics receptacle. Thus, a more detailed example may have the bridge node being programmatically operative to receive the external sensor data by being further operative to identify the approaching customer of the node-based logistics receptacle 43150 based upon at least a first generated portion of the external sensor data; and confirm drop off of the delivery item by the approaching customer based upon a subsequently generated portion of the external sensor data prior to predicting the change in the future interactions with the one or more of the storage receptacle components of the node-based logistics receptacle 43150.

In such an example and in more detail, those skilled in the art will appreciate that the wireless accessory sensor node may be further operative to broadcast an updated advertising signal in response to the generated sensor data reflecting at least one interaction with the one or more of the storage receptacle components (e.g., the entrance opening) of the node-based logistics receptacle 43150 during the recording time period. The bridge node 43200, in such an example, may be programmatically operative to receive the external sensor data and confirm drop off of the delivery item by being further operative to identify the delivery item with the approaching customer using a first part of the subsequently generated portion of the external sensor data, detect the updated advertising signal over the communication interface 203, retrieve event information from the wireless accessory sensor node in response to detecting the updated advertising signal (where such event information includes at least information reflecting at least one interaction with the storage receptacle components of the node-based logistics receptacle 43150 during the recording time period), and then confirm drop off of the delivery item based upon the retrieved event information.

In even more detail relative to such an example, those skilled in the art will appreciate that the wireless accessory sensor node may be further operative to broadcast an updated advertising signal in response to the generated sensor data reflecting at least one interaction with the one or more of the storage receptacle components (e.g., the entrance opening) of the node-based logistics receptacle 43150 during the recording time period. The bridge node 43200, in this more detailed example, is programmatically operative to receive the external sensor data and confirm drop off of the delivery item by being further operative to identify the delivery item with the approaching customer (e.g., parcel 4505 with customer 3800) using a first part of the subsequently generated portion of the external sensor data, detect the updated advertising signal over the communication interface 203, retrieve event information from the wireless accessory sensor node in response to detecting the updated advertising signal (where the event information includes at least information reflecting the interaction(s) with the one or more of the storage receptacle components of the node-based logistics receptacle 43150 during the recording time period, determine the approaching customer is moving away from the node-based logistics receptacle 43150 using a second part of the subsequently generated portion of the external sensor data, and confirm drop off of the delivery item (e.g., parcel 4505) based upon the retrieved event information.

Figure 46A:
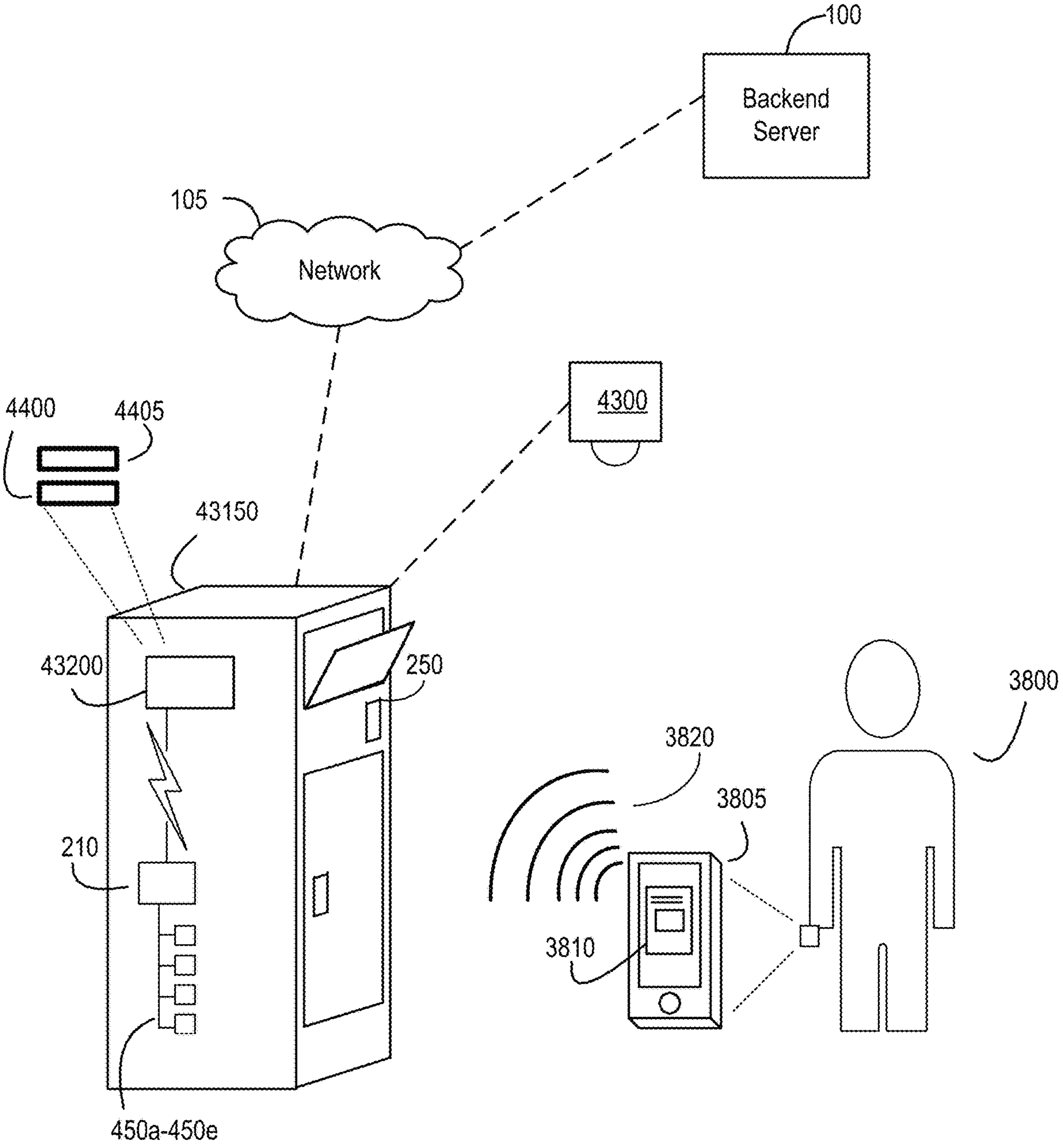
FIGS. 46A-46C are further diagrams illustrating examples of how the exemplary node-based logistics receptacle of FIG. 43 may enhance monitoring of a local environment proximate the exemplary enhanced connected logistics receptacle in accordance with an embodiment of the invention.
Figure 46B:
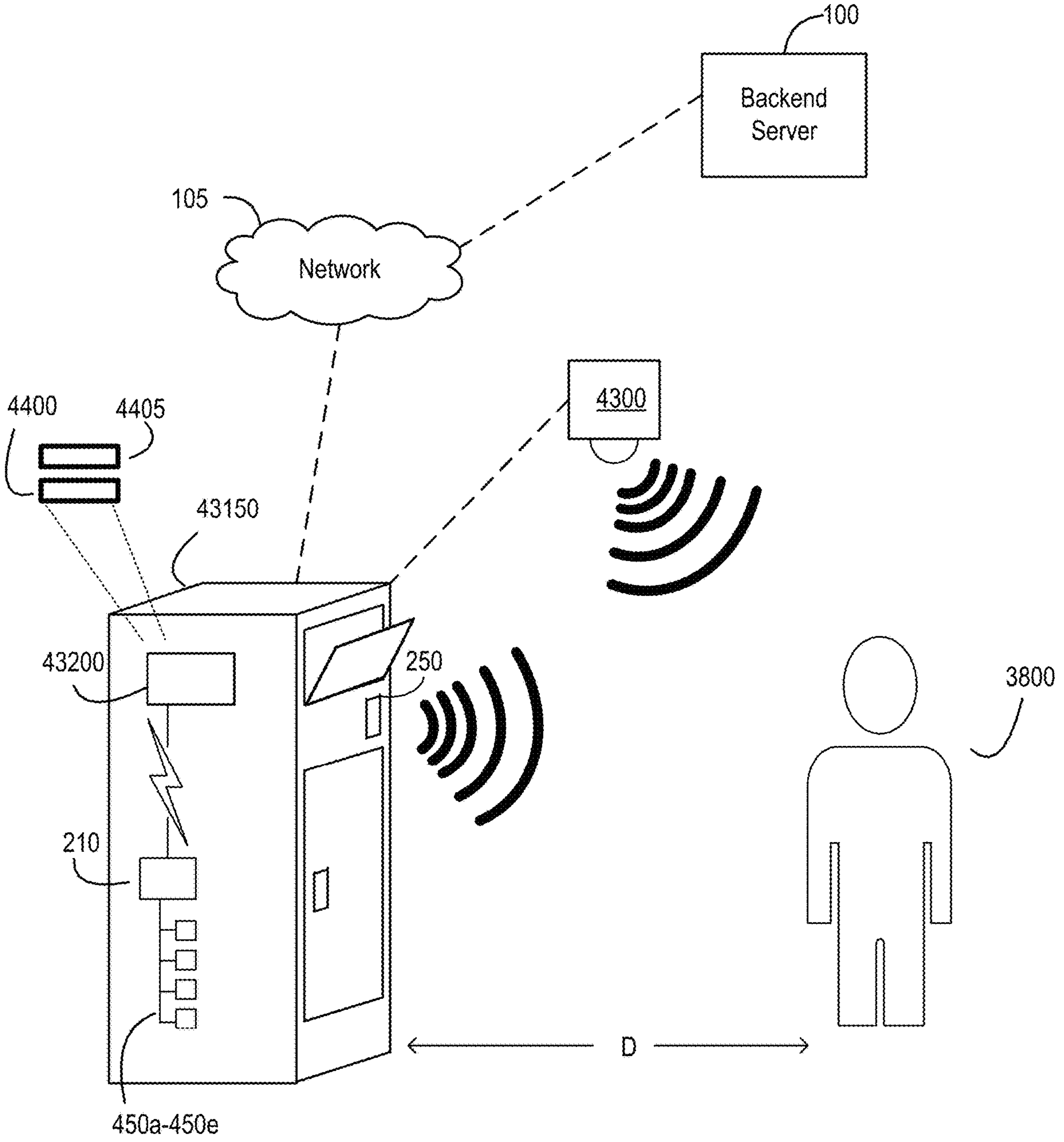
Figure 46C:
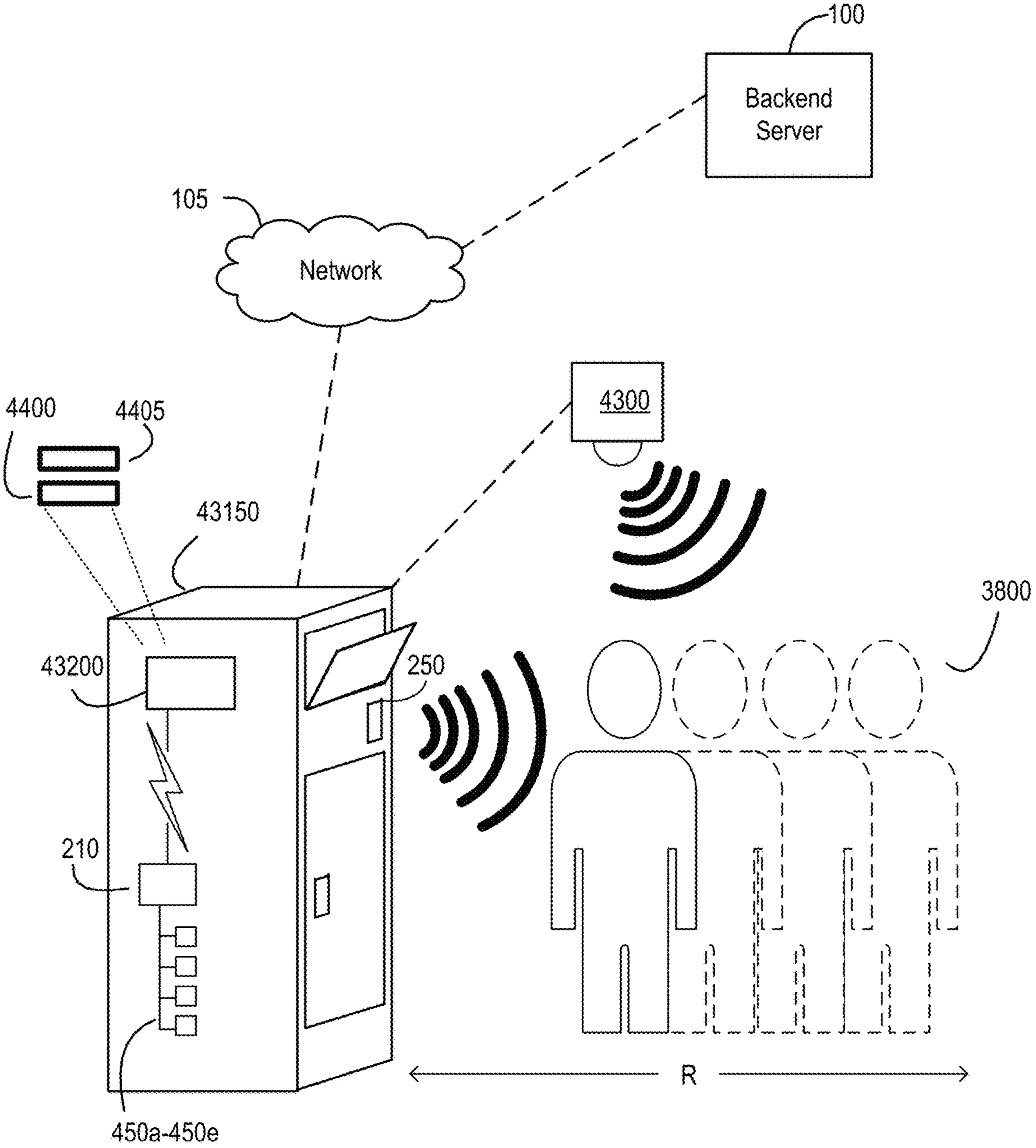

FIGS. 46A-46C are diagrams illustrating further examples of how the exemplary node-based logistics receptacle 43150 of FIG. 43 may enhance monitoring of a local environment proximate the exemplary enhanced connected logistics receptacle 43150 in accordance with an embodiment of the invention. In particular, FIGS. 46A-46C provide examples of how exemplary bridge node 43200 may use the updated management profile 4400 to alter an exemplary operational task related to monitoring for and reporting a change in state of one or more of storage receptacle components of exemplary node-based logistics receptacle 43150. Referring now to FIG. 46A, exemplary node-based logistics receptacle 43150 is shown with exemplary bridge node 43200 being programmatically operative to alter, using the updated management profile 4400, operation of the bridge node 43200 by initiating a new detection task related to a mobile user device 3805 operated by parcel customer 3800. In more detail, bridge node 43200 may be operative to initiate the new detection task by being further operative to detect a signal 3820 from the mobile user device 3805 operated by the parcel customer 3800 (e.g., when device 3805 is executing an exemplary app 3810) as the mobile user device 3805 approaches the node-based logistics receptacle 43150.

In another example illustrated in FIG. 46B, exemplary bridge node 43200 is programmatically operative to alter, using the updated management profile 4400, operation of the bridge node 43200 and initiate the new detection task by being further operative to identify a distance, D, from the approaching parcel customer 3800 to the node-based logistics receptacle 43150 based upon at least a first generated portion of the external sensor data. Those skilled in the art will appreciate that such a portion of the external sensor data may be generated using proximity sensor data, for example, relative to the external sensor(s).

In yet another example illustrated in FIG. 46C, exemplary bridge node 43200 is programmatically operative to alter, using the updated management profile 4400, operation of the bridge node 43200 and initiate the new detection task by being further operative to determine how long the parcel customer 3800 is within a predetermined range, R, of exemplary node-based logistics receptacle 43150. As shown in FIG. 46C, parcel customer 3800 may be initially detected at a beginning time as crossing a threshold into the predetermined range R of receptacle 43150 (e.g., a physical distance). Exemplary bridge node 43200 may continue to monitor parcel customer 3800 while within such a range R and track the time parcel customer remains within such a range R. Alternatively (or in conjunction), bridge node 43200 may determine how long the parcel customer 3800 is within a predetermined range, R, of exemplary node-based logistics receptacle 43150 based upon how long bridge node 43200 detects a signal from mobile user device 3805 used by parcel customer 3800. Further still, bridge node 43200 may determine how long a mobile user device 3805 operated by the parcel customer 3800 is within a predetermined range, R, of exemplary node-based logistics receptacle 43150 as a proxy for the parcel customer itself.

Those skilled in the art will appreciate that the above-described system embodiments that involve self-tuning the operation of exemplary node-based logistics receptacle 43150 based upon contextual awareness may also include retrieval of event information. In more detail, a further embodiment may have the system's bridge node 43200 being programmatically operative to retrieve event information from the wireless accessory sensor node in response to receiving an updated advertising signal from the wireless accessory sensor node. Such an updated advertising signal is related to at least one interaction with one or more of the storage receptacle components of exemplary node-based logistics receptacle 43150 during the recording time period.

Those skilled in the art will appreciate that the above-described system embodiments that involve self-tuning the operation of exemplary node-based logistics receptacle 43150 based upon contextual awareness may also involve generating and transmitting a server notification related to external sensor data. In more detail, a further embodiment may have the system's bridge node 43200 being programmatically operative to generate a server notification related to at least a portion of the external sensor data; and transmit, over the communication interface 203, the server notification to the backend server 100 to cause the backend server 100 to update a server-managed profile for the node-based logistics receptacle (e.g., information stored within exemplary management profile 835). Likewise, an embodiment may have the system's bridge node 43200 being programmatically operative to generate a server management update related to the updated management profile; and transmit, over the communication interface, the server management update to the backend server to cause the backend server to update such a server-managed profile for the node-based logistics receptacle (e.g., exemplary management profile 835).

Those skilled in the art will appreciate that the above-described system embodiments that involve self-tuning the operation of exemplary node-based logistics receptacle 43150 based upon contextual awareness may also involve causing backend server 100 to change a particular dispatched logistics operation previously planned or scheduled for exemplary node-based logistics receptacle 43150. In more detail, a further embodiment may have the system's bridge node 43200 being programmatically operative to retrieve event information from the wireless accessory sensor node in response to receiving an updated advertising signal from the wireless accessory sensor node (where the updated advertising signal is related to at least one interaction with the one or more of the storage receptacle components of exemplary node-based logistics receptacle 43150 during the recording time period. In this further embodiment, the system's bridge node 43200 may also be programmatically operative to transmit, using the communication interface 203, a status update message to the backend server 100. Such a status update message, for example, may reflect the retrieved event information and update the backend server 100 with at least a portion of the updated management profile 4400 (as updated by bridge node 43200). This status update message causes the backend server 100 to alter a dispatched logistics operation for the node-based logistics receptacle 43150 based upon at least one of the retrieved event information and the portion of the updated management profile. In some embodiments, the status update message may cause the backend server 100 to alter a dispatched logistics operation for the node-based logistics receptacle 43150 based upon both of the retrieved event information and the portion of the updated management profile.

Figure 47:
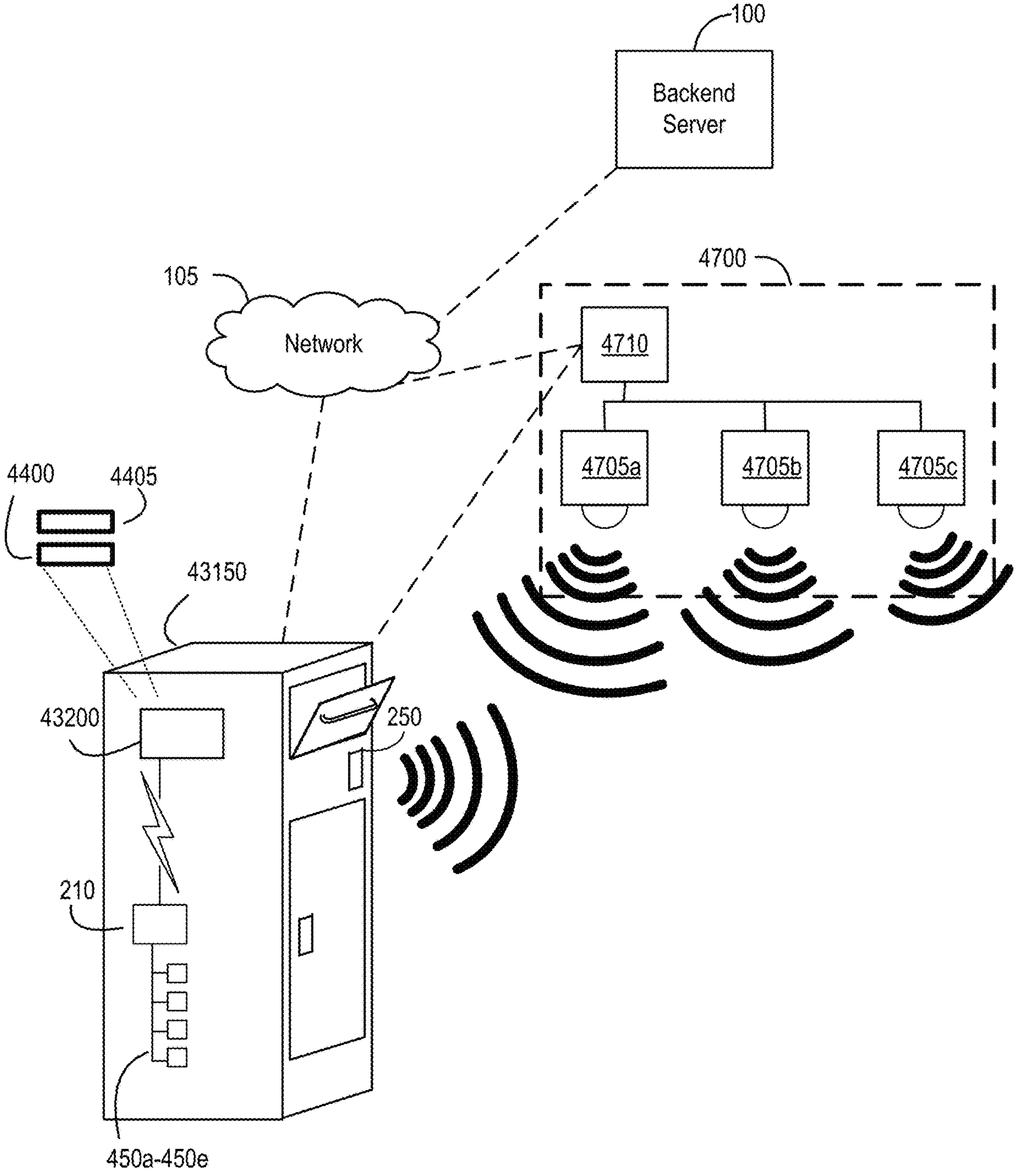
FIG. 47 is a diagram illustrating an example of how the exemplary node-based logistics receptacle of FIG. 43 may use one or more external sensing elements of an external sensing infrastructure in accordance with an embodiment of the invention.

FIG. 47 is a diagram illustrating an example of how the exemplary node-based logistics receptacle 43150 of FIG. 43 may use one or more external sensing elements of an external sensing infrastructure in accordance with an embodiment of the invention. In general, exemplary external sensing infrastructure may be available to an exemplary system embodiment as the external sensor (e.g., in place of or in addition to an external sensor disposed on receptacle 43150 or otherwise disposed separately from receptacle 43150, such as exemplary external sensor 4300). Referring now to FIG. 47, the exemplary system embodiment illustrated using exemplary node-based logistics receptacle 43150 is shown having exemplary external sensing infrastructure 4700, which may include multiple sensing elements 4705*a*-4705*c* and a control node 4710 (e.g., a processor-based device interfacing with each of sensing elements 4705*a*-4705*c* and operative to provide a remotely accessible interface for external sensing data generated by elements of external sensing infrastructure 4700). Exemplary control node 4710 may provide a degree of control for each of the different sensing elements 4705*a*-4705*c* (e.g., turning on/off particular sensing elements, gathering external sensor data generated by the different sensing elements 4705*a*-4705*c*, and controlling access to such external sensor data).

In some embodiments described below, those skilled in the art will appreciate that selective access to such external sensor data generated by one or more sensing elements 4705*a*-4705*c* may be allowed and implemented via machine-to-machine (M2M) micropayment using blockchain techniques. In general, when exemplary node-based logistics receptacle 43150 desires access to an external source of sensor information (e.g., to confirm a sensed condition, such as when a door for its entrance opening is internally sensed to be stuck open), the exemplary node-based logistics receptacle 43150 in such a system embodiment may do so autonomously and securely using predefined pricing and access conditions defined in a self-executing smart contract between a seller (e.g., the owner of the external sensing infrastructure) and a purchaser (e.g., the owner of receptacle 43150). For example, exemplary bridge node 43200 may selectively access a camera (e.g., an external sensing element having object detection capabilities) from a security system (a type of external sensing infrastructure) watching the street where the exemplary node-based logistics receptacle 43150 is located to validate or dismiss a potential overflow.

Those skilled in the art will appreciate that such an exemplary smart contract may be generally considered as a self-executing agreed upon set of conditional rules with the terms of the agreement between the entities (e.g., between devices associated with such different entities) being directly written into lines of code (e.g., computerized transaction protocols that execute contract conditions making a transaction between devices/entities traceable, transparent and irreversible). Those skilled in the art appreciate that an exemplary smart contract is readily understood to, be tangibly implemented and considered a decentralized application on network 105 that executes logic (e.g., the programmatically coded conditional rules) in response to events where execution can result in the exchange of money, delivery of services (such as initiating use of a third party device), unlocking of content protected by digital rights management or other types of data manipulation (such as the exchange of sensor data gathered by the seller). Smart contracts may also be used to enforce privacy protection by, for example, facilitating the selective release of privacy-protected data to meet a specific request or permitting access to a particular secured area (such as the temporary storage area within receptacle 43150) or initiating use of a third party device for a particular task.

Referring back to FIG. 47, a further system embodiment may have exemplary bridge node 43200 being operative to receive the external sensor data generated by the external sensor related to the local environment proximate the node-logistics receptacle 43150 by being further operative to communicate with the external sensing infrastructure 4700 over the communication interface 203 to establish a smart contract based connection with the external sensing infrastructure 4700. In more detail, those skilled in the art will appreciate that establishing such a smart contract based connection by one network device with another network device may be generally accomplished with the execution of a smart contract application that will create and allow such a connection and interaction with the two network devices under terms of the smart contract.

For example, this may involve running an exemplary decentralized application residing on one of the devices or on a part of network 105 representing the smart contract in response to events (such as a request to establish a smart contract based connection) by one device/entity with another device/entity. The smart contract facilitating (e.g., used in establishing) such a connection involves a transaction between the two devices/entities. Data representing payment for such a transaction (e.g., payment for establishing the smart contract based connection for use of data, for engagement between the devices/entities, for the performance of a service by one device/entity for the other device/entity, and the like) may be stored in an extendible chain in a distributed fashion on the network, such a distributed blockchain based virtual permanent ledger.

Here, the smart contract based connection provides paid-for use of data generated by one (or more) of the sensing elements 4705*a*-4705*c* of the external sensing infrastructure 4700. As such, the system's exemplary bridge node 43200 may then receive the external sensor data as the data generated by the one (or more) sensing element(s) of the external sensing infrastructure 4700 under terms of the smart contract based connection with the external sensing infrastructure 4700. In more detail, such a smart contract based connection may, for example, be implemented by a protocol for an automated transaction stored on a blockchain and run in response to meeting at least a payment condition for receiving the data generated by the one (or more) sensing element(s) of the external sensing infrastructure 4700. The smart contract based connection may, in some implementations, provide a cryptographically secure source of the data generated by the one (or more) sensing element(s) of the external sensing infrastructure 4700. In some embodiments, the smart contract based connection may provide for receiving the data generated by the one (or more) sensing element(s) of the external sensing infrastructure 4700 under predetermined pricing terms as the payment condition. Such predetermined pricing terms may, for example, relate to a blockchain-based payment for access rights to the data generated by the one (or more) sensing element(s) of the external sensing infrastructure 4700 and/or a blockchain-based payment for access rights to the data generated by any of the sensing elements of the external sensing infrastructure. In another example, such predetermined pricing terms may relate to a blockchain-based payment on a per-access basis for access rights to the data generated by at least the one (or more) sensing element(s) of the external sensing infrastructure 4700. Additionally, an example embodiment may have the smart contract based connection providing for receiving the data generated by the one (or more) sensing element(s) of the external sensing infrastructure 4700 under predetermined access conditions.

Referring back to FIG. 47, a further system embodiment may have exemplary bridge node 43200 being operative to detect when the receptacle 43150 needs to confirm a sensed condition with external sensor data. In more detail and for example, the system's exemplary bridge node 43200 may be further programmatically operative to receive the external sensor data generated by the external sensor related to the local environment proximate the node-logistics receptacle by being further operative to first identify a sensed state of at least one of the storage receptacle components of receptacle 43150 based upon internal sensor data generated by the wireless accessory sensor node when monitoring of the storage receptacle components, and then determine that the identified sensed state of the at least one of the storage receptacle components is a type of sensed state that warrants confirmation via external sensor verification. The exemplary bridge node 43200 is further operative to then communicate with the external sensing infrastructure 4700 over the communication interface 203 to establish a smart contract based connection with the external sensing infrastructure 4700 when the identified sensed state of the at least one of the storage receptacle components is the type of sensed state that warrants confirmation via external sensor verification. Here, the smart contract based connection provides at least paid-for use of data generated by the one (or more) sensing element(s) of the external sensing infrastructure 4700 under predetermined terms. The exemplary bridge node 43200 is then further operative to receive the external sensor data as the data generated by the one (or more) sensing element(s) of the external sensing infrastructure 4700 under the predetermined terms of the smart contract based connection with the external sensing infrastructure 4700.

In some embodiments, for example, the external sensing infrastructure 4700 may be a security system (e.g., exterior security system, interior security system, and the like) having sensing elements in form security cameras from a set of security cameras used by the security system (or at least a security camera in a set of sensors used by the security system that may have other non-camera sensors, such as door sensors, and the like). In other words, the external sensing infrastructure 4700 may be a camera-based monitoring system or at least have a visual-based sensor as part of the monitoring system.

As shown in FIG. 47, at least one of the exemplary external sensing elements 4705*a*-4705*c* may be implemented as a security camera operably coupled to exemplary bridge node 43200 through a remotely accessible interface 4710 of the security system 4700 (e.g., camera-based monitoring system). As such, the exemplary bridge node 43200 may be further programmatically operative to receive the external sensor data generated by the external sensor related to the local environment proximate the node-logistics receptacle 43150 by being further operative to establish a smart contract based connection with the security system 4700 (e.g., camera-based monitoring system) through the remotely accessible interface 4710 of the security system 4700 (e.g., camera-based monitoring system), and receive the external sensor data generated by the security camera over the remotely accessible interface 4710 of the security system 4700 (e.g., camera-based monitoring system) and the communication interface 203 of the bridge node 43200.

A further system embodiment, in event more detail, may have the bridge node 43200 being further programmatically operative to receive the external sensor data generated by the external sensor related to the local environment proximate the node-logistics receptacle 43150 by being further operative to (a) identify a sensed state of at least one of the storage receptacle components of receptacle 43150 based upon internal sensor data generated by the wireless accessory sensor node when monitoring of the storage receptacle components and (b) determine that the identified sensed state of the at least one of the storage receptacle components is a type of sensed state that warrants confirmation via external sensor verification. Exemplary bridge node 43200, in this embodiment, is then further operative to (c) autonomously, in response to the determination in (b), establish a smart contract based connection with the external sensing infrastructure when the identified sensed state of the at least one of the storage receptacle components is the type of sensed state that warrants confirmation via external sensor verification (where the smart contract based connection provides at least paid-for use of data generated by one or more of the sensing elements 4705*a*-4705*c* of the external sensing infrastructure 4700 under predetermined pricing and access conditions, and (d) receive the external sensor data as the data generated by the one of the sensing elements of the external sensing infrastructure under the predetermined pricing and access conditions of the smart contract based connection with the external sensing infrastructure. In this further system embodiment, exemplary bridge node 43200 may also be programmatically operative to (e) validate that the sensed state of the at least one of the storage receptacle components exceeds a threshold condition based upon the external sensor data as part of receiving the external sensor data.

As such, exemplary bridge node 43200 in this embodiment may be programmatically operative to predict the change in future interactions by being operative to predict the change in future interactions based upon the external sensor data with consideration of the sensed state of at least one of the storage receptacle components based upon external sensor data. The bridge node 43200, using such a prediction, may then transmit a confirmed condition message to the backend server 100 to cause the backend server 100 to responsively initiate a dispatched logistics operation to address the sensed state of at least one of the storage receptacle components based upon external sensor data.

In yet a further embodiment, exemplary bridge node 43200 may be programmatically operative to predict the change in future interactions based upon the external sensor data while considering whether the sensed state of at least one of the storage receptacle components exceeds a threshold condition.

Smart Contract Interactions Involving a Node-Based Logistics Receptacle

In some embodiments set forth above, the embodiment's backend server and/or exemplary node-based logistics receptacle may interact with external third-party devices (such as external sensor networks operated by third parties or deployable mobile logistics assets operated by third parties) using exemplary smart contract agreements codified in tangible code that executes to govern the relative interactions. Those skilled in the art will appreciate that smart contracts are generally programmatic code stored on a blockchain that run automatically when predetermined rules are met. In more detail, an exemplary smart contract may be generally considered as a self-executing set of conditional rules with the terms of the agreed upon rules between the entities (e.g., between devices associated with such different entities) being directly written into lines of code (e.g., computerized transaction protocols that execute contract conditions making a transaction between devices/entities traceable, transparent and irreversible). Those skilled in the art appreciate that an exemplary smart contract is not an abstract concept and, instead, is readily understood to be tangibly implemented and considered a decentralized application on network 105 that executes logic (e.g., the programmatically coded conditional rules) in response to events where execution can result in the exchange of money, delivery of services (such as initiating use of a third party device), unlocking of content protected by digital rights management or other types of data manipulation (such as the exchange of sensor data gathered by the seller). Smart contracts may also be used to enforce privacy protection by, for example, facilitating the selective release of privacy-protected data to meet a specific request or permitting access to a particular secured area (such as the temporary storage area within receptacle 43150) or initiating use of a third party device for a particular task.

Further embodiments described below and illustrated in FIGS. 70-73 provide details regarding an enhanced node-based logistics receptacle that may advantageously interact with different types of external devices where such interactions are facilitated and governed under conditions and/or terms of an exemplary smart contract embodied in code on a blockchain.

Figure 70:
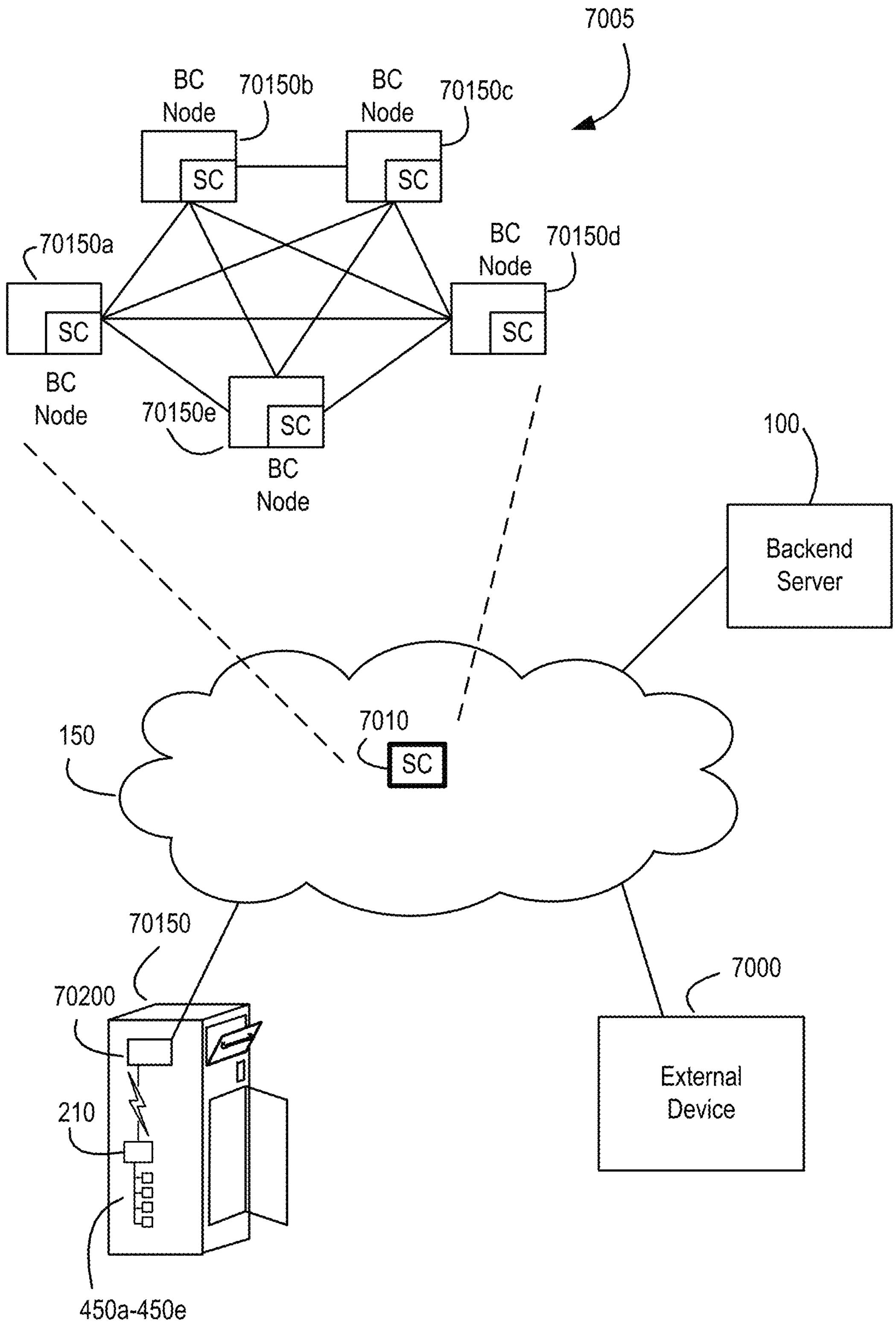
FIG. 70 is a diagram illustrating an exemplary system for self-executing enhanced interaction with a node-based logistics receptacle in accordance with an embodiment of the invention.

FIG. 70 is a diagram illustrating an exemplary system for self-executing enhanced interaction with a node-based logistics receptacle in accordance with an embodiment of the invention. Referring now to FIG. 70, an embodiment is shown with exemplary node-based logistics receptacle 70150, exemplary backend server 100, and an exemplary external device capable of communication over network 105, each of which are coupled to exemplary network 105. Exemplary connected node-based logistics receptacle 70150 is shown operative to communicate with backend server 100 with components similar to exemplary logistics receptacle 150 described relative to FIG. 2. Those skilled in the art will appreciate that exemplary connected logistics receptacle 70150 shown in FIG. 70 is similarly structured to exemplary connected/node-based logistics receptacle 150 and 150*a*, with the exception that exemplary receptacle 70150 is equipped with an exemplary bridge node 70200 and exemplary wireless accessory sensor node 210, which may be coupled to exemplary sensors (such as sensors 450*a*-450*e*). As such, exemplary receptacle 70150 includes an embodiment of monitoring and management code for execution by the processor in bridge node 70200 (controlling functionality of bridge node 70200).

As shown in FIG. 70, exemplary network 105 is shown as having at least a portion being implemented with an exemplary peer-to-peer blockchain infrastructure 7005. Those skilled in the art appreciate that exemplary peer-to-peer blockchain infrastructure 7005 may be implemented with blockchain protocol, which rides on top of Internet protocol (IP), and allows blockchain functions to be readily integrated into network-based applications. FIG. 70 further illustrates exemplary blockchain nodes 70150*a*-70150*e* disposed within this exemplary peer-to-peer blockchain infrastructure 7005 part of network 105 that may be used with exemplary smart contract protocol code 7010. In more detail, those skilled in the art will appreciate that the exemplary peer-to-peer blockchain infrastructure 7005 part of network 105, as a blockchain network, includes a distributed database accessible by each of exemplary blockchain nodes 70150*a*-70150*e*. Such a blockchain distributed database is a type of immutable ledger that is shared, distributed, fault-tolerant and an append-only database that maintains the records in "blocks" that facilitates transactions. In blockchain, data elements depicting an action or a transaction are stored in blocks combined in an on-going and growing chain, such as a block in a chain or sequence of transactions Although the blocks are accessible by all the blockchain network users, they cannot be deleted or altered by them. The blocks are connected to each other in a chain as each block has a hash value of its predecessor. Each block contains several verified transactions. Also, each block includes a timestamp indicating the creation time of that block, and a random number (nonce) for cryptographic operations. As such, exemplary blockchain network 7005 consists of blockchain nodes 70150*a*-70150*e* that maintain the blockchain in a peer-to-peer, distributed fashion where blockchain nodes 70150*a*-70150*e* have access to the blocks, but they cannot completely control them. The blockchain technology allows the communicating entities/devices coupled to network 105 (and exemplary blockchain network 7005) to interact in the absence of a trusted third-party. The interactions are recorded in the distributed blockchain database available to each node. When such an entity/device (e.g., a blockchain user/device/entity) needs to communicate with or interact with another user/device/entity, it broadcasts its "transaction" to the blockchain network 7005. Those skilled in the art will appreciate that nodes 70150*a*-70150*e* in the network 7005 check if the communication/connection/interaction is valid and construct a new block of valid transactions (i.e., combining several valid transactions). If the new block is found valid, it is attached to the blockchain database and cannot be deleted or altered later. Otherwise, the block is dropped. Such blocks added, for example, may reflect a payment (e.g., machine-to-machine (M2M) micro-payment) under predetermined pricing terms as explained in more detail below.

As noted above, FIG. 70 further illustrates the exemplary blockchain nodes 70150*a*-70150*e* disposed within this exemplary peer-to-peer blockchain infrastructure 7005 part of network 105 with exemplary smart contract protocol code 7010. And as previously explained above, those skilled in the art will appreciate that such an exemplary smart contract protocol code 7010 is generally considered as a self-executing agreed upon set of conditional rules with the terms of the agreement between the entities (e.g., between devices associated with such different entities) being directly written into lines of code (e.g., computerized transaction protocols that execute contract conditions making a transaction between devices/entities traceable, transparent and irreversible). Those skilled in the art appreciate that exemplary smart contract protocol code 7010 is readily understood to be tangibly implemented via blockchain nodes 70150*a*-70150*e* and considered a decentralized application on network 105 that executes the lines of code (e.g., the programmatically coded conditional rules) in response to events where execution can result in the exchange of money, delivery of services and/or data (such as initiating use of an external device 7000 or access to data generated by an external device 7000), unlocking of a trusted access privilege (such as an access privilege granted to external device 7000 or those operating device 7000). In other words, exemplary smart contract protocol code 7010 may facilitate the selective release of data from external device 7000 to meet a specific request, facilitate or initiate a service to be provided by external device 7000, or permit trusted access by external device 7000 (or its operators) to a particular secured area (such as the temporary storage area within receptacle 70150).

As shown in FIG. 70, an embodiment of a system for self-executing enhanced interaction with exemplary node-based logistics receptacle 70150 is illustrated. Exemplary node-based logistics receptacle 70150, similar to that described for receptacle 150, has different storage receptacle components including at least an entrance opening 155/156 for receiving a delivery item, a temporary storage area 205 for temporarily maintaining the delivery item once received, and a retrieval door 160 providing selective access to the delivery item within the temporary storage area 205. The system embodiment includes a wireless accessory sensor node (e.g., node 210 disposed on exemplary node-based logistics receptacle 70150) and a bridge node (e.g., exemplary bridge node 70200 disposed on exemplary node-based logistics receptacle 70150). In some embodiments, those skilled in the art will appreciate that such a system may include the node-based logistics receptacle while other embodiments may more generally include just the receptacle's bridge node and a wireless accessory sensor node as elements. In other words, the storage receptacle components (e.g., an entrance opening for receiving the delivery item, a temporary storage area for temporarily maintaining the delivery item once received, and a retrieval door providing selective access to the delivery item within the temporary storage area) may be elements of a system embodiment along with the receptacle's bridge node and a wireless accessory sensor node as elements.

The wireless accessory sensor node 210 has or is coupled to sensors (e.g., sensors 450*a*-450*e*) that collectively monitor the storage receptacle components of the node-based logistics receptacle 70150, where each of the sensors being operative to generate sensor data reflecting one or more interactions with one or more of the storage receptacle components of the node-based logistics receptacle 70150. Such interactions may, for example, be passing of the delivery item through the entrance opening, movement of the entrance opening, deposit of the delivery item within the temporary storage area 205, and a change in status of the retrieval door 160.

Exemplary bridge node 70200 (similar to that in exemplary bridge node 200) has a bridge node processor 201, a bridge node memory 202 coupled to the bridge node processor 201, and a communication interface 203 coupled to the bridge node processor 201. The bridge node memory 202 of exemplary bridge node 70200 maintains an embodiment of monitoring and management code for execution by the bridge node processor 201. During execution of such code, bridge node processor 201 of exemplary bridge node 70200 becomes programmatically operative to upload information related the sensor data from the wireless accessory sensor node 210 in response to a signal broadcast by the wireless accessory sensor node 210 and detect an external device 7000 separate from the node-based logistics receptacle 70150 over the communication interface 203.

During execution of such code, bridge node processor 201 of exemplary bridge node 70200 is further programmatically operative to communicate with the external device 7000 over the communication interface to establish a smart contract based connection with the external device 7000 (where the smart contract based connection provides an interaction privilege associated with the external device 7000), interface with the external device 7000 according to the interaction privilege, and transmit an update message to the backend server using the communication interface, the update message corresponding to at least a portion of the uploaded information related to the sensor data and information related to interfacing with the external device.

In such a system embodiment, those skilled in the art will appreciate that establishing such a smart contract based connection by one network device (e.g., exemplary bridge node 70200) with another network device (e.g., external device 7000) may be generally accomplished with the execution of exemplary smart contract application 7010 (a type of decentralized application on the exemplary peer-to-peer blockchain infrastructure 7005 part of network 105) that will create and allow such a connection and interaction with the two devices under terms of that smart contract application 7010. In other words, an embodiment may involve running an exemplary decentralized application residing on one of the devices or on a part of network 105 representing the smart contract 7010 in response to detecting external device 7000.

Figure 71:
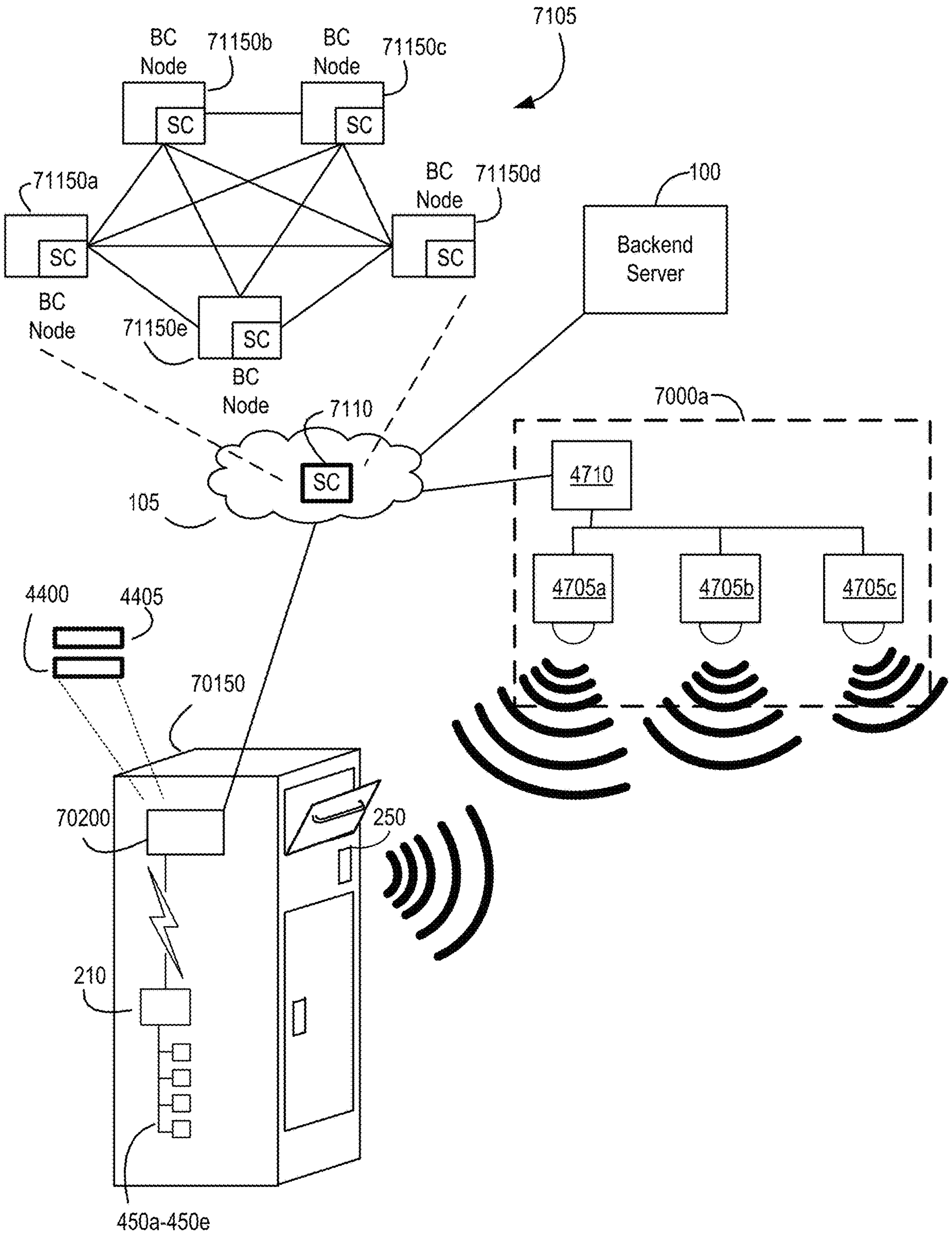
FIG. 71 is a diagram illustrating another exemplary system for self-executing enhanced interaction with a node-based logistics receptacle that interfaces with an exemplary source of data related to an interaction with the node-based logistics receptacle in accordance with an embodiment of the invention.
Figure 72:
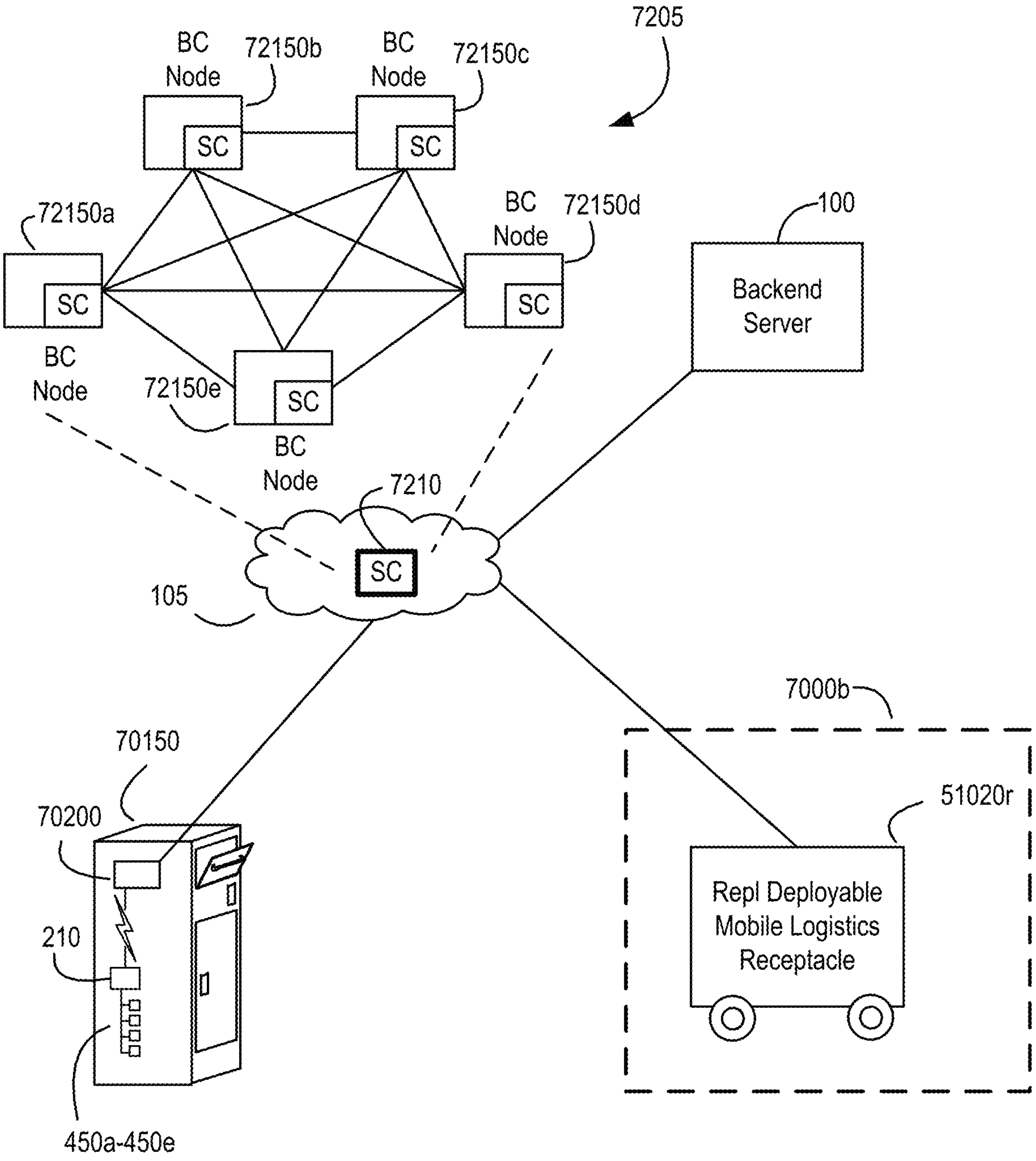
FIG. 72 is a diagram illustrating another exemplary system for self-executing enhanced interaction with a node-based logistics receptacle that interfaces with an exemplary device providing a service related to an interaction with the node-based logistics receptacle in accordance with an embodiment of the invention.
Figure 73:
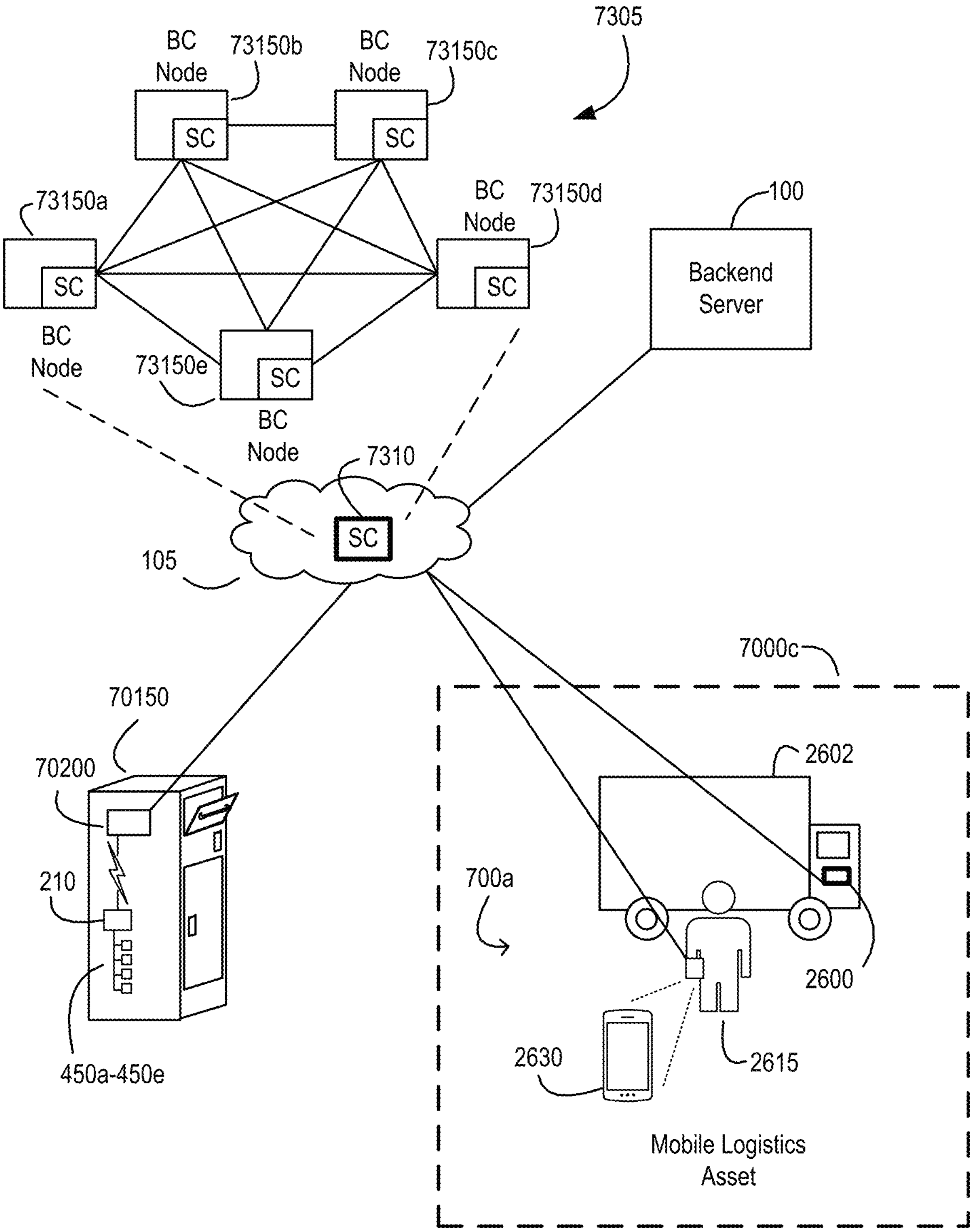
FIG. 73 is a diagram illustrating another exemplary system for self-executing enhanced interaction with a node-based logistics receptacle that interfaces with an exemplary device that may interface with the node-based logistics receptacle with trusted access to within the node-based logistics receptacle in accordance with an embodiment of the invention.

FIGS. 71-73 provide more detailed examples with different types of external devices 7000 and what may be done in different embodiments when interfacing with exemplary external devices (e.g., exemplary external devices 7000*a*-7000*c*) according to the smart contract based connection and the interaction privilege associated with that external device.

In a more detailed example, FIG. 71 is a diagram illustrating another exemplary system for self-executing enhanced interaction with exemplary node-based logistics receptacle 70150 that interfaces with an exemplary source of data (e.g., external device 7000*a*) related to an interaction with the node-based logistics receptacle 70150 in accordance with an embodiment of the invention. Those skilled in the art will appreciate that exemplary receptacle 70150 in this embodiment may operate similar to that of exemplary receptacle 43150 (which may use exemplary management profile 4400 and exemplary environmental context data

4405) with respect to its ability to take advantage of exemplary smart contract application 7110 in establishing the connection with exemplary external device 7000*a*.

As shown in FIG. 71 (and similar to that shown in FIG. 70), at least a portion of network 105 is similarly implemented with an exemplary peer-to-peer blockchain infrastructure 7105. Those skilled in the art appreciate that exemplary peer-to-peer blockchain infrastructure 7105 may be implemented with blockchain protocol, which rides on top of Internet protocol (IP), and allows blockchain functions to be readily integrated into network-based applications. FIG. 71 further illustrates exemplary blockchain nodes 71150*a*-71150*e* disposed within this exemplary peer-to-peer blockchain infrastructure 7105 part of network 105 that may be used with exemplary smart contract application code 7110.

The system embodiment illustrated in FIG. 71 has exemplary external device 7000*a* as an external source of data related to an interaction with the node-based logistics receptacle 70150. As such, exemplary external device 7000*a*, as an external data source (e.g., source of external sensor data), is operative to provide the bridge node 70200 with the data related to the interaction with the node-based logistics receptacle 70150 according to the interaction privilege provided by smart contract application 7110. The exemplary bridge node 70200 on receptacle 70150 (similar to bridge node 43200 on receptacle 43150) is programmatically operative to interface with the external device 7000*a* according to the interaction privilege by being further operative to receive data related to the interaction (e.g., external sensor data) with the node-based logistics receptacle 70150 under terms defined by the interaction privilege from exemplary smart contract application 7110.

In FIG. 71 (similar to that shown in FIG. 47), the smart contract based connection (based upon code in exemplary smart contract application 7110) provides paid-for use of data generated by one (or more) of the sensing elements 4705*a*-4705*c* of the external sensing infrastructure 4700 (as exemplary external device 7000*a*) as data related to the interaction with the node-based logistics receptacle 70150. As such, the system's exemplary bridge node 70200 may then receive the external sensor data as the data generated by the one (or more) sensing element(s) of the external sensing infrastructure 4700 (as a type of external device 7000*a*) and related to the interaction with node-based logistics receptacle 70150 under terms of the smart contract based connection with the external sensing infrastructure 4700 governed by exemplary smart contract application 7110. In more detail, such a smart contract based connection based upon code in exemplary smart contract application 7110 may, for example, be implemented by a protocol for an automated transaction stored on a blockchain and run in response to meeting at least a payment condition for receiving the data generated by the one (or more) sensing element(s) of the external sensing infrastructure 4700 and related to the interaction with node-based logistics receptacle 70150. The smart contract based connection based upon code in exemplary smart contract application 7110 may, in some implementations, provide a cryptographically secure source of the data generated by the one (or more) sensing element(s) of the external sensing infrastructure 4700 and related to the interaction with node-based logistics receptacle 70150. In some embodiments, the smart contract based connection based upon code in exemplary smart contract application 7110 may provide for receiving the data generated by the one (or more) sensing element(s) of the external sensing infrastructure 4700 related to the interaction with node-based logistics receptacle 70150 under predetermined pricing terms as the payment condition. Such predetermined pricing terms may, for example, relate to a blockchain-based payment for access rights to the data generated by the one (or more) sensing element(s) of the external sensing infrastructure 4700 (related to the interaction with node-based logistics receptacle 70150) and/or a blockchain-based payment for access rights to the data generated by any of the sensing elements of the external sensing infrastructure (related to the interaction with node-based logistics receptacle 70150). In another example, such predetermined pricing terms may relate to a blockchain-based payment on a per-access basis for access rights to the data generated by at least the one (or more) sensing element(s) of the external sensing infrastructure 4700 and related to the interaction with node-based logistics receptacle 70150.

Those skilled in the art will appreciate that in the system embodiment illustrated in FIG. 71, exemplary external device 7000*a* may be implemented as an external sensor operative to monitor the interaction with the node-based logistics receptacle 70150, an external sensor operative to monitor a local environment proximate the node-based logistics receptacle 70150 for the interaction with the node-based logistics receptacle 70150, an external sensing infrastructure having at least one sensing element (such as sensing element 4705*a*) operative to monitor the interaction with the node-based logistics receptacle 70150, and an external sensing infrastructure having at least one sensing element (such as an image sensor, video sensor, or a machine vision sensor operative to identify an object (e.g., parcel approaching the receptacle 70150) in the local environment proximate the node-based logistics receptacle 70150) as part of monitoring the interaction operative to monitor a local environment proximate the node-based logistics receptacle 70150 for the interaction with the node-based logistics receptacle 70150.

In more detail, the smart contract based connection established via exemplary smart contract application 7110 may provide an interaction privilege associated with the external device 7000*a* where the interaction privilege defines a time-based privilege restricting when the bridge node 70200 is allowed to interface with the external device 7000*a* and receive the interaction related data/information. In another example, such an interaction privilege defines a cost-based privilege associated with when the bridge node 70200 interfaces with the external device 7000*a* to receive the information to receive the interaction related data/information. In still another example, the interaction privilege defines an identity-based privilege associated whether the bridge node 70200 is authorized to interface with the external device 7000*a* to receive the related data/information.

In another detailed example, FIG. 72 illustrates another exemplary system for self-executing enhanced interaction with exemplary node-based logistics receptacle 70150 that interfaces with an exemplary external device 7000*b* where external device 7000*b* provides a service related to an interaction with exemplary node-based logistics receptacle 70150 in accordance with an embodiment of the invention. As shown in FIG. 72 (and similar to that shown in FIG. 70), at least a portion of network 105 is similarly implemented with an exemplary peer-to-peer blockchain infrastructure 7205 (similar to that of exemplary peer-to-peer blockchain infrastructure 7105 and 7005). Those skilled in the art appreciate that exemplary peer-to-peer blockchain infrastructure 7205 may be implemented with blockchain protocol, which rides on top of Internet protocol (IP), and allows blockchain functions to be readily integrated into network-based applications. FIG. 72 further illustrates exemplary blockchain nodes 72150*a*-72150*e* disposed within this exemplary peer-to-peer blockchain infrastructure 7205 part of network 105 that may be used with exemplary smart contract application code 7210.

The system embodiment illustrated in FIG. 72 has exemplary external device 7000*b* as an external logistics asset related to an interaction with the node-based logistics receptacle 70150. As such, exemplary external device 7000*b* is an exemplary external logistics asset (such as exemplary replacement deployable mobile logistics receptacle 51020*r*) operative to provide a dispatched logistics operation relative to the node-based logistics receptacle 70150 under terms defined by the interaction privilege from exemplary smart contract application 7210.

The exemplary bridge node 70200 on receptacle 70150 in the embodiment shown in FIG. 72 is programmatically operative to interface with the external device 7000*b* according to the interaction privilege by being further operative to permissively interface with the external device 7000*b* (e.g., exemplary replacement deployable mobile logistics receptacle 51020*r*) as part of a dispatched logistics operation relative to the node-based logistics receptacle 70150 under self-executing terms of the smart contract based connection and the interaction privilege based upon code in exemplary smart contract application 7210. In more detail, such a smart contract based connection based upon code in exemplary smart contract application 7210 may, for example, be implemented by a protocol for an automated transaction stored on a blockchain and run in response to meeting at least a payment condition as the interaction privilege for providing the dispatched logistics operation relative to the node-based logistics receptacle 70150. Such a payment condition may, for example, relate to a blockchain-based payment for authorized interaction with the node-based logistics receptacle 70150 or a blockchain-based payment on a per-logistics operation basis for the authorized interaction with the node-based logistics receptacle 70150.

In one embodiment, exemplary external device 7000*b* may be implemented as an external wireless transceiver operated by a logistics asset (mobile logistics receptacle 51020*r*) providing the dispatched logistics operation relative to the node-based logistics receptacle 70150 under the smart contract based connection and the interaction privilege based upon code in exemplary smart contract application 7210. Such an external wireless transceiver may, for example, be implemented as a vehicle-based transceiver or a mobile transceiver operated by personnel associated with the logistics asset.

In the system embodiment illustrated in FIG. 72, the interaction privilege based upon code in exemplary smart contract application 7210 may, for example, define a time-based privilege restricting when the bridge node 70200 is allowed to interface with the external logistics asset 7000*b*, a cost-based privilege associated with when the bridge node 70200 interfaces with the external logistics asset 7000*b*, and/or an identity-based privilege associated whether the bridge node 70200 is authorized to interface with the external logistics asset 7000*b*.

In yet another detailed example, FIG. 73 illustrates another exemplary system for self-executing enhanced interaction with exemplary node-based logistics receptacle 70150 that interfaces with an exemplary external device 7000*c* where external device 7000*c* may be entrusted with access (also referred to as provided with a trusted access privilege) to within exemplary node-based logistics receptacle 70150 as another type of interaction with exemplary node-based logistics receptacle 70150 in accordance with an embodiment of the invention. As shown in FIG. 73 (and similar to that shown in FIG. 70), at least a portion of network 105 is similarly implemented with an exemplary peer-to-peer blockchain infrastructure 7305 (similar to that of exemplary peer-to-peer blockchain infrastructure 7205, 7105 and 7005). Those skilled in the art appreciate that exemplary peer-to-peer blockchain infrastructure 7305 may be implemented with blockchain protocol, which rides on top of Internet protocol (IP), and allows blockchain functions to be readily integrated into network-based applications. FIG. 73 further illustrates exemplary blockchain nodes 73150*a*-73150*e* disposed within this exemplary peer-to-peer blockchain infrastructure 7305 part of network 105 that may be used with exemplary smart contract application code 7310.

The system embodiment illustrated in FIG. 73 has exemplary external device 7000*c* as an external mobile logistics asset 700*a* that may interact with node-based logistics receptacle 70150 by depositing items within receptacle 70105 or retrieving items from within receptacle 70150 via a type of trusted access provided via exemplary smart contract application code 731. In more detail, the interaction privilege based upon code in exemplary smart contract application 7310 may be a trusted access privilege relative to exemplary node-based logistics receptacle 70150, such as a trusted access privilege for authorized access to within the node-based logistics receptacle 70150. Thus, in the system embodiment illustrated in FIG. 73, an example may have bridge node 70200, when executing the monitoring and management code, being programmatically operative to interface with the external device 7000*c* according to the trusted access privilege by being further operative to transmit a privilege inquiry through the communication interface 203 to the external device 7000*c* (e.g., to one of transceivers 2600, 2630, which may be augmented reality devices); receive a privilege response in response to the privilege inquiry through the communication interface 203 from the external device 7000*c*; and provide access to within the node-based logistics receptacle 70150 when the privilege response corresponds to an access right granted by the trusted access privilege based upon code in exemplary smart contract application 7310. Providing such access to within node-based logistics receptacle 70150 may, for example, have bridge node 70200 being operative to actuate the retrieval door 160 from a secured position to an unsecured position. Exemplary bridge node 70200 may, in some embodiments, also be operative to record (or cause to be recorded) a blockchain-based payment for providing the access to within the node-based logistics receptacle 70150 in accordance with the trusted access privilege and the privilege response. Furthermore, exemplary bridge node 70200 may be operative to record (or cause to be recorded) the blockchain-based payment by being further operative to update a blockchain-based ledger on infrastructure 7305 to reflect the blockchain-based payment.

In some embodiments, an exemplary trusted access privilege based upon code in exemplary smart contract application 7310 may, for example, define a time-based access privilege restricting when the bridge node 70200 is allowed to provide access to within the node-based logistics receptacle 70150 (e.g., a time of day access privilege restricting when the bridge node 70200 is allowed to provide access to within the node-based logistics receptacle 70150 and/or a day of week access privilege restricting when the bridge node 70200 is allowed to provide access to within the node-based logistics receptacle 70150). In another example, an exemplary trusted access privilege based upon code in exemplary smart contract application 7310 may, for example, define a cost-based privilege associated with a payment associated with when the bridge node 70200 provides access to within the node-based logistics receptacle 70150. In still another example, an exemplary trusted access privilege based upon code in exemplary smart contract application 7310 may, for example, define an identity-based privilege associated whether the bridge node 70200 is authorized to provide access to within the node-based logistics receptacle 70150 for a logistics entity associated with the external device 7000*c* (e.g., mobile logistics entity 700*a*, which has vehicle-based transceiver 2600 on vehicle 2602 and mobile transceiver 2630 operated by personnel 2615 associated with mobile logistics asset 700*a*).

In some embodiments involving such a trusted access privilege defined by code in exemplary smart contract application 7310, exemplary bridge node 70200 may validate the interaction (e.g., monitor what or how much is taken out or placed within receptacle 70150) during such trusted access. For example, exemplary bridge node 70200 may be operative to interface with the external device 7000*c* according to the trusted access privilege by being further operative to transmit a privilege inquiry through the communication interface 203 to the external device 7000*c* (e.g., one or more of transceivers 2600, 2630); receive a privilege response in response to the privilege inquiry through the communication interface from the external device 7000*c*; provide access to within the node-based logistics receptacle 70150 when the privilege response corresponds to an access right granted by the trusted access privilege; and validate what is taken out of the node-based logistics receptacle 70150 after providing access to within the node-based logistics receptacle 70150. Validating, for example, may have bridge node 70200 being operative to detect what is taken out of the node-based logistics receptacle 70150 and whether what is detected as taken out is greater than a threshold occupancy level within the node-based logistics receptacle 70150. In more detail, this may have bridge node 70200 being operative to detect what is taken out of the node-based logistics receptacle 70150 is greater than the threshold occupancy level within the node-based logistics receptacle 70150 based upon subsequent capacity information uploaded from an onboard wireless accessory sensor node (e.g., sensor data gathered by node 210) as a result of interfacing with the external device 7000*c* under terms of the trusted access privilege. A further example may have exemplary bridge node 70200 being operative to transmit a capacity update message to the backend server 100 using the communication interface 203 based upon the subsequent capacity information uploaded from the wireless accessory sensor node 210. Still another example may have bridge node 70200 being operative to transmit such a capacity update message to the backend server 100 using the communication interface 203 when what is taken out of the node-based logistics receptacle 70150 is greater than the threshold occupancy level within the node-based logistics receptacle 70150 based upon the subsequent capacity information uploaded from the wireless accessory sensor node 210.

Enhanced Interaction with a Mobile Equipped Parcel Customer

In further embodiments, an exemplary node-based logistics receptacle may sense an approaching parcel customer and interact with the parcel customer with knowledge of an anticipated drop off of a delivery item. Based upon the detection of such a potential parcel customer, the exemplary node-based logistics receptacle may interact with the approaching parcel customer through the customer's mobile device to, for example, verify if a deposit was or is to be made outside of the exemplary node-based logistics receptacle and coordinate with the backend server to initiate a dispatched logistics operation (e.g., pickup operation) with a higher level of urgency. The parcel customer's mobile device, in some examples, may be an augmented reality type of device (e.g., an AR headset having sensory, user input, and communication capabilities) that helps free the parcel customer's hands from device operation and focus on carrying the delivery item itself. In some examples, the node-based logistics receptacle may use external sensor data (e.g., from an onboard externally focused sensor or a separately disposed external sensor) to generate carrying confirmation data on whether the parcel customer is carrying a delivery item as part of such enhanced interaction where a drop off verification confirmation message and detected placement of the delivery item may be used to trigger communications with the backend server on initiating an appropriate dispatched logistics operation to service the node-based logistics receptacle.

Figure 74A:
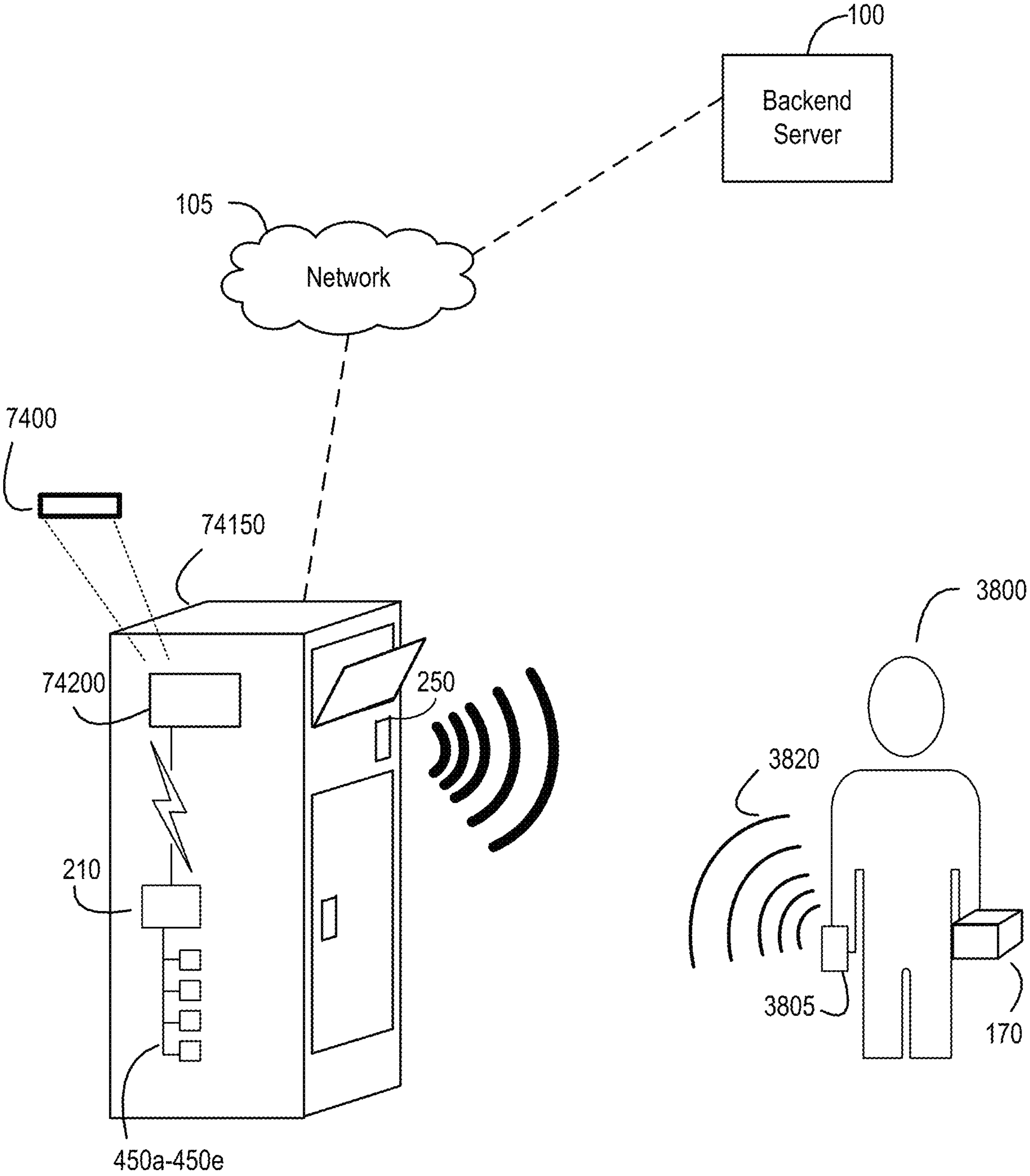
FIGS. 74A-74C are diagrams illustrating an exemplary system for enhanced interaction with a node-based logistics receptacle during an external drop off of a delivery item by a parcel customer operating a mobile user device in accordance with embodiments of the invention.
Figure 74B:
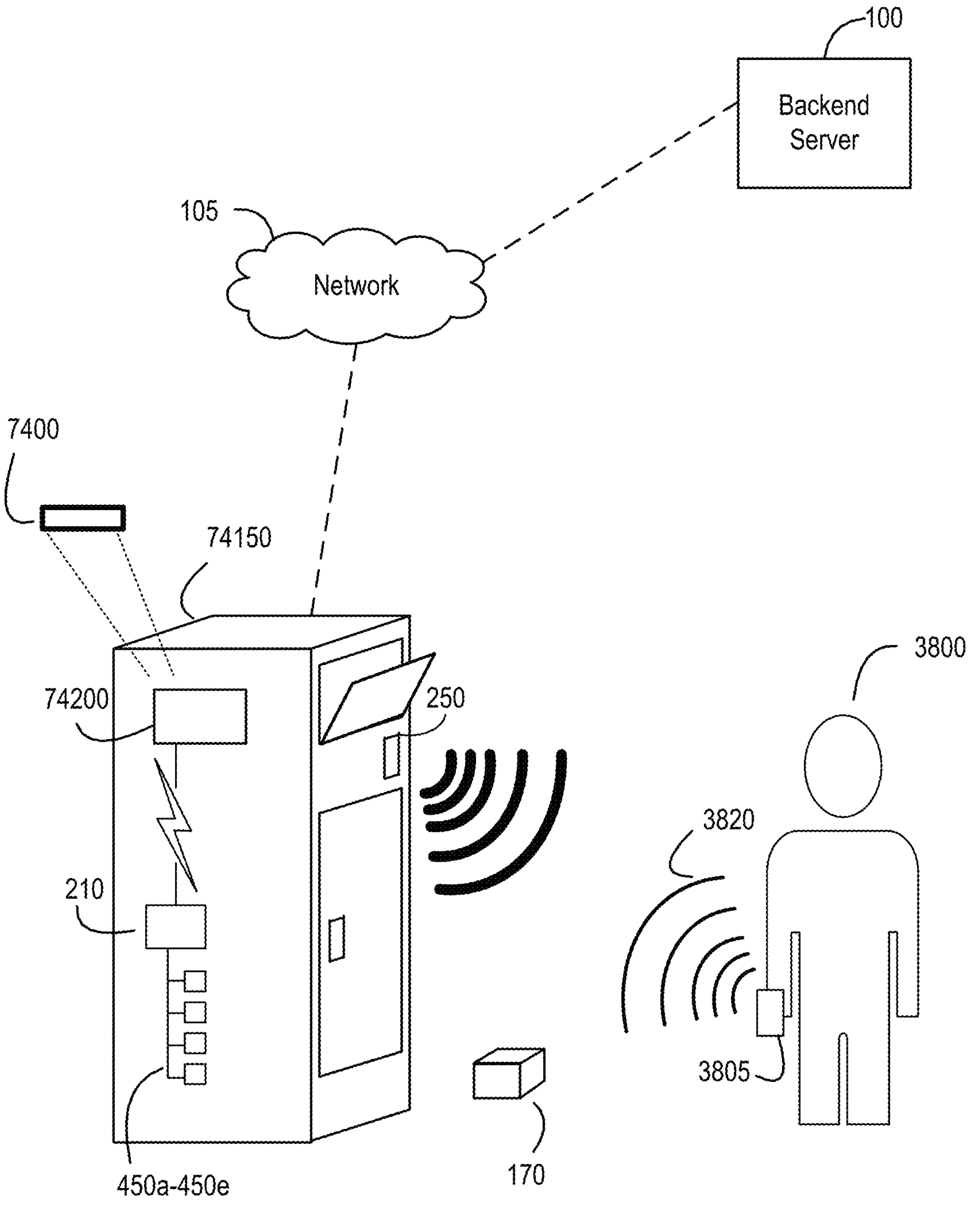
Figure 74C:
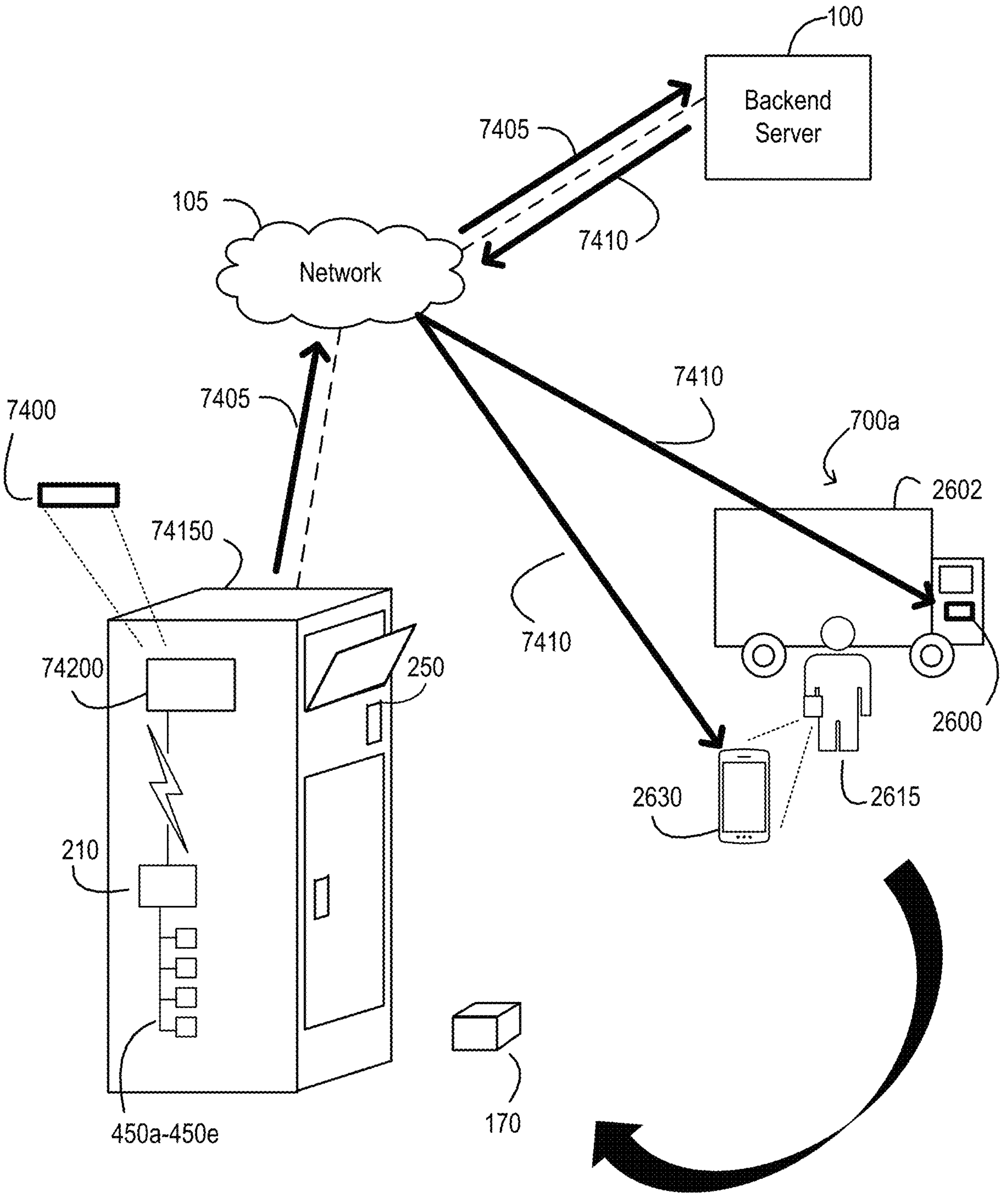

FIGS. 74A-74C are diagrams illustrating an exemplary system for enhanced interaction with a node-based logistics receptacle during an external drop off of a delivery item by a parcel customer operating a mobile user device in accordance with embodiments of the invention. Referring now to FIG. 74A, exemplary node-based logistics receptacle 74150 is shown operative to communicate with backend server 100 with components similar to exemplary logistics receptacle 150 described relative to FIG. 2. Those skilled in the art will appreciate that exemplary connected logistics receptacle 74150 shown in FIGS. 74A-76C is similarly structured to exemplary connected/node-based logistics receptacle 150 and 150*a*, with the exception that exemplary receptacle 74150 is equipped with an exemplary bridge node 74200 that uses further types of data maintained on the bridge node 74200 (e.g., exemplary anticipated entity data e shown and exemplary carrying confirmation data 7500) and operative to use different types of external sensors that monitor interactions with receptacle 74150 and areas proximate to receptacle 74150 (e.g., an external sensor used with external sensor node 250 as part of receptacle 74150, exemplary external sensor 4300 disposed external to and separate from receptacle 74150). As such, exemplary receptacle 74150 includes an embodiment of monitoring and management code for execution by the processor in bridge node 74200 (controlling functionality of bridge node 74200 in such additional embodiments) and use of such data (e.g., exemplary anticipated entity data 7400 shown and exemplary carrying confirmation data 7500) maintained within memory 305/310 of bridge node 74200 as part of enhanced interaction between exemplary node-based logistics receptacle 74150 and a mobile user device 3805 equipped parcel customer 3800 as implemented in exemplary node-based logistics receptacle 74150. Those skilled in the art will appreciate that backend server 100 may, in some embodiments, transmit updates to the exemplary anticipated entity data 7400 for use by the exemplary connected logistics receptacle 74150.

As shown in FIG. 2, exemplary logistics receptacle 150 includes exemplary external sensor node 250 having at least one sensor (e.g., motion sensor, proximity sensor, range sensor, and the like) that monitors the near-by or local environment proximate to exemplary connected logistics receptacle 150. Consistent with this and as shown in FIGS. 74A-76C, exemplary connected logistics receptacle 74150 is shown including exemplary external sensor node 250 having at least one sensor that is disposed on receptacle 74150. Those skilled in the art will appreciate that the externally focused sensor coupled to external sensor node 250 may be disposed relative to logistics receptacle 74150 so as to have a sensing orientation to monitor particular locations proximate receptacle 74150 for any externally deposited parcel or delivery item.

Referring back to FIG. 74A, an exemplary system for enhanced interaction with node-based logistics receptacle 74150 during an external drop off of a delivery item 170 by a parcel customer 3800 operating mobile user device 3805 is illustrated. In general, an embodiment of such an exemplary system includes a wireless accessory sensor node (such as exemplary wireless accessory sensor node 210) and a bridge node (such as exemplary bridge node 74200), each of which are disposed on the node-based logistics receptacle 74150.

In this system embodiment, the wireless accessory sensor node includes at least one internal sensor that collectively monitors one or more of the storage receptacle components (e.g., entrance opening, temporary storage area, selectively accessible retrieval door) of the node-based logistics receptacle 74150 and generates internal sensor data reflecting an interaction with one or more of the storage receptacle components of the node-based logistics receptacle 74150. For example, such an internal sensor monitoring an entrance opening to the node-based logistics receptacle 74150 may be implemented with a variety of different types of internal sensors, such as a motion sensor detecting a change in motion of the entrance opening, a motion sensor detecting the change in motion of the entrance opening and a failure to return to a prior state of the one or more of the entrance opening, a motion sensor detecting movement of what passes through the entrance opening, an inertial sensor detecting a change in motion of the entrance opening, a status sensor detecting a change in orientation of the entrance opening, an accelerometer detecting a change in motion of the entrance opening, and/or a magnetic sensor detecting a change in position of the entrance opening. In another example, such an internal sensor monitoring the temporary storage area within the node-based logistics receptacle 74150 may be implemented with different types of sensors, such as an image sensor detecting a change in what is within the temporary storage area, a scale detecting a change in what is within the temporary storage area, a force sensor detecting a change in what has been deposited within the temporary storage area, a light sensor detecting a change in light within the node-enabled logistics receptacle, and/or a chemical sensor detecting presence of a chemical within the temporary storage area. In yet another example, the internal sensor monitoring the selectively accessible retrieval door on the node-based logistics receptacle 74150 may be implemented with different types of sensors, such as a motion sensor detecting a change in state of the selectively accessible retrieval door, a motion sensor detecting a change in state of the selectively accessible retrieval door and a failure to return to a prior state of the selectively accessible retrieval door, an inertial sensor detecting a change in inertial motion of the selectively accessible retrieval door, a gyroscopic sensor detecting a change in movement of the selectively accessible retrieval door, a status sensor detecting a change in orientation of the selectively accessible retrieval door, a magnetic sensor detecting a change in position of the selectively accessible retrieval door, and/or a lock sensor detecting a change in secured state of the selectively accessible retrieval door.

In this system embodiment, the wireless accessory sensor node also includes (e.g., is coupled to) an external sensor that monitors a local environment proximate the node-based logistics receptacle 74150. Such an external sensor (e.g., the external sensor used with and coupled to exemplary wireless accessory sensor node 250) is operative to generate external sensor data relative to the local environment proximate the node-based logistics receptacle 74150 where such external sensor data is then used, for example, to detect and confirm if a delivery item has been placed near the receptacle 74150 as part of customer 3800 externally depositing such a delivery item. For example, and in more detail, such an external sensor may be implemented with an external motion, image or video sensor detecting a change in what has been placed within a predetermined range of the node-based logistics receptacle 74150 representative of the local environment proximate the node-based logistics receptacle 74150. In another example, such an external sensor may be a machine vision sensor operative to identify an object in the local environment proximate the node-based logistics receptacle 74150 and detect a change in what has been placed within a predetermined range of the node-based logistics receptacle 74150 representative of that local environment based upon the identified object (e.g., package 170). In still another example, the external sensor may be a range sensor (e.g., a proximity sensor, a depth sensor, a LiDAR sensor, an infrared sensor, and a laser-based sensor) detecting the change in what has been placed within the predetermined range of the node-based logistics receptacle 74150 representative of the local environment proximate the node-based logistics receptacle 74150. Further still, an exemplary external sensor may be implemented with at least one of multiple sensing elements of an external sensing infrastructure disposed within a viewable range that includes the node-based logistics receptable 74150, where at least one of the sensing elements is operative to provide sensing element sensor data to the wireless accessory sensor node as the external sensor data. Those skilled in the art will appreciate that an exemplary wireless accessory sensor node in such an embodiment may be coupled to different sensors (e.g., one or more internal sensors as well as one or more external sensors) consistent with the present disclosure.

In this system embodiment, those skilled in the art will appreciate that the bridge node 74200 includes a bridge node processor, a bridge node memory coupled to the bridge node processor and maintaining monitoring and management code for execution by the bridge node processor, and a wireless transceiver-based communication interface coupled to the bridge node processor that is operative to communicate with at least backend server 100.

In operation when executing the monitoring and management code as part of this system embodiment, the bridge node processor of bridge node 74200 is programmatically configured so as to be operative to detect, using the communication interface, a wireless communication signal 3820 broadcast from the mobile user device 3805 operated by the parcel customer 3800. In more detail, the bridge node processor of bridge node 74200 may be programmatically operative to detect the wireless communication signal 3820 broadcast by being further operative to detect an RF signature associated with the parcel customer 3800 (e.g., where such an RF signature is associated with at least one of the parcel customer 3800 and the mobile user device 3805 operated by the parcel customer 3800). More specifically, another example of such detection may have the bridge node processor of bridge node 74200 being operative to detect the wireless communication signal 3820 by being further operative to detect an RF signature related to the wireless communication signal 3820 and identify the RF signature as corresponding to an anticipated drop off.

In even more detail, yet another example of such detection may have the bridge node memory of bridge node 74200 maintaining anticipated entity data 7400 including entity information on one or more entity anticipated to make a deposit at the node-based logistics receptacle 74150. In this example, the bridge node processor of bridge node 74200 may be programmatically operative to detect the wireless communication signal 3820 by being further operative to detect an RF signature related to the wireless communication signal 3820, compare the RF signature with the entity information in the anticipated entity data 7400 maintained in the bridge node memory, and identify the RF signature as corresponding to an anticipated drop off entity based upon the results of that comparison. In some embodiments, the bridge node processor of bridge node 74200 may be receive, using the communication interface, an update to the anticipated entity data 7400. Such an update to the anticipated entity data 7400 may, for example, have updated entity information on at least one additional entity anticipated to make a deposit at the node-based logistics receptacle 74150.

In further embodiments, the bridge node processor of bridge node 74200 may be programmatically operative to detect the wireless communication signal 3820 by being further operative to detect information associated with the parcel customer 3800 as part of a wireless message associated with or related to signal 3820 or another signal subsequently broadcast by mobile user device 3805. Such information associated with the parcel customer 3800 and part of the wireless message may, for example, be associated with the mobile user device 3805 operated by the parcel customer 3800. In more detail, the bridge node processor of bridge node 74200 may be programmatically operative to detect the wireless communication signal 3820 by being further operative to detect information associated with the parcel customer 3800 as part of a wireless message related to the wireless communication signal 3820, and identify the information associated with the parcel customer 3800 as corresponding to an anticipated drop off entity. In even more detail, an example may have the bridge node processor of bridge node 74200 may be programmatically operative to detect the wireless communication signal 3820 by being further operative to detect information associated with the parcel customer 3800 as part of a wireless message related to the wireless communication signal 3820, compare the information associated with the parcel customer 3800 with entity information in the anticipated entity data 7400 maintained in the bridge node memory, and identify the information associated with the parcel customer 3800 as corresponding to an anticipated drop off entity based upon that comparison.

Referring now to FIG. 74B, the bridge node processor of bridge node 74200 in such a system embodiment is programmatically operative to detect placement of the delivery item 170 proximate the node-based logistics receptacle 74150 based upon the external sensor data generated by the external sensor and without information reflecting the interaction with the one or more of the storage receptacle components using the internal sensor data. In more detail, those skilled in the art will appreciate that the bridge node processor of bridge node 74200 in such a system embodiment is programmatically operative to detect the placement of the delivery item 170 proximate the node-based logistics receptacle 74150 (such as that shown in FIG. 74B) by being further operative to receive, from the system's wireless accessory sensor node, information corresponding to the external sensor data without receiving information corresponding to the internal sensor data. In even more detail, an example embodiment may have the bridge node processor of bridge node 74200 being programmatically operative to detect the placement of the delivery item 170 proximate the node-based logistics receptacle 74150 by being further operative to receive, from the system's wireless accessory sensor node, event information corresponding to the external sensor data; and receive, from the wireless accessory sensor node, non-event information generated by the wireless accessory sensor node representing a lack of physical interaction with the storage receptacle components. A further example with yet more detail may have the bridge node processor of bridge node 74200 being programmatically operative to detect the placement of the delivery item 170 proximate the node-based logistics receptacle 74150 by being further operative to detect, using the communication interface, an updated advertising signal generated by the system's wireless accessory sensor node; identify a flag set within the detected updated advertising signal; retrieve, using the communication interface, a status update from the system's wireless accessory sensor node in response to identifying the flag set; access event information corresponding to the external sensor data as part of the status update; confirm the status update does not include information representing a physical interaction with the storage receptacle components corresponding to the internal sensor data; and identify the placement of the delivery item 170 proximate the node-based logistics receptacle 74150 based upon the event information corresponding to the external sensor data.

Once delivery item 170 is detected as being placed proximate the node-based logistics receptacle 74150, the system's bridge node processor of bridge node 74200 in such a system embodiment is programmatically operative to responsively transmit, using the communication interface of bridge node 74200, a verification message to the mobile user device 3805 operated by the parcel customer 3800. In more detail, such a verification message may, for example, include a prompt for the parcel customer 3800 to verify that the delivery item 170 was placed outside of the node-based logistics receptacle 74150. In another example, the verification message may include, for example, information provided to the mobile user device 3805 related to a request for the parcel customer 3800 to verify that the delivery item 170 was placed outside of the node-based logistics receptacle 74150.

The bridge node processor of bridge node 74200 in such a system embodiment is also programmatically operative to receive, using the communication interface, a verification confirmation message from the mobile user device 3805 operated by the parcel customer 3800. Such a verification confirmation message, for example, may include a response from the mobile user device 3805 verifying that the delivery item 170 was placed outside of the node-based logistics receptacle 74150. In more detail, the verification confirmation message may, for example, be a response from the mobile user device 3805 verifying that the delivery item 170 was placed outside of the node-based logistics receptacle 74150 for a future pickup logistics operation related to the node-based logistics receptacle 74150.

Those skilled in the art will appreciate that in some system embodiments, detecting placement of delivery item 170 and receipt of an exemplary verification confirmation message may automatically involve a smart contract based payment for use of the exemplary node-based logistics receptacle 74150 related to the placed delivery item 170. For example, an embodiment may have the bridge node processor of bridge node 74200 being further programmatically operative to communicate with the mobile user device 3805 over the communication interface, in response to receiving the verification confirmation message, to establish a smart contract based connection with the mobile user device 3805, where such a smart contract based connection (e.g., via exemplary smart contract application code) provides terms for paid use of the node-based logistics receptacle 74150. In more detail, such a smart contract based connection may include a protocol for an automated transaction via executable code stored on a blockchain and run in response to meeting at least a payment condition (e.g., predetermined pricing terms as reflected in the smart contract application code) for use of the node-based logistics receptacle 74150 in shipping the delivery item 170. In particular, the predetermined pricing terms may, for example, relate to a blockchain-based payment for external deposit of the delivery item 170 proximate the node-based logistics receptacle 74150. In some examples, the predetermined pricing terms relate to a blockchain-based payment for external deposit of the delivery item 170 proximate the node-based logistics receptacle 74150 during a predetermined time period (e.g., terms for particular hours during the day, terms for particular days of the week). Such predetermined pricing terms may also, for example, relate to a blockchain-based payment on a per-deposit basis for externally depositing one or more parcel items external to the node-based logistics receptacle 74150.

Referring now to FIG. 74C, the bridge node processor of bridge node 74200 in such a system embodiment is programmatically operative to transmit, using the communication interface of bridge node 74200, exemplary external deposit information 7405 to the backend server 100 related to the detected placement of the delivery item 170 based upon the verification confirmation message to cause the backend server 100 to initiate a dispatched logistics operation related to the node-based logistics receptacle 74150. As shown in FIG. 74C, backend server 100 receives exemplary deposit information 7405 reflecting the detected and customer confirmed placement of the delivery item 170. In response, backend server 100 (with awareness of such an external placement of delivery item 170) initiates the dispatched logistics operation by transmitting exemplary dispatch message 7410 to a particular logistics asset (such as exemplary logistics asset 700*a*).

In more detail and still with reference to FIG. 74C, the external deposit information 7405 transmitted to the backend server 100 related to the detected placement of the delivery item 170 may, for example, include a priority level indicator to cause the backend server 100 to initiate the dispatched logistics operation related to the node-based logistics receptacle 74150 with a heightened level of urgency. Such a priority level indicator reflects, for example, that the delivery item 170 is deposited with the node-based logistics receptacle 74150 outside of a secured temporary storage area 205 within the node-based logistics receptacle 74150.

The initiated dispatch logistics operation by backend server 100 may, in more detail, be with a logistics asset capable of completing the dispatched logistics operation under a predetermined condition (e.g., a timing criteria related to pickup of the delivery item 170 deposited external to the node-enabled logistics receptacle 74150). In another example, the initiated dispatch logistics operation by backend server 100 may, in more detail, be with a selected one of a multiple different logistics assets (e.g., similar logistics assets or a mix of different types of logistics assets), where the selected logistics asset being capable of completing the dispatched logistics operation under a predetermined time window for pickup of the delivery item 170.

This may, for example, have backend server 100 considering one or more for-hire logistics assets for the selected logistics asset to service node-based logistics receptacle 74150. For example, the bridge node processor of bridge node 74200, when executing the monitoring and management code, may be further programmatically operative to communicate with the for-hire logistics asset over the bridge node's communication interface to establish a smart contract based connection with the for-hire logistics asset when the for-hire logistics asset is the selected one of the logistics dispatched by the backend server 100 for completing the dispatched logistics operation. Such a smart contract based connection provides terms for paid pickup of the delivery item 170 disposed external to the node-based logistics receptacle 74150. As such, the for-hire logistics asset may be under payment terms defined by the smart contract based connection with the backend server when the for-hire logistics asset is selected.

Figure 75A:
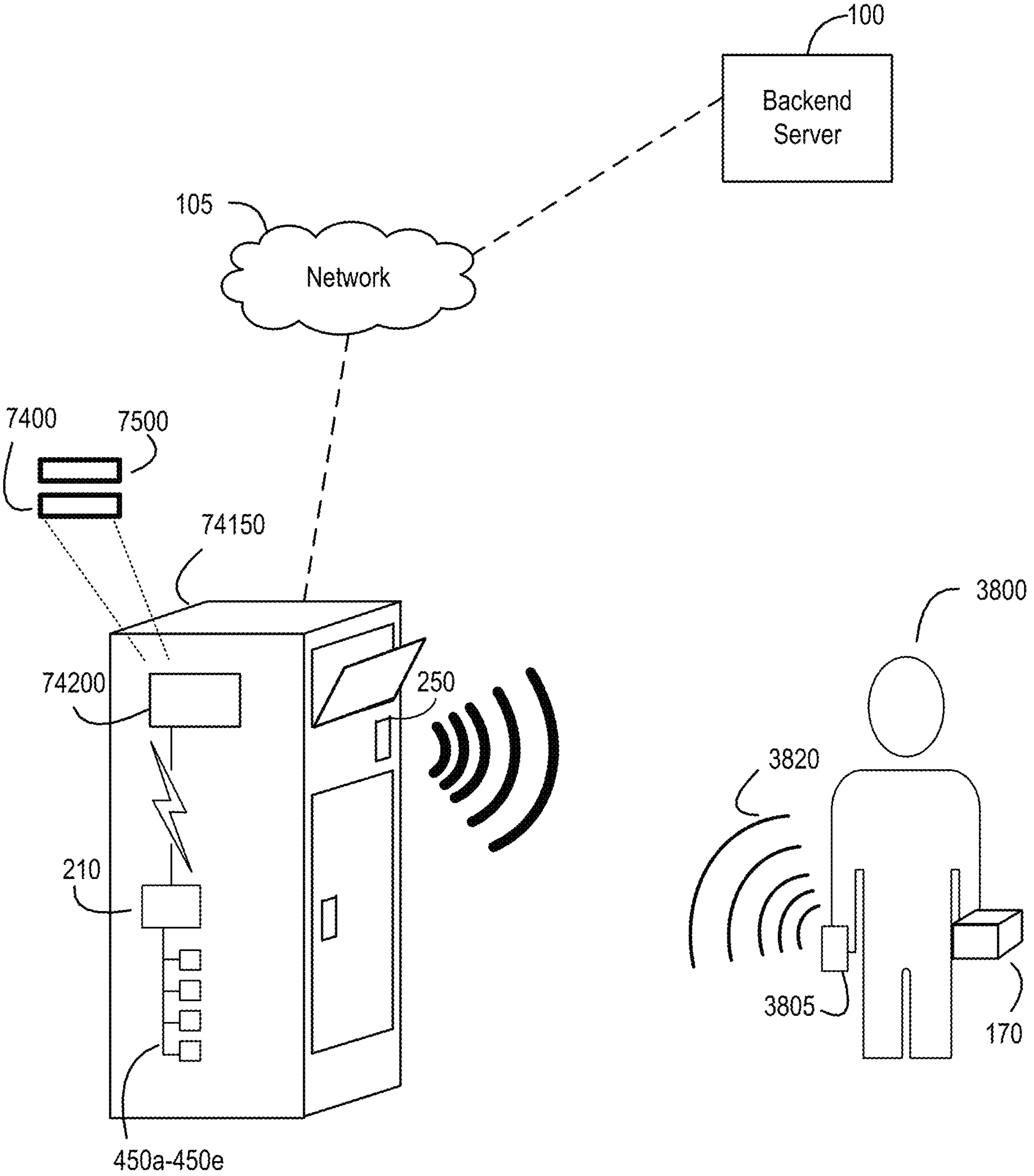
FIGS. 75A-75C are diagrams illustrating another exemplary system for enhanced interaction with a node-based logistics receptacle during an external drop off of a delivery item by a parcel customer that involves detection of whether the parcel customer is carrying the delivery item upon approach to the node-based logistics receptacle using an onboard external sensor in accordance with embodiments of the invention.
Figure 75B:
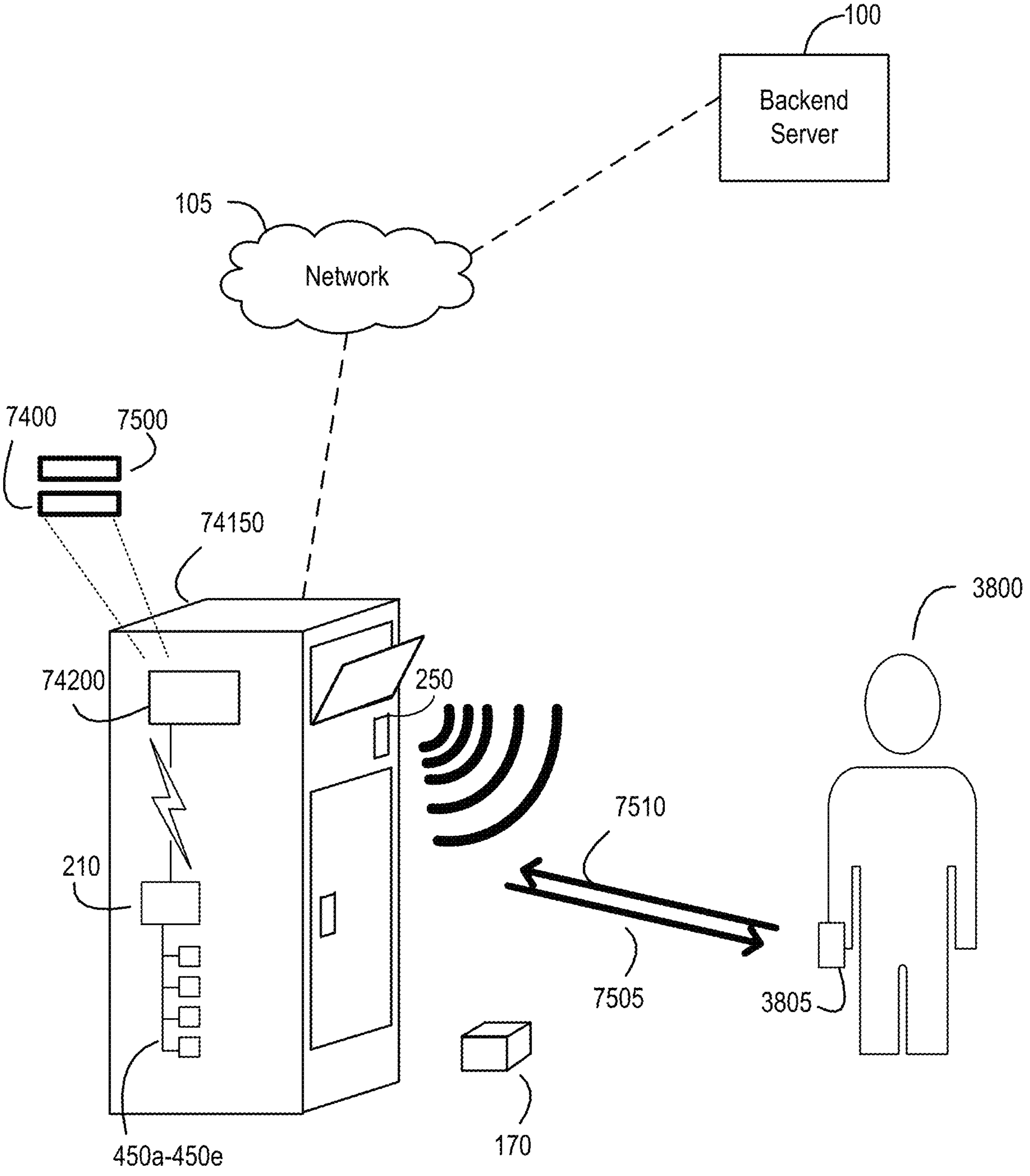
Figure 75C:
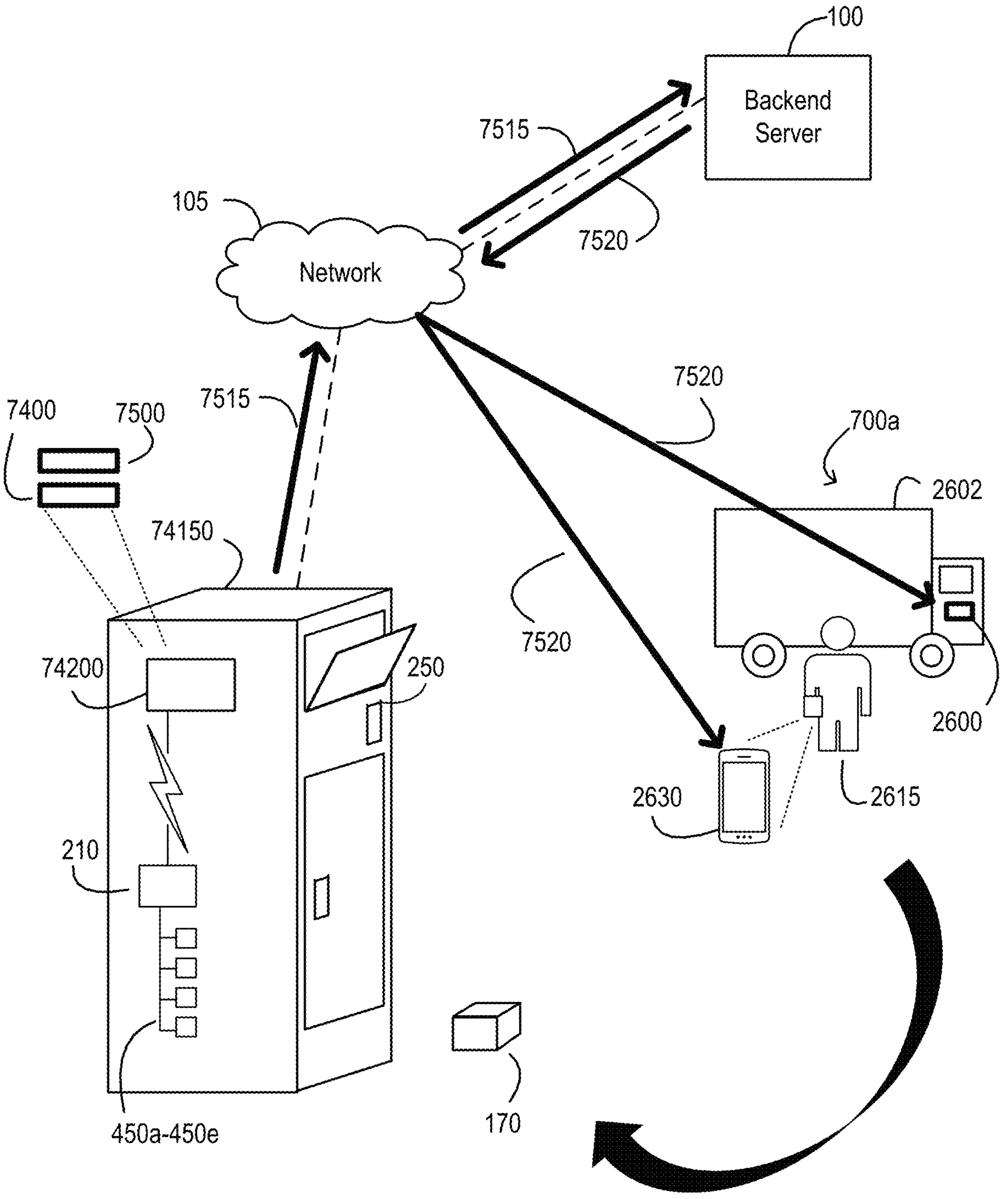

FIGS. 75A-75C are diagrams illustrating another exemplary system for enhanced interaction with an embodiment of node-based logistics receptacle 74150 during an external drop off of a delivery item 170 by a parcel customer 3800 that involves detection of whether the parcel customer 3800 is carrying the delivery item 170 upon approach to the node-based logistics receptacle 74150 using an onboard external sensor in accordance with embodiments of the invention. Those skilled in the art will appreciate that the embodiment of exemplary node-based logistics receptacle 74150 (including exemplary internal and external sensors) shown in FIGS. 75A-75C is similar to that of the example illustrated in FIGS. 74A-74C and further includes exemplary carrying confirmation data 7500 maintained as part of the memory of bridge node 74200 and includes exemplary monitoring and management code that configures the bridge node processor of bridge node 74200 to be programmatically operative in a way that allows bridge node 74200 to detect whether customer 3800 is carrying a package or parcel or object that may be shipped (e.g., package 170). In general, such a system embodiment may use the external sensor that is part of node-based logistics receptacle 74150 to detect an approaching parcel customer, detect whether the parcel customer is carrying a package or delivery item, send the customer a drop off verification message if detected to be carrying a package that prompts the customer to verify he/she is carrying such a package or delivery item, receive a customer response on whether the customer intends to place that package/delivery item outside of the node-based logistics receptacle, detect placement (with no detection of internal deposit), and respond to such placement with external deposit information being sent to the backend server to initiate a dispatched pickup.

In more detail, such an additional system embodiment for enhanced interaction with a node-based logistics receptacle and a parcel entity (e.g., customer, logistics personnel, and the like) operating a mobile user device includes exemplary node-based logistics receptacle 74150 as shown in FIGS. 75A-75C having a wireless accessory sensor node and a bridge node. The system's wireless accessory sensor node includes at least one internal sensor that collectively monitors one or more of the storage receptacle components of the node-based logistics receptacle 74150 and generates internal sensor data reflecting an interaction with one or more of the storage receptacle components of the node-based logistics receptacle. The system's wireless accessory sensor node also includes an external sensor for monitoring a local environment proximate the node-based logistics receptacle 74150, the external sensor being operative to generate external sensor data relative to the local environment proximate the node-based logistics receptacle. The system's bridge node (e.g., bridge node 74200) has a bridge node processor, a bridge node memory, and a communication interface. The bridge node memory is coupled to the bridge node processor and maintains an embodiment of monitoring and management code for execution by the bridge node processor as well as exemplary anticipated entity data 7400. The bridge node's communication interface is coupled to the bridge node processor and is operative to communicate with at least backend server 100.

In this additional system embodiment, the bridge node processor of exemplary bridge node 74200 shown in FIGS. 75A-75C, when executing the monitoring and management code, is programmatically operative to detect, using the communication interface, a wireless communication signal 3820 broadcast from the mobile user device 3805 operated by the parcel customer 3800 and identify the wireless communication signal 3820 as corresponding to an anticipated drop off entity. More specifically, the bridge node processor of bridge node 74200 may identify the wireless communication signal 3820 as corresponding to the anticipated drop off entity by being further operative to identify an RF signature from the wireless communication signal 3820 where the RF signature corresponds to the anticipated drop off entity. Such an RF signature may, for example, be associated with at least one of the parcel customer 3800 and the mobile user device 3805 operated by the parcel customer 3800. In a more detailed example, the bridge node memory may maintain exemplary anticipated entity data 7400, which includes entity information on one or more entities anticipated to make a deposit at the node-based logistics receptacle. As such, the bridge node processor of bridge node 74200, when executing the monitoring and management code, may be programmatically operative to identify the wireless communication signal 3820 as corresponding to the anticipated drop off entity based upon comparing the RF signature with the entity information in the anticipated entity data 7400 maintained in the bridge node memory. In this system embodiment, bridge node 74200 may be further programmatically operative to receive, using the communication interface, an update to the anticipated entity data 7400 from backend server 100 where the update to the anticipated entity data 7400 has updated entity information on at least one additional entity anticipated to make a deposit at the node-based logistics receptacle 74150.

In another example, the bridge node processor of bridge node 74200 may identify the wireless communication signal 3820 as corresponding to the anticipated drop off entity by being further operative to identify information associated with the parcel customer 3800 as part of a wireless message in the wireless communication signal 3820. Such information associated with the parcel customer 3800 as part of the wireless message may, in some instances, be associated with the mobile user device 3805 operated by the parcel customer 3800. In more detail, the bridge node processor of bridge node 74200 may identify the wireless communication signal 3820 as corresponding to the anticipated drop off entity by being further operative to detect the information associated with the parcel customer 3800 as part of a wireless message related to the wireless communication signal 3820, compare the information associated with the parcel customer 3820 with the entity information in the anticipated entity data 7400, and identify the information associated with the parcel customer 3800 as corresponding to the anticipated drop off entity based upon such a comparison.

In this additional system embodiment shown in FIGS. 75A-75C, the bridge node processor of exemplary bridge node 74200, when executing the monitoring and management code, is programmatically operative to generate carrying confirmation data 7500 related to whether the parcel customer 3800 is carrying a delivery item (such as exemplary package 170) based upon the external sensor data generated by the external sensor. For example, the external sensor data may be generated by a machine vision sensor capable of identifying such a delivery item being carried by parcel customer 3800 and discriminating it from other images in its field of view. Based upon such machine vision sensor data, bridge node 74200 may then generate information (i.e., carrying confirmation data 7500) reflecting whether parcel customer has a delivery item in their position that may potentially be deposited with node-based logistics receptacle 74150.

In this additional system embodiment, the bridge node processor of exemplary bridge node 74200, when executing the monitoring and management code, is programmatically operative to transmit, using the communication interface, a drop off verification message 7505 to the mobile user device 3805 operated by the parcel customer 3800 when the carrying confirmation data indicates the parcel customer 3800 is carrying the delivery item as shown in FIG. 75B. The drop off verification message 7505 includes a prompt for the parcel customer 3800 to verify that the parcel customer 3800 intends to place the delivery item 170 outside of the node-based logistics receptacle 74150. The bridge node processor of exemplary bridge node 74200 is further operative to receive, using the communication interface, a drop off verification confirmation message 7510 from the mobile user device 3805 operated by the parcel customer 3805 as shown in FIG. 75B. The drop off verification confirmation message 7510 includes a response indicating whether the parcel customer 3800 intends to place the delivery item 1700 outside of the node-based logistics receptacle 74150.

The bridge node processor of exemplary bridge node 74200 is also operative to detect placement of the delivery item 170 proximate the node-based logistics receptacle 74150 based upon subsequent external sensor data generated by the external sensor and without information reflecting the interaction with the one or more of the storage receptacle components using the internal sensor data. For example, and in more detail, the bridge node processor, when executing the monitoring and management code, may be programmatically operative to detect the placement of the delivery item 170 proximate the node-based logistics receptacle 74150 by being further operative to receive, from the wireless accessory sensor node, information corresponding to the subsequent external sensor data without receiving information corresponding to the internal sensor data. In a further example, the bridge node processor may be programmatically operative to detect the placement of the delivery item 170 proximate the node-based logistics receptacle 74150 by being further operative to receive, from the wireless accessory sensor node, event information corresponding to the external sensor data; and receive, from the wireless accessory sensor node, non-event information generated by the wireless accessory sensor node representing a lack of physical interaction with the storage receptacle components of node-based logistics receptacle 74150. In still a more detailed example, the bridge node processor, when executing the monitoring and management code, may be programmatically operative to detect the placement of the delivery item 170 proximate the node-based logistics receptacle 74150 by being further operative to detect an updated advertising signal generated by the wireless accessory sensor node; identify a flag set within the detected updated advertising signal; retrieve, using the communication interface, a status update from the wireless accessory sensor node in response to identifying the flag set; access event information corresponding to the subsequent external sensor data as part of the status update; confirm the status update does not include information representing a physical interaction with the storage receptacle components corresponding to the internal sensor data; and then identify the placement of the delivery item 170 proximate the node-based logistics receptacle 74150 based upon the identified event information corresponding to the subsequent external sensor data.

A further system embodiment may implement a smart contract based payment upon confirmation that parcel customer intends to use this node-based logistics receptacle 74150. For example, the bridge node processor of bridge node 74200, when executing the monitoring and management code, may be further programmatically operative to communicate with the mobile user device 3805 over the communication interface, in response to receiving the drop off verification confirmation message 7510 and when the response indicates the parcel customer intends to place the delivery item 170 outside of the node-based logistics receptacle 74150, to establish a smart contract based connection with the mobile user device 3805 that provides terms for paid use of the node-based logistics receptacle 74150. Those skilled in the art will appreciate that such a smart contract based connection may, for example, be implemented via a protocol for an automated transaction stored on a blockchain and run in response to meeting at least a payment condition for use of the node-based logistics receptacle 74150 in shipping the delivery item 170. In more detail, the smart contract based connection may provide for paid use of the node-based logistics receptacle 74150 under predetermined pricing terms as the payment condition. Such predetermined pricing terms may, for example, relate to a blockchain-based payment for external deposit of the delivery item 170 proximate the node-based logistics receptacle, relate to a blockchain-based payment for external deposit of the delivery item 170 proximate the node-based logistics receptacle 74150 during a predetermined time period (such as specific time periods during the day, specific days of the week, and the like), or relate to a blockchain-based payment on a per-deposit basis for externally depositing one or more parcel items external to the node-based logistics receptacle 74150.

In another embodiment, the system may implement a smart contract based payment upon detecting that parcel customer 3800 has deposited delivery item 170 with node-based logistics receptacle 74150 (rather than based upon a confirmed intent to use receptacle 74150). For example, the bridge node processor of bridge node 74200, when executing the monitoring and management code, may be further programmatically operative to communicate with the mobile user device 3805 over the communication interface, in response to detecting placement of the delivery item 170 proximate the node-based logistics receptacle 74150, to establish a smart contract based connection with the mobile user device 3805 that provides terms for paid use of the node-based logistics receptacle 74150. Those skilled in the art will appreciate that such a smart contract based connection may, for example, be implemented via a protocol for an automated transaction stored on a blockchain and run in response to meeting at least a payment condition for use of the node-based logistics receptacle 74150 in shipping the delivery item 170. In more detail, the smart contract based connection may provide for paid use of the node-based logistics receptacle 74150 under predetermined pricing terms as the payment condition. Such predetermined pricing terms may, for example, relate to a blockchain-based payment for external deposit of the delivery item 170 proximate the node-based logistics receptacle 74150, relate to a blockchain-based payment for external deposit of the delivery item 170 proximate the node-based logistics receptacle 74150 during a predetermined time period, or relate to a blockchain-based payment on a per-deposit basis for externally depositing one or more parcel items external to the node-based logistics receptacle 74150.

Referring now to FIG. 75C, the bridge node processor of exemplary bridge node 74200 is also operative to transmit, using the communication interface, exemplary external deposit information 7515 to the backend server 100 in response to the detected placement of the delivery item 170. The exemplary external deposit information 7515 is related to the detected placement of the delivery item 170 and causes the backend server 100 to initiate a dispatched logistics operation related to the node-based logistics receptacle 74150. In more detail, an embodiment of the external deposit information 7515 transmitted to the backend server 100 may include a priority level indicator to cause the backend server 100 to initiate the dispatched logistics operation related to the node-based logistics receptacle 74150 with a heightened level of urgency. Such a priority level indicator, for example, may reflect that the delivery item 170 is deposited with the node-based logistics receptacle 74150 outside of a secured temporary storage area 205 within the node-based logistics receptacle 74150.

In more detail, the external deposit information 7515 transmitted to the backend server 100 may cause the backend server 100 to initiate the dispatched logistics operation with a logistics asset capable of completing the dispatched logistics operation under a predetermined condition (e.g., a timing criteria related to pickup of the delivery item deposited external to the node-enabled logistics receptacle 74150). For example, backend server 100 (with awareness of such an external placement of delivery item 170) may initiate the dispatched logistics operation by transmitting exemplary dispatch message 7520 to a particular logistics asset (such as exemplary logistics asset 700*a* shown in FIG. 75C). In a more detailed embodiment, the external deposit information 7515 transmitted to the backend server 100 may cause the backend server 100 to send dispatch message 7520 that initiates the dispatched logistics operation with a selected one of a multiple different logistics assets (e.g., similar logistics assets or a mix of different types of logistics assets), where the selected logistics asset is capable of completing the dispatched logistics operation under a predetermined time window for pickup of the delivery item 170.

As noted with the earlier system embodiment, this additional system embodiment may have the backend server 100 being caused to initiate the dispatched logistics operation where at least one of the logistics assets considered is a for-hire logistics asset. For example, the bridge node processor of bridge node 74200 in such an additional system embodiment, when executing the monitoring and management code, may be further programmatically operative to communicate with the for-hire logistics asset over the bridge node's communication interface to establish a smart contract based connection with the for-hire logistics asset when the for-hire logistics asset is the selected one of the logistics dispatched by the backend server 100 for completing the dispatched logistics operation. Such a smart contract based connection provides terms for paid pickup of the delivery item 170 disposed external to the node-based logistics receptacle 74150. As such, the for-hire logistics asset may be under payment terms defined by the smart contract based connection with the backend server when the for-hire logistics asset is selected.

FIGS. 76A-76D are diagrams illustrating a further embodiment of an exemplary system for enhanced interaction with a node-based logistics receptacle 74150 during an external drop off of a delivery item 170 by a parcel customer 3800. In general, this further embodiment involves detection of whether the parcel customer 3800 is carrying the delivery item 170 upon approach to the node-based logistics receptacle 74150 using a separately disposed external sensor (such as sensor 4300 or a sensing element of external sensing infrastructure 4700) in accordance with embodiments of the invention. In more detail, such a further system embodiment may use an external sensor that is not an integrated part of node-based logistics receptacle 74150 itself, such as sensor 4300 or external sensing infrastructure 4700. Such a separate external sensor is disposed outside of the node-based logistics receptacle 74150 and is coupled to or otherwise may be in communication with the bridge node 74200 of receptacle 74150 as shown in FIGS. 76A-76D.

Those skilled in the art will appreciate that the embodiment of exemplary node-based logistics receptacle 74150 (including exemplary internal sensors) as shown in FIGS. 76A-76D is similar to that of the example illustrated in FIGS. 74A-75C while further involving the generation of exemplary carrying confirmation data 7500 as well as execution of a an embodiment of exemplary monitoring and management code that configures the bridge node processor of bridge node 74200 to be programmatically operative in a way described below relative to such a further system embodiment.

In more detail, a further system embodiment for enhanced interaction with a node-based logistics receptacle and a parcel entity (e.g., customer, logistics personnel, and the like) operating a mobile user device includes exemplary node-based logistics receptacle 74150 as shown in FIGS. 76A-76D having a wireless accessory sensor node and a bridge node. The system's wireless accessory sensor node includes at least one internal sensor that collectively monitors one or more of the storage receptacle components of the node-based logistics receptacle 74150 and generates internal sensor data reflecting an interaction with one or more of the storage receptacle components of the node-based logistics receptacle. The system's bridge node (e.g., bridge node 74200) has a bridge node processor, a bridge node memory, and a communication interface. The bridge node memory is coupled to the bridge node processor and maintains an embodiment of monitoring and management code for execution by the bridge node processor, exemplary anticipated entity data 7400, and exemplary carrying confirmation data 7500 as generated by the system's bridge node. The bridge node's communication interface is coupled to the bridge node processor and is operative to communicate with at least backend server 100.

In this further system embodiment, the system includes an external sensor (such as exemplary external sensor 4300 shown in FIG. 76A) in communication with the bridge node 74200. The external sensor 4300 is disposed external to and separate from the node-based logistics receptacle 74150, and is operative to monitor a local environment proximate the node-based logistics receptacle 74150 and generate external sensor data relative to the local environment proximate the node-based logistics receptacle 74150. Examples of external sensor 4300 may be implemented as an image sensor that generates image sensor data as the external sensor data, a video sensor that generates video sensor data as the external sensor data, LiDAR sensor that generates multi-dimensional information on the local environment proximate node-based logistics receptacle 74150 as the external sensor data, as well as a machine vision sensor that generates video sensor data used to identify objects within its field of view. In more detail, those skilled in the art will appreciate that such a machine vision sensor can identify an object in the local environment proximate the node-based logistics receptacle 74150 based upon video sensor data and is further operative to detect a change in what has been placed within a predetermined range of the node-based logistics receptacle 74150 representative of the local environment proximate the node-based logistics receptacle 74150 based upon the identified object.

Figure 76A:
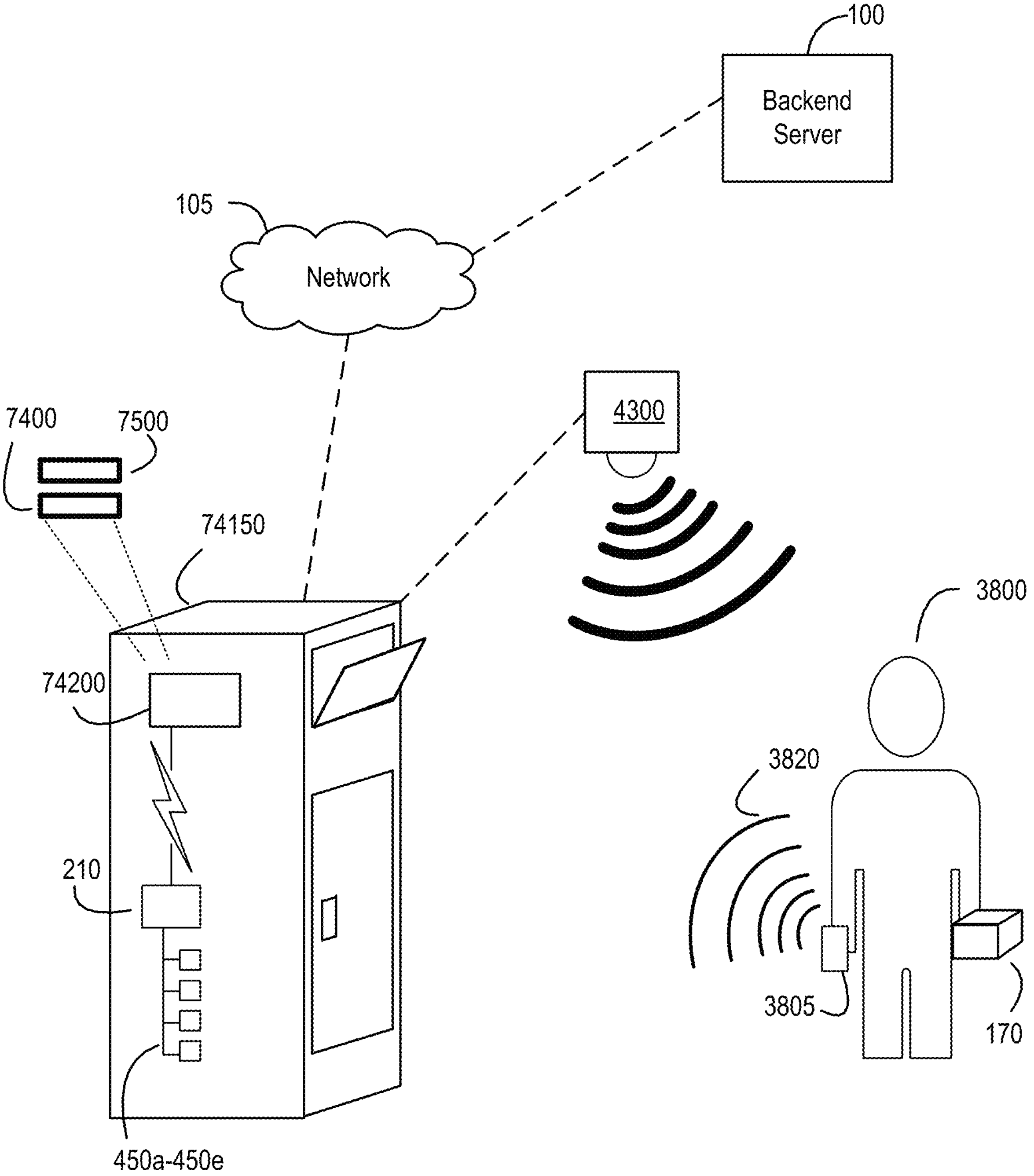
FIGS. 76A-76D are diagrams illustrating still another exemplary system for enhanced interaction with a node-based logistics receptacle during an external drop off of a delivery item by a parcel customer that involves detection of whether the parcel customer is carrying the delivery item upon approach to the node-based logistics receptacle using a separately disposed external sensor in accordance with embodiments of the invention.
Figure 76B:
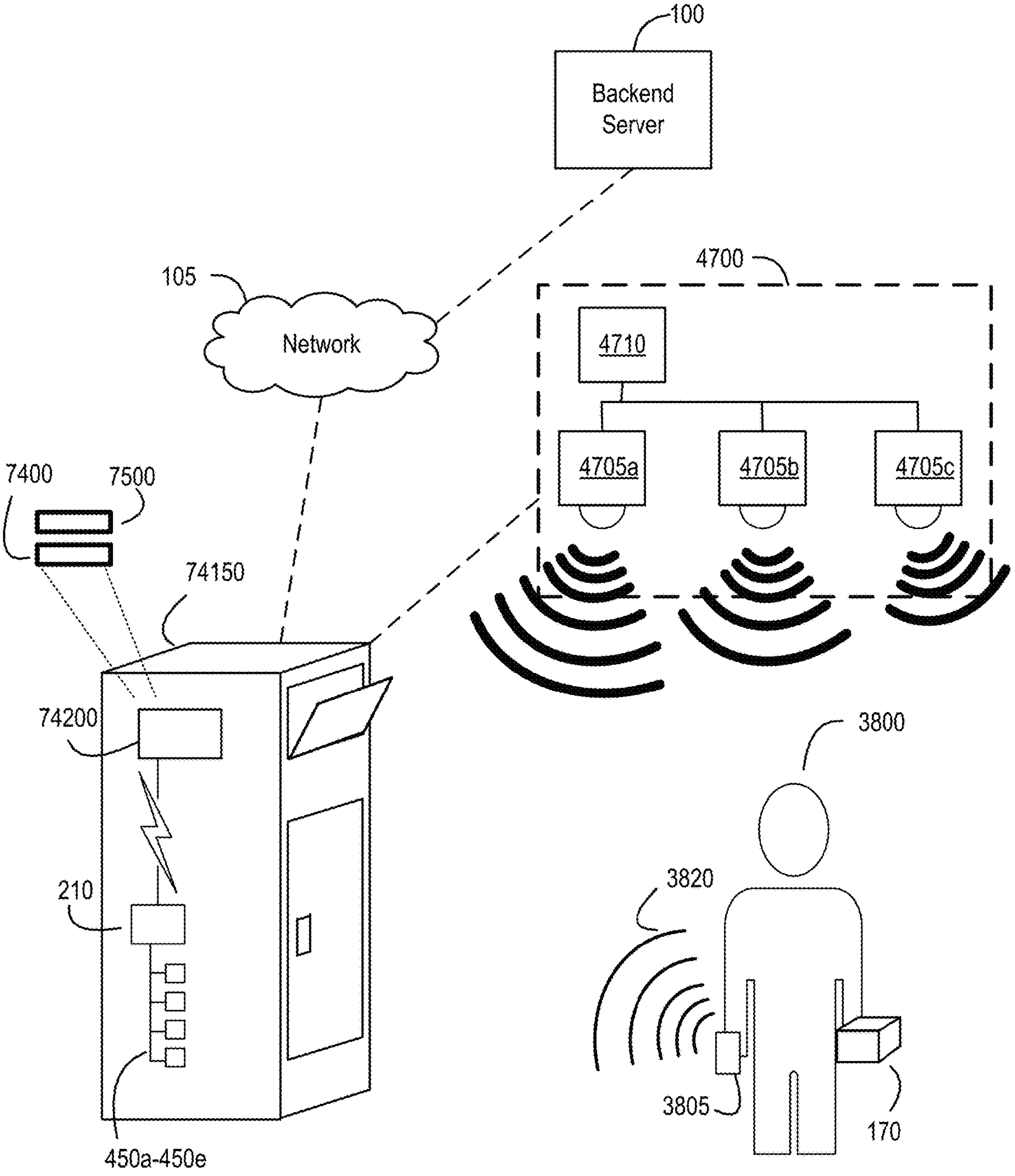

While external sensor 4300 is shown in FIG. 76A as a type of separately disposed external sensor used in such a further system embodiment, FIG. 76B illustrates exemplary node-based logistics receptacle 74150 being operative to communicate and receive external sensor data from one or more sensing elements 4705*a*-4705*c* of exemplary external sensing infrastructure 4700 as another type of separately disposed external sensor used in such a further system embodiment. Referring now to FIG. 76B, the system's external sensor may be implemented using at least one of a plurality of sensing elements 7405*a*-4705*c* of an external sensing infrastructure 4700 disposed within a viewable range that includes the node-based logistics receptable 74150 where at least one of the sensing elements 4705*a*-4705*c* is operative to provide sensing element sensor data to the system's wireless accessory sensor node as the external sensor data.

Those skilled in the art will further appreciate that the system's use of such an exemplary external sensor (e.g., external sensor 4300 or one of sensing elements 4705*a*-4705*c* of external sensing infrastructure 4700) may be facilitated through a smart contract based connection where receipt of the external sensor data may be a paid-for service provided under terms of the smart contract application code representing such a connection. For example, the ability of the bridge node 74200 to receive the external sensor data generated by the external sensor related to the local environment proximate the node-logistics receptacle 74150 may be possible with the bridge node processor of bridge node 74200 being further operative to communicate with the external sensing infrastructure 4700 (e.g., through its control node 4710) over the communication interface to establish a smart contract based connection with the external sensing infrastructure 4700 where the smart contract based connection (via execution of the smart contract application code) provides paid-for use of data generated by the one of the sensing elements of the external sensing infrastructure 4700, and then receive the external sensor data under terms of the smart contract based connection with the external sensing infrastructure 4700. Those skilled in the art will appreciate that such a smart contract based connection may be implemented with code defining a protocol for an automated transaction stored on a blockchain and run in response to meeting at least a payment condition for receiving the data generated by the one of the sensing elements 4705*a*-4705*c* of the external sensing infrastructure 4700. In more detail, such a smart contract based connection may provide a cryptographically secure source of the data generated by the one of the sensing elements 4705*a*-4705*c* of the external sensing infrastructure 4700. Stated another way, an example may have the smart contract based connection running the smart contract application code to provide for the bridge node 74200 to receive the data generated by the one of the sensing elements 4705*a*-4705*c* of the external sensing infrastructure 4700 under predetermined pricing terms as the payment condition and/or predetermined access conditions (such as time of day conditions, day of the week conditions, and the like). Such predetermined pricing terms, for example, may relate to a blockchain-based payment for access rights to the data generated by the one of the elements 4705*a*-4705*c* of the external sensing infrastructure 4700, relate to a blockchain-based payment for access rights to the data generated by any of the sensing elements 4705*a*-4705*c* of the external sensing infrastructure 4700, relate to a blockchain-based payment on a per-access basis for access rights to the data generated by at least the one of the sensing elements 4705*a*-4705*c* of the external sensing infrastructure 4700.

Those skilled in the art will further appreciate that in some system embodiments, the external sensing infrastructure 4700 may be a security system with sensing elements being different security cameras used by the security system. In other embodiments, the external sensing infrastructure 4700 may be more generally a camera-based monitoring system where the sensing elements may be a set of cameras used by the camera-based monitoring system. In more detail, an example may have the external sensor of a system embodiment being a particular security camera operably coupled to the bridge node 74150 through a remotely accessible interface of the security system (e.g., control node 4710 of system 4700). In such an example, the bridge node 74200 may be further programmatically operative to receive the external sensor data generated by the external sensor related to the local environment proximate the node-logistics receptacle 74150 by being further operative to establish the smart contract based connection with the security system 4700 through the remotely accessible interface 4710 of the security system 4700, and receive the external sensor data generated by the security camera over the remotely accessible interface 4710 of the security system and the communication interface 203 of the bridge node. This is equally applicable to an example where infrastructure 4700 is a camera-based monitoring system.

In this further system embodiment, the bridge node processor of bridge node 74200, when executing the monitoring and management code, is programmatically operative to detect a wireless communication signal 3820 broadcast from the mobile user device 3820 operated by the parcel customer 3800 and identify the wireless communication signal as corresponding to an anticipated drop off entity. Consistent with the related system embodiments described above, detecting such a signal and identifying it to correspond to an anticipated drop off entity may involve detecting an RF signature. For example, and in more detail, the bridge node processor of bridge node 74200, when executing the monitoring and management code, may identify the wireless communication signal as corresponding to the anticipated drop off entity by being further operative to identify an RF signature from the wireless communication signal where the RF signature corresponds to the anticipated drop off entity. In particular, such an RF signature may be associated with at least one of the parcel customer 3800 and the mobile user device 3805 operated by the parcel customer 3800. In another example, the bridge node's processor may be programmatically operative to identify the wireless communication signal as corresponding to the anticipated drop off entity based upon comparing the RF signature with the entity information in the anticipated entity data 7400 maintained in the bridge node memory (which may be updated by backend server 100 with updated entity information on at least one additional entity anticipated to make a deposit at the node-based logistics receptacle 74150).

Consistent with the related system embodiments describe above, detecting such a signal and identifying it to correspond to an anticipated drop off entity may involve detecting information in a wireless message portion of the wireless communication signal 3820. For example, and in more detail, the bridge node processor of bridge node 74200 may identify the wireless communication signal 3820 as corresponding to the anticipated drop off entity by being further operative to identify information associated with the parcel customer 3800 as part of a wireless message in the wireless communication signal 3820. Such information associated with the parcel customer 3800 as part of the wireless message may, in some instances, be associated with the mobile user device 3805 operated by the parcel customer 3800. In even more detail, the bridge node processor may identify the wireless communication signal 3820 as corresponding to the anticipated drop off entity by being further operative to detect the information associated with the parcel customer 3800 as part of a wireless message related to the wireless communication signal 3820; compare the information associated with the parcel customer 3800 with entity information in the anticipated entity data 7400 maintained in the bridge node memory; and identify the information associated with the parcel customer 3800 as corresponding to the anticipated drop off entity based upon the comparison.

Figure 76C:
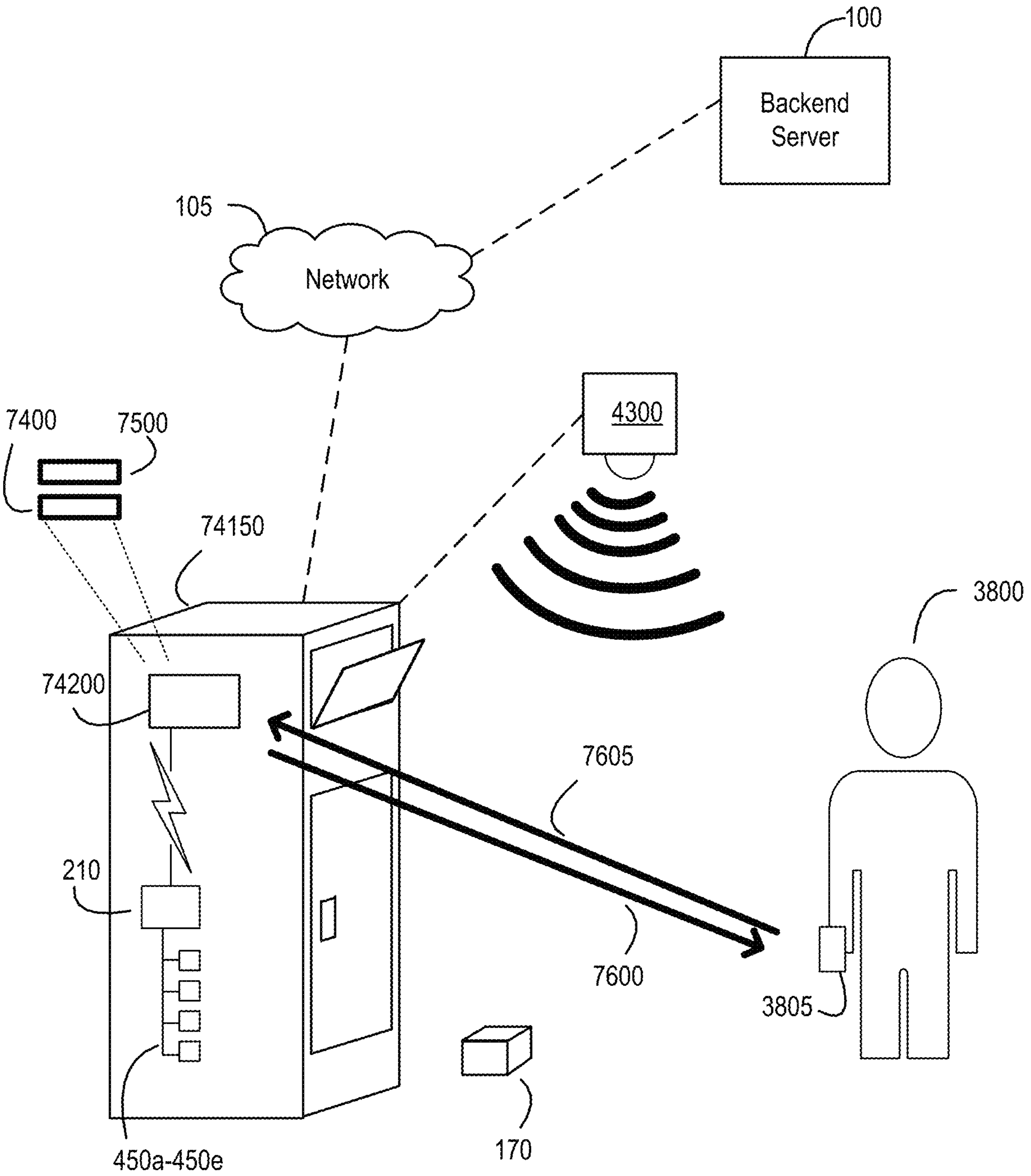

In a further system embodiment and with reference to FIG. 76C, the bridge node processor of bridge node 74200, when executing the monitoring and management code, is also programmatically operative to receive the external sensor data generated by the external sensor related to the local environment proximate the node-logistics receptacle 74150, generate carrying confirmation data 7500 related to whether the parcel customer 3800 is carrying a delivery item 170 based upon the external sensor data generated by the external sensor, and responsively transmit a drop off verification message e to the mobile user device 3805 operated by the parcel customer 3800 when the carrying confirmation data 7500 indicates the parcel customer 3800 is carrying the delivery item 170. Such a drop off verification message includes a prompt for the parcel customer 3800 to verify that the parcel customer 3800 intends to place the delivery item 170 outside of the node-based logistics receptacle 74150. The bridge node processor of bridge node 74200, when executing the monitoring and management code, is further programmatically operative to receive a drop off verification confirmation message 7605 from the mobile user device 3805 that has a response indicating whether the parcel customer 3800 intends to place the delivery item 170 outside of the node-based logistics receptacle 74150.

In some embodiments, the system's bridge node processor may establish a smart contract based connection with mobile user device 3805 in response to receiving the drop off verification confirmation message 7605 and when the response indicates the parcel customer 3800 intends to place the delivery item 170 outside of the node-based logistics receptacle 74150. Such a smart contract based connection may be implemented via a protocol for an automated transaction stored on a blockchain and run in response to meeting at least a payment condition for use of the node-based logistics receptacle 74150 in shipping the delivery item 170 where the payment condition may, for example, be under predetermined pricing terms. In more detail, such predetermined pricing terms may, for example, relate to a blockchain-based payment for external deposit of the delivery item 170 proximate the node-based logistics receptacle 74150, relate to a blockchain-based payment for external deposit of the delivery item 170 proximate the node-based logistics receptacle 74150 during a predetermined time period, or relate to a blockchain-based payment on a per-deposit basis for externally depositing one or more parcel items external to the node-based logistics receptacle 74150.

Still referring to FIG. 76C, the bridge node processor of bridge node 74200, when executing the monitoring and management code, is programmatically operative to detect placement of the delivery item 170 proximate the node-based logistics receptacle 74150 based upon subsequent external sensor data generated by the external sensor (e.g., sensor 4300 or a sensing element of sensing infrastructure 470) and without information reflecting the interaction with the one or more of the storage receptacle components using the internal sensor data. In more detail, detecting the placement of the delivery item 170 proximate the node-based logistics receptacle 74150 may be accomplished in an exemplary embodiment with the bridge node being further operative to receive, from the system's wireless accessory sensor node, information corresponding to the subsequent external sensor data without receiving information corresponding to the internal sensor data.

Those skilled in the art will appreciate that in some embodiments, the system's bridge node processor may establish a smart contract based connection with mobile user device 3805 in response to detecting placement of the delivery item 170 proximate the node-based logistics receptacle 74150 (rather than information on the parcel customer's intent to deposit such an item 170). Such a smart contract based connection provides terms for paid use of the node-based logistics receptacle 74150 by the parcel customer. Such a smart contract based connection may be implemented via a protocol for an automated transaction stored on a blockchain and run in response to meeting at least a payment condition for use of the node-based logistics receptacle 74150 in shipping the delivery item, where the payment condition may, for example be defined as predetermined pricing terms. In more detail, such predetermined pricing terms may, for example, relate to a blockchain-based payment for external deposit of the delivery item 170 proximate the node-based logistics receptacle 74150, relate to a blockchain-based payment for external deposit of the delivery item 170 proximate the node-based logistics receptacle 74150 during a predetermined time period, or relate to a blockchain-based payment on a per-deposit basis for externally depositing one or more parcel items external to the node-based logistics receptacle 74150.

Figure 76D:
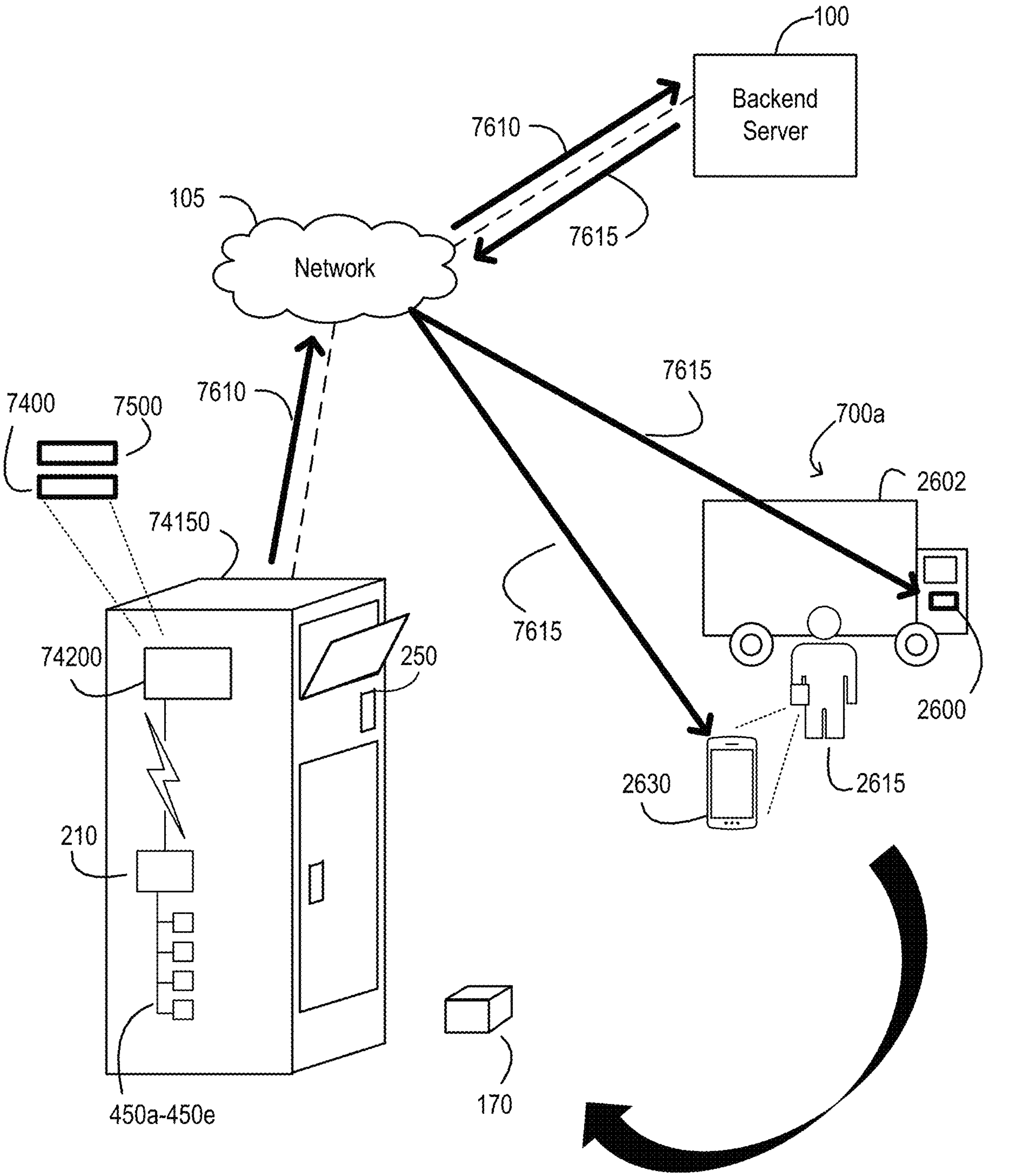

Now referring to FIG. 76D, the bridge node processor of bridge node 74200, when executing the monitoring and management code, is programmatically operative to transmit, using the communication interface, external deposit information 7610 to the backend server 100 in response to the detected placement of the delivery item 170. The external deposit information 7610 is related to the detected placement of the delivery item 170 and causes the backend server 100 to initiate a dispatched logistics operation related to the node-based logistics receptacle 74150 via exemplary dispatch message 7615. In more detail, exemplary external deposit information 7610 transmitted to the backend server 100 may, for example, include a priority level indicator to cause the backend server 100 to initiate the dispatched logistics operation related to the node-based logistics receptacle 74150 with a heightened level of urgency. Such a priority level indicator may reflect that the delivery item 170 is deposited with the node-based logistics receptacle 74150 outside of a secured temporary storage area 205 within the node-based logistics receptacle. The external deposit information 7610 may, for example, cause the backend server 100 to initiate the dispatched logistics operation with a logistics asset (such as exemplary logistics asset 700*a* shown in FIG. 76D) capable of completing the dispatched logistics operation under a predetermined condition (e.g., a timing criteria related to pickup of the delivery item 170 deposited external to the node-enabled logistics receptacle 74150). In another example embodiment, the external deposit information 7610 transmitted to the backend server 100 may cause the backend server 100 to initiate the dispatched logistics operation with a selected one of multiple different logistics assets (e.g., similar logistics assets or a mix of different types of logistics assets), where the selected logistics asset is capable of completing the dispatched logistics operation under a predetermined time window for pickup of the delivery item 170.

Similar to some of the previously described system embodiments, this may, for example, have backend server 100 considering one or more for-hire logistics assets for the selected logistics asset to service node-based logistics receptacle 74150. For example, the bridge node processor of bridge node 74200, when executing the monitoring and management code, may be further programmatically operative to communicate with the for-hire logistics asset over the bridge node's communication interface to establish a smart contract based connection with the for-hire logistics asset when the for-hire logistics asset is the selected one of the logistics dispatched by the backend server 100 for completing the dispatched logistics operation. Such a smart contract based connection provides terms for paid pickup of the delivery item 170 disposed external to the node-based logistics receptacle 74150. As such, the for-hire logistics asset may be under payment terms defined by the smart contract based connection with the backend server when the for-hire logistics asset is selected.

Enhanced and Proactive Interaction with Informed Option for Drop Off

In still additional embodiments, an exemplary node-based logistics receptacle may sense an approaching parcel customer and interact with the parcel customer with knowledge of an anticipated drop off of a delivery item in an additional manner that proactively informs the parcel customer with alternative drop off information (e.g., via presentation of alternative drop off information on the parcel customer's mobile device, which may be an AR equipped headset). This, for example, may be the case when the parcel customer responds to a message from the node-based logistics receptacle that the parcel customer does not intend to use that particular node-based logistics receptacle. By providing such alternative drop off information to the approaching parcel customer, the parcel customer may elect to use another nearby node-based logistics receptacle or, for example, may rethink their intention not to use that particular node-based logistics receptacle and proceed with depositing their delivery item (e.g., package 170) with that particular node-based logistics receptacle.

Figure 77A:
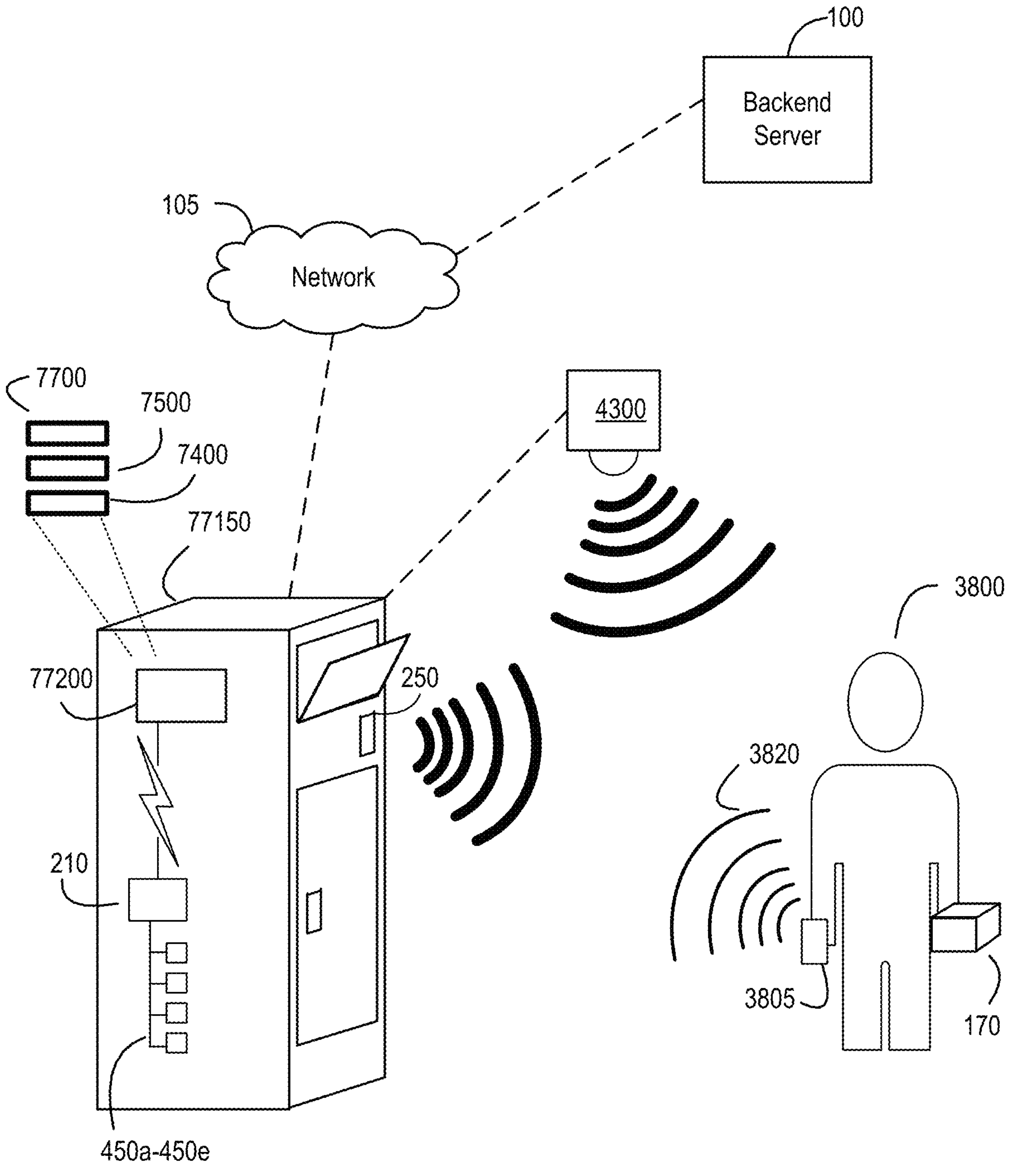
FIGS. 77A-77D are diagrams illustrating yet another exemplary system for enhanced interaction with a node-based logistics receptacle and a detected parcel customer that involves proactively sending the parcel customer alternative drop off information upon approach to the node-based logistics receptacle in accordance with embodiments of the invention.

FIGS. 77A-77D are diagrams illustrating yet another exemplary system for enhanced interaction with a node-based logistics receptacle and a detected parcel customer that involves proactively sending the parcel customer alternative drop off information upon approach to the node-based logistics receptacle in accordance with embodiments of the invention. Referring now to FIG. 77A, exemplary node-based logistics receptacle 77150 is shown operative to communicate with backend server 100 with components similar to exemplary logistics receptacle 150 described relative to FIG. 2. Those skilled in the art will appreciate that exemplary node-based connected logistics receptacle 77150 shown in FIGS. 77A-77D is generally similar to exemplary connected/node-based logistics receptacle 150 and 150*a* and, more specifically, is similar to exemplary node-based logistics receptacle 74150 (that includes exemplary anticipated entity data 7400 and exemplary carrying confirmation data 7500), with the exception that exemplary receptacle 77150 is equipped with an exemplary bridge node 77200 that is programmatically configured differently so that it uses further types of data maintained on the bridge node 77200 (such as exemplary alternative drop off data 7700) and is operative to use different types of external sensors that monitor interactions with receptacle 77150 and areas proximate to receptacle 77150 (e.g., an external sensor used with external sensor node 250 as part of receptacle 74150, exemplary external sensor 4300 disposed external to and separate from receptacle 74150). As such, exemplary receptacle 77150 includes an embodiment of monitoring and management code for execution by the processor in bridge node 77200 (controlling functionality of bridge node 77200 in such additional embodiments) and use of such data (e.g., exemplary anticipated entity data 7400, exemplary carrying confirmation data 7500, and exemplary alternative drop off data 7700) maintained within memory 305/310 of bridge node 77200 as part of enhanced interaction between exemplary node-based logistics receptacle 77150 and a mobile user device 3805 equipped parcel customer 3800 as implemented in exemplary node-based logistics receptacle 77150. Those skilled in the art will appreciate that backend server 100 may, in some embodiments, transmit updates to the exemplary anticipated entity data 7400 and/or exemplary alternative drop off data 7700 for use by the exemplary node-based logistics receptacle 77150.

In general, those skilled in the art will appreciate that exemplary alternative drop off data 7700 is stored in a data structure or file and locally maintains alternative drop off information on one or more alternative drop off points (e.g., other shipment facilities, other node-based logistics receptacles, other mobile logistics assets capable of operating as a drop off point) for a parcel shipment or delivery item (such as package 170). For example, such alternative drop off information may include location information or address information for alternative drop off points. In another example, the alternative drop off information may include a respective distance from the particular node-based logistics receptacle 77150 to different alternative drop off points so that information may be provided on closer ones of the alternative drop off points relative to the location or address of the node-based logistics receptacle 77150. Thus, when the bridge node 77200 of node-based logistics receptacle 77150 provides information on a particular alternative drop off point, such information may be a closest one of the possible alternative other drop off points. The alternative drop off information may also, for example, include directions to such an alternative drop off point.

In some embodiments, the information in exemplary alternative drop off data 7700 may include other types of contextual information related to the different alternative drop off points. For example, the alternative drop off information may include traffic data relative to the alternative drop off point, weather data relative to the alternative drop off point, crime data relative to the alternative drop off point, seasonal activity data relative to the alternative drop off point, wait time data relative to a particular alternative drop off point (e.g., historic wait time at a shipping facility), operational timing data relative to the (e.g., opening and closing business hours for a shipping facility, last pickup times for a particular alternative node-based logistics receptacle, data identifying when items are accepted relative to that drop off point.

Exemplary alternative drop off information in data 7700 may include different types of information on different types of drop off points. For example, the alternative drop off information may include information related to a staffed facility as an alternative drop off point and an unstaffed logistics receptacle as another alternative drop off point (e.g., location, closing time, wait time of the staffed facility; and location and last pickup time of the alternative node-based logistics receptacle).

Exemplary alternative drop off information in data 7700 may, for example, include alternative drop off information related to one or more alternative drop off points for a parcel that may be detected as approaching node-based logistics receptacle 77150. Those skilled in the art will appreciate that bridge node 77200 may, be programmatically operative to receive, using the communication interface 203, an update for the alternative drop off information 7700 or an updated portion of such information 7700 from the backend server 100 or a network storage data source (e.g., network database 180 and the like).

Consistent with what is shown in FIG. 2 and as shown in FIGS. 77A-77D, exemplary connected logistics receptacle 77150 is shown including exemplary external sensor node 250 having at least one sensor that is disposed on receptacle 77150. Those skilled in the art will appreciate that the externally focused sensor coupled to external sensor node 250 may be disposed relative to logistics receptacle 77150 so as to have a sensing orientation to monitor particular locations proximate receptacle 77150 for any externally deposited parcel or delivery item. Similarly, those skilled in the art will appreciate that exemplary external sensor 4300 shown in FIGS. 77A-77D may also have a sensing orientation to monitor particular locations proximate receptacle 77150 for any externally deposited parcel or delivery item.

Referring back to FIG. 77A, an embodiment of an exemplary system for enhanced interaction with node-based logistics receptacle 77150 and a parcel customer 3800 operating mobile user device 3805 is illustrated. In general, an embodiment of such an exemplary system includes a wireless accessory sensor node (such as exemplary wireless accessory sensor node 210) and a bridge node (such as exemplary bridge node 77200), each of which are disposed on the node-based logistics receptacle 77150. Exemplary node-based logistics receptacle 77150 (as explained relative to receptacle 150 above) has multiple storage receptacle components, such as an external housing, an entrance opening 155/156 disposed on the receptacle housing through which a delivery item may be inserted, a temporary storage area 205 within the receptacle housing for temporarily maintaining custody of the delivery item when inserted through the entrance opening, and a selectively accessible retrieval door 160 providing access to within the temporary storage area.

In this system embodiment, the wireless accessory sensor node includes at least one internal sensor that collectively monitors one or more of the storage receptacle components (e.g., entrance opening, temporary storage area, selectively accessible retrieval door) of the node-based logistics receptacle 77150 and generates internal sensor data reflecting an interaction with one or more of the storage receptacle components of the node-based logistics receptacle 77150. For example, such an internal sensor monitoring an entrance opening to the node-based logistics receptacle 77150 may be implemented with a variety of different types of internal sensors, such as a motion sensor detecting a change in motion of the entrance opening, a motion sensor detecting the change in motion of the entrance opening and a failure to return to a prior state of the one or more of the entrance opening, a motion sensor detecting movement of what passes through the entrance opening, an inertial sensor detecting a change in motion of the entrance opening, a status sensor detecting a change in orientation of the entrance opening, an accelerometer detecting a change in motion of the entrance opening, and/or a magnetic sensor detecting a change in position of the entrance opening. In another example, such an internal sensor monitoring the temporary storage area within the node-based logistics receptacle 77150 may be implemented with different types of sensors, such as an image sensor detecting a change in what is within the temporary storage area, a scale detecting a change in what is within the temporary storage area, a force sensor detecting a change in what has been deposited within the temporary storage area, a light sensor detecting a change in light within the node-enabled logistics receptacle, and/or a chemical sensor detecting presence of a chemical within the temporary storage area. In yet another example, the internal sensor monitoring the selectively accessible retrieval door on the node-based logistics receptacle 77150 may be implemented with different types of sensors, such as a motion sensor detecting a change in state of the selectively accessible retrieval door, a motion sensor detecting a change in state of the selectively accessible retrieval door and a failure to return to a prior state of the selectively accessible retrieval door, an inertial sensor detecting a change in inertial motion of the selectively accessible retrieval door, a gyroscopic sensor detecting a change in movement of the selectively accessible retrieval door, a status sensor detecting a change in orientation of the selectively accessible retrieval door, a magnetic sensor detecting a change in position of the selectively accessible retrieval door, and/or a lock sensor detecting a change in secured state of the selectively accessible retrieval door.

In this system embodiment, those skilled in the art will appreciate that the bridge node 77200 includes a bridge node processor, a bridge node memory coupled to the bridge node processor and maintaining monitoring and management code for execution by the bridge node processor, and a wireless transceiver-based communication interface coupled to the bridge node processor that is operative to communicate with at least backend server 100.

In this system embodiment, the bridge node 77200 is in communication (e.g., directly or indirectly) with an external sensor that operates to monitor a local environment proximate the node-based logistics receptacle 77150 and generate external sensor data relative to the local environment proximate the node-based logistics receptacle 77150. Such an external sensor, in one example, may be disposed on receptacle 77150 (e.g., the external sensor coupled to external sensor node 250 as shown in FIG. 77A). In another example, the external sensor may be disposed external to and separate from the node-based logistics receptacle 77150 (e.g., external sensor 4300 shown in FIG. 77A). In this system embodiment, an exemplary external sensor may be implemented as an image sensor that generates image sensor data as the external sensor data or a machine vision sensor that generates video sensor data as the image sensor data. In more detail, such a machine vision sensor (a type of image sensor) may be operative to identify an object in the local environment proximate the node-based logistics receptacle 77150 based upon video sensor data and may be further operative to detect a change in what has been placed within a predetermined range of the node-based logistics receptacle 77150 representative of the local environment proximate the node-based logistics receptacle 77150 based upon the identified object.

In still another example, the system's external sensor may be disposed externally to and separate from the node-based logistics receptacle 77150 (e.g., one of the sensing elements (such as a camera) of exemplary external sensing infrastructure 4700 (such as a security system) as shown in FIG. 76B). More specifically, such an external sensing element of infrastructure 4700 may be disposed within a viewable range that includes the node-based logistics receptable 77150 and is operative to provide sensing element sensor data to the wireless accessory sensor node as the external sensor data or to provide sensing element sensor data directly to the bridge node 77200 in node-based logistics receptacle 77150. For example, bridge node 77200 may be programmatically operative to receive the external sensor data generated by the external sensor related to the local environment proximate the node-logistics receptacle 77150 by being further operative to communicate with the external sensing infrastructure 4700 over the communication interface to establish a smart contract based connection with the external sensing infrastructure 4700. Those skilled in the art will appreciate that such a smart contract based connection through execution of the smart contract's application code provides paid for use of data generated by the one of the sensing elements of the external sensing infrastructure 4700. As a result, the bridge node 77200 is operative to receive the external sensor data and the as the data generated by the one of the sensing elements of the external sensing infrastructure 4700 under terms of the smart contract based connection with the external sensing infrastructure 4700. Here, the smart contract based connection may, for example, be implemented as a protocol for an automated transaction stored on a blockchain and run in response to meeting at least a payment condition for receiving the data generated by the one of the sensing elements of the external sensing infrastructure 4700. Stated another way, the smart contract based connection may, for example, provide a cryptographically secure source of the data generated by the one of the sensing elements of the external sensing infrastructure 4700. Such a smart contract based connection that provides for receiving the data generated by the one of the sensing elements of the external sensing infrastructure 4700 may do so under predetermined pricing terms as the payment condition or under predetermined access conditions. Such predetermined pricing terms may, for example, relate to a blockchain-based payment for access rights to the data generated by the one of the sensing elements of the external sensing infrastructure 4700; relate to a blockchain-based payment for access rights to the data generated by any of the sensing elements of the external sensing infrastructure 4700; and relate to a blockchain-based payment on a per-access basis for access rights to the data generated by at least the one of the sensing elements of the external sensing infrastructure 4700.

In operation when executing the monitoring and management code as part of this system embodiment shown in FIGS. 77A-77D, the bridge node processor of bridge node 77200 is programmatically configured so as to be operative to detect, using the communication interface 203, a wireless communication signal 3820 broadcast from the mobile user device 3805 (e.g., a smartphone, tablet, mobile AR headset, and the like) operated by the parcel customer 3800. In some examples, this may involve detecting an RF signature associated with the parcel customer 3800 (e.g., where such an RF signature is associated with at least one of the parcel customer 3800 and the mobile user device 3805 operated by the parcel customer 3800) or an RF signature related to the wireless communication signal 3820. The bridge node 77200 is then operative to identify the signal 3820 (e.g., the RF signature with that signal) as corresponding to one of multiple anticipated drop off entities maintained in anticipated entity data 7400.

The bridge node processor of bridge node 77200 is further programmatically configured so as to be operative to receive the external sensor data generated by the external sensor related to the local environment proximate the node-based logistics receptacle (e.g., data from the sensor associated with external sensor node 250 and/or data from external sensor 4300) and to generate carrying confirmation data 7500 related to whether the parcel customer 3800 is carrying a delivery item (such as package 170) based upon the external sensor data received from the external sensor.

Figure 77B:
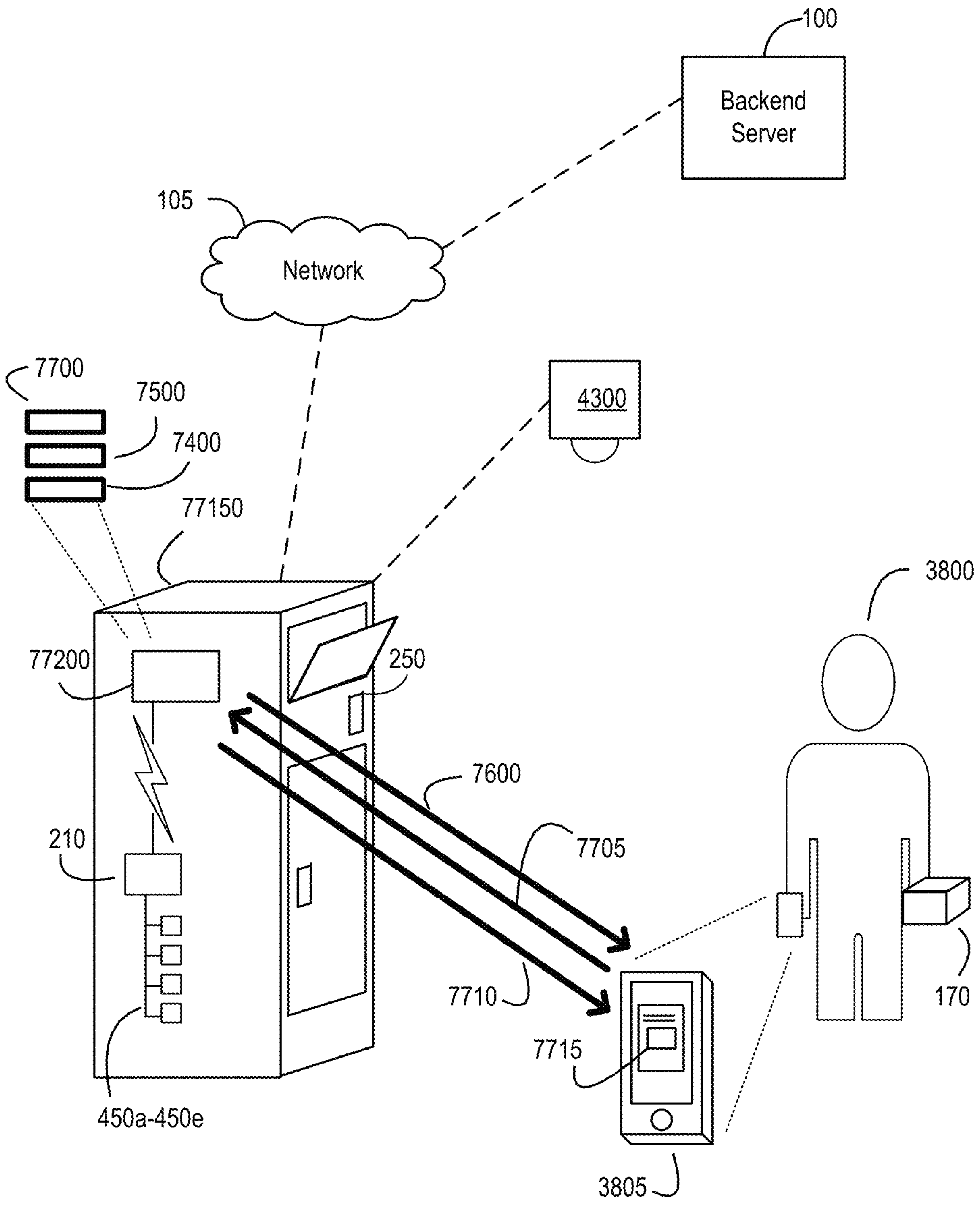

Referring now to FIG. 77B, the bridge node processor of bridge node 74200 in such a system embodiment is programmatically operative to transmit, using the communication interface 203, an exemplary drop off verification message 7600 to the mobile user device 3805 operated by the parcel customer 3800 when the carrying confirmation data 7600 indicates the parcel customer 3800 is carrying the delivery item. Such an exemplary drop off verification message 7600 presents a request (e.g., via information 7715 that can be displayed on mobile user device 3805) that the parcel customer 3800 verify that the parcel customer 3800 intends to place the delivery item 170 with the node-based logistics receptacle 77150.

The bridge node processor of bridge node 74200 in such a system embodiment is also programmatically operative to receive, using the communication interface 203, an exemplary drop off verification response message 7705 from the mobile user device 3805, which indicates the parcel customer 3800 does not intend to place the delivery item 170 with the node-based logistics receptacle 77150 (e.g., deposited inside the receptacle 77150 or placed externally and proximate to the receptacle 77150). Based upon this response message 7705, the bridge node processor of bridge node 77200 in such a system embodiment is programmatically operative to transmit, using the communication interface 203, an exemplary alternative drop off information message 7710 to the mobile user device 3805, which provides exemplary alternative drop off information related to at least one alternative drop off point for the delivery item 170. For example, the information 7715 displayed on mobile user device 3805 may be updated with the alternative drop off information received. As noted above, the content of such alternative drop off information is generated by bridge node 77200 using exemplary alternative drop off data 7700, and proactively informs parcel customer 3800 of one or more alternative drop off points where delivery item 170 may be deposited.

In further system embodiments, bridge node 77200 may generate such an alternative drop off information message 7710 with a type of contextual awareness of whether the parcel customer 3800 may be estimated to reach a particular alternative drop off point before pickup occurs for that alternative drop off point, which may involve determining an estimated reachable alternative drop off point. This may, for example, involve a further request from bridge node 77200 to mobile user device 3800 on a transport mode for parcel customer 3800 (e.g., walking, biking, riding in a vehicle, and the like). In another example, the alternative drop off information provided in the alternative drop off information message 7710 may include multiple estimated reachable alternative drop off points assuming different types of transport modes (e.g., parcel customer movement by walking, biking, or driving) and based on contextual data related to areas between any such related alternative drop off points and node-based logistics receptacle 77150 (e.g., weather, traffic, and the like). As such, those skilled in the art will appreciate that the alternative drop off information in message 7710 may be related to at least one estimated reachable alternative drop off point for the delivery item 170.

In more detail, such an estimated reachable alternative drop off point for the delivery item 170 may be determined by the bridge node processor of bridge node 77200 based upon a scheduled pickup time related to the different alternative drop off points and a distance from the location of the node-based logistics receptacle 77150 to the different alternative drop off points to come up with which alternative drop off points are estimated to be reachable by the scheduled pickup time for this parcel customer 3800. For example, the bridge node processor of bridge node 77200, when executing the monitoring and management code, may be programmatically operative to transmit the alternative drop off information message 7710 to the mobile user device 3805 by being further operative to receive a pickup status related to each of the alternative drop off points (e.g., those with information in exemplary alternative drop off data 7700) from the backend server 100, identify at least one estimated reachable alternative drop off point from the alternative drop off points in such data 7700 based upon the pickup status of each of the alternative drop off points, and transmit the alternative drop off information message 7710 to the mobile user device 3805, where the alternative drop off information is related to the identified estimated reachable alternative drop off point(s) for the parcel customer's delivery item 170. In another related example, the bridge node processor of bridge node 77200, when executing the monitoring and management code, may be programmatically operative to transmit the alternative drop off information message 7710 by receiving a pickup status related to each of the alternative drop off points in data 7700 from the backend server 100 where such a pickup status identifies if the respective alternative drop off point has been serviced (and/or identifies a location of pickup entities assigned to service the respective alternative drop off point); identify at least one estimated reachable alternative drop off point from the alternative drop off points in data 7700 based upon (a) the pickup status of each alternative drop off point and (b) a distance from the node-based logistics receptacle 77150 to each of the alternative drop off points; and transmit the alternative drop off information message 7710 to the mobile user device 3805 where the alternative drop off information in message 7710 is related to the identified estimated reachable alternative drop off point(s) for the delivery item 170.

For temperature sensitive delivery item shipments, some embodiments may have the bridge node 77200 being aware of such shipment related information and knowledge of this temperature sensitive information may be used by the bridge node 77200 to refine how to determine an appropriate alternative drop off point for the particular parcel customer 3800. For example, bridge node 77200 may maintain exemplary anticipated entity data 7400 that also includes temperature sensitive shipment information for the delivery item 170 being shipped by parcel customer 3800 as an anticipated entity that would potentially use node-based logistics receptacle 77150. In more detail, an example may have the bridge node processor of bridge node 77200 being operative to transmit the alternative drop off information message 7710 to the mobile user device 3805 operated by the parcel customer 3800 (or any other transceiver operated by a potential shipping customer approaching node-based logistics receptacle 77150) by being further operative to identify temperature sensitive shipment information for the delivery item 170 based upon the drop off verification response message; determine an environment appropriate alternative drop off point for the delivery item 170 based upon the identified temperature sensitive shipment information for the delivery item 170; and transmit the alternative drop off information message 7710 to the mobile user device 3805 operated by the parcel customer 3800 where the alternative drop off information message 7710 provides the alternative drop off information related to the environment appropriate alternative drop off point for the delivery item. Such an environmental appropriate alternative drop off point may have insulated storage capabilities or climate control functionality as part of how shipment items (such as delivery item 170) may be maintained while in custody at that drop off point. For example, an environmental appropriate alternative drop off point for the delivery item may be a climate controlled drop off point capable of maintaining the delivery item in an environmental condition consistent with the identified temperature sensitive shipment information.

In another example, when the bridge node memory maintains weather data about a local operating environment of alternative drop off points (e.g., as part of exemplary alternative drop off data 7700), the bridge node processor may be programmatically operative to determine the environment appropriate alternative drop off point for the delivery item from multiple alternative drop off points based upon the identified temperature sensitive shipment information for the delivery item 170 and the weather data about the local operating environment of each of the alternative drop off points. In still another example, when the bridge node memory further maintains internal temperature information about an internal storage environment of a plurality of alternative drop off points (e.g., as part of exemplary alternative drop off data 7700), the bridge node processor may be programmatically operative to determine the environment appropriate alternative drop off point for the delivery item from multiple alternative drop off points based upon the identified temperature sensitive shipment information for the delivery item 170 and the internal temperature information about the internal storage environment of each of the alternative drop off points. Further still, another example may the bridge node memory maintaining internal temperature information about an internal storage environment of different alternative drop off points (e.g., as part of exemplary alternative drop off data 7700), and have the bridge node processor being programmatically operative to determine the environment appropriate alternative drop off point for the delivery item 170 from the alternative drop off points based upon (a) the identified temperature sensitive shipment information for the delivery item 170, (b) the internal temperature information about the internal storage environment of each of the alternative drop off points, and (c) a pickup status related to each of the alternative drop off points (e.g., a pickup status related to a time before scheduled pickup related to each of the alternative drop off points).

Those skilled in the art will appreciate that such temperature sensitive shipment information for the delivery item 170 may, for example, include temperature rated packaging data that defines a desired thermal characteristic for the delivery item 170. Such a desired thermal characteristics for delivery item 170 may, for example, be an upper temperature threshold, a lower temperature threshold, both an upper and lower temperature threshold, a temperature threshold and time period threshold.

Determining an environmental appropriate alternative drop off point for a particular delivery item may also involve use of external sensors that detect outside temperatures and considering a risk to shipping the delivery item and reaching its destination/alternative drop off point prior to exceeding desired thermal characteristics. For example, and in more detail, an embodiment may have at least a portion of the external sensor data including external temperature data relative to the local environment proximate the node-based logistics receptacle 77150. As such and in this example, the bridge node processor of bridge node 77200, when executing the monitoring and management code, may be programmatically operative to determine the environment appropriate alternative drop off point for the delivery item 170 based upon (a) the identified temperature sensitive shipment information for the delivery item 170, (b) the external temperature data relative to the local environment proximate node-based logistics receptacle 77150, and (c) a distance to each of the alternative drop off points. The bridge node processor of bridge node 77200 may be further programmatically operative to transmit the alternative drop off information message 7710 to the mobile user device 3805, where the alternative drop off information message 7710 provides the alternative drop off information related to the environment appropriate alternative drop off point for the delivery item 170.

In a related but more detailed example where at least a portion of the external sensor data includes external temperature data relative to the local environment proximate the node-based logistics receptacle 77150 and the bridge node memory also maintains weather data about a local operating environment of the alternative drop off points, the bridge node processor may determine the environment appropriate alternative drop off point for the delivery item 170 based upon (a) the identified temperature sensitive shipment information for the delivery item 170, (b) the external temperature data relative to the local environment proximate the node-based logistics receptacle 77150, (c) the weather data about the local operating environment of each of the alternative drop off points, and (d) a distance to each of the alternative drop off points. The bridge node processor of bridge node 77200 may be further programmatically operative to transmit the alternative drop off information message 7710 to the mobile user device 3805 to provide the alternative drop off information related to the environment appropriate alternative drop off point for the delivery item 170.

In a further example with more specificity, at least a portion of the external sensor data includes external temperature data relative to the local environment proximate the node-based logistics receptacle 77150 and the bridge node memory further maintains weather data about a local operating environment of alternative drop off points and internal temperature information about an internal storage environment of the alternative drop off points. As such, the bridge node processor of bridge node 77200 in this example, when executing the monitoring and management code, is programmatically operative to determine the environment appropriate alternative drop off point for the delivery item 170 based upon (a) the identified temperature sensitive shipment information for the delivery item 170, (b) the external temperature data relative to the local environment proximate the node-based logistics receptacle 77150, (c) the weather data about the local operating environment of each of the alternative drop off points, (d) the internal temperature information about the internal storage environment of the alternative drop off points, and (e) a distance to each of the plurality of alternative drop off points. The bridge node processor then is operative to transmit, using the communication interface 203, the alternative drop off information message 7710 to the mobile user device 3805 as a way of providing the alternative drop off information related to the environment appropriate alternative drop off point for the delivery item 170.

Figure 77C:
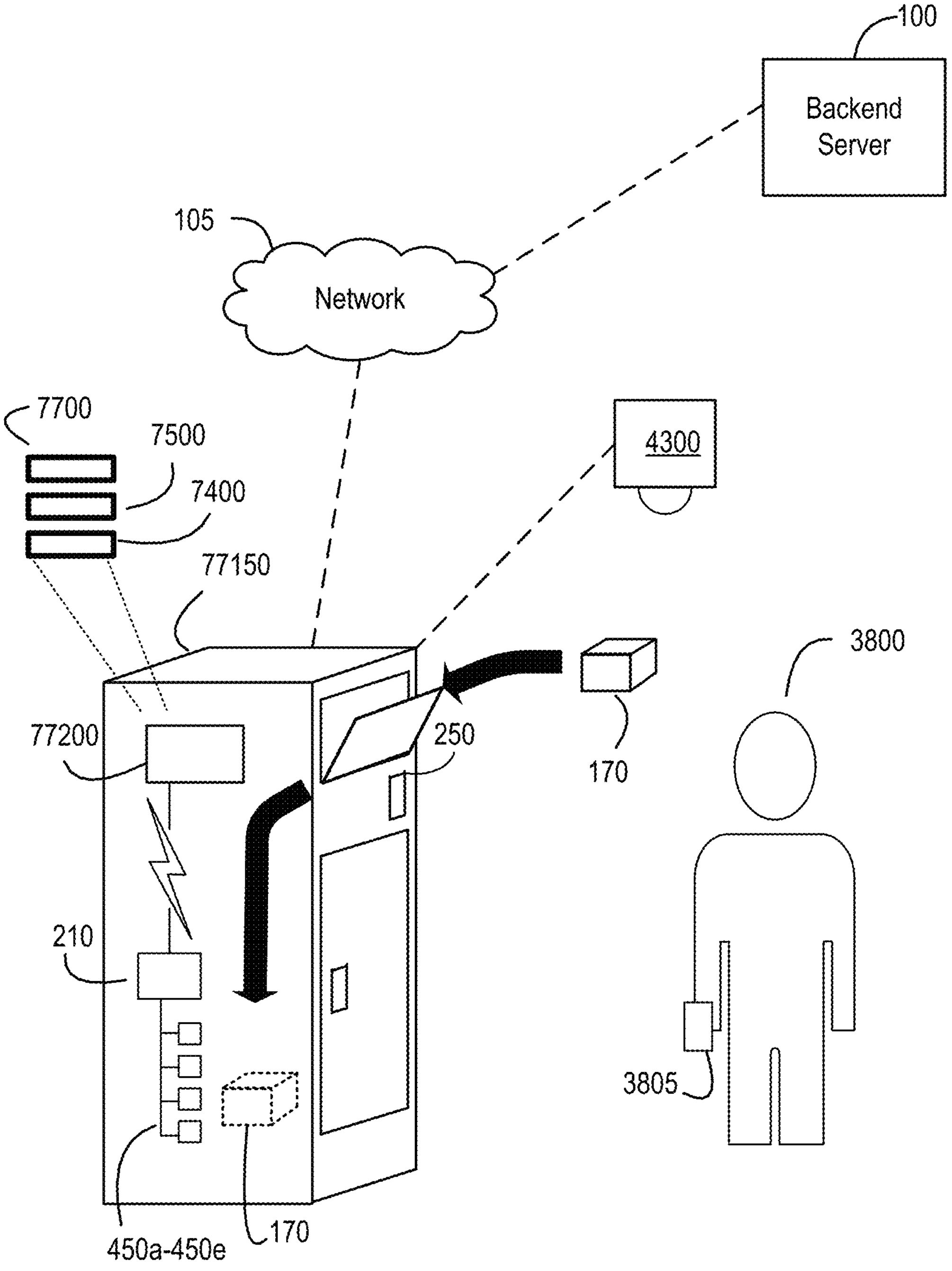

Referring now to FIG. 77C, an example is illustrated where parcel customer 3800, while having received the alternative drop off information (as a result of a reported intent not to use node-based logistics receptacle 77150), considers the alternative drop off information and then decides to deposit the delivery item 170 into node-based logistics receptacle 77150. The alternative drop off information, for example, may present information on alternative drop off points that are less desirable to parcel customer 3800 than simply using node-based logistics receptacle 77150. As shown in FIG. 77C, package 170 (the delivery item carried by parcel customer 3800) may be inserted through the entrance opening of node-based logistics receptacle 77150 and deposited thereafter within the temporary storage area within node-based logistics receptacle 77150. In this example embodiment, the bridge node processor of bridge node 77200, when executing the monitoring and management code, may be further programmatically operative to detect, after transmitting the alternative drop off information message 7710, receipt of the delivery item 170 within the node-based logistics receptacle 77150 based upon information reflecting the interaction with the one or more of the storage receptacle components using the internal sensor data; and transmit deposit information to the backend server 100 in response to the detected placement of the delivery item. Such deposit information is generally related to the detected receipt of the delivery item and causes the backend server 100 to initiate a dispatched logistics operation related to the node-based logistics receptacle 77150.

Those skilled in the art will appreciate that electing to deposit delivery item 170 within node-based logistics receptacle 77150 may incur an automated payment by parcel customer 3800 via smart contract in some embodiments. For example, the bridge node processor of bridge node 77200, when executing the monitoring and management code, may be further programmatically operative to communicate with the mobile user device 3805 over the communication interface 203, in response to detecting placement of the delivery item with the node-based logistics receptacle 77150, to establish a smart contract based connection with the mobile user device 3805 where the smart contract based connection provides terms for paid use of the node-based logistics receptacle 77150. Such a smart contract based connection, for example, may be implemented via a protocol for an automated transaction stored on a blockchain and run in response to meeting at least a payment condition for use of the node-based logistics receptacle 77150 as part of shipping the deposited delivery item 170. The payment condition, for example, may include predetermined pricing terms for paid use of the node-based logistics receptacle 77150, such as predetermined pricing terms that relate to a blockchain-based payment at a first pricing term for internal receipt of the delivery item 170 within the node-based logistics receptacle 77150 and/or predetermined pricing terms relate to a blockchain-based payment on a per-deposit basis for depositing one or more parcel items with the node-based logistics receptacle 77150. In more detail, the predetermined pricing terms may relate to a blockchain-based payment at a first pricing term for internal receipt of the delivery item 170 within the node-based logistics receptacle 77150 where the first pricing term is at a lower rate compared to a second pricing term for external deposit of the delivery item 170 outside of and proximate the node-based logistics receptacle 77150.

Figure 77D:
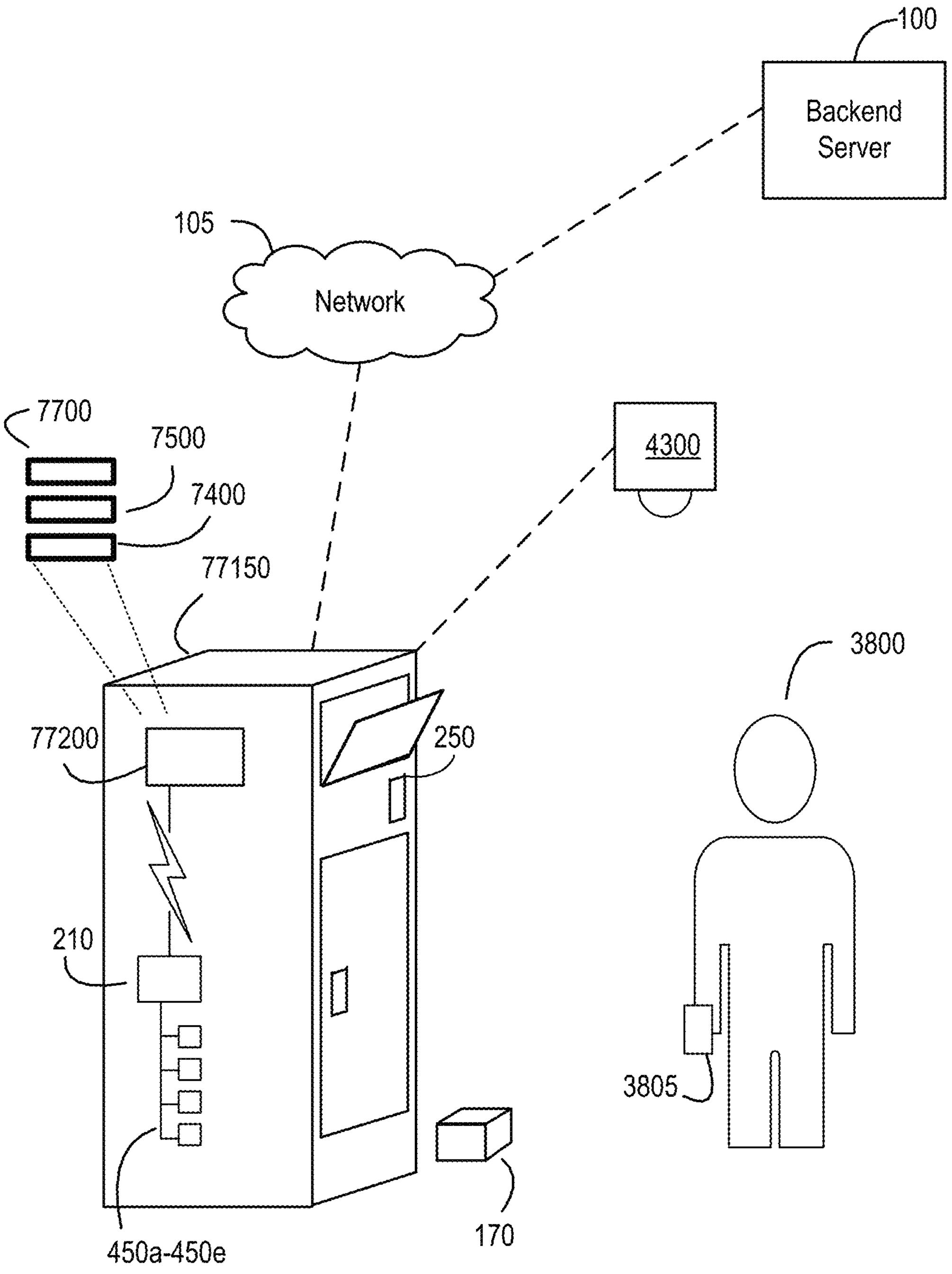

Referring now to FIG. 77D, an example is illustrated where parcel customer 3800, while having received the alternative drop off information (as a result of a reported intent not to use node-based logistics receptacle 77150), considers the alternative drop off information and then decides to deposit the delivery item 170 outside of and proximate the node-based logistics receptacle 77150 (rather than within the temporary storage area of receptacle 77150). This may, for example, be due to the size of delivery item 170 and the size of the entrance opening used to deposit any parcel items within receptacle 77150. As shown in FIG. 77D, package 170 (the delivery item carried by parcel customer 3800) may be placed next to, near, or proximate node-based logistics receptacle 77150 (rather than deposited within the temporary storage area within node-based logistics receptacle 77150 as shown in FIG. 77C). In this example embodiment and in more detail, the bridge node processor of bridge node 77200, when executing the monitoring and management code, may be further programmatically operative to detect, after transmitting the alternative drop off information message 7710, placement of the delivery item 170 proximate the node-based logistics receptacle 77150 based upon subsequent external sensor data generated by the external sensor (e.g., the external sensor coupled to external sensor node 250 and/or external sensor 4300) and without information reflecting the interaction with one or more of the storage receptacle components using the internal sensor data. In this example embodiment, the bridge node processor of bridge node 77200, when executing the monitoring and management code, may be further programmatically operative to transmit exemplary deposit information to the backend server 100 in response to the detected placement of the delivery item. Such deposit information, in this example, is generally related to the detected placement of the delivery item 170 and causes the backend server 100 to initiate a dispatched logistics operation related to the node-based logistics receptacle 77150.

Those skilled in the art will appreciate that electing to deposit delivery item 170 external to and proximate node-based logistics receptacle 77150 may also incur an automated payment by parcel customer 3800 via smart contract in some embodiments. For example, the bridge node processor of bridge node 77200, when executing the monitoring and management code, may be further programmatically operative to communicate with the mobile user device 3805 over the communication interface 203, in response to detecting placement of the delivery item with the node-based logistics receptacle 77150 (e.g., detecting external proximate placement of delivery item 170 shown in FIG. 77D), to establish a smart contract based connection with the mobile user device 3805 where the smart contract based connection provides terms for paid use of the node-based logistics receptacle 77150. Such a smart contract based connection, for example, may be implemented via a protocol for an automated transaction stored on a blockchain and run in response to meeting at least a payment condition for use of the node-based logistics receptacle 77150 as part of shipping the delivery item 170 placed next to and near node-based logistics receptacle 77150. The payment condition, for example, may include predetermined pricing terms for paid use of the node-based logistics receptacle 77150, such as predetermined pricing terms that relate to a blockchain-based payment at a first pricing term for internal receipt of the delivery item 170 within the node-based logistics receptacle 77150 and/or predetermined pricing terms relate to a blockchain-based payment on a per-deposit basis for depositing one or more parcel items with the node-based logistics receptacle 77150. In more detail, the predetermined pricing terms may relate to a blockchain-based payment at a pricing term for external deposit of the delivery item 170 with the node-based logistics receptacle 77150 where that pricing term is at a higher rate compared to another pricing term for internal deposit of the delivery item 170 within the node-based logistics receptacle 77150.

In some embodiments, the dispatched logistics operation may be initiated by backend server 100 with a greater sense of urgency when, for example, the delivery item 170 is detected as placed outside of node-based logistics receptacle 77150. For example, and in more detail, such an embodiment may have the exemplary deposit information representing the external deposit of delivery item 170 transmitted to the backend server 100 including a priority level indicator to cause the backend server 100 to initiate the dispatched logistics operation related to the node-based logistics receptacle 77150 with a heightened level of urgency. In more detail, the priority level indicator may reflect that the delivery item is deposited with the node-based logistics receptacle 77150 outside of a secured temporary storage area within the node-based logistics receptacle 77150 (such as outside of temporary storage area 205 of receptacle 77150). In another example, the bridge node processor of bridge node 77200, when executing the monitoring and management code, may be programmatically operative to transmit, using the communication interface 203, exemplary external deposit information to the backend server 100 related to the detected placement of the delivery item 170 to cause the backend server 100 to initiate the dispatched logistics operation with a logistics asset capable of completing the dispatched logistics operation under a predetermined condition. Such an exemplary predetermined condition may, for example, be a timing criteria related to pickup of the delivery item 170 deposited external to the node-enabled logistics receptacle 77150 (e.g., pickup within 2 hours of detected deposit outside receptacle 77150, and the like). In yet another detailed example, the bridge node processor of bridge node 77200, when executing the monitoring and management code, may be programmatically operative to transmit the external deposit information to the backend server 100 related to the detected placement of the delivery item 170 to cause the backend server 100 to initiate the dispatched logistics operation with a selected one of multiple logistics assets (e.g., a group of similar logistics assets, a group of different types of logistics assets, from different for-hire logistics assets) where the selected logistics asset is capable of completing the dispatched logistics operation under a predetermined time window for pickup of the delivery item 170. Further still, an example may have the bridge node processor of bridge node 77200, when executing the monitoring and management code, being programmatically operative to transmit the external deposit information to the backend server 100 to cause the backend server 100 to initiate the dispatched logistics operation with a for-hire logistics asset through a smart contract based connection between the backend server 100 and the for-hire logistics asset. Those skilled in the art will appreciate that such a smart contract based connection between server 100 and the for-hire logistics asset may programmatically define (via code in the relevant smart contract application being executed) terms for paid pickup of the delivery item 170 disposed external to the node-based logistics receptacle 77150.

In further embodiments, a smart contract between the node-based logistics receptacle 77150 (e.g., bridge node 77200) and the parcel customer's mobile user device 3805 may be automatically executed for a paid-for extension of a pickup window related to servicing node-based logistics receptacle 77150. In some examples, this may be in response to internal deposit of delivery item 170, external placement of delivery item 170 with node-based logistics receptacle 170, or either situation. In more detail, the bridge node processor of bridge node 77200 may be further programmatically operative to detect, after transmitting the alternative drop off information message 7710, deposit of the delivery item with the node-based logistics receptacle 77150 based upon at least one of (a) subsequent external sensor data generated by the system's external sensor (such as the sensor with external sensor node 250 and/or external sensor 4300) and (b) information reflecting the interaction with one or more of the storage receptacle components of receptacle 77150 using the internal sensor data. In response to detecting deposit of delivery item 170 with receptacle 77150, the bridge node processor of bridge node 77200 may be further programmatically operative to establish a smart contract based connection with the mobile user device 3805, which provides terms for a first pricing term for deposit of the delivery item 170 with the node-based logistics receptacle 77150 and second pricing term (e.g., an additional fee) for extending the pickup time relative to the node-based logistics receptacle 77150; and transmit deposit information to the backend server in response to the detected placement of the delivery item 170. Here, the exemplary deposit information transmitted is related to the detected deposit of the delivery item 170 as well as extension of the predetermined pickup time. Those skilled in the art will appreciate that receipt of the deposit information causes the backend server 100 to initiate a dispatched logistics operation related to the node-based logistics receptacle 77150 consistent with extended pickup time (e.g., initiate the dispatched logistics operation consistent with the extended pickup time with a logistics asset capable of conducting the dispatched logistics operation consistent with the extended pickup time or with a logistics asset capable of conducting the dispatched logistics operation no earlier than the extended pickup time). Such a logistics asset in this example may be one of a variety of types of logistics assets, including a for-hire logistics asset hired to specifically conduct at least this particular dispatched logistics operation.

In more detail, the engagement to have such a for-hire logistics asset conduct the dispatched logistics operation may be governed by a smart contract as well. For example, the bridge node processor of bridge node 77200, when executing the monitoring and management code, may be programmatically operative to transmit the deposit information to the backend server 100 to cause the backend server 100 to initiate the dispatched logistics operation with the for-hire logistics asset through a smart contract based connection between the backend server 100 and the for-hire logistics asset. Such a smart contract based connection provide programmatically defined (via the smart contract application code) payment terms for the for-hire logistics asset to conduct the dispatched logistics operation related to pickup of the delivery item 170 disposed external to the node-based logistics receptacle 77150 no earlier than the extended pickup time. Thus, parcel customer 3800 may elect to pay for the extended pickup time through a first smart contract's payment terms while the backend server 100 may operation to engage a for-hire logistics asset under a different smart contract's payment terms in order to initiate the dispatched logistics operation related to node-based logistics receptacle 77150 under the extended pickup time.

Periodic Heartbeat Validation of Components in Node-Based Logistics Receptacle

In many of the embodiments described herein, an exemplary node-based logistics receptacle having a bridge node and at least one wireless accessory sensor node is operative to monitor for changes in the state of the logistics receptacle and report event information related to such changes to a backend server. In further embodiments, what is generated within such an exemplary node-based logistics receptacle may also include, at times, another type of information (generally referred to as non-event information) resulting from confirming operation of the wireless accessory sensor node when the change in state of the storage receptacle has not been detected. The generated non-event information represents a lack of physical interaction with the monitored storage components of such an exemplary node-based logistics receptacle, but is information that is generated so as to validate that node devices used for monitoring within the exemplary node-based logistics receptacle remain operative. Such non-event information may, for example, take the form of a total event count of zero for the exemplary node-based logistics receptacle as a type of periodic heartbeat that may be reported to the backend server to validate that the bridge node and/or wireless sensor node remains operational but is simply not detecting changes relative to the exemplary node-based logistics receptacle. Those skilled in the art will appreciate that exemplary non-event information provides a different type or additional kind of information related to what is going on with a deployed exemplary logistics receptacle. For example, a status flag in an updated advertising signal broadcast by the wireless accessory sensor node may indicate data is available for upload by the bridge node related to one or more particular events (e.g., detected changes in state of the logistics receptacle) or indicate that no event was detected during a particular period of time. In such embodiments, both types of information may be useful to the backend server and such embodiments may transmit receptacle update information that include one or both types of information (e.g., event information indicative of one or more changes in state of the logistics receptacle, non-event information indicating no detected changes in the logistics receptacle). Those skilled in the art will appreciate that such exemplary receptacle update information may generally represent a periodic heartbeat where no change in status is triggering reporting to the backend server, and it is instead reported where such a heartbeat type of update is uploaded from the wireless accessory sensor node and reported to the backend server.

FIG. 48 is a diagram of an exemplary proactively monitored and reporting logistics receptacle system operating within a network in accordance with an embodiment of the invention. Referring now to FIG. 48, exemplary connected node-based logistics receptacle 48150 is shown operative to communicate with backend server 100 with components similar to exemplary logistics receptacle 150 described relative to FIG. 2. Those skilled in the art will appreciate that exemplary connected logistics receptacle 48150 shown in FIG. 48 is similarly structured to exemplary connected/node-based logistics receptacle 150 and 150*a*, with the exception that exemplary receptacle 48150 is equipped with an exemplary bridge node 48200 that generates further types of data maintained on the bridge node 48200 (e.g., exemplary non-event information) and exemplary wireless accessory sensor node 48210 (similar to node 210 or other wireless accessory sensor nodes within logistics receptacle 150) coupled to exemplary sensors 450*a*-450*e*. As such, exemplary receptacle 48150 includes an embodiment of monitoring and management code for execution by the processor in bridge node 48200 (controlling functionality of bridge node 48200 in such additional embodiments) and use of such data (e.g., exemplary management profile 4400 and environmental context data 4405) maintained within memory 305/310 of bridge node 48200 as part of enhanced self-tuning functionality based upon contextual awareness implemented in exemplary connected logistics receptacle 48150. Those skilled in the art will appreciate that backend server 100 may, in some embodiments, transmit updates to the exemplary management profile 4400 and/or environmental context data 4405 for use by the exemplary connected logistics receptacle 48150. Those skilled in the art will also appreciate, as explained in more detail below, that bridge node 48200 may update the exemplary management profile 4400 and/or environmental context data 4405 based on operations of receptacle 48150 without an update command or data from backend server 100.

Consistent with the description above, the system embodiment uses exemplary wireless accessory sensor node 48210 (e.g., similar to exemplary node 210) coupled to a plurality of sensors (e.g., sensors 450*a*-450*e*) that collectively monitor the storage receptacle components of the node-based logistics receptacle 48150 and generate sensor data reflecting one or more interactions with one or more of the storage receptacle components of the node-based logistics receptacle 48150 over a recording time period. Such sensors, as described above, may generate sensor data related to motion of the entrance opening, motion of objects moving through the entrance opening, motion of an object within the temporary storage area, image sensor data related a change of contents maintained within the temporary storage area, weight sensor data related a change in weight of what is stored within the temporary storage area, and the like. Those skilled in the art will appreciate that such sensors respectively monitor each of the monitored storage components for a change in state of the storage receptacle.

In more detail, this system embodiment's exemplary wireless accessory sensor node 48210 is operative to receive sensor data generated by the sensors; determine whether the change in state of the storage receptacle has been detected based upon sensor data generated by at least one of the sensors 450*a*-450*e*; generate event information including recorded timestamped information reflecting the detected change in state of the storage receptacle when the sensor data indicates the change in state of the storage receptacle has been detected; and periodically generate non-event information resulting from confirming operation of the wireless accessory sensor node when the change in state of the storage receptacle has not been detected. Such generated non-event information represents a lack of physical interaction with the monitored storage components of exemplary receptacle 48150, in contrast to the event information. The exemplary wireless accessory sensor node 48210 is also operative to broadcast an updated advertising signal having a flag set within the updated advertising signal where such a set flag indicates exemplary wireless accessory sensor node 48210 has a status update available for upload from the wireless accessory sensor node 48210. Such a status update includes at least one of the generated event information or the generated non-event information.

Figure 49A:
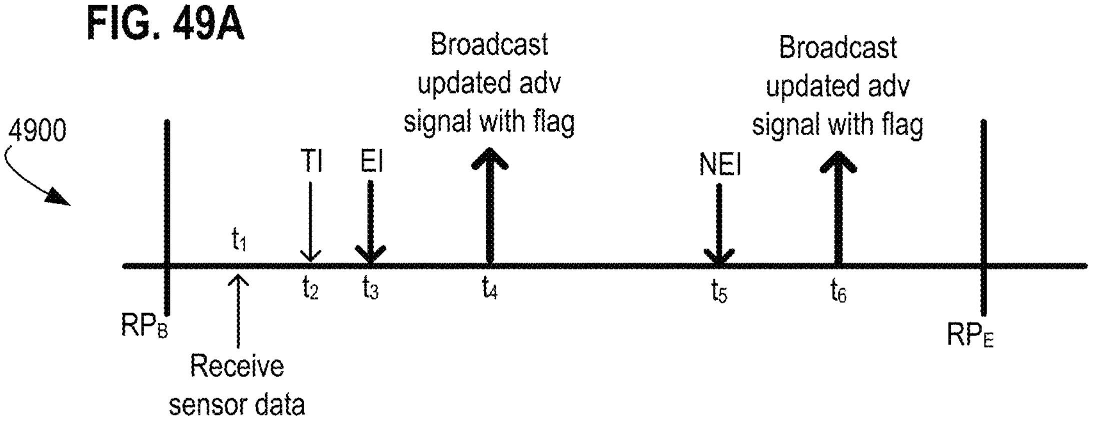
FIGS. 49A-49B are timing diagrams illustrating exemplary wireless accessory sensor node activity during an exemplary reporting period for exemplary proactively monitored and reporting logistics receptacle system of FIG. 48 involving the generation of event information or non-event information in accordance with different embodiments of the invention.
Figure 49B:
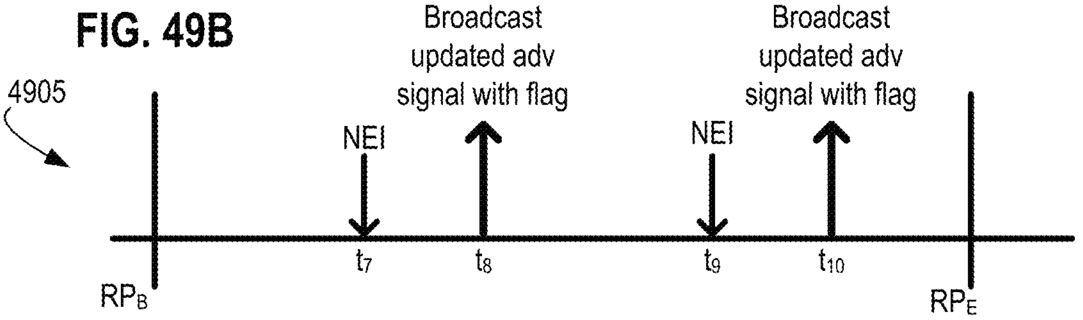

In more detail, FIGS. 49A-49B are exemplary timing diagrams illustrating examples of exemplary wireless accessory sensor node 48210 activity over an exemplary reporting period during operation of the exemplary proactively monitored and reporting logistics receptacle system of FIG. 48 involving the generation of event information or non-event information in accordance with different embodiments of the invention. In general, FIGS. 49A-49B illustrate such exemplary activity from the perspective of wireless accessory sensor node 48210. FIG. 49A generally represents an example where wireless accessory sensor node 48210 detects a change in state of exemplary receptacle 48150 during a first portion of a reporting period but then fails to detect any further change in state of exemplary receptacle 48150 during a second portion of a reporting period. However, those skilled in the art will appreciate that during an exemplary reporting period, wireless accessory sensor node 48210 may detect a change in state of exemplary receptacle 48150 and broadcast an updated advertising signal with a set flag without separately and subsequently generating non-event information and broadcasting another updated advertising signal within the reporting period related to such non-event information. Likewise, those skilled in the art will appreciate that during an exemplary reporting period, wireless accessory sensor node 48210 may not detect a change in state of exemplary receptacle 48150 at all and broadcast an updated advertising signal with a set flag without generating event information and broadcasting a separate updated advertising signal within the reporting period related to such event information.

Referring now to FIG. 49A, an example is shown where both event information and non-event information are generated at different times (e.g., $t_3$ and $t_5$, respectively). In the example shown in FIG. 49A, an exemplary timeline 4900 of activity is shown having a beginning time at $RP_B$ where an exemplary reporting period begins and an ending time at $RP_E$ where the exemplary reporting period ends. At time $t_1$, exemplary wireless accessory sensor node 48210 receives sensor data generated by one or more of the sensors monitoring the monitored storage components of exemplary receptacle 48150. Such sensor data may, for example, indicate a change relative to the state of entrance opening 155, change of the state of temporary storage area 205, change of the state of door 160, and/or change of the state of the area proximate connected logistics receptacle 150. Exemplary wireless accessory sensor node 48210 detects the change in state of the storage receptacle based upon the sensor data generated by the at least one of the sensors, and then at time $t_2$ records timestamped information (TI) reflecting the detected change in state of the storage receptacle. At time $t_3$, exemplary wireless accessory sensor node 48210 generates event information (EI) including the timestamped information reflecting the detected change in state of the storage receptacle when the sensor data indicates the change in state of the storage receptacle has been detected. Generation of the EI then has exemplary wireless accessory sensor node 48210 broadcasting the updated advertising signal having a flag set within the updated advertising signal at time to over the wireless transceiver interface of node 48210. Here, at time $t_4$, the flag being set indicates the wireless accessory sensor node 48210 has a status update available for upload from the wireless accessory sensor node 48210. Such a status update includes, at this point in time, the generated event information (EI). After a period of time where no change in receptacle 48150 is detected, exemplary wireless accessory sensor node 48210 generates non-event information (NEI) at time $t_5$. Those skilled in the art will appreciate that this is an example of how exemplary wireless accessory sensor node 48210 may periodically generate confirming the operation of the wireless accessory sensor node 48210 when the change in state of the storage receptacle has not been detected during the reporting period or a particular portion of the reporting period. Generation of the NEI at time $t_5$ then has exemplary wireless accessory sensor node 48210 broadcasting the updated advertising signal having a flag set within the updated advertising signal at time to over the wireless transceiver interface of node 48210. Here, at time to, the flag being set indicates the wireless accessory sensor node 48210 has a status update available for upload from the wireless accessory sensor node 48210 and where such a status update includes, at this point in time, the generated non-event information (NEI).

Referring now to the example activity shown in FIG. 49B, an exemplary timeline 4905 of activity is shown with no detected change in state of the logistics receptacle during any part of the reporting period. As such, non-event information (NEI) is generated periodically (e.g., at times $t_7$ and $t_9$). Generation of the NEI at each of times $t_7$ and $t_9$, respectively, has exemplary wireless accessory sensor node 48210 broadcasting an updated advertising signal having a flag set within the updated advertising signal (e.g., at times $t_8$ and $t_{10}$, respectively) over the wireless transceiver interface of node 48210. For these instances at times $t_8$ and $t_{10}$, the flag being set indicates the wireless accessory sensor node 48210 has a status update available for upload from the wireless accessory sensor node 48210 and where such a status update includes, at this point in time, the generated non-event information (NEI).

Figure 50:
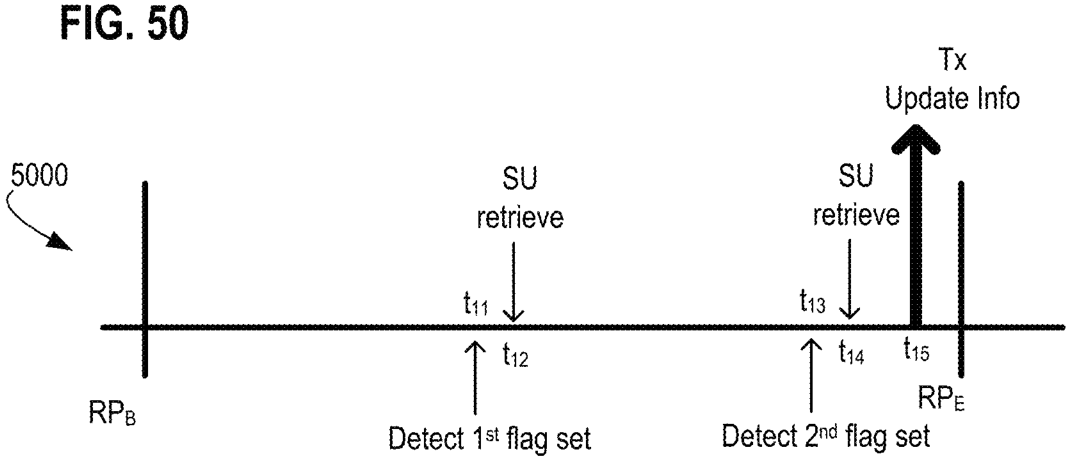
FIG. 50 is a timing diagram illustrating exemplary bridge node activity during the exemplary reporting period for exemplary proactively monitored and reporting logistics receptacle system of FIG. 48 involving status updates that may include event information or non-event information retrieved from an exemplary wireless accessory sensor node in accordance with an embodiment of the invention.

FIG. 50 is a timing diagram illustrating exemplary bridge node activity during the exemplary reporting period for exemplary proactively monitored and reporting logistics receptacle system of FIG. 48 involving status updates that may include event information or non-event information retrieved from exemplary wireless accessory sensor node 48210 in accordance with an embodiment of the invention. Referring now to the example shown in FIG. 50, an exemplary timeline 5000 of activity from the perspective of exemplary bridge node 48200 is shown where bridge node 48200 is operative to detect, using the wireless communication interface 203, the flag set within the updated advertising signal at time $t_{11}$ and retrieve, using the wireless communication interface 203, the status update from the wireless accessory sensor node 48210 at time $t_{12}$ in response to detecting the flag set at time $t_{11}$. In some embodiments, bridge node 48200 may soon thereafter generate and transmit exemplary receptacle update information to backend server 100 prior to tis. However, those skilled in the art will appreciate that other embodiments (such as that shown in FIG. 50) may have bridge node 48200 waiting until time $t_{15}$ (e.g., waiting to see if a second flag set is detected at time $t_{13}$ and where another status update is retrieved from wireless accessory sensor node 48210 at time $t_{14}$) to transmit receptacle update information to backend server 100. The receptacle update information includes or at least reflects the retrieved status update including at least one of the generated event information (EI) and the generated non-event information (NEI). As such, the transmitted receptacle update information proactively validates an operational status of the bridge node 48200 and the wireless accessory sensor node 48210 to the backend server 100.

Furthermore, the transmitted receptacle update information may cause the backend server 100 to initiate a first type of dispatched logistics operation related to the storage receptacle 48150 when the status update reflected in the receptacle update information corresponds to the event information. In more detail, such a system embodiment may have the first type of dispatched logistics operation comprises a dispatched pickup operation for contents within the storage receptacle of receptacle 48150. For example, and in even more detail, the receptacle update information transmitted to the backend server may cause the backend server 100 to reactively dispatch a logistics asset (e.g., exemplary logistics asset 700*a*, or a mobile node operated by logistics asset 700*a*) to the location of receptacle 48150 for pickup of at least the delivery item from within the storage receptacle as the first type of dispatched logistics operation. In another example, the receptacle update information transmitted to the backend server 100 may cause the server 100 to alter a previously scheduled dispatch operation related to the storage receptacle 48150 as the first type of dispatched logistics operation. In still another example, the receptacle update information transmitted to the backend server 100 may cause the server 100 to transmit a pickup message to an alternative logistics asset (e.g., exemplary logistics asset 700*b*) as the first type of dispatched logistics operation related to the storage receptacle 48150 where the alternative logistics asset is different than an original logistics asset corresponding to a previously scheduled dispatch operation related to that storage receptacle 48150.

In a further system embodiment, the receptacle update information may selectively cause the backend server 100 to initiate a second type of dispatched logistics operation related to the storage receptacle 48150 when the status update reflected in the receptacle update information corresponds to the non-event information (NEI). For example, the non-event information may be an indication the wireless accessory sensor node 48210 has not detected the change in state of the storage receptacle 48150 and an indication the wireless accessory sensor node 48210 is still operational to detect the change in state of the storage receptacle. However, those skilled in the art will appreciate that the non-event information may, in some instances, be an indication the wireless accessory sensor node 48210 is not operational to detect the change in state of the storage receptacle. For example, receipt of exemplary receptacle update information may provide EI and/or NEI that confirms expected operation of receptacle 48150. In other cases, the NEI is provided at an unexpected time, which may indicate abnormal operation of receptacle 48150. In still other cases, the lack of such EI/NEI when anticipated by server 100 may confirm a problem with receptacle 48150. Thus, in some embodiments, the second type of dispatched logistics operation may be a dispatched maintenance operation to service the storage receptacle.

In such a system embodiment, different types of sensors may be used for monitoring different monitored components of exemplary node-based logistics receptacle 48150. For example, the sensor data generated by at least one of the sensors may be sensor data indicating a change in state of the entrance opening as the change in state of the storage receptacle (e.g., where the sensor may be a motion sensor detecting a change in motion of the entrance opening; a motion sensor detecting a change in motion of the entrance opening and a failure to return to a prior state of the entrance opening; an inertial sensor detecting a change in inertial movement related to the entrance opening; a status sensor detecting a change in orientation of the entrance opening and a failure to return to a prior state of the entrance opening as the change in state of the storage receptacle and where the retrieved event information transmitted to the backend server 100 may indicate an overflow state of the storage receptacle; a motion sensor detecting movement of what is received through the entrance opening; an accelerometer detecting a change in motion of the entrance opening; a multiple-axis accelerometer detecting a change in multi-dimensional motion of the entrance opening; a gyroscopic sensor detecting a change in movement related to the entrance opening; and a magnetic sensor detecting a change in position of the entrance opening as the change in state of the storage receptacle). In another example, the sensor data generated by at least one of the sensors may be sensor data indicating a change in state of the temporary storage area as the change in state of the storage receptacle (e.g., where the sensor may be a motion sensor detecting motion within the temporary storage area; an image sensor detecting a change of what is stored within the temporary storage area; a scale disposed at a bottom of the temporary storage area where the scale detects a change in weight of what is stored within the temporary storage area; a force sensor disposed within the temporary storage area, the force sensor detecting a change in what has been deposited within the temporary storage area (such as a load cell operative to detect an impact force related to the change in what has been deposited within the temporary storage area); a light sensor detecting a change in light within the temporary storage area; and a chemical sensor detecting a chemical within the temporary storage area as the change in state of the storage receptacle). In still another example, the sensor data generated by at least one of the sensors may be sensor data indicating a change in state of the selectively accessible retrieval door as the change in state of the storage receptacle (e.g., where the sensor may be a motion sensor detecting a change in motion of the selectively accessible retrieval door; a motion sensor detecting a change in motion of the selectively accessible retrieval door and a failure to return to a prior state of the selectively accessible retrieval door; an inertial sensor detecting a change in inertial movement related to the selectively accessible retrieval door; a gyroscopic sensor detecting a change in movement related to the selectively accessible retrieval door; a status sensor detecting a change in orientation of the selectively accessible retrieval door and a failure to return to a prior state of the selectively accessible retrieval door as the change in state of the storage receptacle (where the retrieved event information transmitted to the backend server may be indicative of an unsecured state of the storage receptacle); a magnetic sensor detecting a change in position of the selectively accessible retrieval door; a lock sensor detecting a change in state of the door's lock; an external motion sensor detecting a change in what has been placed within a predetermined range of the storage receptacle; a range sensor (such as a proximity sensor, a depth sensor, a LiDAR sensor, an infrared sensor, and/or a laser-based sensor) detecting a change in what has been placed within a predetermined range of the storage receptacle).

As previously shown relative to examples shown in FIGS. 5A-5E, such a system embodiment may have the entrance opening of receptacle 48150 being, for example, an articulating door that when open allows the delivery item to be received by the storage receptacle and transferred into the temporary storage area; a static chute that allows the delivery item to be inserted through the static chute and into the temporary storage area; or an articulating drop chute that allows the delivery item to be received in a first position of the articulating drop chute and transfers the received delivery item to the temporary storage area in a second position of the articulating drop chute.

In a further system embodiment, the change in the state of exemplary node-based logistics receptacle 48150 may be validated. For example, exemplary wireless accessory sensor node 48210 may be operative to detect the change in state of the storage receptacle (e.g., a delivery event where the delivery item is received by the storage receptacle) based upon sensor data generated by at least one of the sensors by being further operative to detect a change in state of the entrance opening using the at least one of the sensors, and validate the change in state of the entrance opening by detecting light within the temporary storage area using a second of the sensors. In another example, exemplary wireless accessory sensor node 48210 may be operative to detect the change in state of the storage receptacle (e.g., a pickup event where the delivery item is removed from the storage receptacle) based upon sensor data generated by at least one of the sensors by being further operative to detect a change in state of the selectively accessible retrieval door using the at least one of the sensors; and validate the change in state of the selectively accessible retrieval door by detecting light within the temporary storage area using a second of the sensors.

In some embodiments, the system's bridge node 48200 may have its processor 201 operative to detect the flag set (e.g., at time $t_{11}$ or time $t_{13}$) by being further operative to wake from a low power state of the bridge node 48200 at a predetermined time of day and, after the predetermined time of day, detect the flag set within the updated advertising signal over the wireless communication interface 203. In a more detailed example, the system's bridge node 48200 may have its processor 201 operative to detect the flag set (e.g., at time $t_{11}$ or time $t_{13}$) by being further operative to wake from a low power state of the bridge node 48200 at a beginning of a reporting period for the bridge node 48200 (e.g., a time period defined by the backend server and provided by the backend server to the bridge node, a dynamically adjusted time period stored in the bridge node memory, the dynamically adjusted time period defined by a reporting period update message sent by the backend server to the bridge node). After the beginning of the reporting period for the bridge node 48200, processor 201 is then operative to detect the flag set within the updated advertising signal over the wireless communication interface.

Those skilled in the art will appreciate that in such a system embodiment, the event information may include timestamped information and an identifier indicating a type of detected change in state of the storage receptacle (e.g., where the type of detected change in state of the storage receptacle is a change in state of the entrance opening, the temporary storage area, the selectively accessible retrieval door, the lock on the retrieval door, a change in what has been placed within the predetermined range of the storage receptacle as indicated by an external motion sensor and/or range sensor). In more detail, such timestamped information may include data indicating a time corresponding to the detected change in state of the storage receptacle. In a further example, such timestamped information may include data indicating a series of times corresponding to a series of related changes to the storage receptacle, where the series of related changes to the storage receptacle are detected by the wireless accessory sensor node 48210 as the detected change in state of the storage receptacle.

A further system embodiment may have the system's exemplary wireless accessory sensor node 48210 receiving at least a portion of the sensor data over its wireless transceiver interface. A further example may have exemplary wireless accessory sensor node 48210 having a sensor interface coupling node's sensor node processor to the sensors, where the sensor interface is operative to communicate with the sensors and receive the sensor data. In some instances, such a sensor interface may be wirelessly coupled to at least a portion of the sensors.

In yet another system embodiment, the system's exemplary bridge node 48200 may be implemented as a mobile bridge node (e.g., when logistics receptacle 48150 is disposed on a mobile delivery vehicle) having location circuitry coupled to the bridge node processor 201 and operative to generate location data reflecting a current location of the mobile bridge node as mounted to the storage receptacle 48150. In such an example, the receptacle update information transmitted to the backend server 100 may further include the current location of the mobile bridge node.

Dynamic Tuning of Backend Server

Figure 56:
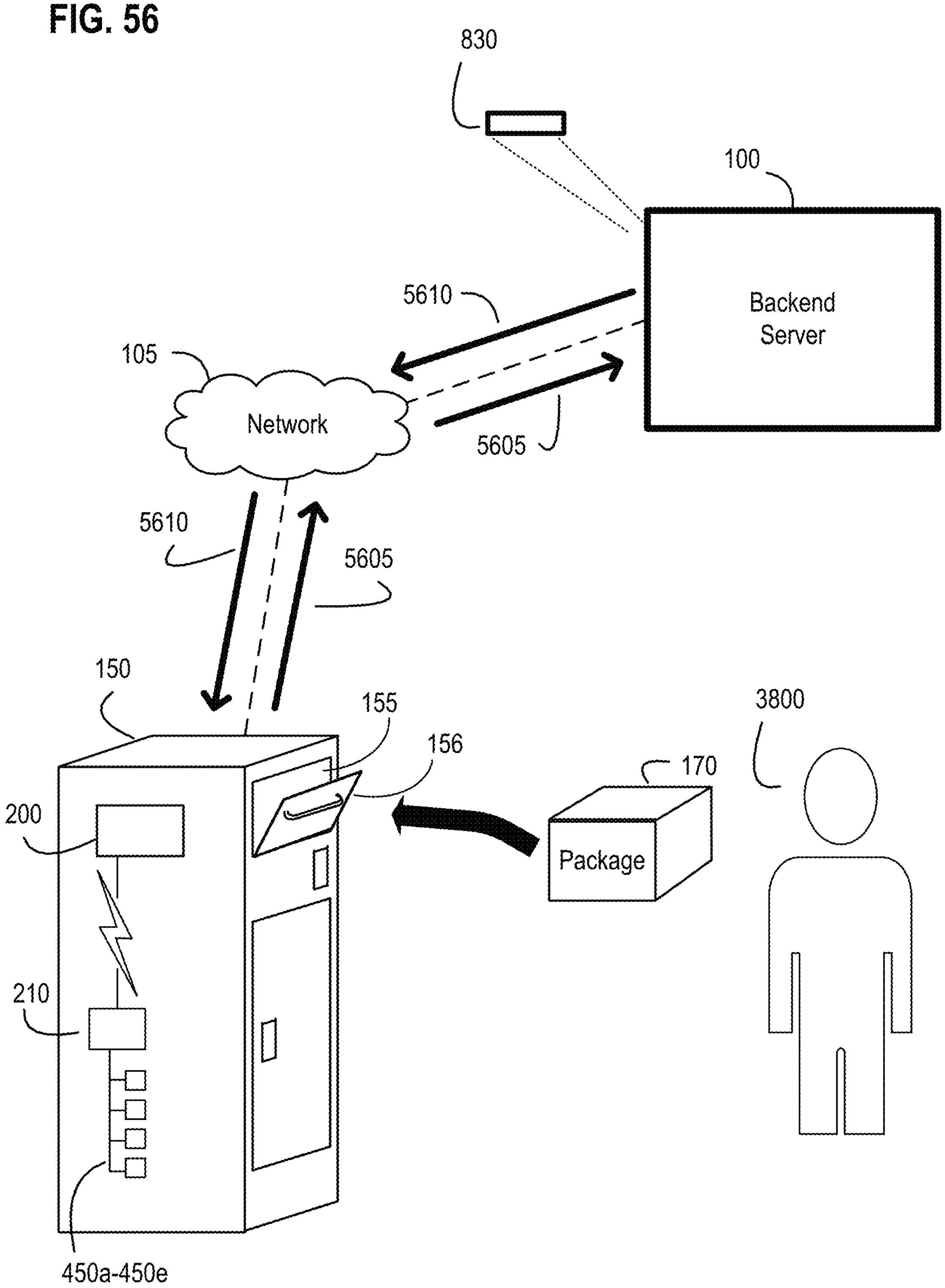
FIG. 56 is a diagram illustrating an exemplary dynamic learning server-based logistics system in accordance with an embodiment of the invention.
Figure 57:
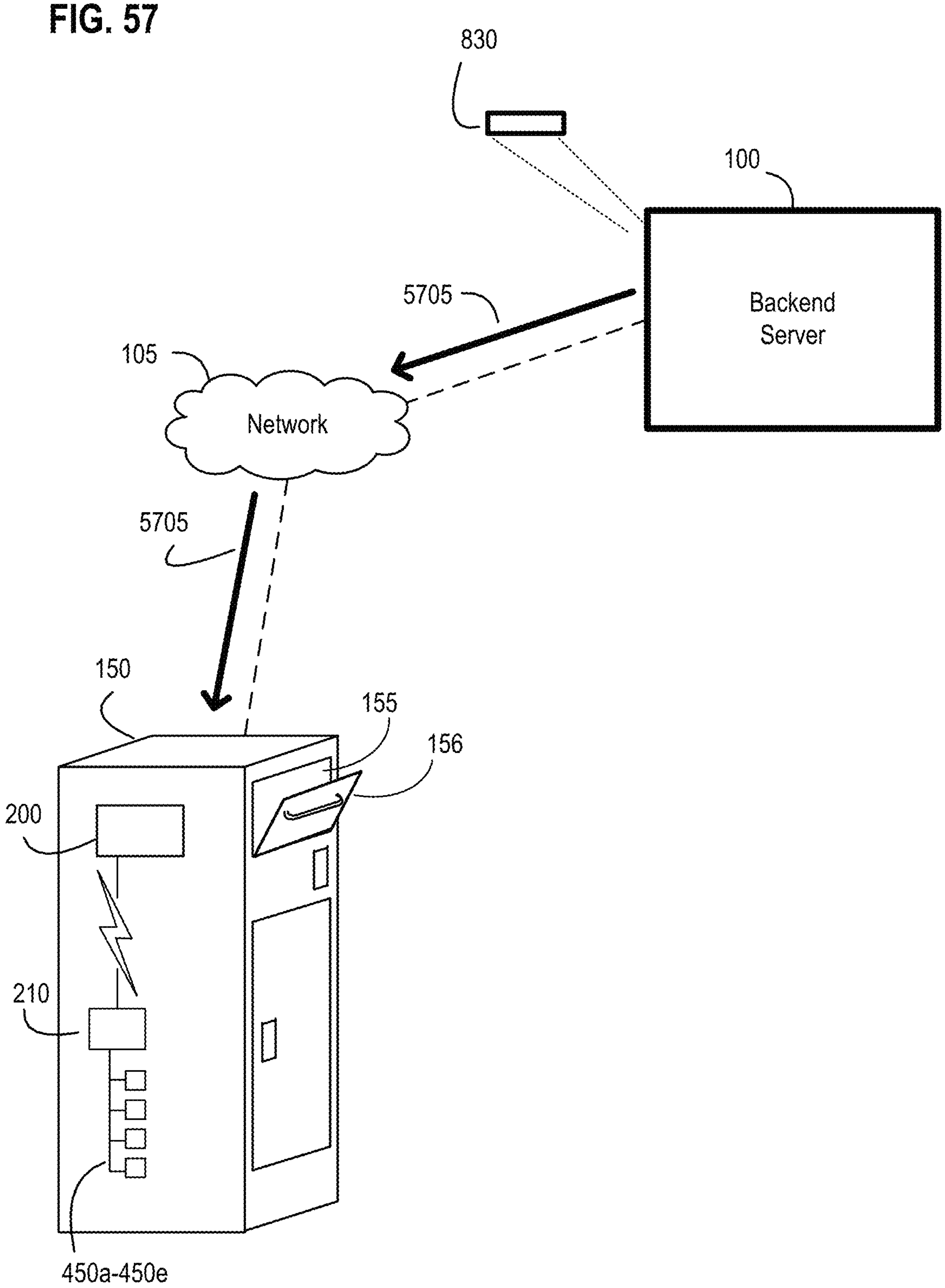
FIG. 57 is a diagram illustrating an embodiment of the system of FIG. 56 where the backend server transmits an exemplary setup message in accordance with an embodiment of the invention.

As noted above, various embodiments may have the backend server learning from the reported event information and responsively tuning or modifying the operations of one or more node-based logistics receptacles as a result. In further embodiments, the backend server 100 learns from the reported event information in an advantageously different way by dynamically adjusting when to update engagement/interaction history information and use pattern information that is kept as part of the management profile on the backend server. In other words, some further embodiments have the backend server 100 updating onboard information (e.g., management profile type of information) at dynamically adjusted times depending on changes in engagement and patterns and rates of change of such engagement and patterns as further event information is received from various connected logistics receptacles 150 to further enhance operations of backend server 100. FIGS. 56-57 illustrate various aspects related to embodiments of such a dynamical learning server-based logistics system.

FIG. 56 is a diagram illustrating an exemplary dynamic learning server-based logistics system in accordance with an embodiment of the invention. Referring now FIG. 56, exemplary connected node-based logistics receptacle 150 is shown operative to communicate with backend server 100. Exemplary parcel customer 3800 is shown transporting exemplary package 170 (a type of delivery item) to be deposited within the exemplary connected logistics receptacle 150. An embodiment of an exemplary dynamic learning server-based logistics system includes node-based logistics receptacle 150 and exemplary backend server 100. In this system embodiment, the node-based logistics receptacle 150 is operative to receive a delivery item as part of a logistics transaction and includes monitored receptacle components (e.g., entrance opening, a temporary storage area and selectively accessible retrieval door consistent with that previously described). The system's exemplary connected logistics receptacle 150 is also illustrated being equipped with at least exemplary bridge node 200, exemplary wireless accessory sensor node 210, and sensors 450*a*-450*e* that are coupled to the wireless accessory sensor node on receptacle 150 and collectively monitor one or more interactions with the monitored receptacle components over a recording time period. The bridge node 200 in this particular system embodiment is operative to retrieve event information from the wireless accessory sensor node (where the event information is related to sensor data generated by the sensors 450*a*-450*e*) and transmit the retrieved event information at an upload time.

The system's backend server 100, as shown in FIG. 56, maintains a management profile (e.g., exemplary management profile 835) related to operation of the node-based logistics receptacle 150. In more detail and as noted above, exemplary management profile 835 is generally a data structure generated, maintained, and updated by backend server 100 with information on the history and use of a node-based logistics receptacles (e.g., exemplary connected node-based logistics receptacle 150), its respective components, and logistics assets used to service the particular node-based logistics receptacle. Management profile 835 may, in some embodiments, be implemented with a database or records for each connected node-based logistics receptable being managed by backend server 100 or may be implemented as separate sub-profiles for each connected node-based logistics receptable being managed by backend server 100.

In this embodiment and as explained in more detail below, the exemplary dynamic learning server-based logistics system has the backend server 100 dynamically revising management profile 835 in a particularly advantageous manner. In general, the system's backend server 100 is programmatically configured to be operative to receive the retrieved event information 5605 from the bridge node 200 at the upload time; compare the retrieved event information with the management profile 835; and identify a threshold change condition from the comparison of the retrieved event information with the management profile 835. The system's backend server 100 is then programmatically configured to be operative to dynamically revise the management profile 835 when the threshold change condition is identified, and transmit an adjustment message 5610 to the bridge node 200 where the adjustment message is based upon the revised management profile 835. The adjustment message 5610 initiates a timing change to operation of the bridge node 200. Such a timing change may, for example, be implemented as a change to the recording time period and/or a change to the upload time for the bridge node 200.

In more detail, a further embodiment of the exemplary dynamic learning server-based logistics system may define the threshold change condition in a variety of ways. For example, the threshold change condition may be a predetermined threshold change in engagement (or interaction) with the node-based logistics receptacle. More specifically, the threshold change condition may take the form of a predetermined threshold change in engagement (or interaction) with the node-based logistics receptacle 150 as indicated by the event information compared to an engagement history for the node-based logistics receptacle 150, which is maintained as part of the management profile 835 for the node-based logistics receptacle 105. Such an engagement history may, for example, be a prior component engagement history for prior instances of interactions with different ones of the monitored receptacle components.

In another embodiment, the system may define the threshold change condition as a predetermined threshold rate of change in engagement (interaction) with the node-based logistics receptacle 150. In more detail, the threshold change condition may be a predetermined threshold rate of change in engagement with the node-based logistics receptacle 150 as indicated by the event information compared to an engagement history for the node-based logistics receptacle 150, which is maintained as part of the management profile 835 for the node-based logistics receptacle 105. Such an engagement history may, for example, be a prior component engagement history for prior instances of interactions with different ones of the monitored receptacle components.

In yet another embodiment, the threshold change condition may be implemented as a predetermined threshold change in a pattern of engagement (interaction) with the node-based logistics receptacle 150. In more detail, the threshold change condition may be a predetermined threshold change in the pattern of engagement with the node-based logistics receptacle 150 as indicated by the event information compared to a pattern of usage for the node-based logistics receptacle 150, where the pattern of usage is maintained as part of the management profile 835 for the node-based logistics receptacle 150. Such an exemplary pattern of usage may take the form of a pattern of prior delivery events associated with the node-based logistics receptacle 150, a pattern of prior pickup events associated with the node-based logistics receptacle 150, and a pattern of prior pickup and delivery events associated with the node-based logistics receptacle 150.

Further still, an embodiment may have the threshold change condition being a predetermined threshold rate of change in a pattern of engagement with the node-based logistics receptacle 150.

Additional embodiments may, for example, implement the threshold change condition as a predetermined threshold change in historic use pattern associated with the node-based logistics receptacle 150. Such a historic use pattern associated with the node-based logistics receptacle may be a threshold occupancy pattern identifying a frequency of reaching a threshold occupied level within the node-based logistics receptacle 150 and/or an overload pattern identifying a frequency of reaching an overload condition for the node-based logistics receptacle.

Certain embodiments may have the backend server 100 being operative to identify the threshold condition using limits. For example, the backend server 100 may be programmatically configured to be operative to identify the threshold change condition based upon or when the comparison of the retrieved event information with the management profile indicates exceeding a threshold limit associated with the threshold change condition. In another example, the backend server 100 may be programmatically configured to be operative to identify the threshold change condition based upon or when the comparison of the retrieved event information with the management profile indicates a threshold limit associated with the threshold change condition has not been met. In still another example, the backend server 100 may be programmatically configured to be operative to identify the threshold change condition based upon the comparison of the retrieved event information with the management profile indicating at least one of (a) a failure to meet a lower threshold limit associated with the threshold change condition and (b) exceeding an upper threshold limit associated with the threshold change condition. In yet another example, the backend server 100 being programmatically configured to be operative to identify the threshold change condition based upon when the comparison of the retrieved event information with the management profile indicates falling within a threshold limit range associated with the threshold change condition. Further still, another example may have the backend server 100 being programmatically configured to be operative to identify the threshold change condition based upon or when the comparison of the retrieved event information with the management profile indicates falling outside of a threshold limit range associated with the threshold change condition.

Additional system embodiments may have backend server 100 dynamically revising management profile 835 under more specific conditions. For example, the backend server 100 may be programmatically configured to be operative to dynamically revise the management profile 835 when the threshold change condition is identified by being programmatically configured to be operative to revise timing information maintained within the management profile 835 at a predetermined update time. Such a predetermined update time may, for example, be different from a current update time for revising the management profile. Additionally, such timing information that is revised may be the recording time period and/or the upload time in such additional system embodiments. In still another example, the backend server 100 may be programmatically configured to be operative to dynamically revise the management profile 835 when the threshold change condition is identified by being programmatically configured to be operative to revise timing information maintained within the management profile 835 at a predetermined update time based upon when the threshold change condition is identified and based upon the event information and at least one prior event information received from the node-based logistics receptacle 150.

FIG. 57 is a diagram illustrating a more detailed embodiment of the system of FIG. 56 where the backend server transmits an exemplary setup message in accordance with an embodiment of the invention. Referring now to FIG. 57, exemplary backend server 100 is shown as part of a system embodiment where the backend server 100 may be programmatically configured to be further operative to transmit a setup message 5705 to the bridge node 200. Such an exemplary setup message 5705 configures operation of the bridge node 200 related to at least the recording time period for the wireless accessory sensor node 210 and the upload time for transmitting the retrieved event information to the backend server 100.

Referring back to FIG. 56, a similar system embodiment of an exemplary dynamic learning server-based logistics system having the node-based logistics receptacle 150 and the backend server 100 that maintains management profile 835, the backend server 100 is more specifically programmatically configured to be operative to receive the retrieved event information 5605 from the bridge node 200 at the upload time and determine whether a threshold change condition exists based upon a comparison of the retrieved event information to at least a portion of the management profile 835. In this further embodiment, when backend server 100 determines the threshold change condition exists, backend server 100 is then operative to (a) adjust an update time related to revising the management profile 835, (b) revise the management profile 835 based upon the retrieved event information at the adjusted update time, and (c) transmit an adjustment message 5610 to the bridge node 200, where the adjustment message 5610 is based upon the revised management profile 835 and where the adjustment message 5610 initiates a timing change to operation of the bridge node 200 (e.g., a change to the recording time period and/or upload time). In this further more detailed system embodiment, an embodiment may be implemented that similarly involves transmitting a setup message 5705 (as shown in FIG. 57) to bridge node 200 to configure operation of the bridge node 200 related to at least one of the recording time period for the wireless accessory sensor node (e.g., node 210) and the upload time for when the bridge node 200 is to transmit the retrieved event information to the backend server 100.

Likewise, in this more detailed system embodiment of an exemplary dynamic learning server-based logistics system, further embodiments may similarly implement the threshold change condition similar to that described above (e.g., being a predetermined threshold change in engagement indicated by a comparison of event information and an engagement history maintained within the management profile 835; being a predetermined threshold rate of change in engagement based on engagement history; being a predetermined threshold change in a pattern of engagement (such as using a pattern of usage reflected in information within management profile 835); being a predetermined threshold rate of change in a pattern of engagement; being a predetermined threshold change in historic use pattern associated with the node-based logistics receptacle (e.g., threshold occupancy patterns, overload patterns).

Likewise, in this more detailed system embodiment of an exemplary dynamic learning server-based logistics system, further embodiments may revise the management profile 835 in more specific ways. For example, such an embodiment may have the backend server 100 being programmatically configured to be operative to revise the management profile 835 when the threshold change condition is determined to exist by being programmatically configured to be operative to revise timing information (e.g., the recording time period and/or the upload time) maintained within the management profile 835 at the adjusted update time (e.g., an adjusted update time that is different from a prior update time associated with revising the management profile 835 when the threshold change condition is determined not to exist). In another example, the backend server 100 may be programmatically configured to be operative to revise the management profile when the threshold change condition is determined to exist by being programmatically configured to be operative to revise timing information maintained within the management profile at the adjusted update time based upon when the threshold change condition is determined to exist and based upon the retrieved event information and at least one prior event information received from the node-based logistics receptacle 150.

Enhanced Node-Based Logistics Receptacle with a Deployable Storage Element

As noted above, some embodiments described herein may involve on-demand deployment of a mobile logistics receptacle as a type of dispatched logistics asset apparatus to the location of an existing node-based logistics receptacle to help address surges in demand at the location of that exemplary node-based logistics receptacle (or in locations near that exemplary node-based logistics receptacle). In additional embodiments, an exemplary node-based logistics receptacle may be equipped with a deployable storage element (e.g., an exemplary deployable mobile container) that is deployed from within the node-based logistics receptacle with items/parcels that may have been collected or otherwise received by that node-based logistics receptacle. As discussed below in more detail, such a deployable mobile container may help to better and more efficiently facilitate logistics operations involving a node-based logistics receptacle. For example, one or more node-based logistics receptacles may deploy their deployable mobile container so that items/parcels within each of them may be provided to a logistics asset that may not be at the same location as the node-based logistics receptacle, but be at separate logistics location (e.g., a location central to several other node-based logistics receptacles or a location that is more accessible to the logistics asset than the location of the node-based logistics receptacle deploying its deployable storage element). Further, as described in more detail below, exemplary deployable storage elements may be autonomous and capable of launching from its node-based logistics receptacle and moving to different locations while navigating to locations while avoiding obstacles as well as autonomously loading into other logistics asset vehicles or a receiving facility associated with a logistics asset or entity. As such, exemplary embodiments of an enhanced node-based logistics receptacle having at least one deployable storage element are described in more detail below relative to FIGS. 58A-69.

Figure 58A:
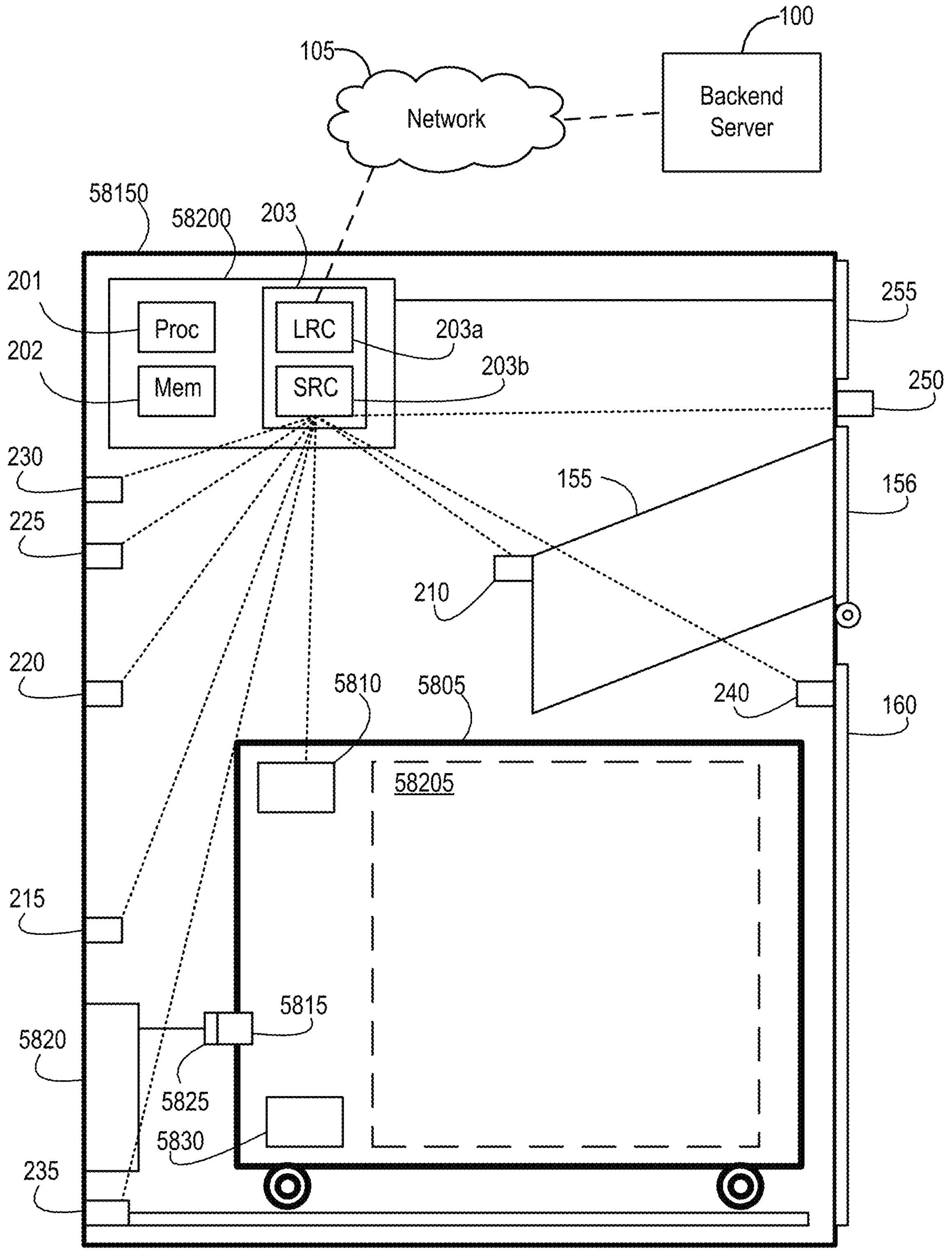
FIGS. 58A-58B are diagrams illustrating aspects of an exemplary node-based logistics receptacle with a deployable storage element in accordance with an embodiment of the invention.
Figure 58B:
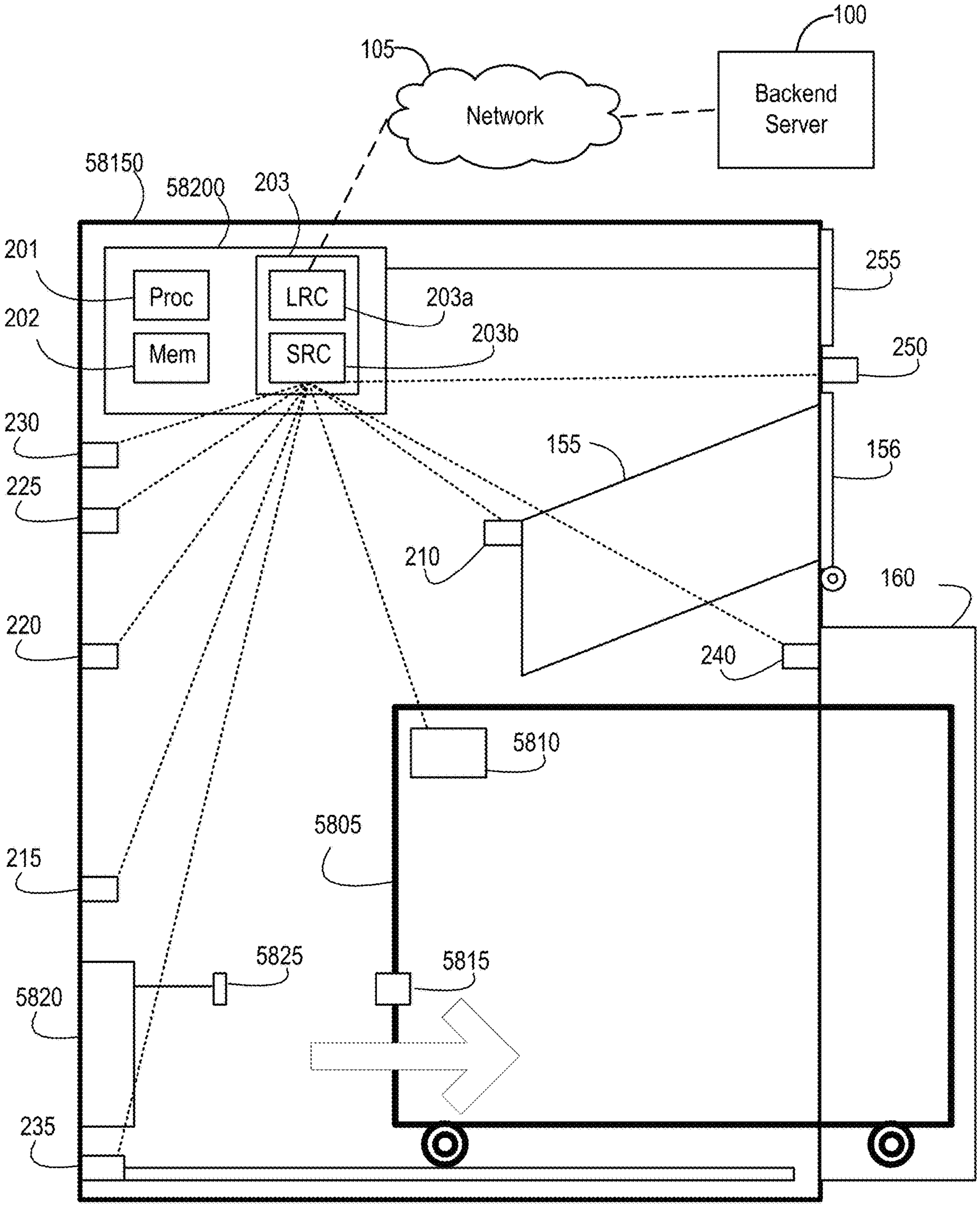

In general, FIGS. 58A-58B are diagrams illustrating aspects of an exemplary node-based logistics receptacle 58150 with a deployable storage element in accordance with an embodiment of the invention. The exemplary node-based logistics receptacle 58150 shown in FIG. 58A has an exemplary deployable autonomous mobile container 5805 configured to operate within the receptacle 58150 where container 5805 is able to receive deposited items (where exemplary deployable autonomous mobile container 51020*c*, while similar, is a self-moving apparatus that is not used within a node-based logistics receptacle). The exemplary node-based logistics receptacle 58150 shown in FIG. 58B illustrates how exemplary deployable autonomous mobile container 5805 may be launched from within the receptacle 58150 where deployable autonomous mobile container 5805 moves from within receptacle 58150 (e.g., through an opened retrieval door 160) upon receipt of a deploy activation signal.

In more detail and referring now to FIG. 58A, exemplary connected node-based logistics receptacle 58150 is shown operative to communicate with backend server 100 with components similar to exemplary logistics receptacle 150 described relative to FIG. 2. Those skilled in the art will appreciate that exemplary connected logistics receptacle 58150 shown in at least FIGS. 58A-58B is similarly structured to exemplary connected/node-based logistics receptacle 150 and 150*a*, with the exception that exemplary receptacle 58150 is equipped with an exemplary bridge node 58200 that is programmatically configured to interface with exemplary deployable autonomous mobile container 5805, monitor what has been deposited within container 5805 in various ways, and coordinate the deployment of container 5805 from a host position within receptacle 58150 to one or more positions external to receptacle 58150.

As shown in FIG. 58A, exemplary connected node-based logistics receptacle 58150 is shown with exemplary power source 5820 and exemplary power coupling 5825, which mates to a power charging port 5815 on exemplary deployable autonomous mobile container 5805. Power source 5820 (e.g., a battery, a corded power supply, a solar powered power source, and the like) provides power to exemplary deployable autonomous mobile container 5805 through power coupling 5825 disposed on a portion of the storage receptacle. The power charging port 5815 disposed on exemplary deployable autonomous mobile container 5805 accepts power from power source 5820 through power coupling 5825 to charge the deployable autonomous mobile container 5805 and energize electrical components disposed as part of container 5805 (such as the container's autonomous controller 5810 and its propulsion and steering system 5830). Those skilled in the art will appreciate that exemplary power charging port 5815 mates to exemplary power coupling 5825 when exemplary deployable autonomous mobile container 5805 is in a host position within the storage receptacle. Power source 5820 may, in some embodiments, be able to sense a mated connection with container 5805 and report or confirm the mated connection to bridge node 58200 by sending a confirmation detection message or signal to bridge node 58200, which may be useful when container 5805 is initially loaded into and received by node-based logistics receptacle 58150. Further, those skilled in the art will appreciate that exemplary power charging port 5815 becomes automatically disconnected from the power coupling 5825 when the deployable autonomous mobile container 5805 autonomously moves from the host position within the receptacle 58150 to a position external to the receptacle 58150.

Within exemplary connected node-based logistics receptacle 58150, exemplary deployable autonomous mobile container 5805 is shown as resting in the host position upon a weight/force sensitive sensor (scale, load cell, impact sensor) coupled to exemplary temporary storage area force sensor node 235, which can detect changes in what has been deposited within container 5805 in this embodiment. Thus, the weight of contents deposited within container 5810 may be monitored by exemplary connected node-based logistics receptacle 58150 (e.g., exemplary bridge node 58200 and exemplary wireless accessory sensor node 235 coupled to the weight/force sensitive sensor).

As shown in FIG. 58A, exemplary deployable autonomous mobile container 5805 includes its own temporary storage area 58205 for temporarily maintaining one or more delivery items once they are deposited within the receptacle 58150 through the entrance opening of receptacle 58150 (e.g., exemplary entrance opening 155 and/or entrance opening door 156). As noted above and explained in more detail relative to FIG. 61, exemplary deployable autonomous mobile container 5805 is controlled by its own exemplary autonomous controller 5810, which accepts input (such as a deploy activation signal, destination information, remote input, sensor feedback, and the like), generates control signals for the container's propulsion and steering system 5830 to control movement of the container 5805, and may generate further signals as part of interfacing with other devices (e.g., wirelessly interacting with mobile logistics assets or personnel associated with such mobile logistics assets). Exemplary deployable autonomous mobile container 5805 is operative to autonomously move from the host position within the receptacle 58150 to a position external to the receptacle 58150 in response to receiving a deploy activation signal from exemplary bridge node 58200.

In a system embodiment involving exemplary node-based logistics receptacle 58150 and exemplary deployable autonomous mobile container 5805, the receptacle's exemplary bridge node 58200 (a node similar to exemplary bridge node 200) is mounted to the storage receptacle 58150. Exemplary bridge node 58200 includes bridge node processor 201, bridge node memory 202 coupled to the bridge node processor 201 (where bridge node memory storage 202 in this embodiment involving the deployable storage element maintains monitoring and deployment code for execution by processor 201—an example of CRL control & management code 305 shown in FIG. 3—and data representing an exemplary deployment threshold setting used by processor 201 when determining whether to generate the deploy activation signal), long-range communication interface 203*a* coupled to the bridge node processor 201 that can communicate with the backend server 100 over a first communication path, and short-range communication interface 203*b* coupled to the bridge node processor 201 that can communicate over a second communication path.

The exemplary deployment threshold setting may be implemented in a variety of ways as a threshold used to evaluate when to launch exemplary deployable autonomous mobile container 5805 relative to a current condition of what is maintained within container 5605. Such a deployment threshold setting, for example, may relate to a predetermined number of items being maintained within the deployable autonomous mobile container 5805 when the current condition of what is presently maintained within the deployable autonomous mobile container 5805 corresponds to a count of how many items are presently maintained within the deployable autonomous mobile container (e.g., with such a count being based upon motion, impact, and/or image sensor data related to items as they are deposited in area 58205 within container 5805). In another example, the deployment threshold setting may relate to a predetermined volume level of items being maintained within the deployable autonomous mobile container while the current condition of what is presently maintained within the deployable autonomous mobile container 5805 corresponds to a current volume level of items presently maintained within the deployable autonomous mobile container 5805. In still another example, the deployment threshold setting may relate to a predetermined weight of items being maintained within the deployable autonomous mobile container 5805 while the current condition of what is presently maintained within the deployable autonomous mobile container 5805 corresponds to a current weight of items presently maintained within the deployable autonomous mobile container 5805. In yet another example, the deployment threshold setting may relate to a predetermined economic-related threshold where at least when the current condition of what is presently maintained within the deployable autonomous mobile container 5805 corresponds to the predetermined threshold then an economic threshold is exceeded to warrant servicing the storage receptacle 58150 by activating the deployable autonomous mobile container 5805 to leave the host position and move to the position external to the storage receptacle 58150 for a logistics operation related to at least the delivery item. Those skilled in the art will appreciate, for example, that costs for operating a particular deployable autonomous mobile container 5805 and costs incurred related to a logistics operation related to servicing what has been deposited within that container 5805 may be associated with the economic threshold (e.g., costs incurred to launch, service, and replace container 5805 compared with the benefits of more timely servicing of what is deposited within receptacle 58150 (such as meeting priority shipping terms for particular packages, and the like)). In more detail, such an economic threshold may related to particular number/type of packages, a particular combination of packages and letters, and/or weight of container contents where such a threshold involved in generating the deploy activation signal is a threshold grounded in economic terms for operation of the node-based logistics receptacle 58150 and associated logistics assets that are used to service receptacle 58150 (including mobile logistics assets used to collect and/or service exemplary deployable autonomous mobile container 5805 launched from receptacle 58150).

In such a system embodiment involving exemplary node-based logistics receptacle 58150 and exemplary deployable autonomous mobile container 5805 as illustrated in FIG. 58A, the system includes sensors operatively in communication with the bridge node's processor (e.g., communicating directly to the bridge node 200 or indirectly via an intervening wireless accessory sensor node that accepts sensor data from the sensor and makes that sensor data available to bridge node 58200). Generally, such sensors include one or more interaction sensors in communication with the bridge node's processor (directly or indirectly) and that are disposed on the receptacle 58150 to monitor for a change in state of the entrance opening 155/156. In one example where the interaction sensor directly supplies sensor data to bridge node 58200, the interaction sensor generates sensor data corresponding to corresponding to the change in the state of the entrance opening 155/156 and provides the interaction sensor data to the bridge node processor 201. Such sensor data generated by the interaction sensor monitoring the entrance opening may, for example, be motion sensor data related to motion of the entrance opening, or motion sensor data related to motion of an object through the entrance opening, image sensor data related to an object passing through the entrance opening, and the like. Additionally, such an interaction sensor may be implemented with an inertial sensor detecting a change in inertial movement related to the entrance opening, an accelerometer detecting a change in motion of the entrance opening, a magnetic sensor detecting a change in position of the entrance opening, or a status sensor detecting a change in orientation of the entrance opening and a failure to return to a prior state of the entrance opening.

In another example, such as that shown in FIG. 58A where the interaction sensor indirectly supplies sensor data to bridge node 58200, the interaction sensor (e.g., motion sensor, status sensor, image sensor, and the like as described above) used with exemplary wireless accessory sensor nodes (such as node 210 operative to detect different types of changes in the state of the entrance opening of connected logistics receptacle 58150) generates interaction sensor data corresponding to the particular change in the state of the entrance opening. Those skilled in the art will appreciate, in light of embodiments already described above, that the wireless accessory sensor node, as an intermediary, may report such interaction sensor data is available and then provides the interaction sensor data to the bridge node processor 201.

Aside from interaction sensor(s), the sensors involved in a system embodiment involving exemplary node-based logistics receptacle 58150 and exemplary deployable autonomous mobile container 5805 also include one or more exemplary storage sensors operatively in communication with the bridge node processor 201. Such exemplary storage sensor(s) may be in direct communication with bridge node processor 201 where the storage sensor may be wired directly to bridge node 58200 or may be wirelessly coupled through interface 203 to bridge node 58200. Similar to that described above for the interaction sensor, those skilled in the art will appreciate that such an exemplary storage sensor may be indirectly coupled to and indirectly communicate with bridge node processor 201 through an intermediary wireless accessory sensor node coupled to the storage sensor. Consistent with what is described above relative to an example of indirect communication of an interaction sensor with bridge node 58200, those skilled in the art will appreciate that such a wireless accessory sensor node may be operative to provide the interaction sensor data and the storage sensor data to the bridge node processor 201 by being further operative to (a) broadcast an updated advertising signal indicating the wireless accessory sensor node has at least one of the interaction sensor data and the storage sensor data for upload by the bridge node processor 201 and (b) respond to a request from the bridge node processor 201 for information related to at least one of the interaction sensor data and the storage sensor data.

Such a storage sensor is operative to monitor for a change in state of what is maintained within the deployable autonomous mobile container 5805. To do this, the storage sensor (e.g., being operative to generate storage sensor data corresponding to the change in the state of what is maintained within the deployable autonomous mobile container 5805 and provide the storage sensor data to the bridge node processor 201. In more detail, those skilled in the art will appreciated that such a storage sensor may be mounted to an interior of the storage receptacle 58150 and oriented to monitor what is maintained within the deployable autonomous mobile container 5805 (e.g., what has been deposited within storage area 58205 of container 5805). In a further example, such a storage sensor may be mounted on the deployable autonomous mobile container 5805 and wirelessly coupled to the bridge node 58200 (e.g., directly to interface 203 or indirectly to interface 203 through a wireless accessory sensor node, which may gather the storage sensor data and make such storage sensor data available for upload by bridge node 58200) and oriented to monitor what is deposited within the deployable autonomous mobile container 5805. Such a storage sensor may be implemented, for example, by a motion sensor detecting motion within the deployable autonomous mobile container 5805, an image sensor detecting a change of what is stored within the deployable autonomous mobile container 5805, a scale disposed within the deployable autonomous mobile container 5805 where the scale detects at least a change in weight of what is stored within the deployable autonomous mobile container 5805.

In such a system embodiment involving exemplary node-based logistics receptacle 58150 and exemplary deployable autonomous mobile container 5805 as illustrated in FIG. 58A, the bridge node 58200 (specifically the bridge node processor 201 in bridge node 58200), when executing the monitoring and deployment code, being programmatically operative to detect the change in the state of the entrance opening based upon the interaction sensor data, determine a current condition of what is presently maintained within the deployable autonomous mobile container based upon the storage sensor data, and generate the deploy activation signal when the current condition of what is presently maintained within the deployable autonomous mobile container corresponds to at least the deployment threshold setting for the deployable autonomous mobile container 5805. The bridge node 58200 is further programmatically operative to transmit the deploy activation signal to the deployable autonomous mobile container 5805 (e.g., where autonomous controller 5810 uses a wireless transceiver onboard container 5805 to receive such a deploy activation signal) to initiate movement by the deployable autonomous mobile container 5805 from the host position within the receptacle 58150 to a position external to the receptacle 58150 in response to receiving the deploy activation signal. As shown in FIG. 58B, exemplary deployable autonomous mobile container 5805, in response to the deploy activation signal, is shown as it moves from the host position within the receptacle 58150, disconnects from power coupling 5825, and proceeds under its own power and autonomous control out from within node-based logistics receptacle 58150.

Those skilled in the art will appreciate that in an embodiment where retrieval door 160 (or another access door) secures container 5805 in place, door 160 may be actuated in response to the deploy activation signal to an open position to allow container 5805 to move external to receptacle 58150. However, in another embodiment, exemplary deployable mobile container 5805 may be secured within receptacle 58150 in the host position without the need for an actuated door to allow movement of container 5805 away from receptacle 58150. In other words, exemplary deployable autonomous mobile container 5805 may insert and securely fit within receptacle 58150 while leaving one side of container 5805 exposed. As such, essentially one side of deployable autonomous mobile container 5805 may form a removable portion of the exterior of receptacle 58150 yet still secure the storage area 58205 within container 5805 in the host position.

In a further system embodiment involving exemplary node-based logistics receptacle 58150 and exemplary deployable autonomous mobile container 5805, the bridge node 58200, when executing the monitoring and deployment code, may be further programmatically operative to transmit, using the communication interface 203, event information (including at least information reflecting the detected change in state of the entrance opening and/or timestamped information related to the detected change in state of the entrance opening) to the backend server 100 when the current condition of what is presently maintained within the deployable autonomous mobile container 5805 corresponds to less than the deployment threshold setting for the deployable autonomous mobile container 5805. Additionally, the bridge node 58200 may be operative to transmit, using the communication interface 203, a dispatch message to the backend server 100 when the current condition of what is presently maintained within the deployable autonomous mobile container 5805 corresponds to less than the deployment threshold setting for the deployable autonomous mobile container 5805. Such a dispatch message may include event information (including at least information reflecting the detected change in state of the entrance opening and/or timestamped information related to the detected change in state of the entrance opening) reflecting the detected change in state of the entrance opening and cause the backend server 100 to initiate a dispatched logistics operation related to the storage receptacle (such as causing a logistics asset to travel to the location of node-based logistics receptacle 58150 to pickup/drop off items).

Figure 59:
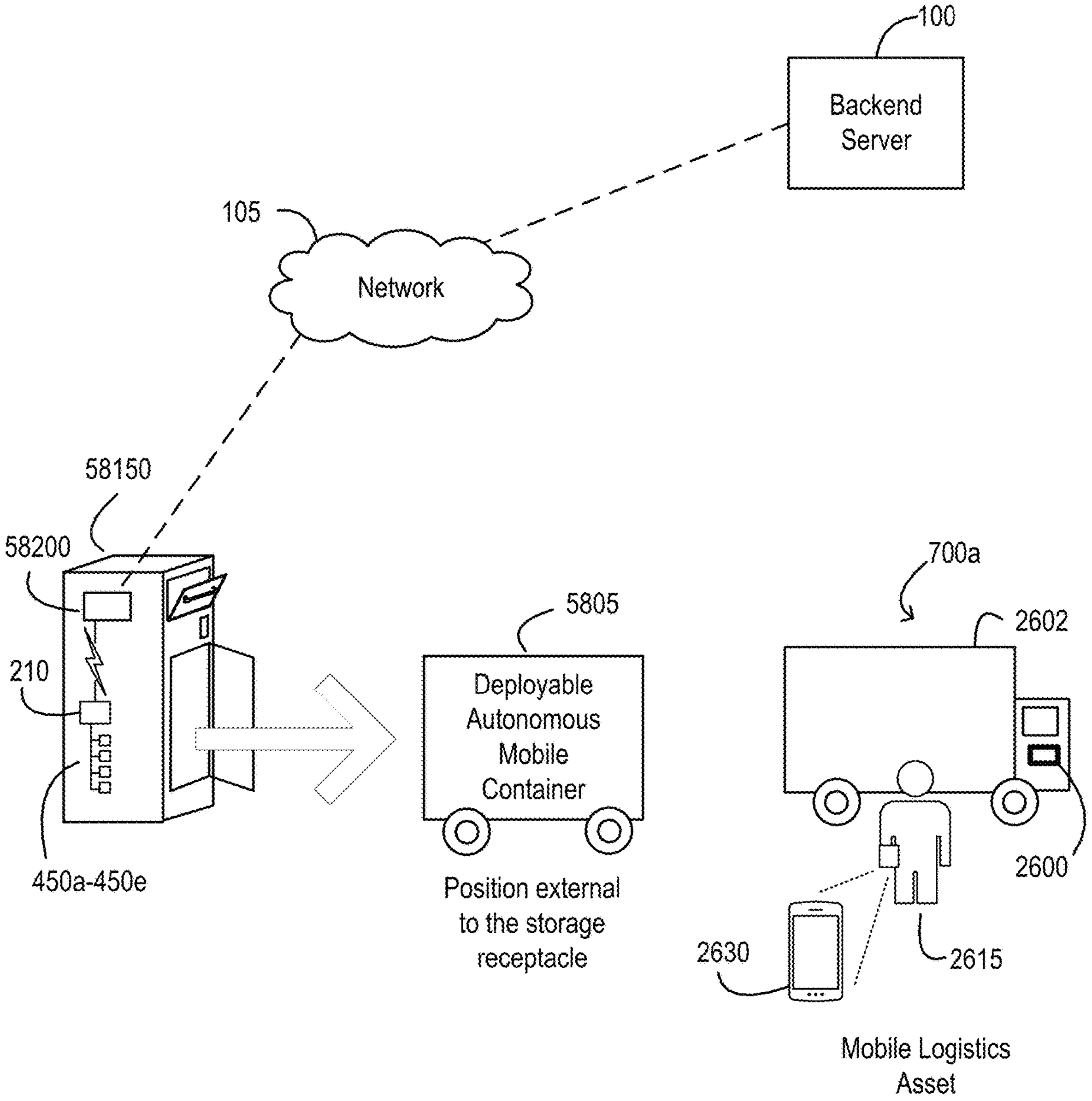
FIG. 59 is a diagram illustrating an exemplary deployable storage element deployed to a position external to the node-based logistics receptacle and near an exemplary mobile logistics asset in accordance with an embodiment of the invention.

FIG. 59 is a diagram illustrating an exemplary deployable storage element deployed to a position external to the node-based logistics receptacle 58150 and near an exemplary mobile logistics asset 700*a* in accordance with an embodiment of the invention. Referring now to FIG. 59, exemplary deployable autonomous mobile container 5805 has been deployed and is shown at a position external to the storage receptacle 58150. In more detail, an embodiment may have exemplary deployable autonomous mobile container 5805 being operative to move from the host position within receptacle 58150 to a logistics destination as the position external to the storage receptacle according to logistics destination information contained within the deploy activation signal received by the autonomous controller 5810 of container 5805. In such an embodiment, the logistics destination may, for example, be the position of a logistics asset (such as logistics asset 700*a*) capable of accepting or unloading the deployable autonomous mobile container. For example, as shown in FIG. 59, an exemplary mobile logistics asset 700*a* has delivery vehicle 2602, which may be capable of accepting or otherwise receiving exemplary deployable autonomous mobile container 5805.

Rather than being contained within the deploy activation signal, another embodiment may have the logistics destination information used by the autonomous controller 5810 may be contained within a logistics destination message received by the deployable autonomous mobile container 5805. Such a logistics destination message received by the deployable autonomous mobile container 5805 may, for example, be sent by the receptacle's bridge node 58200 (e.g., as a separate communication than the deploy activation signal), sent by backend server 100, sent by a transceiver operated by a mobile logistics asset (e.g., mobile transceiver 2600 disposed on delivery vehicle 2602 associated with mobile logistics asset 700*a* or mobile handheld communication device 2630 carried by courier personnel 2615 and operates as a type of mobile wireless transceiver associated with the mobile logistics asset 700*a*). Additionally, an exemplary logistics destination message received by the deployable autonomous mobile container 5805 may be sent by a transceiver operated by an autonomous mobile logistics asset (e.g., exemplary autonomous mobile logistics asset 6000 illustrated in and described below relative to FIG. 60).

In some embodiments, exemplary deployable autonomous mobile container 5805 may move from the host position within exemplary node-based logistics receptacle 58150 to more than one position as it navigates and moves outside of receptacle 58150. For example, an embodiment may have exemplary deployable autonomous mobile container 5805 being operative to move from the host position to one or more positions external to the storage receptacle 58150, and then subsequently move to a logistics destination (e.g., a position at or near mobile logistics asset 700*a*) according to logistics destination information contained within a logistics destination message received by the deployable autonomous mobile container. In such an example, a further embodiment may have the logistics destination message received by the deployable autonomous mobile container 5805 having been sent by a transceiver operated by a mobile logistics asset (e.g., mobile transceiver 2600 disposed on delivery vehicle 2602 or mobile handheld communication device 2630—both of which being associated with mobile logistics asset 700*a* as shown in FIG. 59). Likewise, yet another embodiment may have the logistics destination message received by the deployable autonomous mobile container 5805 having been sent by a transceiver operated by an autonomous mobile logistics asset (e.g., exemplary autonomous mobile logistics asset 6000 illustrated in and described below relative to FIG. 60).

Figure 60:
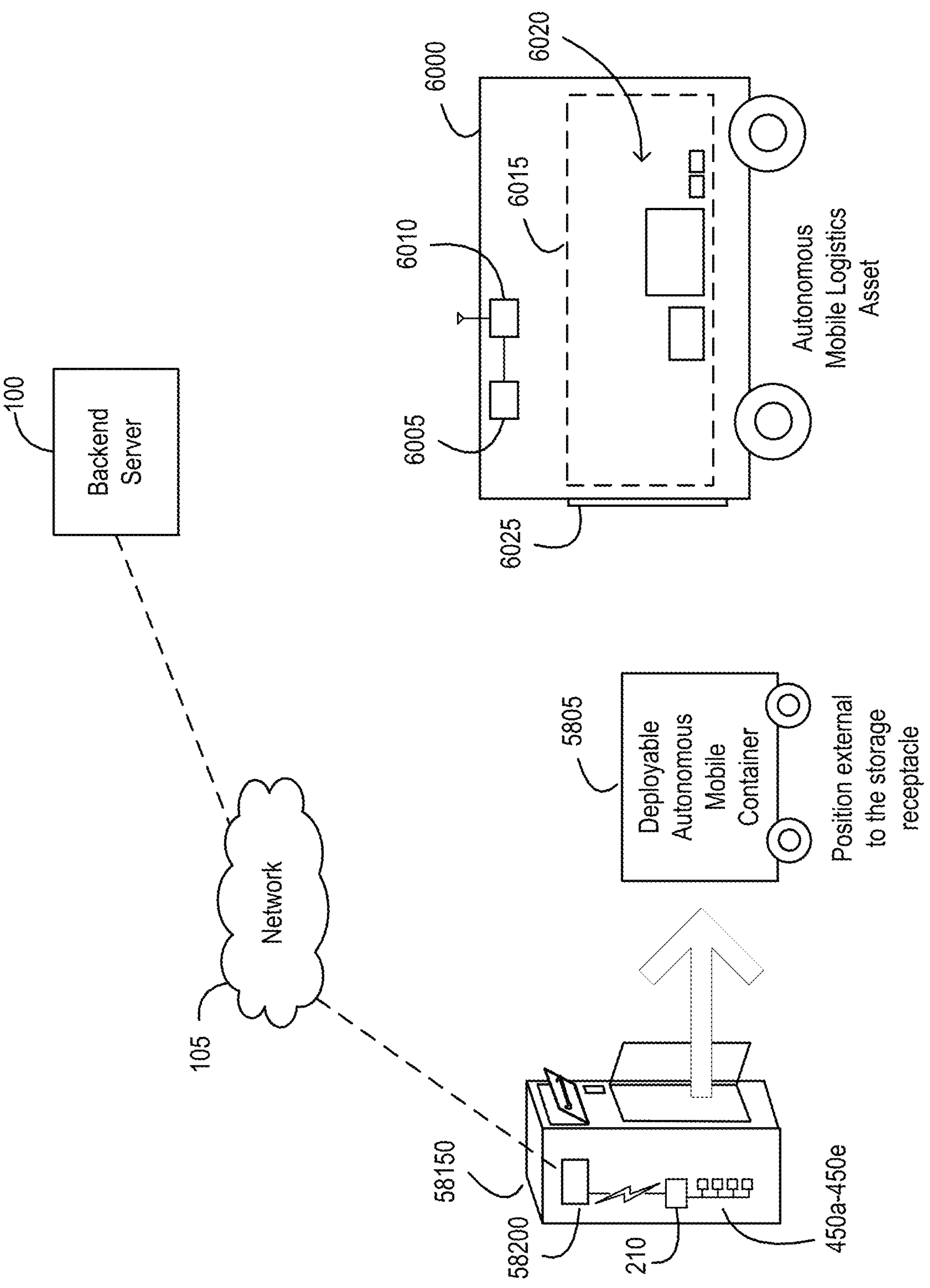
FIG. 60 is a diagram illustrating an exemplary deployable storage element deployed to a position external to the node-based logistics receptacle and near an exemplary autonomous mobile logistics asset in accordance with an embodiment of the invention.

FIG. 60 is a diagram illustrating an exemplary deployable storage element (e.g., exemplary deployable autonomous mobile container 5805) deployed to a position external to the node-based logistics receptacle 58150 and near an exemplary autonomous mobile logistics asset 6000 in accordance with an embodiment of the invention. Referring now to FIG. 60, exemplary autonomous mobile logistics asset 6000 is shown as a type of mobile logistics asset that may receive, accept or unload exemplary deployable autonomous mobile container 5805 at a logistics destination for container 5805. Those skilled in the art will appreciate that exemplary autonomous mobile logistics asset 6000 is generally a type of self-propelled autonomous delivery vehicle capable of being dispatched to a particular location so that delivery items (or mobile containers that maintain delivery items) may be loaded inside for further logistics movement to another location (such as a logistics facility for sorting and/or delivery at a destination). As shown in FIG. 60, exemplary autonomous mobile logistics asset 6000 has an autonomous controller 6005, wireless transceiver, storage area 6015 for items/containers being transported, and a securable port 6025 providing selective access to within exemplary autonomous mobile logistics asset 6000. The autonomous controller 6005 is coupled to a wireless transceiver 6010 so that controller 6005 may communicate with devices (such as exemplary deployable autonomous mobile container 5805, backend server 100, node-based logistics receptacle 58150, and other wireless devices). Storage area 6015 within the autonomous mobile logistics asset 6000 is used for temporarily maintaining delivery items (e.g., items 6020) that may be loaded into or unloaded from within autonomous mobile logistics asset 6000. Storage area 6015 may be accessed through securable port 6025 (which may be implemented as a retractable and securable ramp, door, hatch, and the like) so that deployable autonomous mobile container 5805 may move within storage area 6015 when autonomous mobile logistics asset 6000 operates to accept container 5805 and the delivery items it may contain.

Figure 61:
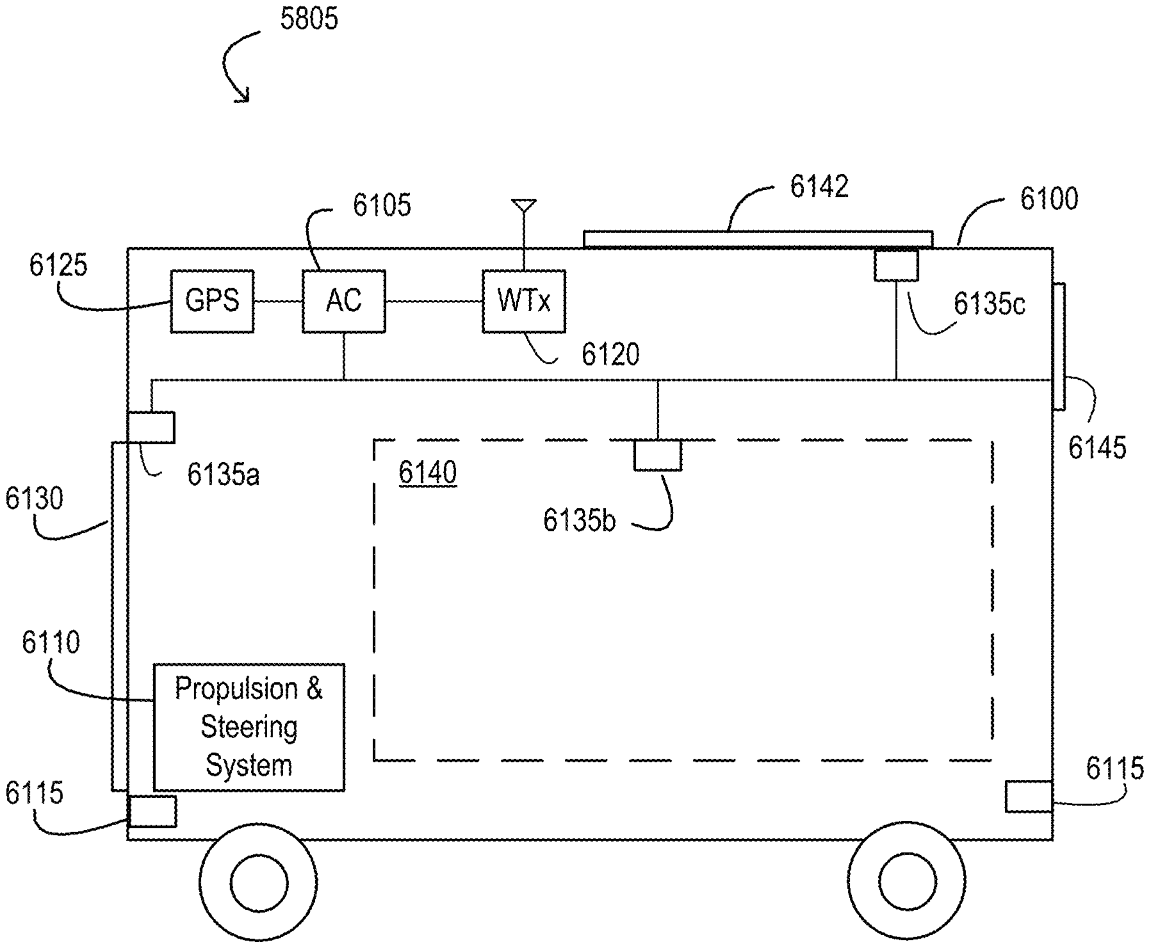
FIG. 61 is a detailed diagram illustrating an exemplary deployable autonomous mobile container as a type of deployable storage element in accordance with an embodiment of the invention.

FIG. 61 is a more detailed diagram illustrating an exemplary deployable autonomous mobile container 5805 as a type of deployable storage element in accordance with an embodiment of the invention. Referring now to FIG. 61, exemplary deployable autonomous mobile container 5805 is shown having a container housing 6100, autonomous controller 6105 (referred to as controller 5810 in FIG. 58A), propulsion and steering system 6110 (also referred to as system 5830 in FIG. 58A), internal storage area 6140 (also referred to as storage area 58205 in FIG. 58A), mobile container navigation sensors 6115, wireless radio transceiver 6120, an access port 6130, s, location circuitry 6125, an actuated top access panel 6142, and exemplary human engagement interface 6145. Exemplary container housing 6100 is a mobile housing structure that can temporarily maintain the delivery item once the delivery item has been deposited within the node-based logistics receptacle 58150 (while container 5805 is in the host position) through the receptacle's entrance opening. Those skilled in the art will appreciate that the exemplary autonomous controller 6105 is disposed on the container housing 6100 and may be maintained within its own module or environmental housing along with interfacing that facilitates coupling to onboard sensors (e.g., sensors 6115, 6135*a*-6135*c*) as well as location circuitry 6125, and transceiver 6120.

Exemplary propulsion and steering system 6110 is generally disposed on the container housing to allow for controlled movement of container 5805. Propulsion and steering system 6110 is responsive to propulsion and steering control signals from the autonomous controller 6105 that cause changes to directional movement of the deployable autonomous mobile container 5805. Embodiments may have exemplary propulsion and steering system 6110 including wheels, steering linkages, and one or more propulsion engine (e.g., electric motor(s)) that implement speed and direction control actuation, while other embodiments may use tracks or alternative propulsion implementations that may be speed and directionally controlled.

Exemplary mobile container navigation sensors 6115 are coupled to the autonomous controller 6105 and disposed relative to the exterior of housing 6100 so as to have sensory ranges proximate different parts of container 5805 (e.g., in front of container 5805, behind container 5805, on each side of container 5805, and in some implementations above container 5805). In some embodiments, the mobile container navigation sensors 6115 are operative to autonomously detect an object in the path of the deployable autonomous mobile container 5805 and provide navigation feedback sensor data to the autonomous controller 6105 on the detected object. In other embodiments, the mobile container navigation sensors 6115 are operative to generate sensor data and provide such sensor data to the autonomous controller 6105, which uses its logic to process the sensor data to autonomously detect an object in the path of the deployable autonomous mobile container 5805.

Exemplary wireless radio transceiver 6120, which includes an antenna, is disposed on the container housing 6100 and operatively coupled to the autonomous controller 6105. As deployed on the container housing 6100, the wireless radio transceiver 6120 is operative to communicate with communication devices disposed external to the deployable autonomous mobile container, such as backend server 100, bridge node 58200, as well as other vehicle-based and mobile handheld transceivers (e.g., transceivers 2600, 2630) used by customers as well as logistics assets.

Exemplary location circuitry 6125 is also disposed on the container housing 6100 and operatively coupled to the autonomous controller 6105. Onboard container 5805, exemplary location circuitry 6125 generates location data (e.g., GPS coordinates) on a location of the deployable autonomous mobile container 5805 and provide the location data to the autonomous controller 6105 for use in navigating activity by autonomous controller 6105.

Exemplary access port 6130 generally provides unloading access to within the deployable autonomous mobile container 5805. Access port 6130 is a securable door, hatch, or other opening that may, in some embodiments, be actuated by autonomous controller 6105 between a closed/secured position and an open/unsecured position based upon sensed interactions with external devices, verification/authentication of such external devices, and the like.

Exemplary internal sensors 6135*a*-6135*c* provide monitoring of internal temporary storage area 6140 within container housing 6100. For example, internal sensor 6135 is an exemplary internal sensor that monitors access port 6130 (e.g., what goes through the opening covered by port 6130, motion detected relative to port 6130 or through the opening covered by port 6130, status of port 6130, and the like). In more detail, the autonomous controller 6105 is operative to receive internal sensor data generated by the internal sensor, transmit the internal sensor data to the bridge node 58200 (e.g., when container 5805 is in the host position within receptacle 58150), and transmit the internal sensor data to an external node outside of the storage receptacle (such as a mobile user device operated by a logistics asset).

Exemplary human engagement interface 6145 is disposed on an exterior of the container housing 6100 and coupled to autonomous controller 6105. In general, human engagement interface 6145 is operative to provide feedback information—e.g., to container 5805 and by container 5805 to personnel outside of container 5805. In other words, those skilled in the art will appreciate that human engagement interface 6145 may include one or more devices that facilitates communication with personnel outside of container 5805—e.g., providing information to those outside of container 5805 and/or receiving input from those outside of container 5805. An embodiment may implement human engagement interface 6145, for example, with one or more exterior exposed status light, speaker, microphone, switch, button, keypad, display, and interactive touch sensitive screen.

As shown in FIG. 61, exemplary actuated top access panel 6142 is generally a type of actuated port that can cover or provide access to within storage area 6140. As such, exemplary actuated top access panel 6142 provides access to the opening through which delivery items may drop and be deposited into storage area 6140 within exemplary deployable autonomous mobile container 5805. Stated another way, exemplary access panel 6142 secures what is maintained within the deployable autonomous mobile container 5805 once the deployable autonomous mobile container 5805 is moved from the host position. In more detail, autonomous controller 6105 within deployable autonomous mobile container 5805 can actuate the access panel 6142 in response to the deploy activation signal to secure what is maintained within the deployable autonomous mobile container. In particular, the autonomous controller 6105 may actuate the access panel 6142 to a closed position in response to receiving the deploy activation signal from the bridge node 58200 to secure what is maintained within the deployable autonomous mobile container 5805.

In some embodiments, exemplary actuated top access panel 6142 may be used to provide authorized access to within the deployable autonomous mobile container 5805. For example, an embodiment may have autonomous controller 6105 actuate the access panel 6142 to an open position in response to receiving an access signal from an external device to provide access to what is maintained within the deployable autonomous mobile container 5805. In more detail, the autonomous controller 6105 may verify the access signal is from an authorized entity operating the external device prior to actuating the access panel 6142 to the open position.

Figure 62A:
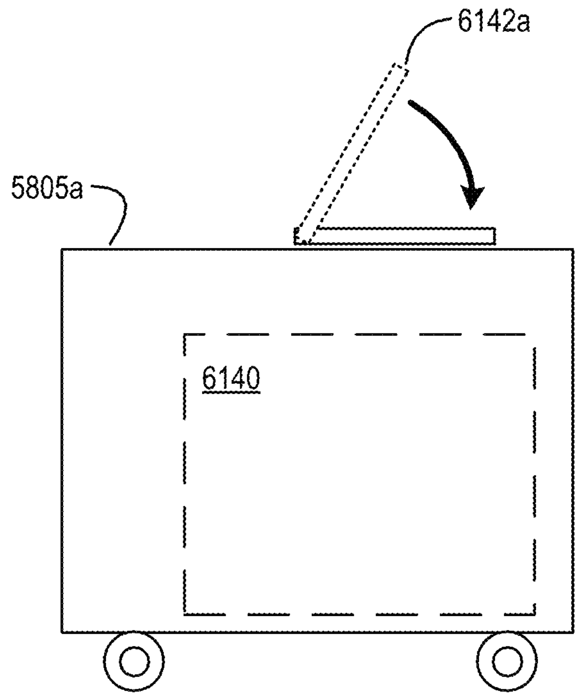
FIGS. 62A-62C are diagrams illustrating various examples of closable access panels that provide access within an exemplary deployable autonomous mobile container and may secure what has been deposited within the exemplary deployable autonomous mobile container in accordance with an embodiment of the invention.
Figure 62B:
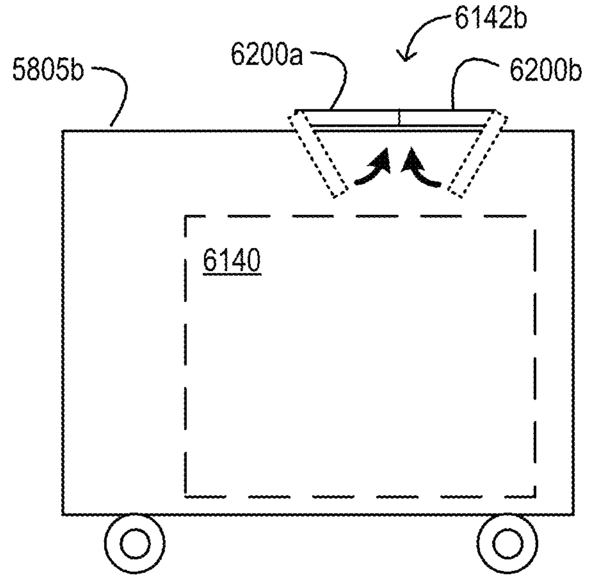
Figure 62C:
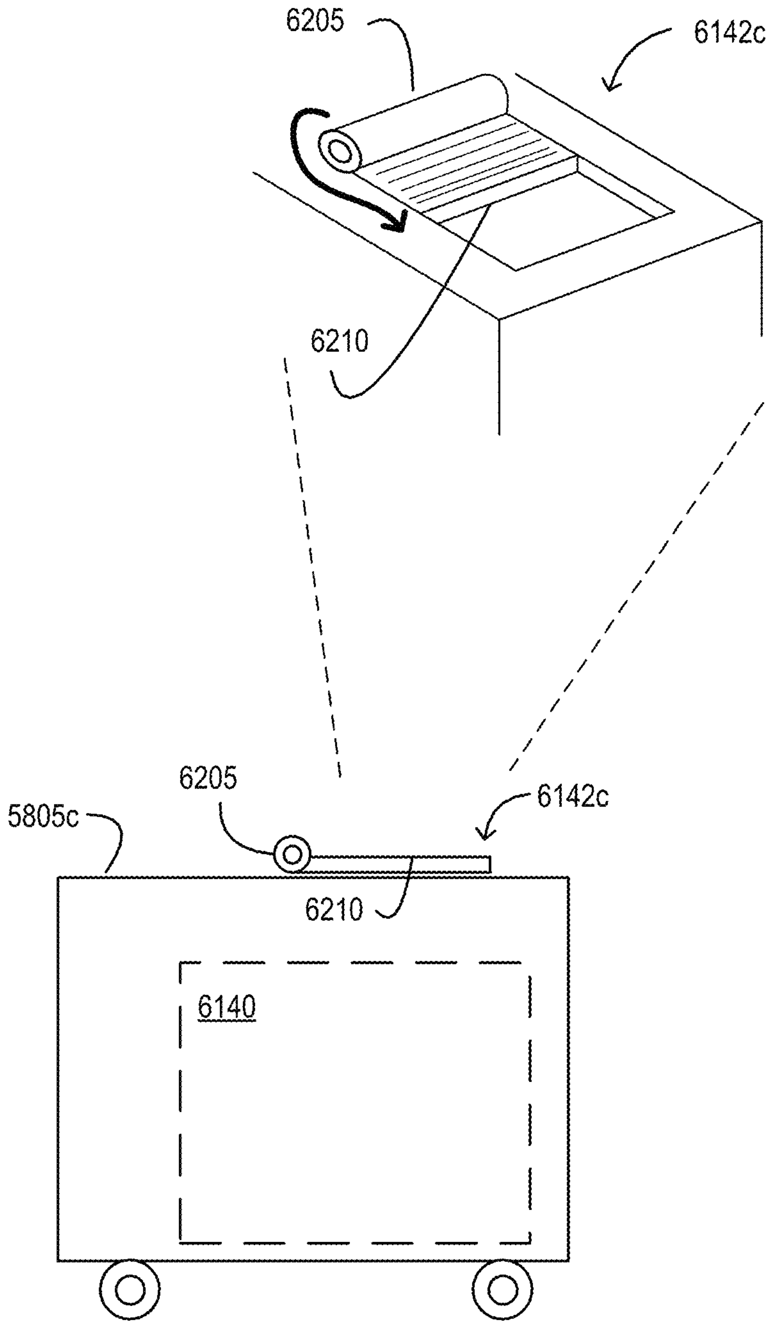

FIGS. 62A-62C are diagrams illustrating more details on various examples of closable or actuated access panels used as actuated top access panel 6142 that provide access within an exemplary deployable autonomous mobile container and may secure what has been deposited within the exemplary deployable autonomous mobile container 5805 in accordance with an embodiment of the invention. Those skilled in the art will appreciate that exemplary actuated access panel 6142 may, for example, be implemented with an actuated cover, an actuated door, an actuated lid, or an actuated roll top for the deployable autonomous mobile container. Referring now to FIG. 62A, exemplary deployable autonomous mobile container 5805*a* is shown in a configuration where a lifting actuated access panel 6142*a* is shown in the form of an actuated lifting door or lid that may extend above container 5805*a*. Here, exemplary autonomous controller 6105 may initiate actuation of access panel 6142*a* to cause movement of access panel 6142*a* between a lifted position (open) to a retracted position (closed) as shown in FIG. 62A. Those skilled in the art will appreciate that access panel 6142*a* may be an actuated securable cover or lid for the container housing 6100 of the deployable autonomous mobile container 5805*a*.

In FIG. 62B, exemplary deployable autonomous mobile container 5805*b* is shown in a configuration where a dropping actuated access panel 6142*b* is shown in the form of a set of actuated dropping doors 6200*a*, 6200*b* that may drop into container 5805*a*. Here, exemplary autonomous controller 6105 may initiate actuation of access panel 6142*b* to cause movement of access panel 6142*b* between a dropped position (open) to a pulled up or lifted position (closed) as shown in FIG. 62B. Those skilled in the art will appreciated that access panel 6142*b* may be an actuated securable door for the container housing 6100 of the deployable autonomous mobile container 5805*b*.

In FIG. 62C, exemplary deployable autonomous mobile container 5805*c* is shown in a configuration where roll-top type of actuated access panel 6142*c* is shown in the form of a flexible panel 6210 that may be actuated to extend from and roll up into a roll-retention cylinder 6205. Here, exemplary autonomous controller 6105 may initiate actuation of access panel 6142*c* to cause movement of access panel 6142*c* between an open position where flexible panel 6210 is withdrawn and wound into roll-retention cylinder 6205 to a closed position where flexible panel 6210 extends from roll-retention cylinder 6205 and secures in place over the opening covered by panel 6142*c* as shown in FIG. 62B. Those skilled in the art will appreciate that access panel

6142*c* may be an actuated securable roll top for the container housing 6100 of the deployable autonomous mobile container 5805*c*.

Figure 63A:
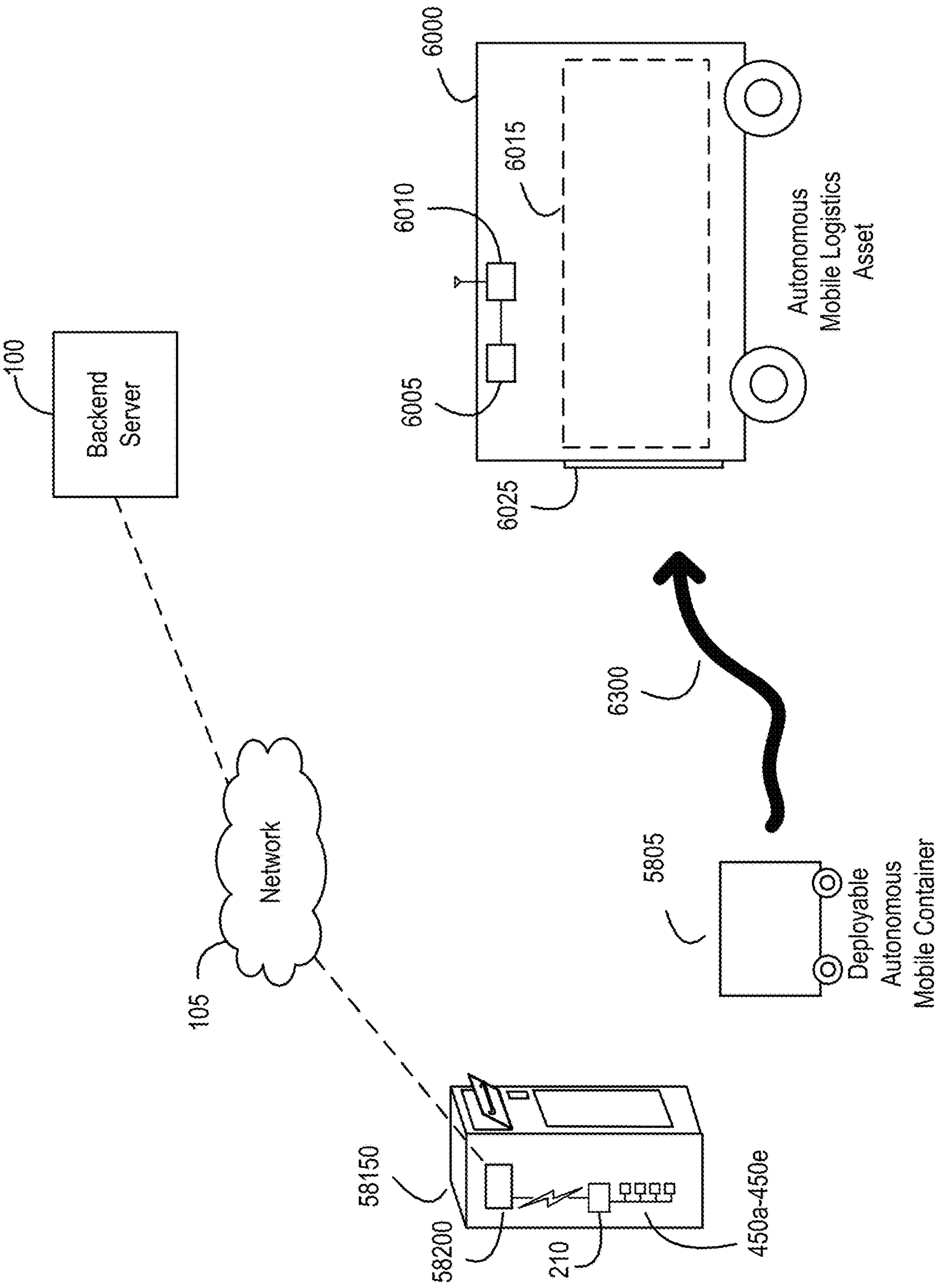
FIG. 63A is a diagram illustrating an exemplary deployable autonomous mobile container navigating towards an exemplary mobile logistics asset in accordance with an embodiment of the invention.

FIGS. 63A-63E illustrate examples of how an exemplary deployable autonomous mobile container 5805 launched from exemplary node-based logistics receptacle 58150 interacts with various mobile logistics assets in different ways. For example, FIG. 63A is a diagram illustrating an exemplary deployable autonomous mobile container 5805 navigating towards an exemplary mobile logistics asset (e.g., exemplary autonomous mobile logistics asset 6000) in accordance with an embodiment of the invention. Referring now to FIG. 63A, exemplary deployable autonomous mobile container 5805 is shown having been deployed, no longer in its host position within node-based logistics receptacle 58150, and navigating on path 6300 towards a mobile logistics asset (e.g., exemplary autonomous mobile logistics asset 6000). In doing so, those skilled in the art will appreciate that an embodiment of autonomous controller 6105 within exemplary deployable autonomous mobile container 5805 is operative to navigate towards the autonomous mobile logistics asset 6000 using the mobile container navigation sensors 6115, which may include motion sensors, image/video sensors, machine vision type of sensors, proximity sensors, and the like. Exemplary autonomous controller 6105 within exemplary deployable autonomous mobile container 5805, in a further embodiment, is operative to detect, using the wireless radio transceiver 6120 coupled to autonomous controller 6105, a signal from the autonomous mobile logistics asset 6000 and navigate, using the mobile container navigation sensors 6115, to the autonomous mobile logistics asset 6000 based upon at least the detected signal from the autonomous mobile logistics asset 6000. Such a detected signal may provide guidance information, such as location information on a logistics destination, on where the deployable autonomous mobile container 5805 can meet the mobile logistics asset.

In a more detailed embodiment, the autonomous controller 6105 is further operative to cause the deployable autonomous mobile container 5805 to move from the host position to a logistics destination as the position external to the node-based logistics receptacle 58150 according to logistics destination information received by the autonomous controller 6105. The logistics destination may, in an example, correspond to the position of a logistics asset (e.g., mobile logistics asset 700*a*, autonomous mobile logistics asset 6000) operative to accept the deployable autonomous mobile container 5805. Such a logistics destination may, in another example, correspond to the position of a logistics asset (e.g., mobile logistics asset 700*a*, autonomous mobile logistics asset 6000) operative to unload the deployable autonomous mobile container 5805. Such logistics destination information received by autonomous controller 6105 may, for example, have been sent by bridge node 58200, backend server 100, a transceiver operated by a mobile logistics asset, or a transceiver operated by an autonomous mobile logistics asset (such as a mobile user device operated by the mobile logistics asset or personnel associated with the mobile logistics asset).

Figure 63B:
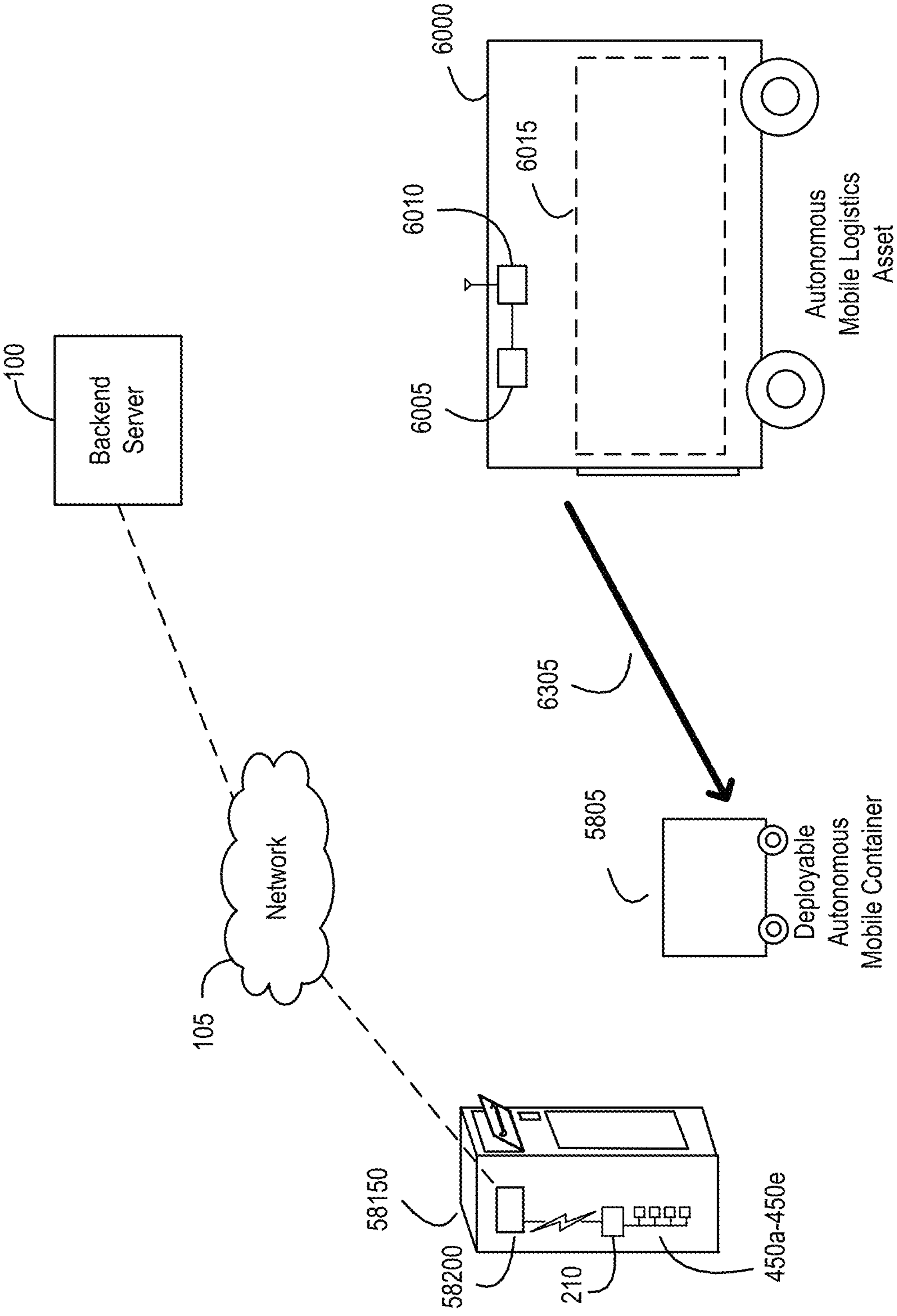
FIG. 63B is a diagram illustrating an exemplary deployable autonomous mobile container interacting with an exemplary mobile logistics asset as part of authenticating the exemplary mobile logistics asset in accordance with an embodiment of the invention.

When the deployable autonomous mobile container 5805 approaches a mobile logistics asset, the autonomous controller 6105 in some embodiments is programmatically operative to authenticate that the approached mobile logistics asset is an authorized entity with which the deployable autonomous mobile container 5805 can use relative to its cargo of delivery items. FIG. 63B is a diagram illustrating exemplary deployable autonomous mobile container 5805 interacting with an exemplary mobile logistics asset (e.g., autonomous mobile logistics asset 6000) as part of authenticating the exemplary mobile logistics asset in accordance with an embodiment of the invention. Referring now to the embodiment shown in FIG. 63B, those skilled in the art will appreciate that the autonomous controller 6105 within deployable autonomous mobile container 5805 is operative to use its wireless radio transceiver 6120 to detect a signal from a mobile logistics asset as container 5805 approaches the mobile logistics asset. Here, for example, autonomous controller 6105 detects a wireless signal 6305 emanating from exemplary autonomous mobile logistics asset 6000 as container 5805 approaches the mobile logistics asset 6000. Once signal 6305 is detected, autonomous controller 6105 is further programmatically operative in this embodiment to authenticate that the mobile logistics asset 6000 is an authorized logistics asset to receive what is temporarily maintained within the container housing. In more detail, exemplary autonomous controller 6105 may be operative to authenticate that the mobile logistics asset 6000 is an authorized logistics asset based upon authentication information received from the mobile logistics asset 6000 over the wireless radio transceiver 6120. Such authentication information may, for example, be part of signal 6305 detected by autonomous controller 6105 upon the approach to mobile logistics asset 6000 without requesting signal 6305 (or the authentication information) to be broadcast. However, in other embodiments, the authentication information may be requested by autonomous controller 6105 in response to receiving the initial signal 6305 from mobile logistics asset 6000. In such an embodiment, the autonomous controller 6005 of exemplary autonomous mobile logistics asset 6000 may respond to such a request by subsequently transmitting a second message that includes the authentication information. This response, for example, may be performed after the autonomous mobile logistics asset 6000 itself has authenticated that exemplary deployable autonomous mobile container 5805 is a deployable storage element that mobile logistics asset 6000 is authorized to assist with its onboard delivery items.

Figure 63C:
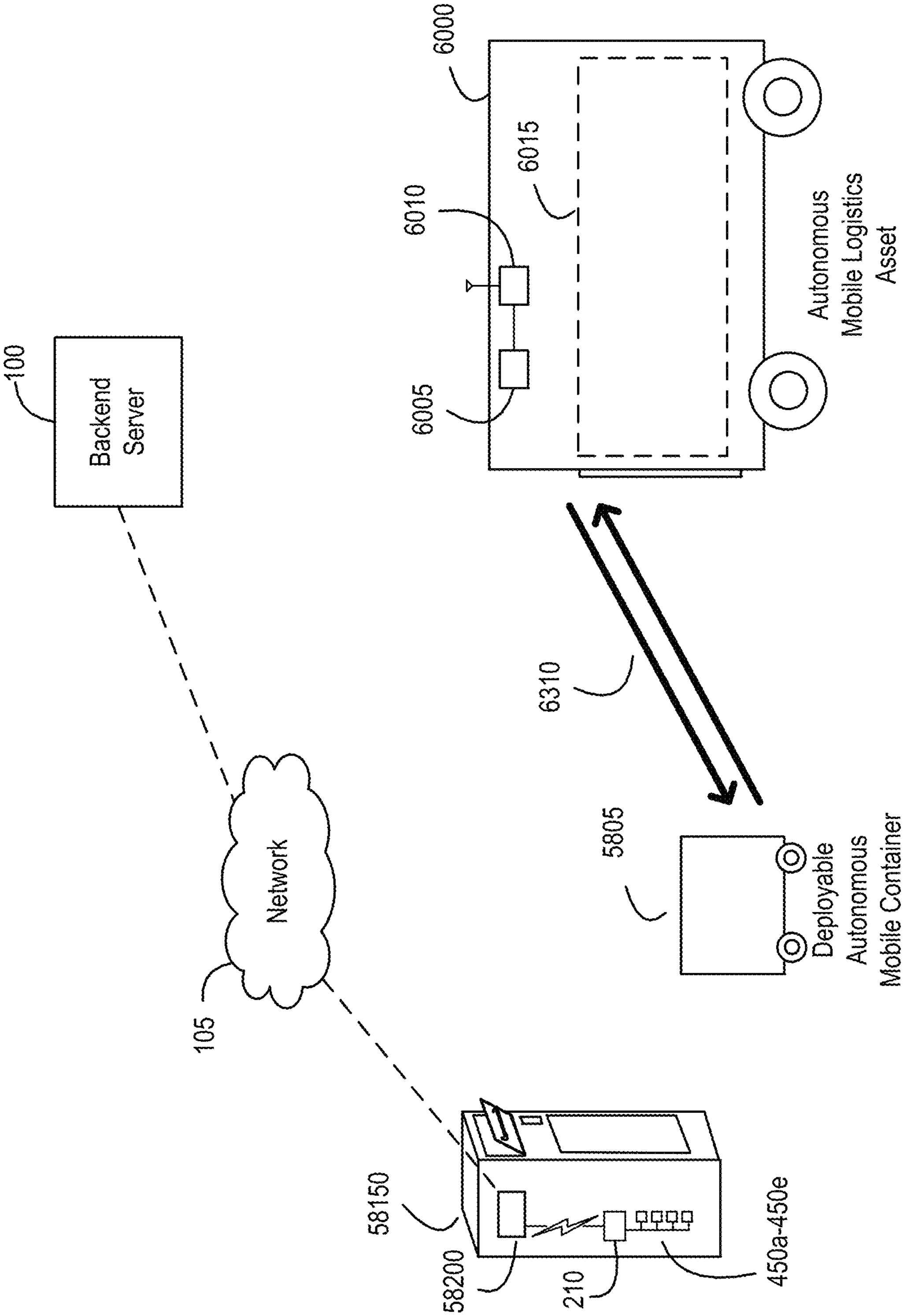
FIG. 63C is a diagram illustrating an exemplary deployable autonomous mobile container interacting with an exemplary mobile logistics asset as part of a security handshake interface operation in accordance with an embodiment of the invention.

FIG. 63C is a diagram illustrating an embodiment where exemplary deployable autonomous mobile container 5805 is interacting with exemplary mobile logistics asset 6000 as part of a security handshake interface operation in accordance with an embodiment of the invention. Referring to FIG. 63C, the autonomous controller 6105 of exemplary deployable autonomous mobile container 5805 is operative to authenticate that the mobile logistics asset 6000 is an authorized logistics asset based upon a security handshake interface operation 6310 conducted with the mobile logistics asset 6000 over the wireless radio transceiver 6120. Those skilled in the art will appreciate that the security handshake interface operation 6310 is a process that establishes a communication link between autonomous controller 6105 of container 5805 and autonomous controller 6005 of mobile logistics asset 6000 and provides authentication information used to authenticate that the mobile logistics asset 6000 is an authorized logistics asset to be used by deployable autonomous mobile container 5805.

In some embodiments where personnel are involved with the mobile logistics asset (e.g., exemplary personnel 2615 associated with mobile logistics asset 700*a* using delivery vehicle 2602), the authentication information may be provided by a mobile handheld communication device 2630 operated by personnel 2615. Those skilled in the art will appreciate that the principles described above regarding detecting signal 6305 may be applicable to a signal being broadcast by mobile handheld communication device 2630 (rather than asset 6000) and handshaking operations 6310 may be performed with mobile handheld communication device 2630 (rather than asset 6000), which in some embodiments may be implemented as an augmented reality headset communication device.

Figure 63D:
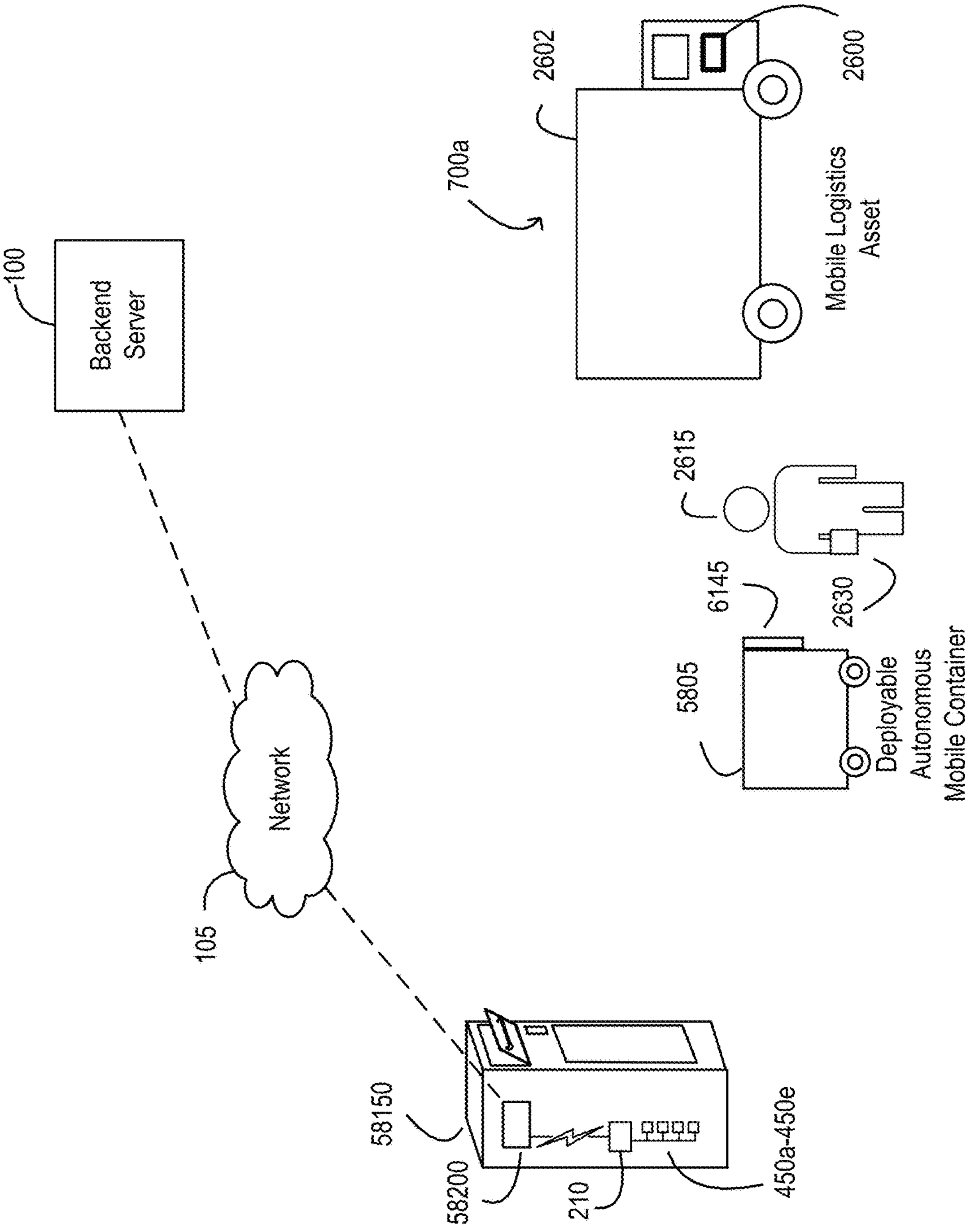
FIG. 63D is a diagram illustrating an exemplary deployable autonomous mobile container interacting with personnel associated with an exemplary mobile logistics asset using a human engagement interface on the deployable autonomous mobile container in accordance with an embodiment of the invention.

In still other embodiments where personnel are involved with the mobile logistics asset (e.g., exemplary personnel 2615 associated with mobile logistics asset 700*a* using delivery vehicle 2602), the authentication information may be provided by such personnel via human input to exemplary container 5805. FIG. 63D is a diagram illustrating an embodiment where exemplary deployable autonomous mobile container 5805 is interacting with personnel 2615 associated with an exemplary mobile logistics asset 700*a* using a human engagement interface 6145 on the deployable autonomous mobile container 5805 in accordance with an embodiment of the invention. Referring to the embodiment illustrated in FIG. 63D, exemplary deployable autonomous mobile container 5805 is shown having at least one human engagement interface 6145 (e.g., a keypad and display, an interactive touchscreen, and the like) disposed on an exterior of the container housing 6100 of exemplary container 5805. The human engagement interface 6145, in this embodiment, is operative to at least receive authentication information from personnel 2615 associated with the mobile logistics asset 700*a*. Once personnel 2615 inputs information on human engagement interface 6145, autonomous controller 6105 of container 5805 is operative to authenticate that the mobile logistics asset 700*a* is the authorized logistics asset based upon the authentication information received using the at least one human engagement interface.

In some embodiments, exemplary deployable autonomous mobile container 5805 may be unloaded by the authenticated mobile logistics asset. Such unloading may, for example, be performed by personnel 2615 associated with mobile logistics asset 700*a*. In other instances, such unloading may be performed in a machine-to-machine manner an object manipulation system (e.g., robotic arms, and the like) used on deployable autonomous mobile logistics asset 6000 under control of autonomous controller 6005 to move items from container 5805 to within storage area 6015. Such unloading operations may be monitored by sensors onboard exemplary deployable autonomous mobile container 5805 (e.g., using internal sensor 6135*b*).

Once unloaded, exemplary deployable autonomous mobile container 5805 may move to a secondary location. In one example, such as a storage location or hub location remote from node-based logistics receptacle 58150 and used to temporarily store the deployable autonomous mobile container 5805. In another example, the secondary location is simply back to the location of node-based logistics receptacle 58150.

In more detail, an embodiment may have the autonomous controller 6105 of container 5805 being further operative to cause the deployable autonomous mobile container 5805 to move from the logistics destination to the secondary location. Such movement to the secondary location may, for example, be in response to monitoring the internal temporary storage area 6140 within the container housing 6100 of deployable autonomous mobile container 5805 using the at least one internal sensor (such as internal storage area sensor 6135*b*). More specifically, an embodiment may have the autonomous controller 6105 of container 5805 being further operative to cause the deployable autonomous mobile container 5805 to detect, using the at least internal sensor 6135*b*, the internal temporary storage 6140 has been unloaded at the logistics destination; and move from the logistics destination to a secondary location when the internal temporary storage 6140 is detected to have been unloaded at the logistics destination using internal sensor 6135*b*.

Figure 63E:
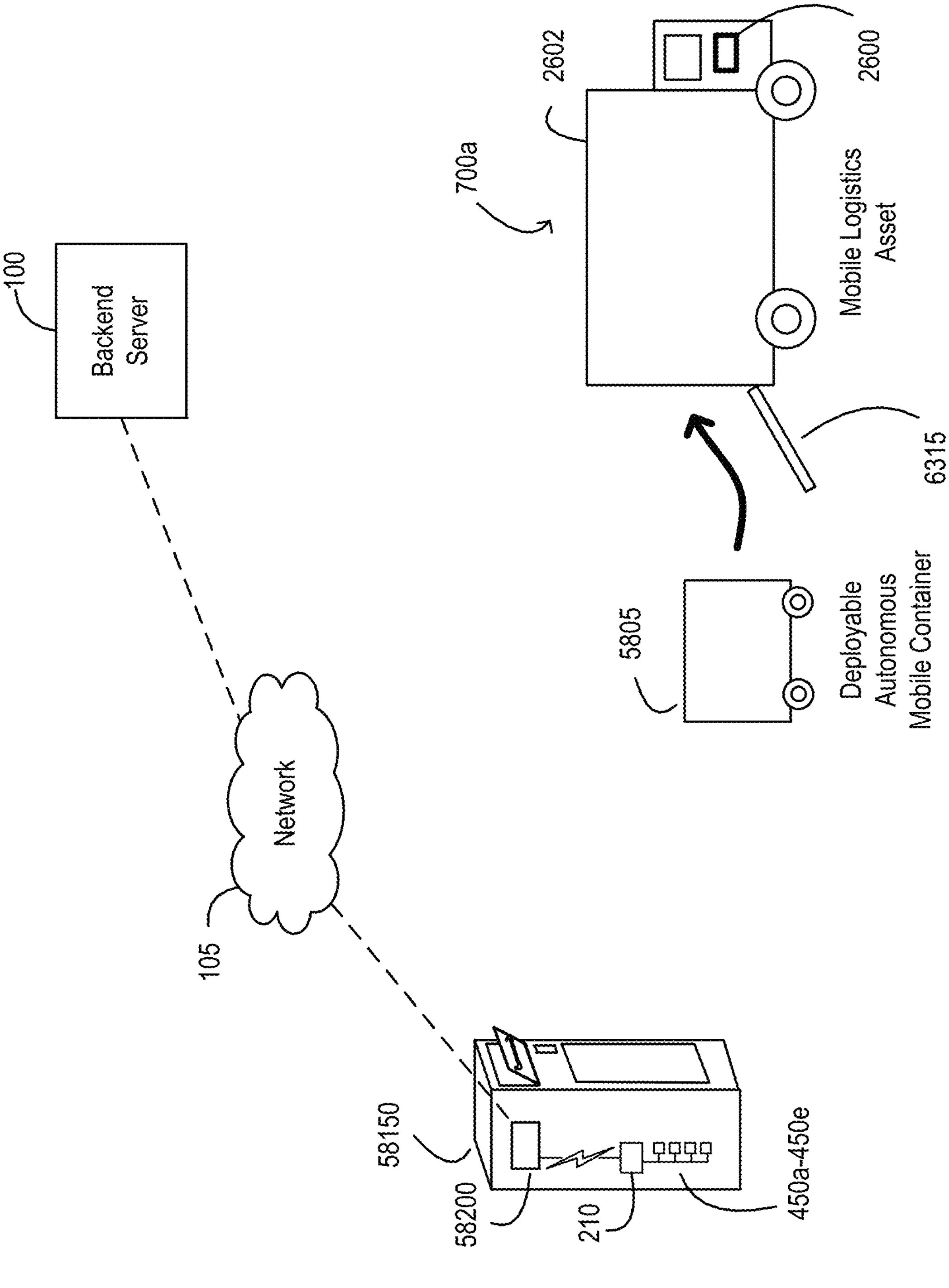
FIG. 63E is a diagram illustrating an exemplary deployable autonomous mobile container autonomously loading into an exemplary mobile logistics asset in accordance with an embodiment of the invention.

While some embodiments may have exemplary deployable autonomous mobile container 5805 unloaded at the logistics destination, other embodiments may have exemplary deployable autonomous mobile container 5805 loading into the mobile logistics asset at the logistics destination and then transported elsewhere as part of shipping the delivery items in container 5805. FIG. 63E is a diagram illustrating an embodiment where exemplary deployable autonomous mobile container 5805 is autonomously loading into exemplary mobile logistics asset 700*a* in accordance with an embodiment of the invention. Referring now to the embodiment illustrated in FIG. 63E, exemplary delivery vehicle 2602 associated with mobile logistics asset 700*a* has a delivery vehicle door 6315 that may be lowered or otherwise opened to make ready for autonomous loading of container 5805. For example, in response to a loading request signal from autonomous controller 6105 of container 5805 to transceiver 2600 or handheld 2630, transceiver 2600/handheld 2630 (which may be implemented as AR headset communication devices) may responsively cause actuation of door 6315. In another example, the loading request signal may be sent to handheld 2630 used by personnel 2615 associated with mobile logistics asset 700*a* to request personnel 2615 to manually ready delivery vehicle 2602 for autonomous loading of container 5805 by container 5805. Thereafter, the autonomous controller 6105 of exemplary deployable autonomous mobile container 5805 is operative to cause autonomous loading of the deployable autonomous mobile container 5805 into mobile logistics asset. For example and in more detail, the autonomous controller 6105 may be further operative to cause autonomous loading of the deployable autonomous mobile container 5805 into a storage area of the mobile logistics asset's delivery vehicle 2602 based at least upon the navigation feedback sensor data from the mobile container navigation sensors 6115, location data generated by location circuitry 6125, and/or one or more signals received from the mobile logistics asset (e.g., signals from transceiver 2600, which may provide such signals in response to input from onboard vehicle sensor, and the like).

Figure 64:
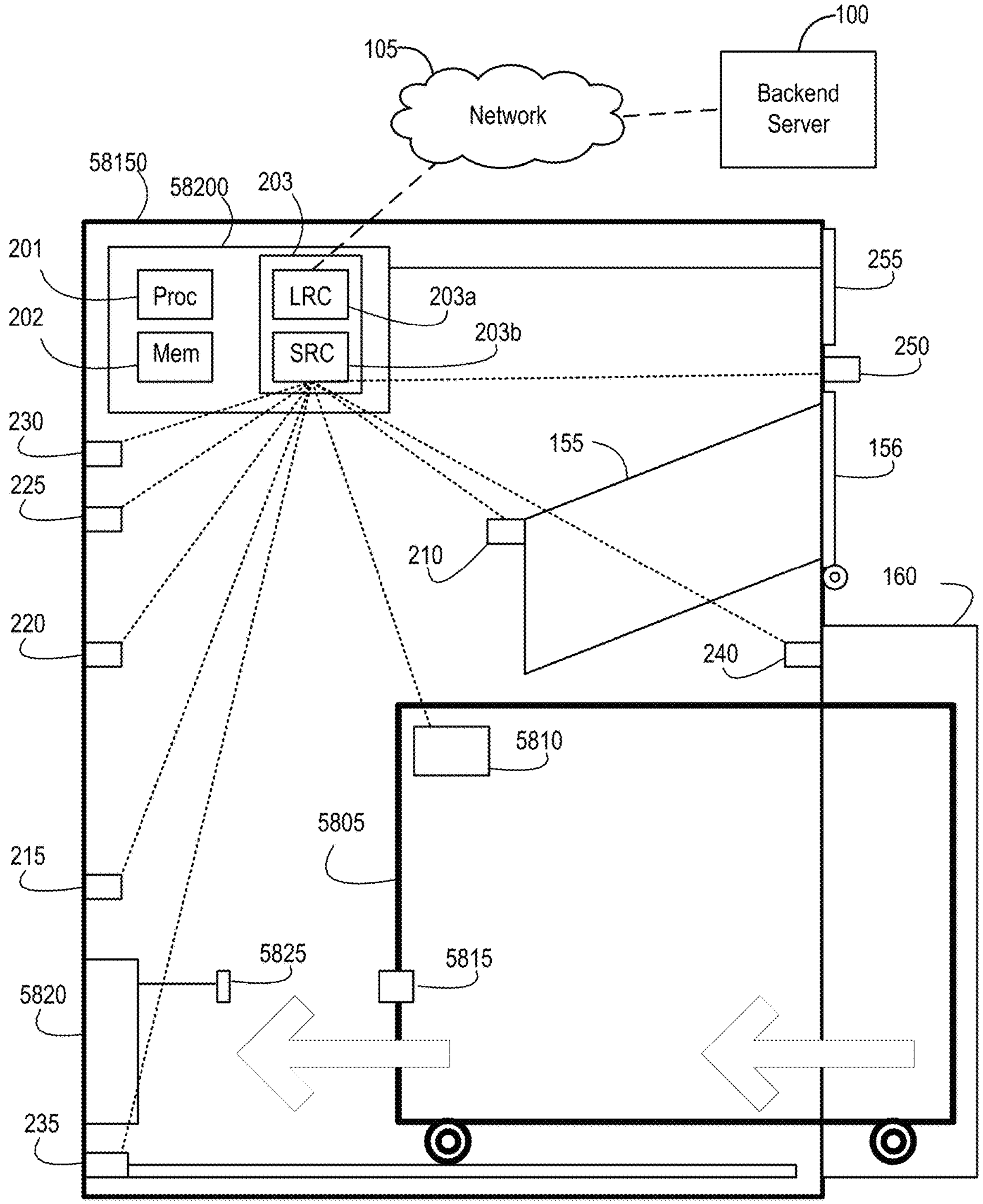
FIG. 64 is a diagram illustrating an exemplary node-based logistics receptacle receiving an exemplary deployable autonomous mobile container and verifying the compatibility of the deployable autonomous mobile container with that node-based logistics receptacle in accordance with an embodiment of the invention.

FIG. 64 is a diagram illustrating an embodiment of exemplary node-based logistics receptacle 58150 receiving an exemplary deployable autonomous mobile container (such as exemplary container 5805) back into its host position and verifying the compatibility of the deployable autonomous mobile container 5805 being received with that node-based logistics receptacle 58150 in accordance with an embodiment of the invention. As an exemplary deployable autonomous mobile container is activated and launched from exemplary node-based logistics receptacle 58150, that exemplary deployable autonomous mobile container may return to the node-based logistics receptacle 58150 or be replaced with another similar deployable autonomous mobile container. Referring now to FIG. 64, an embodiment may have the receptacle verify that the returning or replacement deployable autonomous mobile container is a compatible container for that receptacle. For example, the bridge node 58200 in exemplary node-based logistics receptacle 58150, when executing the monitoring and deployment code, may be further programmatically operative to verify that the deployable autonomous mobile container 5805 is a compatible container for the storage receptacle. More particularly, the bridge node 58200 in exemplary node-based logistics receptacle 58150, when executing the monitoring and deployment code, may be further programmatically operative to confirm receipt of the deployable autonomous mobile container 5805 into the host position within receptacle 58150 (e.g., receive container 5805 via confirmation of the container's location using internal monitoring sensors within receptacle 58150 and/or confirming the container is mated to power source 5820 via a confirmation detection message or signal); and verify that the deployable autonomous mobile container 5805, once received in the host position, is a compatible container for the storage receptacle 58150.

In some embodiments, this type of verification of compatibility may be proactively accomplished prior to when the container 5805 is fully seated in the host position within node-based logistics receptacle 58150. For example, an embodiment may have bridge node 58200 being programmatically operative to detect the deployable autonomous mobile container 5805 approaching the storage receptacle 58150 (e.g., via detection of signals broadcast from container 5805); receive container identification information from the deployable autonomous mobile container 5805 while the deployable autonomous container is approaching the storage receptacle (e.g., such container identification information being part of what is broadcast and detected or, alternatively, provided by container 5805 upon a separate request from bridge node 58200); and verify that the deployable autonomous mobile container 5805 approaching is a compatible container for the storage receptacle based upon the container identification information received from the deployable autonomous mobile container 5805. Those skilled in the art will appreciate that the approaching container 5805 in such an embodiment may be a replacement deployable autonomous mobile container to take the place of a previously deployed second deployable autonomous mobile container.

Furthermore, an additional embodiment may have bridge node 58200 being programmatically operative to transmit a substitution request to the backend server 100 for a substitute deployable autonomous mobile container when the bridge node 5820 is unable to verify that the deployable autonomous mobile container (e.g., one that has been received into the host position within receptacle 58150 or one that is merely approaching receptacle 58150) is compatible for the node-based logistics receptacle 58150.

Figure 65:
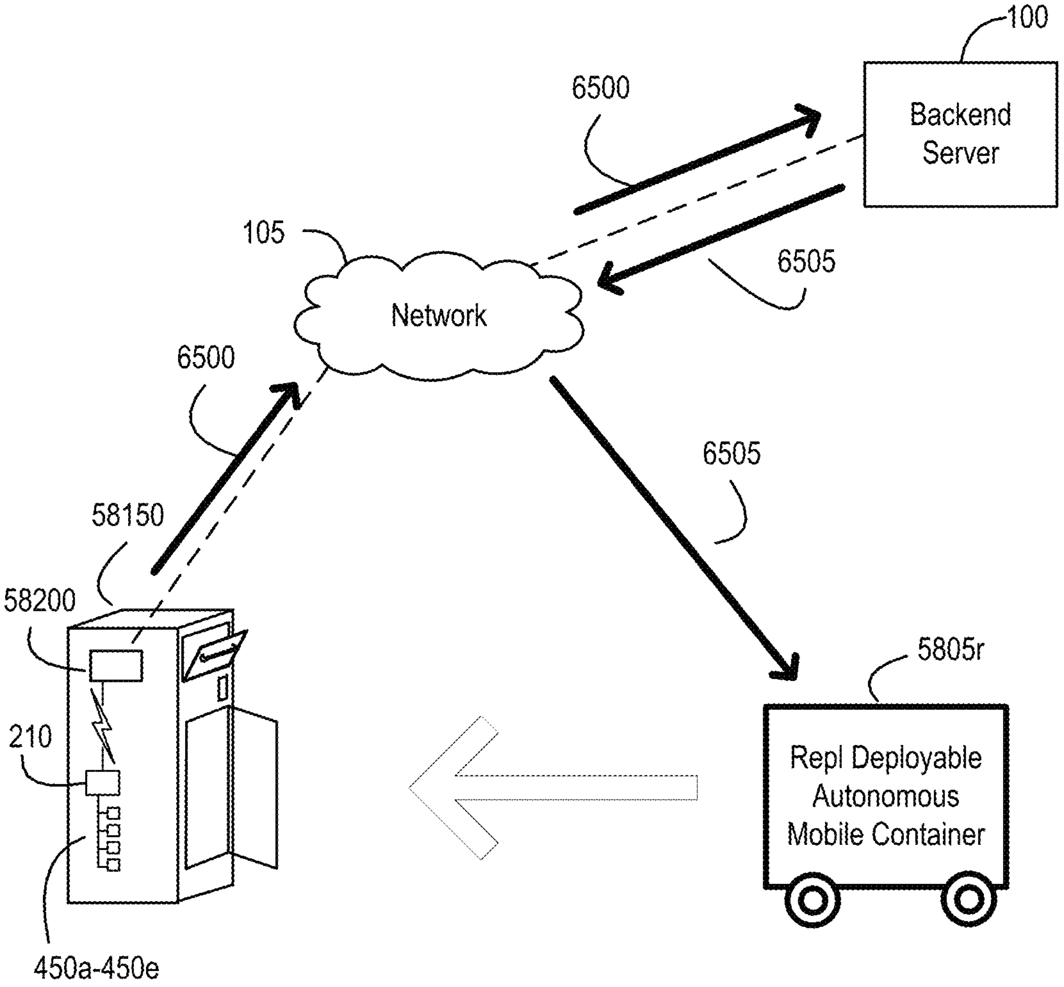
FIG. 65 is a diagram illustrating an exemplary node-based logistics receptacle requesting a replacement deployable autonomous mobile container in accordance with an embodiment of the invention.

As noted above, an exemplary deployable autonomous mobile container moving to be received within the node-based logistics receptacle 58150 may be a replacement deployable autonomous mobile container. FIG. 65 is a diagram illustrating an exemplary node-based logistics receptacle requesting an exemplary replacement deployable autonomous mobile container **5805*r* in accordance with an embodiment of the invention. Referring now to FIG. 65, exemplary node-based logistics receptacle 58150 is shown after having launched its deployable autonomous mobile container 5805. In this condition, those skilled in the art will appreciate that the receptacle 58150 is in need of a replacement for the deployed container 5805. Accordingly, and in an embodiment, the bridge node 58200 of receptacle 58150 may be operative to transmit a replacement request 6500 to the backend server 100 for a replacement deployable autonomous mobile container after transmitting the deploy activation signal, which initiates deployment of deployable autonomous mobile container 5805. In more detail and for example, the bridge node 58200 of receptacle 58150 may be operative to transmit a replacement request 6500 to the backend server 100 for a replacement deployable autonomous mobile container after transmitting the deploy activation signal and upon detecting (e.g., using sensors on the node-based logistics receptacle 58150) that the deployable autonomous mobile container 5805 has moved from the host position within the receptacle 58150 to a position external to the receptacle 58150. In another example, the bridge node 58200 of receptacle 58150 may be operative to transmit a replacement request 6500 to the backend server 100 for a replacement deployable autonomous mobile container after transmitting the deploy activation signal and detecting, using the communication interface 203, a deployment confirmation signal from the deployable autonomous mobile container 5805 confirming the deployable autonomous mobile container 5805 has moved from the host position within the receptacle 58150 to the position external to the storage receptacle 58150**.

Backend server 100, in response to the receipt of such a replacement request 6500, may initiate a replacement operation for node-based logistics receptacle 58150 and send a replacement activation signal 6505 to an exemplary replacement deployable autonomous mobile container **5805*r* as shown in FIG. 65. For example, an embodiment may have bridge node 58200 being further programmatically operative to transmit, after transmitting the deploy activation signal to the deployable autonomous mobile container, a replacement logistics operation request (e.g., as part of replacement request 6500) to the backend server 100 to cause the backend server 100 to initiate the replacement logistics operation involving a replacement deployable autonomous mobile container 5805*r* (e.g., via replacement activation signal 6505) after transmitting the deploy activation signal to the deployable autonomous mobile container 5805**.

Thereafter, a further embodiment may have the bridge node 58200, when executing the monitoring and deployment code, being further programmatically operative to receive (or otherwise confirm receipt of) the replacement deployable autonomous mobile container **5805*r* after transmitting the deploy activation signal to the deployable autonomous mobile container 5805 and after transmitting the replacement request 6500 to the backend server 100. In more detail, the bridge node 58200 may be operative to receive the replacement deployment autonomous mobile container 5805*r* by being operative to detect a signal broadcast by the replacement deployable autonomous mobile container 5805*r* as container 5805*r* autonomously approaches the storage receptacle 58150; and confirm receipt of the replacement deployable autonomous mobile container 5805*r* into the host position within the storage receptacle 58150. As noted above, an embodiment may have bridge node 58200 confirming receipt of a deployable autonomous mobile container into the host position within receptacle 58150 may, for example, be based upon confirmation of the container's location using internal monitoring sensors (e.g., proximity sensors, motion sensors, image sensors) within receptacle 58150 and/or confirming the container has been mated to the power source 5820 within receptacle 58150** via a confirmation detection message or signal).

Further still, an even more detailed embodiment may have bridge node 58200 being operative to detect a signal broadcast by the replacement deployable autonomous mobile container **5805*r* autonomously approaching receptacle 58150; identify container identification information in the signal broadcast by the replacement deployable autonomous mobile container 5805*r* during the approach; verify that the replacement deployable autonomous mobile container 5805*r* is a compatible container for the storage receptacle based upon the container identification information; and receive the replacement deployable autonomous mobile container 5805***r* into the host position within the storage receptacle 58150. In this way, node-enabled logistics receptacle 58150 is able to proactively interrogate the approaching replacement deployable autonomous mobile container 5805*r* to avoid compatibility issues before the container 5805*r* is received within the receptacle 58150 and any potential damage or other issues arising from the incompatibility occur.

Figure 66A:
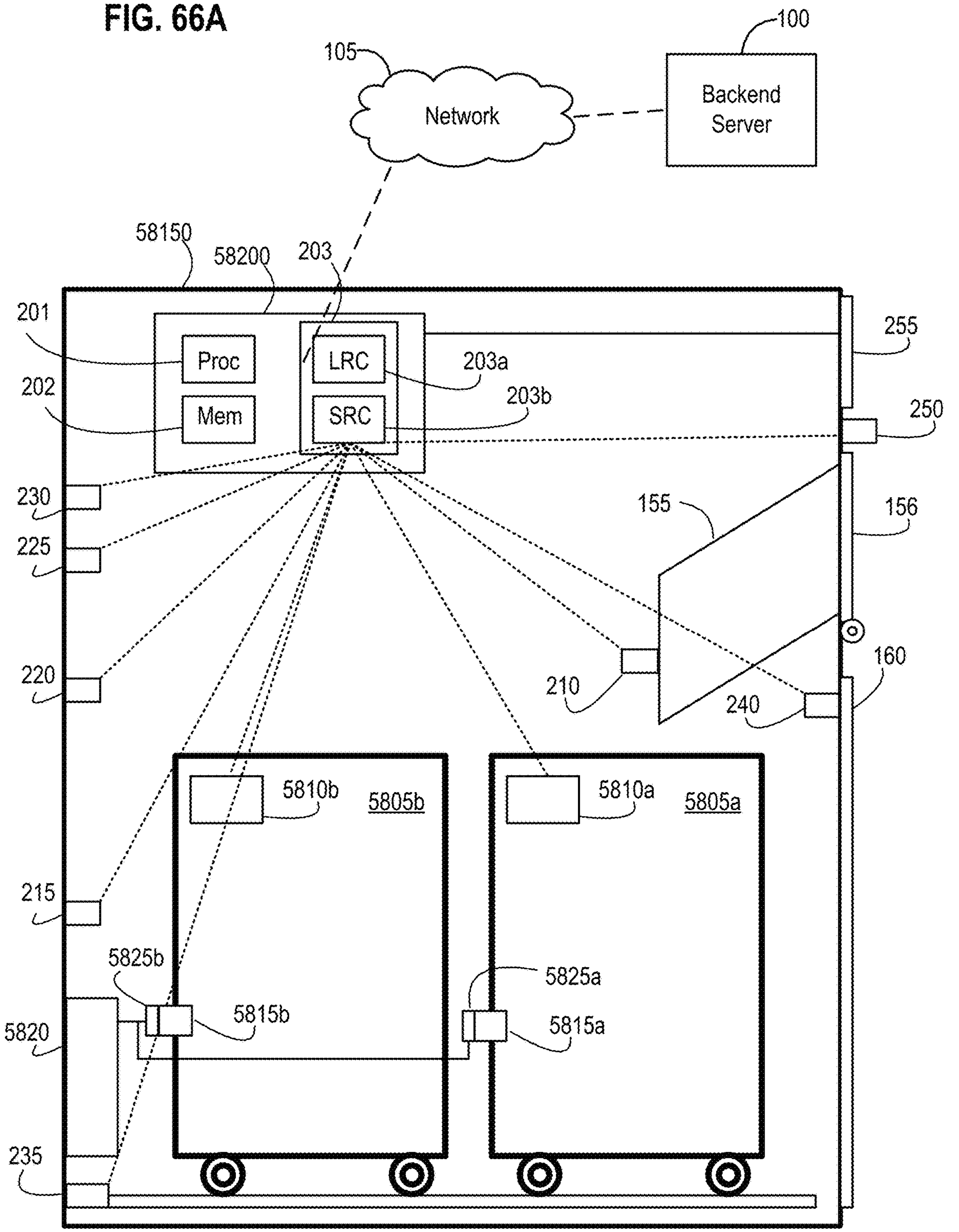
FIGS. 66A-66C are diagrams illustrating an exemplary node-based logistics receptacle having a first deployable autonomous mobile container and a reserve deployable autonomous mobile container in accordance with an embodiment of the invention.
Figure 66B:
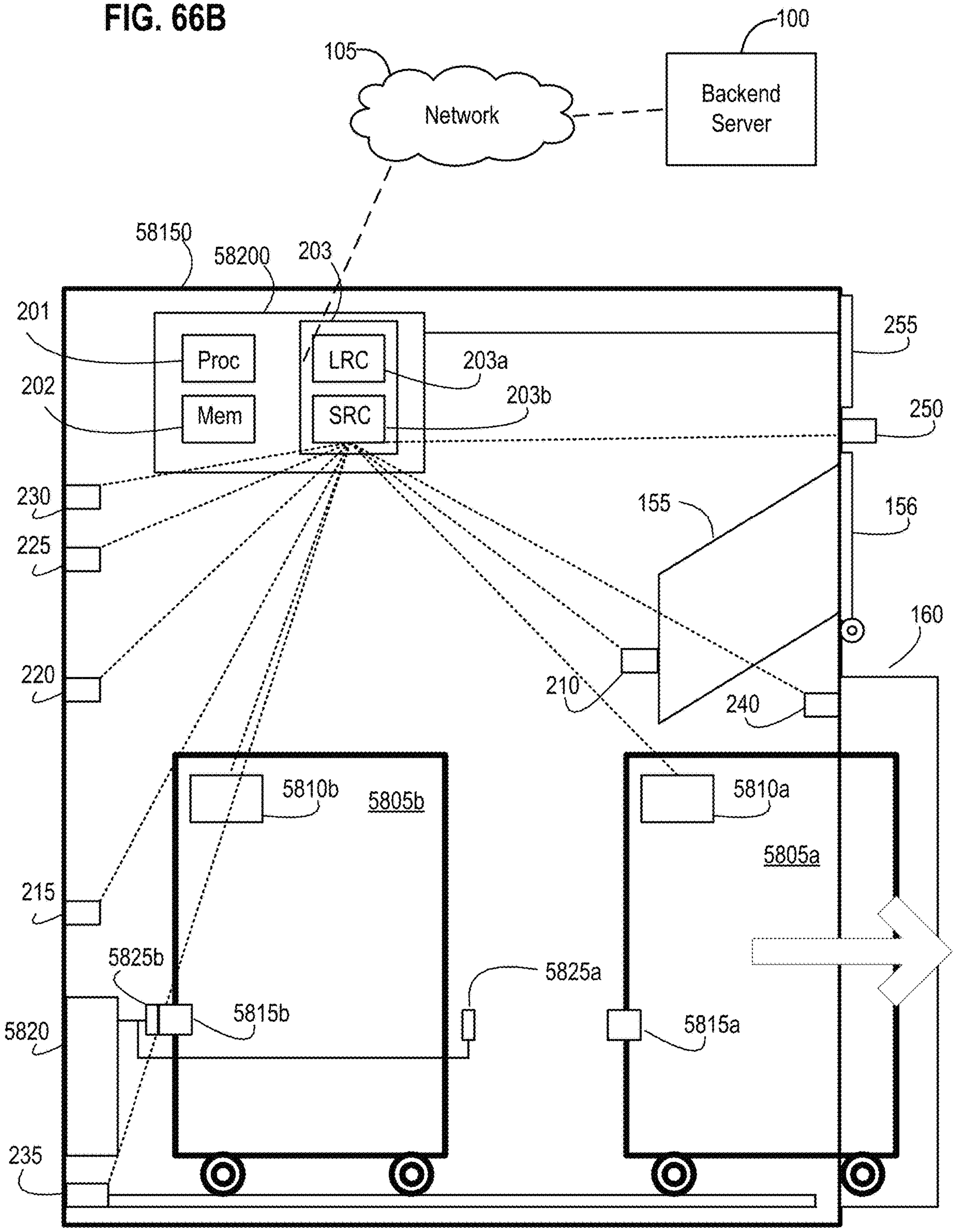
Figure 66C:
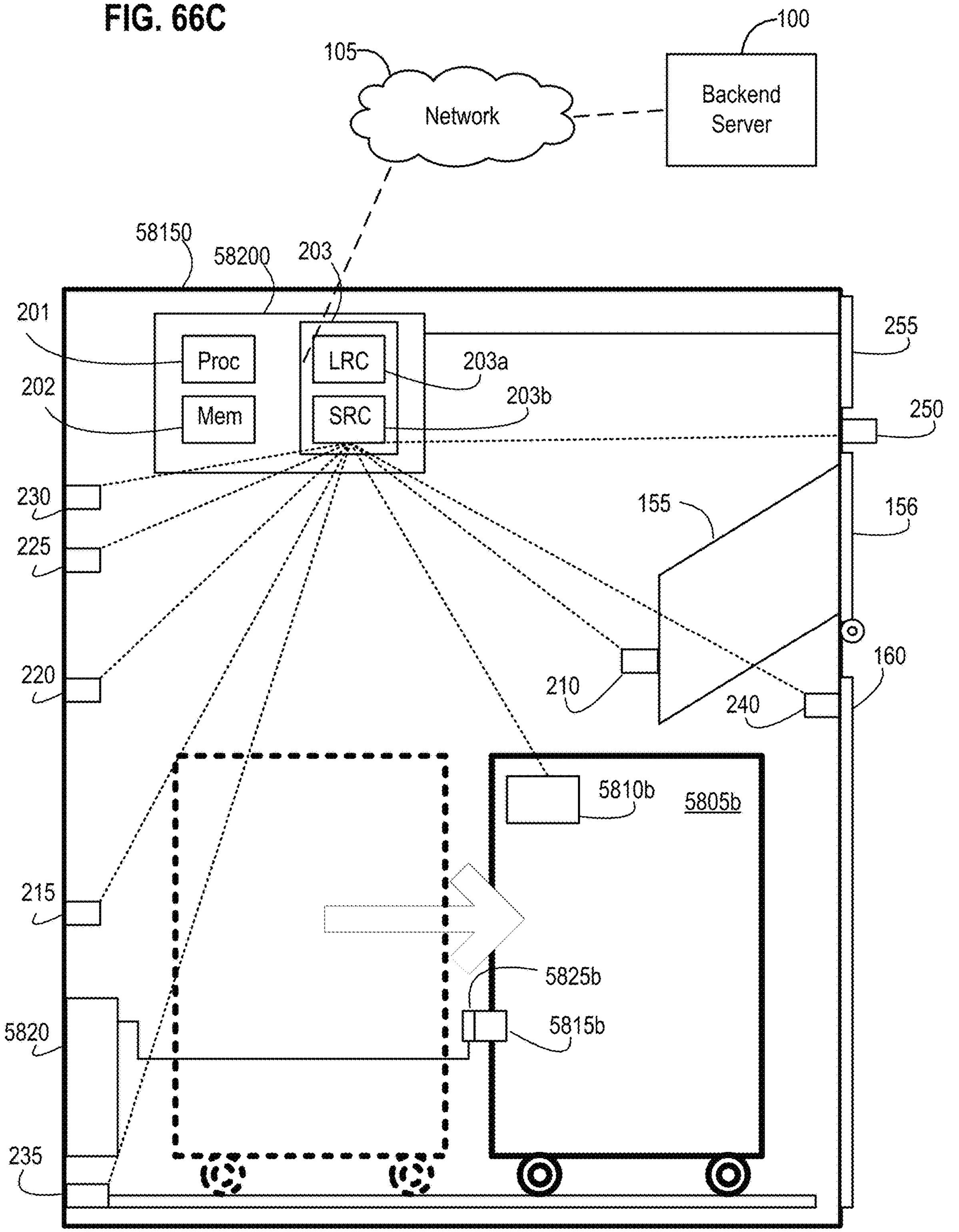

In some embodiments involving a deployable storage element, the node-based logistics receptacle is able to accommodate a first "primary" deployable autonomous mobile container that is current used to receive any items being deposited along with a second "reserve" deployable autonomous mobile container that can take the primary container's place once the primary container is launched. FIGS. 66A-66C are diagrams illustrating an embodiment with an exemplary node-based logistics receptacle 58150 having a first deployable autonomous mobile container 5805*a* and a reserve deployable autonomous mobile container 5805*b* in accordance with an embodiment of the invention. Referring now to FIG. 66A, another embodiment of exemplary node-based logistics receptacle 58150 is shown with the internal capacity to hold two different deployable autonomous mobile containers. A first deployable autonomous mobile container 5805*a* is considered a primary one of the containers as it is in a primary host position where container 5805*a* is used to receive any items being deposited through entrance opening 155/156. Exemplary first deployable autonomous mobile container 5805*a* (similar to exemplary container 5805 described above and shown in FIG. 58A) has an autonomous controller 5810*a* and a power charging port 5815*a* (coupled to power coupling 5820 when container 5805*a* is in the host primary position). In like manner, exemplary reserve deployable autonomous mobile container 5805*b* (also similar to exemplary container 5805 described above and shown in FIG. 58A) is in a reserve host position, has an autonomous controller 5810*b* and a power charging port 5815*b* (coupled to power coupling 5820*b* when container 5805*b* is in the reserve host position) but does not receive items being deposited through entrance opening 155/156 while in the reserve host position. Instead, exemplary reserve deployable autonomous mobile container 5805*b* is held unoccupied in the reserve host position until the container 5805*a* in the primary host position is launched from receptacle 580150 as shown in FIG. 66B.

In more detail, an embodiment may have deployable autonomous mobile container 5805*a* operative to receive delivery items while disposed in the host position within the storage receptacle 58150. The reserve deployable autonomous mobile container 5805*b* is disposed in a holding or reserve host position within the storage receptacle 58150. Furthermore, the reserve deployable autonomous mobile container 5805*b* is operative, as shown in FIG. 66C, to move into the host position (also referred to as the primary host position) within the storage receptacle 58150 after the deployable autonomous mobile container 5805*a* moves to out of the receptacle 58150 to a position external to the storage receptacle 58150 in response to receiving the deploy activation signal from bridge node 58200. Once moved into the primary host position (e.g., when bridge node 58200 transmits a shift activation signal to reserve container 5805*b* and container 5805*b* moves from the holding position to the primary host position in response to the shift activation signal), reserve deployable autonomous mobile container 5805*b* is able to receive at least one subsequent parcel being deposited within the storage receptacle 58150.

Those skilled in the art will further appreciate that in some embodiments that utilize more than one deployable storage element in the node-based logistics receptacle 58150, an embodiment may have the primary container 5805*a* and the reserve container 5805*b* used to receive items. For example, an embodiment may have entrance chute 155 being operative to shift and allow subsequently deposited items deposited after such a shift to be received in the reserve container 5805*b*. Such a shift may be initiated by bridge node 58200 with a control signal applied to an actuator that may move one end of entrance chute 155 or add in addition chute structure to cause such subsequently deposited items to move through chute 155 and into reserve container 5805*b* instead of primary container 5805*a*. Initiating such a chute shift may, for example, be in response to when bridge node 58200 detects an overload condition relative to the receptacle 58150 or a situation approaching such an overload condition using sensor data generated by sensors on or around (e.g., external to) node-based logistics receptacle 58150.

In another example, an embodiment may dispose each of exemplary deployable autonomous mobile containers 5805*a*, 5805*b* in a configuration within an embodiment of node-based logistics receptacle 58150 where both containers 5805*a*, 5805*b* may be launched at the same time as well as at different times independent of each other. Such an embodiment may allow for a given node-based logistics receptacle to use a particular deployable autonomous mobile container for a faster and higher priority shipment service as well as use the other deployable autonomous mobile container for a different level of shipment service (e.g., lower price, conventional delivery time guarantees, and the like).

Figure 67:
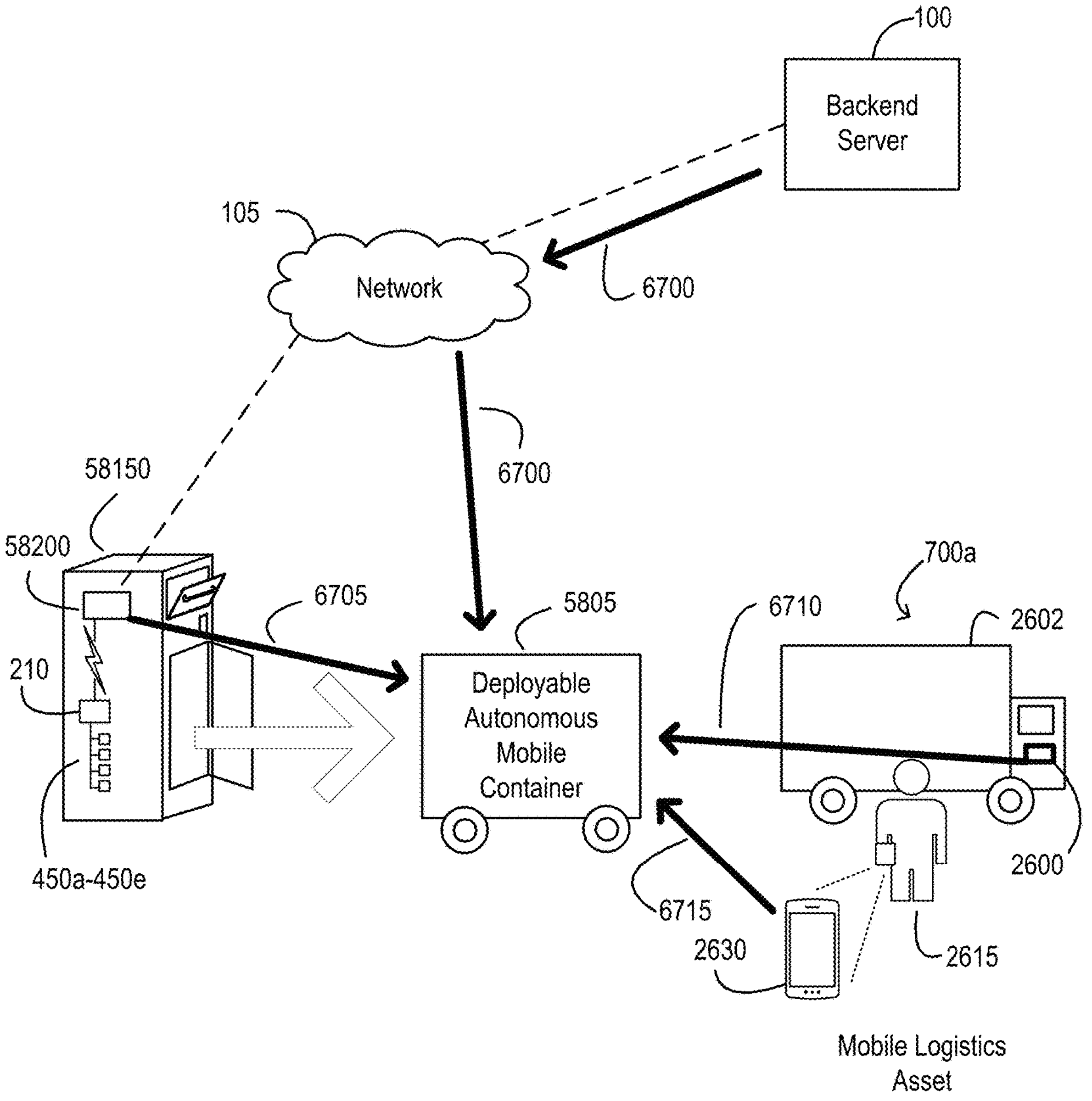
FIG. 67 is a diagram illustrating an exemplary deployable autonomous mobile container that is deployed and receiving a remote input signal used by the deployable autonomous mobile container as part of generating propulsion and steering control signals in accordance with an embodiment of the invention.

Those skilled in the art will also appreciate that an exemplary deployable storage element associated (e.g., deployable autonomous mobile container 5805) with a node-based logistics receptacle may operate once launched in a fully autonomous mode. However, some embodiments may have the deployable storage element receiving remote input so as to have a degree of potential human intervention or override capability (e.g., a level 3 conditional type of driving automation) as the deployable storage element transits outside of the node-enabled logistics receptacle 58150 towards a logistics destination. FIG. 67 is a diagram illustrating an exemplary deployable autonomous mobile container 5805 that is deployed and receiving a remote input signal used by the deployable autonomous mobile container 5805 as part of generating propulsion and steering control signals in accordance with an embodiment of the invention. Referring now to FIG. 67, exemplary deployable autonomous mobile container 5805 is shown deployed from within node-based logistics receptacle 58150 and moving under control of autonomous controller 5810 (also referred to as autonomous controller 6105) as well as according to a remote input signal (e.g., one of signals 6700-6715). In other words, bridge node 58200 is operative to initiate launching and cause container 5805 to move from within receptacle 58150 in response to the deploy activation signal, while the container 5805 continues to move outside of receptacle 58150 autonomously in many embodiments, but also in a semi-autonomous mode in other embodiments where a remote input signal is sent to the autonomous controller running in container 5805. In more detail, such a remote input signal may be received by the deployable autonomous mobile container 5805 as a wireless control signal 6705 generated by the bridge node 58200, a wireless control signal 6700 from the backend server 100, a wireless control signal 6715 from a mobile user device 2630 (e.g., an AR headset type of communication device) operated by a logistics asset 700*a* or personnel 2615 associated with logistics asset 700*a*, and wireless control signal 6710 from a transceiver 2600 operating on a delivery vehicle 2602 associated with a logistics asset 700*a*. Such a remote input signal, for example, may provide a selective override related to the movement of the deployable autonomous mobile container 5805. In even more detail, the autonomous controller on deployable autonomous mobile container 5805 may be operative, in an embodiment, to generate the propulsion and steering control signals in response to at least navigation feedback sensor data, location data, and the remote input signal received from an external device (e.g., bridge node 58200, backend server 100, mobile user device 2630, transceiver 2600 on delivery vehicle) as supplemental autonomous control of the deployable mobile container.

Figure 68:
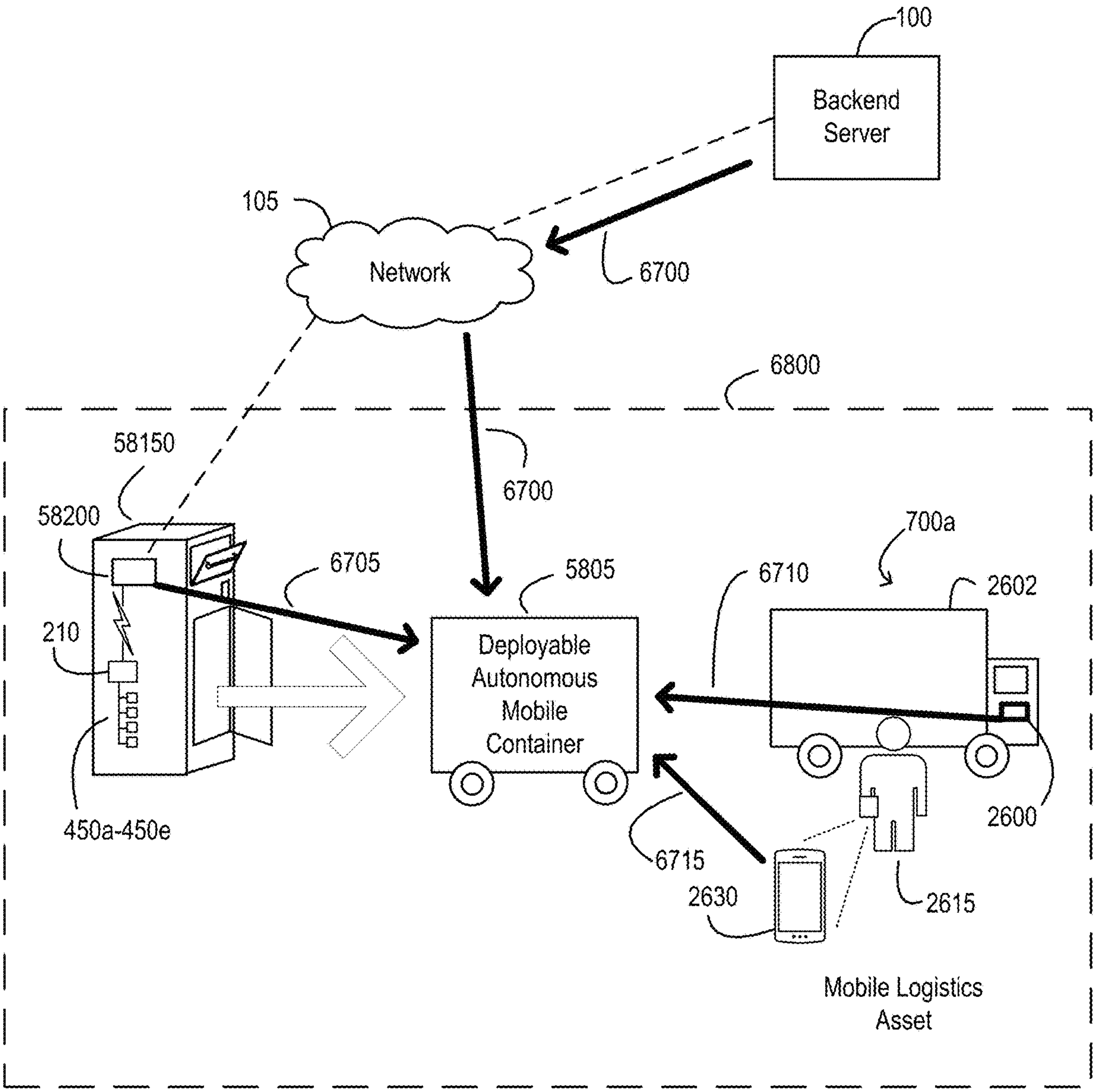
FIG. 68 is a diagram illustrating an exemplary deployable autonomous mobile container that is deployed and autonomously operating within a predefined area in accordance with an embodiment of the invention.

In some embodiments where an exemplary deployable autonomous mobile container has launched is operating in an autonomous manner, a predefined area may be used within which the exemplary deployable autonomous mobile container is self-driving within that predefined area but may require human intervention outside of that predefined area. FIG. 68 is a diagram illustrating an exemplary deployable autonomous mobile container 5805 (similar to that shown in FIG. 67) that is deployed and autonomously operating within a predefined area in accordance with an embodiment of the invention. Referring now to FIG. 68, exemplary deployable autonomous mobile container 5805 is shown deployed from within node-based logistics receptacle 58150 and moving under control of autonomous controller 5810 (also referred to as autonomous controller 6105) as well as according to a remote input signal (e.g., one of signals 6700-6715) but such that container 5805 is autonomously moving (e.g., self-driving) within predefined area 6800 (e.g., a geo-fenced area). In other words, bridge node 58200 is operative to initiate launching and cause container 5805 to move from within receptacle 58150 in response to the deploy activation signal, while the container 5805 continues to move outside of receptacle 58150 autonomously within predefined area 6800, but also in a semi-autonomous mode in other embodiments where a remote input signal (similar to that described above) is sent to the autonomous controller running in container 5805. As such, movement by the deployable autonomous mobile container 5805 within predefined area 6800 relative to the host position of the deployable autonomous mobile container (e.g., the location of node-based logistics receptacle 58150) is autonomously controlled by the container's autonomous controller within the predefined area 6800 after receipt of the deploy activation signal. Further, movement by the deployable autonomous mobile container 5805 outside predefined area 6800 is semi-autonomously controlled by the container's autonomous controller within the predefined area 6800 as it also uses the remote input signal (e.g., one of signals 6700-6715). The remote input signal used in the embodiment shown in FIG. 68, for example, may provide a selective override related to the movement of the deployable autonomous mobile container 5805 within predetermined area 6800. In even more detail, the autonomous controller on deployable autonomous mobile container 5805 may be operative, in an embodiment, to generate the propulsion and steering control signals in response to at least the navigation feedback sensor data and responsive to a remote input signal from an external device (e.g., bridge node 58200, backend server 100, mobile user device 2630, transceiver 2600 on delivery vehicle) as supplemental autonomous control of the deployable mobile container outside of the predefined area 6800. Such a remote input signal, while received outside of predefined area 6800, may be used as a type of override signal.

Figure 69:
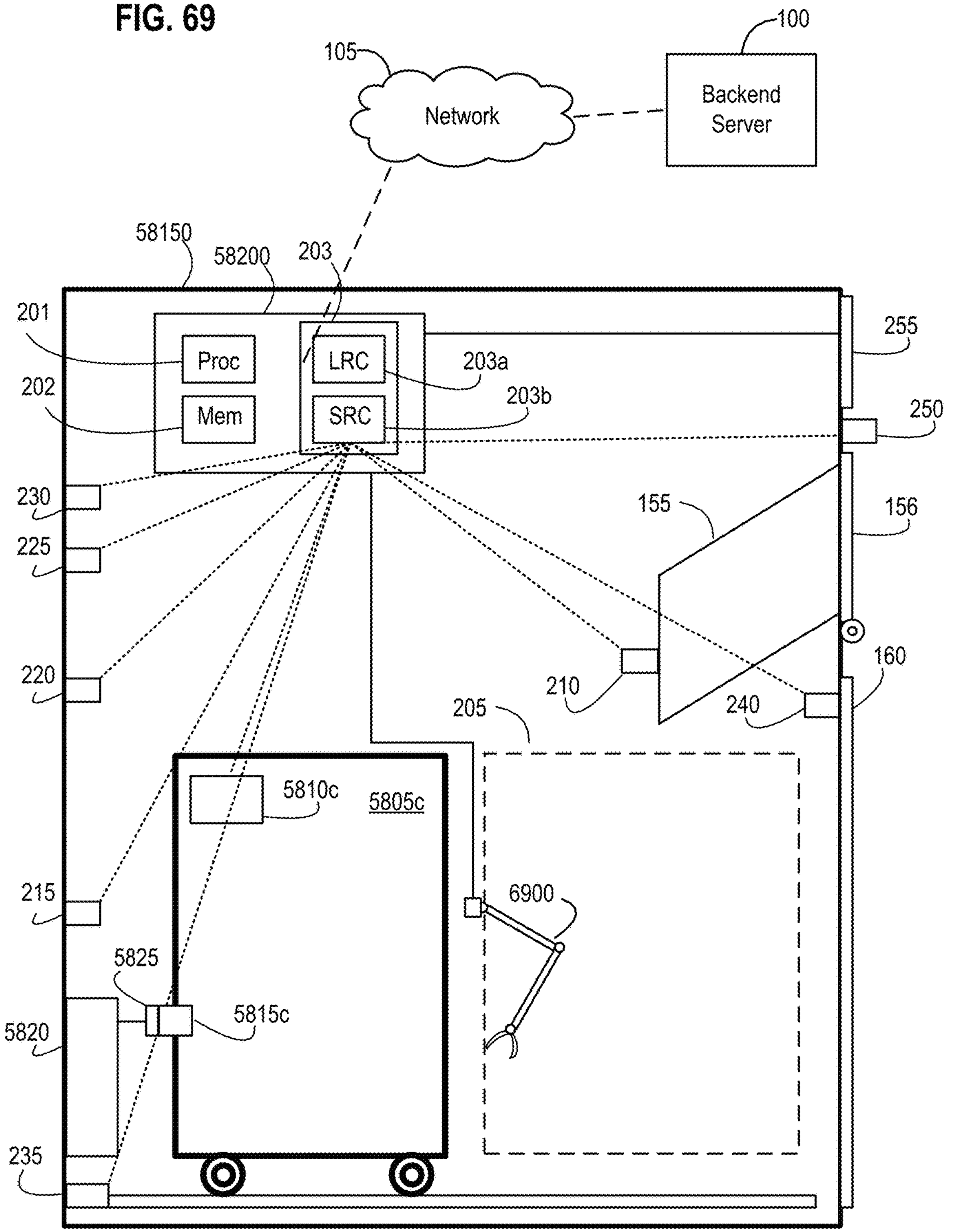
FIG. 69 is a diagram illustrating an exemplary node-based logistics receptacle having a temporary storage area separate from an exemplary deployable autonomous mobile container and an exemplary parcel manipulator that is capable of moving contents of the temporary storage into the deployable autonomous mobile container in accordance with an embodiment of the invention.

In still further embodiments involving a deployable storage element launched from within a node-based logistics receptacle, a further embodiment may use the temporary storage area 205 within an exemplary node-based logistics receptacle 105 but include a deployable autonomous mobile container that may be launched with some or all of the contents maintained in temporary storage area 205 that have been transferred into the deployable autonomous mobile container. FIG. 69 is a diagram illustrating a version of exemplary node-based logistics receptacle 58150 having a temporary storage area 205 separate from an exemplary deployable autonomous mobile container 5805 and an exemplary parcel manipulator 6900 that is capable of moving contents of temporary storage area 205 into an exemplary deployable autonomous mobile container 5805*c* in accordance with an embodiment of the invention. Referring now to FIG. 69, the illustrated version of exemplary node-based logistics receptacle 58150 is similar to that of what is shown in FIGS. 58A and 58B, but this receptacle 58150 has temporary storage area 205 in a location where delivery items deposited through entrance opening 155/156 are received into temporary storage area 205 (rather than directly into container 5805*c*). Additionally, this version of receptacle 58150 includes parcel manipulator 6900 (e.g., a robotic arm capable of grasping and moving items, and the like). Exemplary parcel manipulator 6900 may include machine vision capabilities, is disposed with access to within area 205 and operative to move some or all of those contents of the temporary storage area 205 into the deployable autonomous mobile container 5805*c* in response to a load activation signal from bride node 58200. More particularly, an embodiment may have bridge node 58200 in this version of node-based logistics receptacle 58150 be programmatically operative to detect the change in the state of the entrance opening 155/156 based upon the interaction sensor data, determine a current condition of what is presently maintained within the temporary storage area 205 based upon the storage sensor data, transmit the load activation signal to the parcel manipulator 6900 when the current condition of what is presently maintained within the temporary storage area 205 corresponds to at least the deployment threshold setting for the deployable autonomous mobile container 5805*c*, generate the deploy activation signal after generating the load activation signal, and transmit the deploy activation signal to the deployable autonomous mobile container 5805*c* to initiate movement by the deployable autonomous mobile container 5805*c* from the host position within the storage receptacle 58150 to the position external to the storage receptacle 58150 in response to receiving the deploy activation signal.

It should be emphasized that the sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments to better monitor for use of, engagement with, and deposits of packages (generally referred as delivery items) within or proximate to an enhanced connected logistics receptacle, and advantageously causes a backend server to initiate one or more responsive actions (e.g., a dispatched logistics operation relative to the reporting receptacle). Moreover, at least some of the exemplary embodiments disclosed herein may be used independently from one another and/or in combination with one another and may have applications to devices and methods not disclosed herein.

Those skilled in the art will readily appreciate that operations of such an exemplary enhanced connected logistics receptacle or system that uses such an enhanced connected logistics receptacle, as set forth herein, are not limited to drop boxes or locker units, but may be used to manage logistics related to mobile logistics receptacles that may be serviced by logistics personnel and/or autonomous logistics devices capable of interacting with the enhanced connected logistics receptacle.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

While numerous embodiments and variations of such embodiments are described above, what follows below is a listing of an exemplary claim set focusing on one or more aspects of the different embodiments described above.

What is claimed is:

1. A proactively monitored and reporting logistics receptacle system for receiving and temporarily maintaining a delivery item, the system comprising:

a storage receptacle for receiving the delivery item, the storage receptacle comprising a plurality of monitored storage components comprising at least an entrance opening for receiving the delivery item, a temporary storage area for temporarily maintaining the delivery item once the delivery item has been received by the storage receptacle through the entrance opening, and a selectively accessible retrieval door providing access to the temporary storage area of the storage receptacle;

a bridge node mounted to the storage receptacle, the bridge node comprising a bridge node processor, a bridge node memory coupled to the bridge node processor, the bridge node memory storage maintaining bridge node code for execution by the bridge node processor, and a wireless communication interface coupled to the bridge node processor, the wireless communication interface being operative to communicate with at least a backend server; and a wireless accessory sensor node having a plurality of sensors that respectively monitor each of the monitored storage components for a change in state of the storage receptacle, wherein the wireless accessory sensor node being further operative to determine whether the change in state of the storage receptacle has been detected based upon sensor data generated by at least one of the sensors, generate event information including timestamped information reflecting the detected change in state of the storage receptacle when the sensor data indicates the change in state of the storage receptacle has been detected, periodically generate non-event information resulting from confirming operation of the wireless accessory sensor node when the change in state of the storage receptacle has not been detected, the generated non-event information representing a lack of physical interaction with the monitored storage components, broadcast an updated advertising signal having a flag set within the updated advertising signal, the flag being set indicating the wireless accessory sensor node has a status update available for upload from the wireless accessory sensor node, the status update including at least one of the generated event information or the generated non-event information;

wherein the bridge node processor, when executing the bridge node code maintained on the bridge node memory, is operative to detect, using the wireless communication interface, the flag set within the updated advertising signal, retrieve, using the wireless communication interface, the status update from the wireless accessory sensor node in response to detecting the flag set, and transmit, using the wireless communication interface, receptacle update information to the backend server, the receptacle update information reflecting the retrieved status update including at least one of the generated event information and the generated non-event information, wherein the receptacle update information proactively validates an operational status of the bridge node and the wireless accessory sensor node to the backend server, wherein the receptacle update information causing the backend server to initiate a first type of dispatched logistics operation related to the storage receptacle when the status update reflected in the receptacle update information corresponds to the event information.

2. The system of claim 1, wherein the first type of dispatched logistics operation comprises a dispatched pickup operation for contents within the storage receptacle.

3. The system of claim 1, wherein the receptacle update information transmitted to the backend server causes the backend server to reactively dispatch a logistics asset to the storage receptacle for pickup of at least the delivery item from within the storage receptacle as the first type of dispatched logistics operation.

4. The system of claim 3, wherein the receptacle update information transmitted to the backend server causes the backend server to reactively dispatch the logistics asset to the storage receptacle by causing the backend server to transmit a pickup message to a mobile node operated by the logistics asset, the pickup message identifying the storage receptacle for the dispatched logistics operation.

5. The system of claim 1, wherein the receptacle update information transmitted to the backend server causes the server to alter a previously scheduled dispatch operation related to the storage receptacle as the first type of dispatched logistics operation.

6. The system of claim 5, wherein the receptacle update information transmitted to the backend server causes the server to transmit a pickup message to an alternative logistics asset as the first type of dispatched logistics operation related to the storage receptacle, the alternative logistics asset being different than an original logistics asset corresponding to a previously scheduled dispatch operation related to the storage receptacle.

7. The system of claim 1, wherein the receptacle update information selectively causing the backend server to initiate a second type of dispatched logistics operation related to the storage receptacle when the status update reflected in the receptacle update information corresponds to the non-event information.

8. The system of claim 7, wherein the non-event information comprises an indication the wireless accessory sensor node has not detected the change in state of the storage receptacle and an indication the wireless accessory sensor node is operational to detect the change in state of the storage receptacle.

9. The system of claim 7, wherein the non-event information comprises an indication the wireless accessory sensor node is not operational to detect the change in state of the storage receptacle.

10. The system of claim 7, wherein the second type of dispatched logistics operation comprises a dispatched maintenance operation to service the storage receptacle.

11. The system of claim 1, wherein the sensor data generated by the at least one of the sensors comprises sensor data indicating a change in state of the entrance opening as the change in state of the storage receptacle.

12. The system of claim 11, wherein the at least one of the sensors comprises a motion sensor detecting a change in motion of the entrance opening as the change in state of the storage receptacle.

13. The system of claim 11, wherein the at least one of the sensors comprises a motion sensor detecting a change in motion of the entrance opening and a failure to return to a prior state of the entrance opening as the change in state of the storage receptacle.

14. The system of claim 11, wherein the at least one of the sensors comprises an inertial sensor detecting a change in inertial movement related to the entrance opening as the change in state of the storage receptacle.

15. The system of claim 11, wherein the at least one of the sensors comprises a status sensor detecting a change in orientation of the entrance opening and a failure to return to a prior state of the entrance opening as the change in state of the storage receptacle.

16. The system of claim 15, wherein the retrieved event information transmitted to the backend server is indicative of an overflow state of the storage receptacle.

17. The system of claim 11, wherein the at least one of the sensors comprises a motion sensor detecting movement of what is received through the entrance opening as the change in state of the storage receptacle.

18. The system of claim 11, wherein the at least one of the sensors comprises an accelerometer detecting a change in motion of the entrance opening as the change in state of the storage receptacle.

19. The system of claim 11, wherein the at least one of the sensors comprises a multiple-axis accelerometer detecting a change in multi-dimensional motion of the entrance opening as the change in state of the storage receptacle.

20. The system of claim 11, wherein the at least one of the sensors comprises a gyroscopic sensor detecting a change in movement related to the entrance opening as the change in state of the storage receptacle.

21. The system of claim 11, wherein the at least one of the sensors comprises a magnetic sensor detecting a change in position of the entrance opening as the change in state of the storage receptacle.

22. The system of claim 1, wherein the sensor data generated by the at least one of the sensors comprises sensor data indicating a change in state of the temporary storage area as the change in state of the storage receptacle.

23. The system of claim 22, wherein the at least one of the sensors comprises a motion sensor detecting motion within the temporary storage area as the change in state of the storage receptacle.

24. The system of claim 22, wherein the at least one of the sensors comprises an image sensor detecting a change of what is stored within the temporary storage area as the change in state of the storage receptacle.

25. The system of claim 22, wherein the at least one of the sensors comprises a scale disposed at a bottom of the temporary storage area, the scale detecting a change in weight of what is stored within the temporary storage area as the change in state of the storage receptacle.

26. The system of claim 22, wherein the at least one of the sensors comprises a force sensor disposed within the temporary storage area, the force sensor detecting a change in what has been deposited within the temporary storage area as the change in state of the storage receptacle.

27. The system of claim 26, wherein the force sensor comprises a load cell operative to detect an impact force related to the change in what has been deposited within the temporary storage area as the change in state of the storage receptacle.

28. The system of claim 22, wherein the at least one of the sensors comprises a light sensor detecting a change in light within the temporary storage area as the change in state of the storage receptacle.

29. The system of claim 22, wherein the at least one of the sensors comprises a chemical sensor detecting a chemical within the temporary storage area as the change in state of the storage receptacle.

30. The system of claim 1, wherein the sensor data generated by the at least one of the sensors comprises sensor data indicating a change in state of the selectively accessible retrieval door as the change in state of the storage receptacle.

31. The system of claim 30, wherein the at least one of the sensors comprises a motion sensor detecting a change in motion of the selectively accessible retrieval door as the change in state of the storage receptacle.

32. The system of claim 30, wherein the at least one of the sensors comprises a motion sensor detecting a change in motion of the selectively accessible retrieval door and a failure to return to a prior state of the selectively accessible retrieval door as the change in state of the storage receptacle.

33. The system of claim 30, wherein the at least one of the sensors comprises an inertial sensor detecting a change in inertial movement related to the selectively accessible retrieval door as the change in state of the storage receptacle.

34. The system of claim 30, wherein the at least one of the sensors comprises a gyroscopic sensor detecting a change in movement related to the selectively accessible retrieval door as the change in state of the storage receptacle.

35. The system of claim 30, wherein the at least one of the sensors comprises a status sensor detecting a change in orientation of the selectively accessible retrieval door and a failure to return to a prior state of the selectively accessible retrieval door as the change in state of the storage receptacle.

36. The system of claim 35, wherein the retrieved event information transmitted to the backend server is indicative of an unsecured state of the storage receptacle.

37. The system of claim 30, wherein the at least one of the sensors comprises a magnetic sensor detecting a change in position of the selectively accessible retrieval door as the change in state of the storage receptacle.

38. The system of claim 30, wherein the storage receptacle further comprises a lock for securing the selectively accessible retrieval door; and wherein the at least one of the sensors comprises a lock sensor detecting a change in state of the lock as the change in state of the storage receptacle.

39. The system of claim 1, wherein the at least one of the sensors comprises an external motion sensor detecting a change in what has been placed within a predetermined range of the storage receptacle as the change in state of the storage receptacle.

40. The system of claim 1, wherein the at least one of the sensors comprises a range sensor detecting a change in what has been placed within a predetermined range of the storage receptacle as the change in state of the storage receptacle.

41. The system of claim 40, wherein the range sensor comprises at least one of a proximity sensor, a depth sensor, a LiDAR sensor, an infrared sensor, and a laser-based sensor.

42. The system of claim 1, wherein the entrance opening comprises an articulating door that when open allows the delivery item to be received by the storage receptacle and transferred into the temporary storage area.

43. The system of claim 1, wherein the entrance opening comprises a static chute that allows the delivery item to be inserted through the static chute and into the temporary storage area.

44. The system of claim 1, wherein the entrance opening comprises an articulating drop chute that allows the delivery item to be received in a first position of the articulating drop chute and transfers the received delivery item to the temporary storage area in a second position of the articulating drop chute.

45. The system of claim 1, wherein the wireless accessory sensor node is operative to detect the change in state of the storage receptacle based upon sensor data generated by the at least one of the sensors by being further operative to:

detect a change in state of the entrance opening using the at least one of the sensors, and validate the change in state of the entrance opening by detecting light within the temporary storage area using a second of the sensors.

46. The system of claim 45, wherein the change in state of the storage receptacle corresponds to a delivery event where the delivery item is received by the storage receptacle.

47. The system of claim 1, wherein the wireless accessory sensor node is operative to detect the change in the state of the storage receptacle based upon sensor data generated by the at least one of the sensors by being further operative to:

detect a change in state of the selectively accessible retrieval door using the at least one of the sensors; and validate the change in state of the selectively accessible retrieval door by detecting light within the temporary storage area using a second of the sensors.

48. The system of claim 47, wherein the change in state of the storage receptacle corresponds to a pickup event where the delivery item is removed from the storage receptacle.

49. The system of claim 1, wherein the bridge node processor, when executing the bridge node code, is operative to detect the flag set within the updated advertising signal over the wireless communication interface by being further operative to:

wake from a low power state of the bridge node at a predetermined time of day; and after the predetermined time of day, detect the flag set within the updated advertising signal over the wireless communication interface.

50. The system of claim 1, wherein the bridge node processor, when executing the bridge node code, is operative to detect the flag set within the updated advertising signal over the wireless communication interface by being further operative to:

wake from a low power state of the bridge node at a beginning of a reporting period for the bridge node;

after the beginning of the reporting period for the bridge node, detect the flag set within the updated advertising signal over the wireless communication interface.

51. The system of claim 50, wherein the reporting period for the bridge node comprises a time period defined by the backend server and provided by the backend server to the bridge node.

52. The system of claim 50, wherein the reporting period for the bridge node comprises a dynamically adjusted time period stored in the bridge node memory, the dynamically adjusted time period defined by a reporting period update message sent by the backend server to the bridge node.

53. The system of claim 1, wherein the event information comprises the timestamped information and an identifier indicating a type of detected change in state of the storage receptacle.

54. The system of claim 53, wherein the type of detected change in state of the storage receptacle comprises a change in state of the entrance opening.

55. The system of claim 53, wherein the type of detected change in state of the storage receptacle comprises a change in state of the temporary storage area.

56. The system of claim 53, wherein the type of detected change in state of the storage receptacle comprises a change in state of the selectively accessible retrieval door.

57. The system of claim 53, wherein the storage receptacle further comprises a lock for securing the selectively accessible retrieval door;

wherein the at least one of the sensors comprises a lock sensor monitoring a state of the lock; and wherein the type of detected change in state of the storage receptacle comprises a change in the state of the lock as indicated by the lock sensor.

58. The system of claim 53, wherein the at least one of the sensors comprises an external motion sensor that monitors outside the storage receptacle for movement within a predetermined range of the storage receptacle; and wherein the type of detected change in state of the storage receptacle comprises a change in what has been placed within the predetermined range of the storage receptacle as indicated by the external motion sensor.

59. The system of claim 53, wherein the at least one of the sensors comprises a range sensor that monitors outside the storage receptacle for what has been placed within a predetermined range of the storage receptacle; and wherein the type of detected change in state of the storage receptacle comprises a change in what has been placed within the predetermined range of the storage receptacle as indicated by the range sensor.

60. The system of claim 1, wherein the timestamped information comprises data indicating a time corresponding to the detected change in state of the storage receptacle.

61. The system of claim 1, wherein the timestamped information comprises data indicating a series of times corresponding to a series of related changes to the storage receptacle, wherein the series of related changes to the storage receptacle are detected by the wireless accessory sensor node as the detected change in state of the storage receptacle.

62. The system of claim 1, wherein the wireless accessory sensor node further comprises a sensor node processor in operative communication with the sensors, a sensor node memory coupled to the sensor node processor, the sensor node memory storage maintaining sensor node code for execution by the sensor node processor, and a wireless transceiver interface coupled to the sensor node processor, the wireless transceiver interface being operative to communicate with the wireless communication interface of the bridge node, and wherein the sensor node processor, when executing the sensor node code maintained on the sensor node memory, is operative to receive the sensor data generated by the sensors, detect the change in state of the storage receptacle based upon the sensor data generated by the at least one of the sensors, record the timestamped information reflecting the detected change in state of the storage receptacle, generate the event information including the timestamped information reflecting the detected change in state of the storage receptacle when the sensor data indicates the change in state of the storage receptacle has been detected, periodically generate the non-event information confirming the operation of the wireless accessory sensor node when the change in state of the storage receptacle has not been detected, broadcast the updated advertising signal having a flag set within the updated advertising signal over the wireless transceiver interface, the flag being set indicating the wireless accessory sensor node has the status update available for upload from the wireless accessory sensor node, the status update including at least one of the generated event information or the generated non-event information.

63. The system of claim 62, wherein the wireless accessory sensor node receives at least a portion of the sensor data over the wireless transceiver interface.

64. The system of claim 62, wherein the wireless accessory sensor node further comprises a sensor interface coupling the sensor node processor to the sensors, the sensor interface being operative to communicate with the sensors and receive the sensor data.

65. The system of claim 64, wherein the sensor interface being wirelessly coupled to at least a portion of the sensors.

66. The system of claim 1, wherein the bridge node comprises a mobile bridge node, the mobile bridge node further comprising location circuitry coupled to the bridge node processor and operative to generate location data reflecting a current location of the mobile bridge node as mounted to the storage receptacle.

67. The system of claim 66, wherein the receptacle update information transmitted to the backend server further includes the current location of the mobile bridge node.

68. The system of claim 66, wherein the storage receptacle being disposed on a mobile delivery vehicle.

69. A proactively monitored and reporting logistics receptacle system for receiving and temporarily maintaining a delivery item, the system comprising:

a storage receptacle for receiving the delivery item, the storage receptacle comprising a plurality of monitored storage components comprising at least an entrance opening for receiving the delivery item, a temporary storage area for temporarily maintaining the delivery item once the delivery item has been received by the storage receptacle through the entrance opening, and a selectively accessible retrieval door providing access to the temporary storage area of the storage receptacle;

a bridge node mounted to the storage receptacle, the bridge node comprising a bridge node processor, a bridge node memory coupled to the bridge node processor, the bridge node memory storage maintaining bridge node code for execution by the bridge node processor, and a wireless communication interface coupled to the bridge node processor, the wireless communication interface being operative to communicate with at least a backend server; and a wireless accessory sensor node having a plurality of sensors that respectively monitor each of the monitored storage components for a change in state of the storage receptacle, wherein the bridge node processor, when executing the bridge node code maintained on the bridge node memory, is operative to retrieve, using the wireless communication interface, a status update from the wireless accessory sensor node, the status update comprising at least one of (a) event information regarding the change in state of the storage receptacle as detected by at least one of the sensors, and (b) non-event information confirming an operation status of the wireless accessory sensor node when the change in state of the storage receptacle has not been detected, the non-event information representing a lack of physical interaction with the monitored storage components, generate receptacle update information reflecting the status update retrieved from the wireless accessory sensor node, and transmit, using the wireless communication interface, the receptacle update information to the backend server, wherein the receptacle update information sent to the backend server selectively causing the backend server to initiate one of a first type of dispatched logistics operation related to the storage receptacle and a second type of dispatched logistics operation related to the storage receptacle depending upon the status update as reflected in the receptacle update information.

70. The system of claim 69, wherein the receptacle update information sent to the backend server selectively causing the backend server to initiate the first type of dispatched logistics operation related to the storage receptacle when the status update as reflected in the receptacle update information comprises the event information.

71. The system of claim 70, wherein the first type of dispatched logistics operation comprises a dispatched pickup operation for contents within the storage receptacle.

72. The system of claim 69, wherein the receptacle update information sent to the backend server selectively causing the backend server to initiate the second type of dispatched logistics operation related to the storage receptacle when the status update as reflected in the receptacle update information comprises the non-event information.

73. The system of claim 72, wherein the non-event information comprises an indication the wireless accessory sensor node has not detected the change in state of the storage receptacle and an indication the wireless accessory sensor node is operational to detect the change in state of the storage receptacle.

74. The system of claim 72, wherein the non-event information comprises an indication the wireless accessory sensor node is not operational to detect the change in state of the storage receptacle.

75. The system of claim 72, wherein the second type of dispatched logistics operation comprises a dispatched maintenance operation to service the storage receptacle.

* * * * *